US008114527B2

(12) United States Patent
Nagasawa et al.

(10) Patent No.: US 8,114,527 B2
(45) Date of Patent: Feb. 14, 2012

(54) HIGHLY CORROSION-RESISTANT, RUST-PREVENTION COATING MATERIAL, HIGHLY CORROSION-RESISTANT STEEL, AND STEEL STRUCTURE

(75) Inventors: Makoto Nagasawa, Tokyo (JP); Minoru Ito, Tokyo (JP); Michio Kaneko, Tokyo (JP); Kenji Katoh, Tokyo (JP); Shiro Imai, Yokohama (JP); Masatoshi Kominami, Kitakyushu (JP); Toshiro Terakawa, Himeji (JP); Takashi Kumai, Himeji (JP)

(73) Assignee: Nippon Steel Corporation, Tokyo (JP)

( * ) Notice: Subject to any disclaimer, the term of this patent is extended or adjusted under 35 U.S.C. 154(b) by 297 days.

(21) Appl. No.: 12/311,455

(22) PCT Filed: Sep. 26, 2007

(86) PCT No.: PCT/JP2007/069331
§ 371 (c)(1),
(2), (4) Date: Mar. 25, 2009

(87) PCT Pub. No.: WO2008/038828
PCT Pub. Date: Apr. 3, 2008

(65) Prior Publication Data
US 2010/0028658 A1   Feb. 4, 2010

(30) Foreign Application Priority Data

Sep. 28, 2006 (JP) .................. 2006-264115
Sep. 11, 2007 (JP) .................. 2007-235500

(51) Int. Cl.
*B32B 5/06* (2006.01)
*B32B 15/16* (2006.01)
*B32B 15/18* (2006.01)
*C22C 18/00* (2006.01)

(52) U.S. Cl. ......... 428/659; 428/548; 428/658; 420/513; 75/255

(58) Field of Classification Search .................. None
See application file for complete search history.

(56) References Cited

U.S. PATENT DOCUMENTS 3,827,140 A * 8/1974 Yamagishi et al. .......... 228/199
(Continued)

FOREIGN PATENT DOCUMENTS

JP   01-311178   12/1989
(Continued)

OTHER PUBLICATIONS

International Search Report dated Dec. 4, 2007 issued in corresponding PCT Application No. PCT/JP2007/069331.

*Primary Examiner* — Jennifer McNeil
*Assistant Examiner* — Jason Savage
(74) *Attorney, Agent, or Firm* — Kenyon & Kenyon LLP

(57) ABSTRACT

A highly corrosion-resistant, rust-prevention coating material comprising:
  an inorganic binder; and
  Zn metal particles comprised of Zn and unavoidable impurities and dispersed in the binder at the rate of 30 mass % or greater based on a dry coating film,
  wherein (i) the Zn metal particles include (i-1) fine-grain Zn metal particles of 0.05 to 5 μm peak grain diameter whose grain-diameter distribution has a grain-diameter frequency distribution with a single peak and a tail on either side of the peak and (i-2) coarse-grain Zn metal particles of 6 to 100 μm peak grain diameter whose grain-diameter distribution has a grain-diameter frequency distribution with another single peak and a tail on either side of the peak, and
  wherein (ii) the percentage of all Zn metal particles accounted for by Zn metal particles of 0.05 to 5 μm grain diameter expressed in volume percentage is 5 to 99%.

11 Claims, 1 Drawing Sheet

U.S. PATENT DOCUMENTS

| | | | |
|---|---|---|---|
| 3,941,609 A * | 3/1976 | Stern | 106/403 |
| 4,352,899 A * | 10/1982 | Tada et al. | 523/451 |
| 5,167,701 A * | 12/1992 | Savin | 106/14.41 |
| 5,413,628 A * | 5/1995 | Savin | 106/14.44 |
| 5,868,819 A * | 2/1999 | Guhde et al. | 106/14.14 |
| 6,399,146 B1 * | 6/2002 | Harris et al. | 427/127 |
| 2006/0093909 A1 * | 5/2006 | Zhang | 429/209 |
| 2009/0068493 A1 * | 3/2009 | Sakakibara et al. | 428/626 |
| 2010/0247956 A1 * | 9/2010 | Katoh et al. | 428/659 |

FOREIGN PATENT DOCUMENTS

| | | |
|---|---|---|
| JP | 02-073932 | 3/1990 |
| JP | 08-151538 | 6/1996 |
| JP | 2000-080309 | 3/2000 |
| JP | 2001-164194 | 6/2001 |
| JP | 2002-285102 | 10/2002 |
| JP | 2003-213394 | 7/2003 |
| JP | 2005-314501 | 11/2005 |
| JP | 2005-336431 | 12/2005 |

* cited by examiner

HIGHLY CORROSION-RESISTANT, RUST-PREVENTION COATING MATERIAL, HIGHLY CORROSION-RESISTANT STEEL, AND STEEL STRUCTURE

FIELD OF THE INVENTION

This invention relates to a highly corrosion-resistant, rust-prevention coating material and a highly corrosion-resistant steel, particularly to a highly corrosion-resistant, rust-prevention coating material that exhibits outstanding corrosion resistance and rust prevention when applied to the surface of various types of steel, to a highly corrosion-resistant steel coated with the coating material, and to a steel structure including the steel.

DESCRIPTION OF THE RELATED ART

Rust-prevention coating materials containing large amounts of Zn particles, specifically zinc-rich paints, are in general use as rust-prevention coating materials against combating steel rusting. The Zn particles used in a zinc-rich paint are usually produced by the mist process. Zn particles (grains) produced by the mist process are spherical particles with a grain diameter distribution wherein the average grain diameter has a single frequency peak in the region of from several to several tens of μm.

The Zn particles are used mainly in the undercoating of heavy-duty corrosion preventive coating. The rust-prevention mechanism is characterized in utilizing the sacrificial corrosion protection effect of the Zn particles contained in the coating.

The rust-prevention performance of a zinc-rich paint coating therefore depends heavily on the sacrificial corrosion protection effect of the Zn particles. In some use environments, the rate of Zn consumption is so high that the protective effect with respect to the steel does not last very long.

Countermeasures include that of reducing the average grain diameter of the Zn particles in the coating material and that of increasing the coating thickness. But these expedients may lead to a decline in adherence to the steel and ready occurrence of coat cracking and sagging. In other words, it has been difficult to achieve a coating that offers excellent rust prevention performance while also being good in physical properties and easy to apply. The aforesaid countermeasures thus leave much to be desired.

In view of this situation, a need has been felt for the development of a high-performance zinc-rich paint that preserves the current merits of such paints and further exhibits sacrificial corrosion protection over the long term. A number of proposals for this purpose have been reported.

For example, Japanese Patent Publication (A) No. H08-151538 ('538) teaches an organic coating composition reduced in Zn particle and other metal content by addition of a bonding agent and metal powder of less than −750 mV potential.

Inventions aimed at improving corrosion resistance by combining new alloy particles have also been reported.

For example, Japanese Patent Publication (A) No. H01-3111178 ('178) teaches a zinc-rich paint containing Zn alloy particles and Mn particles in addition to Zn particles. And Japanese Patent Publication (A) No. 2001-164194 ('194) teaches a corrosion-resistant coating material containing Zn—Al—Mg alloy particles.

These inventions attempt to enhance corrosion resistance by combining Zn—Mg alloy particles and an organic resin such as epoxy resin or urethane resin.

In addition, Japanese Patent Publication (A) No. H02-73932 ('932) teaches use of an inorganic binder. The technology of this publication exploits the long-life performance of inorganic Zn—Mg particles having a metal structure composed of Zn and $MgZn_2$.

A number of other studies have approached the issue from the aspect of particle shape. For example, Japanese Patent Publication (A) No. 2002-285102 ('102) and Japanese Patent Publication (A) No. 2005-336431 ('431) teach inorganic corrosion resistant coating materials containing flaky particles of Zn—Mg alloy and corrosion-resistant steels coated with the coating materials.

SUMMARY OF THE INVENTION

Although '538 achieves corrosion resistance superior to that of conventional zinc-rich paints by using a binding agent and controlling metal powder potential, it is an ordinary organic coating material readily degraded in an environment involving a combination of elements like ultraviolet rays, moisture and oxygen, so that it is vulnerable to secondary issues such the need for relatively frequent maintenance.

Another problem with '538 that must be addressed is that it generates much toxic gas during baking.

'178 and '194 use mainly organic binders and '932 uses mainly an inorganic binder. All three teach use of high-corrosion-resistance particles such as Mg, Al and the like as metal particles.

They improve corrosion resistance by forming $MgZn_2$ and $Mg_2Zn_{11}$ intermetallic compounds. Specifically, the intermetallic compounds are present inside alloy particles whose surfaces are covered with an oxide layer or Zn and Mg solid solution phase.

The intermetallic compound phase having high corrosion resistance therefore cannot easily appear at the alloy particle surfaces. As a result, corrosion resistance is inadequate.

Moreover, when low-electrical-conductivity $ZnCl_2.4Zn(OH)_2.H_2O$ forms in the main rust component, the sacrificial corrosion protection effect is not thoroughly manifested. This is another issue that must be overcome.

The alloy particles are most often produced by ingot fragmentation, the atomization process or the mist process. Reliable production of the alloy particles on an industrial scale is therefore impossible. This is another point requiring attention.

Although '102 and '431 teach flaky alloy particles, spray-coating of flaky alloy particles is difficult. Flaky alloy particles cannot achieve adequate coating film adherence by conventional airless spraying, so that improvement is necessary in this regard.

The object of this invention is therefore to provide a highly corrosion-resistant, rust-prevention coating material and a highly corrosion-resistant steel that exhibit corrosion resistance and rust prevention markedly superior to that obtainable heretofore. It achieves this object by, unlike what has been possible heretofore, producing Zn metal particles or Zn alloy particles that have two different peak grain diameters or average grain diameters, particularly Zn metal particles or Zn alloy particles having two peaks including one added on the fine-grain side, and combining these particles with an inorganic or organic binder.

In the present invention, Zn metal particles comprised of Zn and unavoidable impurities are dispersed in the binder of the rust-prevention coating material in an amount of 30 mass % or greater based on the dry coating film. The inventors accomplished the invention by taking advantage of the following fundamental knowledge acquired in the course of a broad-ranging study.

Outstanding corrosion resistance, rust prevention and coating property are exhibited when the Zn metal particles used have a grain diameter distribution including two peaks, namely, when the Zn metal particles used include both (i) fine-grain Zn metal particles of 0.05 to 5 µm peak grain diameter or 0.01 to 5 µm average grain diameter and (ii) coarse-grain Zn metal particles of 6 to 100 µm peak grain diameter or average grain diameter, and the percentage of all Zn metal particles accounted for by fine-grain Zn metal particles of 0.05 to 5 µm grain diameter expressed in volume percent is 5% to 99%.

The inventors further conducted a detailed study regarding the possibility of further improving the corrosion resistance and rust prevention offered by the aforesaid particles having a grain diameter distribution including two peaks.

As a result, they learned that a rust-prevention coating material excellent rust prevention can be obtained by using as the fine-grain Zn metal particles or coarse-grain Zn metal particles Zn alloy particles containing, in mass %, 0.01 to 30% Mg and further that a rust-prevention coating material of still more excellent rust prevention performance can be obtained by incorporating in the Zn alloy particles, in mass %, one or both of Al: 0.01 to 30% and Si: 0.01 to 3%.

The inventors also conducted studies focused on the shape and state of the Zn alloy particles and the Zn—Mg—Al—Si alloy particles containing one or both of Al: 0.01 to 30 mass % and Si: 0.01 to 3 mass %.

As a result, they ascertained that rust prevention improves, probably owing to improved spontaneous dissolving property, when the fine-grain alloy particles or coarse-grain alloy particles are not spherical but are shaped bodies that are formed by fragmentation or the like to have multiple flat or curved surfaces each enclosed by a single contour line and that have physical fragmentation (fracture) faces or cracks on the surfaces thereof.

A particularly noteworthy finding was that rust prevention improves dramatically when cracks of 0.01 µm or greater length and 0.01 µm or greater depth are present. The inventors further found that in this case a notable additional improvement in rust prevention is observed when one or more of the intermetallic compounds $MgZn_2$, $Mg_2Zn_{11}$, $MgZn$ and $Mg_2Zn_3$ are present on the fragmentation surfaces.

The inventors further made an in-depth study with regard to a method for producing Zn metal particles having two grain-diameter frequency peaks in the grain-diameter distribution.

As a result, they discovered that Zn alloy particles that have not only a grain-diameter frequency peak like the conventional one but also a grain-diameter frequency peak farther to the fine-grain side than the conventional one and that exhibit even better corrosion resistance and rust prevention can be formed by producing primary particles by an ordinary method like the mist process or gas-atomization process and thereafter causing the particles to collide with one another or collide with another solid body.

The Zn alloy particles having the two grain-diameter frequency peaks exhibit excellent corrosion resistance and rust prevention when used as coating material pigment without modification. However, a further investigation revealed that when used as mixed with conventional, widely-employed Zn particle pigment produced by an ordinary method like the mist process or gas-atomization process, there is realized corrosion resistance and rust prevention far superior to that when conventional Zn particles are used alone.

The inventors further found that an organic coating material using the invention Zn metal particles or Zn alloy particles as pigment exhibits excellent corrosion resistance and rust prevention not heretofore achievable, even in a severe environment including a combination of organic coating material degrading factors like ultraviolet rays, moisture and oxygen.

The inventors further carried out a thorough study regarding the distribution of the Zn metal particles in the dry coating film and learned that an additional improvement in corrosion resistance and rust prevention can be achieved by concentrating the fine-grain Zn alloy particles in the film surface layer.

The present invention was accomplished based on the foregoing knowledge. The gist of the invention is as set out below.

(1) A highly corrosion-resistant, rust-prevention coating material comprising:

an inorganic binder; and

Zn metal particles comprised of Zn and unavoidable impurities and dispersed in the binder at the rate of 30 mass % or greater based on a dry coating film, wherein (i) the Zn metal particles include (i-1) fine-grain Zn metal particles of 0.05 to 5 µm peak grain diameter whose grain-diameter distribution has a grain-diameter frequency distribution with a single peak and a tail on either side of the peak and (i-2) coarse-grain Zn metal particles of 6 to 100 µm peak grain diameter whose grain-diameter distribution has a grain-diameter frequency distribution with another single peak and a tail on either side of the peak, and wherein (ii) the percentage of all Zn metal particles accounted for by Zn metal particles of 0.05 to 5 µm grain diameter expressed in volume percentage is 5 to 99%.

(2) A highly corrosion-resistant, rust-prevention coating material comprising:

an inorganic binder; and

Zn metal particles comprised of Zn and unavoidable impurities and dispersed in the binder at the rate of 30 mass % or greater based on a dry coating film, wherein (i) the Zn metal particles include (i-1) fine-grain Zn metal particles of 0.01 to 5 µm average grain diameter whose grain-diameter distribution has a grain-diameter frequency distribution with a single peak and a tail on either side of the peak and (i-2) coarse-grain Zn metal particles of 6 to 100 µm average grain diameter whose grain-diameter distribution has a grain-diameter frequency distribution with another single peak and a tail on either side of the peak, and wherein (ii) the percentage of the fine-grain Zn metal particles and coarse-grain Zn metal particles accounted for by the fine-grain Zn metal particles expressed in volume percentage is 5 to 99%.

(3) A highly corrosion-resistant, rust-prevention coating material according to (1) or (2), wherein the metal particles are Zn alloy particles containing, in mass %, Mg: 0.01 to 30% and a balance of Zn and unavoidable impurities.

(4) A highly corrosion-resistant, rust-prevention coating material according to (1) or (2), wherein the zinc metal particles are mixed particles including (a) zinc metal particles containing Zn and unavoidable impurities and (b) Zn alloy particles containing, in mass %, Mg: 0.01 to 30% and a balance of Zn and unavoidable impurities.

(5) A highly corrosion-resistant, rust-prevention coating material according to (3) or (4), wherein the Zn alloy particles further contain, in mass %, one or both of Al: 0.01 to 30% and Si: 0.01 to 3%.

(6) A highly corrosion-resistant, rust-prevention coating material according to any of (3) to (5), wherein the Zn alloy particles have physical fracture facets and/or cracks of 0.01 µm or greater length or cracks of 0.01 µm or greater depth, and Mg solid solution phase and Zn—Mg intermetallic compounds are present at the fragmentation faces and/or cracks (7) A highly corrosion-resistant, rust-prevention coating material according to (6), wherein an average value of the aspect ratio (maximum grain diameter/minimum grain diameter) of the Zn alloy particles is 1 to 1.5.

(8) A highly corrosion-resistant, rust-prevention coating material according to (6) or (7), wherein the Zn—Mg intermetallic compounds are one or more of $MgZn_2$, $Mg_2Zn_{11}$, $Mg_2Zn_3$, $MgZn$ and $Mg_7Zn_3$.

(9) A highly corrosion-resistant, rust-prevention coating material according to any of (3) to (8), wherein the Zn alloy particles are polyhedrons having multiple flat or curved surfaces each enclosed by a single contour line.

(10) A highly corrosion-resistant, rust-prevention coating material according to any of (3) to (9), which has dispersed in the binder thereof not only said fine-grain Zn alloy particles and coarse-grain Zn alloy particles but also Zn metal particles of an average grain diameter of 0.05 to 50 μm containing Zn and a balance of unavoidable impurities, wherein (a) the total volume percentage of all metal particles accounted for by Zn alloy particles of a grain diameter of 0.05 to 5 μm expressed in volume percentage is 5 to 99% and (b) the metal particles are in total dispersed in the binder at the rate of 30 mass % or greater based on a dry coating film.

(11) A highly corrosion-resistant, rust-prevention coating material according to (10), wherein the ratio, in mass %, of (amount of the fine-grain and coarse-grain Zn metal particles or amount of the fine-grain and coarse-grain Zn alloy particles): (amount of the Zn metal particles of an average grain diameter of 0.05 to 50 μm containing Zn and a balance of unavoidable impurities) is, when expressed as 1/x, such that x is 300.0 or less.

(12) A highly corrosion-resistant, rust-prevention coating material according to (11), wherein the Mg content of the mixed particles including the Zn alloy particles and the Zn metal particles of an average grain diameter of 0.05 to 50 μm containing Zn and a balance of unavoidable impurities is 0.01 to less than 30 mass % where the total of the mixed particles is defined as 100 mass %.

(13) A highly corrosion-resistant, rust-prevention coating material according to any of (1) to (12), wherein an organic binder is used instead of the inorganic binder.

(14) A highly corrosion-resistant steel coated with a highly corrosion-resistant, rust-prevention coating material set out in any of (1) to (13), wherein the thickness of the dry coating film is 2 to 700 μl and the fine-grain Zn metal particles and coarse-grain Zn metal particles or the fine-grain Zn alloy particles and coarse-grain Zn alloy particles are dispersed in the coating film.

(15) A highly corrosion-resistant steel coated with a highly corrosion-resistant, rust-prevention coating material set out in any of (3) to (13),
wherein the thickness of the dry coating film is 2 to 700 μm and the fine-grain Zn alloy particles and coarse-grain Zn alloy particles are dispersed in the coating film, and
wherein the content ratio of the fine-grain Zn alloy particles of a grain diameter of 0.05 to 5 μm in an outermost 10% thickness surface layer region of the dry film is twice or greater the content ratio of the fine-grain Zn alloy particles of a grain diameter of 0.05 to 5 μm in the whole dry film.

(16) A steel structure equipped partially or completely with the highly corrosion-resistant steel set out in (14) or (15).

This invention enables provision of highly corrosion-resistant coating material and highly corrosion-resistant steel that exhibit excellent corrosion-resistance and rust prevention unattainable using the metal particles added to conventional rust-prevention coating materials. It achieves this improvement over the prior art by producing Zn metal particles or Zn alloy particles having two grain-diameter frequency peaks in the grain-diameter frequency distribution and combining the particles with an inorganic or organic binder.

DETAILED DESCRIPTION OF THE INVENTION

Figure 1:
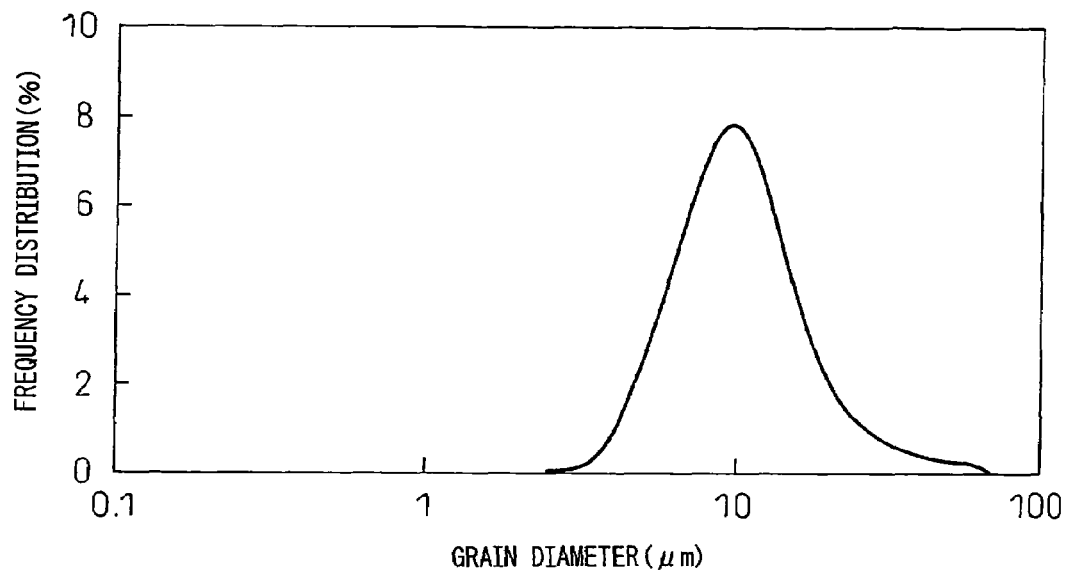
FIG. 1 is a diagram showing the grain-diameter distribution of the Zn metal particles contained in a conventional zinc-rich primer. It shows part of the results obtained by laser scattering particle distribution analysis. The horizontal axis is scaled for grain diameter (μm) represented as equivalent spherical diameter. The vertical axis is scaled for frequency distribution (%) represented as equivalent spherical volume.

The requirements specified by the present invention will be explained in detail.

The invention does not particularly specify the method of producing the Zn metal particles and Zn alloy particles used. The coarse-grain Zn metal particles and coarse-grain Zn alloy particles of the invention can, for example, be produced by general-purpose powder production methods such as the mist process or the atomization process.

The fine-grain Zn metal particles and fine-grain Zn alloy particles can be produced by the mist process or the atomization process. They can also be produced by a physical fragmentation method that causes Zn metal particles or Zn alloy particles produced by one of the foregoing processes to collide directly or indirectly with one another.

As specific physical fracture methods can be mentioned, for instance, that of adding Zn metal particles or Zn alloy particles obtained by the mist process or atomization process to toluene or xylene and jetting the so-obtained slurry so as to bring counterflows into collision with one another, and that of causing a jetted stream of the slurry to collide perpendicularly with a separate flat solid body.

The Zn metal particles or Zn alloy particles contained in the highly corrosion-resistant, rust-prevention coating material according to the invention must be composed of (i-1) fine-grain Zn metal particles or fine-grain Zn alloy particles of 0.05 to 5 μm peak grain diameter or 0.01 to 5 μm average diameter whose grain-diameter distribution has a grain-diameter frequency distribution with a single peak and a tail on either side of the peak and (i-2) coarse-grain Zn metal particles or coarse-grain Zn alloy particles of 6 to 100 μm peak grain diameter or average grain diameter whose grain-diameter distribution has a grain-diameter frequency distribution with another single peak and a tail on either side of the peak.

Although Zn metal particles that have a single grain-diameter frequency distribution peak, like those contained in conventional rust-prevention coating materials, can be produced at low cost, they are limited with regard to improvement of the metal particle filling factor because, on average, particles of the same size come to be evenly distributed in the coating film.

Although the approach to corrosion resistance improvement has been to reduce the peak grain diameter or average grain diameter of the metal particle grain-diameter distribution, thereby increasing the filling factor, or to increase film thickness, adequate corrosion resistance improvement has not been achieved because these measures cause film cracking and sagging.

In contrast, the present invention imparts two grain-diameter frequency peaks to the grain-diameter distribution of the Zn metal particles or Zn alloy particles, thus increasing the filling factor and making it possible to markedly improve corrosion resistance without application of a thick coat.

The grain-diameter distribution of the Zn metal particles and Zn alloy particles can be determined by dispersing the Zn metal particles or Zn alloy particles in an organic solvent such as toluene or xylene having a moisture content of 0.8% or less and conducting laser scattering particle distribution analysis in this state.

When the moisture content is high, caution is required because the grain diameters change owing to a reaction between the Zn metal particles or Zn alloy particles and water.

In accordance with the principle of laser scattering analysis, the grain-diameter distribution is determined from the equivalent spherical diameters of the Zn metal particle or Zn alloy particle grain diameters.

The grain-diameter distribution can be represented as a histogram by representing the grain diameter d (μm) logarithmically on the horizontal axis, defining 25 to 27 d segments on the logarithmic representation for the individual orders of magnitude change in d, and linearly representing the frequency (vol %) detected for every d segment on the vertical axis.

In this invention, fragmenting the Zn alloy particles so as to form physical fragmentation (fracture) facets or cracks on the surfaces thereof produces an improvement in corrosion resistance exceeding the improvement in corrosion resistance that can be realized by increasing the filling factor.

A "physical fragmentation (fracture) face" as termed with respect to the present invention means a face shaped by a portion of a spherical particle breaking away. As explained further later, the fact of the Zn alloy particles having physical fragmentation faces makes it possible to realize a considerable improvement in corrosion resistance and rust prevention.

A "crack" as termed with respect to the present invention means a fissure present at the spherical particle surface of a length of 0.01 μm or greater or a depth from the surface of 0.01 μm or greater. When the length or depth of the cracks is less than 0.01 μm, an adequate improvement in corrosion resistance cannot be obtained. A length or depth of 0.01 μm or greater is therefore necessary.

The cracks are often formed as a byproduct of the fragmentation for obtaining the physical fragmentation faces. Regarding the abundance of cracks, it is preferable for 1 or more cracks of 0.01 μm or greater length or depth to be seen in 20% or greater of the number of Zn alloy particles per field of observation when the Zn alloy particles are observed with a scanning electron microscope or the like.

When the peak grain diameter of the grain-diameter distribution of the fine-grain Zn metal particles or fine-grain Zn alloy particles is less than 0.05 μm, or when the average grain diameter thereof is less than 0.01 μm, loss from the surfaces tends to occur owing to mechanical removal or chemical extraction, so that adequate sacrificial corrosion protection cannot be obtained. Therefore, the lower limit of the peak grain diameter was defined as 0.05 μm and the lower limit of the average grain diameter as 0.01 μm.

Two grain diameter frequency peaks cannot be obtained when the peak grain diameter or average grain diameter of the fine-grain Zn metal particles or fine-grain Zn alloy particles exceeds 5 μm, so 5 μm was defined as the upper limit.

The peak grain diameter or average grain diameter of the grain-diameter distribution of the coarse-grain Zn metal particles or coarse-grain Zn alloy particles was defined as 6 μm or greater because when it is less than 6 μm, the corrosion resistance and rust prevention saturate and, in addition, it becomes impossible to obtain two grain diameter frequency peaks.

When the peak grain diameter or average grain diameter of the grain-diameter distribution of the coarse-grain Zn metal particles or coarse-grain Zn alloy particles exceeds 100 μm, stable spray coating or brush coating cannot be achieved. The upper limit was therefore defined as 100 μm.

When coating property and adherence are a concern in addition to corrosion resistance, it is preferable to define the peak grain diameter or average grain diameter of the grain-diameter distribution of the fine-grain Zn metal particles or fine-grain Zn alloy particles as 1 to 4 μm and the peak grain diameter or average grain diameter of the grain-diameter distribution of the coarse-grain Zn metal particles or coarse-grain Zn alloy particles as 6 to 20 μm.

Further, from the viewpoint of achieving stable spray coating, it is preferable to define the peak grain diameter or average grain diameter of the grain-diameter distribution of the fine-grain Zn metal particles or fine-grain Zn alloy particles as 1.5 to 2.5 μm and the peak grain diameter or average grain diameter of the grain-diameter distribution of the coarse-grain Zn metal particles or coarse-grain Zn alloy particles as 8.5 to 11.5 μm.

Insofar as the particle diameters are within the foregoing ranges, no limit is placed on the width ratios of the two different grain diameter frequency peaks. However, sharper grain diameter frequency peaks are preferable from the viewpoint of maximizing rust prevention performance.

Among all of the particles contained in the invention highly corrosion-resistant, rust-prevention coating material, i.e., among the combined total of the fine-grain Zn metal particles or fine-grain Zn alloy particles whose peak grain diameter or average grain diameter of the grain-diameter distribution is 0.05 to 5 μm and the coarse-grain Zn metal particles or coarse-grain Zn alloy particles whose peak grain diameter or average grain diameter of the grain-diameter distribution is 6 to 100 μm, the percentage of the particles accounted for by particles of 0.05 to 5 μm diameter, expressed in volume percentage, must be 5% or greater.

When the percentage is less than 5%, no pronounced improvement of corrosion resistance and rust prevention is observed.

The maximum percentage accounted for by particles of 0.05 to 5 μm diameter contained in the invention highly corrosion-resistant, rust-prevention coating material, expressed in volume percentage, is defined as 99% because corrosion resistance improves in proportion as the percentage of fine-grain Zn metal particles or fine-grain Zn alloy particles increases.

At greater than 99%, however, the excessive fine-grain Zn metal particles do not contribute to, but may detract from, the effect of improving corrosion resistance. The upper limit is therefore defined as 99%.

Insofar as the percentage of all Zn metal particles having two grain diameter frequency peaks accounted for by Zn metal particles of 0.05 to 5 μm diameter, expressed in volume percentage, is 5 to 99%, a dramatic improvement in corrosion resistance and rust prevention can be achieved even if Zn metal particles produced by the mist process or gas atomization process are combined.

From the viewpoint of the applied film, it is necessary for the fine-grain Zn metal particles or fine-grain Zn alloy particles and the coarse-grain Zn metal particles or coarse-grain Zn alloy particles to be present in a total amount of 30 mass % or greater based on the dry coating film. Excellent corrosion resistance and rust prevention cannot be realized when the content is less than 30 mass %.

In the present invention, the presence of the two grain diameter frequency peaks enables marked improvement of corrosion resistance and rust prevention even when Zn alloy particles obtained by adding Mg, Al, Si or the like to Zn are combined with conventional Zn metal particles.

The corrosion resistance and rust prevention improving effect produced by the Zn alloy particles or the mixed Zn metal particles and Zn alloy particles having two grain diameter frequency peaks is more pronounced than the corrosion resistance and rust prevention improving effect produced by the Zn alloy particles having two grain diameter frequency peak.

Reasons for this stronger corrosion resistance improvement include, among others, an increase in the grain-diameter frequency distribution on the fine-grain side attributable to Mg addition and exposure of physical fracture facets and cracks.

No substantial improvement in rust prevention performance is obtained when the Mg content of the Zn alloy particles is less than 0.01 mass % and rust prevention performance declines when the Mg content exceeds 30 mass %. Mg content is therefore defined as 0.01 to 30 mass %.

In order to enhance physical fragmentation property and crack occurrence by adding Mg to the Zn alloy, Mg is preferably added to a content of 0.5 to 15 mass %. As Mg is more expensive than Zn, an Mg content of 0.5 to 10 mass % is economically preferable.

The mixing ratio of the Zn metal particles and Zn alloy particles need not be defined insofar as the aforesaid composition limits are observed. However, Mg addition produces no substantial improvement in rust prevention at an Mg content of less than 0.01 mass %, while Mg addition has a reverse effect at a content exceeding 30 mass %. The total Mg content is therefore preferably 0.01 to 30 mass %.

Although corrosion resistance improves with increasing Mg content, Mg is a more expensive material than Zn. Since overall material cost is therefore increased by Mg addition, the total Mg content is preferably 0.01 to 10 mass % for optimum balance between corrosion resistance and economy.

Moreover, the inventors discovered that addition of general-purpose Zn metal particles of 2 to 20 μm average grain diameter to Zn alloy particles having two grain diameter frequency peaks in the grain-diameter distribution enables a major improvement in economy without loss of steel corrosion resistance enhancing effect.

However, in this case too, it is necessary for the volume percentage of the total of the Zn alloy particles and Zn metal particles accounted for by Zn alloy particles of 0.05 to 5 μm diameter to be 5 to 99% and for the Zn alloy particles and Zn metal particles to be dispersed in a total amount of 30 mass % or greater based on the dry coating film.

Further, as regards the mixing of the Zn alloy particles and Zn metal particles, it is preferable from the viewpoint of improving corrosion resistance and rust prevention to conduct the mixing under a condition whereby the ratio, in mass %, of (Zn alloy particle content %):(Zn metal particle content %) is, when expressed as 1/x, such that x is 300.0 or less.

When x exceeds 300.0, the effect of Zn alloy particle addition toward improvement of corrosion resistance and rust prevention ceases to be observed and x must therefore be made 300.0 or less.

When top priority is placed on corrosion resistance, it is preferable to increase the percentage of Zn alloy particles without limit so that the percentage of Zn metal particles approaches zero. However, in the interest of striking a practical balance between corrosion resistance and economy, the ratio (Zn alloy particle content %):(Zn metal particle content %) is preferably between 1:1 and 1:120. From the aspect of mixing stability, the ratio is preferably between 1:1 and 1:30.

In the present invention, the average grain diameter in the grain-diameter distribution of the Zn metal particles used in the mixture is, from the standpoint of optimizing economy and filling factor, preferably 2 to 50 μm, which is an intermediate grain diameter range in the grain-diameter distribution having two grain diameter frequency peaks.

It is worth noting that addition of general-purpose Zn metal particles of 2 to 50 μm average grain diameter to Zn metal particles having two grain diameter frequency peaks in the grain-diameter distribution makes it possible to achieve better economy while retaining the effect of steel corrosion resistance improvement.

In the present invention, corrosion resistance can be increased by adding one or both of Al and Si to the Zn alloy.

No effect of improving rust prevention performance is obtained when the Al content of the Zn alloy particles is less than 0.01 mass %. When Al is present at content exceeding 30 mass %, it impairs the physical fragmentation property by incorporating Mg in solid solution. Al content is therefore defined as 0.01 to 30 mass %.

From the aspects of rust prevention performance and ease of occurrence of physical fracture facets and/or cracks, Al content is preferably 0.01 to 10 mass %, and when physical fragmentation property is a primary concern, it is preferably 0.01 to 2 mass %

No effect of improving coating film adherence or physical fragmentation property is obtained when the Si content of the Zn alloy particles is less than 0.01 mass %. When Si is present at a content exceeding 3 mass %, corrosion resistance declines. Si content is therefore defined as 0.01 to 3 mass %. In order to maximize coating film adherence and corrosion resistance, Si content is preferably 0.1 to 1 mass %.

The mixing ratio of Al and Si in the coating film need not be defined insofar as the Al and Si contents are within the aforesaid ranges. From the viewpoint of corrosion resistance, the contents are preferably Al: 0.01 to 1.0 mass % and Si: 0.01 to 1.0 mass %.

The Zn alloy particles containing Mg contain intermetallic compounds and can be provided with physical fragmentation faces and/or cracks on their outer surface during the fine alloy particle production process.

The intermetallic compounds are compounds of Mg and Zn combined in simple whole-number ratios. Examples include $MgZn_2$, $Mg_2Zn_{11}$, $MgZn$, $Mg_2Zn_3$, and $Mg_7Zn_3$. Among these intermetallic compound, $MgZn_2$ and $Mg_2Zn_{11}$ are particularly preferable from the viewpoint of fragmentation property and corrosion resistance.

Corrosion resistance and rust prevention improve further when the metal particles are not spherical but are physically fragmented into the shape of sphere-like polyhedrons. The sphere-like polyhedrons are quasi-spheres formed by physical fragmentation of spherical particles. Polyhedrons having 2 or more faces are preferable for optimizing the balance among coating film adherence, economy and corrosion resistance. Polyhedrons having 6 or more faces are preferable for corrosion resistance improvement.

Such Zn metal particles and Zn alloy particles are dispersed in a vehicle (liquid binder) to obtain the highly corrosion-resistant, rust-prevention coating material of this invention. Usable vehicles include, for example, inorganic binders such as alkyl silicate and alkali silicate, and organic binders such as epoxy resin, urethane resin, phenoxy resin and polyester resin.

Other liquid binders are also usable, including any of the liquid binders used in zinc-rich paints. The coating material can be either of the emulsion type or the solvent type.

Other ordinary additives can be incorporated within ranges not impairing corrosion resistance For example, when the coating material is to be used to form a corrosion preventive primer coat, a third component such as boron can be added to enhance adherence with the topcoat.

In order to achieve rust prevention capability, the mixing of the Zn metal particles and Zn alloy particles with the binder must be conducted so that the total of fine Zn metal particles or fine-grain Zn alloy particles and coarse-grain Zn metal particles or coarse-grain Zn alloy particles are evenly dispersed in an amount of 30 mass % or greater based on the dry coating film. From the viewpoint of good balance among the three properties of corrosion resistance, workability and cut-tablility, the amount dispersed is preferably 40 to 65 mass %.

By keeping the moisture content of the produced coating material at 0.8% or less, it is possible to ensure that the fine-grain and coarse-grain Zn metal particles and the fine-grain and coarse-grain Zn alloy particles maintain their suitable stability and reactivity performance, thereby enabling production of a corrosion preventive coating material excellent in rust prevention.

When the highly corrosion-resistant, rust-prevention coating material according to the present invention is prepared using an inorganic binder such as alkali silicate or alkyl silicate, it is preferable at the time of applying it to a steel plate or other steel material to pretreat the base material to some degree so as to ensure strong adherence.

Although application following treatment with a hand tool or power tool is acceptable, application after blasting is desirable for obtaining high bonding strength.

When an organic binder such as epoxy resin, urethane resin, phenoxy resin or polyester resin is used, good results can be obtained by direct application to the steel plate or material. However, a coated steel plate or the like having still more excellent corrosion resistance can be obtained by subjecting the surface to blasting, phosphating or chromating beforehand.

The reason for defining the lower limit of coating thickness as 2 μm is that a coated material of adequate corrosion resistance and rust prevention cannot be obtained when the coating is thinner than 2 μm. Although rust prevention improves with increasing coat thickness, the upper limit of coating thickness must be set at 700 μm from the viewpoint of adherence performance and for preventing coat cracking after drying and coating material sagging during application.

For optimum coat performance and economy, the preferred range of coat thickness is 5 to 50 μm in combination with an inorganic binder and 5 to 100 μm in combination with an organic binder.

Moreover, with regard to the distribution of 0.05 to 5 μm grain diameter Zn alloy particles in the coating, corrosion resistance and rust prevention tend to improve when the content ratio of Zn alloy particles of a grain diameter of 0.05 to 5 μm in an outermost 10% thickness surface layer region of the dry film is high. In order to secure this corrosion resistance and rust prevention improving effect without fail, the content ratio of Zn alloy particles of a grain diameter of 0.05 to 5 μm in the outermost 10% thickness surface layer region of the dry film should be made twice or greater the content ratio of the Zn alloy particles of a grain diameter of 0.05 to 5 μm in the whole dry film. This markedly increases the high corrosion resistance and rust prevention effect of the coating film when it is applied to a steel.

EXAMPLES

Concrete embodiments of the present invention are explained in the following.

First Set of Examples

The grain-diameter distribution and average diameter of the Zn metal particles and Zn alloy particles, and the total volume percentage of particles in the 0.05 to 5 μm grain-diameter range were determined by laser scattering particle distribution analysis.

Therefore, grain diameter was evaluated as equivalent spherical diameter and volume percentage was evaluated as the equivalent spherical volume of the particles.

A histogram for evaluating grain diameter-distribution was drawn by representing grain diameters of 0.05 μm and greater on the horizontal axis and representing the proportion of the number of particles whose grain diameters fell in grain-diameter intervals $d_n$ to $d_{n+1}$ (μm) of 0.05 μm and greater diameter on the vertical axis. Here, $d_n+1=(1+\alpha)d_n$, where n is a natural number and α is for convenience defined as 0.09 to 0.1.

The peak value was determined from this grain-diameter histogram. In the case where grain diameter is represented as equivalent spherical diameter and grain diameter is represented logarithmically, this method makes possible to draw a histogram that, for instance, has the 1 to 10 μm range divided into 25 to 27 equal grain diameter segments.

Specifically, the histogram was created by logarithmically representing grain diameter on the horizontal axis as equivalent spherical diameter, linearly representing in every equivalent spherical diameter segment of $d_n$ to less than $d_{n+1}$ on the vertical axis the frequency $f_n$ of the particles contained in the segment as the equivalent spherical volume percentage (%) of the total equivalent spherical volume of all measured particles, plotting $f_n$ for every $(d_n d_{n+1})^{1/2}$, and connecting neighboring plots.

The peak value is therefore the grain diameter $(d_n d_{n+1})^{1/2}$ at which frequency $f_n$ exhibits maximum value.

The grain-diameter distribution and average grain diameter of particles of 0.01 to 0.05 μm average diameter were determined by laser scattering particle distribution analysis using an analyzer equipped with an ultraviolet semiconductor laser.

As termed with respect to the present invention, "fine grains" means grains that, as determined by grain-diameter distribution measurement using laser scattering particle distribution analysis, are Zn metal particles or Zn alloy particles of 0.05 to 5 μm peak grain diameter or 0.01 to 5 μm average diameter having a grain-diameter frequency distribution with a single peak and a tail on either side of the peak. The term "coarse grains" means grains that are Zn metal particles or Zn alloy particles of 6 to 100 μm peak grain diameter or 6 to 100 μm average grain diameter having a grain-diameter frequency distribution with another single peak and a tail on either side of the peak.

Grain diameter distributions obtained in Examples are shown in Tables 1 to 172 as expressed in either peak grain diameter or average grain diameter.

The state of Zn metal particles and Zn alloy particles was determined by observing 50 to 100 randomly extracted particles using a scanning electron microscope equipped with a field emission electron gun.

Particle fragmentation (fracture) facets and cracked surfaces were observed with a scanning electron microscope. Zn alloy particles in particular were examined for Zn and Mg distribution state and the atomic concentration ratios of the elements by mapping analysis using an energy-dispersive X-ray analyzer attached to a scanning electron microscope. It was checked whether Zn—Mg intermetallic compounds were present and the element ratios of those found were examined.

Presence of Zn—Mg intermetallic compounds and their types were determined based on the shape of the secondary electron image, color and shape of the backscattered electron image, the mapping analysis image, the result of Zn and Mg atomic concentration ratio measurement, and result of Zn alloy particle X-ray diffraction analysis.

Specifically, Zn alloy particles for which presence of $MgZn_2$, $Mg_2Zn_{11}$ or $Mg_2Zn_3$ was ascertained from the X-ray diffraction analysis results were measured with an energy-dispersive X-ray analyzer for physical fragmentation (fracture) facets on the surfaces of particles of 5 μm or greater grain diameter, $MgZn_2$, $Mg_2Zn_{11}$, or $Mg_2Zn_3$ was identified from the results of the Zn and Mg atomic concentration ratio measurement, and the shape and color thereof was ascertained from the secondary electron image and backscattered electron image of the surface thereof.

In the case of the surface of a fine particle of less than 5 μm grain diameter which, because of its small size, could not be accurately measured for element ratio with an energy-dispersive X-ray analyzer, presence of $MgZn_2$, $Mg_2Zn_{11}$ or $Mg_2Zn_3$ was inferred by comparing the secondary electron image and backscattered electron image with the secondary electron image and backscattered electron image of a region other than a physical fragmentation face.

On the other hand, in the case of Zn alloy particles having an Mg concentration of 20 to 30 mass %, MgZn and $Mg_7Zn_3$ were determined from the results of the atomic concentration ratio measurement.

Figure 2:
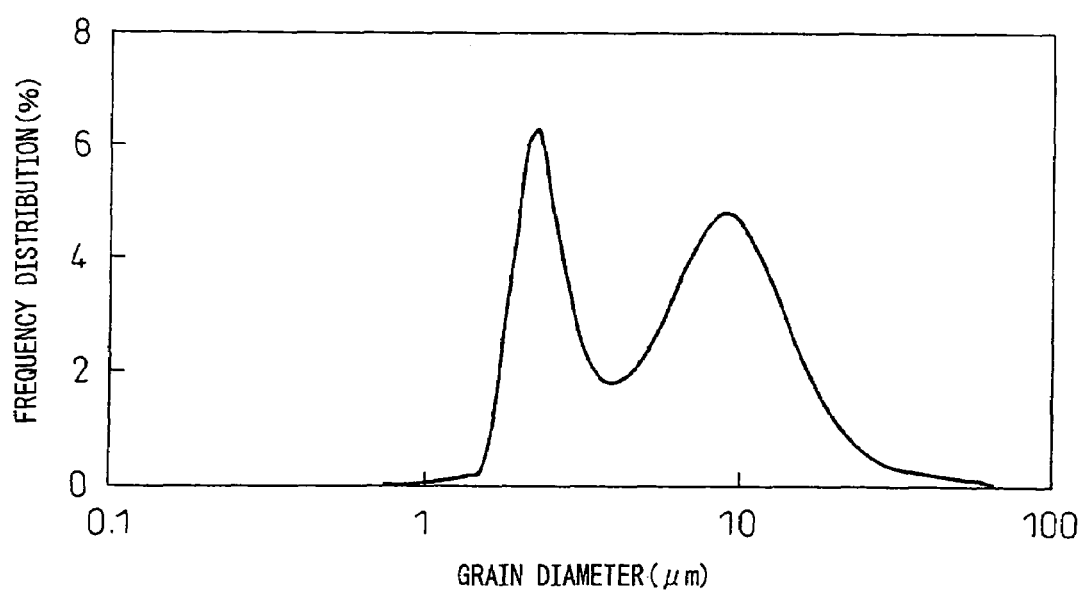
FIG. 2 is a diagram showing and example of the grain-diameter distribution of Zn alloy particles contained in the invention highly corrosion-resistant, rust-prevention coating material. It shows part of the results obtained by laser scattering particle distribution analysis. The horizontal axis is scaled for grain diameter (μm) represented as equivalent spherical diameter. The vertical axis is scaled for frequency distribution (%) represented as equivalent spherical volume.

FIG. 1 shows the grain-diameter distribution of Zn metal particles contained in a conventional zinc-rich primer, which can be considered to be typical of the Comparative Examples. FIG. 2 shows the grain-diameter distribution of Zn metal particles contained in a highly corrosion-resistant, rust-prevention coating material typical of the present invention.

The grain-diameter distribution of the conventional zinc-rich primer shown in FIG. 1 has a grain-diameter frequency peak at around 10 μm. In contrast, the grain-diameter distribution of the Invention Example shown in FIG. 2, while also having one grain-diameter frequency peak similar to that of the Comparative Example at around 10 μm, further has another grain-diameter frequency peak located 2 to 3 μm toward the fine-grain side from that of the Comparative Example.

In Comparative Examples 1 to 18 shown in Table 1, almost all of the particles are accounted for by spherical Zn metal particles of around 5 to 10 μm grain diameter produced by the mist processes. On the other hand, in all of the Invention Examples shown in Tables 2 to 5 and in Comparative Examples 19 to 49 shown in Tables 2 and 3, it can be seen that, with respect to the Zn metal particles and Zn alloy particles, the particles exhibiting two grain-diameter distributions had fragmentation (fracture) facets or cracks and were non-spherical, generally granular polyhedral particles of nearly spherical shape.

When the fragmentation (fracture) facets and cracked faces of the Zn alloy particles of the Invention Examples were observed as backscattered electron images, they were found to be divided into black regions with high Mg and white regions with low Mg content. An analysis of the black regions at the fragmentation faces and cracks of the particles of 5 μm or greater grain diameter revealed the presence of intermetallic compounds, chiefly of $MgZn_2$ and $Mg_2Zn_{11}$ but in some cases $Mg_2Zn_3$, MgZn and $Mg_7Zn_3$.

Second Set of Examples

Coated test pieces were prepared as Comparative Examples and Invention Examples under the conditions indicated in Tables 1 to 172. The Comparative Examples are shown in Tables 1 to 5 and the Invention Examples in Tables 6 to 172. The coating materials of the respective examples were prepared by ordinary methods. In all Comparative Examples and Invention Examples of Tables 1 to 3, Tables 6 to 22, Tables 43 and 44, and Tables 79 and 80, two types were separately prepared using either a commercially available ethylene silicate resin inorganic binder or a commercially available urethane resin organic binder.

In the Examples of Tables 4 and 5, Tables 23 to 42, Tables 45 to 78, Tables 81 to 98, and Tables 99 to 172, various resins were used as binders and the type of resin used in each Example is indicated.

All coating materials had a moisture content of 0.8 mass % or less. The thicknesses of the dried coats are given in the Tables.

Corrosion resistance was assessed by conducting the salt spray test of JIS K 5600 (5% NaCl spray; 35° C.). Coating test pieces measuring 150×70×3.2 mm were used. The bottom of each test piece was formed with an X-cut using a cutter. The evaluation adopted in the corrosion test was time to occurrence of red rust from the test piece surface. The test results are shown in the tables.

When time to red rusting was less than 900 hours, corrosion resistance was rated Poor and designated by the symbol P in the tables. When time to red rusting was 900 hours to less than 2,000 hours, corrosion resistance was rated acceptable (Good) and designated by the symbol G in the tables. When time to red rusting was 2,000 hours or greater, corrosion resistance was rated particularly good within the acceptable range (Excellent) and designated by the symbol E in the tables.

In comparison with the Comparative Examples 1 to 30, the Invention Examples exhibited outstanding corrosion resistance as evidenced by marked suppression of red rusting.

Tables 43 to 78 show corrosion test results with presence/absence on the particle surfaces of Mg solid solution phase and Zn intermetallic compounds, and presence/absence of $MgZn_2$ or $Mg_2Zn_{11}$.

It can be seen from Tables 43 to 78 that presence of Mg solid solution phase and Zn—Mg intermetallic compounds on the particle surfaces inhibited red rusting and that red rusting was markedly inhibited when the intermetallic compounds were $MgZn_2$ and/or $Mg_2Zn_{11}$ and in some cases $MgZn_2$, $Mg_2Zn_{11}$, $Mg_2Zn_3$, MgZn and/or $Mg_7Zn_3$.

Tables 79 to 98 show the corrosion test results obtained when the ratio of all particles accounted for by Zn alloy particles of a grain diameter of 0.05 to 5 μm in an outermost 10% thickness surface layer region of the dry film was varied.

The ratio of Zn alloy particles of a grain diameter of 0.05 to 5 μm in the outermost 10% thickness surface layer region was varied by applying coating materials varied in the ratio of Zn alloy particles of a grain diameter of 0.05 to 5 μm at the final stage of the coating.

It can be seen from Tables 79 to 98 that red rusting was markedly inhibited when the ratio of all particles accounted for by Zn alloy particles of a grain diameter of 0.05 to 5 μm in the outermost 10% thickness surface layer region was twice or greater the ratio in the whole dry film.

Tables 99 to 172 relate to Invention Examples in which Zn metal particles comprising Zn and unavoidable impurities and having a grain-diameter distribution whose peak grain diameter or average grain diameter was 2 to 50 μm were later added to and mixed with fine-grain Zn metal particles and coarse-grain Zn metal particles, or fine-grain Zn alloy particles and coarse-grain Zn alloy particles of Invention Examples, the mixed particles were used to prepare highly corrosion-resistant, rust-prevention coating materials, and the prepared coating materials were applied to steels and dried. The tables show the results of corrosion tests conducted on the so-prepared coated steels.

The results of the evaluation are shown in the Corrosion Test Results column. When time to red rusting was less than 900 hours, corrosion resistance was rated Poor and designated by the symbol P. When time to red rusting was 900 hours to less than 2,000 hours, corrosion resistance was rated acceptable (Good) and designated by the symbol G in the tables. When time to red rusting was 2,000 hours or greater, corrosion resistance was rated particularly good within the acceptable range (Excellent) and designated by the symbol E in the tables.

It can be seen from Tables 99 to 172 that when the coating material was prepared from Zn alloy particles having a grain-diameter distribution with two (fine particle and coarse particle) peaks and Zn metal particles having a grain-diameter distribution with only one peak falling between those of the fine particles and coarse particles, excellent corrosion resistance was exhibited in the case where the ratio, in mass % based on the dry coating film, of (Zn alloy particle content %):(Zn metal particle content %) was, expressed as 1/x, such that x was 300.0 or less.

It can also be seen that corrosion resistance was excellent even when Zn metal particles of 2 to 50 μm average grain diameter were later added to the fine-grain Zn metal particles and coarse-grain Zn metal particles.

TABLE 1

| Comparative Example No. | Average grain diameter (μm) | Metal grain diameter distribution (Ave grain diameter) (μm) | | Percent of fine-grain metal grains among metal grains (Vol %) | Metal grain chemical component content (Mass %) | | | | Total metal grain content of coat (Mass %) | Coat thickness (μm) | | Time to red rusting | |
|---|---|---|---|---|---|---|---|---|---|---|---|---|---|
| | | Fine grain metal | Coarse grain metal | | Zn | Mg | Al | Si | | Inorganic | Organic | Inorganic | Organic |
| Prior Art Product | 1 | 4.77 | — | — | — | 100 | 0 | 0 | 0 | 33 | 15.6 | 5 | P | P |
| | 2 | 4.89 | — | — | — | 100 | 0 | 0 | 0 | 36 | 20.3 | 14 | P | P |
| | 3 | 5.05 | — | — | — | 100 | 0 | 0 | 0 | 39 | 24.5 | 50 | P | P |
| | 4 | 4.00 | — | — | — | 100 | 0 | 0 | 0 | 37 | 16 | 100 | P | P |
| | 5 | 5.11 | — | — | — | 100 | 0 | 0 | 0 | 32 | 55 | 150 | P | P |
| | 6 | 5.23 | — | — | — | 100 | 0 | 0 | 0 | 38 | 45 | 160 | P | P |
| | 7 | 5.39 | — | — | — | 100 | 0 | 0 | 0 | 47 | 65 | 170 | P | P |
| | 8 | 4.34 | — | — | — | 100 | 0 | 0 | 0 | 51 | 38 | 134 | P | P |
| | 9 | 4.32 | — | — | — | 100 | 0 | 0 | 0 | 52 | 42 | 167 | P | P |
| | 10 | 4.44 | — | — | — | 100 | 0 | 0 | 0 | 53 | 25 | 38 | P | P |
| | 11 | 4.60 | — | — | — | 100 | 0 | 0 | 0 | 49 | 32 | 268 | P | P |
| | 12 | 3.55 | — | — | — | 100 | 0 | 0 | 0 | 48 | 25 | 256 | P | P |
| | 13 | 4.66 | — | — | — | 100 | 0 | 0 | 0 | 46 | 36 | 234 | P | P |
| | 14 | 4.78 | — | — | — | 100 | 0 | 0 | 0 | 86 | 19 | 243 | P | P |
| | 15 | 6.54 | — | — | — | 100 | 0 | 0 | 0 | 88 | 28.6 | 132 | P | P |
| | 16 | 6.38 | — | — | — | 100 | 0 | 0 | 0 | 89 | 27 | 124 | P | P |
| | 17 | 4.58 | — | — | — | 100 | 0 | 0 | 0 | 90 | 195 | 87 | P | P |
| | 18 | 15.2 | — | — | — | 100 | 0 | 0 | 0 | 85 | 23 | 95 | P | P |

TABLE 2

| Comparative Example No. | Average grain diameter (μm) | Metal grain diameter distribution (Ave grain diameter) (μm) | | Percent of fine-grain metal grains among metal grains (Vol %) | Metal grain chemical component content (Mass %) | | | | Total metal grain content of coat (Mass %) | Coat thickness (μm) | | Time to red rusting | |
|---|---|---|---|---|---|---|---|---|---|---|---|---|---|
| | | Fine grain metal | Coarse grain metal | | Zn | Mg | Al | Si | | Inorganic | Organic | Inorganic | Organic |
| Other | 19 | Deficient fine metal grains in invention range | 5.6 | 12.8 | 42.04 | 94.5 | 5.5 | | | 50 | 23 | 97 | P | P |
| | 20 | Deficient fine metal grains in invention range | 0.005 | 6.4 | 38.41 | 93.2 | 6.8 | | | 30 | 18 | 94 | P | P |

TABLE 2-continued

| Comparative Example No. | Average grain diameter (μm) | Metal grain diameter distribution (Ave grain diameter) (μm) | | Percent of fine-grain metal grains among metal grains (Vol %) | Metal grain chemical component content (Mass %) | | | | Total metal grain content of coat (Mass %) | Coat thickness (μm) | | Time to red rusting | |
|---|---|---|---|---|---|---|---|---|---|---|---|---|---|
| | | Fine grain metal | Coarse grain metal | | Zn | Mg | Al | Si | | Inorganic | Organic | Inorganic | Organic |
| 21 | Deficient fine metal grains in invention range | 0.007 | 7.8 | 66.80 | 95.6 | 3.2 | 1.2 | | 31 | 38 | 78 | P | P |
| 22 | Deficient fine metal grains in invention range | 0.008 | 13.5 | 76.50 | 87.6 | 4.7 | 5.7 | 2.0 | 42 | 42 | 213 | P | P |
| 23 | Deficient fine metal grains in invention range | 5.1 | 121 | 43.60 | 94.6 | 5.4 | | | 38 | 55 | 93 | P | P |
| 24 | Deficient fine metal grains in invention range | 5.6 | 113 | 34.20 | 78.4 | 15.6 | 3.0 | 3.0 | 53 | 16 | 97 | P | P |
| 25 | Deficient fine metal grains in invention range | 0.005 | 134 | 5.95 | 90.0 | 10.0 | | | 66 | 55 | 99 | P | P |
| 26 | Deficient fine metal grains in invention range | 5.3 | 103 | 6.43 | 80.5 | 15.3 | 4.2 | | 77 | 45 | 102 | P | P |
| 27 | Deficient fine metal grains in invention range | 0.006 | 105 | 78.90 | 91.5 | 7.5 | | 1.0 | 54 | 16 | 105 | P | P |
| 28 | Deficient fine metal grains in invention range | 4.5 | 125 | 44.12 | 95.7 | 3.5 | 0.1 | 0.8 | 39 | 19 | 177 | P | P |
| 29 | Deficient fine metal grains in invention range | 3.6 | 113 | 5.70 | 82.2 | 17.8 | | | 35 | 23 | 99 | P | P |
| 30 | Deficient fine metal grains in invention range | 2.7 | 105 | 67.80 | 91.9 | 3.6 | 2.7 | 1.8 | 65 | 16 | 56 | P | P |
| 31 | Deficient fine metal grains in invention range | 0.5 | 101 | 14.70 | 70.8 | 26.7 | 2.5 | | 55 | 8 | 100 | P | P |

TABLE 3

| | Comparative Example No. | Average grain diameter (μm) | Metal grain diameter distribution (Ave grain diameter) (μm) | | Percent of fine-grain metal grains among metal grains (Vol %) | Metal grain chemical component content (Mass %) | | | | Total metal grain content of coat (Mass %) | Coat thickness (μm) | | Time to red rusting | |
|---|---|---|---|---|---|---|---|---|---|---|---|---|---|---|
| | | | Fine grain metal | Coarse grain metal | | Zn | Mg | Al | Si | | Inorganic | Organic | Inorganic | Organic |
| Other | 32 | Deficient mixing ratio | 2.58 | 9.45 | 3.65 | 94.5 | 5.5 | | | 75 | 35 | 87 | P | P |
| | 33 | Deficient mixing ratio | 2.37 | 9.61 | 4.65 | 93.0 | 5.5 | 1.5 | | 76 | 38 | 95 | P | P |
| | 34 | Deficient mixing ratio | 2.15 | 9.85 | 99.80 | 94.1 | 5.9 | | | 72 | 65 | 123 | P | P |
| | 35 | Deficient mixing ratio | 2.94 | 9.36 | 2.65 | 85.6 | 9.8 | 4.6 | | 79 | 37 | 125 | P | P |
| | 36 | Deficient mixing ratio | 2.55 | 12.5 | 1.45 | 93.5 | 4.5 | 1.0 | 1.0 | 65 | 13 | 99 | P | P |
| | 37 | Deficient coat metal grains | 2.65 | 8.56 | 34.60 | 96.1 | 3.9 | | 0.8 | 10 | 54 | 94 | P | P |
| | 38 | Deficient coat metal grains | 2.94 | 8.21 | 86.53 | 97.5 | 2.5 | | 2.5 | 16 | 49 | 146 | P | P |
| | 39 | Deficient coat metal grains | 2.58 | 8.33 | 64.58 | 94.5 | 5.5 | 2.5 | 1.5 | 9 | 150 | 146 | P | P |
| | 40 | Deficient mixing ratio | 2.63 | 10.9 | 35.70 | 68.5 | 31.5 | | | 55 | 14 | 125 | P | P |

TABLE 3-continued

| Comparative Example No. | Average grain diameter (μm) | Metal grain diameter distribution (Ave grain diameter) (μm) Fine grain metal | Metal grain diameter distribution (Ave grain diameter) (μm) Coarse grain metal | Percent of fine-grain metal grains among metal grains (Vol %) | Metal grain chemical component content (Mass %) Zn | Metal grain chemical component content (Mass %) Mg | Metal grain chemical component content (Mass %) Al | Metal grain chemical component content (Mass %) Si | Total metal grain content of coat (Mass %) | Coat thickness (μm) Inorganic | Coat thickness (μm) Organic | Time to red rusting Inorganic | Time to red rusting Organic |
|---|---|---|---|---|---|---|---|---|---|---|---|---|---|
| 41 | Deficient mixing ratio | 1.87 | 8.9 | 43.70 | 70.8 | 17.8 | 11.4 | | 12 | 17 | 175 | P | P |
| 42 | Deficient mixing ratio | 3.86 | 9.8 | 21.60 | 99.995 | 0.005 | | | 56 | 22 | 200 | P | P |
| 43 | Deficient mixing ratio | 3.7 | 65.8 | 43.70 | 80.5 | 14.6 | | 4.9 | 53 | 25 | 187 | P | P |
| 44 | Deficient mixing ratio | 2.8 | 16.9 | 55.40 | 96.4 | 0.007 | | 3.6 | 65 | 32 | 174 | P | P |
| 45 | Deficient mixing ratio | 3.9 | 10.99 | 13.90 | 49.1 | 31.9 | 9.4 | 9.6 | 32 | 25 | 76 | P | P |
| 46 | Deficient mixing ratio | 4.2 | 14.97 | 44.12 | 56.7 | 25.6 | 11.8 | 5.9 | 83 | 42 | 260 | P | P |
| 47 | Deficient mixing ratio | 3.55 | 7.89 | 14.60 | 64.4 | 35.6 | | | 55 | 25 | 155 | P | P |
| 48 | Deficient mixing ratio | 2.45 | 10.5 | 87.90 | 57.5 | 31.6 | | 10.9 | 12 | 14 | 167 | P | P |
| 49 | Deficient mixing ratio | 1.45 | 15.6 | 24.60 | 32.2 | 67.8 | | | 34 | 17 | 145 | P | P |

TABLE 4

| Comparative Example No | Average diameter of later-added Zn metal grains (μm) | Diameter distribution (peak diameter) of Zn metal grains/Zn alloy grains (μm) Fine metal | Diameter distribution (peak diameter) of Zn metal grains/Zn alloy grains (μm) Coarse metal | Percent of fine-grain metal grains among Zn metal grains/Zn alloy grains (Vol %) | Chemical component content of Zn metal grains/Zn alloy grains (Mass %) Zn | Chemical component content of Zn metal grains/Zn alloy grains (Mass %) Mg | Chemical component content of Zn metal grains/Zn alloy grains (Mass %) Al | Chemical component content of Zn metal grains/Zn alloy grains (Mass %) Si | Zn alloy grain fracture surfaces or cracks present? | Ave aspect ratio | Ratio of (Zn metal grains or Zn alloy grains):(Later-added Zn metal grains) Zn metal grains/Zn alloy grains | Ratio of (Zn metal grains or Zn alloy grains):(Later-added Zn metal grains) Later-added Zn metal grains |
|---|---|---|---|---|---|---|---|---|---|---|---|---|
| 50 | — | 5.6 | 12.8 | 5.66 | 70.7 | 27.5 | 1 | 0.8 | Yes | 1.12 | — | — |
| 51 | — | 0.005 | 6.4 | 16.55 | 94.6 | 2.9 | 0 | 2.5 | Yes | 1.38 | — | — |
| 52 | — | 0.007 | 7.8 | 21.55 | 94 | 4.5 | 0 | 1.5 | Yes | 1.22 | — | — |
| 53 | — | 0.008 | 13.5 | 5.66 | 99.43 | 0.07 | 0 | 0.5 | Yes | 1.14 | — | — |
| 54 | — | 5.1 | 121 | 33.66 | 96.82 | 3.1 | 0.04 | 0.04 | Yes | 1.02 | — | — |
| 55 | — | 5.6 | 113 | 45.65 | 100 | 0 | 0 | 0 | Yes | 1.05 | — | — |
| 56 | — | 0.005 | 134 | 49.88 | 68.84 | 29.5 | 0.06 | 1.6 | Yes | 1.36 | — | — |
| 57 | — | 5.3 | 103 | 42.33 | 92.33 | 7.6 | 0.07 | 0 | No | 1.11 | — | — |
| 58 | — | 0.006 | 105 | 65.44 | 100 | 0 | 0 | 0 | Yes | 1.07 | — | — |
| 59 | — | 4.5 | 125 | 77.55 | 91.8 | 4.6 | 1.8 | 1.8 | Yes | 1.42 | — | — |
| 60 | — | 3.6 | 113 | 96.55 | 82 | 8.3 | 9.2 | 0.5 | Yes | 1.38 | — | — |
| 61 | — | 2.7 | 105 | 5.97 | 88.2 | 11.8 | 0 | 0 | No | 1.22 | — | — |
| 62 | — | 0.5 | 101 | 87.77 | 86.06 | 12.9 | 0 | 1.04 | No | 1.14 | — | — |
| 63 | — | 2.45 | 11.1 | 3.65 | 99.34 | 0.6 | 0 | 0.06 | Yes | 1.13 | — | — |
| 64 | — | 1.85 | 8.92 | 4.65 | 96.82 | 3.1 | 0.04 | 0.04 | Yes | 1.02 | — | — |
| 65 | — | 1.65 | 9.23 | 99.80 | 96.82 | 3.1 | 0.04 | 0.04 | Yes | 1.50 | — | — |
| 66 | — | 2.45 | 9.05 | 2.65 | 100 | 0 | 0 | 0 | No | 1.13 | — | — |
| 67 | — | 2.01 | 10.91 | 67.89 | 96.82 | 3.1 | 0.04 | 0.04 | Yes | 1.04 | — | — |
| 68 | — | 1.99 | 11.12 | 56.89 | 96.82 | 3.1 | 0.04 | 0.04 | Yes | 1.02 | — | — |
| 69 | — | 2.38 | 10.93 | 45.67 | 100 | 0 | 0 | Yes | 1.08 | — | — |
| 70 | — | 2.49 | 9.34 | 34.67 | 68.5 | 31.5 | | | No | 1.15 | — | — |
| 71 | — | 2.34 | 8.77 | 95.66 | 70.8 | 17.8 | 11.4 | | No | 1.34 | — | — |

TABLE 4-continued

| | | Coating details | | | | |
|---|---|---|---|---|---|---|
| Comparative Example No | Mg content of all metal grains (Mass %) | Total metal grain content of coat (Mass %) | Base resin type | Coat thickness (μm) | Coating method | Corrosion Test Results |
| 50 | — | 35 | Alkali-silicate | 2 | Spray | P |
| 51 | — | 66 | Alkyl silicate | 37 | Spray | P |
| 52 | — | 38 | Alkali-silicate | 12 | Spray | P |
| 53 | — | 84 | Alkyl silicate | 160 | Brush | P |
| 54 | — | 39 | Alkali-silicate | 5 | Brush | P |
| 55 | — | 85 | Alkyl silicate | 12 | Brush | P |
| 56 | — | 36 | Alkali-silicate | 2 | Spray | P |
| 57 | — | 56 | Alkyl silicate | 18 | Spray | P |
| 58 | — | 42 | Alkyl silicate | 23 | Spray | P |
| 59 | — | 31 | Epoxy resin | 30 | Brush | P |
| 60 | — | 88 | Acrylic resin | 77 | Brush | P |
| 61 | — | 78 | Urethane resin | 254 | Brush | P |
| 62 | — | 36 | Polyester resin | 47 | Spray | P |
| 63 | — | 37 | Epoxy resin | 43 | Spray | P |
| 64 | — | 45 | Acrylic resin | 322 | Brush | P |
| 65 | — | 68 | Urethane resin | 25 | Brush | P |
| 66 | — | 79 | Polyester resin | 700 | Brush | P |
| 67 | — | 10 | Alkali-silicate | 22 | Spray | P |
| 68 | — | 16 | Acrylic resin | 25 | Spray | P |
| 69 | — | 9 | Alkali-silicate | 14 | Spray | P |
| 70 | — | 90 | Urethane resin | 112 | Spray | P |
| 71 | — | 43 | Alkali-silicate | 554 | Spray | P |

TABLE 5

| Comparative Example No | Average diameter of later-added Zn metal grains (μm) | Diameter distribution (peak diameter) of Zn metal grains/Zn alloy grains (μm) | | Percent of fine-grain metal grains among Zn metal grains/Zn alloy grains (Vol %) | Chemical component content of Zn metal grains/Zn alloy grains (Mass %) | | | | Zn alloy grain fracture surfaces or cracks present? | Ave aspect ratio |
|---|---|---|---|---|---|---|---|---|---|---|
| | | Fine metal | Coarse metal | | Zn | Mg | Al | Si | | |
| 72 | — | 3.99 | 27.6 | 34.21 | 100 | 0.005 | | | Yes | 1.25 |
| 73 | — | 1.02 | 21.9 | 7.88 | 80.5 | 14.6 | | 4.9 | Yes | 1.19 |
| 74 | — | 0.05 | 22.5 | 92.32 | 96.4 | 0.007 | | 3.6 | Yes | 1.18 |
| 75 | — | 2.01 | 17.5 | 11.22 | 49.1 | 31.9 | 9.4 | 9.6 | No | 1.24 |
| 76 | — | 1.51 | 6.99 | 55.66 | 56.7 | 25.6 | 11.8 | 5.9 | Yes | 1.11 |
| 77 | — | 2.38 | 7.65 | 78.99 | 64.4 | 35.6 | | | Yes | 1.27 |
| 78 | — | 2.35 | 9.25 | 35.87 | 57.5 | 31.6 | | 10.9 | Yes | 1.31 |
| 79 | — | 2.57 | 9.56 | 42.04 | 32.2 | 67.8 | | | No | 1.26 |
| 80 | 23.5 | 1.99 | 11.12 | 95.66 | 80.5 | 14.6 | | 4.9 | Yes | 1.02 |
| 81 | 5.96 | 2.38 | 10.93 | 34.21 | 96.4 | 0.007 | | 3.6 | Yes | 1.50 |
| 82 | 10.64 | 2.49 | 9.34 | 7.88 | 49.1 | 31.9 | 9.4 | 9.6 | No | 1.13 |
| 83 | 16.5 | 0.006 | 105 | 92.32 | 86.06 | 12.9 | 0 | 1.04 | Yes | 1.04 |
| 84 | 7.95 | 4.5 | 125 | 11.22 | 99.34 | 0.6 | 0 | 0.06 | Yes | 1.02 |
| 85 | 7.95 | 1.02 | 21.9 | 4.65 | 96.82 | 3.1 | 0.04 | 0.04 | Yes | 1.08 |
| 86 | 9.64 | 0.05 | 22.5 | 99.80 | 91.8 | 4.6 | 1.8 | 1.8 | No | 1.15 |
| 87 | 0.96 | 2.01 | 17.5 | 95.66 | 82 | 8.3 | 9.2 | 0.5 | Yes | 1.02 |
| 88 | 5.26 | 1.51 | 6.99 | 34.21 | 88.2 | 11.8 | 0 | 0 | Yes | 1.50 |
| 89 | 13.5 | 2.38 | 7.65 | 7.88 | 86.06 | 12.9 | 0 | 1.04 | No | 1.13 |
| 90 | 13.5 | 2.35 | 9.25 | 92.32 | 99.34 | 0.6 | 0 | 0.06 | Yes | 1.04 |
| 91 | 9.64 | 2.57 | 9.56 | 11.22 | 96.82 | 2.4 | 0.04 | 0.04 | Yes | 1.02 |
| 92 | 16.5 | 2.35 | 9.25 | 55.66 | 99.5 | 0.5 | 0 | 0 | Yes | 1.08 |
| 93 | 58.2 | 2.57 | 9.56 | 78.99 | 99.34 | 0.6 | 0 | 0.06 | Yes | 1.15 |

TABLE 5-continued

| Comparative Example No | Ratio of (Zn metal grains or Zn alloy grains):(Later-added Zn metal grains) | | Mg content of all metal grains (Mass %) | Coating details | | | | Corrosion Test Results |
|---|---|---|---|---|---|---|---|---|
| | Zn metal grains/Zn alloy grains | Later-added Zn metal grains | | Total metal grain content of coat (Mass %) | Base resin type | Coat thickness (μm) | Coating method | |
| 72 | — | — | — | 38 | Urethane resin | 150 | Spray | P |
| 73 | — | — | — | 56 | Alkali silicate | 18 | Spray | P |
| 74 | — | — | — | 89 | Alkyl silicate | 657 | Brush | P |
| 75 | — | — | — | 32 | Alkyl silicate | 24 | Spray | P |
| 76 | — | — | — | 55 | Urethane resin | 99 | Spray | P |
| 77 | — | — | — | 79 | Alkyl silicate | 7 | Spray | P |
| 78 | — | — | — | 49 | Epoxy resin | 100 | Spray | P |
| 79 | — | — | — | 89 | Alkyl silicate | 27 | Brush | P |
| 80 | 1 | 387 | 1.867 | 43 | Alkali silicate | 15 | Spray | P |
| 81 | 1 | 198.7 | 0.047 | 38 | Alkyl silicate | 14 | Spray | P |
| 82 | 1 | 36 | 0.500 | 56 | Urethane resin | 55 | Spray | P |
| 83 | 1 | 1.5 | 0.012 | 89 | Alkyl silicate | 8 | Spray | P |
| 84 | 1 | 0.008 | 1.587 | 32 | Urethane resin | 122 | Brush | P |
| 85 | 1 | 1.4 | 2.833 | 55 | Alkyl silicate | 555 | Spray | P |
| 86 | 1 | 4.2 | 2.673 | 79 | Alkali silicate | 19 | Spray | P |
| 87 | 1 | 1.6 | 0.731 | 10 | Alkyl silicate | 25 | Brush | P |
| 88 | 1 | 7.5 | 0.671 | 16 | Alkyl silicate | 58 | Spray | P |
| 89 | 1 | 1.6 | 3.538 | 9 | Alkyl silicate | 685 | Spray | P |
| 90 | 1 | 385 | 0.002 | 49 | Alkali silicate | 19 | Brush | P |
| 91 | 1 | 270 | 0.009 | 89 | Urethane resin | 700 | Spray | P |
| 92 | 1 | 195 | 0.003 | 89 | Alkyl silicate | 77 | Spray | P |
| 93 | 1 | 2.9 | 0.154 | 79 | Alkyl silicate | 54 | Spray | P |

TABLE 6

| Invention Example No | Diameter distribution of Zn metal grains/Zn alloy grains (Ave grain diameter) (μm) | | Percent of fine grain metal grains among Zn metal grains/Zn alloy grains (Vol %) | Chemical component content of Zn metal grains/Zn alloy grains (Mass %) | | | | Zn alloy grain fracture surfaces present? | Total metal grain content of coat (Mass %) | Coat thickness (μm) | | Time to red rusting | |
|---|---|---|---|---|---|---|---|---|---|---|---|---|---|
| | Fine metal | Coarse metal | | Zn | Mg | Al | Si | | | Inorganic | Organic | Inorganic | Organic |
| 1 | 2.65 | 9.56 | 5.66 | 100 | 0 | 0 | 0 | No | 35 | 22 | 120 | G | G |
| 2 | 0.05 | 6.50 | 16.55 | 100 | 0 | 0 | 0 | No | 66 | 18 | 77 | G | G |
| 3 | 4.6 | 65.50 | 21.55 | 100 | 0 | 0 | 0 | No | 38 | 23 | 85 | G | G |
| 4 | 3.56 | 13.50 | 5.66 | 100 | 0 | 0 | 0 | No | 84 | 25 | 126 | G | G |
| 5 | 4.55 | 16.70 | 33.66 | 100 | 0 | 0 | 0 | No | 39 | 15 | 145 | G | G |
| 6 | 2.15 | 9.89 | 45.65 | 100 | 0 | 0 | 0 | No | 85 | 19 | 120 | G | E |
| 7 | 3.22 | 10.55 | 49.88 | 100 | 0 | 0 | 0 | No | 36 | 24 | 110 | G | G |
| 8 | 2.99 | 9.64 | 42.33 | 100 | 0 | 0 | 0 | No | 56 | 15 | 105 | G | G |
| 9 | 3.65 | 11.22 | 65.44 | 100 | 0 | 0 | 0 | No | 42 | 10 | 99 | G | G |
| 10 | 4.55 | 13.50 | 77.55 | 100 | 0 | 0 | 0 | No | 31 | 7 | 120 | G | G |
| 11 | 3.57 | 22.50 | 96.55 | 100 | 0 | 0 | 0 | No | 88 | 5.5 | 85 | G | G |
| 12 | 1.99 | 8.56 | 5.97 | 100 | 0 | 0 | 0 | No | 78 | 17 | 102 | G | E |
| 13 | 2.12 | 9.46 | 87.77 | 100 | 0 | 0 | 0 | No | 36 | 22 | 99 | G | G |
| 14 | 2.45 | 11.10 | 86.55 | 100 | 0 | 0 | 0 | No | 37 | 26 | 134 | G | G |
| 15 | 1.85 | 8.92 | 15.67 | 100 | 0 | 0 | 0 | No | 45 | 21 | 156 | G | G |
| 16 | 1.65 | 9.23 | 31.55 | 100 | 0 | 0 | 0 | No | 68 | 17 | 121 | G | E |
| 17 | 2.45 | 9.05 | 26.76 | 100 | 0 | 0 | 0 | No | 79 | 6 | 109 | G | E |
| 18 | 2.01 | 10.91 | 67.89 | 100 | 0 | 0 | 0 | No | 47 | 10 | 89 | G | G |
| 19 | 1.99 | 11.12 | 56.89 | 100 | 0 | 0 | 0 | No | 56 | 21 | 94 | G | G |
| 20 | 2.38 | 10.93 | 45.67 | 100 | 0 | 0 | 0 | No | 37 | 34 | 103 | G | G |

TABLE 7

| Invention Example No | Diameter distribution of Zn metal grains/Zn alloy grains (Ave grain diameter) (μm) | | Percent of fine grain metal grains among Zn metal grains/ Zn alloy grains (Vol %) | Chemical component content of Zn metal grains/Zn alloy grains (Mass %) | | | | Zn alloy grain fracture surfaces present? | Total metal grain content of coat (Mass %) | Coat thickness (μm) | | Time to red rusting | |
|---|---|---|---|---|---|---|---|---|---|---|---|---|---|
| | Fine metal | Coarse metal | | Zn | Mg | Al | Si | | | Inorganic | Organic | Inorganic | Organic |
| 21 | 2.49 | 9.34 | 34.67 | 100 | 0 | 0 | 0 | No | 90 | 21 | 111 | G | E |
| 22 | 2.34 | 8.77 | 95.66 | 100 | 0 | 0 | 0 | No | 43 | 18 | 90 | G | G |
| 23 | 3.99 | 27.60 | 34.21 | 100 | 0 | 0 | 0 | No | 38 | 19 | 109 | G | G |
| 24 | 1.02 | 21.90 | 7.88 | 100 | 0 | 0 | 0 | No | 56 | 21 | 89 | G | G |
| 25 | 0.05 | 22.50 | 92.32 | 100 | 0 | 0 | 0 | No | 89 | 17 | 99 | G | G |
| 26 | 2.01 | 17.50 | 11.22 | 100 | 0 | 0 | 0 | No | 32 | 14 | 89 | G | G |
| 27 | 1.51 | 6.99 | 55.66 | 100 | 0 | 0 | 0 | No | 55 | 16 | 134 | G | G |
| 28 | 2.38 | 7.65 | 78.99 | 100 | 0 | 0 | 0 | No | 79 | 21 | 120 | G | E |
| 29 | 2.35 | 9.25 | 35.87 | 96.0 | 4.0 | 0 | 0 | Yes | 47 | 20.3 | 189 | E | E |
| 30 | 2.57 | 9.56 | 42.04 | 97.5 | 2.5 | 0 | 0 | Yes | 49 | 24.5 | 167 | G | G |
| 31 | 2.56 | 9.84 | 6.55 | 98.4 | 1.6 | 0 | 0 | Yes | 52 | 16 | 156 | G | G |
| 32 | 2.21 | 9.75 | 43.60 | 95.5 | 4.5 | 0 | 0 | Yes | 51 | 55 | 203 | E | E |
| 33 | 2.64 | 9.85 | 44.12 | 96.2 | 3.8 | 0 | 0 | No | 53 | 45 | 206 | G | G |
| 34 | 1.99 | 8.56 | 37.21 | 98.0 | 2.0 | 0 | 0 | Yes | 78 | 65 | 214 | E | E |
| 35 | 2.94 | 8.21 | 43.38 | 94.5 | 5.5 | 0 | 0 | Yes | 83 | 38 | 256 | E | E |
| 36 | 2.58 | 8.33 | 13.52 | 94.0 | 6.0 | 0 | 0 | No | 89 | 42 | 215 | E | E |
| 37 | 2.37 | 8.00 | 44.94 | 97.5 | 2.5 | 0 | 0 | Yes | 90 | 25 | 245 | E | E |
| 38 | 2.15 | 9.22 | 45.46 | 93.2 | 6.8 | 0 | 0 | Yes | 86 | 32 | 167 | E | E |
| 39 | 2.96 | 9.36 | 35.96 | 94.5 | 5.5 | 0 | 0 | Yes | 53 | 25 | 158 | G | G |
| 40 | 2.85 | 9.45 | 42.13 | 93.6 | 6.4 | 0 | 0 | No | 48 | 36 | 169 | G | G |

TABLE 8

| Invention Example No | Diameter distribution of Zn metal grains/Zn alloy grains (Ave grain diameter) (μm) | | Percent of fine grain metal grains among Zn metal grains/ Zn alloy grains (Vol %) | Chemical component content of Zn metal grains/Zn alloy grains (Mass %) | | | | Zn alloy grain fracture surfaces present? | Total metal grain content of coat (Mass %) | Coat thickness (μm) | | Time to red rusting | |
|---|---|---|---|---|---|---|---|---|---|---|---|---|---|
| | Fine metal | Coarse metal | | Zn | Mg | Al | Si | | | Inorganic | Organic | Inorganic | Organic |
| 41 | 2.94 | 9.61 | 7.56 | 94.1 | 5.9 | 0 | 0 | Yes | 46 | 19 | 145 | G | G |
| 42 | 2.11 | 9.85 | 43.69 | 93.5 | 6.5 | 0 | 0 | Yes | 47 | 28.6 | 167 | E | E |
| 43 | 2.68 | 9.23 | 44.21 | 97.6 | 2.4 | 0 | 0 | Yes | 49 | 27 | 169 | G | G |
| 44 | 2.99 | 9.08 | 39.51 | 94.5 | 5.5 | 0 | 0 | Yes | 83 | 195 | 160 | E | E |
| 45 | 2.78 | 9.87 | 45.68 | 96.8 | 3.2 | 0 | 0 | No | 85 | 23 | 159 | E | E |
| 46 | 2.96 | 9.46 | 65.58 | 95.4 | 4.6 | 0 | 0 | No | 90 | 23 | 157 | E | E |
| 47 | 2.85 | 9.28 | 47.24 | 94.8 | 5.2 | 0 | 0 | Yes | 89 | 18 | 146 | E | E |
| 48 | 2.64 | 9.45 | 47.76 | 97.5 | 2.5 | 0 | 0 | Yes | 88 | 55 | 148 | E | E |
| 49 | 2.35 | 9.25 | 45.02 | 90.0 | 10.0 | 0 | 0 | No | 47 | 19 | 123 | E | E |
| 50 | 2.12 | 9.46 | 47.02 | 92.5 | 7.5 | 0 | 0 | Yes | 47 | 42 | 213 | E | E |
| 51 | 2.34 | 9.46 | 7.66 | 91.6 | 8.4 | 0 | 0 | No | 52 | 19 | 215 | E | E |
| 52 | 2.33 | 9.46 | 15.20 | 90.8 | 9.2 | 0 | 0 | No | 52 | 28.6 | 224 | E | E |
| 53 | 2.23 | 9.06 | 43.16 | 88.5 | 11.5 | 0 | 0 | Yes | 52 | 27 | 267 | E | E |
| 54 | 2.12 | 9.30 | 49.33 | 87.5 | 12.5 | 0 | 0 | Yes | 88 | 195 | 243 | E | E |
| 55 | 2.21 | 8.68 | 19.47 | 92.4 | 7.6 | 0 | 0 | Yes | 87 | 23 | 74 | E | E |
| 56 | 1.38 | 8.53 | 69.55 | 91.6 | 8.4 | 0 | 0 | Yes | 89 | 23 | 63 | E | E |
| 57 | 1.95 | 9.32 | 51.41 | 91.1 | 8.9 | 0 | 0 | Yes | 90 | 28.6 | 65 | E | E |
| 58 | 2.26 | 8.95 | 75.88 | 90.6 | 9.4 | 0 | 0 | Yes | 91 | 27 | 98 | E | E |
| 59 | 2.05 | 12.54 | 48.08 | 86.5 | 13.5 | 0 | 0 | Yes | 46 | 195 | 98 | G | G |
| 60 | 1.65 | 8.70 | 66.85 | 92.5 | 7.5 | 0 | 0 | Yes | 47 | 23 | 97 | E | E |

TABLE 9

| Invention Example No | Diameter distribution of Zn metal grains/Zn alloy grains (Ave grain diameter) (μm) | | Percent of fine grain metal grains among Zn metal grains/ Zn alloy grains (Vol %) | Chemical component content of Zn metal grains/Zn alloy grains (Mass %) | | | | Zn alloy grain fracture surfaces present? | Total metal grain content of coat (Mass %) | Coat thickness (μm) | | Time to red rusting | |
|---|---|---|---|---|---|---|---|---|---|---|---|---|---|
| | Fine metal | Coarse metal | | Zn | Mg | Al | Si | | | Inorganic | Organic | Inorganic | Organic |
| 61 | 2.35 | 8.55 | 7.68 | 91.1 | 8.9 | 0 | 0 | Yes | 47 | 23 | 94 | E | E |
| 62 | 1.62 | 8.91 | 8.64 | 90.6 | 9.4 | 0 | 0 | Yes | 49 | 18 | 93 | E | E |
| 63 | 1.88 | 9.91 | 16.58 | 89.4 | 10.6 | 0 | 0 | Yes | 50 | 55 | 75 | G | G |
| 64 | 2.35 | 9.25 | 35.87 | 96.0 | 4.0 | 0 | 0 | Yes | 47 | 16.5 | 64 | E | E |
| 65 | 2.57 | 9.56 | 42.04 | 97.5 | 2.5 | 0 | 0 | Yes | 48 | 25.4 | 62 | G | G |

TABLE 9-continued

| Invention Example No | Diameter distribution of Zn metal grains/Zn alloy grains (Ave grain diameter) (μm) | | Percent of fine grain metal grains among Zn metal grains/ Zn alloy grains (Vol %) | Chemical component content of Zn metal grains/Zn alloy grains (Mass %) | | | | Zn alloy grain fracture surfaces present? | Total metal grain content of coat (Mass %) | Coat thickness (μm) | | Time to red rusting | |
|---|---|---|---|---|---|---|---|---|---|---|---|---|---|
| | Fine metal | Coarse metal | (Vol %) | Zn | Mg | Al | Si | | | Inorganic | Organic | Inorganic | Organic |
| 66 | 2.56 | 9.84 | 38.41 | 98.4 | 1.6 | 0 | 0 | Yes | 49 | 5.8 | 64 | G | G |
| 67 | 2.21 | 9.75 | 6.99 | 95.5 | 4.5 | 0 | 0 | Yes | 51 | 42.5 | 75 | E | E |
| 68 | 2.64 | 9.85 | 44.12 | 96.2 | 3.8 | 0 | 0 | Yes | 52 | 15.6 | 73 | G | G |
| 69 | 2.65 | 8.56 | 66.99 | 98.0 | 2.0 | 0 | 0 | Yes | 88 | 8.4 | 65 | E | E |
| 70 | 2.94 | 8.21 | 43.38 | 94.5 | 5.5 | 0 | 0 | Yes | 89 | 17.6 | 75 | E | E |
| 71 | 2.58 | 8.33 | 39.75 | 94.0 | 6.0 | 0 | 0 | Yes | 87 | 19.8 | 73 | E | E |
| 72 | 2.37 | 8.00 | 65.38 | 97.5 | 2.5 | 0 | 0 | Yes | 85 | 22.5 | 78 | E | E |
| 73 | 2.15 | 9.22 | 45.46 | 93.2 | 6.8 | 0 | 0 | Yes | 83 | 24.6 | 125 | E | E |
| 74 | 2.96 | 9.36 | 22.55 | 94.5 | 5.5 | 0 | 0 | Yes | 46 | 23.8 | 167 | G | G |
| 75 | 2.85 | 9.45 | 42.13 | 93.6 | 6.4 | 0 | 0 | Yes | 48 | 15.2 | 28 | G | G |
| 76 | 2.94 | 9.61 | 38.50 | 94.1 | 5.9 | 0 | 0 | Yes | 51 | 10.6 | 34 | G | G |
| 77 | 2.11 | 9.85 | 64.13 | 93.5 | 6.5 | 0 | 0 | Yes | 51 | 10.7 | 256 | E | E |
| 78 | 2.68 | 9.23 | 44.21 | 97.6 | 2.4 | 0 | 0 | Yes | 51 | 15 | 24 | G | G |
| 79 | 2.99 | 9.08 | 39.51 | 94.5 | 5.5 | 0 | 0 | Yes | 88 | 10.5 | 96 | E | E |
| 80 | 1.82 | 2.87 | 78.64 | 96.8 | 3.2 | 0 | 0 | No | 87 | 14.5 | 94 | E | E |

TABLE 10

| Invention Example No | Diameter distribution of Zn metal grains/Zn alloy grains (Ave grain diameter) (μm) | | Percent of fine grain metal grains among Zn metal grains/ Zn alloy grains (Vol %) | Chemical component content of Zn metal grains/Zn alloy grains (Mass %) | | | | Zn alloy grain fracture surfaces present? | Total metal grain content of coat (Mass %) | Coat thickness (μm) | | Time to red rusting | |
|---|---|---|---|---|---|---|---|---|---|---|---|---|---|
| | Fine metal | Coarse metal | (Vol %) | Zn | Mg | Al | Si | | | Inorganic | Organic | Inorganic | Organic |
| 81 | 1.42 | 9.46 | 42.05 | 95.4 | 4.6 | 0 | 0 | No | 85 | 12.3 | 93 | E | E |
| 82 | 2.12 | 9.28 | 64.58 | 94.8 | 5.2 | 0 | 0 | No | 82 | 8.6 | 95 | E | E |
| 83 | 1.92 | 9.45 | 47.76 | 97.5 | 2.5 | 0 | 0 | Yes | 86 | 17.5 | 92 | E | E |
| 84 | 2.11 | 9.63 | 24.10 | 96.3 | 3.7 | 0 | 0 | Yes | 45 | 12.6 | 95 | E | E |
| 85 | 2.97 | 9.16 | 39.11 | 94.5 | 5.5 | 0 | 0 | Yes | 48 | 10.4 | 91 | G | G |
| 86 | 2.36 | 10.39 | 19.65 | 95.5 | 4.5 | 0 | 0 | Yes | 50 | 10.9 | 90 | E | E |
| 87 | 3.05 | 10.56 | 65.39 | 97.3 | 2.7 | 0 | 0 | Yes | 51 | 19 | 99 | G | G |
| 88 | 2.15 | 10.74 | 48.57 | 95.8 | 4.2 | 0 | 0 | Yes | 51 | 25.6 | 98 | E | E |
| 89 | 2.19 | 10.27 | 24.91 | 94.6 | 5.4 | 0 | 0 | Yes | 79 | 28.6 | 97 | E | E |
| 90 | 2.48 | 11.50 | 39.92 | 94.7 | 5.3 | 0 | 0 | No | 81 | 24.7 | 94 | E | E |
| 91 | 2.85 | 11.67 | 22.65 | 94.8 | 5.2 | 0 | 0 | No | 80 | 22.9 | 93 | E | E |
| 92 | 2.75 | 11.85 | 66.20 | 96.1 | 3.9 | 0 | 0 | No | 82 | 52.3 | 83 | E | E |
| 93 | 2.46 | 11.38 | 49.38 | 97.5 | 2.5 | 0 | 0 | Yes | 83 | 56.3 | 88 | E | E |
| 94 | 2.71 | 12.61 | 30.58 | 94.0 | 6.0 | 0 | 0 | Yes | 46 | 33.3 | 89 | G | G |
| 95 | 2.36 | 12.78 | 45.59 | 95.0 | 5.0 | 0 | 0 | Yes | 48 | 34.5 | 87 | G | G |
| 96 | 2.16 | 9.57 | 28.32 | 97.2 | 2.8 | 0 | 0 | Yes | 51 | 23.5 | 86 | E | E |
| 97 | 2.46 | 9.81 | 71.87 | 99.5 | 0.5 | 0 | 0 | Yes | 53 | 26.7 | 85 | E | E |
| 98 | 2.49 | 8.43 | 53.05 | 94.6 | 5.4 | 0 | 0 | Yes | 54 | 38.5 | 89 | E | E |
| 99 | 2.95 | 8.55 | 27.74 | 96.5 | 3.5 | 0 | 0 | Yes | 88 | 45.2 | 84 | E | E |
| 100 | 2.36 | 8.22 | 42.75 | 96.7 | 3.3 | 0 | 0 | Yes | 89 | 36.9 | 88 | E | E |

TABLE 11

| Invention Example No | Diameter distribution of Zn metal grains/Zn alloy grains (Ave grain diameter) (μm) | | Percent of fine grain metal grains among Zn metal grains/ Zn alloy grains (Vol %) | Chemical component content of Zn metal grains/Zn alloy grains (Mass %) | | | | Zn alloy grain fracture surfaces present? | Total metal grain content of coat (Mass %) | Coat thickness (μm) | | Time to red rusting | |
|---|---|---|---|---|---|---|---|---|---|---|---|---|---|
| | Fine metal | Coarse metal | (Vol %) | Zn | Mg | Al | Si | | | Inorganic | Organic | Inorganic | Organic |
| 101 | 2.21 | 9.44 | 23.29 | 96.5 | 3.5 | 0 | 0 | No | 90 | 35.8 | 86 | E | E |
| 102 | 2.25 | 9.58 | 61.12 | 95.5 | 4.5 | 0 | 0 | Yes | 86 | 34.2 | 85 | E | E |
| 103 | 2.44 | 9.67 | 44.30 | 95.8 | 4.2 | 0 | 0 | Yes | 85 | 31.2 | 83 | E | E |
| 104 | 2.78 | 9.83 | 23.96 | 96.4 | 3.6 | 0 | 0 | Yes | 46 | 37.5 | 82 | G | G |
| 105 | 2.15 | 10.07 | 44.09 | 95.7 | 4.3 | 0 | 0 | Yes | 47 | 12.5 | 81 | E | E |
| 106 | 2.19 | 9.45 | 24.63 | 95.8 | 4.2 | 0 | 0 | Yes | 47 | 10.2 | 89 | E | E |

TABLE 11-continued

| Invention Example No | Diameter distribution of Zn metal grains/Zn alloy grains (Ave grain diameter) (μm) | | Percent of fine grain metal grains among Zn metal grains/ Zn alloy grains (Vol %) | Chemical component content of Zn metal grains/Zn alloy grains (Mass %) | | | | Zn alloy grain fracture surfaces present? | Total metal grain content of coat (Mass %) | Coat thickness (μm) | | Time to red rusting | |
|---|---|---|---|---|---|---|---|---|---|---|---|---|---|
| | Fine metal | Coarse metal | | Zn | Mg | Al | Si | | | Inorganic | Organic | Inorganic | Organic |
| 107 | 2.48 | 9.30 | 62.46 | 96.8 | 3.2 | 0 | 0 | Yes | 48 | 14.5 | 96 | E | E |
| 108 | 2.59 | 9.99 | 45.64 | 97.1 | 2.9 | 0 | 0 | Yes | 50 | 16.3 | 95 | G | G |
| 109 | 2.47 | 9.58 | 25.30 | 96.3 | 3.7 | 0 | 0 | Yes | 86 | 15.8 | 99 | E | E |
| 110 | 2.69 | 9.40 | 42.84 | 94.2 | 5.8 | 0 | 0 | Yes | 84 | 13.5 | 100 | E | E |
| 111 | 2.57 | 9.57 | 25.44 | 95.6 | 4.4 | 0 | 0 | Yes | 83 | 12.7 | 123 | E | E |
| 112 | 2.49 | 9.54 | 63.27 | 97.8 | 2.2 | 0 | 0 | Yes | 82 | 11.2 | 89 | E | E |
| 113 | 2.68 | 9.58 | 46.45 | 94.5 | 5.5 | 0 | 0 | Yes | 81 | 16.5 | 87 | E | E |
| 114 | 2.35 | 9.25 | 46.45 | 90.0 | 10.0 | 0 | 0 | Yes | 46 | 10.6 | 86 | E | E |
| 115 | 2.48 | 10.04 | 50.91 | 92.5 | 7.5 | 0 | 0 | No | 47 | 10.7 | 84 | E | E |
| 116 | 2.13 | 11.27 | 27.25 | 91.6 | 8.4 | 0 | 0 | Yes | 48 | 15 | 89 | E | E |
| 117 | 1.93 | 11.44 | 42.26 | 90.8 | 9.2 | 0 | 0 | Yes | 51 | 10.5 | 100 | E | E |
| 118 | 2.05 | 8.90 | 33.69 | 88.5 | 11.5 | 0 | 0 | Yes | 53 | 14.5 | 87 | G | G |
| 119 | 1.42 | 8.75 | 48.70 | 87.5 | 12.5 | 0 | 0 | Yes | 88 | 12.3 | 89 | E | E |
| 120 | 1.46 | 9.44 | 29.24 | 92.4 | 7.6 | 0 | 0 | Yes | 85 | 8.6 | 85 | E | E |

TABLE 12

| Invention Example No | Diameter distribution of Zn metal grains/Zn alloy grains (Ave grain diameter) (μm) | | Percent of fine grain metal grains among Zn metal grains/ Zn alloy grains (Vol %) | Chemical component content of Zn metal grains/Zn alloy grains (Mass %) | | | | Zn alloy grain fracture surfaces present? | Total metal grain content of coat (Mass %) | Coat thickness (μm) | | Time to red rusting | |
|---|---|---|---|---|---|---|---|---|---|---|---|---|---|
| | Fine metal | Coarse metal | | Zn | Mg | Al | Si | | | Inorganic | Organic | Inorganic | Organic |
| 121 | 1.75 | 9.03 | 67.07 | 91.6 | 8.4 | 0 | 0 | Yes | 83 | 17.5 | 83 | E | E |
| 122 | 1.86 | 8.85 | 50.25 | 91.1 | 8.9 | 0 | 0 | Yes | 82 | 12.6 | 86 | E | E |
| 123 | 1.74 | 8.95 | 29.91 | 90.6 | 9.4 | 0 | 0 | Yes | 83 | 10.4 | 88 | E | E |
| 124 | 1.96 | 12.54 | 87.50 | 86.5 | 13.5 | 0 | 0 | Yes | 47 | 10.9 | 80 | G | G |
| 125 | 1.65 | 8.70 | 30.58 | 87.4 | 12.6 | 0 | 0 | No | 51 | 19 | 89 | G | G |
| 126 | 2.35 | 8.55 | 68.41 | 88.5 | 11.5 | 0 | 0 | No | 52 | 25.6 | 89 | G | G |
| 127 | 1.62 | 10.72 | 54.59 | 89.6 | 10.4 | 0 | 0 | No | 51 | 28.6 | 98 | G | G |
| 128 | 2.25 | 9.90 | 34.25 | 89.4 | 10.6 | 0 | 0 | No | 52 | 24.7 | 96 | G | G |
| 129 | 2.36 | 9.57 | 37.61 | 90.6 | 9.4 | 0 | 0 | Yes | 89 | 22.9 | 94 | E | E |
| 130 | 2.24 | 10.79 | 45.60 | 90.3 | 9.7 | 0 | 0 | Yes | 85 | 52.3 | 123 | E | E |
| 131 | 2.46 | 10.93 | 46.70 | 90.2 | 9.8 | 0 | 0 | Yes | 82 | 56.3 | 156 | E | E |
| 132 | 1.56 | 11.02 | 41.22 | 91.5 | 8.5 | 0 | 0 | Yes | 87 | 33.3 | 234 | E | E |
| 133 | 1.24 | 11.18 | 45.68 | 86.5 | 13.5 | 0 | 0 | Yes | 88 | 34.5 | 278 | E | E |
| 134 | 1.68 | 11.42 | 22.02 | 85.5 | 14.5 | 0 | 0 | Yes | 49 | 23.5 | 134 | G | G |
| 135 | 2.65 | 10.80 | 37.03 | 89.4 | 10.6 | 0 | 0 | Yes | 50 | 26.7 | 88 | G | G |
| 136 | 2.22 | 10.65 | 28.46 | 90.6 | 9.4 | 0 | 0 | Yes | 51 | 38.5 | 98 | E | E |
| 137 | 2.45 | 11.34 | 43.47 | 90.8 | 9.2 | 0 | 0 | Yes | 52 | 25.4 | 97 | E | E |
| 138 | 2.23 | 11.62 | 35.19 | 91.6 | 8.4 | 0 | 0 | Yes | 53 | 5.8 | 94 | G | G |
| 139 | 2.26 | 11.15 | 73.02 | 92.4 | 7.6 | 0 | 0 | Yes | 88 | 42.5 | 93 | E | E |
| 140 | 2.72 | 12.38 | 56.20 | 88.8 | 11.2 | 0 | 0 | Yes | 85 | 15.6 | 75 | E | E |

TABLE 13

| Invention Example No | Diameter distribution of Zn metal grains/Zn alloy grains (Ave grain diameter) (μm) | | Percent of fine grain metal grains among Zn metal grains/ Zn alloy grains (Vol %) | Chemical component content of Zn metal grains/Zn alloy grains (Mass %) | | | | Zn alloy grain fracture surfaces present? | Total metal grain content of coat (Mass %) | Coat thickness (μm) | | Time to red rusting | |
|---|---|---|---|---|---|---|---|---|---|---|---|---|---|
| | Fine metal | Coarse metal | | Zn | Mg | Al | Si | | | Inorganic | Organic | Inorganic | Organic |
| 141 | 2.13 | 12.55 | 35.86 | 85.1 | 14.9 | 0 | 0 | Yes | 83 | 8.4 | 64 | E | E |
| 142 | 1.98 | 9.34 | 93.45 | 92.5 | 7.5 | 0 | 0 | Yes | 81 | 17.6 | 62 | E | E |
| 143 | 2.02 | 9.58 | 30.66 | 90.5 | 9.5 | 0 | 0 | Yes | 80 | 19.8 | 64 | E | E |
| 144 | 2.21 | 9.88 | 74.21 | 91.4 | 8.6 | 0 | 0 | Yes | 47 | 22.5 | 75 | E | E |
| 145 | 2.55 | 10.00 | 55.39 | 92.1 | 7.9 | 0 | 0 | Yes | 49 | 24.6 | 73 | G | G |
| 146 | 1.92 | 10.67 | 30.08 | 86.3 | 13.7 | 0 | 0 | Yes | 50 | 23.8 | 65 | G | G |
| 147 | 1.96 | 11.89 | 45.09 | 90.2 | 9.8 | 0 | 0 | Yes | 51 | 15.2 | 97 | G | G |

TABLE 13-continued

| Invention Example No | Diameter distribution of Zn metal grains/Zn alloy grains (Ave grain diameter) (µm) | | Percent of fine grain metal grains among Zn metal grains/ Zn alloy grains (Vol %) | Chemical component content of Zn metal grains/Zn alloy grains (Mass %) | | | | Zn alloy grain fracture surfaces present? | Total metal grain content of coat (Mass %) | Coat thickness (µm) | | Time to red rusting | |
|---|---|---|---|---|---|---|---|---|---|---|---|---|---|
| | Fine metal | Coarse metal | | Zn | Mg | Al | Si | | | Inorganic | Organic | Inorganic | Organic |
| 148 | 2.11 | 12.03 | 41.41 | 89.5 | 10.5 | 0 | 0 | No | 52 | 10.6 | 85 | G | G |
| 149 | 2.97 | 12.12 | 17.75 | 83.6 | 16.4 | 0 | 0 | Yes | 83 | 10.7 | 65 | E | E |
| 150 | 2.36 | 12.28 | 32.76 | 92.4 | 7.6 | 0 | 0 | No | 88 | 15 | 78 | E | E |
| 151 | 3.05 | 12.52 | 30.89 | 86.5 | 13.5 | 0 | 0 | Yes | 85 | 10.5 | 67 | E | E |
| 152 | 2.57 | 11.90 | 45.90 | 86.2 | 13.8 | 0 | 0 | No | 83 | 14.5 | 78 | E | E |
| 153 | 2.65 | 11.75 | 42.22 | 89.6 | 10.4 | 0 | 0 | Yes | 82 | 12.3 | 79 | E | E |
| 154 | 2.54 | 12.44 | 18.56 | 89.4 | 10.6 | 0 | 0 | No | 47 | 8.6 | 78 | G | G |
| 155 | 2.85 | 12.03 | 33.57 | 90.5 | 9.5 | 0 | 0 | Yes | 46 | 17.5 | 67 | G | G |
| 156 | 2.75 | 10.61 | 31.70 | 87.2 | 12.8 | 0 | 0 | Yes | 49 | 28.6 | 67 | G | G |
| 157 | 2.46 | 11.30 | 46.71 | 92.4 | 7.6 | 0 | 0 | Yes | 50 | 24.7 | 56 | E | E |
| 158 | 2.71 | 11.58 | 47.89 | 91.5 | 8.5 | 0 | 0 | Yes | 51 | 22.9 | 85 | V | V |
| 159 | 2.36 | 11.11 | 24.23 | 91 | 9 | 0 | 0 | Yes | 83 | 52.3 | 89 | E | E |
| 160 | 2.16 | 12.34 | 39.24 | 88.8 | 11.2 | 0 | 0 | Yes | 82 | 56.3 | 89 | E | E |

TABLE 14

| Invention Example No | Diameter distribution of Zn metal grains/Zn alloy grains (Ave grain diameter) (µm) | | Percent of fine grain metal grains among Zn metal grains/Zn alloy grains (Vol %) | Chemical component content of Zn metal grains/Zn alloy grains (Mass %) | | | | Zn alloy grain fracture surfaces present? | Total metal grain content of coat (Mass %) | Coat thickness (µm) | | Time to red rusting | |
|---|---|---|---|---|---|---|---|---|---|---|---|---|---|
| | Fine metal | Coarse metal | | Zn | Mg | Al | Si | | | Inorganic | Organic | Inorganic | Organic |
| 161 | 2.46 | 12.51 | 37.37 | 86.2 | 13.8 | 0 | 0 | Yes | 88 | 33.3 | 98 | E | E |
| 162 | 2.49 | 11.64 | 50.38 | 92.4 | 7.6 | 0 | 0 | Yes | 85 | 34.5 | 96 | E | E |
| 163 | 1.63 | 9.16 | 37.14 | 90.6 | 9.4 | 0 | 0 | Yes | 86 | 23.5 | 94 | E | E |
| 164 | 1.51 | 9.46 | 13.48 | 91.4 | 8.6 | 0 | 0 | Yes | 47 | 26.7 | 123 | E | E |
| 165 | 3.05 | 9.54 | 40.05 | 87.5 | 12.5 | 0 | 0 | No | 48 | 38.5 | 156 | G | G |
| 166 | 2.57 | 9.56 | 38.18 | 88.5 | 11.5 | 0 | 0 | No | 50 | 25.4 | 234 | G | G |
| 167 | 2.65 | 9.46 | 7.63 | 90.6 | 9.4 | 0 | 0 | Yes | 51 | 5.8 | 278 | G | G |
| 168 | 2.54 | 11.99 | 37.95 | 91.4 | 8.6 | 0 | 0 | Yes | 52 | 42.5 | 134 | G | G |
| 169 | 2.85 | 12.08 | 14.29 | 91.5 | 8.5 | 0 | 0 | Yes | 88 | 15.6 | 88 | E | E |
| 170 | 2.75 | 12.24 | 40.86 | 89.6 | 10.4 | 0 | 0 | No | 89 | 42.5 | 98 | E | E |
| 171 | 2.46 | 12.48 | 97.50 | 89.3 | 10.7 | 0 | 0 | No | 86 | 15.6 | 97 | E | E |
| 172 | 2.71 | 11.86 | 13.30 | 92.1 | 7.9 | 0 | 0 | Yes | 87 | 8.4 | 94 | E | E |
| 173 | 2.36 | 11.71 | 43.62 | 87.5 | 12.5 | 0 | 0 | No | 86 | 17.6 | 93 | E | E |
| 174 | 2.46 | 11.35 | 56.93 | 91.9 | 7.5 | 0.6 | 0 | Yes | 46 | 22.5 | 75 | E | E |
| 175 | 1.45 | 12.02 | 36.59 | 90.45 | 9.5 | 0.05 | 0 | Yes | 49 | 24.6 | 64 | G | G |
| 176 | 2.42 | 13.24 | 39.95 | 91.38 | 8.6 | 0.02 | 0 | Yes | 35 | 23.8 | 62 | G | G |
| 177 | 2.11 | 9.46 | 86.50 | 91.1 | 7.9 | 1 | 0 | Yes | 37 | 15.2 | 64 | E | E |
| 178 | 2.97 | 13.47 | 32.87 | 81.1 | 13.7 | 5.2 | 0 | No | 36 | 10.6 | 134 | G | G |
| 179 | 2.36 | 9.46 | 16.23 | 85.6 | 9.8 | 4.6 | 0 | Yes | 38 | 107 | 167 | E | E |
| 180 | 3.05 | 13.87 | 37.40 | 89.5 | 10.5 | 0 | 0.001 | Yes | 48 | 15 | 38 | G | G |

TABLE 15

| Invention Example No | Diameter distribution of Zn metal grains/Zn alloy grains (Ave grain diameter) (µm) | | Percent of fine grain metal grains among Zn metal grains/Zn alloy grains (Vol %) | Chemical component content of Zn metal grains/Zn alloy grains (Mass %) | | | | Zn alloy grain fracture surfaces present? | Total metal grain content of coat (Mass %) | Coat thickness (µm) | | Time to red rusting | |
|---|---|---|---|---|---|---|---|---|---|---|---|---|---|
| | Fine metal | Coarse metal | | Zn | Mg | Al | Si | | | Inorganic | Organic | Inorganic | Organic |
| 181 | 2.57 | 13.25 | 40.76 | 83 | 16.4 | 0 | 0.6 | No | 46 | 10.5 | 268 | G | G |
| 182 | 2.65 | 13.10 | 87.31 | 95.3 | 3.9 | 0 | 0.8 | Yes | 52 | 14.5 | 256 | G | G |
| 183 | 2.12 | 9.08 | 92.50 | 95 | 2.5 | 0 | 2.5 | Yes | 51 | 12.3 | 234 | E | E |
| 184 | 1.65 | 9.87 | 17.93 | 92.5 | 6 | 0 | 1.5 | No | 50 | 8.6 | 243 | E | E |
| 185 | 2.35 | 9.46 | 44.50 | 94.1 | 5 | 0 | 0.9 | Yes | 30 | 17.5 | 132 | E | E |
| 186 | 1.63 | 9.28 | 96.50 | 96.7 | 2.8 | 0 | 0.5 | Yes | 38 | 12.6 | 124 | E | E |
| 187 | 2.64 | 9.45 | 16.94 | 98.5 | 0.5 | 0.3 | 0.7 | Yes | 39 | 10.4 | 87 | G | G |
| 188 | 2.35 | 9.25 | 88.12 | 94.58 | 5.4 | 0.02 | 0.005 | Yes | 83 | 10.9 | 95 | E | E |

TABLE 15-continued

| Invention Example No | Diameter distribution of Zn metal grains/Zn alloy grains (Ave grain diameter) (μm) | | Percent of fine grain metal grains among Zn metal grains/Zn alloy grains (Vol %) | Chemical component content of Zn metal grains/Zn alloy grains (Mass %) | | | | Zn alloy grain fracture surfaces present? | Total metal grain content of coat (Mass %) | Coat thickness (μm) | | Time to red rusting | |
|---|---|---|---|---|---|---|---|---|---|---|---|---|---|
| | Fine metal | Coarse metal | | Zn | Mg | Al | Si | | | Inorganic | Organic | Inorganic | Organic |
| 189 | 2.31 | 9.46 | 60.57 | 95.65 | 3.5 | 0.05 | 0.8 | Yes | 79 | 15 | 97 | E | E |
| 190 | 2.62 | 9.46 | 39.48 | 89 | 3.3 | 5.2 | 2.5 | Yes | 75 | 10.5 | 94 | E | E |
| 191 | 2.52 | 9.46 | 15.82 | 94.98 | 3.5 | 0.02 | 1.5 | Yes | 76 | 14.5 | 93 | E | E |
| 192 | 2.24 | 13.32 | 49.57 | 89.5 | 5 | 4.6 | 0.9 | Yes | 72 | 12.3 | 88 | E | E |
| 193 | 0.05 | 6.54 | 86.52 | 97.5 | 2.5 | 0 | 0.07 | Yes | 49 | 32 | 83 | G | G |
| 194 | 2.42 | 6.35 | 90.98 | 93.5 | 6.5 | 0 | 0.11 | Yes | 51 | 25 | 88 | E | E |
| 195 | 0.11 | 7.54 | 67.32 | 88.5 | 11.5 | 0 | 0.42 | Yes | 46 | 36 | 89 | G | G |
| 196 | 1.92 | 8.64 | 82.33 | 97.6 | 2.4 | 0 | 0.65 | No | 49 | 19 | 87 | E | E |
| 197 | 0.46 | 6.45 | 73.76 | 95.5 | 4.5 | 0 | 0.35 | Yes | 35 | 28.6 | 86 | G | G |
| 198 | 0.77 | 6.48 | 88.77 | 97.3 | 2.7 | 0 | 2.7 | Yes | 37 | 27 | 85 | G | G |
| 199 | 1.55 | 10.54 | 80.49 | 96.5 | 3.5 | 0 | 0.6 | Yes | 36 | 195 | 89 | E | E |
| 200 | 1.23 | 12.54 | 88.60 | 93.2 | 6.8 | 0 | 1.8 | Yes | 38 | 23 | 84 | G | G |

TABLE 16

| Invention Example No | Diameter distribution of Zn metal grains/Zn alloy grains (Ave grain diameter) (μm) | | Percent of fine grain metal grains among Zn metal grains/Zn alloy grains (Vol %) | Chemical component content of Zn metal grains/Zn alloy grains (Mass %) | | | | Zn alloy grain fracture surfaces present? | Total metal grain content of coat (Mass %) | Coat thickness (μm) | | Time to red rusting | |
|---|---|---|---|---|---|---|---|---|---|---|---|---|---|
| | Fine metal | Coarse metal | | Zn | Mg | Al | Si | | | Inorganic | Organic | Inorganic | Organic |
| 201 | 1.45 | 18.67 | 53.20 | 87.6 | 12.4 | 0 | 1.34 | No | 48 | 23 | 88 | G | G |
| 202 | 1.64 | 19.45 | 98.71 | 98.5 | 1.5 | 0 | 0.75 | Yes | 46 | 18 | 86 | G | G |
| 203 | 0.54 | 21.55 | 97.23 | 87.5 | 12.5 | 0 | 0.43 | Yes | 52 | 55 | 85 | G | G |
| 204 | 1.85 | 7.54 | 70.16 | 95.4 | 4.6 | 5.8 | 0 | No | 51 | 19 | 83 | E | E |
| 205 | 1.42 | 35.48 | 82.73 | 95.2 | 4.8 | 2.7 | 0 | No | 50 | 42 | 82 | G | G |
| 206 | 0.06 | 65.22 | 68.54 | 92.5 | 7.5 | 0.6 | 0 | Yes | 30 | 19 | 81 | G | G |
| 207 | 1.34 | 35.47 | 75.38 | 98.4 | 1.6 | 0.5 | 0 | Yes | 38 | 28.6 | 89 | G | G |
| 208 | 1.58 | 15.24 | 90.39 | 97.1 | 2.9 | 0.2 | 0 | Yes | 39 | 27 | 89 | G | G |
| 209 | 1.47 | 13.67 | 86.71 | 96.5 | 3.5 | 0.01 | 0 | Yes | 83 | 195 | 85 | E | E |
| 210 | 1.64 | 6.45 | 63.05 | 97.4 | 2.6 | 0.06 | 0 | Yes | 79 | 23 | 83 | E | E |
| 211 | 1.86 | 7.54 | 78.06 | 94.6 | 5.4 | 0.07 | 0 | Yes | 75 | 23 | 86 | E | E |
| 212 | 0.25 | 14.32 | 98.71 | 93.6 | 6.4 | 0.05 | 0 | Yes | 76 | 25.4 | 88 | E | E |
| 213 | 0.46 | 45.22 | 97.23 | 92.2 | 7.8 | 0.02 | 0 | No | 72 | 5.8 | 80 | E | E |
| 214 | 0.77 | 48.57 | 70.16 | 94.4 | 5.6 | 0.65 | 0 | Yes | 71 | 42.5 | 89 | E | E |
| 215 | 1.55 | 99.52 | 82.73 | 96.5 | 3.5 | 0.78 | 0 | Yes | 88 | 15.6 | 89 | E | E |
| 216 | 1.23 | 13.64 | 98.71 | 97.3 | 2.7 | 0.99 | 0 | Yes | 82 | 8.4 | 98 | E | E |
| 217 | 1.45 | 18.54 | 97.23 | 94.5 | 5.5 | 1.76 | 0 | No | 83 | 17.6 | 96 | E | E |
| 218 | 1.64 | 7.54 | 70.16 | 90.6 | 9.4 | 7.8 | 0 | Yes | 81 | 19.8 | 94 | E | E |
| 219 | 0.54 | 14.52 | 82.73 | 87.4 | 12.6 | 9.88 | 0 | Yes | 64 | 22.5 | 123 | G | G |
| 220 | 1.85 | 13.75 | 86.54 | 88.4 | 11.6 | 4.65 | 0 | Yes | 69 | 24.6 | 156 | G | G |

TABLE 17

| Invention Example No | Diameter distribution of Zn metal grains/Zn alloy grains (Ave grain diameter) (μm) | | Percent of fine grain metal grains among Zn metal grains/Zn alloy grains (Vol %) | Chemical component content of Zn metal grains/Zn alloy grains (Mass %) | | | | Zn alloy grain fracture surfaces present? | Total metal grain content of coat (Mass %) | Coat thickness (μm) | | Time to red rusting | |
|---|---|---|---|---|---|---|---|---|---|---|---|---|---|
| | Fine metal | Coarse metal | | Zn | Mg | Al | Si | | | Inorganic | Organic | Inorganic | Organic |
| 221 | 1.42 | 16.54 | 75.20 | 89.5 | 10.5 | 3.65 | 0 | Yes | 83 | 23.8 | 234 | E | E |
| 222 | 2.3 | 9.80 | 82.73 | 95.2 | 4.8 | 8.99 | 0 | Yes | 50 | 15.2 | 95 | E | E |
| 223 | 1.8 | 11.20 | 97.23 | 96.4 | 3.6 | 0 | 0.07 | Yes | 72 | 10.6 | 99 | E | E |
| 224 | 1.92 | 7.99 | 38.92 | 95.3 | 4.5 | 0.2 | 0 | Yes | 51 | 32 | 94 | E | E |
| 225 | 1.96 | 10.89 | 45.09 | 94.2 | 5.2 | 0.6 | 0 | Yes | 50 | 25 | 92 | E | E |
| 226 | 2.25 | 11.03 | 41.46 | 91.45 | 8.5 | 0.05 | 0 | Yes | 30 | 36 | 87 | E | E |
| 227 | 2.36 | 6.35 | 46.12 | 97.58 | 2.4 | 0.02 | 0 | No | 38 | 19 | 84 | E | E |
| 228 | 2.24 | 7.54 | 46.64 | 95.9 | 3.1 | 1 | 0 | Yes | 39 | 28.6 | 100 | E | E |
| 229 | 2.11 | 8.64 | 29.13 | 88.3 | 6.5 | 5.2 | 0 | Yes | 83 | 27 | 99 | E | E |

TABLE 17-continued

| Invention Example No | Diameter distribution of Zn metal grains/Zn alloy grains (Ave grain diameter) (μm) | | Percent of fine grain metal grains among Zn metal grains/Zn alloy grains (Vol %) | Chemical component content of Zn metal grains/Zn alloy grains (Mass %) | | | | Zn alloy grain fracture surfaces present? | Total metal grain content of coat (Mass %) | Coat thickness (μm) | | Time to red rusting | |
|---|---|---|---|---|---|---|---|---|---|---|---|---|---|
| | Fine metal | Coarse metal | | Zn | Mg | Al | Si | | | Inorganic | Organic | Inorganic | Organic |
| 230 | 2.97 | 11.90 | 41.70 | 90.5 | 4.9 | 4.6 | 0 | Yes | 79 | 195 | 86 | G | E |
| 231 | 2.36 | 11.75 | 42.22 | 91.5 | 8.5 | 0 | 0.001 | Yes | 75 | 23 | 97 | G | E |
| 232 | 3.05 | 12.44 | 46.93 | 86.85 | 12.5 | 0.05 | 0.6 | Yes | 76 | 23 | 32 | G | E |
| 233 | 2.57 | 12.03 | 47.45 | 83.6 | 14.6 | 1 | 0.8 | Yes | 72 | 28.6 | 55 | G | E |
| 234 | 1.88 | 9.91 | 12.60 | 91 | 6.5 | 0 | 2.5 | Yes | 71 | 27 | 57 | E | E |
| 235 | 1.86 | 7.54 | 42.51 | 92.8 | 5.7 | 0 | 1.5 | No | 82 | 195 | 39 | E | E |
| 236 | 1.57 | 8.64 | 43.03 | 95.7 | 3.4 | 0 | 0.9 | Yes | 83 | 23 | 67 | E | E |
| 237 | 2.75 | 10.71 | 47.74 | 92.6 | 6.9 | 0 | 0.5 | Yes | 81 | 23 | 78 | E | E |
| 238 | 0.54 | 21.55 | 97.23 | 93.4 | 5.6 | 0.3 | 0.7 | Yes | 64 | 25.4 | 79 | G | E |
| 239 | 1.85 | 26.87 | 70.16 | 96.38 | 3.6 | 0.02 | 0.005 | Yes | 69 | 5.8 | 82 | G | E |
| 240 | 1.42 | 35.48 | 82.73 | 92.12 | 7.8 | 0.04 | 0.04 | Yes | 83 | 42.5 | 81 | E | E |

TABLE 18

| Invention Example No | Diameter distribution of Zn metal grains/Zn alloy grains (Ave grain diameter) (μm) | | Percent of fine grain metal grains among Zn metal grains/Zn alloy grains (Vol %) | Chemical component content of Zn metal grains/Zn alloy grains (Mass %) | | | | Zn alloy grain fracture surfaces present? | Total metal grain content of coat (Mass %) | Coat thickness (μm) | | Time to red rusting | |
|---|---|---|---|---|---|---|---|---|---|---|---|---|---|
| | Fine metal | Coarse metal | | Zn | Mg | Al | Si | | | Inorganic | Organic | Inorganic | Organic |
| 241 | 0.06 | 65.22 | 94.81 | 80.3 | 16.5 | 1 | 2.2 | Yes | 50 | 15.6 | 89 | G | E |
| 242 | 1.34 | 35.47 | 96.54 | 79.94 | 18.4 | 0.06 | 1.6 | Yes | 72 | 19 | 96 | G | E |
| 243 | 0.25 | 14.32 | 98.71 | 91.85 | 2.5 | 5.6 | 0.05 | Yes | 76 | 42 | 95 | G | E |
| 244 | 0.46 | 45.22 | 97.23 | 91.4 | 4.3 | 4.2 | 0.1 | Yes | 72 | 23 | 99 | G | E |
| 245 | 0.77 | 48.57 | 70.16 | 89.8 | 3.5 | 6.4 | 0.3 | Yes | 46 | 28.6 | 100 | G | E |
| 246 | 1.55 | 99.52 | 82.73 | 84.9 | 2.6 | 9.6 | 2.9 | Yes | 52 | 5.8 | 123 | G | E |
| 247 | 1.23 | 13.64 | 98.71 | 88.4 | 1.5 | 8.5 | 1.6 | Yes | 83 | 15.2 | 89 | E | E |
| 248 | 2.94 | 9.61 | 7.56 | 94.1 | 5.9 | 0.65 | 0.07 | Yes | 46 | 19 | 145 | G | G |
| 249 | 2.11 | 9.85 | 95.98 | 93.5 | 6.5 | 0.07 | 0 | Yes | 47 | 28.6 | 167 | E | E |
| 250 | 2.68 | 9.23 | 68.91 | 97.6 | 2.4 | 0.08 | 2.5 | Yes | 49 | 27 | 169 | G | G |
| 251 | 2.74 | 9.46 | 46.67 | 92.5 | 7.5 | 1.2 | 2.9 | Yes | 47 | 42 | 213 | G | G |
| 252 | 2.13 | 9.46 | 7.66 | 91.6 | 8.4 | 1.8 | 1.8 | Yes | 52 | 19 | 215 | E | E |
| 253 | 2.82 | 9.46 | 15.20 | 90.8 | 9.2 | 9.2 | 0.5 | Yes | 52 | 28.6 | 224 | G | G |
| 254 | 1.88 | 9.91 | 16.58 | 89.4 | 10.6 | 8.9 | 0.8 | Yes | 50 | 55 | 75 | G | G |
| 255 | 2.35 | 9.25 | 35.87 | 96.0 | 4.0 | 0 | 0.7 | Yes | 47 | 16.5 | 64 | E | E |
| 256 | 2.57 | 9.56 | 42.04 | 97.5 | 2.5 | 0.02 | 0 | Yes | 48 | 25.4 | 62 | G | G |
| 257 | 2.56 | 9.84 | 38.41 | 98.4 | 1.6 | 7.8 | 0 | Yes | 49 | 5.8 | 64 | G | G |
| 258 | 2.21 | 9.75 | 6.99 | 95.5 | 4.5 | 0 | 0.5 | Yes | 51 | 42.5 | 75 | E | E |
| 259 | 2.64 | 9.85 | 44.12 | 96.2 | 3.8 | 0.08 | 0 | Yes | 52 | 15.6 | 73 | G | G |
| 260 | 2.68 | 9.23 | 44.21 | 97.6 | 2.4 | 2.7 | 0 | No | 51 | 15 | 24 | G | G |

TABLE 19

| Invention Example No | Diameter distribution of Zn metal grains/Zn alloy grains (Ave grain diameter) (μm) | | Percent of fine grain metal grains among Zn metal grains/Zn alloy grains (Vol %) | Chemical component content of Zn metal grains/Zn alloy grains (Mass %) | | | | Zn alloy grain fracture surfaces present? | Total metal grain content of coat (Mass %) | Coat thickness (μm) | | Time to red rusting | |
|---|---|---|---|---|---|---|---|---|---|---|---|---|---|
| | Fine metal | Coarse metal | | Zn | Mg | Al | Si | | | Inorganic | Organic | Inorganic | Organic |
| 261 | 1.55 | 9.08 | 39.51 | 94.5 | 5.5 | 3.7 | 0 | Yes | 88 | 10.5 | 96 | E | E |
| 262 | 1.88 | 9.87 | 78.64 | 96.8 | 3.2 | 1.8 | 0 | No | 87 | 14.5 | 94 | E | E |
| 263 | 1.55 | 9.46 | 42.05 | 95.4 | 4.6 | 1.5 | 0 | Yes | 85 | 12.3 | 93 | E | E |
| 264 | 2.85 | 9.28 | 64.58 | 94.8 | 5.2 | 0 | 2.9 | Yes | 82 | 8.6 | 95 | E | E |
| 265 | 2.64 | 9.45 | 47.76 | 97.5 | 2.5 | 0 | 2.7 | Yes | 86 | 17.5 | 92 | E | E |
| 266 | 2.36 | 10.39 | 19.65 | 95.5 | 4.5 | 0 | 0.05 | Yes | 50 | 10.9 | 90 | E | E |
| 267 | 3.05 | 10.56 | 65.39 | 97.3 | 2.7 | 0 | 0.02 | Yes | 51 | 19 | 99 | G | G |
| 268 | 2.57 | 10.74 | 48.57 | 95.8 | 4.2 | 0 | 0.08 | Yes | 51 | 25.6 | 98 | G | G |
| 269 | 2.65 | 10.27 | 24.91 | 94.6 | 5.4 | 0 | 1.02 | No | 79 | 28.6 | 97 | G | E |
| 270 | 2.54 | 11.50 | 39.92 | 94.7 | 5.3 | 0 | 1.05 | No | 81 | 24.7 | 94 | G | E |

TABLE 19-continued

| Invention Example No | Diameter distribution of Zn metal grains/Zn alloy grains (Ave grain diameter) (μm) | | Percent of fine grain metal grains among Zn metal grains/Zn alloy grains (Vol %) | Chemical component content of Zn metal grains/Zn alloy grains (Mass %) | | | | Zn alloy grain fracture surfaces present? | Total metal grain content of coat (Mass %) | Coat thickness (μm) | | Time to red rusting | |
|---|---|---|---|---|---|---|---|---|---|---|---|---|---|
| | Fine metal | Coarse metal | | Zn | Mg | Al | Si | | | Inorganic | Organic | Inorganic | Organic |
| 271 | 2.85 | 11.67 | 22.65 | 94.8 | 5.2 | 0 | 0.04 | Yes | 80 | 22.9 | 93 | G | E |
| 272 | 2.75 | 11.85 | 66.20 | 96.1 | 3.9 | 3.6 | 0.03 | Yes | 82 | 52.3 | 83 | G | E |
| 273 | 2.69 | 9.40 | 42.84 | 94.2 | 5.8 | 0.08 | 0.06 | Yes | 84 | 13.5 | 100 | G | E |
| 274 | 2.57 | 9.57 | 25.44 | 95.6 | 4.4 | 0.6 | 0.02 | Yes | 83 | 12.7 | 123 | G | E |
| 275 | 2.49 | 9.54 | 63.27 | 97.8 | 2.2 | 0.2 | 0.07 | Yes | 82 | 11.2 | 89 | E | E |
| 276 | 2.68 | 9.58 | 46.45 | 94.5 | 5.5 | 0 | 1.11 | Yes | 81 | 16.5 | 87 | G | E |
| 277 | 2.35 | 9.25 | 46.45 | 90.0 | 10.0 | 0 | 1.04 | Yes | 46 | 10.6 | 86 | G | G |
| 278 | 2.48 | 10.04 | 50.91 | 92.5 | 7.5 | 0 | 0.06 | Yes | 47 | 10.7 | 84 | E | E |
| 279 | 1.74 | 8.95 | 29.91 | 90.6 | 9.4 | 0 | 0.99 | No | 83 | 10.4 | 88 | E | E |
| 280 | 2.25 | 9.90 | 34.25 | 89.4 | 10.6 | 0 | 0.45 | Yes | 52 | 24.7 | 96 | E | E |

TABLE 20

| Invention Example No | Diameter distribution of Zn metal grains/Zn alloy grains (Ave grain diameter) (μm) | | Percent of fine grain metal grains among Zn metal grains/Zn alloy grains (Vol %) | Chemical component content of Zn metal grains/Zn alloy grains (Mass %) | | | | Zn alloy grain fracture surfaces present? | Total metal grain content of coat (Mass %) | Coat thickness (μm) | | Time to red rusting | |
|---|---|---|---|---|---|---|---|---|---|---|---|---|---|
| | Fine metal | Coarse metal | | Zn | Mg | Al | Si | | | Inorganic | Organic | Inorganic | Organic |
| 281 | 2.36 | 9.57 | 37.61 | 90.6 | 9.4 | 0.7 | 0 | Yes | 89 | 22.9 | 94 | E | E |
| 282 | 2.24 | 10.79 | 45.60 | 90.3 | 9.7 | 0.5 | 0 | Yes | 85 | 52.3 | 123 | E | E |
| 283 | 2.23 | 11.62 | 35.19 | 91.6 | 8.4 | 0.2 | 0 | Yes | 53 | 5.8 | 94 | G | G |
| 284 | 2.26 | 11.15 | 73.02 | 92.4 | 7.6 | 0.07 | 0 | Yes | 88 | 42.5 | 93 | E | E |
| 285 | 2.72 | 12.38 | 56.20 | 88.8 | 11.2 | 0.06 | 0 | Yes | 85 | 15.6 | 75 | G | E |
| 286 | 2.11 | 12.03 | 41.41 | 89.5 | 10.5 | 0.13 | 0 | No | 52 | 10.6 | 85 | G | G |
| 287 | 2.97 | 12.12 | 17.75 | 83.6 | 16.4 | 0.65 | 0 | Yes | 83 | 10.7 | 65 | G | E |
| 288 | 2.36 | 12.28 | 32.76 | 92.4 | 7.6 | 0.27 | 0 | Yes | 88 | 15 | 78 | G | E |
| 289 | 2.75 | 10.61 | 31.70 | 87.2 | 12.8 | 0.45 | 0.65 | Yes | 49 | 28.6 | 67 | G | G |
| 290 | 2.46 | 11.30 | 46.71 | 92.4 | 7.6 | 0.33 | 0.99 | Yes | 50 | 24.7 | 56 | G | G |
| 291 | 2.71 | 11.58 | 47.89 | 91.5 | 8.5 | 1 | 2.5 | Yes | 51 | 22.9 | 85 | G | G |
| 292 | 2.36 | 11.11 | 24.23 | 91 | 9 | 0.87 | 1.8 | Yes | 83 | 52.3 | 89 | G | E |
| 293 | 2.16 | 12.34 | 39.24 | 88.8 | 11.2 | 0.06 | 0 | Yes | 82 | 56.3 | 89 | G | E |
| 294 | 2.46 | 12.51 | 37.37 | 86.2 | 13.8 | 0.27 | 0 | Yes | 88 | 33.3 | 98 | G | E |
| 295 | 2.49 | 11.64 | 50.38 | 92.4 | 7.6 | 0.86 | 0 | No | 85 | 34.5 | 96 | G | E |
| 296 | 2.71 | 11.86 | 13.30 | 92.1 | 7.9 | 0.65 | 0 | Yes | 87 | 8.4 | 94 | G | E |
| 297 | 2.36 | 11.71 | 43.62 | 87.5 | 12.5 | 0.43 | 0 | No | 86 | 17.6 | 93 | G | E |
| 298 | 1.96 | 10.89 | 56.93 | 91.9 | 7.5 | 0.6 | 0 | Yes | 46 | 22.5 | 75 | E | E |
| 299 | 2.25 | 11.03 | 36.59 | 90.45 | 9.5 | 0.05 | 0 | Yes | 49 | 24.6 | 64 | E | E |
| 300 | 2.42 | 13.24 | 39.95 | 91.38 | 8.6 | 0.02 | 0 | Yes | 35 | 23.8 | 62 | G | G |

TABLE 21

| Invention Example No | Diameter distribution of Zn metal grains/Zn alloy grains (Ave grain diameter) (μm) | | Percent of fine grain metal grains among Zn metal grains/Zn alloy grains (Vol %) | Chemical component content of Zn metal grains/Zn alloy grains (Mass %) | | | | Zn alloy grain fracture surfaces present? | Total metal grain content of coat (Mass %) | Coat thickness (μm) | | Time to red rusting | |
|---|---|---|---|---|---|---|---|---|---|---|---|---|---|
| | Fine metal | Coarse metal | | Zn | Mg | Al | Si | | | Inorganic | Organic | Inorganic | Organic |
| 301 | 2.96 | 9.46 | 44.50 | 94.1 | 5 | 0 | 0.9 | No | 30 | 17.5 | 132 | G | G |
| 302 | 2.85 | 9.28 | 96.50 | 96.7 | 2.8 | 0 | 0.5 | Yes | 38 | 12.6 | 124 | G | G |
| 303 | 2.64 | 9.45 | 16.94 | 98.5 | 0.5 | 0.3 | 0.7 | Yes | 39 | 10.4 | 87 | G | G |
| 304 | 2.35 | 9.25 | 88.12 | 94.58 | 5.4 | 0.02 | 0.005 | Yes | 83 | 10.9 | 95 | E | E |
| 305 | 2.31 | 9.46 | 60.57 | 95.65 | 3.5 | 0.8 | 0 | Yes | 79 | 15 | 97 | E | E |
| 306 | 2.62 | 9.46 | 39.48 | 89 | 3.3 | 5.2 | 2.5 | Yes | 75 | 10.5 | 94 | G | E |
| 307 | 2.52 | 9.46 | 15.82 | 94.98 | 3.5 | 0.02 | 1.5 | Yes | 76 | 14.5 | 93 | G | E |
| 308 | 2.24 | 13.32 | 49.57 | 89.5 | 5 | 4.6 | 0.9 | Yes | 72 | 12.3 | 88 | G | E |
| 309 | 0.06 | 65.22 | 68.54 | 92.5 | 7.5 | 0.06 | 0.07 | Yes | 30 | 19 | 81 | G | G |
| 310 | 1.34 | 35.47 | 75.38 | 98.4 | 1.6 | 0.99 | 0.01 | Yes | 38 | 28.6 | 89 | G | G |
| 311 | 1.58 | 15.24 | 90.39 | 97.1 | 2.9 | 0.54 | 0.03 | Yes | 39 | 27 | 89 | G | G |

TABLE 21-continued

| Invention Example No | Diameter distribution of Zn metal grains/Zn alloy grains (Ave grain diameter) (μm) | | Percent of fine grain metal grains among Zn metal grains/Zn alloy grains (Vol %) | Chemical component content of Zn metal grains/Zn alloy grains (Mass %) | | | | Zn alloy grain fracture surfaces present? | Total metal grain content of coat (Mass %) | Coat thickness (μm) | | Time to red rusting | |
|---|---|---|---|---|---|---|---|---|---|---|---|---|---|
| | Fine metal | Coarse metal | | Zn | Mg | Al | Si | | | Inorganic | Organic | Inorganic | Organic |
| 312 | 1.47 | 9.28 | 86.71 | 96.5 | 3.5 | 0.02 | 0.07 | Yes | 83 | 195 | 85 | E | E |
| 313 | 1.64 | 9.28 | 63.05 | 97.4 | 2.6 | 0.07 | 0.8 | Yes | 79 | 23 | 83 | E | E |
| 314 | 1.86 | 16.54 | 78.06 | 94.6 | 5.4 | 0.09 | 0.03 | Yes | 75 | 23 | 86 | G | E |
| 315 | 0.25 | 14.32 | 98.71 | 93.6 | 6.4 | 1.05 | 0.99 | Yes | 76 | 25.4 | 88 | G | E |
| 316 | 0.46 | 45.22 | 97.23 | 92.2 | 7.8 | 2.6 | 0.54 | Yes | 72 | 5.8 | 80 | G | E |
| 317 | 0.77 | 48.57 | 70.16 | 94.4 | 5.6 | 5.8 | 0.22 | Yes | 71 | 42.5 | 89 | G | E |
| 318 | 1.55 | 99.52 | 82.73 | 96.5 | 3.5 | 6.8 | 0.91 | Yes | 88 | 15.6 | 89 | G | E |
| 319 | 1.96 | 10.89 | 45.09 | 94.2 | 5.2 | 0.6 | 0.43 | Yes | 50 | 25 | 92 | E | E |
| 320 | 2.25 | 11.03 | 41.46 | 91.45 | 8.5 | 0.05 | 0.32 | Yes | 30 | 36 | 87 | E | E |

TABLE 22

| Invention Example No | Diameter distribution of Zn metal grains/Zn alloy grains (Ave grain diameter) (μm) | | Percent of fine grain metal grains among Zn metal grains/Zn alloy grains (Vol %) | Chemical component content of Zn metal grains/Zn alloy grains (Mass %) | | | | Zn alloy grain fracture surfaces present? | Total metal grain content of coat (Mass %) | Coat thickness (μm) | | Time to red rusting | |
|---|---|---|---|---|---|---|---|---|---|---|---|---|---|
| | Fine metal | Coarse metal | | Zn | Mg | Al | Si | | | Inorganic | Organic | Inorganic | Organic |
| 321 | 2.36 | 12.12 | 46.12 | 97.58 | 2.4 | 0.02 | 0 | Yes | 38 | 19 | 84 | G | G |
| 322 | 2.24 | 9.46 | 46.64 | 95.9 | 3.1 | 1 | 0 | Yes | 39 | 28.6 | 100 | E | E |
| 323 | 2.11 | 12.52 | 29.13 | 88.3 | 6.5 | 5.2 | 0 | No | 83 | 27 | 99 | G | E |
| 324 | 2.97 | 11.90 | 41.70 | 90.5 | 4.9 | 4.6 | 0 | Yes | 79 | 195 | 86 | G | E |
| 325 | 2.36 | 9.46 | 42.22 | 91.5 | 8.5 | 0 | 0.001 | Yes | 75 | 23 | 97 | E | E |
| 326 | 3.05 | 12.44 | 46.93 | 86.9 | 12.5 | 0 | 0.6 | No | 76 | 23 | 32 | G | E |
| 327 | 2.57 | 12.03 | 47.45 | 84.6 | 14.6 | 0 | 0.8 | Yes | 72 | 28.6 | 55 | G | E |
| 328 | 1.85 | 26.87 | 70.16 | 96.38 | 3.6 | 0.02 | 0.005 | Yes | 69 | 5.8 | 82 | G | G |
| 329 | 1.42 | 35.48 | 82.73 | 92.12 | 7.8 | 0.04 | 0.04 | Yes | 83 | 42.5 | 81 | G | E |
| 330 | 0.06 | 65.22 | 94.81 | 80.3 | 16.5 | 1 | 2.2 | Yes | 50 | 15.6 | 89 | G | G |
| 331 | 1.34 | 35.47 | 96.54 | 79.94 | 18.4 | 0.06 | 1.6 | Yes | 72 | 19 | 96 | G | E |
| 332 | 0.25 | 14.32 | 98.71 | 91.85 | 2.5 | 5.6 | 0.05 | Yes | 76 | 42 | 95 | G | E |
| 333 | 0.46 | 45.22 | 97.23 | 91.4 | 4.3 | 4.2 | 0.1 | Yes | 72 | 23 | 99 | G | E |
| 334 | 0.77 | 48.57 | 70.16 | 89.8 | 3.5 | 6.4 | 0.3 | Yes | 46 | 28.6 | 100 | G | G |

TABLE 23

| Invention Example No | Granularity distribution of Zn metal grains/Zn alloy grains (peak grain diameter) (μm) | | Percent of fine-grain metal grains among Zn metal grains/Zn alloy grains (Vol %) | Chemical component content of Zn metal grains/Zn alloy grains (Mass %) | | | | Zn alloy grain fracture surfaces or cracks present? | Ave aspect ratio | Total metal grain content of coat (Mass %) | Coating details | | Corrosion Test Results |
|---|---|---|---|---|---|---|---|---|---|---|---|---|---|
| | Fine metal | Coarse metal | | Zn | Mg | Al | Si | | | | Base resin type | Coat thickness (μm) | Coating method | |
| 413 | 2.65 | 9.56 | 5.66 | 100 | 0 | 0 | 0 | No | — | 35 | Alkali silicate | 2 | Spray | G |
| 414 | 0.05 | 6.5 | 16.55 | 100 | 0 | 0 | 0 | No | — | 66 | Alkyl silicate | 37 | Spray | E |
| 415 | 4.6 | 65.5 | 21.55 | 100 | 0 | 0 | 0 | No | — | 38 | Alkali silicate | 12 | Spray | E |
| 416 | 3.56 | 13.5 | 5.66 | 100 | 0 | 0 | 0 | No | — | 84 | Alkyl silicate | 160 | Brush | E |
| 417 | 4.55 | 16.7 | 33.66 | 100 | 0 | 0 | 0 | No | — | 39 | Alkali silicate | 5 | Brush | G |
| 418 | 2.15 | 9.89 | 45.65 | 100 | 0 | 0 | 0 | No | — | 85 | Alkyl silicate | 12 | Brush | E |
| 419 | 3.22 | 10.55 | 49.88 | 100 | 0 | 0 | 0 | No | — | 36 | Alkali silicate | 2 | Spray | G |
| 420 | 2.99 | 9.64 | 42.33 | 100 | 0 | 0 | 0 | No | — | 56 | Alkyl silicate | 18 | Spray | E |
| 421 | 3.65 | 11.22 | 65.44 | 100 | 0 | 0 | 0 | No | — | 42 | Alkyl silicate | 23 | Spray | E |
| 422 | 4.55 | 13.5 | 77.55 | 100 | 0 | 0 | 0 | No | — | 31 | Epoxy resin | 30 | Brush | E |
| 423 | 3.57 | 22.5 | 96.55 | 100 | 0 | 0 | 0 | No | — | 88 | Acrylic resin | 77 | Brush | E |
| 424 | 1.99 | 8.56 | 5.97 | 100 | 0 | 0 | 0 | No | — | 78 | Urethane resin | 254 | Brush | E |

TABLE 23-continued

| Invention Example No | Granularity distribution of Zn metal grains/ Zn alloy grains (peak grain diameter) (μm) Fine metal | Coarse metal | Percent of fine-grain metal grains among Zn metal grains/ Zn alloy grains (Vol %) | Chemical component content of Zn metal grains/Zn alloy grains (Mass %) Zn | Mg | Al | Si | Zn alloy grain fracture surfaces or cracks present? | Ave aspect ratio | Coating details Total metal grain content of coat (Mass %) | Base resin type | Coat thickness (μm) | Coating method | Corrosion Test Results |
|---|---|---|---|---|---|---|---|---|---|---|---|---|---|---|
| 425 | 2.12 | 9.46 | 87.77 | 100 | 0 | 0 | 0 | No | — | 36 | Polyester resin | 47 | Spray | E |
| 426 | 2.45 | 11.1 | 86.55 | 100 | 0 | 0 | 0 | No | — | 37 | Epoxy resin | 43 | Spray | E |
| 427 | 1.85 | 8.92 | 15.67 | 100 | 0 | 0 | 0 | No | — | 45 | Acrylic resin | 322 | Brush | E |
| 428 | 1.65 | 9.23 | 31.55 | 100 | 0 | 0 | 0 | No | — | 68 | Urethane resin | 20 | Brush | E |
| 429 | 2.45 | 9.05 | 26.76 | 100 | 0 | 0 | 0 | No | — | 79 | Polyester resin | 700 | Brush | E |
| 430 | 2.01 | 10.91 | 67.89 | 100 | 0 | 0 | 0 | No | — | 47 | Alkali silicate | 22 | Spray | E |
| 431 | 1.99 | 11.12 | 56.89 | 100 | 0 | 0 | 0 | No | — | 56 | Alkyl silicate | 25 | Spray | E |
| 432 | 2.38 | 10.93 | 45.67 | 100 | 0 | 0 | 0 | No | — | 37 | Alkali silicate | 14 | Spray | E |
| 433 | 2.49 | 9.34 | 34.67 | 100 | 0 | 0 | 0 | No | — | 90 | Urethane resin | 112 | Spray | E |
| 434 | 2.34 | 8.77 | 95.66 | 100 | 0 | 0 | 0 | No | — | 43 | Alkali silicate | 554 | Spray | E |

TABLE 24

| Invention Example No | Granularity distribution of Zn metal grains/ Zn alloy grains (peak grain diameter) (μm) Fine metal | Coarse metal | Percent of fine-grain metal grains among Zn metal grains/ Zn alloy grains (Vol %) | Chemical component content of Zn metal grains/Zn alloy grains (Mass %) Zn | Mg | Al | Si | Zn alloy grain fracture surfaces or cracks present? | Ave aspect ratio | Coating details Total metal grain content of coat (Mass %) | Base resin type | Coat thickness (μm) | Coating method | Corrosion Test Results |
|---|---|---|---|---|---|---|---|---|---|---|---|---|---|---|
| 435 | 3.99 | 27.6 | 34.21 | 100 | 0 | 0 | 0 | No | — | 38 | Urethane resin | 150 | Spray | E |
| 436 | 1.02 | 21.9 | 7.88 | 100 | 0 | 0 | 0 | No | — | 56 | Alkali silicate | 18 | Spray | E |
| 437 | 0.05 | 22.5 | 92.32 | 100 | 0 | 0 | 0 | No | — | 89 | Alkyl silicate | 657 | Brush | E |
| 438 | 2.01 | 17.5 | 11.22 | 100 | 0 | 0 | 0 | No | — | 32 | Alkyl silicate | 24 | Spray | E |
| 439 | 1.51 | 6.99 | 55.66 | 100 | 0 | 0 | 0 | No | — | 55 | Urethane resin | 99 | Spray | E |
| 440 | 2.38 | 7.65 | 78.99 | 100 | 0 | 0 | 0 | No | — | 79 | Alkyl silicate | 7 | Spray | E |
| 441 | 1.99 | 8.56 | 5.97 | 100 | 0 | 0 | 0 | No | — | 78 | Epoxy resin | 100 | Spray | E |
| 442 | 2.49 | 9.34 | 34.67 | 100 | 0 | 0 | 0 | No | — | 77 | Alkyl silicate | 27 | Brush | E |
| 443 | 1.02 | 21.9 | 7.88 | 100 | 0 | 0 | 0 | No | — | 56 | Alkali silicate | 15 | Spray | E |
| 444 | 2.35 | 9.25 | 35.87 | 88.8 | 11.2 | 0 | 0 | Yes | 1.12 | 49 | Alkyl silicate | 14 | Spray | E |
| 445 | 2.57 | 9.56 | 42.04 | 90.6 | 9.4 | 0 | 0 | No | 1.38 | 89 | Urethane resin | 55 | Spray | E |
| 446 | 2.56 | 9.84 | 6.55 | 81.45 | 18.5 | 0 | 0.05 | Yes | 1.22 | 90 | Alkyl silicate | 8 | Spray | E |
| 447 | 2.21 | 9.75 | 43.60 | 99.97 | 0.03 | 0 | 0 | Yes | 1.14 | 86 | Urethane resin | 122 | Brush | E |
| 448 | 2.64 | 9.85 | 44.12 | 98.4 | 1.6 | 0 | 0 | No | 1.02 | 48 | Alkyl silicate | 555 | Spray | E |
| 449 | 1.99 | 8.56 | 37.21 | 93.2 | 6.8 | 0 | 0 | Yes | 1.05 | 47 | Alkali silicate | 19 | Spray | E |
| 450 | 2.94 | 8.21 | 43.38 | 84.5 | 13.9 | 0 | 1.6 | No | 1.36 | 47 | Alkyl silicate | 25 | Brush | E |
| 451 | 2.58 | 8.33 | 13.52 | 98.1 | 1.9 | 0 | 0 | Yes | 1.11 | 47 | Alkyl silicate | 58 | Spray | E |
| 452 | 2.37 | 8 | 44.94 | 94.3 | 5.7 | 0 | 0 | No | 1.07 | 52 | Alkyl silicate | 685 | Spray | E |
| 453 | 2.15 | 9.22 | 45.46 | 90.8 | 9.2 | 0 | 0 | No | 1.42 | 52 | Alkali silicate | 19 | Brush | E |
| 454 | 2.96 | 9.36 | 35.96 | 83.3 | 15.4 | 0 | 1.3 | Yes | 1.38 | 52 | Urethane resin | 700 | Spray | E |
| 455 | 2.85 | 9.45 | 42.13 | 79.84 | 18.6 | 0 | 1.56 | Yes | 1.22 | 88 | Alkyl silicate | 77 | Spray | E |
| 456 | 2.94 | 9.61 | 7.56 | 96.4 | 3.6 | 0 | 0 | Yes | 1.14 | 87 | Alkyl silicate | 54 | Spray | E |

TABLE 25

| Invention Example No | Granularity distribution of Zn metal grains/ Zn alloy grains (peak grain diameter) (μm) Fine metal | Coarse metal | Percent of fine-grain metal grains among Zn metal grains/ Zn alloy grains (Vol %) | Chemical component content of Zn metal grains/Zn alloy grains (Mass %) | | | | Zn alloy grain fracture surfaces or cracks present? | Ave aspect ratio | Coating details | | | | Corrosion Test Results |
|---|---|---|---|---|---|---|---|---|---|---|---|---|---|---|
| | | | | Zn | Mg | Al | Si | | | Total metal grain content of coat (Mass %) | Base resin type | Coat thickness (μm) | Coating method | |
| 457 | 2.11 | 9.85 | 43.69 | 94.6 | 5.4 | 0 | 0 | Yes | 1.13 | 89 | Alkyl silicate | 64 | Spay | E |
| 458 | 2.68 | 9.23 | 44.21 | 92.4 | 7.6 | 0 | 0 | Yes | 1.02 | 90 | Alkyl silicate | 34 | Brush | E |
| 459 | 2.99 | 9.08 | 39.51 | 75.5 | 24.5 | 0 | 0 | Yes | 1.06 | 91 | Alkali silicate | 28 | Spay | E |
| 460 | 2.78 | 9.87 | 45.68 | 82.4 | 17.6 | 0 | 0 | Yes | 1.05 | 46 | Urethane resin | 109 | Brush | E |
| 461 | 2.96 | 9.46 | 65.58 | 98.6 | 1.4 | 0 | 0 | Yes | 1.24 | 47 | Alkyl silicate | 15 | Spay | E |
| 462 | 2.85 | 9.28 | 47.24 | 78.5 | 21.5 | 0 | 0 | Yes | 1.33 | 47 | Alkyl silicate | 14 | Spay | E |
| 463 | 2.64 | 9.45 | 47.76 | 89.6 | 10.4 | 0 | 0 | Yes | 1.27 | 49 | Alkyl silicate | 18 | Spay | E |
| 464 | 2.35 | 9.25 | 45.02 | 87.2 | 12.8 | 0 | 0 | Yes | 1.05 | 50 | Alkali silicate | 2 | Spay | G |
| 465 | 2.12 | 9.46 | 47.02 | 92.2 | 7.8 | 0 | 0 | Yes | 1.22 | 87 | Alkyl silicate | 37 | Spay | E |
| 466 | 2.34 | 9.46 | 7.66 | 70.5 | 29.5 | 0 | 0 | Yes | 1.13 | 83 | Alkali silicate | 12 | Spay | E |
| 467 | 2.33 | 9.46 | 15.20 | 91.5 | 8.5 | 0 | 0 | Yes | 1.06 | 48 | Alkyl silicate | 160 | Brush | E |
| 468 | 2.23 | 9.06 | 43.16 | 74.5 | 25.5 | 0 | 0 | Yes | 1.05 | 51 | Alkali silicate | 5 | Brush | E |
| 469 | 2.12 | 9.3 | 49.33 | 99.93 | 0.07 | 0 | 0 | Yes | 1.24 | 51 | Alkyl silicate | 56 | Brush | E |
| 470 | 2.21 | 8.68 | 19.47 | 89.2 | 10.8 | 0 | 0 | No | 1.05 | 87 | Alkali silicate | 2 | Spay | E |
| 471 | 1.38 | 8.53 | 69.55 | 86 | 11.2 | 1.6 | 1.2 | No | 1.12 | 85 | Alkyl silicate | 18 | Spay | E |
| 472 | 1.95 | 9.32 | 51.41 | 75.23 | 24.5 | 0.27 | 0 | Yes | 1.38 | 86 | Alkyl silicate | 23 | Spay | E |
| 473 | 2.26 | 8.95 | 75.88 | 82.6 | 17.4 | 0 | 0 | Yes | 1.13 | 50 | Epoxy resin | 30 | Brush | E |
| 474 | 2.05 | 12.54 | 48.08 | 98.7 | 1.3 | 0 | 0 | Yes | 1.33 | 51 | Acrylic resin | 77 | Brush | E |
| 475 | 1.65 | 8.7 | 66.85 | 80.5 | 19.5 | 0 | 0 | Yes | 1.27 | 51 | Urethane resin | 655 | Brush | E |
| 476 | 2.35 | 8.55 | 7.68 | 88.85 | 10.8 | 0.05 | 0.3 | No | 1.23 | 80 | Polyester resin | 47 | Spay | E |
| 477 | 1.62 | 8.91 | 8.64 | 87.7 | 11.9 | 0.4 | 0 | Yes | 1.11 | 46 | Epoxy resin | 43 | Spay | E |
| 478 | 1.88 | 9.91 | 16.58 | 90.5 | 9.5 | 0 | 0 | Yes | 1.42 | 51 | Acrylic resin | 52 | Brush | E |

TABLE 26

| Invention Example No | Granularity distribution of Zn metal grains/ Zn alloy grains (peak grain diameter) (μm) Fine metal | Coarse metal | Percent of fine-grain metal grains among Zn metal grains/ Zn alloy grains (Vol %) | Chemical component content of Zn metal grains/Zn alloy grains (Mass %) | | | | Zn alloy grain fracture surfaces or cracks present? | Ave aspect ratio | Coating details | | | | Corrosion Test Results |
|---|---|---|---|---|---|---|---|---|---|---|---|---|---|---|
| | | | | Zn | Mg | Al | Si | | | Total metal grain content of coat (Mass %) | Base resin type | Coat thickness (μm) | Coating method | |
| 479 | 2.35 | 9.25 | 35.87 | 89.5 | 10.5 | 0 | 0 | Yes | 1.06 | 86 | Urethane resin | 20 | Brush | E |
| 480 | 2.57 | 9.56 | 42.04 | 84.9 | 15.1 | 0 | 0 | Yes | 1.05 | 85 | Polyester resin | 200 | Brush | E |
| 481 | 2.56 | 9.84 | 38.41 | 83.2 | 16.8 | 0 | 0 | Yes | 1.07 | 82 | Alkali silicate | 22 | Spray | E |
| 482 | 2.21 | 9.75 | 6.99 | 89.4 | 10.6 | 0 | 0 | Yes | 1.42 | 81 | Alkyl silicate | 25 | Spray | E |
| 483 | 2.64 | 9.85 | 44.12 | 84.3 | 13.3 | 2.4 | 0 | Yes | 1.38 | 46 | Alkali silicate | 14 | Spray | E |
| 484 | 2.65 | 8.56 | 66.99 | 98.6 | 1.4 | 0 | 0 | No | 1.22 | 47 | Urethane resin | 112 | Spray | E |
| 485 | 2.94 | 8.21 | 43.38 | 76.45 | 23.5 | 0 | 0.05 | Yes | 1.14 | 48 | Alkali silicate | 24 | Spray | E |
| 486 | 2.58 | 8.33 | 39.75 | 91.1 | 8.9 | 0 | 0 | Yes | 1.13 | 51 | Urethane resin | 150 | Spray | E |
| 487 | 2.37 | 8 | 65.38 | 85.1 | 14.9 | 0 | 0 | Yes | 1.02 | 53 | Alkali silicate | 18 | Spray | E |
| 488 | 2.15 | 9.22 | 45.46 | 77.48 | 18.4 | 2.55 | 1.57 | Yes | 1.06 | 88 | Alkyl silicate | 19 | Brush | E |
| 489 | 2.96 | 9.36 | 22.55 | 97.9 | 2.1 | 0 | 0 | Yes | 1.05 | 85 | Alkyl silicate | 24 | Spray | E |
| 490 | 2.85 | 9.45 | 42.13 | 94.8 | 5.2 | 0 | 0 | Yes | 1.24 | 83 | Urethane resin | 99 | Spray | E |
| 491 | 2.94 | 9.61 | 38.50 | 84.6 | 15.4 | 0 | 0 | Yes | 1.33 | 82 | Alkyl silicate | 7 | Spray | E |
| 492 | 2.11 | 9.85 | 64.13 | 89.3 | 10.7 | 0 | 0 | Yes | 1.27 | 83 | Epoxy resin | 100 | Spray | E |
| 493 | 2.68 | 9.23 | 44.21 | 83.3 | 16.7 | 0 | 0 | Yes | 1.05 | 47 | Alkyl silicate | 27 | Brush | E |
| 494 | 2.99 | 9.08 | 39.51 | 80.05 | 19.6 | 0.35 | 0 | No | 1.12 | 51 | Alkali silicate | 15 | Spray | E |
| 495 | 1.82 | 9.87 | 78.64 | 85.5 | 14.5 | 0 | 0 | No | 1.23 | 52 | Alkyl silicate | 14 | Spray | E |
| 496 | 1.42 | 9.46 | 42.05 | 85 | 14.2 | 0 | 0.8 | No | 1.36 | 51 | Urethane resin | 55 | Spray | E |
| 497 | 2.12 | 9.28 | 64.58 | 87.3 | 12.7 | 0 | 0 | No | 1.11 | 52 | Alkyl silicate | 8 | Spray | E |
| 498 | 1.92 | 9.45 | 47.76 | 89.5 | 10.5 | 0 | 0 | Yes | 1.07 | 89 | Urethane resin | 122 | Brush | E |
| 499 | 2.11 | 9.63 | 24.10 | 87.3 | 11.8 | 0 | 0.9 | Yes | 1.42 | 85 | Alkyl silicate | 54 | Spray | E |
| 500 | 2.97 | 9.16 | 39.11 | 86.4 | 12.8 | 0.5 | 0.3 | Yes | 1.38 | 82 | Alkali silicate | 19 | Spray | E |

TABLE 27

| Invention Example No | Granularity distribution of Zn metal grains/ Zn alloy grains (peak grain diameter) (μm) Fine metal | Granularity distribution of Zn metal grains/ Zn alloy grains (peak grain diameter) (μm) Coarse metal | Percent of fine-grain metal grains among Zn metal grains/ Zn alloy grains (Vol %) | Chemical component content of Zn metal grains/Zn alloy grains (Mass %) Zn | Chemical component content of Zn metal grains/Zn alloy grains (Mass %) Mg | Chemical component content of Zn metal grains/Zn alloy grains (Mass %) Al | Chemical component content of Zn metal grains/Zn alloy grains (Mass %) Si | Zn alloy grain fracture surfaces or cracks present? | Ave aspect ratio | Total metal grain content of coat (Mass %) | Coating details Base resin type | Coat thickness (μm) | Coating method | Corrosion Test Results |
|---|---|---|---|---|---|---|---|---|---|---|---|---|---|---|
| 501 | 2.36 | 10.39 | 19.65 | 93.8 | 6.2 | 0 | 0 | Yes | 1.22 | 87 | Alkyl silicate | 25 | Brush | E |
| 502 | 3.05 | 10.56 | 65.39 | 83.8 | 16.2 | 0 | 0 | Yes | 1.14 | 88 | Alkyl silicate | 58 | Spray | E |
| 503 | 2.15 | 10.74 | 48.57 | 80.4 | 19.6 | 0 | 0 | Yes | 1.13 | 49 | Alkyl silicate | 21 | Spray | E |
| 504 | 2.19 | 10.27 | 24.91 | 87.6 | 12.4 | 0 | 0 | Yes | 1.02 | 50 | Alkali silicate | 19 | Brush | E |
| 505 | 2.48 | 11.5 | 39.92 | 89.3 | 10.7 | 0 | 0 | Yes | 1.06 | 51 | Urethane resin | 56 | Spray | E |
| 506 | 2.85 | 11.67 | 22.65 | 91.5 | 8.5 | 0 | 0 | Yes | 1.05 | 52 | Alkyl silicate | 77 | Spray | E |
| 507 | 2.75 | 11.85 | 66.20 | 94.9 | 5.1 | 0 | 0 | Yes | 1.24 | 53 | Alkyl silicate | 12 | Spray | E |
| 508 | 2.46 | 11.38 | 49.38 | 75.5 | 24.5 | 0 | 0 | Yes | 1.33 | 88 | Alkyl silicate | 64 | Spray | E |
| 509 | 2.71 | 12.61 | 30.58 | 86.5 | 13.5 | 0 | 0 | Yes | 1.27 | 85 | Alkyl silicate | 34 | Brush | E |
| 510 | 2.36 | 12.78 | 45.59 | 80 | 20 | 0 | 0 | Yes | 1.05 | 83 | Alkali silicate | 28 | Spray | E |
| 511 | 2.16 | 9.57 | 28.32 | 84.5 | 15.5 | 0 | 0 | Yes | 1.12 | 81 | Urethane resin | 109 | Brush | E |
| 512 | 2.46 | 9.81 | 71.87 | 88 | 10.5 | 1.5 | 0 | Yes | 1.23 | 80 | Alkyl silicate | 15 | Spray | E |
| 513 | 2.49 | 8.43 | 53.05 | 92.1 | 7.9 | 0 | 0 | Yes | 1.36 | 47 | Alkyl silicate | 14 | Spray | E |
| 514 | 2.95 | 8.55 | 27.74 | 95.2 | 4.8 | 0 | 0 | Yes | 1.11 | 49 | Alkyl silicate | 18 | Spray | E |
| 515 | 2.36 | 8.22 | 42.75 | 81.6 | 18.4 | 0 | 0 | Yes | 1.07 | 50 | Urethane resin | 122 | Brush | E |
| 516 | 2.21 | 9.44 | 23.29 | 86.8 | 12.7 | 0 | 0.5 | Yes | 1.42 | 51 | Alkyl silicate | 54 | Spray | E |
| 517 | 2.25 | 9.58 | 61.12 | 89.7 | 10.3 | 0 | 0 | No | 1.38 | 52 | Alkali silicate | 19 | Spray | E |
| 518 | 2.44 | 9.67 | 44.30 | 71.2 | 20.8 | 8 | 0 | Yes | 1.22 | 83 | Alkyl silicate | 25 | Brush | E |
| 519 | 2.78 | 9.83 | 23.96 | 97.5 | 2.5 | 0 | 0 | No | 1.14 | 88 | Alkyl silicate | 58 | Spray | E |
| 520 | 2.15 | 10.07 | 44.09 | 84.8 | 15.2 | 0 | 0 | Yes | 1.13 | 85 | Alkyl silicate | 21 | Spray | E |
| 521 | 2.19 | 9.45 | 24.63 | 80.8 | 19.2 | 0 | 0 | No | 1.02 | 83 | Alkali silicate | 19 | Brush | E |
| 522 | 2.48 | 9.3 | 62.46 | 78.7 | 13.5 | 7.8 | 0 | Yes | 1.06 | 82 | Urethane resin | 56 | Spray | E |

TABLE 28

| Invention Example No | Granularity distribution of Zn metal grains/ Zn alloy grains (peak grain diameter) (μm) Fine metal | Granularity distribution of Zn metal grains/ Zn alloy grains (peak grain diameter) (μm) Coarse metal | Percent of fine-grain metal grains among Zn metal grains/ Zn alloy grains (Vol %) | Chemical component content of Zn metal grains/Zn alloy grains (Mass %) Zn | Chemical component content of Zn metal grains/Zn alloy grains (Mass %) Mg | Chemical component content of Zn metal grains/Zn alloy grains (Mass %) Al | Chemical component content of Zn metal grains/Zn alloy grains (Mass %) Si | Zn alloy grain fracture surfaces or cracks present? | Ave aspect ratio | Total metal grain content of coat (Mass %) | Coating details Base resin type | Coat thickness (μm) | Coating method | Corrosion Test Results |
|---|---|---|---|---|---|---|---|---|---|---|---|---|---|---|
| 523 | 2.59 | 9.99 | 45.64 | 88.1 | 11.9 | 0 | 0 | No | 1.05 | 47 | Alkyl silicate | 77 | Spray | E |
| 524 | 2.47 | 9.58 | 25.30 | 88.5 | 10.6 | 0 | 0.9 | Yes | 1.24 | 46 | Alkyl silicate | 54 | Spray | E |
| 525 | 2.69 | 9.4 | 42.84 | 84.6 | 15.4 | 0 | 0 | Yes | 1.33 | 49 | Alkali silicate | 2 | Spray | G |
| 526 | 2.57 | 9.57 | 25.44 | 97.4 | 2.6 | 0 | 0 | Yes | 1.27 | 50 | Alkali silicate | 20 | Spray | E |
| 527 | 2.49 | 9.54 | 63.27 | 83.3 | 16.7 | 0 | 0 | Yes | 1.37 | 51 | Alkali silicate | 5 | Spray | G |
| 528 | 2.68 | 9.58 | 46.45 | 91.9 | 8.1 | 0 | 0 | Yes | 1.10 | 83 | Alkyl silicate | 20 | Spray | E |
| 529 | 2.35 | 9.25 | 46.45 | 86.3 | 13.7 | 0 | 0 | Yes | 1.04 | 82 | Alkali silicate | 15 | Brush | E |
| 530 | 2.48 | 10.04 | 50.91 | 81.5 | 18.5 | 0 | 0 | Yes | 1.02 | 88 | Alkyl silicate | 57 | Brush | E |
| 531 | 2.13 | 11.27 | 27.25 | 97.6 | 2.4 | 0 | 0 | Yes | 1.01 | 85 | Alkali silicate | 13 | Brush | E |
| 532 | 1.93 | 11.44 | 42.26 | 89.1 | 10.9 | 0 | 0 | Yes | 1.08 | 86 | Alkali silicate | 22 | Brush | E |
| 533 | 2.05 | 8.9 | 33.69 | 92.8 | 7.2 | 0 | 0 | Yes | 1.14 | 47 | Alkali silicate | 20 | Spray | E |
| 534 | 1.42 | 8.75 | 48.70 | 81.96 | 17.5 | 0.5 | 0.04 | No | 1.23 | 48 | Alkali silicate | 27 | Spray | E |
| 535 | 1.46 | 9.44 | 29.24 | 85.4 | 14.6 | 0 | 0 | No | 1.33 | 50 | Alkali silicate | 15 | Spray | E |
| 536 | 1.75 | 9.03 | 67.07 | 90.6 | 9.4 | 0 | 0 | Yes | 1.37 | 51 | Alkali silicate | 35 | Spray | E |
| 537 | 1.86 | 8.85 | 50.25 | 92.9 | 7.1 | 0 | 0 | Yes | 1.44 | 52 | Alkali silicate | 34 | Brush | E |
| 538 | 1.74 | 8.95 | 29.91 | 77.5 | 22.5 | 0 | 0 | Yes | 1.21 | 88 | Alkali silicate | 45 | Brush | E |
| 539 | 1.96 | 12.54 | 87.50 | 84.8 | 13.7 | 1.5 | 0 | No | 1.22 | 89 | Alkali silicate | 52 | Brush | E |
| 540 | 1.65 | 8.7 | 30.58 | 87.1 | 12.9 | 0 | 0 | No | 1.23 | 86 | Alkali silicate | 23 | Brush | E |
| 541 | 2.35 | 8.55 | 68.41 | 95.7 | 4.3 | 0 | 0 | Yes | 1.47 | 87 | Alkali silicate | 5 | Spray | E |
| 542 | 1.62 | 10.72 | 54.59 | 80.2 | 17.6 | 1 | 1.2 | No | 1.01 | 86 | Alkali silicate | 52 | Brush | E |
| 543 | 2.25 | 9.9 | 34.25 | 98.8 | 0.6 | 0.6 | 0 | Yes | 1.04 | 46 | Alkali silicate | 150 | Brush | E |
| 544 | 2.36 | 9.57 | 37.61 | 86.9 | 10.3 | 1.6 | 1.2 | Yes | 1.05 | 49 | Alkyl silicate | 60 | Brush | E |

TABLE 29

| Invention Example No | Granularity distribution of Zn metal grains/ Zn alloy grains (peak grain diameter) (μm) Fine metal | Coarse metal | Percent of fine-grain metal grains among Zn metal grains/ Zn alloy grains (Vol %) | Chemical component content of Zn metal grains/Zn alloy grains (Mass %) Zn | Mg | Al | Si | Zn alloy grain fracture surfaces or cracks present? | Ave aspect ratio | Total metal grain content of coat (Mass %) | Coating details Base resin type | Coat thickness (μm) | Coating method | Corrosion Test Results |
|---|---|---|---|---|---|---|---|---|---|---|---|---|---|---|
| 545 | 2.24 | 10.79 | 45.60 | 92.98 | 7 | 0.02 | 0 | Yes | 1.12 | 35 | Alkali silicate | 15 | Spray | E |
| 546 | 2.46 | 10.93 | 46.70 | 75.5 | 23.5 | 1 | 0 | Yes | 1.11 | 37 | Alkyl silicate | 24 | Spray | E |
| 547 | 1.56 | 11.02 | 41.22 | 82.5 | 17.5 | 0 | 0 | No | 1.08 | 36 | Alkali silicate | 34 | Spray | E |
| 548 | 1.24 | 11.18 | 45.68 | 80.1 | 12.4 | 7.5 | 0 | Yes | 1.47 | 38 | Alkyl silicate | 20 | Brush | E |
| 549 | 1.68 | 11.42 | 22.02 | 85.09 | 14.9 | 0 | 0.01 | Yes | 1.50 | 48 | Alkali silicate | 200 | Brush | E |
| 550 | 2.65 | 10.8 | 37.03 | 78.7 | 20.7 | 0 | 0.6 | No | 1.13 | 46 | Alkyl silicate | 56 | Brush | E |
| 551 | 2.22 | 10.65 | 28.46 | 91.29 | 8.6 | 0 | 0.11 | Yes | 1.26 | 51 | Alkali silicate | 34 | Brush | E |
| 552 | 2.45 | 11.34 | 43.47 | 85.8 | 14.2 | 0 | 0 | Yes | 1.14 | 46 | Alkyl silicate | 2 | Spray | G |
| 553 | 2.23 | 11.62 | 35.19 | 98.12 | 0.08 | 0 | 1.8 | Yes | 1.49 | 38 | Alkali silicate | 15 | Spray | E |
| 554 | 2.26 | 11.15 | 73.02 | 83.46 | 15.2 | 0 | 1.34 | No | 1.34 | 48 | Alkali silicate | 10 | Spray | E |
| 555 | 2.72 | 12.38 | 56.20 | 73.17 | 17.4 | 9 | 0.43 | Yes | 1.18 | 52 | Alkyl silicate | 125 | Brush | E |
| 556 | 2.13 | 12.55 | 35.86 | 98.6 | 0.8 | 0.6 | 0 | Yes | 1.17 | 30 | Alkali silicate | 24 | Brush | E |
| 557 | 1.98 | 9.34 | 93.45 | 93.55 | 6.4 | 0.05 | 0 | Yes | 1.48 | 76 | Alkyl silicate | 110 | Brush | E |
| 558 | 2.02 | 9.58 | 30.66 | 96.78 | 3.2 | 0.02 | 0 | No | 1.49 | 72 | Alkali silicate | 24 | Brush | E |
| 559 | 2.21 | 9.88 | 74.21 | 83 | 9.2 | 7.8 | 0 | Yes | 1.27 | 81 | Alkyl silicate | 2 | Spray | G |
| 560 | 2.55 | 10 | 55.39 | 70.92 | 19.2 | 9.88 | 0 | Yes | 1.17 | 64 | Alkali silicate | 37 | Spray | E |
| 561 | 1.92 | 10.67 | 30.08 | 80.25 | 15.1 | 4.65 | 0 | Yes | 1.16 | 69 | Alkyl silicate | 113 | Brush | E |
| 562 | 1.96 | 11.89 | 45.09 | 81.85 | 14.5 | 3.65 | 0 | Yes | 1.27 | 83 | Alkali silicate | 2 | Spray | G |
| 563 | 2.11 | 12.03 | 41.41 | 89.45 | 10.5 | 0.05 | 0 | Yes | 1.27 | 30 | Alkyl silicate | 75 | Brush | E |
| 564 | 2.97 | 12.12 | 17.75 | 87.3 | 7.5 | 5.2 | 0 | Yes | 1.49 | 83 | Alkali silicate | 30 | Brush | E |
| 565 | 2.36 | 12.28 | 32.76 | 93.9 | 6.1 | 0 | 0.001 | Yes | 1.29 | 75 | Alkyl silicate | 34 | Brush | E |
| 566 | 3.05 | 12.52 | 30.89 | 82.55 | 16.8 | 0.05 | 0.6 | Yes | 1.23 | 76 | Epoxy resin | 124 | Brush | E |

TABLE 30

| Invention Example No | Granularity distribution of Zn metal grains/ Zn alloy grains (peak grain diameter) (μm) Fine metal | Coarse metal | Percent of fine-grain metal grains among Zn metal grains/ Zn alloy grains (Vol %) | Chemical component content of Zn metal grains/Zn alloy grains (Mass %) Zn | Mg | Al | Si | Zn alloy grain fracture surfaces or cracks present? | Ave aspect ratio | Total metal grain content of coat (Mass %) | Coating details Base resin type | Coat thickness (μm) | Coating method | Corrosion Test Results |
|---|---|---|---|---|---|---|---|---|---|---|---|---|---|---|
| 567 | 2.57 | 11.9 | 45.90 | 70.7 | 27.5 | 1 | 0.8 | Yes | 1.23 | 72 | Acrylic resin | 15 | Spray | E |
| 568 | 2.65 | 11.75 | 42.22 | 94.6 | 2.9 | 0 | 2.5 | Yes | 1.23 | 71 | Urethane resin | 23 | Spray | E |
| 569 | 2.54 | 12.44 | 18.56 | 94 | 4.5 | 0 | 1.5 | No | 1.23 | 82 | Polyester resin | 157 | Brush | E |
| 570 | 2.85 | 12.03 | 33.57 | 99.43 | 0.07 | 0 | 0.5 | Yes | 1.27 | 81 | Epoxy resin | 26 | Spray | E |
| 571 | 2.75 | 10.61 | 31.70 | 96.82 | 3.1 | 0.04 | 0.04 | Yes | 1.23 | 83 | Acrylic resin | 38 | Spray | E |
| 572 | 2.46 | 11.3 | 46.71 | 76.3 | 20.5 | 1 | 2.2 | Yes | 1.36 | 50 | Urethane resin | 160 | Brush | E |
| 573 | 2.71 | 11.58 | 47.89 | 68.84 | 29.5 | 0.06 | 1.6 | Yes | 1.11 | 72 | Polyester resin | 27 | Brush | E |
| 574 | 2.36 | 11.11 | 24.23 | 92.33 | 7.6 | 0.07 | 0 | Yes | 1.02 | 47 | Epoxy resin | 180 | Brush | E |
| 575 | 2.16 | 12.34 | 39.24 | 95.2 | 0.7 | 1.2 | 2.9 | Yes | 1.05 | 47 | Acrylic resin | 26 | Spray | E |
| 576 | 2.46 | 12.51 | 37.37 | 91.8 | 4.6 | 1.8 | 1.8 | Yes | 1.24 | 52 | Urethane resin | 180 | Brush | E |
| 577 | 2.49 | 11.64 | 50.38 | 82 | 8.3 | 9.2 | 0.5 | Yes | 1.33 | 52 | Polyester resin | 15 | Spray | E |
| 578 | 1.63 | 9.16 | 37.14 | 88.2 | 11.8 | 0 | 0 | Yes | 1.27 | 50 | Epoxy resin | 2 | Spray | G |
| 579 | 1.51 | 9.46 | 13.48 | 86.06 | 12.9 | 0 | 1.04 | Yes | 1.50 | 46 | Acrylic resin | 28 | Spray | E |
| 580 | 3.05 | 9.54 | 40.05 | 99.34 | 0.6 | 0 | 0.06 | Yes | 1.13 | 47 | Urethane resin | 30 | Spray | E |
| 581 | 2.57 | 9.56 | 38.18 | 89.51 | 9.5 | 0 | 0.99 | No | 1.04 | 83 | Polyester resin | 2 | Spray | G |
| 582 | 2.65 | 9.46 | 7.63 | 88.3 | 11.7 | 0 | 0 | Yes | 1.02 | 52 | Epoxy resin | 157 | Brush | E |
| 583 | 2.54 | 11.99 | 37.95 | 89.9 | 9.4 | 0.7 | 0 | Yes | 1.08 | 89 | Acrylic resin | 28 | Brush | E |
| 584 | 2.85 | 12.08 | 14.29 | 87.8 | 11.7 | 0.5 | 0 | Yes | 1.15 | 85 | Alkyl silicate | 130 | Brush | E |
| 585 | 2.75 | 12.24 | 40.86 | 95.6 | 4.2 | 0.2 | 0 | Yes | 1.34 | 53 | Alkyl silicate | 29 | Brush | E |
| 586 | 2.46 | 12.48 | 97.50 | 97.13 | 2.8 | 0.07 | 0 | Yes | 1.25 | 88 | Epoxy resin | 30 | Brush | E |
| 587 | 2.71 | 11.86 | 13.30 | 86.1 | 13.9 | 0 | 0 | Yes | 1.19 | 85 | Acrylic resin | 120 | Brush | E |
| 588 | 2.36 | 11.71 | 43.62 | 82.6 | 14.6 | 1.6 | 1.2 | No | 1.18 | 82 | Urethane resin | 187 | Brush | E |

TABLE 31

| Invention Example No | Granularity distribution of Zn metal grains/ Zn alloy grains (peak grain diameter) (μm) | | Percent of fine-grain metal grains among Zn metal grains/ Zn alloy grains (Vol %) | Chemical component content of Zn metal grains/Zn alloy grains (Mass %) | | | | Zn alloy grain fracture surfaces or cracks present? | Ave aspect ratio | Total metal grain content of coat (Mass %) | Coating details | | | Corrosion Test Results |
|---|---|---|---|---|---|---|---|---|---|---|---|---|---|---|
| | Fine metal | Coarse metal | | Zn | Mg | Al | Si | | | | Base resin type | Coat thickness (μm) | Coating method | |
| 589 | 2.46 | 11.35 | 56.93 | 72.95 | 26.4 | 0.65 | 0 | Yes | 1.24 | 83 | Polyester resin | 28 | Spray | E |
| 590 | 1.45 | 12.02 | 36.59 | 83.23 | 16.5 | 0.27 | 0 | Yes | 1.11 | 88 | Epoxy resin | 5 | Spray | E |
| 591 | 2.42 | 13.24 | 39.95 | 79.4 | 19.5 | 0.45 | 0.65 | Yes | 1.27 | 49 | Acrylic resin | 35 | Spray | E |
| 592 | 2.11 | 9.46 | 86.50 | 97.08 | 1.6 | 0.33 | 0.99 | Yes | 1.31 | 50 | Urethane resin | 5 | Spray | G |
| 593 | 2.97 | 13.47 | 32.87 | 90.5 | 6 | 1 | 2.5 | Yes | 1.26 | 51 | Polyester resin | 200 | Brush | E |
| 594 | 2.36 | 9.46 | 16.23 | 88.93 | 8.4 | 0.87 | 1.8 | Yes | 1.14 | 83 | Alkali silicate | 25 | Spray | E |
| 595 | 3.05 | 13.87 | 37.40 | 86.7 | 13.3 | 0 | 0 | Yes | 1.34 | 82 | Alkali silicate | 15 | Spray | E |
| 596 | 2.57 | 13.25 | 40.76 | 81.4 | 18.6 | 0. | 0 | Yes | 1.16 | 88 | Alkyl silicate | 20 | Spray | E |
| 597 | 2.65 | 13.1 | 87.31 | 97.34 | 1.8 | 0.86 | 0 | No | 1.47 | 85 | Alkali silicate | 18 | Spray | E |
| 598 | 2.12 | 9.08 | 92.50 | 95.25 | 4.1 | 0.65 | 0 | Yes | 1.48 | 87 | Alkyl silicate | 22 | Spray | E |
| 599 | 1.65 | 9.87 | 17.93 | 82.87 | 16.7 | 0.43 | 0 | No | 1.49 | 86 | Alkali silicate | 19 | Spray | E |
| 600 | 2.35 | 9.46 | 44.50 | 99 | 0.4 | 0.6 | 0 | Yes | 1.34 | 46 | Alkyl silicate | 29 | Spray | E |
| 601 | 1.63 | 9.28 | 96.50 | 89.35 | 10.6 | 0.05 | 0 | Yes | 1.29 | 49 | Alkali silicate | 23 | Spray | E |
| 602 | 2.64 | 9.45 | 16.94 | 93.08 | 6.9 | 0.02 | 0 | Yes | 1.18 | 35 | Alkyl silicate | 21 | Spray | E |
| 603 | 2.35 | 9.25 | 88.12 | 99.82 | 0.05 | 0.06 | 0.07 | Yes | 1.48 | 30 | Alkali silicate | 19 | Spray | E |
| 604 | 2.31 | 9.46 | 60.57 | 91.56 | 6.4 | 1.05 | 0.99 | Yes | 1.27 | 76 | Alkali silicate | 15 | Spray | E |
| 605 | 2.62 | 9.46 | 39.48 | 93.36 | 3.5 | 2.6 | 0.54 | Yes | 1.17 | 72 | Alkali silicate | 18 | Spray | E |
| 606 | 2.52 | 9.46 | 15.82 | 82.13 | 17.5 | 0.05 | 0.32 | Yes | 1.27 | 30 | Alkyl silicate | 22 | Spray | E |
| 607 | 2.24 | 13.32 | 49.57 | 91.2 | 3.6 | 5.2 | 0 | No | 1.27 | 83 | Alkyl silicate | 21 | Spray | E |
| 608 | 0.05 | 6.54 | 86.52 | 94.1 | 5.9 | 0 | 0.001 | Yes | 1.48 | 75 | Alkyl silicate | 29 | Spray | E |
| 609 | 2.42 | 6.35 | 90.98 | 83.2 | 16.2 | 0 | 0.6 | No | 1.49 | 76 | Alkali silicate | 23 | Spray | E |
| 610 | 0.11 | 7.54 | 67.32 | 76.7 | 22.5 | 0 | 0.8 | Yes | 1.34 | 72 | Alkyl silicate | 21 | Spray | E |

TABLE 32

| Invention Example No | Granularity distribution of Zn metal grains/ Zn alloy grains (peak grain diameter) (μm) | | Percent of fine-grain metal grains among Zn metal grains/ Zn alloy grains (Vol %) | Chemical component content of Zn metal grains/Zn alloy grains (Mass %) | | | | Zn alloy grain fracture surfaces or cracks present? | Ave aspect ratio | Total metal grain content of coat (Mass %) | Coating details | | | Corrosion Test Results |
|---|---|---|---|---|---|---|---|---|---|---|---|---|---|---|
| | Fine metal | Coarse metal | | Zn | Mg | Al | Si | | | | Base resin type | Coat thickness (μm) | Coating method | |
| 611 | 1.92 | 8.64 | 82.33 | 96.52 | 3.4 | 0.04 | 0.04 | Yes | 1.23 | 83 | Alkali silicate | 19 | Spray | E |
| 612 | 0.46 | 6.45 | 73.76 | 68.3 | 26.5 | 3 | 2.2 | Yes | 1.23 | 50 | Alkyl silicate | 21 | Spray | E |
| 613 | 0.77 | 6.48 | 88.77 | 72.84 | 25.5 | 0.06 | 1.6 | Yes | 1.23 | 72 | Alkali silicate | 19 | Spray | E |
| 614 | 2.35 | 9.25 | 45.02 | 87.2 | 12.8 | 0 | 0 | Yes | 1.05 | 50 | Acrylic resin | 654 | Spray | E |
| 615 | 2.33 | 9.46 | 15.2 | 91.5 | 8.5 | 0 | 0 | Yes | 1.06 | 48 | Alkali silicate | 700 | Spray | E |
| 616 | 1.95 | 9.32 | 51.41 | 75.23 | 24.5 | 0.27 | 0 | Yes | 1.38 | 75 | Alkyl silicate | 555 | Spray | E |
| 617 | 2.15 | 9.22 | 45.46 | 77.48 | 18.4 | 2.55 | 1.57 | Yes | 1.06 | 55 | Alkyl silicate | 321 | Spray | E |
| 618 | 2.23 | 11.62 | 35.19 | 72.62 | 0.08 | 25.5 | 1.8 | Yes | 1.49 | 38 | Alkyl silicate | 152 | Brush | E |
| 619 | 2.26 | 11.15 | 73.02 | 64.06 | 15.2 | 19.4 | 1.34 | No | 1.34 | 48 | Urethane resin | 674 | Spray | E |
| 620 | 1.98 | 9.34 | 93.45 | 83 | 6.4 | 10.6 | 0 | Yes | 1.48 | 76 | Polyester resin | 325 | Spray | E |
| 621 | 2.02 | 9.58 | 30.66 | 86.4 | 3.2 | 10.4 | 0 | No | 1.49 | 72 | Alkyl silicate | 665 | Spray | E |
| 622 | 2.36 | 12.28 | 32.76 | 80.4 | 6.1 | 13.5 | 0.001 | Yes | 1.29 | 75 | Alkyl silicate | 354 | Brush | E |
| 623 | 3.05 | 12.52 | 30.89 | 70.1 | 16.8 | 12.5 | 0.6 | Yes | 1.23 | 76 | Alkyl silicate | 165 | Spray | E |
| 624 | 2.57 | 11.9 | 45.9 | 60.9 | 27.5 | 10.8 | 0.8 | Yes | 1.23 | 72 | Urethane resin | 354 | Spray | E |

TABLE 33

| Invention Example No | Granularity distribution of Zn metal grains/ Zn alloy grains (Ave grain diameter) (μm) Fine metal | Granularity distribution of Zn metal grains/ Zn alloy grains (Ave grain diameter) (μm) Coarse metal | Percent of fine-grain metal grains among Zn metal grains/ Zn alloy grains (Vol %) | Chemical component content of Zn metal grains/Zn alloy grains (Mass %) Zn | Chemical component content of Zn metal grains/Zn alloy grains (Mass %) Mg | Chemical component content of Zn metal grains/Zn alloy grains (Mass %) Al | Chemical component content of Zn metal grains/Zn alloy grains (Mass %) Si | Zn alloy grain fracture surfaces or cracks present? | Ave aspect ratio | Coating details Total metal grain content of coat (Mass %) | Coating details Base resin type | Coating details Coat thickness (μm) | Coating details Coating method | Corrosion Test Results |
|---|---|---|---|---|---|---|---|---|---|---|---|---|---|---|
| 625 | 2.65 | 9.56 | 5.66 | 100 | 0 | 0 | 0 | N | — | 35 | Alkali silicate | 2 | Spray | G |
| 626 | 0.05 | 6.5 | 16.55 | 100 | 0 | 0 | 0 | N | — | 66 | Alkyl silicate | 37 | Spray | E |
| 627 | 4.6 | 65.5 | 21.55 | 100 | 0 | 0 | 0 | N | — | 38 | Alkali silicate | 12 | Spray | E |
| 628 | 3.56 | 13.5 | 5.66 | 100 | 0 | 0 | 0 | N | — | 84 | Alkyl silicate | 160 | Brush | E |
| 629 | 4.55 | 16.7 | 33.66 | 100 | 0 | 0 | 0 | N | — | 39 | Alkali silicate | 5 | Brush | G |
| 630 | 2.15 | 9.89 | 45.65 | 100 | 0 | 0 | 0 | N | — | 85 | Alkyl silicate | 12 | Brush | E |
| 631 | 3.22 | 10.55 | 49.88 | 100 | 0 | 0 | 0 | N | — | 36 | Alkali silicate | 2 | Spray | G |
| 632 | 2.99 | 9.64 | 42.33 | 100 | 0 | 0 | 0 | N | — | 56 | Alkyl silicate | 18 | Spray | E |
| 633 | 3.65 | 11.22 | 65.44 | 100 | 0 | 0 | 0 | N | — | 42 | Alkyl silicate | 23 | Spray | E |
| 634 | 4.55 | 13.5 | 77.55 | 100 | 0 | 0 | 0 | N | — | 31 | Epoxy resin | 30 | Brush | E |
| 635 | 3.57 | 22.5 | 96.55 | 100 | 0 | 0 | 0 | N | — | 88 | Acrylic resin | 77 | Brush | E |
| 636 | 1.99 | 8.56 | 5.97 | 100 | 0 | 0 | 0 | N | — | 78 | Urethane resin | 254 | Brush | E |
| 637 | 2.12 | 9.46 | 87.77 | 100 | 0 | 0 | 0 | N | — | 36 | Polyester resin | 47 | Spray | E |
| 638 | 2.45 | 11.1 | 86.55 | 100 | 0 | 0 | 0 | N | — | 37 | Epoxy resin | 43 | Spray | E |
| 639 | 1.85 | 8.92 | 15.67 | 100 | 0 | 0 | 0 | N | — | 45 | Acrylic resin | 322 | Brush | E |
| 640 | 1.65 | 9.23 | 31.55 | 100 | 0 | 0 | 0 | N | — | 68 | Urethane resin | 20 | Brush | E |
| 641 | 2.45 | 9.05 | 26.76 | 100 | 0 | 0 | 0 | N | — | 79 | Polyester resin | 700 | Brush | E |
| 642 | 2.01 | 10.91 | 67.89 | 100 | 0 | 0 | 0 | N | — | 47 | Alkali silicate | 22 | Spray | E |
| 643 | 1.99 | 11.12 | 56.89 | 100 | 0 | 0 | 0 | N | — | 56 | Alkyl silicate | 25 | Spray | E |
| 644 | 2.38 | 10.93 | 45.67 | 100 | 0 | 0 | 0 | N | — | 37 | Alkali silicate | 14 | Spray | E |

TABLE 34

| Invention Example No | Granularity distribution of Zn metal grains/ Zn alloy grains (Ave grain diameter) (μm) Fine metal | Granularity distribution of Zn metal grains/ Zn alloy grains (Ave grain diameter) (μm) Coarse metal | Percent of fine-grain metal grains among Zn metal grains/ Zn alloy grains (Vol %) | Chemical component content of Zn metal grains/Zn alloy grains (Mass %) Zn | Chemical component content of Zn metal grains/Zn alloy grains (Mass %) Mg | Chemical component content of Zn metal grains/Zn alloy grains (Mass %) Al | Chemical component content of Zn metal grains/Zn alloy grains (Mass %) Si | Zn alloy grain fracture surfaces or cracks present? | Ave aspect ratio | Coating details Total metal grain content of coat (Mass %) | Coating details Base resin type | Coating details Coat thickness (μm) | Coating details Coating method | Corrosion Test Results |
|---|---|---|---|---|---|---|---|---|---|---|---|---|---|---|
| 645 | 2.49 | 9.34 | 34.67 | 100 | 0 | 0 | 0 | No | — | 90 | Urethane resin | 112 | Spray | E |
| 646 | 2.34 | 8.77 | 95.66 | 100 | 0 | 0 | 0 | No | — | 43 | Alkali silicate | 554 | Spray | E |
| 647 | 3.99 | 27.60 | 34.21 | 100 | 0 | 0 | 0 | No | — | 38 | Urethane resin | 150 | Spray | E |
| 648 | 1.02 | 21.90 | 7.88 | 100 | 0 | 0 | 0 | No | — | 56 | Alkali silicate | 18 | Spray | E |
| 649 | 0.05 | 22.50 | 92.32 | 100 | 0 | 0 | 0 | No | — | 89 | Alkyl silicate | 657 | Brush | E |
| 650 | 2.01 | 17.50 | 11.22 | 100 | 0 | 0 | 0 | No | — | 32 | Alkyl silicate | 24 | Spray | E |
| 651 | 1.51 | 6.99 | 55.66 | 100 | 0 | 0 | 0 | No | — | 55 | Urethane resin | 99 | Spray | E |
| 652 | 2.38 | 7.65 | 78.99 | 100 | 0 | 0 | 0 | No | — | 79 | Alkyl silicate | 7 | Spray | E |
| 653 | 1.99 | 8.56 | 5.97 | 100 | 0 | 0 | 0 | No | — | 78 | Epoxy resin | 100 | Spray | E |
| 654 | 2.49 | 9.34 | 34.67 | 100 | 0 | 0 | 0 | No | — | 77 | Alkyl silicate | 27 | Brush | E |
| 655 | 1.02 | 21.9 | 7.88 | 100 | 0 | 0 | 0 | No | — | 56 | Alkali silicate | 15 | Spray | E |
| 656 | 2.35 | 9.25 | 35.87 | 88.8 | 11.2 | 0 | 0 | Yes | 1.12 | 49 | Alkyl silicate | 14 | Spray | E |
| 657 | 2.57 | 9.56 | 42.04 | 90.6 | 9.4 | 0 | 0 | No | 1.38 | 89 | Urethane resin | 55 | Spray | E |
| 658 | 2.56 | 9.84 | 6.55 | 81.45 | 18.5 | 0 | 0.05 | Yes | 1.22 | 90 | Alkyl silicate | 8 | Spray | E |
| 659 | 2.21 | 9.75 | 43.60 | 99.97 | 0.03 | 0 | 0 | Yes | 1.14 | 86 | Urethane resin | 122 | Brush | E |
| 660 | 2.64 | 9.85 | 44.12 | 98.4 | 1.6 | 0 | 0 | No | 1.02 | 48 | Alkali silicate | 555 | Spray | E |
| 661 | 1.99 | 8.56 | 37.21 | 93.2 | 6.8 | 0 | 0 | No | 1.05 | 47 | Alkali silicate | 19 | Spray | E |
| 662 | 2.94 | 8.21 | 43.38 | 84.5 | 13.9 | 0 | 1.6 | No | 1.36 | 47 | Alkyl silicate | 25 | Brush | E |
| 663 | 2.58 | 8.33 | 13.52 | 98.1 | 1.9 | 0 | 0 | Yes | 1.11 | 47 | Alkyl silicate | 58 | Spray | E |
| 664 | 2.37 | 8.00 | 44.94 | 94.3 | 5.7 | 0 | 0 | No | 1.07 | 52 | Alkyl silicate | 685 | Spray | E |

TABLE 35

| Invention Example No | Granularity distribution of Zn metal grains/ Zn alloy grains (Ave grain diameter) (μm) Fine metal | Granularity distribution of Zn metal grains/ Zn alloy grains (Ave grain diameter) (μm) Coarse metal | Percent of fine-grain metal grains among Zn metal grains/ Zn alloy grains (Vol %) | Chemical component content of Zn metal grains/Zn alloy grains (Mass %) Zn | Chemical component content of Zn metal grains/Zn alloy grains (Mass %) Mg | Chemical component content of Zn metal grains/Zn alloy grains (Mass %) Al | Chemical component content of Zn metal grains/Zn alloy grains (Mass %) Si | Zn alloy grain fracture surfaces or cracks present? | Ave aspect ratio | Coating details Total metal grain content of coat (Mass %) | Coating details Base resin type | Coating details Coat thickness (μm) | Coating details Coating method | Corrosion Test Results |
|---|---|---|---|---|---|---|---|---|---|---|---|---|---|---|
| 665 | 2.15 | 9.22 | 45.46 | 90.8 | 9.2 | 0 | 0 | No | 1.42 | 52 | Alkali silicate | 19 | Brush | E |
| 666 | 2.96 | 9.36 | 35.96 | 83.3 | 15.4 | 0 | 1.3 | Yes | 1.38 | 52 | Urethane resin | 700 | Spray | E |
| 667 | 2.85 | 9.45 | 42.13 | 79.84 | 18.6 | 0 | 1.56 | Yes | 1.22 | 88 | Alkyl silicate | 77 | Spray | E |
| 668 | 2.94 | 9.61 | 7.56 | 96.4 | 3.6 | 0 | 0 | Yes | 1.14 | 87 | Alkyl silicate | 54 | Spray | E |
| 669 | 2.11 | 9.85 | 43.69 | 94.6 | 5.4 | 0 | 0 | Yes | 1.13 | 89 | Alkyl silicate | 64 | Spray | E |
| 670 | 2.68 | 9.23 | 44.21 | 92.4 | 7.6 | 0 | 0 | Yes | 1.02 | 90 | Alkyl silicate | 34 | Brush | E |
| 671 | 2.99 | 9.08 | 39.51 | 75.5 | 24.5 | 0 | 0 | Yes | 1.06 | 91 | Alkali silicate | 28 | Spray | E |
| 672 | 2.78 | 9.87 | 45.68 | 82.4 | 17.6 | 0 | 0 | Yes | 1.05 | 46 | Urethane resin | 109 | Brush | E |
| 673 | 2.96 | 9.46 | 65.58 | 98.6 | 1.4 | 0 | 0 | Yes | 1.24 | 47 | Alkyl silicate | 15 | Spray | E |
| 674 | 2.85 | 9.28 | 47.24 | 78.5 | 21.5 | 0 | 0 | Yes | 1.33 | 47 | Alkyl silicate | 14 | Spray | E |
| 675 | 2.64 | 9.45 | 47.76 | 89.6 | 10.4 | 0 | 0 | Yes | 1.27 | 49 | Alkyl silicate | 18 | Spray | E |
| 676 | 2.35 | 9.25 | 45.02 | 87.2 | 12.8 | 0 | 0 | Yes | 1.05 | 50 | Alkali silicate | 2 | Spray | G |
| 677 | 2.12 | 9.46 | 47.02 | 92.2 | 7.8 | 0 | 0 | Yes | 1.22 | 87 | Alkyl silicate | 37 | Spray | E |
| 678 | 2.34 | 9.46 | 7.66 | 70.5 | 29.5 | 0 | 0 | Yes | 1.13 | 83 | Alkali silicate | 12 | Spray | E |
| 679 | 2.33 | 9.46 | 15.20 | 91.5 | 8.5 | 0 | 0 | Yes | 1.06 | 48 | Alkali silicate | 160 | Spray | E |
| 680 | 2.23 | 9.06 | 43.16 | 74.5 | 25.5 | 0 | 0 | Yes | 1.05 | 51 | Alkali silicate | 5 | Brush | G |
| 681 | 2.12 | 9.3 | 49.33 | 99.93 | 0.07 | 0 | 0 | Yes | 1.24 | 51 | Alkyl silicate | 56 | Brush | E |
| 682 | 2.21 | 8.68 | 19.47 | 89.2 | 10.8 | 0 | 0 | No | 1.05 | 87 | Alkali silicate | 2 | Spray | G |
| 683 | 1.38 | 8.53 | 69.55 | 86 | 11.2 | 1.6 | 1.2 | No | 1.12 | 85 | Alkyl silicate | 18 | Spray | E |
| 684 | 1.95 | 9.32 | 51.41 | 75.23 | 24.5 | 0.27 | 0 | Yes | 1.38 | 86 | Alkyl silicate | 23 | Spray | E |

TABLE 36

| Invention Example No | Granularity distribution of Zn metal grains/ Zn alloy grains (Ave grain diameter) (μm) Fine metal | Granularity distribution of Zn metal grains/ Zn alloy grains (Ave grain diameter) (μm) Coarse metal | Percent of fine-grain metal grains among Zn metal grains/ Zn alloy grains (Vol %) | Chemical component content of Zn metal grains/Zn alloy grains (Mass %) Zn | Chemical component content of Zn metal grains/Zn alloy grains (Mass %) Mg | Chemical component content of Zn metal grains/Zn alloy grains (Mass %) Al | Chemical component content of Zn metal grains/Zn alloy grains (Mass %) Si | Zn alloy grain fracture surfaces or cracks present? | Ave aspect ratio | Coating details Total metal grain content of coat (Mass %) | Coating details Base resin type | Coating details Coat thickness (μm) | Coating details Coating method | Corrosion Test Results |
|---|---|---|---|---|---|---|---|---|---|---|---|---|---|---|
| 686 | 2.05 | 12.54 | 48.08 | 98.7 | 1.3 | 0 | 0 | Yes | 1.33 | 51 | Acrylic resin | 77 | Brush | E |
| 687 | 1.65 | 8.7 | 66.85 | 80.5 | 19.5 | 0 | 0 | Yes | 1.27 | 51 | Urethane resin | 655 | Brush | E |
| 688 | 2.35 | 8.55 | 7.68 | 88.85 | 10.8 | 0.05 | 0.3 | No | 1.23 | 80 | Polyester resin | 47 | Spray | E |
| 689 | 1.62 | 8.91 | 8.64 | 87.7 | 11.9 | 0.4 | 0 | Yes | 1.11 | 46 | Epoxy resin | 43 | Spray | E |
| 690 | 1.88 | 9.91 | 16.58 | 90.5 | 9.5 | 0 | 0 | Yes | 1.42 | 51 | Acrylic resin | 52 | Brush | E |
| 691 | 2.35 | 9.25 | 35.87 | 89.5 | 10.5 | 0 | 0 | Yes | 1.06 | 86 | Urethane resin | 20 | Brush | E |
| 692 | 2.57 | 9.56 | 42.04 | 84.9 | 15.1 | 0 | 0 | Yes | 1.05 | 85 | Polyester resin | 200 | Brush | E |
| 693 | 2.56 | 9.84 | 38.41 | 83.2 | 16.8 | 0 | 0 | Yes | 1.07 | 82 | Alkali silicate | 22 | Spray | E |
| 694 | 2.21 | 9.75 | 6.99 | 89.4 | 10.6 | 0 | 0 | Yes | 1.42 | 81 | Alkyl silicate | 25 | Spray | E |
| 695 | 2.64 | 9.85 | 44.12 | 84.3 | 13.3 | 2.4 | 0 | Yes | 1.38 | 46 | Alkali silicate | 14 | Spray | E |
| 696 | 2.65 | 8.56 | 66.99 | 98.6 | 1.4 | 0 | 0 | No | 1.22 | 47 | Urethane resin | 112 | Spray | E |
| 697 | 2.94 | 8.21 | 43.38 | 76.45 | 23.5 | 0 | 0.05 | Yes | 1.14 | 48 | Alkali silicate | 24 | Spray | E |
| 698 | 2.58 | 8.33 | 39.75 | 91.1 | 8.9 | 0 | 0 | Yes | 1.13 | 51 | Urethane resin | 150 | Spray | E |
| 699 | 2.37 | 8 | 65.38 | 85.1 | 14.9 | 0 | 0 | Yes | 1.02 | 53 | Alkali silicate | 18 | Spray | E |
| 700 | 2.15 | 9.22 | 45.46 | 77.48 | 18.4 | 2.55 | 1.57 | Yes | 1.06 | 88 | Alkyl silicate | 19 | Brush | E |
| 701 | 2.96 | 9.36 | 22.55 | 97.9 | 2.1 | 0 | 0 | Yes | 1.05 | 85 | Alkyl silicate | 24 | Spray | E |
| 702 | 2.85 | 9.45 | 42.13 | 94.8 | 5.2 | 0 | 0 | Yes | 1.24 | 83 | Urethane resin | 99 | Spray | E |
| 703 | 2.94 | 9.61 | 38.50 | 84.6 | 15.4 | 0 | 0 | Yes | 1.33 | 82 | Alkyl silicate | 7 | Spray | E |
| 704 | 2.11 | 9.85 | 64.13 | 89.3 | 10.7 | 0 | 0 | Yes | 1.27 | 83 | Epoxy resin | 100 | Spray | E |
| 705 | 2.68 | 9.23 | 44.21 | 83.3 | 16.7 | 0 | 0 | Yes | 1.05 | 47 | Alkyl silicate | 27 | Brush | E |

TABLE 37

| Invention Example No | Granularity distribution of Zn metal grains/ Zn alloy grains (Ave grain diameter) (μm) Fine metal | Granularity distribution of Zn metal grains/ Zn alloy grains (Ave grain diameter) (μm) Coarse metal | Percent of fine-grain metal grains among Zn metal grains/ Zn alloy grains (Vol %) | Chemical component content of Zn metal grains/Zn alloy grains (Mass %) Zn | Chemical component content of Zn metal grains/Zn alloy grains (Mass %) Mg | Chemical component content of Zn metal grains/Zn alloy grains (Mass %) Al | Chemical component content of Zn metal grains/Zn alloy grains (Mass %) Si | Zn alloy grain fracture surfaces or cracks present? | Ave aspect ratio | Coating details Total metal grain content of coat (Mass %) | Coating details Base resin type | Coating details Coat thickness (μm) | Coating details Coating method | Corrosion Test Results |
|---|---|---|---|---|---|---|---|---|---|---|---|---|---|---|
| 706 | 2.99 | 9.08 | 39.51 | 80.05 | 19.6 | 0.35 | 0 | No | 1.12 | 51 | Alkali silicate | 15 | Spray | E |
| 707 | 1.82 | 9.87 | 78.64 | 85.5 | 14.5 | 0 | 0 | No | 1.23 | 52 | Alkyl silicate | 14 | Spray | E |
| 708 | 1.42 | 9.46 | 42.05 | 85 | 14.2 | 0 | 0.8 | No | 1.36 | 51 | Urethane resin | 55 | Spray | E |
| 709 | 2.12 | 9.28 | 64.58 | 87.3 | 12.7 | 0 | 0 | No | 1.11 | 52 | Alkyl silicate | 8 | Spray | E |
| 710 | 1.92 | 9.45 | 47.76 | 89.5 | 10.5 | 0 | 0 | Yes | 1.07 | 89 | Urethane resin | 122 | Brush | E |
| 711 | 2.11 | 9.63 | 24.10 | 87.3 | 11.8 | 0 | 0.9 | Yes | 1.42 | 85 | Alkyl silicate | 54 | Spray | E |
| 712 | 2.97 | 9.16 | 39.11 | 86.4 | 12.8 | 0.5 | 0.3 | Yes | 1.38 | 82 | Alkali silicate | 19 | Spray | E |
| 713 | 2.36 | 10.39 | 19.65 | 93.8 | 6.2 | 0 | 0 | Yes | 1.22 | 87 | Alkyl silicate | 25 | Brush | E |
| 714 | 3.05 | 10.56 | 65.39 | 83.8 | 16.2 | 0 | 0 | Yes | 1.14 | 88 | Alkyl silicate | 58 | Spray | E |
| 715 | 2.15 | 10.74 | 48.57 | 80.4 | 19.6 | 0 | 0 | Yes | 1.13 | 49 | Alkyl silicate | 21 | Spray | E |
| 716 | 2.19 | 10.27 | 24.91 | 87.6 | 12.4 | 0 | 0 | Yes | 1.02 | 50 | Alkali silicate | 19 | Brush | E |
| 717 | 2.48 | 11.5 | 39.92 | 89.3 | 10.7 | 0 | 0 | Yes | 1.06 | 51 | Urethane resin | 56 | Spray | E |
| 718 | 2.85 | 11.67 | 22.65 | 91.5 | 8.5 | 0 | 0 | Yes | 1.05 | 52 | Alkyl silicate | 77 | Spray | E |
| 719 | 2.75 | 11.85 | 66.20 | 94.9 | 5.1 | 0 | 0 | Yes | 1.24 | 53 | Alkyl silicate | 12 | Spray | E |
| 720 | 2.46 | 11.38 | 49.38 | 75.5 | 24.5 | 0 | 0 | Yes | 1.33 | 88 | Alkyl silicate | 64 | Spray | E |
| 721 | 2.71 | 12.61 | 30.58 | 86.5 | 13.5 | 0 | 0 | Yes | 1.27 | 85 | Alkyl silicate | 34 | Brush | E |
| 722 | 2.36 | 12.78 | 45.59 | 80 | 20 | 0 | 0 | Yes | 1.05 | 83 | Alkali silicate | 28 | Spray | E |
| 723 | 2.16 | 9.57 | 28.32 | 84.5 | 15.5 | 0 | 0 | Yes | 1.12 | 81 | Urethane resin | 109 | Brush | E |
| 724 | 2.46 | 9.81 | 71.87 | 88 | 10.5 | 1.5 | 0 | Yes | 1.23 | 80 | Alkyl silicate | 15 | Spray | E |
| 725 | 2.49 | 8.43 | 53.05 | 92.1 | 7.9 | 0 | 0 | Yes | 1.36 | 47 | Alkyl silicate | 14 | Spray | E |

TABLE 38

| Invention Example No | Granularity distribution of Zn metal grains/Zn alloy grains (Ave grain diameter) (μm) Fine metal | Granularity distribution of Zn metal grains/Zn alloy grains (Ave grain diameter) (μm) Coarse metal | Percent of fine-grain metal grains among Zn metal grains/Zn alloy grains (Vol %) | Chemical component content of Zn metal grains/Zn alloy grains (Mass %) Zn | Chemical component content of Zn metal grains/Zn alloy grains (Mass %) Mg | Chemical component content of Zn metal grains/Zn alloy grains (Mass %) Al | Chemical component content of Zn metal grains/Zn alloy grains (Mass %) Si | Zn alloy grain fracture surfaces or cracks present? | Ave aspect ratio | Coating details Total metal grain content of coat (Mass %) | Coating details Base resin type | Coating details Coat thickness (μm) | Coating details Coating method | Corrosion Test Results |
|---|---|---|---|---|---|---|---|---|---|---|---|---|---|---|
| 726 | 2.95 | 8.55 | 27.74 | 95.2 | 4.8 | 0 | 0 | Yes | 1.11 | 49 | Alkyl silicate | | Spray | E |
| 727 | 2.36 | 8.22 | 42.75 | 81.6 | 18.4 | 0 | 0 | Yes | 1.07 | 50 | Urethane resin | 122 | Brush | E |
| 728 | 2.21 | 9.44 | 23.29 | 86.8 | 12.7 | 0 | 0.5 | Yes | 1.42 | 51 | Alkyl silicate | 54 | Spray | E |
| 729 | 2.25 | 9.58 | 61.12 | 89.7 | 10.3 | 0 | 0 | No | 1.38 | 52 | Alkali silicate | 19 | Spray | E |
| 730 | 2.44 | 9.67 | 44.30 | 71.2 | 20.8 | 8 | 0 | Yes | 1.22 | 83 | Alkyl silicate | 25 | Brush | E |
| 731 | 2.78 | 9.83 | 23.96 | 97.5 | 2.5 | 0 | 0 | No | 1.14 | 88 | Alkyl silicate | 58 | Spray | E |
| 732 | 2.15 | 10.07 | 44.09 | 84.8 | 15.2 | 0 | 0 | Yes | 1.13 | 85 | Alkyl silicate | 21 | Spray | E |
| 733 | 2.19 | 9.45 | 24.63 | 80.8 | 19.2 | 0 | 0 | No | 1.02 | 83 | Alkali silicate | 19 | Brush | E |
| 734 | 2.48 | 9.3 | 62.46 | 78.7 | 13.5 | 7.8 | 0 | Yes | 1.06 | 82 | Urethane resin | 56 | Spray | E |
| 735 | 2.59 | 9.99 | 45.64 | 88.1 | 11.9 | 0 | 0 | No | 1.05 | 47 | Alkyl silicate | 77 | Spray | E |
| 736 | 2.47 | 9.58 | 25.30 | 88.5 | 10.6 | 0 | 0.9 | Yes | 1.24 | 46 | Alkyl silicate | 54 | Spray | E |
| 737 | 2.69 | 9.4 | 42.84 | 84.6 | 15.4 | 0 | 0 | Yes | 1.33 | 49 | Alkali silicate | 2 | Spray | E |
| 738 | 2.57 | 9.57 | 25.44 | 97.4 | 2.6 | 0 | 0 | Yes | 1.27 | 50 | Alkali silicate | 20 | Spray | E |
| 739 | 2.49 | 9.54 | 63.27 | 83.3 | 16.7 | 0 | 0 | Yes | 1.37 | 51 | Alkali silicate | 5 | Spray | E |
| 740 | 2.68 | 9.58 | 46.45 | 91.9 | 8.1 | 0 | 0 | Yes | 1.10 | 83 | Alkali silicate | 20 | Spray | E |
| 741 | 2.35 | 9.25 | 46.45 | 86.3 | 13.7 | 0 | 0 | Yes | 1.04 | 82 | Alkali silicate | 15 | Brush | E |
| 742 | 2.48 | 10.04 | 50.91 | 81.5 | 18.5 | 0 | 0 | Yes | 1.02 | 88 | Alkyl silicate | 57 | Brush | E |
| 743 | 2.13 | 11.27 | 27.25 | 97.6 | 2.4 | 0 | 0 | Yes | 1.01 | 85 | Alkali silicate | 13 | Brush | E |
| 744 | 1.93 | 11.44 | 42.26 | 89.1 | 10.9 | 0 | 0 | Yes | 1.08 | 86 | Alkali silicate | 22 | Brush | E |
| 745 | 2.05 | 8.9 | 33.69 | 92.8 | 7.2 | 0 | 0 | Yes | 1.14 | 47 | Alkali silicate | 20 | Spray | E |
| 746 | 1.42 | 8.75 | 48.70 | 81.96 | 17.5 | 0.5 | 0.04 | No | 1.23 | 48 | Alkyl silicate | 27 | Spray | E |

TABLE 39

| Invention Example No | Granularity distribution of Zn metal grains/Zn alloy grains (Ave grain diameter) (μm) Fine metal | Granularity distribution of Zn metal grains/Zn alloy grains (Ave grain diameter) (μm) Coarse metal | Percent of fine-grain metal grains among Zn metal grains/ Zn alloy grains (Vol %) | Chemical component content of Zn metal grains/Zn alloy grains (Mass %) Zn | Chemical component content of Zn metal grains/Zn alloy grains (Mass %) Mg | Chemical component content of Zn metal grains/Zn alloy grains (Mass %) Al | Chemical component content of Zn metal grains/Zn alloy grains (Mass %) Si | Zn alloy grain fracture surfaces or cracks present? | Ave aspect ratio | Coating details Total metal grain content of coat (Mass %) | Coating details Base resin type | Coating details Coat thickness (μm) | Coating details Coating method | Corrosion Test Results |
|---|---|---|---|---|---|---|---|---|---|---|---|---|---|---|
| 747 | 1.46 | 9.44 | 29.24 | 85.4 | 14.6 | 0 | 0 | No | 1.33 | 50 | Alkali silicate | 15 | Spray | E |
| 748 | 1.75 | 9.03 | 67.07 | 90.6 | 9.4 | 0 | 0 | Yes | 1.37 | 51 | Alkyl silicate | 35 | Spray | E |
| 749 | 1.86 | 8.85 | 50.25 | 92.9 | 7.1 | 0 | 0 | Yes | 1.44 | 52 | Alkali silicate | 34 | Brush | E |
| 750 | 1.74 | 8.95 | 29.91 | 77.5 | 22.5 | 0 | 0 | Yes | 1.21 | 88 | Alkyl silicate | 45 | Brush | E |
| 751 | 1.96 | 12.54 | 87.50 | 84.8 | 13.7 | 1.5 | 0 | No | 1.22 | 89 | Alkyl silicate | 52 | Brush | E |
| 752 | 1.65 | 8.7 | 30.58 | 87.1 | 12.9 | 0 | 0 | No | 1.23 | 86 | Alkyl silicate | 23 | Brush | E |
| 753 | 2.35 | 8.55 | 68.41 | 95.7 | 4.3 | 0 | 0 | Yes | 1.47 | 87 | Alkali silicate | 5 | Spray | E |
| 754 | 1.62 | 10.72 | 54.59 | 80.2 | 17.6 | 1 | 1.2 | No | 1.01 | 86 | Alkyl silicate | 52 | Brush | E |
| 755 | 2.25 | 9.9 | 34.25 | 98.8 | 0.6 | 0.6 | 0 | Yes | 1.04 | 46 | Alkali silicate | 150 | Brush | E |
| 756 | 2.36 | 9.57 | 37.61 | 86.9 | 10.3 | 1.6 | 1.2 | Yes | 1.05 | 49 | Alkyl silicate | 60 | Brush | E |
| 757 | 2.24 | 10.79 | 45.60 | 92.98 | 7 | 0.02 | 0 | Yes | 1.12 | 35 | Alkali silicate | 15 | Spray | E |
| 758 | 2.46 | 10.93 | 46.70 | 75.5 | 23.5 | 1 | 0 | Yes | 1.11 | 37 | Alkyl silicate | 24 | Spray | E |
| 759 | 1.56 | 11.02 | 41.22 | 82.5 | 17.5 | 0 | 0 | No | 1.08 | 36 | Alkali silicate | 34 | Spray | E |
| 760 | 1.24 | 11.18 | 45.68 | 80.1 | 12.4 | 7.5 | 0 | Yes | 1.47 | 38 | Alkyl silicate | 20 | Brush | E |
| 761 | 1.68 | 11.42 | 22.02 | 85.09 | 14.9 | 0 | 0.01 | Yes | 1.50 | 48 | Alkali silicate | 200 | Brush | E |
| 762 | 2.65 | 10.8 | 37.03 | 78.7 | 20.7 | 0 | 0.6 | No | 1.13 | 46 | Alkyl silicate | 56 | Brush | E |
| 763 | 2.22 | 10.65 | 28.46 | 91.29 | 8.6 | 0 | 0.11 | Yes | 1.26 | 51 | Alkali silicate | 34 | Spray | E |
| 764 | 2.45 | 11.34 | 43.47 | 85.8 | 14.2 | 0 | 0 | Yes | 1.14 | 46 | Alkyl silicate | 2 | Spray | G |
| 765 | 2.23 | 11.62 | 35.19 | 98.12 | 0.08 | 0 | 1.8 | Yes | 1.49 | 38 | Alkali silicate | 15 | Spray | E |
| 766 | 2.26 | 11.15 | 73.02 | 83.46 | 15.2 | 0 | 1.34 | No | 1.34 | 48 | Alkali silicate | 10 | Spray | E |

TABLE 40

| Invention Example No | Granularity distribution of Zn metal grains/Zn alloy grains (Ave grain diameter) (μm) Fine metal | Granularity distribution of Zn metal grains/Zn alloy grains (Ave grain diameter) (μm) Coarse metal | Percent of fine-grain metal grains among Zn metal grains/ Zn alloy grains (Vol %) | Chemical component content of Zn metal grains/Zn alloy grains (Mass %) Zn | Chemical component content of Zn metal grains/Zn alloy grains (Mass %) Mg | Chemical component content of Zn metal grains/Zn alloy grains (Mass %) Al | Chemical component content of Zn metal grains/Zn alloy grains (Mass %) Si | Zn alloy grain fracture surfaces or cracks present? | Ave aspect ratio | Coating details Total metal grain content of coat (Mass %) | Coating details Base resin type | Coating details Coat thickness (μm) | Coating details Coating method | Corrosion Test Results |
|---|---|---|---|---|---|---|---|---|---|---|---|---|---|---|
| 767 | 2.72 | 12.38 | 56.20 | 73.17 | 17.4 | 9 | 0.43 | Yes | 1.18 | 52 | Alkyl silicate | 125 | Brush | E |
| 768 | 2.13 | 12.55 | 35.86 | 98.6 | 0.8 | 0.6 | 0 | Yes | 1.17 | 30 | Alkali silicate | 24 | Brush | E |
| 769 | 1.98 | 9.34 | 93.45 | 93.55 | 6.4 | 0.05 | 0 | Yes | 1.48 | 76 | Alkali silicate | 110 | Brush | E |
| 770 | 2.02 | 9.58 | 30.66 | 96.78 | 3.2 | 0.02 | 0 | No | 1.49 | 72 | Alkali silicate | 24 | Brush | E |
| 771 | 2.21 | 9.88 | 74.21 | 83 | 9.2 | 7.8 | 0 | Yes | 1.27 | 81 | Alkali silicate | 2 | Spray | G |
| 772 | 2.55 | 10 | 55.39 | 70.92 | 19.2 | 9.88 | 0 | Yes | 1.17 | 64 | Alkali silicate | 37 | Spray | E |
| 773 | 1.92 | 10.67 | 30.08 | 80.25 | 15.1 | 4.65 | 0 | Yes | 1.16 | 69 | Alkyl silicate | 113 | Brush | E |
| 774 | 1.96 | 11.89 | 45.09 | 81.85 | 14.5 | 3.65 | 0 | Yes | 1.27 | 83 | Alkali silicate | 2 | Spray | G |
| 775 | 2.11 | 12.03 | 41.41 | 89.45 | 10.5 | 0.05 | 0 | Yes | 1.27 | 30 | Alkyl silicate | 75 | Brush | E |
| 776 | 2.97 | 12.12 | 17.75 | 87.3 | 7.5 | 5.2 | 0 | Yes | 1.49 | 83 | Alkali silicate | 30 | Brush | E |
| 777 | 2.36 | 12.28 | 32.76 | 93.9 | 6.1 | 0 | 0.001 | Yes | 1.29 | 75 | Alkyl silicate | 34 | Brush | E |
| 778 | 3.05 | 12.52 | 30.89 | 82.55 | 16.8 | 0.05 | 0.6 | Yes | 1.23 | 76 | Epoxy resin | 124 | Brush | E |
| 779 | 2.57 | 11.9 | 45.90 | 70.7 | 27.5 | 1 | 0.8 | Yes | 1.23 | 72 | Acrylic Resin | 15 | Spray | E |
| 780 | 2.65 | 11.75 | 42.22 | 94.6 | 2.9 | 0 | 2.5 | Yes | 1.23 | 71 | Urethane Resin | 23 | Spray | E |
| 781 | 2.54 | 12.44 | 18.56 | 94 | 4.5 | 0 | 1.5 | No | 1.23 | 82 | Polyester resin | 157 | Brush | E |
| 782 | 2.85 | 12.03 | 33.57 | 99.43 | 0.07 | 0 | 0.5 | Yes | 1.27 | 81 | Epoxy resin | 26 | Spray | E |
| 783 | 2.75 | 10.61 | 31.70 | 96.82 | 3.1 | 0.04 | 0.04 | Yes | 1.23 | 83 | Acrylic resin | 38 | Spray | E |
| 784 | 2.46 | 11.3 | 46.71 | 76.3 | 20.5 | 1 | 2.2 | Yes | 1.36 | 50 | Urethane resin | 160 | Brush | E |
| 785 | 2.71 | 11.58 | 47.89 | 68.84 | 29.5 | 0.06 | 1.6 | Yes | 1.11 | 72 | Polyester resin | 27 | Brush | E |
| 786 | 2.36 | 11.11 | 24.23 | 92.33 | 7.6 | 0.07 | 0 | Yes | 1.02 | 47 | Epoxy resin | 180 | Brush | E |

TABLE 41

| Invention Example No | Granularity distribution of Zn metal grains/Zn alloy grains (Ave grain diameter) (μm) Fine metal | Granularity distribution of Zn metal grains/Zn alloy grains (Ave grain diameter) (μm) Coarse metal | Percent of fine-grain metal grains among Zn metal grains/ Zn alloy grains (Vol %) | Chemical component content of Zn metal grains/Zn alloy grains (Mass %) Zn | Chemical component content of Zn metal grains/Zn alloy grains (Mass %) Mg | Chemical component content of Zn metal grains/Zn alloy grains (Mass %) Al | Chemical component content of Zn metal grains/Zn alloy grains (Mass %) Si | Zn alloy grain fracture surfaces or cracks present? | Ave aspect ratio | Coating details Total metal grain content of coat (Mass %) | Coating details Base resin type | Coating details Coat thickness (μm) | Coating details Coating method | Corrosion Test Results |
|---|---|---|---|---|---|---|---|---|---|---|---|---|---|---|
| 788 | 2.46 | 12.51 | 37.37 | 91.8 | 4.6 | 1.8 | 1.8 | Yes | 1.24 | 52 | Urethane resin | 180 | Brush | E |
| 789 | 2.49 | 11.64 | 50.38 | 82 | 8.3 | 9.2 | 0.5 | Yes | 1.33 | 52 | Polyester resin | 15 | Spray | E |
| 790 | 1.63 | 9.16 | 37.14 | 88.2 | 11.8 | 0 | 0 | Yes | 1.27 | 50 | Epoxy resin | 2 | Spray | G |
| 791 | 1.51 | 9.46 | 13.48 | 86.06 | 12.9 | 0 | 1.04 | Yes | 1.50 | 46 | Acrylic resin | 28 | Spray | E |
| 792 | 3.05 | 9.54 | 40.05 | 99.34 | 0.6 | 0 | 0.06 | Yes | 1.13 | 47 | Urethane resin | 30 | Spray | E |
| 793 | 2.57 | 9.56 | 38.18 | 89.51 | 9.5 | 0 | 0.99 | No | 1.04 | 83 | Polyester resin | 2 | Spray | G |
| 794 | 2.65 | 9.46 | 7.63 | 88.3 | 11.7 | 0 | 0 | Yes | 1.02 | 52 | Epoxy resin | 157 | Brush | E |
| 795 | 2.54 | 11.99 | 37.95 | 89.9 | 9.4 | 0.7 | 0 | Yes | 1.08 | 89 | Acrylic resin | 28 | Brush | E |
| 796 | 2.85 | 12.08 | 14.29 | 87.8 | 11.7 | 0.5 | 0 | Yes | 1.15 | 85 | Alkyl silicate | 130 | Brush | E |
| 797 | 2.75 | 12.24 | 40.86 | 95.6 | 4.2 | 0.2 | 0 | Yes | 1.34 | 53 | Alkyl silicate | 29 | Brush | E |
| 798 | 2.46 | 12.48 | 97.50 | 97.13 | 2.8 | 0.07 | 0 | Yes | 1.25 | 88 | Epoxy resin | 30 | Brush | E |
| 799 | 2.71 | 11.86 | 13.30 | 86.1 | 13.9 | 0 | 0 | Yes | 1.19 | 85 | Acrylic resin | 120 | Brush | E |
| 800 | 2.36 | 11.71 | 43.62 | 82.6 | 14.6 | 1.6 | 1.2 | No | 1.18 | 52 | Urethane resin | 187 | Brush | E |
| 801 | 2.46 | 11.35 | 56.93 | 72.95 | 26.4 | 0.65 | 0 | Yes | 1.24 | 83 | Polyester resin | 28 | Spray | E |
| 802 | 1.45 | 12.02 | 36.59 | 83.23 | 16.5 | 0.27 | 0 | Yes | 1.11 | 88 | Epoxy resin | 5 | Spray | E |
| 803 | 2.42 | 13.24 | 39.95 | 79.4 | 19.5 | 0.45 | 0.65 | Yes | 1.27 | 49 | Acrylic resin | 35 | Spray | E |
| 804 | 2.11 | 9.46 | 86.50 | 97.08 | 1.6 | 0.33 | 0.99 | Yes | 1.31 | 50 | Urethane resin | 5 | Spray | G |
| 805 | 2.97 | 13.47 | 32.87 | 90.5 | 6 | 1 | 2.5 | Yes | 1.26 | 51 | Polyester resin | 200 | Brush | E |
| 806 | 2.36 | 9.46 | 16.23 | 88.93 | 8.4 | 0.87 | 1.8 | Yes | 1.14 | 83 | Alkali silicate | 25 | Spray | E |
| 807 | 3.05 | 13.87 | 37.40 | 86.7 | 13.3 | 0 | 0 | Yes | 1.34 | 82 | Alkali silicate | 15 | Spray | E |

TABLE 42

| Invention Example No | Granularity distribution of Zn metal grains/Zn alloy grains (Ave grain diameter) (μm) Fine metal | Granularity distribution of Zn metal grains/Zn alloy grains (Ave grain diameter) (μm) Coarse metal | Percent of fine-grain metal grains among Zn metal grains/ Zn alloy grains (Vol %) | Chemical component content of Zn metal grains/Zn alloy grains (Mass %) Zn | Chemical component content of Zn metal grains/Zn alloy grains (Mass %) Mg | Chemical component content of Zn metal grains/Zn alloy grains (Mass %) Al | Chemical component content of Zn metal grains/Zn alloy grains (Mass %) Si | Zn alloy grain fracture surfaces or cracks present? | Ave aspect ratio | Coating details Total metal grain content of coat (Mass %) | Coating details Base resin type | Coating details Coat thickness (μm) | Coating details Coating method | Corrosion Test Results |
|---|---|---|---|---|---|---|---|---|---|---|---|---|---|---|
| 808 | 2.57 | 13.25 | 40.76 | 81.4 | 18.6 | 0 | 0 | Yes | 1.16 | 88 | Alkyl silicate | 20 | Spray | E |
| 809 | 2.65 | 13.1 | 87.31 | 97.34 | 1.8 | 0.86 | 0 | No | 1.47 | 85 | Alkyl silicate | 18 | Spray | E |
| 810 | 2.12 | 9.08 | 92.50 | 95.25 | 4.1 | 0.65 | 0 | Yes | 1.48 | 87 | Alkyl silicate | 22 | Spray | E |
| 811 | 1.65 | 9.87 | 17.93 | 82.87 | 16.7 | 0.43 | 0 | No | 1.49 | 86 | Alkyl silicate | 19 | Spray | E |
| 812 | 2.35 | 9.46 | 44.50 | 99 | 0.4 | 0.6 | 0 | Yes | 1.34 | 46 | Alkyl silicate | 29 | Spray | E |
| 813 | 1.63 | 9.28 | 96.50 | 89.35 | 10.6 | 0.05 | 0 | Yes | 1.29 | 49 | Alkali silicate | 23 | Spray | E |
| 814 | 2.64 | 9.45 | 16.94 | 93.08 | 6.9 | 0.02 | 0 | Yes | 1.18 | 35 | Alkyl silicate | 21 | Spray | E |
| 815 | 2.35 | 9.25 | 88.12 | 99.82 | 0.05 | 0.06 | 0.07 | Yes | 1.48 | 30 | Alkyl silicate | 19 | Spray | E |
| 816 | 2.31 | 9.46 | 60.57 | 91.56 | 6.4 | 1.05 | 0.99 | Yes | 1.27 | 76 | Alkyl silicate | 15 | Spray | E |
| 817 | 2.62 | 9.46 | 39.48 | 93.36 | 3.5 | 2.6 | 0.54 | Yes | 1.17 | 72 | Alkali silicate | 18 | Spray | E |
| 818 | 2.52 | 9.46 | 15.82 | 82.13 | 17.5 | 0.05 | 0.32 | Yes | 1.27 | 30 | Alkyl silicate | 22 | Spray | E |
| 819 | 2.24 | 13.32 | 49.57 | 91.2 | 3.6 | 5.2 | 0 | No | 1.27 | 83 | Alkyl silicate | 21 | Spray | E |
| 820 | 0.05 | 6.54 | 86.52 | 94.1 | 5.9 | 0 | 0.001 | Yes | 1.48 | 75 | Alkyl silicate | 29 | Spray | E |
| 821 | 2.42 | 6.35 | 90.98 | 83.2 | 16.2 | 0 | 0.6 | No | 1.49 | 76 | Alkali silicate | 23 | Spray | E |
| 822 | 0.11 | 7.54 | 67.32 | 76.7 | 22.5 | 0 | 0.8 | Yes | 1.34 | 72 | Alkyl silicate | 21 | Spray | E |
| 823 | 1.92 | 8.64 | 82.33 | 96.52 | 3.4 | 0.04 | 0.04 | Yes | 1.23 | 83 | Alkali silicate | 19 | Spray | E |
| 824 | 0.46 | 6.45 | 73.76 | 68.3 | 26.5 | 3 | 2.2 | Yes | 1.23 | 50 | Alkyl silicate | 21 | Spray | E |
| 825 | 0.77 | 6.48 | 88.77 | 72.84 | 25.5 | 0.06 | 1.6 | Yes | 1.23 | 72 | Alkali silicate | 19 | Spray | E |
| 826 | 2.35 | 9.25 | 45.02 | 87.2 | 12.8 | 0 | 0 | Yes | 1.05 | 50 | Acrylic resin | 654 | Spray | E |
| 827 | 2.33 | 9.46 | 15.2 | 91.5 | 8.5 | 0 | 0 | Yes | 1.06 | 48 | Alkali silicate | 700 | Spray | E |

TABLE 43

| Invention Example No | Average grain diameter (μm) | Diameter distribution of Zn metal grains/Zn alloy grains (Ave grain diameter) (μm) | | Percent of fine-grain metal grains among Zn metal grains/Zn alloy grains (Vol %) | Chemical component content of Zn metal grains/Zn alloy grains (Mass %) | | | | Zn alloy Mg solid solution phase and Zn—Mg intermetallic compounds present on grain surfaces? | MgZn2 or Mg2Zn11 present? | Mg content of all metal grains (Mass %) | Coat thickness (μm) | | Time to red rusting | |
|---|---|---|---|---|---|---|---|---|---|---|---|---|---|---|---|
| | | Fine metal | Coarse metal | | Zn | Mg | Al | Si | | | | Inorganic | Organic | Organic | Inorganic |
| 335 | — | 2.35 | 9.25 | 78.99 | 96.0 | 4.0 | 0 | 0 | Yes | Yes | 92 | 24.6 | 125 | E | E |
| 336 | — | 1.99 | 9.56 | 42.04 | 97.5 | 2.5 | 0 | 0 | Yes | Yes | 80 | 23.8 | 167 | E | E |
| 337 | — | 2.35 | 10 | 6.55 | 98.4 | 1.6 | 0 | 0 | Yes | Yes | 67 | 15.2 | 88 | E | E |
| 338 | — | 2.21 | 8.54 | 43.60 | 95.5 | 7.8 | 0 | 0 | Yes | Yes | 77 | 10.6 | 56 | E | E |
| 339 | — | 2.64 | 9.85 | 44.12 | 96.2 | 3.8 | 0 | 0 | Yes | Yes | 53 | 10.7 | 256 | E | E |
| 340 | — | 2.65 | 8.56 | 80.33 | 98.0 | 2.0 | 0 | 0 | Yes | No | 78 | 15 | 24 | E | E |
| 341 | — | 2.94 | 8.21 | 43.38 | 94.5 | 5.5 | 0 | 0 | No | No | 83 | 10.5 | 96 | G | G |
| 342 | — | 2.58 | 8.33 | 13.52 | 94.0 | 6.0 | 0 | 0 | No | No | 89 | 14.5 | 94 | G | G |
| 343 | — | 2.37 | 8.5 | 34.55 | 97.5 | 2.5 | 0 | 0.07 | Yes | Yes | 90 | 12.3 | 93 | E | E |
| 344 | — | 2.15 | 10.11 | 80.50 | 93.2 | 6.8 | 0 | 0.99 | Yes | Yes | 45 | 8.6 | 95 | E | E |
| 345 | — | 2.96 | 9.36 | 79.08 | 94.5 | 5.5 | 0 | 0 | No | No | 53 | 17.5 | 92 | G | G |
| 346 | — | 2.85 | 9.45 | 42.13 | 93.6 | 6.4 | 0 | 0 | No | No | 48 | 12.6 | 95 | G | G |
| 347 | — | 2.94 | 9.61 | 7.56 | 94.1 | 5.9 | 0 | 0 | Yes | No | 46 | 10.4 | 91 | E | E |
| 348 | — | 2.11 | 9.85 | 33.30 | 93.5 | 6.5 | 0 | 0 | Yes | No | 47 | 10.9 | 90 | E | E |
| 349 | — | 2.68 | 9.23 | 79.25 | 97.6 | 2.4 | 0 | 0 | No | No | 49 | 19 | 99 | G | G |
| 350 | — | 2.49 | 9.08 | 7.83 | 94.5 | 5.5 | 0 | 0.53 | Yes | Yes | 83 | 25.6 | 115 | E | E |
| 351 | — | 2.21 | 9.87 | 45.68 | 92.45 | 7.5 | 0 | 0.05 | Yes | Yes | 35 | 18 | 97 | E | E |
| 352 | — | 2.96 | 9.46 | 65.58 | 90.45 | 9.5 | 0.05 | 0 | No | No | 90 | 24.7 | 94 | G | G |
| 353 | — | 2.85 | 9.28 | 47.24 | 91.38 | 8.6 | 0.02 | 0 | No | No | 89 | 22.9 | 93 | G | G |
| 354 | — | 2.64 | 9.45 | 47.76 | 91.1 | 7.9 | 1 | 0 | Yes | No | 88 | 52.3 | 83 | G | G |

TABLE 44

| Invention Example No | Average grain diameter (μm) | Diameter distribution of Zn metal grains/Zn alloy grains (Ave grain diameter) (μm) | | Percent of fine-grain metal grains among Zn metal grains/Zn alloy grains (Vol %) | Chemical component content of Zn metal grains/Zn alloy grains (Mass %) | | | | Zn alloy Mg solid solution phase and Zn—Mg intermetallic compounds present on grain surfaces? | MgZn2 or Mg2Zn11 present? | Mg content of all metal grains (Mass %) | Coat thickness (μm) | | Time to red rusting | |
|---|---|---|---|---|---|---|---|---|---|---|---|---|---|---|---|
| | | Fine metal | Coarse metal | | Zn | Mg | Al | Si | | | | Inorganic | Organic | Organic | Inorganic |
| 355 | — | 2.35 | 9.25 | 80.06 | 81.1 | 13.7 | 5.2 | 0 | Yes | Yes | 47 | 56.3 | 88 | E | G |
| 356 | — | 2.12 | 9.46 | 47.02 | 85.6 | 9.8 | 4.6 | 0 | No | No | 47 | 33.3 | 89 | G | G |
| 357 | — | 1.76 | 9.46 | 7.66 | 89.5 | 10.5 | 0 | 0.001 | No | No | 52 | 34.5 | 87 | G | G |
| 358 | — | 2.12 | 9.46 | 15.20 | 91.2 | 8.8 | 0 | 0 | Yes | Yes | 52 | 23.5 | 103 | E | E |
| 359 | — | 1.65 | 9.06 | 86.28 | 96.1 | 3.9 | 0 | 0 | Yes | Yes | 52 | 26.7 | 85 | E | E |
| 360 | — | 2.12 | 10.99 | 49.33 | 97.5 | 2.5 | 0 | 0 | Yes | Yes | 88 | 19.5 | 109 | E | E |
| 361 | — | 2.21 | 8.08 | 5.99 | 94 | 6 | 0 | 0 | Yes | Yes | 49 | 15 | 74 | E | E |
| 362 | — | 1.99 | 8.53 | 69.55 | 99.4 | 0.6 | 0 | 0 | Yes | Yes | 35 | 23 | 105 | E | E |
| 363 | — | 1.95 | 9.32 | 86.45 | 91.6 | 7.9 | 0 | 0.5 | No | No | 37 | 31.2 | 83 | G | G |
| 364 | — | 1.76 | 8.95 | 75.88 | 98.5 | 0.5 | 0.3 | 0.7 | No | No | 36 | 37.5 | 82 | G | G |
| 365 | — | 1.48 | 10.21 | 48.08 | 88.43 | 11.5 | 0.02 | 0.05 | Yes | Yes | 80 | 9.8 | 124 | E | E |
| 366 | — | 1.65 | 8.7 | 66.85 | 95.73 | 3.5 | 0.12 | 0.65 | Yes | Yes | 55 | 15.5 | 89 | E | E |
| 367 | — | 2.35 | 9.86 | 7.68 | 92.09 | 7.8 | 0.06 | 0.05 | No | No | 46 | 14.5 | 96 | G | G |
| 368 | — | 1.62 | 8.91 | 8.64 | 95.49 | 3.5 | 0.02 | 0.99 | Yes | Yes | 35 | 16.3 | 95 | E | E |
| 369 | — | 1.88 | 9.91 | 16.58 | 93.96 | 5 | 0.54 | 0.5 | Yes | Yes | 67 | 15.8 | 99 | E | E |
| 370 | — | 2.35 | 9.25 | 35.87 | 91.45 | 8.5 | 0.05 | 0 | No | No | 47 | 19 | 89 | G | G |
| 371 | — | 2.57 | 9.56 | 42.04 | 97.13 | 2.4 | 0.02 | 0.45 | Yes | Yes | 78 | 14.6 | 89 | E | E |
| 372 | — | 2.56 | 9.84 | 38.41 | 94.58 | 5.4 | 0.02 | 0.11 | Yes | Yes | 34 | 19.5 | 98 | E | E |
| 373 | — | 2.21 | 9.75 | 6.99 | 95.65 | 6.8 | 0.05 | 0.8 | No | No | 51 | 24.7 | 96 | G | G |

TABLE 45

| Invention Example No | Granularity distribution (peak diameter) of Zn metal grains/Zn alloy grains (μm) | | Percent of fine-grain metal grains among Zn metal grains/Zn alloy grains (Vol %) | Chemical component content of Zn metal grains/Zn alloy grains (Mass %) | | | | Zn alloy grain fracture surfaces or cracks present? | Ave aspect ratio | Mg solid solution phase and Zn—Mg intermetallic compounds present on grain surfaces? | Any of MgZn2, Mg2Zn11, Mg2Zn3, MgZn, Mg7Zn3 present? |
|---|---|---|---|---|---|---|---|---|---|---|---|
| | Fine metal | Coarse metal | | Zn | Mg | Al | Si | | | | |
| 837 | 2.35 | 9.25 | 35.87 | 88.8 | 11.2 | 0 | 0 | Yes | 1.12 | Yes | Yes |
| 838 | 2.57 | 9.56 | 42.04 | 90.6 | 9.4 | 0 | 0 | No | 1.38 | Yes | Yes |
| 839 | 2.56 | 9.84 | 6.55 | 81.45 | 18.5 | 0 | 0.5 | Yes | 1.22 | Yes | Yes |
| 840 | 2.21 | 9.75 | 43.60 | 99.97 | 0.03 | 0 | 0 | Yes | 1.14 | Yes | Yes |
| 841 | 2.64 | 9.85 | 44.12 | 98.4 | 1.6 | 0 | 0 | No | 1.02 | Yes | Yes |
| 842 | 1.99 | 8.56 | 37.21 | 93.2 | 6.8 | 0 | 0 | Yes | 1.05 | Yes | Yes |
| 843 | 2.94 | 8.21 | 43.38 | 84.5 | 13.9 | 0 | 1.6 | No | 1.36 | No | Yes |
| 844 | 2.58 | 8.33 | 13.52 | 98.1 | 1.9 | 0 | 0 | Yes | 1.11 | No | Yes |
| 845 | 2.37 | 8 | 44.94 | 94.3 | 5.7 | 0 | 0 | No | 1.07 | Yes | Yes |
| 846 | 2.15 | 9.22 | 45.46 | 90.8 | 9.2 | 0 | 0 | No | 1.42 | Yes | Yes |
| 847 | 2.96 | 9.36 | 35.96 | 83.3 | 15.4 | 0 | 1.3 | Yes | 1.38 | No | Yes |
| 848 | 2.85 | 9.45 | 42.13 | 79.84 | 18.6 | 0 | 1.56 | Yes | 1.22 | No | Yes |
| 849 | 2.94 | 9.61 | 7.56 | 96.4 | 3.6 | 0 | 0 | Yes | 1.14 | Yes | Yes |
| 850 | 2.11 | 9.85 | 43.69 | 94.6 | 5.4 | 0 | 0 | Yes | 1.13 | Yes | Yes |
| 851 | 2.68 | 9.23 | 44.21 | 92.4 | 7.6 | 0 | 0 | Yes | 1.02 | No | Yes |
| 852 | 2.99 | 9.08 | 39.51 | 75.5 | 24.5 | 0 | 0 | Yes | 1.06 | Yes | Yes |
| 853 | 2.78 | 9.87 | 45.68 | 82.4 | 17.6 | 0 | 0 | Yes | 1.05 | Yes | Yes |
| 854 | 2.96 | 9.46 | 65.58 | 98.6 | 1.4 | 0 | 0 | Yes | 1.24 | No | Yes |
| 855 | 2.85 | 9.28 | 47.24 | 78.5 | 21.5 | 0 | 0 | Yes | 1.33 | No | Yes |
| 856 | 2.64 | 9.45 | 47.76 | 89.6 | 10.4 | 0 | 0 | Yes | 1.27 | Yes | Yes |

| Invention Example No | Coating details | | | | Corrosion Test Results |
|---|---|---|---|---|---|
| | Total metal grain content of coat (Mass %) | Base resin type | Coat thickness (μm) | Coating method | |
| 837 | 49 | Alkyl silicate | 14 | Spray | E |
| 838 | 89 | Urethane resin | 55 | Spray | E |
| 839 | 90 | Alkyl silicate | 8 | Spray | E |
| 840 | 86 | Urethane resin | 122 | Brush | E |
| 841 | 48 | Alkyl silicate | 555 | Spray | E |
| 842 | 47 | Alkali silicate | 19 | Spray | E |
| 843 | 47 | Alkyl silicate | 25 | Brush | E |
| 844 | 47 | Alkyl silicate | 58 | Spray | E |
| 845 | 52 | Alkyl silicate | 685 | Spray | E |
| 846 | 52 | Alkali silicate | 19 | Brush | E |
| 847 | 52 | Urethane resin | 700 | Spray | E |
| 848 | 88 | Alkyl silicate | 77 | Spray | E |
| 849 | 87 | Alkyl silicate | 54 | Spray | E |
| 850 | 89 | Alkyl silicate | 64 | Spray | E |
| 851 | 90 | Alkyl silicate | 34 | Brush | E |
| 852 | 91 | Alkali silicate | 28 | Spray | E |
| 853 | 46 | Urethane resin | 109 | Brush | E |
| 854 | 47 | Alkyl silicate | 15 | Spray | E |
| 855 | 47 | Alkyl silicate | 14 | Spray | E |
| 856 | 49 | Alkyl silicate | 18 | Spray | E |

TABLE 46

| Invention Example No | Granularity distribution (peak diameter) of Zn metal grains/Zn alloy grains (μm) | | Percent of fine-grain metal grains among Zn metal grains/Zn alloy grains (Vol %) | Chemical component content of Zn metal grains/Zn alloy grains (Mass %) | | | | Zn alloy grain fracture surfaces or cracks present? | Ave aspect ratio | Mg solid solution phase and Zn—Mg intermetallic compounds present on grain surfaces? | Any of MgZn2, Mg2Zn11, Mg2Zn3, MgZn, Mg7Zn3 present? |
|---|---|---|---|---|---|---|---|---|---|---|---|
| | Fine metal | Coarse metal | | Zn | Mg | Al | Si | | | | |
| 857 | 2.35 | 9.25 | 45.02 | 87.2 | 12.8 | 0 | 0 | Yes | 1.05 | Yes | Yes |
| 858 | 2.12 | 9.46 | 47.02 | 92.2 | 7.8 | 0 | 0 | Yes | 1.22 | No | Yes |
| 859 | 2.34 | 9.46 | 7.66 | 70.5 | 29.5 | 0 | 0 | Yes | 1.13 | No | Yes |
| 860 | 2.33 | 9.46 | 15.20 | 91.5 | 8.5 | 0 | 0 | Yes | 1.06 | Yes | Yes |
| 861 | 2.23 | 9.06 | 43.16 | 74.5 | 25.5 | 0 | 0 | Yes | 1.05 | Yes | Yes |
| 862 | 2.12 | 9.3 | 49.33 | 99.93 | 0.07 | 0 | 0 | Yes | 1.24 | Yes | Yes |
| 863 | 2.21 | 8.68 | 19.47 | 89.2 | 10.8 | 0 | 0 | No | 1.05 | Yes | Yes |
| 864 | 1.38 | 8.53 | 69.55 | 86 | 11.2 | 1.6 | 1.2 | No | 1.12 | Yes | Yes |
| 865 | 1.95 | 9.32 | 51.41 | 75.23 | 24.5 | 0.27 | 0 | Yes | 1.38 | No | Yes |
| 866 | 2.26 | 8.95 | 75.88 | 82.6 | 17.4 | 0 | 0 | Yes | 1.13 | No | Yes |
| 867 | 2.05 | 12.54 | 48.08 | 98.7 | 1.3 | 0 | 0 | Yes | 1.33 | Yes | Yes |
| 868 | 1.65 | 8.7 | 66.85 | 80.5 | 19.5 | 0 | 0 | Yes | 1.27 | Yes | Yes |
| 869 | 2.35 | 8.55 | 7.68 | 88.85 | 10.8 | 0.05 | 0.3 | No | 1.23 | No | Yes |
| 870 | 1.62 | 8.91 | 8.64 | 87.7 | 11.9 | 0.4 | 0 | Yes | 1.11 | Yes | Yes |
| 871 | 1.88 | 9.91 | 16.58 | 90.5 | 9.5 | 0 | 0 | Yes | 1.42 | Yes | Yes |
| 872 | 2.35 | 9.25 | 35.87 | 89.5 | 10.5 | 0 | 0 | Yes | 1.06 | No | Yes |
| 873 | 2.57 | 9.56 | 42.04 | 84.9 | 15.1 | 0 | 0 | Yes | 1.05 | Yes | Yes |
| 874 | 2.56 | 9.84 | 38.41 | 83.2 | 16.8 | 0 | 0 | Yes | 1.07 | Yes | Yes |
| 875 | 2.21 | 9.75 | 6.99 | 89.4 | 10.6 | 0 | 0 | Yes | 1.42 | No | Yes |
| 876 | 2.64 | 9.85 | 44.12 | 84.3 | 13.3 | 2.4 | 0 | Yes | 1.38 | Yes | Yes |

| Invention Example No | Coating details | | | | Corrosion Test Results |
|---|---|---|---|---|---|
| | Total metal grain content of coat (Mass %) | Base resin type | Coat thickness (μm) | Coating method | |
| 857 | 50 | Alkali silicate | 2 | Spray | G |
| 858 | 87 | Alkyl silicate | 37 | Spray | E |
| 859 | 83 | Alkali silicate | 12 | Spray | E |
| 860 | 48 | Alkyl silicate | 160 | Brush | E |
| 861 | 51 | Alkali silicate | 5 | Brush | G |
| 862 | 51 | Alkyl silicate | 56 | Brush | E |
| 863 | 87 | Alkali silicate | 2 | Spray | G |
| 864 | 85 | Alkyl silicate | 18 | Spray | E |
| 865 | 86 | Alkyl silicate | 23 | Spray | E |
| 866 | 50 | Epoxy resin | 30 | Brush | E |
| 867 | 51 | Acrylic resin | 77 | Brush | E |
| 868 | 51 | Urethane resin | 655 | Brush | E |
| 869 | 80 | Polyester resin | 47 | Spray | E |
| 870 | 46 | Epoxy resin | 43 | Spray | E |
| 871 | 51 | Acrylic resin | 52 | Brush | E |
| 872 | 86 | Urethane resin | 20 | Brush | E |
| 873 | 85 | Polyester resin | 200 | Brush | E |
| 874 | 82 | Alkali silicate | 22 | Spray | E |
| 875 | 81 | Alkyl silicate | 25 | Spray | E |
| 876 | 46 | Alkali silicate | 14 | Spray | E |

TABLE 47

| Invention Example No | Granularity distribution (peak diameter) of Zn metal grains/Zn alloy grains (μm) | | Percent of fine-grain metal grains among Zn metal grains/ Zn alloy grains (Vol %) | Chemical component content of Zn metal grains/Zn alloy grains (Mass %) | | | | Zn alloy grain fracture surfaces or cracks present? | Ave aspect ratio | Mg solid solution phase and Zn—Mg intermetallic compounds present on grain surfaces? | Any of MgZn2, Mg2Zn11, Mg2Zn3, MgZn, Mg7Zn3 present? |
|---|---|---|---|---|---|---|---|---|---|---|---|
| | Fine metal | Coarse metal | | Zn | Mg | Al | Si | | | | |
| 877 | 2.65 | 8.56 | 66.99 | 98.6 | 1.4 | 0 | 0 | No | 1.22 | Yes | Yes |
| 878 | 2.94 | 8.21 | 43.38 | 76.45 | 23.5 | 0 | 0.05 | Yes | 1.14 | Yes | Yes |
| 879 | 2.58 | 8.33 | 39.75 | 91.1 | 8.9 | 0 | 0 | Yes | 1.13 | Yes | Yes |
| 880 | 2.37 | 8 | 65.38 | 85.1 | 14.9 | 0 | 0 | Yes | 1.02 | Yes | Yes |
| 881 | 2.15 | 9.22 | 45.46 | 77.48 | 18.4 | 2.55 | 1.57 | Yes | 1.06 | Yes | Yes |
| 882 | 2.96 | 9.36 | 22.55 | 97.9 | 2.1 | 0 | 0 | Yes | 1.05 | Yes | Yes |
| 883 | 2.85 | 9.45 | 42.13 | 94.8 | 5.2 | 0 | 0 | Yes | 1.24 | Yes | Yes |
| 884 | 2.94 | 9.61 | 38.50 | 84.6 | 15.4 | 0 | 0 | Yes | 1.33 | Yes | Yes |
| 885 | 2.11 | 9.85 | 64.13 | 89.3 | 10.7 | 0 | 0 | Yes | 1.27 | Yes | Yes |
| 886 | 2.68 | 9.23 | 44.21 | 83.3 | 16.7 | 0 | 0 | Yes | 1.05 | Yes | Yes |
| 887 | 2.99 | 9.08 | 39.51 | 80.05 | 19.6 | 0.35 | 0 | No | 1.12 | Yes | Yes |
| 888 | 1.82 | 9.87 | 78.64 | 85.5 | 14.5 | 0 | 0 | No | 1.23 | Yes | Yes |
| 889 | 1.42 | 9.46 | 42.05 | 85 | 14.2 | 0 | 0.8 | No | 1.36 | Yes | Yes |
| 890 | 2.12 | 9.28 | 64.58 | 87.3 | 12.7 | 0 | 0 | No | 1.11 | Yes | Yes |
| 891 | 1.92 | 9.45 | 47.76 | 89.5 | 10.5 | 0 | 0 | Yes | 1.07 | Yes | Yes |
| 892 | 2.11 | 9.63 | 24.10 | 87.3 | 11.8 | 0 | 0.9 | Yes | 1.42 | Yes | Yes |
| 893 | 2.97 | 9.16 | 39.11 | 86.4 | 12.8 | 0.5 | 0.3 | Yes | 1.38 | Yes | Yes |
| 894 | 2.36 | 10.39 | 19.65 | 93.8 | 6.2 | 0 | 0 | Yes | 1.22 | Yes | Yes |
| 895 | 3.05 | 10.56 | 65.39 | 83.8 | 16.2 | 0 | 0 | Yes | 1.14 | Yes | Yes |
| 896 | 2.15 | 10.74 | 48.57 | 80.4 | 19.6 | 0 | 0 | Yes | 1.13 | Yes | Yes |

| Invention Example No | Coating details | | | | Corrosion Test Results |
|---|---|---|---|---|---|
| | Total metal grain content of coat (Mass %) | Base resin type | Coat thickness (μm) | Coating method | |
| 877 | 47 | Urethane resin | 112 | Spray | E |
| 878 | 48 | Alkali silicate | 24 | Spray | E |
| 879 | 51 | Urethane resin | 150 | Spray | E |
| 880 | 53 | Alkali silicate | 18 | Spray | E |
| 881 | 88 | Alkyl silicate | 19 | Brush | E |
| 882 | 85 | Alkyl silicate | 24 | Spray | E |
| 883 | 83 | Urethane resin | 99 | Spray | E |
| 884 | 82 | Alkyl silicate | 7 | Spray | E |
| 885 | 83 | Epoxy resin | 100 | Spray | E |
| 886 | 47 | Alkyl silicate | 27 | Brush | E |
| 887 | 51 | Alkali silicate | 15 | Spray | E |
| 888 | 52 | Alkyl silicate | 14 | Spray | E |
| 889 | 51 | Urethane resin | 55 | Spray | E |
| 890 | 52 | Alkyl silicate | 8 | Spray | E |
| 891 | 89 | Urethane resin | 122 | Brush | E |
| 892 | 85 | Alkyl silicate | 54 | Spray | E |
| 893 | 82 | Alkali silicate | 19 | Spray | E |
| 894 | 87 | Alkyl silicate | 25 | Brush | E |
| 895 | 88 | Alkyl silicate | 58 | Spray | E |
| 896 | 49 | Alkyl silicate | 21 | Spray | E |

TABLE 48

| Invention Example No | Granularity distribution (peak diameter) of Zn metal grains/Zn alloy grains (μm) Fine metal | Granularity distribution (peak diameter) of Zn metal grains/Zn alloy grains (μm) Coarse metal | Percent of fine-grain metal grains among Zn metal grains/Zn alloy grains (Vol %) | Chemical component content of Zn metal grains/Zn alloy grains (Mass %) Zn | Chemical component content of Zn metal grains/Zn alloy grains (Mass %) Mg | Chemical component content of Zn metal grains/Zn alloy grains (Mass %) Al | Chemical component content of Zn metal grains/Zn alloy grains (Mass %) Si | Zn alloy grain fracture surfaces or cracks present? | Ave aspect ratio | Mg solid solution phase and Zn—Mg intermetallic compounds present on grain surfaces? | Any of MgZn2, Mg2Zn11, Mg2Zn3, MgZn, Mg7Zn3 present? |
|---|---|---|---|---|---|---|---|---|---|---|---|
| 897 | 2.19 | 10.27 | 24.91 | 87.6 | 12.4 | 0 | 0 | Yes | 1.02 | Yes | Yes |
| 898 | 2.48 | 11.5 | 39.92 | 89.3 | 10.7 | 0 | 0 | Yes | 1.06 | Yes | Yes |
| 899 | 2.85 | 11.67 | 22.65 | 91.5 | 8.5 | 0 | 0 | Yes | 1.05 | Yes | Yes |
| 900 | 2.75 | 11.85 | 66.20 | 94.9 | 5.1 | 0 | 0 | Yes | 1.24 | Yes | Yes |
| 901 | 2.46 | 11.38 | 49.38 | 75.5 | 24.5 | 0 | 0 | Yes | 1.33 | Yes | Yes |
| 902 | 2.71 | 12.61 | 30.58 | 86.5 | 13.5 | 0 | 0 | Yes | 1.27 | Yes | Yes |
| 903 | 2.36 | 12.78 | 45.59 | 80 | 20 | 0 | 0 | Yes | 1.05 | Yes | Yes |
| 904 | 2.16 | 9.57 | 28.32 | 84.5 | 15.5 | 0 | 0 | Yes | 1.12 | Yes | Yes |
| 905 | 2.46 | 9.81 | 71.87 | 88 | 10.5 | 1.5 | 0 | Yes | 1.23 | Yes | Yes |
| 906 | 2.49 | 8.43 | 53.05 | 92.1 | 7.9 | 0 | 0 | Yes | 1.36 | Yes | Yes |
| 907 | 2.95 | 8.55 | 27.74 | 95.2 | 4.8 | 0 | 0 | Yes | 1.11 | Yes | Yes |
| 908 | 2.36 | 8.22 | 42.75 | 81.6 | 18.4 | 0 | 0 | Yes | 1.07 | Yes | Yes |
| 909 | 2.21 | 9.44 | 23.29 | 86.8 | 12.7 | 0 | 0.5 | Yes | 1.42 | Yes | Yes |
| 910 | 2.25 | 9.58 | 61.12 | 89.7 | 10.3 | 0 | 0 | No | 1.38 | Yes | Yes |
| 911 | 2.44 | 9.67 | 44.30 | 71.2 | 20.8 | 8 | 0 | Yes | 1.22 | Yes | Yes |
| 912 | 2.78 | 9.83 | 23.96 | 97.5 | 2.5 | 0 | 0 | No | 1.14 | Yes | Yes |
| 913 | 2.15 | 10.07 | 44.09 | 84.8 | 15.2 | 0 | 0 | Yes | 1.13 | Yes | Yes |
| 914 | 2.19 | 9.45 | 24.63 | 80.8 | 19.2 | 0 | 0 | No | 1.02 | Yes | Yes |
| 915 | 2.48 | 9.3 | 62.46 | 78.7 | 13.5 | 7.8 | 0 | Yes | 1.06 | Yes | Yes |
| 916 | 2.59 | 9.99 | 45.64 | 88.1 | 11.9 | 0 | 0 | No | 1.05 | Yes | Yes |

| Invention Example No | Coating details Total metal grain content of coat (Mass %) | Coating details Base resin type | Coating details Coat thickness (μm) | Coating details Coating method | Corrosion Test Results |
|---|---|---|---|---|---|
| 897 | 50 | Alkali silicate | 19 | Brush | E |
| 898 | 51 | Urethane resin | 56 | Spray | E |
| 899 | 52 | Alkyl silicate | 77 | Spray | E |
| 900 | 53 | Alkyl silicate | 12 | Spray | E |
| 901 | 88 | Alkyl silicate | 64 | Spray | E |
| 902 | 85 | Alkyl silicate | 34 | Brush | E |
| 903 | 83 | Alkali silicate | 28 | Spray | E |
| 904 | 81 | Urethane resin | 109 | Brush | E |
| 905 | 80 | Alkyl silicate | 15 | Spray | E |
| 906 | 47 | Alkyl silicate | 14 | Spray | E |
| 907 | 49 | Alkyl silicate | 18 | Spray | E |
| 908 | 50 | Urethane resin | 122 | Brush | E |
| 909 | 51 | Alkyl silicate | 54 | Spray | E |
| 910 | 52 | Alkali silicate | 19 | Spray | E |
| 911 | 83 | Alkyl silicate | 25 | Brush | E |
| 912 | 88 | Alkyl silicate | 58 | Spray | E |
| 913 | 85 | Alkyl silicate | 21 | Spray | E |
| 914 | 83 | Alkali silicate | 19 | Brush | E |
| 915 | 82 | Urethane resin | 56 | Spray | E |
| 916 | 47 | Alkyl silicate | 77 | Spray | E |

TABLE 49

| Invention Example No | Granularity distribution (peak diameter) of Zn metal grains/Zn alloy grains (μm) Fine metal | Granularity distribution (peak diameter) of Zn metal grains/Zn alloy grains (μm) Coarse metal | Percent of fine-grain metal grains among Zn metal grains/Zn alloy grains (Vol %) | Chemical component content of Zn metal grains/Zn alloy grains (Mass %) Zn | Chemical component content of Zn metal grains/Zn alloy grains (Mass %) Mg | Chemical component content of Zn metal grains/Zn alloy grains (Mass %) Al | Chemical component content of Zn metal grains/Zn alloy grains (Mass %) Si | Zn alloy grain fracture surfaces or cracks present? | Ave aspect ratio | Mg solid solution phase and Zn—Mg intermetallic compounds present on grain surfaces? | Any of MgZn2, Mg2Zn11, Mg2Zn3, MgZn, Mg7Zn3 present? |
|---|---|---|---|---|---|---|---|---|---|---|---|
| 917 | 2.47 | 9.58 | 25.30 | 88.5 | 10.6 | 0 | 0.9 | Yes | 1.24 | Yes | Yes |
| 918 | 2.69 | 9.4 | 42.84 | 84.6 | 15.4 | 0 | 0 | Yes | 1.33 | Yes | Yes |
| 919 | 2.57 | 9.57 | 25.44 | 97.4 | 2.6 | 0 | 0 | Yes | 1.27 | Yes | Yes |
| 920 | 2.49 | 9.54 | 63.27 | 83.3 | 16.7 | 0 | 0 | Yes | 1.37 | Yes | Yes |
| 921 | 2.68 | 9.58 | 46.45 | 91.9 | 8.1 | 0 | 0 | Yes | 1.10 | Yes | Yes |
| 922 | 2.35 | 9.25 | 46.45 | 86.3 | 13.7 | 0 | 0 | Yes | 1.04 | Yes | Yes |
| 923 | 2.48 | 10.04 | 50.91 | 81.5 | 18.5 | 0 | 0 | Yes | 1.02 | Yes | Yes |
| 924 | 2.13 | 11.27 | 27.25 | 97.6 | 2.4 | 0 | 0 | Yes | 1.01 | Yes | Yes |
| 925 | 1.93 | 11.44 | 42.26 | 89.1 | 10.9 | 0 | 0 | Yes | 1.08 | Yes | Yes |
| 926 | 2.05 | 8.9 | 33.69 | 92.8 | 7.2 | 0 | 0 | Yes | 1.14 | Yes | Yes |
| 927 | 1.42 | 8.75 | 48.70 | 81.96 | 17.5 | 0.5 | 0.04 | No | 1.23 | Yes | Yes |
| 928 | 1.46 | 9.44 | 29.24 | 85.4 | 14.6 | 0 | 0 | No | 1.33 | Yes | Yes |
| 929 | 1.75 | 9.03 | 67.07 | 90.6 | 9.4 | 0 | 0 | Yes | 1.37 | Yes | Yes |
| 930 | 1.86 | 8.85 | 50.25 | 92.9 | 7.1 | 0 | 0 | Yes | 1.44 | Yes | Yes |
| 931 | 1.74 | 8.95 | 29.91 | 77.5 | 22.5 | 0 | 0 | Yes | 1.21 | Yes | Yes |
| 932 | 1.96 | 12.54 | 87.50 | 84.8 | 13.7 | 1.5 | 0 | No | 1.22 | Yes | Yes |
| 933 | 1.65 | 8.7 | 30.58 | 87.1 | 12.9 | 0 | 0 | No | 1.23 | Yes | Yes |
| 934 | 2.35 | 8.55 | 68.41 | 95.7 | 4.3 | 0 | 0 | Yes | 1.47 | Yes | Yes |
| 935 | 1.62 | 10.72 | 54.59 | 80.2 | 17.6 | 1 | 1.2 | No | 1.01 | Yes | Yes |
| 936 | 2.25 | 9.9 | 34.25 | 98.8 | 0.6 | 0.6 | 0 | Yes | 1.04 | Yes | Yes |

| Invention Example No | Coating details Total metal grain content of coat (Mass %) | Coating details Base resin type | Coating details Coat thickness (μm) | Coating details Coating method | Corrosion Test Results |
|---|---|---|---|---|---|
| 917 | 46 | Alkyl silicate | 54 | Spray | E |
| 918 | 49 | Alkali silicate | 2 | Spray | G |
| 919 | 50 | Alkali silicate | 20 | Spray | E |
| 920 | 51 | Alkali silicate | 5 | Spray | G |
| 921 | 83 | Alkyl silicate | 20 | Spray | E |
| 922 | 82 | Alkali silicate | 15 | Brush | E |
| 923 | 88 | Alkyl silicate | 57 | Brush | E |
| 924 | 85 | Alkali silicate | 13 | Brush | E |
| 925 | 86 | Alkyl silicate | 22 | Brush | E |
| 926 | 47 | Alkali silicate | 20 | Spray | E |
| 927 | 48 | Alkyl silicate | 27 | Spray | E |
| 928 | 50 | Alkali silicate | 15 | Spray | E |
| 929 | 51 | Alkyl silicate | 35 | Spray | E |
| 930 | 52 | Alkali silicate | 34 | Brush | E |
| 931 | 88 | Alkyl silicate | 45 | Brush | E |
| 932 | 89 | Alkyl silicate | 52 | Brush | E |
| 933 | 86 | Alkyl silicate | 23 | Brush | E |
| 934 | 87 | Alkali silicate | 5 | Spray | E |
| 935 | 86 | Alkyl silicate | 52 | Brush | E |
| 936 | 46 | Alkali silicate | 150 | Brush | E |

TABLE 50

| Invention Example No | Granularity distribution (peak diameter) of Zn metal grains/Zn alloy grains (μm) Fine metal | Granularity distribution (peak diameter) of Zn metal grains/Zn alloy grains (μm) Coarse metal | Percent of fine-grain metal grains among Zn metal grains/ Zn alloy grains (Vol %) | Chemical component content of Zn metal grains/Zn alloy grains (Mass %) Zn | Chemical component content of Zn metal grains/Zn alloy grains (Mass %) Mg | Chemical component content of Zn metal grains/Zn alloy grains (Mass %) Al | Chemical component content of Zn metal grains/Zn alloy grains (Mass %) Si | Zn alloy grain fracture surfaces or cracks present? | Ave aspect ratio | Mg solid solution phase and Zn—Mg intermetallic compounds present on grain surfaces? | Any of MgZn2, Mg2Zn11, Mg2Zn3, MgZn, Mg7Zn3 present? |
|---|---|---|---|---|---|---|---|---|---|---|---|
| 937 | 2.36 | 9.57 | 37.61 | 86.9 | 10.3 | 1.6 | 1.2 | Yes | 1.05 | Yes | Yes |
| 938 | 2.24 | 10.79 | 45.60 | 92.98 | 7 | 0.02 | 0 | Yes | 1.12 | Yes | Yes |
| 939 | 2.46 | 10.93 | 46.70 | 75.5 | 23.5 | 1 | 0 | Yes | 1.11 | Yes | Yes |
| 940 | 1.56 | 11.02 | 41.22 | 82.5 | 17.5 | 0 | 0 | No | 1.08 | Yes | Yes |
| 941 | 1.24 | 11.18 | 45.68 | 80.1 | 12.4 | 7.5 | 0 | Yes | 1.47 | Yes | Yes |
| 942 | 1.68 | 11.42 | 22.02 | 85.09 | 14.9 | 0 | 0.01 | Yes | 1.50 | Yes | Yes |
| 943 | 2.65 | 10.8 | 37.03 | 78.7 | 20.7 | 0 | 0.6 | No | 1.13 | Yes | Yes |
| 944 | 2.22 | 10.65 | 28.46 | 91.29 | 8.6 | 0 | 0.11 | Yes | 1.26 | Yes | Yes |
| 945 | 2.45 | 11.34 | 43.47 | 85.8 | 14.2 | 0 | 0 | Yes | 1.14 | Yes | Yes |
| 946 | 2.23 | 11.62 | 35.19 | 98.12 | 0.08 | 0 | 1.8 | Yes | 1.49 | Yes | Yes |
| 947 | 2.26 | 11.15 | 73.02 | 83.46 | 15.2 | 0 | 1.34 | No | 1.34 | Yes | Yes |
| 948 | 2.72 | 12.38 | 56.20 | 73.17 | 17.4 | 9 | 0.43 | Yes | 1.18 | Yes | Yes |
| 949 | 2.13 | 12.55 | 35.86 | 98.6 | 0.8 | 0.6 | 0 | Yes | 1.17 | Yes | Yes |
| 950 | 1.98 | 9.34 | 93.45 | 93.55 | 6.4 | 0.05 | 0 | Yes | 1.48 | Yes | Yes |
| 951 | 2.02 | 9.58 | 30.66 | 96.78 | 3.2 | 0.02 | 0 | No | 1.49 | Yes | Yes |
| 952 | 2.21 | 9.88 | 74.21 | 83 | 9.2 | 7.8 | 0 | Yes | 1.27 | Yes | Yes |
| 953 | 2.55 | 10 | 55.39 | 70.92 | 19.2 | 9.88 | 0 | Yes | 1.17 | Yes | Yes |
| 954 | 1.92 | 10.67 | 30.08 | 80.25 | 15.1 | 4.65 | 0 | Yes | 1.16 | Yes | Yes |
| 955 | 1.96 | 11.89 | 45.09 | 81.85 | 14.5 | 3.65 | 0 | Yes | 1.27 | Yes | Yes |
| 956 | 2.11 | 12.03 | 41.41 | 89.45 | 10.5 | 0.05 | 0 | Yes | 1.27 | Yes | Yes |
| 957 | 2.97 | 12.12 | 17.75 | 87.3 | 7.5 | 5.2 | 0 | Yes | 1.49 | Yes | Yes |

| Invention Example No | Coating details Total metal grain content of coat (Mass %) | Coating details Base resin type | Coating details Coat thickness (μm) | Coating details Coating method | Corrosion Test Results |
|---|---|---|---|---|---|
| 937 | 49 | Alkyl silicate | 60 | Brush | E |
| 938 | 35 | Alkali silicate | 15 | Spray | E |
| 939 | 37 | Alkyl silicate | 24 | Spray | E |
| 940 | 36 | Alkali silicate | 34 | Spray | E |
| 941 | 38 | Alkyl silicate | 20 | Brush | E |
| 942 | 48 | Alkali silicate | 200 | Brush | E |
| 943 | 46 | Alkyl silicate | 56 | Brush | E |
| 944 | 51 | Alkali silicate | 34 | Spray | E |
| 945 | 46 | Alkyl silicate | 2 | Spray | G |
| 946 | 38 | Alkali silicate | 15 | Spray | E |
| 947 | 48 | Alkali silicate | 10 | Spray | E |
| 948 | 52 | Alkyl silicate | 125 | Brush | E |
| 949 | 30 | Alkali silicate | 24 | Brush | E |
| 950 | 76 | Alkyl silicate | 110 | Brush | E |
| 951 | 72 | Alkali silicate | 24 | Brush | E |
| 952 | 81 | Alkyl silicate | 2 | Spray | G |
| 953 | 64 | Alkali silicate | 37 | Spray | E |
| 954 | 69 | Alkyl silicate | 113 | Brush | E |
| 955 | 83 | Alkali silicate | 2 | Spray | G |
| 956 | 30 | Alkyl silicate | 75 | Brush | E |
| 957 | 83 | Alkali silicate | 30 | Brush | E |

TABLE 51

| Invention Example No | Granularity distribution (peak diameter) of Zn metal grains/Zn alloy grains (μm) Fine metal | Granularity distribution (peak diameter) of Zn metal grains/Zn alloy grains (μm) Coarse metal | Percent of fine-grain metal grains among Zn metal grains/ Zn alloy grains (Vol %) | Chemical component content of Zn metal grains/Zn alloy grains (Mass %) Zn | Mg | Al | Si | Zn alloy grain fracture surfaces or cracks present? | Ave aspect ratio | Mg solid solution phase and Zn—Mg intermetallic compounds present on grain surfaces? | Any of MgZn2, Mg2Zn11, Mg2Zn3, MgZn, Mg7Zn3 present? |
|---|---|---|---|---|---|---|---|---|---|---|---|
| 958 | 2.36 | 12.28 | 32.76 | 93.9 | 6.1 | 0 | 0.001 | Yes | 1.29 | Yes | Yes |
| 959 | 3.05 | 12.52 | 30.89 | 82.55 | 16.8 | 0.05 | 0.6 | Yes | 1.23 | Yes | Yes |
| 960 | 2.57 | 11.9 | 45.90 | 70.7 | 27.5 | 1 | 0.8 | Yes | 1.23 | Yes | Yes |
| 961 | 2.65 | 11.75 | 42.22 | 94.6 | 2.9 | 0 | 2.5 | Yes | 1.23 | Yes | Yes |
| 962 | 2.54 | 12.44 | 18.56 | 94 | 4.5 | 0 | 1.5 | No | 1.23 | Yes | Yes |
| 963 | 2.85 | 12.03 | 33.57 | 99.43 | 0.07 | 0 | 0.5 | Yes | 1.27 | Yes | Yes |
| 964 | 2.75 | 10.61 | 31.70 | 96.82 | 3.1 | 0.04 | 0.04 | Yes | 1.23 | Yes | Yes |
| 965 | 2.46 | 11.3 | 46.71 | 76.3 | 20.5 | 1 | 2.2 | Yes | 1.36 | Yes | Yes |
| 966 | 2.71 | 11.58 | 47.89 | 68.84 | 29.5 | 0.06 | 1.6 | Yes | 1.11 | Yes | Yes |
| 967 | 2.36 | 11.11 | 24.23 | 92.33 | 7.6 | 0.07 | 0 | Yes | 1.02 | Yes | Yes |
| 968 | 2.16 | 12.34 | 39.24 | 95.2 | 0.7 | 1.2 | 2.9 | Yes | 1.05 | Yes | Yes |
| 969 | 2.46 | 12.51 | 37.37 | 91.8 | 4.6 | 1.8 | 1.8 | Yes | 1.24 | Yes | Yes |
| 970 | 2.49 | 11.64 | 50.38 | 82 | 8.3 | 9.2 | 0.5 | Yes | 1.33 | Yes | Yes |
| 971 | 1.63 | 9.16 | 37.14 | 88.2 | 11.8 | 0 | 0 | Yes | 1.27 | Yes | Yes |
| 972 | 1.51 | 9.46 | 13.48 | 86.06 | 12.9 | 0 | 1.04 | Yes | 1.50 | Yes | Yes |
| 973 | 3.05 | 9.54 | 40.05 | 99.34 | 0.6 | 0 | 0.06 | Yes | 1.13 | Yes | Yes |
| 974 | 2.57 | 9.56 | 38.18 | 89.51 | 9.5 | 0 | 0.99 | No | 1.04 | Yes | Yes |
| 975 | 2.65 | 9.46 | 7.63 | 88.3 | 11.7 | 0 | 0 | Yes | 1.02 | Yes | Yes |
| 976 | 2.54 | 11.99 | 37.95 | 89.9 | 9.4 | 0.7 | 0 | Yes | 1.08 | Yes | Yes |
| 977 | 2.85 | 12.08 | 14.29 | 87.8 | 11.7 | 0.5 | 0 | Yes | 1.15 | Yes | Yes |

| Invention Example No | Coating details Total metal grain content of coat (Mass %) | Base resin type | Coat thickness (μm) | Coating method | Corrosion Test Results |
|---|---|---|---|---|---|
| 958 | 75 | Alkyl silicate | 34 | Brush | E |
| 959 | 76 | Epoxy resin | 124 | Brush | E |
| 960 | 72 | Acrylic resin | 15 | Spray | E |
| 961 | 71 | Urethane resin | 23 | Spray | E |
| 962 | 82 | Polyester resin | 157 | Brush | E |
| 963 | 81 | Epoxy resin | 26 | Spray | E |
| 964 | 83 | Acrylic resin | 38 | Spray | E |
| 965 | 50 | Urethane resin | 160 | Brush | E |
| 966 | 72 | Polyester resin | 27 | Brush | E |
| 967 | 47 | Epoxy resin | 180 | Brush | E |
| 968 | 47 | Acrylic resin | 26 | Spray | E |
| 969 | 52 | Urethane resin | 180 | Brush | E |
| 970 | 52 | Polyester resin | 15 | Spray | E |
| 971 | 50 | Epoxy resin | 2 | Spray | G |
| 972 | 46 | Acrylic resin | 28 | Spray | E |
| 973 | 47 | Urethane resin | 30 | Spray | E |
| 974 | 83 | Polyester resin | 2 | Spray | G |
| 975 | 52 | Epoxy resin | 157 | Brush | E |
| 976 | 89 | Acrylic resin | 28 | Brush | E |
| 977 | 85 | Alkyl silicate | 130 | Brush | E |

TABLE 52

| Invention Example No | Granularity distribution (peak diameter) of Zn metal grains/Zn alloy grains (μm) Fine metal | Granularity distribution (peak diameter) of Zn metal grains/Zn alloy grains (μm) Coarse metal | Percent of fine-grain metal grains among Zn metal grains/Zn alloy grains (Vol %) | Chemical component content of Zn metal grains/Zn alloy grains (Mass %) Zn | Chemical component content of Zn metal grains/Zn alloy grains (Mass %) Mg | Chemical component content of Zn metal grains/Zn alloy grains (Mass %) Al | Chemical component content of Zn metal grains/Zn alloy grains (Mass %) Si | Zn alloy grain fracture surfaces or cracks present? | Ave aspect ratio | Mg solid solution phase and Zn—Mg intermetallic compounds present on grain surfaces? | Any of MgZn2, Mg2Zn11, Mg2Zn3, MgZn, Mg7Zn3 present? |
|---|---|---|---|---|---|---|---|---|---|---|---|
| 978 | 2.75 | 12.24 | 40.86 | 95.6 | 4.2 | 0.2 | 0 | Yes | 1.34 | Yes | Yes |
| 979 | 2.46 | 12.48 | 97.50 | 97.13 | 2.8 | 0.07 | 0 | Yes | 1.25 | Yes | Yes |
| 980 | 2.71 | 11.86 | 13.30 | 86.1 | 13.9 | 0 | 0 | Yes | 1.19 | Yes | Yes |
| 981 | 2.36 | 11.71 | 43.62 | 82.6 | 14.6 | 1.6 | 1.2 | No | 1.18 | Yes | Yes |
| 982 | 2.46 | 11.35 | 56.93 | 72.95 | 26.4 | 0.65 | 0 | Yes | 1.24 | Yes | Yes |
| 983 | 1.45 | 12.02 | 36.59 | 83.23 | 16.5 | 0.27 | 0 | Yes | 1.11 | Yes | Yes |
| 984 | 2.42 | 13.24 | 39.95 | 79.4 | 19.5 | 0.45 | 0.65 | Yes | 1.27 | Yes | Yes |
| 985 | 2.11 | 9.46 | 86.50 | 97.08 | 1.6 | 0.33 | 0.99 | Yes | 1.31 | Yes | Yes |
| 986 | 2.97 | 13.47 | 32.87 | 90.5 | 6 | 1 | 2.5 | Yes | 1.26 | Yes | Yes |
| 987 | 2.36 | 9.46 | 16.23 | 88.93 | 8.4 | 0.87 | 1.8 | Yes | 1.14 | Yes | Yes |
| 988 | 3.05 | 13.87 | 37.40 | 86.7 | 13.3 | 0 | 0 | Yes | 1.34 | Yes | Yes |
| 989 | 2.57 | 13.25 | 40.76 | 81.4 | 18.6 | 0. | 0 | Yes | 1.16 | Yes | Yes |
| 990 | 2.65 | 13.1 | 87.31 | 97.34 | 1.8 | 0.86 | 0 | No | 1.47 | Yes | Yes |
| 991 | 2.12 | 9.08 | 92.50 | 95.25 | 4.1 | 0.65 | 0 | Yes | 1.48 | Yes | Yes |
| 992 | 1.65 | 9.87 | 17.93 | 82.87 | 16.7 | 0.43 | 0 | No | 1.49 | Yes | Yes |
| 993 | 2.35 | 9.46 | 44.50 | 99 | 0.4 | 0.6 | 0 | Yes | 1.34 | Yes | Yes |
| 994 | 1.63 | 9.28 | 96.50 | 89.35 | 10.6 | 0.05 | 0 | Yes | 1.29 | Yes | Yes |
| 995 | 2.64 | 9.45 | 16.94 | 93.08 | 6.9 | 0.02 | 0 | Yes | 1.18 | Yes | Yes |
| 996 | 2.35 | 9.25 | 88.12 | 99.82 | 0.05 | 0.06 | 0.07 | Yes | 1.48 | Yes | Yes |
| 997 | 2.31 | 9.46 | 60.57 | 91.56 | 6.4 | 1.05 | 0.99 | Yes | 1.27 | Yes | Yes |

| Invention Example No | Coating details Total metal grain content of coat (Mass %) | Coating details Base resin type | Coating details Coat thickness (μm) | Coating details Coating method | Corrosion Test Results |
|---|---|---|---|---|---|
| 978 | 53 | Alkyl silicate | 29 | Brush | E |
| 979 | 88 | Epoxy resin | 30 | Brush | E |
| 980 | 85 | Acrylic resin | 120 | Brush | E |
| 981 | 52 | Urethane resin | 187 | Brush | E |
| 982 | 83 | Polyester resin | 28 | Spray | E |
| 983 | 88 | Epoxy resin | 5 | Spray | E |
| 984 | 49 | Acrylic resin | 35 | Spray | E |
| 985 | 50 | Urethane resin | 5 | Spray | G |
| 986 | 51 | Polyester resin | 200 | Brush | E |
| 987 | 83 | Alkali silicate | 25 | Spray | E |
| 988 | 82 | Alkali silicate | 15 | Spray | E |
| 989 | 88 | Alkyl silicate | 20 | Spray | E |
| 990 | 85 | Alkali silicate | 18 | Spray | E |
| 991 | 87 | Alkyl silicate | 22 | Spray | E |
| 992 | 86 | Alkali silicate | 19 | Spray | E |
| 993 | 46 | Alkyl silicate | 29 | Spray | E |
| 994 | 49 | Alkali silicate | 23 | Spray | E |
| 995 | 35 | Alkyl silicate | 21 | Spray | E |
| 996 | 30 | Alkali silicate | 19 | Spray | E |
| 997 | 76 | Alkyl silicate | 15 | Spray | E |

TABLE 53

| Invention Example No | Granularity distribution (peak diameter) of Zn metal grains/Zn alloy grains (μm) | | Percent of fine-grain metal grains among Zn metal grains/ Zn alloy grains (Vol %) | Chemical component content of Zn metal grains/Zn alloy grains (Mass %) | | | | Zn alloy grain fracture surfaces or cracks present? | Ave aspect ratio | Mg solid solution phase and Zn—Mg intermetallic compounds present on grain surfaces? |
|---|---|---|---|---|---|---|---|---|---|---|
| | Fine metal | Coarse metal | | Zn | Mg | Al | Si | | | |
| 998 | 2.62 | 9.46 | 39.48 | 93.36 | 3.5 | 2.6 | 0.54 | Yes | 1.17 | Yes |
| 999 | 2.52 | 9.46 | 15.82 | 82.13 | 17.5 | 0.05 | 0.32 | Yes | 1.27 | Yes |
| 1000 | 2.24 | 13.32 | 49.57 | 91.2 | 3.6 | 5.2 | 0 | No | 1.27 | Yes |
| 1001 | 0.05 | 6.54 | 86.52 | 94.1 | 5.9 | 0 | 0.001 | Yes | 1.48 | Yes |
| 1002 | 2.42 | 6.35 | 90.98 | 83.2 | 16.2 | 0 | 0.6 | No | 1.49 | Yes |
| 1003 | 0.11 | 7.54 | 67.32 | 76.7 | 22.5 | 0 | 0.8 | Yes | 1.34 | Yes |
| 1004 | 1.92 | 8.64 | 82.33 | 96.52 | 3.4 | 0.04 | 0.04 | Yes | 1.23 | Yes |
| 1005 | 0.46 | 6.45 | 73.76 | 68.3 | 26.5 | 3 | 2.2 | Yes | 1.23 | Yes |
| 1006 | 0.77 | 6.48 | 88.77 | 72.84 | 25.5 | 0.06 | 1.6 | Yes | 1.23 | Yes |
| 1007 | 2.35 | 9.25 | 45.02 | 87.2 | 12.8 | 0 | 0 | Yes | 1.05 | Yes |
| 1008 | 2.33 | 9.46 | 15.2 | 91.5 | 8.5 | 0 | 0 | Yes | 1.06 | Yes |
| 1009 | 1.95 | 9.32 | 51.41 | 75.23 | 24.5 | 0.27 | 0 | Yes | 1.38 | Yes |
| 1010 | 2.15 | 9.22 | 45.46 | 77.48 | 18.4 | 2.55 | 1.57 | Yes | 1.06 | Yes |
| 1011 | 2.23 | 11.62 | 35.19 | 72.62 | 0.08 | 25.5 | 1.8 | Yes | 1.49 | Yes |
| 1012 | 2.26 | 11.15 | 73.02 | 64.06 | 15.2 | 19.4 | 1.34 | No | 1.34 | Yes |
| 1013 | 1.98 | 9.34 | 93.45 | 83 | 6.4 | 10.6 | 0 | Yes | 1.48 | Yes |
| 1014 | 2.02 | 9.58 | 30.66 | 86.4 | 3.2 | 10.4 | 0 | No | 1.49 | Yes |
| 1015 | 2.36 | 12.28 | 32.76 | 80.4 | 6.1 | 13.5 | 0.001 | Yes | 1.29 | Yes |
| 1016 | 3.05 | 12.52 | 30.89 | 70.1 | 16.8 | 12.5 | 0.6 | Yes | 1.23 | Yes |
| 1017 | 2.57 | 11.9 | 45.90 | 60.9 | 27.5 | 10.8 | 0.8 | Yes | 1.23 | Yes |

| Invention Example No | Any of MgZn2, Mg2Zn11, Mg2Zn3, MgZn, Mg7Zn3 present? | Coating details | | | | Corrosion Test Results |
|---|---|---|---|---|---|---|
| | | Total metal grain content of coat (Mass %) | Base resin type | Coat thickness (μm) | Coating method | |
| 998 | Yes | 72 | Alkali silicate | 18 | Spray | E |
| 999 | Yes | 30 | Alkyl silicate | 22 | Spray | E |
| 1000 | Yes | 83 | Alkyl silicate | 21 | Spray | E |
| 1001 | Yes | 75 | Alkyl silicate | 29 | Spray | E |
| 1002 | Yes | 76 | Alkali silicate | 23 | Spray | E |
| 1003 | Yes | 72 | Alkyl silicate | 21 | Spray | E |
| 1004 | Yes | 83 | Alkali silicate | 19 | Spray | E |
| 1005 | Yes | 50 | Alkyl silicate | 21 | Spray | E |
| 1006 | Yes | 72 | Alkali silicate | 19 | Spray | E |
| 1007 | Yes | 50 | Acrylic resin | 654 | Spray | E |
| 1008 | Yes | 48 | Alkali silicate | 700 | Spray | E |
| 1009 | Yes | 75 | Alkyl silicate | 555 | Spray | E |
| 1010 | Yes | 55 | Alkyl silicate | 321 | Spray | E |
| 1011 | Yes | 38 | Alkyl silicate | 152 | Brush | E |
| 1012 | Yes | 48 | Urethane resin | 674 | Spray | E |
| 1013 | Yes | 76 | Polyester resin | 325 | Spray | E |
| 1014 | Yes | 72 | Alkyl silicate | 665 | Spray | E |
| 1015 | Yes | 75 | Alkyl silicate | 354 | Brush | E |
| 1016 | Yes | 76 | Alkyl silicate | 165 | Spray | E |
| 1017 | Yes | 72 | Urethane resin | 354 | Spray | E |

TABLE 54

| Invention Example No | Granularity distribution (Ave diameter) of Zn metal grains/Zn alloy grains (μm) | | Percent of fine-grain metal grains among Zn metal grains/ Zn alloy grains (Vol %) | Chemical component content of Zn metal grains/Zn alloy grains (Mass %) | | | | Zn alloy grain fracture surfaces or cracks present? | Ave aspect ratio | Mg solid solution phase and Zn—Mg intermetallic compounds present on grain surfaces? |
|---|---|---|---|---|---|---|---|---|---|---|
| | Fine metal | Coarse metal | | Zn | Mg | Al | Si | | | |
| 1018 | 2.35 | 9.25 | 35.87 | 88.8 | 11.2 | 0 | 0 | Yes | 1.12 | Yes |
| 1019 | 2.57 | 9.56 | 42.04 | 90.6 | 9.4 | 0 | 0 | No | 1.38 | Yes |
| 1020 | 2.56 | 9.84 | 6.55 | 81.45 | 18.5 | 0 | 0.05 | Yes | 1.22 | Yes |
| 1021 | 2.21 | 9.75 | 43.60 | 99.97 | 0.03 | 0 | 0 | Yes | 1.14 | Yes |
| 1022 | 2.64 | 9.85 | 44.12 | 98.4 | 1.6 | 0 | 0 | No | 1.02 | Yes |
| 1023 | 1.99 | 8.56 | 37.21 | 93.2 | 6.8 | 0 | 0 | Yes | 1.05 | Yes |
| 1024 | 2.94 | 8.21 | 43.38 | 84.5 | 13.9 | 0 | 1.6 | No | 1.36 | No |
| 1025 | 2.58 | 8.33 | 13.52 | 98.1 | 1.9 | 0 | 0 | Yes | 1.11 | No |
| 1026 | 2.37 | 8 | 44.94 | 94.3 | 5.7 | 0 | 0 | No | 1.07 | Yes |
| 1027 | 2.15 | 9.22 | 45.46 | 90.8 | 9.2 | 0 | 0 | No | 1.42 | Yes |
| 1028 | 2.96 | 9.36 | 35.96 | 83.3 | 15.4 | 0 | 1.3 | Yes | 1.38 | No |
| 1029 | 2.85 | 9.45 | 42.13 | 79.84 | 18.6 | 0 | 1.56 | Yes | 1.22 | No |
| 1030 | 2.94 | 9.61 | 7.56 | 96.4 | 3.6 | 0 | 0 | Yes | 1.14 | Yes |
| 1031 | 2.11 | 9.85 | 43.69 | 94.6 | 5.4 | 0 | 0 | Yes | 1.13 | Yes |
| 1032 | 2.68 | 9.23 | 44.21 | 92.4 | 7.6 | 0 | 0 | Yes | 1.02 | No |
| 1033 | 2.99 | 9.08 | 39.51 | 75.5 | 24.5 | 0 | 0 | Yes | 1.06 | Yes |
| 1034 | 2.78 | 9.87 | 45.68 | 82.4 | 17.6 | 0 | 0 | Yes | 1.05 | Yes |
| 1035 | 2.96 | 9.46 | 65.58 | 98.6 | 1.4 | 0 | 0 | Yes | 1.24 | No |
| 1036 | 2.85 | 9.28 | 47.24 | 78.5 | 21.5 | 0 | 0 | Yes | 1.33 | No |
| 1037 | 2.64 | 9.45 | 47.76 | 89.6 | 10.4 | 0 | 0 | Yes | 1.27 | Yes |

| Invention Example No | Any of MgZn2, Mg2Zn11, Mg2Zn3, MgZn, Mg7Zn3 present? | Coating details | | | | Corrosion Test Results |
|---|---|---|---|---|---|---|
| | | Total metal grain content of coat (Mass %) | Base resin type | Coat thickness (μm) | Coating method | |
| 1018 | Yes | 49 | Alkyl silicate | 14 | Spray | E |
| 1019 | Yes | 89 | Urethane resin | 55 | Spray | E |
| 1020 | Yes | 90 | Alkyl silicate | 8 | Spray | E |
| 1021 | Yes | 86 | Urethane resin | 122 | Brush | E |
| 1022 | Yes | 48 | Alkyl silicate | 555 | Spray | E |
| 1023 | Yes | 47 | Alkali silicate | 19 | Spray | E |
| 1024 | Yes | 47 | Alkyl silicate | 25 | Brush | E |
| 1025 | Yes | 47 | Alkyl silicate | 58 | Spray | E |
| 1026 | Yes | 52 | Alkyl silicate | 685 | Spray | E |
| 1027 | Yes | 52 | Alkali silicate | 19 | Brush | E |
| 1028 | Yes | 52 | Urethane resin | 700 | Spray | E |
| 1029 | Yes | 88 | Alkyl silicate | 77 | Spray | E |
| 1030 | Yes | 87 | Alkyl silicate | 54 | Spray | E |
| 1031 | Yes | 89 | Alkyl silicate | 64 | Spray | E |
| 1032 | Yes | 90 | Alkyl silicate | 34 | Brush | E |
| 1033 | Yes | 91 | Alkali silicate | 28 | Spray | E |
| 1034 | Yes | 46 | Urethane resin | 109 | Brush | E |
| 1035 | Yes | 47 | Alkyl silicate | 15 | Spray | E |
| 1036 | Yes | 47 | Alkyl silicate | 14 | Spray | E |
| 1037 | Yes | 49 | Alkyl silicate | 18 | Spray | E |

TABLE 55

| Invention Example No | Granularity distribution (Ave diameter) of Zn metal grains/Zn alloy grains (μm) Fine metal | Granularity distribution (Ave diameter) of Zn metal grains/Zn alloy grains (μm) Coarse metal | Percent of fine-grain metal grains among Zn metal grains/ Zn alloy grains (Vol %) | Chemical component content of Zn metal grains/Zn alloy grains (Mass %) Zn | Chemical component content of Zn metal grains/Zn alloy grains (Mass %) Mg | Chemical component content of Zn metal grains/Zn alloy grains (Mass %) Al | Chemical component content of Zn metal grains/Zn alloy grains (Mass %) Si | Zn alloy grain fracture surfaces or cracks present? | Ave aspect ratio | Mg solid solution phase and Zn—Mg intermetallic compounds present on grain surfaces? |
|---|---|---|---|---|---|---|---|---|---|---|
| 1038 | 2.35 | 9.25 | 45.02 | 87.2 | 12.8 | 0 | 0 | Yes | 1.05 | Yes |
| 1039 | 2.12 | 9.46 | 47.02 | 92.2 | 7.8 | 0 | 0 | Yes | 1.22 | No |
| 1040 | 2.34 | 9.46 | 7.66 | 70.5 | 29.5 | 0 | 0 | Yes | 1.13 | No |
| 1041 | 2.33 | 9.46 | 15.20 | 91.5 | 8.5 | 0 | 0 | Yes | 1.06 | Yes |
| 1042 | 2.23 | 9.06 | 43.16 | 74.5 | 25.5 | 0 | 0 | Yes | 1.05 | Yes |
| 1043 | 2.12 | 9.3 | 49.33 | 99.93 | 0.07 | 0 | 0 | Yes | 1.24 | Yes |
| 1044 | 2.21 | 8.68 | 19.47 | 89.2 | 10.8 | 0 | 0 | No | 1.05 | Yes |
| 1045 | 1.38 | 8.53 | 69.55 | 86 | 11.2 | 1.6 | 1.2 | No | 1.12 | Yes |
| 1046 | 1.95 | 9.32 | 51.41 | 75.23 | 24.5 | 0.27 | 0 | Yes | 1.38 | No |
| 1047 | 2.26 | 8.95 | 75.88 | 82.6 | 17.4 | 0 | 0 | Yes | 1.13 | No |
| 1048 | 2.05 | 12.54 | 48.08 | 98.7 | 1.3 | 0 | 0 | Yes | 1.33 | Yes |
| 1049 | 1.65 | 8.7 | 66.85 | 80.5 | 19.5 | 0 | 0 | Yes | 1.27 | Yes |
| 1050 | 2.35 | 8.55 | 7.68 | 88.85 | 10.8 | 0.05 | 0.3 | No | 1.23 | No |
| 1051 | 1.62 | 8.91 | 8.64 | 87.7 | 11.9 | 0.4 | 0 | Yes | 1.11 | Yes |
| 1052 | 1.88 | 9.91 | 16.58 | 90.5 | 9.5 | 0 | 0 | Yes | 1.42 | Yes |
| 1053 | 2.35 | 9.25 | 35.87 | 89.5 | 10.5 | 0 | 0 | Yes | 1.06 | No |
| 1054 | 2.57 | 9.56 | 42.04 | 84.9 | 15.1 | 0 | 0 | Yes | 1.05 | Yes |
| 1055 | 2.56 | 9.84 | 38.41 | 83.2 | 16.8 | 0 | 0 | Yes | 1.07 | Yes |
| 1056 | 2.21 | 9.75 | 6.99 | 89.4 | 10.6 | 0 | 0 | Yes | 1.42 | No |
| 1057 | 2.64 | 9.85 | 44.12 | 84.3 | 13.3 | 2.4 | 0 | Yes | 1.38 | Yes |

| Invention Example No | Any of MgZn2, Mg2Zn11, Mg2Zn3, MgZn, Mg7Zn3 present? | Coating details Total metal grain content of coat (Mass %) | Coating details Base resin type | Coating details Coat thickness (μm) | Coating details Coating method | Corrosion Test Results |
|---|---|---|---|---|---|---|
| 1038 | Yes | 50 | Alkali silicate | 2 | Spray | G |
| 1039 | Yes | 87 | Alkyl silicate | 37 | Spray | E |
| 1040 | Yes | 83 | Alkali silicate | 12 | Spray | E |
| 1041 | Yes | 48 | Alkyl silicate | 160 | Brush | E |
| 1042 | Yes | 51 | Alkali silicate | 5 | Brush | G |
| 1043 | Yes | 51 | Alkyl silicate | 56 | Brush | E |
| 1044 | Yes | 87 | Alkali silicate | 2 | Spray | G |
| 1045 | Yes | 85 | Alkyl silicate | 18 | Spray | E |
| 1046 | Yes | 86 | Alkyl silicate | 23 | Spray | E |
| 1047 | Yes | 50 | Epoxy resin | 30 | Brush | E |
| 1048 | Yes | 51 | Acrylic resin | 77 | Brush | E |
| 1049 | Yes | 51 | Urethane resin | 655 | Brush | E |
| 1050 | Yes | 80 | Polyester resin | 47 | Spray | E |
| 1051 | Yes | 46 | Epoxy resin | 43 | Spray | E |
| 1052 | Yes | 51 | Acrylic resin | 52 | Brush | E |
| 1053 | Yes | 86 | Urethane resin | 20 | Brush | E |
| 1054 | Yes | 85 | Polyester resin | 200 | Brush | E |
| 1055 | Yes | 82 | Alkali silicate | 22 | Spray | E |
| 1056 | Yes | 81 | Alkyl silicate | 25 | Spray | E |
| 1057 | Yes | 46 | Alkali silicate | 14 | Spray | E |

TABLE 56

| Invention Example No | Granularity distribution (Ave diameter) of Zn metal grains/Zn alloy grains (μm) Fine metal | Granularity distribution (Ave diameter) of Zn metal grains/Zn alloy grains (μm) Coarse metal | Percent of fine-grain metal grains among Zn metal grains/Zn alloy grains (Vol %) | Chemical component content of Zn metal grains/Zn alloy grains (Mass %) Zn | Chemical component content of Zn metal grains/Zn alloy grains (Mass %) Mg | Chemical component content of Zn metal grains/Zn alloy grains (Mass %) Al | Chemical component content of Zn metal grains/Zn alloy grains (Mass %) Si | Zn alloy grain fracture surfaces or cracks present? | Ave aspect ratio | Mg solid solution phase and Zn—Mg intermetallic compounds present on grain surfaces? |
|---|---|---|---|---|---|---|---|---|---|---|
| 1058 | 2.65 | 8.56 | 66.99 | 98.6 | 1.4 | 0 | 0 | No | 1.22 | Yes |
| 1059 | 2.94 | 8.21 | 43.38 | 76.45 | 23.5 | 0 | 0.05 | Yes | 1.14 | Yes |
| 1060 | 2.58 | 8.33 | 39.75 | 91.1 | 8.9 | 0 | 0 | Yes | 1.13 | Yes |
| 1061 | 2.37 | 8 | 65.38 | 85.1 | 14.9 | 0 | 0 | Yes | 1.02 | Yes |
| 1062 | 2.15 | 9.22 | 45.46 | 77.48 | 18.4 | 2.55 | 1.57 | Yes | 1.06 | Yes |
| 1063 | 2.96 | 9.36 | 22.55 | 97.9 | 2.1 | 0 | 0 | Yes | 1.05 | Yes |
| 1064 | 2.85 | 9.45 | 42.13 | 94.8 | 5.2 | 0 | 0 | Yes | 1.24 | Yes |
| 1065 | 2.94 | 9.61 | 38.50 | 84.6 | 15.4 | 0 | 0 | Yes | 1.33 | Yes |
| 1066 | 2.11 | 9.85 | 64.13 | 89.3 | 10.7 | 0 | 0 | Yes | 1.27 | Yes |
| 1067 | 2.68 | 9.23 | 44.21 | 83.3 | 16.7 | 0 | 0 | Yes | 1.05 | Yes |
| 1068 | 2.99 | 9.08 | 39.51 | 80.05 | 19.6 | 0.35 | 0 | No | 1.12 | Yes |
| 1069 | 1.82 | 9.87 | 78.64 | 85.5 | 14.5 | 0 | 0 | No | 1.23 | Yes |
| 1070 | 1.42 | 9.46 | 42.05 | 85 | 14.2 | 0 | 0.8 | No | 1.36 | Yes |
| 1071 | 2.12 | 9.28 | 64.58 | 87.3 | 12.7 | 0 | 0 | No | 1.11 | Yes |
| 1072 | 1.92 | 9.45 | 47.76 | 89.5 | 10.5 | 0 | 0 | Yes | 1.07 | Yes |
| 1073 | 2.11 | 9.63 | 24.10 | 87.3 | 11.8 | 0 | 0.9 | Yes | 1.42 | Yes |
| 1074 | 2.97 | 9.16 | 39.11 | 86.4 | 12.8 | 0.5 | 0.3 | Yes | 1.38 | Yes |
| 1075 | 2.36 | 10.39 | 19.65 | 93.8 | 6.2 | 0 | 0 | Yes | 1.22 | Yes |
| 1076 | 3.05 | 10.56 | 65.39 | 83.8 | 16.2 | 0 | 0 | Yes | 1.14 | Yes |
| 1077 | 2.15 | 10.74 | 48.57 | 80.4 | 19.6 | 0 | 0 | Yes | 1.13 | Yes |

| Invention Example No | Any of MgZn2, Mg2Zn11, Mg2Zn3, MgZn, Mg7Zn3 present? | Coating details Total metal grain content of coat (Mass %) | Coating details Base resin type | Coating details Coat thickness (μm) | Coating details Coating method | Corrosion Test Results |
|---|---|---|---|---|---|---|
| 1058 | Yes | 47 | Urethane resin | 112 | Spray | E |
| 1059 | Yes | 48 | Alkali silicate | 24 | Spray | E |
| 1060 | Yes | 51 | Urethane resin | 150 | Spray | E |
| 1061 | Yes | 53 | Alkali silicate | 18 | Spray | E |
| 1062 | Yes | 88 | Alkyl silicate | 19 | Brush | E |
| 1063 | Yes | 85 | Alkyl silicate | 24 | Spray | E |
| 1064 | Yes | 83 | Urethane resin | 99 | Spray | E |
| 1065 | Yes | 82 | Alkyl silicate | 7 | Spray | E |
| 1066 | Yes | 83 | Epoxy resin | 100 | Spray | E |
| 1067 | Yes | 47 | Alkyl silicate | 27 | Brush | E |
| 1068 | Yes | 51 | Alkali silicate | 15 | Spray | E |
| 1069 | Yes | 52 | Alkyl silicate | 14 | Spray | E |
| 1070 | Yes | 51 | Urethane resin | 55 | Spray | E |
| 1071 | Yes | 52 | Alkyl silicate | 8 | Spray | E |
| 1072 | Yes | 89 | Urethane resin | 122 | Brush | E |
| 1073 | Yes | 85 | Alkyl silicate | 54 | Spray | E |
| 1074 | Yes | 82 | Alkali silicate | 19 | Spray | E |
| 1075 | Yes | 87 | Alkyl silicate | 25 | Brush | E |
| 1076 | Yes | 88 | Alkyl silicate | 58 | Spray | E |
| 1077 | Yes | 49 | Alkyl silicate | 21 | Spray | E |

TABLE 57

| Invention Example No | Granularity distribution (Ave diameter) of Zn metal grains/Zn alloy grains (μm) Fine metal | Granularity distribution (Ave diameter) of Zn metal grains/Zn alloy grains (μm) Coarse metal | Percent of fine-grain metal grains among Zn metal grains/ Zn alloy grains (Vol %) | Chemical component content of Zn metal grains/Zn alloy grains (Mass %) Zn | Chemical component content of Zn metal grains/Zn alloy grains (Mass %) Mg | Chemical component content of Zn metal grains/Zn alloy grains (Mass %) Al | Chemical component content of Zn metal grains/Zn alloy grains (Mass %) Si | Zn alloy grain fracture surfaces or cracks present? | Ave aspect ratio | Mg solid solution phase and Zn—Mg intermetallic compounds present on grain surfaces? |
|---|---|---|---|---|---|---|---|---|---|---|
| 1078 | 2.19 | 10.27 | 24.91 | 87.6 | 12.4 | 0 | 0 | Yes | 1.02 | Yes |
| 1079 | 2.48 | 11.5 | 39.92 | 89.3 | 10.7 | 0 | 0 | Yes | 1.06 | Yes |
| 1080 | 2.85 | 11.67 | 22.65 | 91.5 | 8.5 | 0 | 0 | Yes | 1.05 | Yes |
| 1081 | 2.75 | 11.85 | 66.20 | 94.9 | 5.1 | 0 | 0 | Yes | 1.24 | Yes |
| 1082 | 2.46 | 11.38 | 49.38 | 75.5 | 24.5 | 0 | 0 | Yes | 1.33 | Yes |
| 1083 | 2.71 | 12.61 | 30.58 | 86.5 | 13.5 | 0 | 0 | Yes | 1.27 | Yes |
| 1084 | 2.36 | 12.78 | 45.59 | 80 | 20 | 0 | 0 | Yes | 1.05 | Yes |
| 1085 | 2.16 | 9.57 | 28.32 | 84.5 | 15.5 | 0 | 0 | Yes | 1.12 | Yes |
| 1086 | 2.46 | 9.81 | 71.87 | 88 | 10.5 | 1.5 | 0 | Yes | 1.23 | Yes |
| 1087 | 2.49 | 8.43 | 53.05 | 92.1 | 7.9 | 0 | 0 | Yes | 1.36 | Yes |
| 1088 | 2.95 | 8.55 | 27.74 | 95.2 | 4.8 | 0 | 0 | Yes | 1.11 | Yes |
| 1089 | 2.36 | 8.22 | 42.75 | 81.6 | 18.4 | 0 | 0 | Yes | 1.07 | Yes |
| 1090 | 2.21 | 9.44 | 23.29 | 86.8 | 12.7 | 0 | 0.5 | Yes | 1.42 | Yes |
| 1091 | 2.25 | 9.58 | 61.12 | 89.7 | 10.3 | 0 | 0 | No | 1.38 | Yes |
| 1092 | 2.44 | 9.67 | 44.30 | 71.2 | 20.8 | 8 | 0 | Yes | 1.22 | Yes |
| 1093 | 2.78 | 9.83 | 23.96 | 97.5 | 2.5 | 0 | 0 | No | 1.14 | Yes |
| 1094 | 2.15 | 10.07 | 44.09 | 84.8 | 15.2 | 0 | 0 | Yes | 1.13 | Yes |
| 1095 | 2.19 | 9.45 | 24.63 | 80.8 | 19.2 | 0 | 0 | No | 1.02 | Yes |
| 1096 | 2.48 | 9.3 | 62.46 | 78.7 | 13.5 | 7.8 | 0 | Yes | 1.06 | Yes |
| 1097 | 2.59 | 9.99 | 45.64 | 88.1 | 11.9 | 0 | 0 | No | 1.05 | Yes |

| Invention Example No | Any of MgZn2, Mg2Zn11, Mg2Zn3, MgZn, Mg7Zn3 present? | Coating details Total metal grain content of coat (Mass %) | Coating details Base resin type | Coating details Coat thickness (μm) | Coating details Coating method | Corrosion Test Results |
|---|---|---|---|---|---|---|
| 1078 | Yes | 50 | Alkali silicate | 19 | Brush | E |
| 1079 | Yes | 51 | Urethane resin | 56 | Spray | E |
| 1080 | Yes | 52 | Alkyl silicate | 77 | Spray | E |
| 1081 | Yes | 53 | Alkyl silicate | 12 | Spray | E |
| 1082 | Yes | 88 | Alkyl silicate | 64 | Spray | E |
| 1083 | Yes | 85 | Alkyl silicate | 34 | Brush | E |
| 1084 | Yes | 83 | Alkali silicate | 28 | Spray | E |
| 1085 | Yes | 81 | Urethane resin | 109 | Brush | E |
| 1086 | Yes | 80 | Alkyl silicate | 15 | Spray | E |
| 1087 | Yes | 47 | Alkyl silicate | 14 | Spray | E |
| 1088 | Yes | 49 | Alkyl silicate | 18 | Spray | E |
| 1089 | Yes | 50 | Urethane resin | 122 | Brush | E |
| 1090 | Yes | 51 | Alkyl silicate | 54 | Spray | E |
| 1091 | Yes | 52 | Alkali silicate | 19 | Spray | E |
| 1092 | Yes | 83 | Alkyl silicate | 25 | Brush | E |
| 1093 | Yes | 88 | Alkyl silicate | 58 | Spray | E |
| 1094 | Yes | 85 | Alkyl silicate | 21 | Spray | E |
| 1095 | Yes | 83 | Alkali silicate | 19 | Brush | E |
| 1096 | Yes | 82 | Urethane resin | 56 | Spray | E |
| 1097 | Yes | 47 | Alkyl silicate | 77 | Spray | E |

TABLE 58

| Invention Example No | Granularity distribution (Ave diameter) of Zn metal grains/Zn alloy grains (μm) Fine metal | Granularity distribution (Ave diameter) of Zn metal grains/Zn alloy grains (μm) Coarse metal | Percent of fine-grain metal grains among Zn metal grains/Zn alloy grains (Vol %) | Chemical component content of Zn metal grains/Zn alloy grains (Mass %) Zn | Chemical component content of Zn metal grains/Zn alloy grains (Mass %) Mg | Chemical component content of Zn metal grains/Zn alloy grains (Mass %) Al | Chemical component content of Zn metal grains/Zn alloy grains (Mass %) Si | Zn alloy grain fracture surfaces or cracks present? | Ave aspect ratio | Mg solid solution phase and Zn—Mg intermetallic compounds present on grain surfaces? |
|---|---|---|---|---|---|---|---|---|---|---|
| 1098 | 2.47 | 9.58 | 25.30 | 88.5 | 10.6 | 0 | 0.9 | Yes | 1.24 | Yes |
| 1099 | 2.69 | 9.4 | 42.84 | 84.6 | 15.4 | 0 | 0 | Yes | 1.33 | Yes |
| 1100 | 2.57 | 9.57 | 25.44 | 97.4 | 2.6 | 0 | 0 | Yes | 1.27 | Yes |
| 1101 | 2.49 | 9.54 | 63.27 | 83.3 | 16.7 | 0 | 0 | Yes | 1.37 | Yes |
| 1102 | 2.68 | 9.58 | 46.45 | 91.9 | 8.1 | 0 | 0 | Yes | 1.10 | Yes |
| 1103 | 2.35 | 9.25 | 46.45 | 86.3 | 13.7 | 0 | 0 | Yes | 1.04 | Yes |
| 1104 | 2.48 | 10.04 | 50.91 | 81.5 | 18.5 | 0 | 0 | Yes | 1.02 | Yes |
| 1105 | 2.13 | 11.27 | 27.25 | 97.6 | 2.4 | 0 | 0 | Yes | 1.01 | Yes |
| 1106 | 1.93 | 11.44 | 42.26 | 89.1 | 10.9 | 0 | 0 | Yes | 1.08 | Yes |
| 1107 | 2.05 | 8.9 | 33.69 | 92.8 | 7.2 | 0 | 0 | Yes | 1.14 | Yes |
| 1108 | 1.42 | 8.75 | 48.70 | 81.96 | 17.5 | 0.5 | 0.04 | No | 1.23 | Yes |
| 1109 | 1.46 | 9.44 | 29.24 | 85.4 | 14.6 | 0 | 0 | No | 1.33 | Yes |
| 1110 | 1.75 | 9.03 | 67.07 | 90.6 | 9.4 | 0 | 0 | Yes | 1.37 | Yes |
| 1111 | 1.86 | 8.85 | 50.25 | 92.9 | 7.1 | 0 | 0 | Yes | 1.44 | Yes |
| 1112 | 1.74 | 8.95 | 29.91 | 77.5 | 22.5 | 0 | 0 | Yes | 1.21 | Yes |
| 1113 | 1.96 | 12.54 | 87.50 | 84.8 | 13.7 | 1.5 | 0 | No | 1.22 | Yes |
| 1114 | 1.65 | 8.7 | 30.58 | 87.1 | 12.9 | 0 | 0 | No | 1.23 | Yes |
| 1115 | 2.35 | 8.55 | 68.41 | 95.7 | 4.3 | 0 | 0 | Yes | 1.47 | Yes |
| 1116 | 1.62 | 10.72 | 54.59 | 80.2 | 17.6 | 1 | 1.2 | No | 1.01 | Yes |
| 1117 | 2.25 | 9.9 | 34.25 | 98.8 | 0.6 | 0.6 | 0 | Yes | 1.04 | Yes |

| Invention Example No | Any of MgZn2, Mg2Zn11, Mg2Zn3, MgZn, Mg7Zn3 present? | Coating details Total metal grain content of coat (Mass %) | Coating details Base resin type | Coating details Coat thickness (μm) | Coating details Coating method | Corrosion Test Results |
|---|---|---|---|---|---|---|
| 1098 | Yes | 46 | Alkyl silicate | 54 | Spray | E |
| 1099 | Yes | 49 | Alkali silicate | 2 | Spray | G |
| 1100 | Yes | 50 | Alkali silicate | 20 | Spray | E |
| 1101 | Yes | 51 | Alkali silicate | 5 | Spray | G |
| 1102 | Yes | 83 | Alkyl silicate | 20 | Spray | E |
| 1103 | Yes | 82 | Alkali silicate | 15 | Brush | E |
| 1104 | Yes | 88 | Alkyl silicate | 57 | Brush | E |
| 1105 | Yes | 85 | Alkali silicate | 13 | Brush | E |
| 1106 | Yes | 86 | Alkali silicate | 22 | Brush | E |
| 1107 | Yes | 47 | Alkali silicate | 20 | Spray | E |
| 1108 | Yes | 48 | Alkyl silicate | 27 | Spray | E |
| 1109 | Yes | 50 | Alkyl silicate | 15 | Spray | E |
| 1110 | Yes | 51 | Alkyl silicate | 35 | Spray | E |
| 1111 | Yes | 52 | Alkali silicate | 34 | Brush | E |
| 1112 | Yes | 88 | Alkyl silicate | 45 | Brush | E |
| 1113 | Yes | 89 | Alkali silicate | 52 | Brush | E |
| 1114 | Yes | 86 | Alkyl silicate | 23 | Brush | E |
| 1115 | Yes | 87 | Alkali silicate | 5 | Spray | E |
| 1116 | Yes | 86 | Alkyl silicate | 52 | Brush | E |
| 1117 | Yes | 46 | Alkali silicate | 150 | Brush | E |

TABLE 59

| Invention Example No | Granularity distribution (Ave diameter) of Zn metal grains/Zn alloy grains (μm) Fine metal | Granularity distribution (Ave diameter) of Zn metal grains/Zn alloy grains (μm) Coarse metal | Percent of fine-grain metal grains among Zn metal grains/ Zn alloy grains (Vol %) | Chemical component content of Zn metal grains/Zn alloy grains (Mass %) Zn | Chemical component content of Zn metal grains/Zn alloy grains (Mass %) Mg | Chemical component content of Zn metal grains/Zn alloy grains (Mass %) Al | Chemical component content of Zn metal grains/Zn alloy grains (Mass %) Si | Zn alloy grain fracture surfaces or cracks present? | Ave aspect ratio | Mg solid solution phase and Zn—Mg intermetallic compounds present on grain surfaces? |
|---|---|---|---|---|---|---|---|---|---|---|
| 1118 | 2.36 | 9.57 | 37.61 | 86.9 | 10.3 | 1.6 | 1.2 | Yes | 1.05 | Yes |
| 1119 | 2.24 | 10.79 | 45.60 | 92.98 | 7 | 0.02 | 0 | Yes | 1.12 | Yes |
| 1120 | 2.46 | 10.93 | 46.70 | 75.5 | 23.5 | 1 | 0 | Yes | 1.11 | Yes |
| 1121 | 1.56 | 11.02 | 41.22 | 82.5 | 17.5 | 0 | 0 | No | 1.08 | Yes |
| 1122 | 1.24 | 11.18 | 45.68 | 80.1 | 12.4 | 7.5 | 0 | Yes | 1.47 | Yes |
| 1123 | 1.68 | 11.42 | 22.02 | 85.09 | 14.9 | 0 | 0.01 | Yes | 1.50 | Yes |
| 1124 | 2.65 | 10.8 | 37.03 | 78.7 | 20.7 | 0 | 0.6 | No | 1.13 | Yes |
| 1125 | 2.22 | 10.65 | 28.46 | 91.29 | 8.6 | 0 | 0.11 | Yes | 1.26 | Yes |
| 1126 | 2.45 | 11.34 | 43.47 | 85.8 | 14.2 | 0 | 0 | Yes | 1.14 | Yes |
| 1127 | 2.23 | 11.62 | 35.19 | 98.12 | 0.08 | 0 | 1.8 | Yes | 1.49 | Yes |
| 1128 | 2.26 | 11.15 | 73.02 | 83.46 | 15.2 | 0 | 1.34 | No | 1.34 | Yes |
| 1129 | 2.72 | 12.38 | 56.20 | 73.17 | 17.4 | 9 | 0.43 | Yes | 1.18 | Yes |
| 1130 | 2.13 | 12.55 | 35.86 | 98.6 | 0.8 | 0.6 | 0 | Yes | 1.17 | Yes |
| 1131 | 1.98 | 9.34 | 93.45 | 93.55 | 6.4 | 0.05 | 0 | Yes | 1.48 | Yes |
| 1132 | 2.02 | 9.58 | 30.66 | 96.78 | 3.2 | 0.02 | 0 | No | 1.49 | Yes |
| 1133 | 2.21 | 9.88 | 74.21 | 83 | 9.2 | 7.8 | 0 | Yes | 1.27 | Yes |
| 1134 | 2.55 | 10 | 55.39 | 70.92 | 19.2 | 9.88 | 0 | Yes | 1.17 | Yes |
| 1135 | 1.92 | 10.67 | 30.08 | 80.25 | 15.1 | 4.65 | 0 | Yes | 1.16 | Yes |
| 1136 | 1.96 | 11.89 | 45.09 | 81.85 | 14.5 | 3.65 | 0 | Yes | 1.27 | Yes |
| 1137 | 2.11 | 12.03 | 41.41 | 89.45 | 10.5 | 0.05 | 0 | Yes | 1.27 | Yes |

| Invention Example No | Any of MgZn2, Mg2Zn11, Mg2Zn3, MgZn, Mg7Zn3 present? | Total metal grain content of coat (Mass %) | Coating details Base resin type | Coating details Coat thickness (μm) | Coating details Coating method | Corrosion Test Results |
|---|---|---|---|---|---|---|
| 1118 | Yes | 49 | Alkyl silicate | 60 | Brush | E |
| 1119 | Yes | 35 | Alkali silicate | 15 | Spray | E |
| 1120 | Yes | 37 | Alkyl silicate | 24 | Spray | E |
| 1121 | Yes | 36 | Alkali silicate | 34 | Spray | E |
| 1122 | Yes | 38 | Alkyl silicate | 20 | Brush | E |
| 1123 | Yes | 48 | Alkali silicate | 200 | Brush | E |
| 1124 | Yes | 46 | Alkyl silicate | 56 | Brush | E |
| 1125 | Yes | 51 | Alkali silicate | 34 | Spray | E |
| 1126 | Yes | 46 | Alkyl silicate | 2 | Spray | G |
| 1127 | Yes | 38 | Alkali silicate | 15 | Spray | E |
| 1128 | Yes | 48 | Alkali silicate | 10 | Spray | E |
| 1129 | Yes | 52 | Alkyl silicate | 125 | Brush | E |
| 1130 | Yes | 30 | Alkali silicate | 24 | Brush | E |
| 1131 | Yes | 76 | Alkali silicate | 110 | Brush | E |
| 1132 | Yes | 72 | Alkali silicate | 24 | Brush | E |
| 1133 | Yes | 81 | Alkyl silicate | 2 | Spray | G |
| 1134 | Yes | 64 | Alkali silicate | 37 | Spray | E |
| 1135 | Yes | 69 | Alkyl silicate | 113 | Brush | E |
| 1136 | Yes | 83 | Alkali silicate | 2 | Spray | G |
| 1137 | Yes | 30 | Alkyl silicate | 75 | Brush | E |

TABLE 60

| Invention Example No | Granularity distribution (Ave diameter) of Zn metal grains/Zn alloy grains (μm) Fine metal | Granularity distribution (Ave diameter) of Zn metal grains/Zn alloy grains (μm) Coarse metal | Percent of fine-grain metal grains among Zn metal grains/Zn alloy grains (Vol %) | Chemical component content of Zn metal grains/Zn alloy grains (Mass %) Zn | Mg | Al | Si | Zn alloy grain fracture surfaces or cracks present? | Ave aspect ratio | Mg solid solution phase and Zn—Mg intermetallic compounds present on grain surfaces? |
|---|---|---|---|---|---|---|---|---|---|---|
| 1138 | 2.97 | 12.12 | 17.75 | 87.3 | 7.5 | 5.2 | 0 | Yes | 1.49 | Yes |
| 1139 | 2.36 | 12.28 | 32.76 | 93.9 | 6.1 | 0 | 0.001 | Yes | 1.29 | Yes |
| 1140 | 3.05 | 12.52 | 30.89 | 82.55 | 16.8 | 0.05 | 0.6 | Yes | 1.23 | Yes |
| 1141 | 2.57 | 11.9 | 45.90 | 70.7 | 27.5 | 1 | 0.8 | Yes | 1.23 | Yes |
| 1142 | 2.65 | 11.75 | 42.22 | 94.6 | 2.9 | 0 | 2.5 | Yes | 1.23 | Yes |
| 1143 | 2.54 | 12.44 | 18.56 | 94 | 4.5 | 0 | 1.5 | No | 1.23 | Yes |
| 1144 | 2.85 | 12.03 | 33.57 | 99.43 | 0.07 | 0 | 0.5 | Yes | 1.27 | Yes |
| 1145 | 2.75 | 10.61 | 31.70 | 96.82 | 3.1 | 0.04 | 0.04 | Yes | 1.23 | Yes |
| 1146 | 2.46 | 11.3 | 46.71 | 76.3 | 20.5 | 1 | 2.2 | Yes | 1.36 | Yes |
| 1147 | 2.71 | 11.58 | 47.89 | 68.84 | 29.5 | 0.06 | 1.6 | Yes | 1.11 | Yes |
| 1148 | 2.36 | 11.11 | 24.23 | 92.33 | 7.6 | 0.07 | 0 | Yes | 1.02 | Yes |
| 1149 | 2.16 | 12.34 | 39.24 | 95.2 | 0.7 | 1.2 | 2.9 | Yes | 1.05 | Yes |
| 1150 | 2.46 | 12.51 | 37.37 | 91.8 | 4.6 | 1.8 | 1.8 | Yes | 1.24 | Yes |
| 1151 | 2.49 | 11.64 | 50.38 | 82 | 8.3 | 9.2 | 0.5 | Yes | 1.33 | Yes |
| 1152 | 1.63 | 9.16 | 37.14 | 88.2 | 11.8 | 0 | 0 | Yes | 1.27 | Yes |
| 1153 | 1.51 | 9.46 | 13.48 | 86.06 | 12.9 | 0 | 1.04 | Yes | 1.50 | Yes |
| 1154 | 3.05 | 9.54 | 40.05 | 99.34 | 0.6 | 0 | 0.06 | Yes | 1.13 | Yes |
| 1155 | 2.57 | 9.56 | 38.18 | 89.51 | 9.5 | 0 | 0.99 | No | 1.04 | Yes |
| 1156 | 2.65 | 9.46 | 7.63 | 88.3 | 11.7 | 0 | 0 | Yes | 1.02 | Yes |
| 1157 | 2.54 | 11.99 | 37.95 | 89.9 | 9.4 | 0.7 | 0 | Yes | 1.08 | Yes |

| Invention Example No | Any of MgZn2, Mg2Zn11, Mg2Zn3, MgZn, Mg7Zn3 present? | Total metal grain content of coat (Mass %) | Coating details Base resin type | Coat thickness (μm) | Coating method | Corrosion Test Results |
|---|---|---|---|---|---|---|
| 1138 | Yes | 83 | Alkali silicate | 30 | Brush | E |
| 1139 | Yes | 75 | Alkyl silicate | 34 | Brush | E |
| 1140 | Yes | 76 | Epoxy resin | 124 | Brush | E |
| 1141 | Yes | 72 | Acrylic resin | 15 | Spray | E |
| 1142 | Yes | 71 | Urethane resin | 23 | Spray | E |
| 1143 | Yes | 82 | Polyester resin | 157 | Brush | E |
| 1144 | Yes | 81 | Epoxy resin | 26 | Spray | E |
| 1145 | Yes | 83 | Acrylic resin | 38 | Spray | E |
| 1146 | Yes | 50 | Urethane resin | 160 | Brush | E |
| 1147 | Yes | 72 | Polyester resin | 27 | Brush | E |
| 1148 | Yes | 47 | Epoxy resin | 180 | Brush | E |
| 1149 | Yes | 47 | Acrylic resin | 26 | Spray | E |
| 1150 | Yes | 52 | Urethane resin | 180 | Brush | E |
| 1151 | Yes | 52 | Polyester resin | 15 | Spray | E |
| 1152 | Yes | 50 | Epoxy resin | 2 | Spray | G |
| 1153 | Yes | 46 | Acrylic resin | 28 | Spray | E |
| 1154 | Yes | 47 | Urethane resin | 30 | Spray | E |
| 1155 | Yes | 83 | Polyester resin | 2 | Spray | G |
| 1156 | Yes | 52 | Epoxy resin | 157 | Brush | E |
| 1157 | Yes | 89 | Acrylic resin | 28 | Brush | E |

TABLE 61

| Invention Example No | Granularity distribution (Ave diameter) of Zn metal grains/Zn alloy grains (μm) Fine metal | Granularity distribution (Ave diameter) of Zn metal grains/Zn alloy grains (μm) Coarse metal | Percent of fine-grain metal grains among Zn metal grains/Zn alloy grains (Vol %) | Chemical component content of Zn metal grains/Zn alloy grains (Mass %) Zn | Chemical component content of Zn metal grains/Zn alloy grains (Mass %) Mg | Chemical component content of Zn metal grains/Zn alloy grains (Mass %) Al | Chemical component content of Zn metal grains/Zn alloy grains (Mass %) Si | Zn alloy grain fracture surfaces or cracks present? | Ave aspect ratio | Mg solid solution phase and Zn—Mg intermetallic compounds present on grain surfaces? |
|---|---|---|---|---|---|---|---|---|---|---|
| 1158 | 2.85 | 12.08 | 14.29 | 87.8 | 11.7 | 0.5 | 0 | Yes | 1.15 | Yes |
| 1159 | 2.75 | 12.24 | 40.86 | 95.6 | 4.2 | 0.2 | 0 | Yes | 1.34 | Yes |
| 1160 | 2.46 | 12.48 | 97.50 | 97.13 | 2.8 | 0.07 | 0 | Yes | 1.25 | Yes |
| 1161 | 2.71 | 11.86 | 13.30 | 86.1 | 13.9 | 0 | 0 | Yes | 1.19 | Yes |
| 1162 | 2.36 | 11.71 | 43.62 | 82.6 | 14.6 | 1.6 | 1.2 | No | 1.18 | Yes |
| 1163 | 2.46 | 11.35 | 56.93 | 72.95 | 26.4 | 0.65 | 0 | Yes | 1.24 | Yes |
| 1164 | 1.45 | 12.02 | 36.59 | 83.23 | 16.5 | 0.27 | 0 | Yes | 1.11 | Yes |
| 1165 | 2.42 | 13.24 | 39.95 | 79.4 | 19.5 | 0.45 | 0.65 | Yes | 1.27 | Yes |
| 1166 | 2.11 | 9.46 | 86.50 | 97.08 | 1.6 | 0.33 | 0.99 | Yes | 1.31 | Yes |
| 1167 | 2.97 | 13.47 | 32.87 | 90.5 | 6 | 1 | 2.5 | Yes | 1.26 | Yes |
| 1168 | 2.36 | 9.46 | 16.23 | 88.93 | 8.4 | 0.87 | 1.8 | Yes | 1.14 | Yes |
| 1169 | 3.05 | 13.87 | 37.40 | 86.7 | 13.3 | 0 | 0 | Yes | 1.34 | Yes |
| 1170 | 2.57 | 13.25 | 40.76 | 81.4 | 18.6 | 0 | 0 | Yes | 1.16 | Yes |
| 1171 | 2.65 | 13.1 | 87.31 | 97.34 | 1.8 | 0.86 | 0 | No | 1.47 | Yes |
| 1172 | 2.12 | 9.08 | 92.50 | 95.25 | 4.1 | 0.65 | 0 | Yes | 1.48 | Yes |
| 1173 | 1.65 | 9.87 | 17.93 | 82.87 | 16.7 | 0.43 | 0 | No | 1.49 | Yes |
| 1174 | 2.35 | 9.46 | 44.50 | 99 | 0.4 | 0.6 | 0 | Yes | 1.34 | Yes |
| 1175 | 1.63 | 9.28 | 96.50 | 89.35 | 10.6 | 0.05 | 0 | Yes | 1.29 | Yes |
| 1176 | 2.64 | 9.45 | 16.94 | 93.08 | 6.9 | 0.02 | 0 | Yes | 1.18 | Yes |
| 1177 | 2.35 | 9.25 | 88.12 | 99.82 | 0.05 | 0.06 | 0.07 | Yes | 1.48 | Yes |

| Invention Example No | Any of MgZn2, Mg2Zn11, Mg2Zn3, MgZn, Mg7Zn3 present? | Total metal grain content of coat (Mass %) | Coating details Base resin type | Coat thickness (μm) | Coating method | Corrosion Test Results |
|---|---|---|---|---|---|---|
| 1158 | Yes | 85 | Alkyl silicate | 130 | Brush | E |
| 1159 | Yes | 53 | Alkyl silicate | 29 | Brush | E |
| 1160 | Yes | 88 | Epoxy resin | 30 | Brush | E |
| 1161 | Yes | 85 | Acrylic resin | 120 | Brush | E |
| 1162 | Yes | 52 | Urethane resin | 187 | Brush | E |
| 1163 | Yes | 83 | Polyester resin | 28 | Spray | E |
| 1164 | Yes | 88 | Epoxy resin | 5 | Spray | E |
| 1165 | Yes | 49 | Acrylic resin | 35 | Spray | E |
| 1166 | Yes | 50 | Urethane resin | 5 | Spray | G |
| 1167 | Yes | 51 | Polyester resin | 200 | Brush | E |
| 1168 | Yes | 83 | Alkali silicate | 25 | Spray | E |
| 1169 | Yes | 82 | Alkali silicate | 15 | Spray | E |
| 1170 | Yes | 88 | Alkyl silicate | 20 | Spray | E |
| 1171 | Yes | 85 | Alkali silicate | 18 | Spray | E |
| 1172 | Yes | 87 | Alkyl silicate | 22 | Spray | E |
| 1173 | Yes | 86 | Alkali silicate | 19 | Spray | E |
| 1174 | Yes | 46 | Alkyl silicate | 29 | Spray | E |
| 1175 | Yes | 49 | Alkali silicate | 23 | Spray | E |
| 1176 | Yes | 35 | Alkyl silicate | 21 | Spray | E |
| 1177 | Yes | 30 | Alkali silicate | 19 | Spray | E |

TABLE 62

| Invention Example No | Granularity distribution (Ave diameter) of Zn metal grains/Zn alloy grains (μm) Fine metal | Granularity distribution (Ave diameter) of Zn metal grains/Zn alloy grains (μm) Coarse metal | Percent of fine-grain metal grains among Zn metal grains/Zn alloy grains (Vol %) | Chemical component content of Zn metal grains/Zn alloy grains (Mass %) Zn | Mg | Al | Si | Zn alloy grain fracture surfaces or cracks present? | Ave aspect ratio | Mg solid solution phase and Zn—Mg intermetallic compounds present on grain surfaces? |
|---|---|---|---|---|---|---|---|---|---|---|
| 1178 | 2.31 | 9.46 | 60.57 | 91.56 | 6.4 | 1.05 | 0.99 | Yes | 1.27 | Yes |
| 1179 | 2.62 | 9.46 | 39.48 | 93.36 | 3.5 | 2.6 | 0.54 | Yes | 1.17 | Yes |
| 1180 | 2.52 | 9.46 | 15.82 | 82.13 | 17.5 | 0.05 | 0.32 | Yes | 1.27 | Yes |
| 1181 | 2.24 | 13.32 | 49.57 | 91.2 | 3.6 | 5.2 | 0 | No | 1.27 | Yes |
| 1182 | 0.05 | 6.54 | 86.52 | 94.1 | 5.9 | 0 | 0.001 | Yes | 1.48 | Yes |
| 1183 | 2.42 | 6.35 | 90.98 | 83.2 | 16.2 | 0 | 0.6 | No | 1.49 | Yes |
| 1184 | 0.11 | 7.54 | 67.32 | 76.7 | 22.5 | 0 | 0.8 | Yes | 1.34 | Yes |
| 1185 | 1.92 | 8.64 | 82.33 | 96.52 | 3.4 | 0.04 | 0.04 | Yes | 1.23 | Yes |
| 1186 | 0.46 | 6.45 | 73.76 | 68.3 | 26.5 | 3 | 2.2 | Yes | 1.23 | Yes |
| 1187 | 0.77 | 6.48 | 88.77 | 72.84 | 25.5 | 0.06 | 1.6 | Yes | 1.23 | Yes |
| 1188 | 2.35 | 9.25 | 45.02 | 87.2 | 12.8 | 0 | 0 | Yes | 1.05 | Yes |
| 1189 | 2.33 | 9.46 | 15.2 | 91.5 | 8.5 | 0 | 0 | Yes | 1.06 | Yes |
| 1190 | 1.95 | 9.32 | 51.41 | 75.23 | 24.5 | 0.27 | 0 | Yes | 1.38 | Yes |
| 1191 | 2.15 | 9.22 | 45.46 | 77.48 | 18.4 | 2.55 | 1.57 | Yes | 1.06 | Yes |
| 1192 | 2.23 | 11.62 | 35.19 | 72.62 | 0.08 | 25.5 | 1.8 | Yes | 1.49 | Yes |
| 1193 | 2.26 | 11.15 | 73.02 | 64.06 | 15.2 | 19.4 | 1.34 | No | 1.34 | Yes |
| 1194 | 1.98 | 9.34 | 93.45 | 83 | 6.4 | 10.6 | 0 | Yes | 1.48 | Yes |
| 1195 | 2.02 | 9.58 | 30.66 | 86.4 | 3.2 | 10.4 | 0 | No | 1.49 | Yes |
| 1196 | 2.36 | 12.28 | 32.76 | 80.4 | 6.1 | 13.5 | 0.001 | Yes | 1.29 | Yes |
| 1197 | 3.05 | 12.52 | 30.89 | 70.1 | 16.8 | 12.5 | 0.6 | Yes | 1.23 | Yes |
| 1198 | 2.57 | 11.9 | 45.90 | 60.9 | 27.5 | 10.8 | 0.8 | Yes | 1.23 | Yes |

| Invention Example No | Any of MgZn2, Mg2Zn11, Mg2Zn3, MgZn, Mg7Zn3 present? | Coating details Total metal grain content of coat (Mass %) | Coating details Base resin type | Coating details Coat thickness (μm) | Coating details Coating method | Corrosion Test Results |
|---|---|---|---|---|---|---|
| 1178 | Yes | 76 | Alkyl silicate | 15 | Spray | E |
| 1179 | Yes | 72 | Alkali silicate | 18 | Spray | E |
| 1180 | Yes | 30 | Alkyl silicate | 22 | Spray | E |
| 1181 | Yes | 83 | Alkyl silicate | 21 | Spray | E |
| 1182 | Yes | 75 | Alkyl silicate | 29 | Spray | E |
| 1183 | Yes | 76 | Alkali silicate | 23 | Spray | E |
| 1184 | Yes | 72 | Alkyl silicate | 21 | Spray | E |
| 1185 | Yes | 83 | Alkali silicate | 19 | Spray | E |
| 1186 | Yes | 50 | Alkyl silicate | 21 | Spray | E |
| 1187 | Yes | 72 | Alkali silicate | 19 | Spray | E |
| 1188 | Yes | 50 | Acrylic resin | 654 | Spray | E |
| 1189 | Yes | 48 | Alkali silicate | 700 | Spray | E |
| 1190 | Yes | 75 | Alkyl silicate | 555 | Spray | E |
| 1191 | Yes | 55 | Alkyl silicate | 321 | Spray | E |
| 1192 | Yes | 38 | Alkyl silicate | 152 | Brush | E |
| 1193 | Yes | 48 | Urethane resin | 674 | Spray | E |
| 1194 | Yes | 76 | Polyester resin | 325 | Spray | E |
| 1195 | Yes | 72 | Alkyl silicate | 665 | Spray | E |
| 1196 | Yes | 75 | Alkyl silicate | 354 | Brush | E |
| 1197 | Yes | 76 | Alkyl silicate | 165 | Spray | E |
| 1198 | Yes | 72 | Urethane resin | 354 | Spray | E |

TABLE 63

| Invention Example No | Granularity distribution (peak diameter) of Zn metal alloy grains (μm) Fine metal | Granularity distribution (peak diameter) of Zn metal alloy grains (μm) Coarse metal | Percent of fine-grain metal grains among Zn metal grains/ Zn alloy grains (Vol %) | Chemical component content of Zn metal grains/Zn alloy grains (Mass %) Zn | Chemical component content of Zn metal grains/Zn alloy grains (Mass %) Mg | Chemical component content of Zn metal grains/Zn alloy grains (Mass %) Al | Chemical component content of Zn metal grains/Zn alloy grains (Mass %) Si | Zn alloy grain fracture surfaces or cracks present? | Ave aspect ratio | Mg solid solution phase and Zn—Mg intermetallic compounds present on grain surfaces? |
|---|---|---|---|---|---|---|---|---|---|---|
| 1199 | 2.35 | 9.25 | 35.87 | 88.8 | 11.2 | 0 | 0 | Yes | 1.12 | Yes |
| 1200 | 2.57 | 9.56 | 42.04 | 90.6 | 9.4 | 0 | 0 | No | 1.38 | Yes |
| 1201 | 2.56 | 9.84 | 6.55 | 81.45 | 18.5 | 0 | 0.05 | Yes | 1.22 | Yes |
| 1202 | 2.21 | 9.75 | 43.60 | 99.97 | 0.03 | 0 | 0 | Yes | 1.14 | Yes |
| 1203 | 2.64 | 9.85 | 44.12 | 98.4 | 1.6 | 0 | 0 | No | 1.02 | Yes |
| 1204 | 1.99 | 8.56 | 37.21 | 93.2 | 6.8 | 0 | 0 | Yes | 1.05 | Yes |
| 1205 | 2.94 | 8.21 | 43.38 | 84.5 | 13.9 | 0 | 1.6 | No | 1.36 | No |
| 1206 | 2.58 | 8.33 | 13.52 | 98.1 | 1.9 | 0 | 0 | Yes | 1.11 | No |
| 1207 | 2.37 | 8 | 44.94 | 94.3 | 5.7 | 0 | 0 | No | 1.07 | Yes |
| 1208 | 2.15 | 9.22 | 45.46 | 90.8 | 9.2 | 0 | 0 | No | 1.42 | Yes |
| 1209 | 2.96 | 9.36 | 35.96 | 83.3 | 15.4 | 0 | 1.3 | Yes | 1.38 | No |
| 1210 | 2.85 | 9.45 | 42.13 | 79.84 | 18.6 | 0 | 1.56 | Yes | 1.22 | No |
| 1211 | 2.94 | 9.61 | 7.56 | 96.4 | 3.6 | 0 | 0 | Yes | 1.14 | Yes |
| 1212 | 2.11 | 9.85 | 43.69 | 94.6 | 5.4 | 0 | 0 | Yes | 1.13 | Yes |
| 1213 | 2.68 | 9.23 | 44.21 | 92.4 | 7.6 | 0 | 0 | Yes | 1.02 | No |
| 1214 | 2.99 | 9.08 | 39.51 | 75.5 | 24.5 | 0 | 0 | Yes | 1.06 | Yes |
| 1215 | 2.78 | 9.87 | 45.68 | 82.4 | 17.6 | 0 | 0 | Yes | 1.05 | Yes |
| 1216 | 2.96 | 9.46 | 65.58 | 98.6 | 1.4 | 0 | 0 | Yes | 1.24 | No |
| 1217 | 2.85 | 9.28 | 47.24 | 78.5 | 21.5 | 0 | 0 | Yes | 1.33 | No |

| Invention Example No | Any of MgZn2, Mg2Zn11, Mg2Zn3, MgZn, Mg7Zn3 present? | Number of faces | Coating details Total metal grain content of coat (Mass %) | Coating details Base resin type | Coating details Coat thickness (μm) | Coating method | Corrosion Test Results |
|---|---|---|---|---|---|---|---|
| 1199 | Yes | 2 | 49 | Alkyl silicate | 14 | Spray | E |
| 1200 | Yes | 2 | 89 | Urethane resin | 55 | Spray | E |
| 1201 | Yes | 2 | 90 | Alkyl silicate | 8 | Spray | E |
| 1202 | Yes | 2 | 86 | Urethane resin | 122 | Brush | E |
| 1203 | Yes | 6 | 48 | Alkyl silicate | 555 | Spray | E |
| 1204 | Yes | 6 | 47 | Alkali silicate | 19 | Spray | E |
| 1205 | Yes | 7 | 47 | Alkyl silicate | 25 | Brush | E |
| 1206 | Yes | 6 | 47 | Alkyl silicate | 58 | Spray | E |
| 1207 | Yes | 2 | 52 | Alkyl silicate | 685 | Spray | E |
| 1208 | Yes | 7 | 52 | Alkali silicate | 19 | Brush | E |
| 1209 | Yes | 2 | 52 | Urethane resin | 700 | Spray | E |
| 1210 | Yes | 6 | 88 | Alkyl silicate | 77 | Spray | E |
| 1211 | Yes | 6 | 87 | Alkyl silicate | 54 | Spray | E |
| 1212 | Yes | 2 | 89 | Alkyl silicate | 64 | Spray | E |
| 1213 | Yes | 2 | 90 | Alkyl silicate | 34 | Brush | E |
| 1214 | Yes | 7 | 91 | Alkali silicate | 28 | Spray | E |
| 1215 | Yes | 6 | 46 | Urethane resin | 109 | Brush | E |
| 1216 | Yes | 7 | 47 | Alkyl silicate | 15 | Spray | E |
| 1217 | Yes | 2 | 47 | Alkyl silicate | 14 | Spray | E |

TABLE 64

| Invention Example No | Granularity distribution (peak diameter) of Zn metal grains/Zn alloy grains (μm) Fine metal | Granularity distribution (peak diameter) of Zn metal grains/Zn alloy grains (μm) Coarse metal | Percent of fine-grain metal grains among Zn metal grains/Zn alloy grains (Vol %) | Chemical component content of Zn metal grains/Zn alloy grains (Mass %) Zn | Chemical component content of Zn metal grains/Zn alloy grains (Mass %) Mg | Chemical component content of Zn metal grains/Zn alloy grains (Mass %) Al | Chemical component content of Zn metal grains/Zn alloy grains (Mass %) Si | Zn alloy grain fracture surfaces or cracks present? | Ave aspect ratio | Mg solid solution phase and Zn—Mg intermetallic compounds present on grain surfaces? |
|---|---|---|---|---|---|---|---|---|---|---|
| 1218 | 2.64 | 9.45 | 47.76 | 89.6 | 10.4 | 0 | 0 | Yes | 1.27 | Yes |
| 1219 | 2.35 | 9.25 | 45.02 | 87.2 | 12.8 | 0 | 0 | Yes | 1.05 | Yes |
| 1220 | 2.12 | 9.46 | 47.02 | 92.2 | 7.8 | 0 | 0 | Yes | 1.22 | No |
| 1221 | 2.34 | 9.46 | 7.66 | 70.5 | 29.5 | 0 | 0 | Yes | 1.13 | No |
| 1222 | 2.33 | 9.46 | 15.20 | 91.5 | 8.5 | 0 | 0 | Yes | 1.06 | Yes |
| 1223 | 2.23 | 9.06 | 43.16 | 74.5 | 25.5 | 0 | 0 | Yes | 1.05 | Yes |
| 1224 | 2.12 | 9.3 | 49.33 | 99.93 | 0.07 | 0 | 0 | Yes | 1.24 | Yes |
| 1225 | 2.21 | 8.68 | 19.47 | 89.2 | 10.8 | 0 | 0 | No | 1.05 | Yes |
| 1226 | 1.38 | 8.53 | 69.55 | 86 | 11.2 | 1.6 | 1.2 | No | 1.12 | Yes |
| 1227 | 1.95 | 9.32 | 51.41 | 75.23 | 24.5 | 0.27 | 0 | Yes | 1.38 | No |
| 1228 | 2.26 | 8.95 | 75.88 | 82.6 | 17.4 | 0 | 0 | Yes | 1.13 | No |
| 1229 | 2.05 | 12.54 | 48.08 | 98.7 | 1.3 | 0 | 0 | Yes | 1.33 | Yes |
| 1230 | 1.65 | 8.7 | 66.85 | 80.5 | 19.5 | 0 | 0 | Yes | 1.27 | Yes |
| 1231 | 2.35 | 8.55 | 7.68 | 88.85 | 10.8 | 0.05 | 0.3 | No | 1.23 | No |
| 1232 | 1.62 | 8.91 | 8.64 | 87.7 | 11.9 | 0.4 | 0 | Yes | 1.11 | Yes |
| 1233 | 1.88 | 9.91 | 16.58 | 90.5 | 9.5 | 0 | 0 | Yes | 1.42 | Yes |
| 1234 | 2.35 | 9.25 | 35.87 | 89.5 | 10.5 | 0 | 0 | Yes | 1.06 | No |
| 1235 | 2.57 | 9.56 | 42.04 | 84.9 | 15.1 | 0 | 0 | Yes | 1.05 | Yes |
| 1236 | 2.56 | 9.84 | 38.41 | 83.2 | 16.8 | 0 | 0 | Yes | 1.07 | Yes |

| Invention Example No | Any of MgZn2, Mg2Zn11, Mg2Zn3, MgZn, Mg7Zn3 present? | Number of faces | Coating details Total metal grain content of coat (Mass %) | Coating details Base resin type | Coating details Coat thickness (μm) | Coating method | Corrosion Test Results |
|---|---|---|---|---|---|---|---|
| 1218 | Yes | 7 | 49 | Alkyl silicate | 18 | Spray | E |
| 1219 | Yes | 6 | 50 | Alkali silicate | 2 | Spray | G |
| 1220 | Yes | 7 | 87 | Alkyl silicate | 37 | Spray | E |
| 1221 | Yes | 6 | 83 | Alkali silicate | 12 | Spray | E |
| 1222 | Yes | 7 | 48 | Alkyl silicate | 160 | Brush | E |
| 1223 | Yes | 6 | 51 | Alkali silicate | 5 | Brush | G |
| 1224 | Yes | 2 | 51 | Alkyl silicate | 56 | Brush | E |
| 1225 | Yes | 7 | 87 | Alkali silicate | 2 | Spray | G |
| 1226 | Yes | 6 | 85 | Alkyl silicate | 18 | Spray | E |
| 1227 | Yes | 6 | 86 | Alkyl silicate | 23 | Spray | E |
| 1228 | Yes | 6 | 50 | Epoxy resin | 30 | Brush | E |
| 1229 | Yes | 2 | 51 | Acrylic resin | 77 | Brush | E |
| 1230 | Yes | 6 | 51 | Urethane resin | 655 | Brush | E |
| 1231 | Yes | 7 | 80 | Polyester resin | 47 | Spray | E |
| 1232 | Yes | 2 | 46 | Epoxy resin | 43 | Spray | E |
| 1233 | Yes | 6 | 51 | Acrylic resin | 52 | Brush | E |
| 1234 | Yes | 2 | 86 | Urethane resin | 20 | Brush | E |
| 1235 | Yes | 6 | 85 | Polyester resin | 200 | Brush | E |
| 1236 | Yes | 7 | 82 | Alkali silicate | 22 | Spray | E |

TABLE 65

| Invention Example No | Granularity distribution (peak diameter) of Zn metal grains/Zn alloy grains (μm) Fine metal | Granularity distribution (peak diameter) of Zn metal grains/Zn alloy grains (μm) Coarse metal | Percent of fine-grain metal grains among Zn metal grains/Zn alloy grains (Vol %) | Chemical component content of Zn metal grains/Zn alloy grains (Mass %) Zn | Chemical component content of Zn metal grains/Zn alloy grains (Mass %) Mg | Chemical component content of Zn metal grains/Zn alloy grains (Mass %) Al | Chemical component content of Zn metal grains/Zn alloy grains (Mass %) Si | Zn alloy grain fracture surfaces or cracks present? | Ave aspect ratio | Mg solid solution phase and Zn—Mg intermetallic compounds present on grain surfaces? |
|---|---|---|---|---|---|---|---|---|---|---|
| 1237 | 2.21 | 9.75 | 6.99 | 89.4 | 10.6 | 0 | 0 | Yes | 1.42 | No |
| 1238 | 2.64 | 9.85 | 44.12 | 84.3 | 13.3 | 2.4 | 0 | Yes | 1.38 | Yes |
| 1239 | 2.65 | 8.56 | 66.99 | 98.6 | 1.40 | 0 | 0 | No | 1.22 | Yes |
| 1240 | 2.94 | 8.21 | 43.38 | 76.45 | 23.5 | 0 | 0.05 | Yes | 1.14 | Yes |
| 1241 | 2.58 | 8.33 | 39.75 | 91.1 | 8.9 | 0 | 0 | Yes | 1.13 | Yes |
| 1242 | 2.37 | 8 | 65.38 | 85.1 | 14.9 | 0 | 0 | Yes | 1.02 | Yes |
| 1243 | 2.15 | 9.22 | 45.46 | 77.48 | 18.4 | 2.55 | 1.57 | Yes | 1.06 | Yes |
| 1244 | 2.96 | 9.36 | 22.55 | 97.9 | 2.1 | 0 | 0 | Yes | 1.05 | Yes |
| 1245 | 2.85 | 9.45 | 42.13 | 94.8 | 5.2 | 0 | 0 | Yes | 1.24 | Yes |
| 1246 | 2.94 | 9.61 | 38.50 | 84.6 | 15.4 | 0 | 0 | Yes | 1.33 | Yes |
| 1247 | 2.11 | 9.85 | 64.13 | 89.3 | 10.7 | 0 | 0 | Yes | 1.27 | Yes |
| 1248 | 2.68 | 9.23 | 44.21 | 83.3 | 16.7 | 0 | 0 | Yes | 1.05 | Yes |
| 1249 | 2.99 | 9.08 | 39.51 | 80.05 | 19.6 | 0.35 | 0 | No | 1.12 | Yes |
| 1250 | 1.82 | 9.87 | 78.64 | 85.5 | 14.5 | 0 | 0 | No | 1.23 | Yes |
| 1251 | 1.42 | 9.46 | 42.05 | 85 | 14.2 | 0 | 0.8 | No | 1.36 | Yes |
| 1252 | 2.12 | 9.28 | 64.58 | 87.3 | 12.7 | 0 | 0 | No | 1.11 | Yes |
| 1253 | 1.92 | 9.45 | 47.76 | 89.5 | 10.5 | 0 | 0 | Yes | 1.07 | Yes |
| 1254 | 2.11 | 9.63 | 24.10 | 87.3 | 11.8 | 0 | 0.9 | Yes | 1.42 | Yes |
| 1255 | 2.97 | 9.16 | 39.11 | 86.4 | 12.8 | 0.5 | 0.3 | Yes | 1.38 | Yes |

| Invention Example No | Any of MgZn2, Mg2Zn11, Mg2Zn3, MgZn, Mg7Zn3 present? | Number of faces | Coating details Total metal grain content of coat (Mass %) | Coating details Base resin type | Coating details Coat thickness (μm) | Coating details Coating method | Corrosion Test Results |
|---|---|---|---|---|---|---|---|
| 1237 | Yes | 7 | 81 | Alkyl silicate | 25 | Spray | E |
| 1238 | Yes | 2 | 46 | Alkali silicate | 14 | Spray | E |
| 1239 | Yes | 2 | 47 | Urethane resin | 112 | Spray | E |
| 1240 | Yes | 6 | 48 | Alkali silicate | 24 | Spray | E |
| 1241 | Yes | 7 | 51 | Urethane resin | 150 | Spray | E |
| 1242 | Yes | 6 | 53 | Alkali silicate | 18 | Spray | E |
| 1243 | Yes | 7 | 88 | Alkyl silicate | 19 | Brush | E |
| 1244 | Yes | 6 | 85 | Alkyl silicate | 24 | Spray | E |
| 1245 | Yes | 2 | 83 | Urethane resin | 99 | Spray | E |
| 1246 | Yes | 2 | 82 | Alkyl silicate | 7 | Spray | E |
| 1247 | Yes | 6 | 83 | Epoxy resin | 100 | Spray | E |
| 1248 | Yes | 7 | 47 | Alkyl silicate | 27 | Brush | E |
| 1249 | Yes | 6 | 51 | Alkali silicate | 15 | Spray | E |
| 1250 | Yes | 6 | 52 | Alkyl silicate | 14 | Spray | E |
| 1251 | Yes | 2 | 51 | Urethane resin | 55 | Spray | E |
| 1252 | Yes | 7 | 52 | Alkyl silicate | 8 | Spray | E |
| 1253 | Yes | 2 | 89 | Urethane resin | 122 | Brush | E |
| 1254 | Yes | 2 | 85 | Alkyl silicate | 54 | Spray | E |
| 1255 | Yes | 6 | 82 | Alkali silicate | 19 | Spray | E |

TABLE 66

| Invention Example No | Granularity distribution (peak diameter) of Zn metal grains/Zn alloy grains (μm) Fine metal | Granularity distribution (peak diameter) of Zn metal grains/Zn alloy grains (μm) Coarse metal | Percent of fine-grain metal grains among Zn metal grains/Zn alloy grains (Vol %) | Chemical component content of Zn metal grains/Zn alloy grains (Mass %) Zn | Chemical component content of Zn metal grains/Zn alloy grains (Mass %) Mg | Chemical component content of Zn metal grains/Zn alloy grains (Mass %) Al | Chemical component content of Zn metal grains/Zn alloy grains (Mass %) Si | Zn alloy grain fracture surfaces or cracks present? | Ave aspect ratio | Mg solid solution phase and Zn—Mg intermetallic compounds present on grain surfaces? |
|---|---|---|---|---|---|---|---|---|---|---|
| 1256 | 2.36 | 10.39 | 19.65 | 93.8 | 6.2 | 0 | 0 | Yes | 1.22 | Yes |
| 1257 | 3.05 | 10.56 | 65.39 | 83.8 | 16.2 | 0 | 0 | Yes | 1.14 | Yes |
| 1258 | 2.15 | 10.74 | 48.57 | 80.4 | 19.6 | 0 | 0 | Yes | 1.13 | Yes |
| 1259 | 2.19 | 10.27 | 24.91 | 87.6 | 12.4 | 0 | 0 | Yes | 1.02 | Yes |
| 1260 | 2.48 | 11.5 | 39.92 | 89.3 | 10.7 | 0 | 0 | Yes | 1.06 | Yes |
| 1261 | 2.85 | 11.67 | 22.65 | 91.5 | 8.5 | 0 | 0 | Yes | 1.05 | Yes |
| 1262 | 2.75 | 11.85 | 66.20 | 94.9 | 5.1 | 0 | 0 | Yes | 1.24 | Yes |
| 1263 | 2.46 | 11.38 | 49.38 | 75.5 | 24.5 | 0 | 0 | Yes | 1.33 | Yes |
| 1264 | 2.71 | 12.61 | 30.58 | 86.5 | 13.5 | 0 | 0 | Yes | 1.27 | Yes |
| 1265 | 2.36 | 12.78 | 45.59 | 80 | 20 | 0 | 0 | Yes | 1.05 | Yes |
| 1266 | 2.16 | 9.57 | 28.32 | 84.5 | 15.5 | 0 | 0 | Yes | 1.12 | Yes |
| 1267 | 2.46 | 9.81 | 71.87 | 88 | 10.5 | 1.5 | 0 | Yes | 1.23 | Yes |
| 1268 | 2.49 | 8.43 | 53.05 | 92.1 | 7.9 | 0 | 0 | Yes | 1.36 | Yes |
| 1269 | 2.95 | 8.55 | 27.74 | 95.2 | 4.8 | 0 | 0 | Yes | 1.11 | Yes |
| 1270 | 2.36 | 8.22 | 42.75 | 81.6 | 18.4 | 0 | 0 | Yes | 1.07 | Yes |
| 1271 | 2.21 | 9.44 | 23.29 | 86.8 | 12.7 | 0 | 0.5 | Yes | 1.42 | Yes |
| 1272 | 2.25 | 9.58 | 61.12 | 89.7 | 10.3 | 0 | 0 | No | 1.38 | Yes |
| 1273 | 2.44 | 9.67 | 44.30 | 71.2 | 20.8 | 8 | 0 | Yes | 1.22 | Yes |
| 1274 | 2.78 | 9.83 | 23.96 | 97.5 | 2.5 | 0 | 0 | No | 1.14 | Yes |

| Invention Example No | Any of MgZn2, Mg2Zn11, Mg2Zn3, MgZn, Mg7Zn3 present? | Coating details Number of faces | Coating details Total metal grain content of coat (Mass %) | Coating details Base resin type | Coating details Coat thickness (μm) | Coating details Coating method | Corrosion Test Results |
|---|---|---|---|---|---|---|---|
| 1256 | Yes | 7 | 87 | Alkyl silicate | 25 | Brush | E |
| 1257 | Yes | 7 | 88 | Alkyl silicate | 58 | Spray | E |
| 1258 | Yes | 6 | 49 | Alkyl silicate | 21 | Spray | E |
| 1259 | Yes | 7 | 50 | Alkali silicate | 19 | Brush | E |
| 1260 | Yes | 7 | 51 | Urethane resin | 56 | Spray | E |
| 1261 | Yes | 6 | 52 | Alkyl silicate | 77 | Spray | E |
| 1262 | Yes | 7 | 53 | Alkyl silicate | 12 | Spray | E |
| 1263 | Yes | 2 | 88 | Alkyl silicate | 64 | Spray | E |
| 1264 | Yes | 7 | 85 | Alkyl silicate | 34 | Brush | E |
| 1265 | Yes | 7 | 83 | Alkali silicate | 28 | Spray | E |
| 1266 | Yes | 2 | 81 | Urethane resin | 109 | Brush | E |
| 1267 | Yes | 6 | 80 | Alkyl silicate | 15 | Spray | E |
| 1268 | Yes | 6 | 47 | Alkyl silicate | 14 | Spray | E |
| 1269 | Yes | 7 | 49 | Alkyl silicate | 18 | Spray | E |
| 1270 | Yes | 7 | 50 | Urethane resin | 122 | Brush | E |
| 1271 | Yes | 6 | 51 | Alkyl silicate | 54 | Spray | E |
| 1272 | Yes | 7 | 52 | Alkali silicate | 19 | Spray | E |
| 1273 | Yes | 2 | 83 | Alkyl silicate | 25 | Brush | E |
| 1274 | Yes | 2 | 88 | Alkyl silicate | 58 | Spray | E |

TABLE 67

| Invention Example No | Granularity distribution (peak diameter) of Zn metal grains/Zn alloy grains (μm) Fine metal | Granularity distribution (peak diameter) of Zn metal grains/Zn alloy grains (μm) Coarse metal | Percent of fine-grain metal grains among Zn metal grains/Zn alloy grains (Vol %) | Chemical component content of Zn metal grains/Zn alloy grains (Mass %) Zn | Chemical component content of Zn metal grains/Zn alloy grains (Mass %) Mg | Chemical component content of Zn metal grains/Zn alloy grains (Mass %) Al | Chemical component content of Zn metal grains/Zn alloy grains (Mass %) Si | Zn alloy grain fracture surfaces or cracks present? | Ave aspect ratio | Mg solid solution phase and Zn—Mg intermetallic compounds present on grain surfaces? |
|---|---|---|---|---|---|---|---|---|---|---|
| 1275 | 2.15 | 10.07 | 44.09 | 84.8 | 15.2 | 0 | 0 | Yes | 1.13 | Yes |
| 1276 | 2.19 | 9.45 | 24.63 | 80.8 | 19.2 | 0 | 0 | No | 1.02 | Yes |
| 1277 | 2.48 | 9.3 | 62.46 | 78.7 | 13.5 | 7.8 | 0 | Yes | 1.06 | Yes |
| 1278 | 2.59 | 9.99 | 45.64 | 88.1 | 11.9 | 0 | 0 | No | 1.05 | Yes |
| 1279 | 2.47 | 9.58 | 25.30 | 88.5 | 10.6 | 0 | 0.9 | Yes | 1.24 | Yes |
| 1280 | 2.69 | 9.4 | 42.84 | 84.6 | 15.4 | 0 | 0 | Yes | 1.33 | Yes |
| 1281 | 2.57 | 9.57 | 25.44 | 97.4 | 2.6 | 0 | 0 | Yes | 1.27 | Yes |
| 1282 | 2.49 | 9.54 | 63.27 | 83.3 | 16.7 | 0 | 0 | Yes | 1.37 | Yes |
| 1283 | 2.68 | 9.58 | 46.45 | 91.9 | 8.1 | 0 | 0 | Yes | 1.10 | Yes |
| 1284 | 2.35 | 9.25 | 46.45 | 86.3 | 13.7 | 0 | 0 | Yes | 1.04 | Yes |
| 1285 | 2.48 | 10.04 | 50.91 | 81.5 | 18.5 | 0 | 0 | Yes | 1.02 | Yes |
| 1286 | 2.13 | 11.27 | 27.25 | 97.6 | 2.4 | 0 | 0 | Yes | 1.01 | Yes |
| 1287 | 1.93 | 11.44 | 42.26 | 89.1 | 10.9 | 0 | 0 | Yes | 1.08 | Yes |
| 1288 | 2.05 | 8.9 | 33.69 | 92.8 | 7.2 | 0 | 0 | Yes | 1.14 | Yes |
| 1289 | 1.42 | 8.75 | 48.70 | 81.96 | 17.5 | 0.5 | 0.04 | No | 1.23 | Yes |
| 1290 | 1.46 | 9.44 | 29.24 | 85.4 | 14.6 | 0 | 0 | No | 1.33 | Yes |
| 1291 | 1.75 | 9.03 | 67.07 | 90.6 | 9.4 | 0 | 0 | Yes | 1.37 | Yes |
| 1292 | 1.86 | 8.85 | 50.25 | 92.9 | 7.1 | 0 | 0 | Yes | 1.44 | Yes |
| 1293 | 1.74 | 8.95 | 29.91 | 77.5 | 22.5 | 0 | 0 | Yes | 1.21 | Yes |

| Invention Example No | Any of MgZn2, Mg2Zn11, Mg2Zn3, MgZn, Mg7Zn3 present? | Number of faces | Coating details Total metal grain content of coat (Mass %) | Coating details Base resin type | Coating details Coat thickness (μm) | Coating method | Corrosion Test Results |
|---|---|---|---|---|---|---|---|
| 1275 | Yes | 6 | 85 | Alkyl silicate | 21 | Spray | E |
| 1276 | Yes | 7 | 83 | Alkali silicate | 19 | Brush | E |
| 1277 | Yes | 6 | 82 | Urethane resin | 56 | Spray | E |
| 1278 | Yes | 2 | 47 | Alkyl silicate | 77 | Spray | E |
| 1279 | Yes | 2 | 46 | Alkyl silicate | 54 | Spray | E |
| 1280 | Yes | 7 | 49 | Alkali silicate | 2 | Spray | G |
| 1281 | Yes | 6 | 50 | Alkali silicate | 20 | Spray | E |
| 1282 | Yes | 7 | 51 | Alkali silicate | 5 | Spray | G |
| 1283 | Yes | 7 | 83 | Alkyl silicate | 20 | Spray | E |
| 1284 | Yes | 6 | 82 | Alkali silicate | 15 | Brush | E |
| 1285 | Yes | 2 | 88 | Alkyl silicate | 57 | Brush | E |
| 1286 | Yes | 7 | 85 | Alkali silicate | 13 | Brush | E |
| 1287 | Yes | 2 | 86 | Alkyl silicate | 22 | Brush | E |
| 1288 | Yes | 2 | 47 | Alkali silicate | 20 | Spray | E |
| 1289 | Yes | 7 | 48 | Alkyl silicate | 27 | Spray | E |
| 1290 | Yes | 2 | 50 | Alkali silicate | 15 | Spray | E |
| 1291 | Yes | 7 | 51 | Alkyl silicate | 35 | Spray | E |
| 1292 | Yes | 2 | 52 | Alkali silicate | 34 | Brush | E |
| 1293 | Yes | 6 | 88 | Alkyl silicate | 45 | Brush | E |

TABLE 68

| Invention Example No | Granularity distribution (peak diameter) of Zn metal alloy grains (μm) Fine metal | Granularity distribution (peak diameter) of Zn metal alloy grains (μm) Coarse metal | Percent of fine-grain metal grains among Zn metal grains/Zn alloy grains (Vol %) | Chemical component content of Zn metal grains/Zn alloy grains (Mass %) Zn | Mg | Al | Si | Zn alloy grain fracture surfaces or cracks present? | Ave aspect ratio | Mg solid solution phase and Zn—Mg intermetallic compounds present on grain surfaces? | Any of MgZn2, Mg2Zn11, Mg2Zn3, MgZn, Mg7Zn3 present? |
|---|---|---|---|---|---|---|---|---|---|---|---|
| 1294 | 1.96 | 12.54 | 87.50 | 84.8 | 13.7 | 1.5 | 0 | No | 1.22 | Yes | Yes |
| 1295 | 1.65 | 8.7 | 30.58 | 87.1 | 12.9 | 0 | 0 | No | 1.23 | Yes | Yes |
| 1296 | 2.35 | 8.55 | 68.41 | 95.7 | 4.3 | 0 | 0 | Yes | 1.47 | Yes | Yes |
| 1297 | 1.62 | 10.72 | 54.59 | 80.2 | 17.6 | 1 | 1.2 | No | 1.01 | Yes | Yes |
| 1298 | 2.25 | 9.9 | 34.25 | 98.8 | 0.6 | 0.6 | 0 | Yes | 1.04 | Yes | Yes |
| 1299 | 2.36 | 9.57 | 37.61 | 86.9 | 10.3 | 1.6 | 1.2 | Yes | 1.05 | Yes | Yes |
| 1300 | 2.24 | 10.79 | 45.60 | 92.98 | 7 | 0.02 | 0 | Yes | 1.12 | Yes | Yes |
| 1301 | 2.46 | 10.93 | 46.70 | 75.5 | 23.5 | 1 | 0 | Yes | 1.11 | Yes | Yes |
| 1302 | 1.56 | 11.02 | 41.22 | 82.5 | 17.5 | 0 | 0 | No | 1.08 | Yes | Yes |
| 1303 | 1.24 | 11.18 | 45.68 | 80.1 | 12.4 | 7.5 | 0 | Yes | 1.47 | Yes | Yes |
| 1304 | 1.68 | 11.42 | 22.02 | 85.09 | 14.9 | 0 | 0.01 | Yes | 1.50 | Yes | Yes |
| 1305 | 2.65 | 10.8 | 37.03 | 78.7 | 20.7 | 0 | 0.6 | No | 1.13 | Yes | Yes |
| 1306 | 2.22 | 10.65 | 28.46 | 91.29 | 8.6 | 0 | 0.11 | Yes | 1.26 | Yes | Yes |
| 1307 | 2.45 | 11.34 | 43.47 | 85.8 | 14.2 | 0 | 0 | Yes | 1.14 | Yes | Yes |
| 1308 | 2.23 | 11.62 | 35.19 | 98.12 | 0.08 | 0 | 1.8 | Yes | 1.49 | Yes | Yes |
| 1309 | 2.26 | 11.15 | 73.02 | 83.46 | 15.2 | 0 | 1.34 | No | 1.34 | Yes | Yes |
| 1310 | 2.72 | 12.38 | 56.20 | 73.17 | 17.4 | 9 | 0.43 | Yes | 1.18 | Yes | Yes |
| 1311 | 2.13 | 12.55 | 35.86 | 98.6 | 0.8 | 0.6 | 0 | Yes | 1.17 | Yes | Yes |
| 1312 | 1.98 | 9.34 | 93.45 | 93.55 | 6.4 | 0.05 | 0 | Yes | 1.48 | Yes | Yes |

| Invention Example No | Number of faces | Coating details Total metal grain content of coat (Mass %) | Base resin type | Coat thickness (μm) | Coating method | Corrosion Test Results |
|---|---|---|---|---|---|---|
| 1294 | 6 | 89 | Alkali silicate | 52 | Brush | E |
| 1295 | 7 | 86 | Alkyl silicate | 23 | Brush | E |
| 1296 | 6 | 87 | Alkali silicate | 5 | Spray | E |
| 1297 | 2 | 86 | Alkyl silicate | 52 | Brush | E |
| 1298 | 2 | 46 | Alkali silicate | 150 | Brush | E |
| 1299 | 2 | 49 | Alkyl silicate | 60 | Brush | E |
| 1300 | 2 | 35 | Alkali silicate | 15 | Spray | E |
| 1301 | 2 | 37 | Alkyl silicate | 24 | Spray | E |
| 1302 | 2 | 36 | Alkyl silicate | 34 | Spray | E |
| 1303 | 6 | 38 | Alkyl silicate | 20 | Brush | E |
| 1304 | 6 | 48 | Alkali silicate | 200 | Brush | E |
| 1305 | 7 | 46 | Alkyl silicate | 56 | Brush | E |
| 1306 | 6 | 51 | Alkali silicate | 34 | Spray | E |
| 1307 | 2 | 46 | Alkyl silicate | 2 | Spray | G |
| 1308 | 7 | 38 | Alkali silicate | 15 | Spray | E |
| 1309 | 2 | 48 | Alkali silicate | 10 | Spray | E |
| 1310 | 6 | 52 | Alkyl silicate | 125 | Brush | E |
| 1311 | 6 | 30 | Alkali silicate | 24 | Brush | E |
| 1312 | 2 | 76 | Alkyl silicate | 110 | Brush | E |

TABLE 69

| Invention Example No | Granularity distribution (peak diameter) of Zn metal grains/Zn alloy grains (μm) Fine metal | Granularity distribution (peak diameter) of Zn metal grains/Zn alloy grains (μm) Coarse metal | Percent of fine-grain metal grains among Zn metal grains/Zn alloy grains (Vol %) | Chemical component content of Zn metal grains/Zn alloy grains (Mass %) Zn | Chemical component content of Zn metal grains/Zn alloy grains (Mass %) Mg | Chemical component content of Zn metal grains/Zn alloy grains (Mass %) Al | Chemical component content of Zn metal grains/Zn alloy grains (Mass %) Si | Zn alloy grain fracture surfaces or cracks present? | Ave aspect ratio | Mg solid solution phase and Zn—Mg intermetallic compounds present on grain surfaces? | Any of MgZn2, Mg2Zn11, Mg2Zn3, MgZn, Mg7Zn3 present? |
|---|---|---|---|---|---|---|---|---|---|---|---|
| 1313 | 2.02 | 9.58 | 30.66 | 96.78 | 3.2 | 0.02 | 0 | No | 1.49 | Yes | Yes |
| 1314 | 2.21 | 9.88 | 74.21 | 83 | 9.2 | 7.8 | 0 | Yes | 1.27 | Yes | Yes |
| 1315 | 2.55 | 10 | 55.39 | 70.92 | 19.2 | 9.88 | 0 | Yes | 1.17 | Yes | Yes |
| 1316 | 1.92 | 10.67 | 30.08 | 80.25 | 15.1 | 4.65 | 0 | Yes | 1.16 | Yes | Yes |
| 1317 | 1.96 | 11.89 | 45.09 | 81.85 | 14.5 | 3.65 | 0 | Yes | 1.27 | Yes | Yes |
| 1318 | 2.11 | 12.03 | 41.41 | 89.45 | 10.5 | 0.05 | 0 | Yes | 1.27 | Yes | Yes |
| 1319 | 2.97 | 12.12 | 17.75 | 87.3 | 7.5 | 5.2 | 0 | Yes | 1.49 | Yes | Yes |
| 1320 | 2.36 | 12.28 | 32.76 | 93.9 | 6.1 | 0 | 0.001 | Yes | 1.29 | Yes | Yes |
| 1321 | 3.05 | 12.52 | 30.89 | 82.55 | 16.8 | 0.05 | 0.6 | Yes | 1.23 | Yes | Yes |
| 1322 | 2.57 | 11.9 | 45.90 | 70.7 | 27.5 | 1 | 0.8 | Yes | 1.23 | Yes | Yes |
| 1323 | 2.65 | 11.75 | 42.22 | 94.6 | 2.9 | 0 | 2.5 | Yes | 1.23 | Yes | Yes |
| 1324 | 2.54 | 12.44 | 18.56 | 94 | 4.5 | 0 | 1.5 | No | 1.23 | Yes | Yes |
| 1325 | 2.85 | 12.03 | 33.57 | 99.43 | 0.07 | 0 | 0.5 | Yes | 1.27 | Yes | Yes |
| 1326 | 2.75 | 10.61 | 31.70 | 96.82 | 3.1 | 0.04 | 0.04 | Yes | 1.23 | Yes | Yes |
| 1327 | 2.46 | 11.3 | 46.71 | 76.3 | 20.5 | 1 | 2.2 | Yes | 1.36 | Yes | Yes |
| 1328 | 2.71 | 11.58 | 47.89 | 68.84 | 29.5 | 0.06 | 1.6 | Yes | 1.11 | Yes | Yes |
| 1329 | 2.36 | 11.11 | 24.23 | 92.33 | 7.6 | 0.07 | 0 | Yes | 1.02 | Yes | Yes |
| 1330 | 2.16 | 12.34 | 39.24 | 95.2 | 0.7 | 1.2 | 2.9 | Yes | 1.05 | Yes | Yes |
| 1331 | 2.46 | 12.51 | 37.37 | 91.8 | 4.6 | 1.8 | 1.8 | Yes | 1.24 | Yes | Yes |

| Invention Example No | Number of faces | Coating details Total metal grain content of coat (Mass %) | Coating details Base resin type | Coating details Coat thickness (μm) | Coating details Coating method | Corrosion Test Results |
|---|---|---|---|---|---|---|
| 1313 | 2 | 72 | Alkali silicate | 24 | Brush | E |
| 1314 | 7 | 81 | Alkyl silicate | 2 | Spray | G |
| 1315 | 6 | 64 | Alkali silicate | 37 | Spray | E |
| 1316 | 7 | 69 | Alkyl silicate | 113 | Brush | E |
| 1317 | 2 | 83 | Alkali silicate | 2 | Spray | G |
| 1318 | 7 | 30 | Alkyl silicate | 75 | Brush | E |
| 1319 | 6 | 83 | Alkali silicate | 30 | Brush | E |
| 1320 | 7 | 75 | Alkyl silicate | 34 | Brush | E |
| 1321 | 6 | 76 | Epoxy resin | 124 | Brush | E |
| 1322 | 7 | 72 | Acrylic resin | 15 | Spray | E |
| 1323 | 6 | 71 | Urethane resin | 23 | Spray | E |
| 1324 | 2 | 82 | Polyester resin | 157 | Brush | E |
| 1325 | 7 | 81 | Epoxy resin | 26 | Spray | E |
| 1326 | 6 | 83 | Acrylic resin | 38 | Spray | E |
| 1327 | 6 | 50 | Urethane resin | 160 | Brush | E |
| 1328 | 6 | 72 | Polyester resin | 27 | Brush | E |
| 1329 | 2 | 47 | Epoxy resin | 180 | Brush | E |
| 1330 | 6 | 47 | Acrylic resin | 26 | Spray | E |
| 1331 | 7 | 52 | Urethane resin | 180 | Brush | E |

TABLE 70

| Invention Example No | Granularity distribution (Ave diameter) of Zn metal grains/Zn alloy grains (μm) Fine metal | Granularity distribution (Ave diameter) of Zn metal grains/Zn alloy grains (μm) Coarse metal | Percent of fine-grain metal grains among Zn metal grains/Zn alloy grains (Vol %) | Chemical component content of Zn metal grains/Zn alloy grains (Mass %) Zn | Chemical component content of Zn metal grains/Zn alloy grains (Mass %) Mg | Chemical component content of Zn metal grains/Zn alloy grains (Mass %) Al | Chemical component content of Zn metal grains/Zn alloy grains (Mass %) Si | Zn alloy grain fracture surfaces or cracks present? | Ave aspect ratio | Mg solid solution phase and Zn—Mg intermetallic compounds present on grain surfaces? | Any of MgZn2, Mg2Zn11, Mg2Zn3, MgZn, Mg7Zn3 present? |
|---|---|---|---|---|---|---|---|---|---|---|---|
| 1380 | 2.35 | 9.25 | 35.87 | 88.8 | 11.2 | 0 | 0 | Yes | 1.12 | Yes | Yes |
| 1381 | 2.57 | 9.56 | 42.04 | 90.6 | 9.4 | 0 | 0 | No | 1.38 | Yes | Yes |
| 1382 | 2.56 | 9.84 | 6.55 | 81.45 | 18.5 | 0 | 0.05 | Yes | 1.22 | Yes | Yes |
| 1383 | 2.21 | 9.75 | 43.60 | 99.97 | 0.03 | 0 | 0 | Yes | 1.14 | Yes | Yes |
| 1384 | 2.64 | 9.85 | 44.12 | 98.4 | 1.6 | 0 | 0 | No | 1.02 | Yes | Yes |
| 1385 | 1.99 | 8.56 | 37.21 | 93.2 | 6.8 | 0 | 0 | Yes | 1.05 | Yes | Yes |
| 1386 | 2.94 | 8.21 | 43.38 | 84.5 | 13.9 | 0 | 1.6 | No | 1.36 | No | Yes |
| 1387 | 2.58 | 8.33 | 13.52 | 98.1 | 1.9 | 0 | 0 | Yes | 1.11 | No | Yes |
| 1388 | 2.37 | 8 | 44.94 | 94.3 | 5.7 | 0 | 0 | No | 1.07 | Yes | Yes |
| 1389 | 2.15 | 9.22 | 45.46 | 90.8 | 9.2 | 0 | 0 | No | 1.42 | Yes | Yes |
| 1390 | 2.96 | 9.36 | 35.96 | 83.3 | 15.4 | 0 | 1.3 | Yes | 1.38 | No | Yes |
| 1391 | 2.85 | 9.45 | 42.13 | 79.84 | 18.6 | 0 | 1.56 | Yes | 1.22 | No | Yes |
| 1392 | 2.94 | 9.61 | 7.56 | 96.4 | 3.6 | 0 | 0 | Yes | 1.14 | Yes | Yes |
| 1393 | 2.11 | 9.85 | 43.69 | 94.6 | 5.4 | 0 | 0 | Yes | 1.13 | Yes | Yes |
| 1394 | 2.68 | 9.23 | 44.21 | 92.4 | 7.6 | 0 | 0 | Yes | 1.02 | No | Yes |
| 1395 | 2.99 | 9.08 | 39.51 | 75.5 | 24.5 | 0 | 0 | Yes | 1.06 | Yes | Yes |
| 1396 | 2.78 | 9.87 | 45.68 | 82.4 | 17.6 | 0 | 0 | Yes | 1.05 | Yes | Yes |
| 1397 | 2.96 | 9.46 | 65.58 | 98.6 | 1.4 | 0 | 0 | Yes | 1.24 | No | Yes |
| 1398 | 2.85 | 9.28 | 47.24 | 78.5 | 21.5 | 0 | 0 | Yes | 1.33 | No | Yes |
| 1399 | 2.64 | 9.45 | 47.76 | 89.6 | 10.4 | 0 | 0 | Yes | 1.27 | Yes | Yes |

| Invention Example No | Number of faces | Coating details Total metal grain content of coat (Mass %) | Coating details Base resin type | Coating details Coat thickness (μm) | Coating details Coating method | Corrosion Test Results |
|---|---|---|---|---|---|---|
| 1380 | 2 | 49 | Alkyl silicate | 14 | Spray | E |
| 1381 | 2 | 89 | Urethane resin | 55 | Spray | E |
| 1382 | 2 | 90 | Alkyl silicate | 8 | Spray | E |
| 1383 | 2 | 86 | Urethane resin | 122 | Brush | E |
| 1384 | 6 | 48 | Alkyl silicate | 555 | Spray | E |
| 1385 | 6 | 47 | Alkali silicate | 19 | Spray | E |
| 1386 | 7 | 47 | Alkyl silicate | 25 | Brush | E |
| 1387 | 6 | 47 | Alkyl silicate | 58 | Spray | E |
| 1388 | 2 | 52 | Alkyl silicate | 685 | Spray | E |
| 1389 | 7 | 52 | Alkali silicate | 19 | Brush | E |
| 1390 | 2 | 52 | Urethane resin | 700 | Spray | E |
| 1391 | 6 | 88 | Alkyl silicate | 77 | Spray | E |
| 1392 | 6 | 87 | Alkyl silicate | 54 | Spray | E |
| 1393 | 2 | 89 | Alkyl silicate | 64 | Spray | E |
| 1394 | 2 | 90 | Alkyl silicate | 34 | Brush | E |
| 1395 | 7 | 91 | Alkali silicate | 28 | Spray | E |
| 1396 | 6 | 46 | Urethane resin | 109 | Brush | E |
| 1397 | 7 | 47 | Alkyl silicate | 15 | Spray | E |
| 1398 | 2 | 47 | Alkyl silicate | 14 | Spray | E |
| 1399 | 7 | 49 | Alkyl silicate | 18 | Spray | E |

TABLE 71

| Invention Example No | Granularity distribution (Ave diameter) of Zn metal grains/Zn alloy grains (μm) Fine metal | Granularity distribution (Ave diameter) of Zn metal grains/Zn alloy grains (μm) Coarse metal | Percent of fine-grain metal grains among Zn metal grains/ Zn alloy grains (Vol %) | Chemical component content of Zn metal grains/Zn alloy grains (Mass %) Zn | Chemical component content of Zn metal grains/Zn alloy grains (Mass %) Mg | Chemical component content of Zn metal grains/Zn alloy grains (Mass %) Al | Chemical component content of Zn metal grains/Zn alloy grains (Mass %) Si | Zn alloy grain fracture surfaces or cracks present? | Ave aspect ratio | Mg solid solution phase and Zn—Mg intermetallic compounds present on grain surfaces? | Any of MgZn2, Mg2Zn11, Mg2Zn3, MgZn, Mg7Zn3 present? |
|---|---|---|---|---|---|---|---|---|---|---|---|
| 1400 | 2.35 | 9.25 | 45.02 | 87.2 | 12.8 | 0 | 0 | Yes | 1.05 | Yes | Yes |
| 1401 | 2.12 | 9.46 | 47.02 | 92.2 | 7.8 | 0 | 0 | Yes | 1.22 | No | Yes |
| 1402 | 2.34 | 9.46 | 7.66 | 70.5 | 29.5 | 0 | 0 | Yes | 1.13 | No | Yes |
| 1403 | 2.33 | 9.46 | 15.20 | 91.5 | 8.5 | 0 | 0 | Yes | 1.06 | Yes | Yes |
| 1404 | 2.23 | 9.06 | 43.16 | 74.5 | 25.5 | 0 | 0 | Yes | 1.05 | Yes | Yes |
| 1405 | 2.12 | 9.3 | 49.33 | 99.93 | 0.07 | 0 | 0 | Yes | 1.24 | Yes | Yes |
| 1406 | 2.21 | 8.68 | 19.47 | 89.2 | 10.8 | 0 | 0 | No | 1.05 | Yes | Yes |
| 1407 | 1.38 | 8.53 | 69.55 | 86 | 11.2 | 1.6 | 1.2 | No | 1.12 | Yes | Yes |
| 1408 | 1.95 | 9.32 | 51.41 | 75.23 | 24.5 | 0.27 | 0 | Yes | 1.38 | No | Yes |
| 1409 | 2.26 | 8.95 | 75.88 | 82.6 | 17.4 | 0 | 0 | Yes | 1.13 | No | Yes |
| 1410 | 2.05 | 12.54 | 48.08 | 98.7 | 1.3 | 0 | 0 | Yes | 1.33 | Yes | Yes |
| 1411 | 1.65 | 8.7 | 66.85 | 80.5 | 19.5 | 0 | 0 | Yes | 1.27 | Yes | Yes |
| 1412 | 2.35 | 8.55 | 7.68 | 88.85 | 10.8 | 0.05 | 0.3 | No | 1.23 | No | Yes |
| 1413 | 1.62 | 8.91 | 8.64 | 87.7 | 11.9 | 0.4 | 0 | Yes | 1.11 | Yes | Yes |
| 1414 | 1.88 | 9.91 | 16.58 | 90.5 | 9.5 | 0 | 0 | Yes | 1.42 | Yes | Yes |
| 1415 | 2.35 | 9.25 | 35.87 | 89.5 | 10.5 | 0 | 0 | Yes | 1.06 | No | Yes |
| 1416 | 2.57 | 9.56 | 42.04 | 84.9 | 15.1 | 0 | 0 | Yes | 1.05 | Yes | Yes |
| 1417 | 2.56 | 9.84 | 38.41 | 83.2 | 16.8 | 0 | 0 | Yes | 1.07 | Yes | Yes |
| 1418 | 2.21 | 9.75 | 6.99 | 89.4 | 10.6 | 0 | 0 | Yes | 1.42 | No | Yes |
| 1419 | 2.64 | 9.85 | 44.12 | 84.3 | 13.3 | 2.4 | 0 | Yes | 1.38 | Yes | Yes |

| Invention Example No | Number of faces | Coating details Total metal grain content of coat (Mass %) | Coating details Base resin type | Coating details Coat thickness (μm) | Coating details Coating method | Corrosion Test Results |
|---|---|---|---|---|---|---|
| 1400 | 6 | 50 | Alkali silicate | 2 | Spray | G |
| 1401 | 7 | 87 | Alkyl silicate | 37 | Spray | E |
| 1402 | 6 | 83 | Alkali silicate | 12 | Spray | E |
| 1403 | 7 | 48 | Alkyl silicate | 160 | Brush | E |
| 1404 | 6 | 51 | Alkali silicate | 5 | Brush | G |
| 1405 | 2 | 51 | Alkyl silicate | 56 | Brush | E |
| 1406 | 7 | 87 | Alkali silicate | 2 | Spray | G |
| 1407 | 6 | 85 | Alkyl silicate | 18 | Spray | E |
| 1408 | 6 | 86 | Alkyl silicate | 23 | Spray | E |
| 1409 | 6 | 50 | Epoxy resin | 30 | Brush | E |
| 1410 | 2 | 51 | Acrylic resin | 77 | Brush | E |
| 1411 | 6 | 51 | Urethane resin | 655 | Brush | E |
| 1412 | 7 | 80 | Polyester resin | 47 | Spray | E |
| 1413 | 2 | 46 | Epoxy resin | 43 | Spray | E |
| 1414 | 6 | 51 | Acrylic resin | 52 | Brush | E |
| 1415 | 2 | 86 | Urethane resin | 20 | Brush | E |
| 1416 | 6 | 85 | Polyester resin | 200 | Brush | E |
| 1417 | 7 | 82 | Alkali silicate | 22 | Spray | E |
| 1418 | 7 | 81 | Alkyl silicate | 25 | Spray | E |
| 1419 | 2 | 46 | Alkali silicate | 14 | Spray | E |

TABLE 72

| Invention Example No | Granularity distribution (Ave diameter) of Zn metal grains/Zn alloy grains (μm) Fine metal | Granularity distribution (Ave diameter) of Zn metal grains/Zn alloy grains (μm) Coarse metal | Percent of fine-grain metal grains among Zn metal grains/Zn alloy grains (Vol %) | Chemical component content of Zn metal grains/Zn alloy grains (Mass %) Zn | Chemical component content of Zn metal grains/Zn alloy grains (Mass %) Mg | Chemical component content of Zn metal grains/Zn alloy grains (Mass %) Al | Chemical component content of Zn metal grains/Zn alloy grains (Mass %) Si | Zn alloy grain fracture surfaces or cracks present? | Ave aspect ratio | Mg solid solution phase and Zn—Mg intermetallic compounds present on grain surfaces? | Any of MgZn2, Mg2Zn11, Mg2Zn3, MgZn, Mg7Zn3 present? |
|---|---|---|---|---|---|---|---|---|---|---|---|
| 1420 | 2.65 | 8.56 | 66.99 | 98.6 | 1.4 | 0 | 0 | No | 1.22 | Yes | Yes |
| 1421 | 2.94 | 8.21 | 43.38 | 76.45 | 23.5 | 0 | 0.05 | Yes | 1.14 | Yes | Yes |
| 1422 | 2.58 | 8.33 | 39.75 | 91.1 | 8.9 | 0 | 0 | Yes | 1.13 | Yes | Yes |
| 1423 | 2.37 | 8 | 65.38 | 85.1 | 14.9 | 0 | 0 | Yes | 1.02 | Yes | Yes |
| 1424 | 2.15 | 9.22 | 45.46 | 77.48 | 18.4 | 2.55 | 1.57 | Yes | 1.06 | Yes | Yes |
| 1425 | 2.96 | 9.36 | 22.55 | 97.9 | 2.1 | 0 | 0 | Yes | 1.05 | Yes | Yes |
| 1426 | 2.85 | 9.45 | 42.13 | 94.8 | 5.2 | 0 | 0 | Yes | 1.24 | Yes | Yes |
| 1427 | 2.94 | 9.61 | 38.50 | 84.6 | 15.4 | 0 | 0 | Yes | 1.33 | Yes | Yes |
| 1428 | 2.11 | 9.85 | 64.13 | 89.3 | 10.7 | 0 | 0 | Yes | 1.27 | Yes | Yes |
| 1429 | 2.68 | 9.23 | 44.21 | 83.3 | 16.7 | 0 | 0 | Yes | 1.05 | Yes | Yes |
| 1430 | 2.99 | 9.08 | 39.51 | 80.05 | 19.6 | 0.35 | 0 | No | 1.12 | Yes | Yes |
| 1431 | 1.82 | 9.87 | 78.64 | 85.5 | 14.5 | 0 | 0 | No | 1.23 | Yes | Yes |
| 1432 | 1.42 | 9.46 | 42.05 | 85 | 14.2 | 0 | 0.8 | No | 1.36 | Yes | Yes |
| 1433 | 2.12 | 9.28 | 64.58 | 87.3 | 12.7 | 0 | 0 | No | 1.11 | Yes | Yes |
| 1434 | 1.92 | 9.45 | 47.76 | 89.5 | 10.5 | 0 | 0 | Yes | 1.07 | Yes | Yes |
| 1435 | 2.11 | 9.63 | 24.10 | 87.3 | 11.8 | 0 | 0.9 | Yes | 1.42 | Yes | Yes |
| 1436 | 2.97 | 9.16 | 39.11 | 86.4 | 12.8 | 0.5 | 0.3 | Yes | 1.38 | Yes | Yes |
| 1437 | 2.36 | 10.39 | 19.65 | 93.8 | 6.2 | 0 | 0 | Yes | 1.22 | Yes | Yes |
| 1438 | 3.05 | 10.56 | 65.39 | 83.8 | 16.2 | 0 | 0 | Yes | 1.14 | Yes | Yes |
| 1439 | 2.15 | 10.74 | 48.57 | 80.4 | 19.6 | 0 | 0 | Yes | 1.13 | Yes | Yes |

| Invention Example No | Coating details Number of faces | Coating details Total metal grain content of coat (Mass %) | Coating details Base resin type | Coating details Coat thickness (μm) | Coating details Coating method | Corrosion Test Results |
|---|---|---|---|---|---|---|
| 1420 | 2 | 47 | Urethane resin | 112 | Spray | E |
| 1421 | 6 | 48 | Alkali silicate | 24 | Spray | E |
| 1422 | 7 | 51 | Urethane resin | 150 | Spray | E |
| 1423 | 6 | 53 | Alkali silicate | 18 | Spray | E |
| 1424 | 7 | 88 | Alkyl silicate | 19 | Brush | E |
| 1425 | 6 | 85 | Alkyl silicate | 24 | Spray | E |
| 1426 | 2 | 83 | Urethane resin | 99 | Spray | E |
| 1427 | 2 | 82 | Alkyl silicate | 7 | Spray | E |
| 1428 | 6 | 83 | Epoxy resin | 100 | Spray | E |
| 1429 | 7 | 47 | Alkyl silicate | 27 | Brush | E |
| 1430 | 6 | 51 | Alkali silicate | 15 | Spray | E |
| 1431 | 6 | 52 | Alkyl silicate | 14 | Spray | E |
| 1432 | 2 | 51 | Urethane resin | 55 | Spray | E |
| 1433 | 7 | 52 | Alkyl silicate | 8 | Spray | E |
| 1434 | 2 | 89 | Urethane resin | 122 | Brush | E |
| 1435 | 2 | 85 | Alkyl silicate | 54 | Spray | E |
| 1436 | 6 | 82 | Alkali silicate | 19 | Spray | E |
| 1437 | 7 | 87 | Alkyl silicate | 25 | Brush | E |
| 1438 | 7 | 88 | Alkyl silicate | 58 | Spray | E |
| 1439 | 6 | 49 | Alkyl silicate | 21 | Spray | E |

TABLE 73

| Invention Example No | Granularity distribution (Ave diameter) of Zn metal grains/Zn alloy grains (μm) Fine metal | Granularity distribution (Ave diameter) of Zn metal grains/Zn alloy grains (μm) Coarse metal | Percent of fine-grain metal grains among Zn metal grains/Zn alloy grains (Vol %) | Chemical component content of Zn metal grains/Zn alloy grains (Mass %) Zn | Chemical component content of Zn metal grains/Zn alloy grains (Mass %) Mg | Chemical component content of Zn metal grains/Zn alloy grains (Mass %) Al | Chemical component content of Zn metal grains/Zn alloy grains (Mass %) Si | Zn alloy grain fracture surfaces or cracks present? | Ave aspect ratio | Mg solid solution phase and Zn—Mg intermetallic compounds present on grain surfaces? | Any of MgZn2, Mg2Zn11, Mg2Zn3, MgZn, Mg7Zn3 present? |
|---|---|---|---|---|---|---|---|---|---|---|---|
| 1440 | 2.19 | 10.27 | 24.91 | 87.6 | 12.4 | 0 | 0 | Yes | 1.02 | Yes | Yes |
| 1441 | 2.48 | 11.5 | 39.92 | 89.3 | 10.7 | 0 | 0 | Yes | 1.06 | Yes | Yes |
| 1442 | 2.85 | 11.67 | 22.65 | 91.5 | 8.5 | 0 | 0 | Yes | 1.05 | Yes | Yes |
| 1443 | 2.75 | 11.85 | 66.20 | 94.9 | 5.1 | 0 | 0 | Yes | 1.24 | Yes | Yes |
| 1444 | 2.46 | 11.38 | 49.38 | 75.5 | 24.5 | 0 | 0 | Yes | 1.33 | Yes | Yes |
| 1445 | 2.71 | 12.61 | 30.58 | 86.5 | 13.5 | 0 | 0 | Yes | 1.27 | Yes | Yes |
| 1446 | 2.36 | 12.78 | 45.59 | 80 | 20 | 0 | 0 | Yes | 1.05 | Yes | Yes |
| 1447 | 2.16 | 9.57 | 28.32 | 84.5 | 15.5 | 0 | 0 | Yes | 1.12 | Yes | Yes |
| 1448 | 2.46 | 9.81 | 71.87 | 88 | 10.5 | 1.5 | 0 | Yes | 1.23 | Yes | Yes |
| 1449 | 2.49 | 8.43 | 53.05 | 92.1 | 7.9 | 0 | 0 | Yes | 1.36 | Yes | Yes |
| 1450 | 2.95 | 8.55 | 27.74 | 95.2 | 4.8 | 0 | 0 | Yes | 1.11 | Yes | Yes |
| 1451 | 2.36 | 8.22 | 42.75 | 81.6 | 18.4 | 0 | 0 | Yes | 1.07 | Yes | Yes |
| 1452 | 2.21 | 9.44 | 23.29 | 86.8 | 12.7 | 0 | 0.5 | Yes | 1.42 | Yes | Yes |
| 1453 | 2.25 | 9.58 | 61.12 | 89.7 | 10.3 | 0 | 0 | No | 1.38 | Yes | Yes |
| 1454 | 2.44 | 9.67 | 44.30 | 71.2 | 20.8 | 8 | 0 | Yes | 1.22 | Yes | Yes |
| 1455 | 2.78 | 9.83 | 23.96 | 97.5 | 2.5 | 0 | 0 | No | 1.14 | Yes | Yes |
| 1456 | 2.15 | 10.07 | 44.09 | 84.8 | 15.2 | 0 | 0 | Yes | 1.13 | Yes | Yes |
| 1457 | 2.19 | 9.45 | 24.63 | 80.8 | 19.2 | 0 | 0 | No | 1.02 | Yes | Yes |
| 1458 | 2.48 | 9.3 | 62.46 | 78.7 | 13.5 | 7.8 | 0 | Yes | 1.06 | Yes | Yes |
| 1459 | 2.59 | 9.99 | 45.64 | 88.1 | 11.9 | 0 | 0 | No | 1.05 | Yes | Yes |

| Invention Example No | Number of faces | Coating details Total metal grain content of coat (Mass %) | Coating details Base resin type | Coating details Coat thickness (μm) | Coating details Coating method | Corrosion Test Results |
|---|---|---|---|---|---|---|
| 1440 | 7 | 50 | Alkali silicate | 19 | Brush | E |
| 1441 | 7 | 51 | Urethane resin | 56 | Spray | E |
| 1442 | 6 | 52 | Alkyl silicate | 77 | Spray | E |
| 1443 | 7 | 53 | Alkyl silicate | 12 | Spray | E |
| 1444 | 2 | 88 | Alkyl silicate | 64 | Spray | E |
| 1445 | 7 | 85 | Alkyl silicate | 34 | Bursh | E |
| 1446 | 7 | 83 | Alkali silicate | 28 | Spray | E |
| 1447 | 2 | 81 | Urethane resin | 109 | Bursh | E |
| 1448 | 6 | 80 | Alkyl silicate | 15 | Spray | E |
| 1449 | 6 | 47 | Alkyl silicate | 14 | Spray | E |
| 1450 | 7 | 49 | Alkyl silicate | 18 | Spray | E |
| 1451 | 7 | 50 | Urethane resin | 122 | Brush | E |
| 1452 | 6 | 51 | Alkyl silicate | 54 | Spray | E |
| 1453 | 7 | 52 | Alkali silicate | 19 | Spray | E |
| 1454 | 2 | 83 | Alkyl silicate | 25 | Brush | E |
| 1455 | 2 | 88 | Alkyl silicate | 58 | Spray | E |
| 1456 | 6 | 85 | Alkyl silicate | 21 | Spray | E |
| 1457 | 7 | 83 | Alkali silicate | 19 | Brush | E |
| 1458 | 6 | 82 | Urethane resin | 56 | Spray | E |
| 1459 | 2 | 47 | Alkyl silicate | 77 | Spray | E |

TABLE 74

| Invention Example No | Granularity distribution (Ave diameter) of Zn metal grains/Zn alloy grains (μm) Fine metal | Granularity distribution (Ave diameter) of Zn metal grains/Zn alloy grains (μm) Coarse metal | Percent of fine-grain metal grains among Zn metal grains/ Zn alloy grains (Vol %) | Chemical component content of Zn metal grains/Zn alloy grains (Mass %) Zn | Chemical component content of Zn metal grains/Zn alloy grains (Mass %) Mg | Chemical component content of Zn metal grains/Zn alloy grains (Mass %) Al | Chemical component content of Zn metal grains/Zn alloy grains (Mass %) Si | Zn alloy grain fracture surfaces or cracks present? | Ave aspect ratio | Mg solid solution phase and Zn—Mg intermetallic compounds present on grain surfaces? | Any of MgZn2, Mg2Zn11, Mg2Zn3, MgZn, Mg7Zn3 present? |
|---|---|---|---|---|---|---|---|---|---|---|---|
| 1460 | 2.47 | 9.58 | 25.30 | 88.5 | 10.6 | 0 | 0.9 | Yes | 1.24 | Yes | Yes |
| 1461 | 2.69 | 9.4 | 42.84 | 84.6 | 15.4 | 0 | 0 | Yes | 1.33 | Yes | Yes |
| 1462 | 2.57 | 9.57 | 25.44 | 97.4 | 2.6 | 0 | 0 | Yes | 1.27 | Yes | Yes |
| 1463 | 2.49 | 9.54 | 63.27 | 83.3 | 16.7 | 0 | 0 | Yes | 1.37 | Yes | Yes |
| 1464 | 2.68 | 9.58 | 46.45 | 91.9 | 8.1 | 0 | 0 | Yes | 1.10 | Yes | Yes |
| 1465 | 2.35 | 9.25 | 46.45 | 86.3 | 13.7 | 0 | 0 | Yes | 1.04 | Yes | Yes |
| 1466 | 2.48 | 10.04 | 50.91 | 81.5 | 18.5 | 0 | 0 | Yes | 1.02 | Yes | Yes |
| 1467 | 2.13 | 11.27 | 27.25 | 97.6 | 2.4 | 0 | 0 | Yes | 1.01 | Yes | Yes |
| 1468 | 1.93 | 11.44 | 42.26 | 89.1 | 10.9 | 0 | 0 | Yes | 1.08 | Yes | Yes |
| 1469 | 2.05 | 8.9 | 33.69 | 92.8 | 7.2 | 0 | 0 | Yes | 1.14 | Yes | Yes |
| 1470 | 1.42 | 8.75 | 48.70 | 81.96 | 17.5 | 0.5 | 0.04 | No | 1.23 | Yes | Yes |
| 1471 | 1.46 | 9.44 | 29.24 | 85.4 | 14.6 | 0 | 0 | No | 1.33 | Yes | Yes |
| 1472 | 1.75 | 9.03 | 67.07 | 90.6 | 9.4 | 0 | 0 | Yes | 1.37 | Yes | Yes |
| 1473 | 1.86 | 8.85 | 50.25 | 92.9 | 7.1 | 0 | 0 | Yes | 1.44 | Yes | Yes |
| 1474 | 1.74 | 8.95 | 29.91 | 77.5 | 22.5 | 0 | 0 | Yes | 1.21 | Yes | Yes |
| 1475 | 1.96 | 12.54 | 87.50 | 84.8 | 13.7 | 1.5 | 0 | No | 1.22 | Yes | Yes |
| 1476 | 1.65 | 8.7 | 30.58 | 87.1 | 12.9 | 0 | 0 | No | 1.23 | Yes | Yes |
| 1477 | 2.35 | 8.55 | 68.41 | 95.7 | 4.3 | 0 | 0 | Yes | 1.47 | Yes | Yes |
| 1478 | 1.62 | 10.72 | 54.59 | 80.2 | 17.6 | 1 | 1.2 | No | 1.01 | Yes | Yes |
| 1479 | 2.25 | 9.9 | 34.25 | 98.8 | 0.6 | 0.6 | 0 | Yes | 1.04 | Yes | Yes |

| Invention Example No | Number of faces | Coating details Total metal grain content of coat (Mass %) | Coating details Base resin type | Coating details Coat thickness (μm) | Coating details Coating method | Corrosion Test Results |
|---|---|---|---|---|---|---|
| 1460 | 2 | 46 | Alkyl silicate | 54 | Spray | E |
| 1461 | 7 | 49 | Alkali silicate | 2 | Spray | G |
| 1462 | 6 | 50 | Alkali silicate | 20 | Spray | E |
| 1463 | 7 | 51 | Alkali silicate | 5 | Spray | G |
| 1464 | 7 | 83 | Alkyl silicate | 20 | Spray | E |
| 1465 | 6 | 82 | Alkali silicate | 15 | Brush | E |
| 1466 | 2 | 88 | Alkyl silicate | 57 | Brush | E |
| 1467 | 7 | 85 | Alkali silicate | 13 | Brush | E |
| 1468 | 7 | 86 | Alkyl silicate | 22 | Brush | E |
| 1469 | 2 | 47 | Alkali silicate | 20 | Spray | E |
| 1470 | 7 | 48 | Alkyl silicate | 27 | Spray | E |
| 1471 | 2 | 50 | Alkali silicate | 15 | Spray | E |
| 1472 | 7 | 51 | Alkyl silicate | 35 | Spray | E |
| 1473 | 2 | 52 | Alkali silicate | 34 | Brush | E |
| 1474 | 6 | 88 | Alkyl silicate | 45 | Brush | E |
| 1475 | 6 | 89 | Alkali silicate | 52 | Brush | E |
| 1476 | 7 | 86 | Alkyl silicate | 23 | Brush | E |
| 1477 | 6 | 87 | Alkali silicate | 5 | Spray | E |
| 1478 | 2 | 86 | Alkyl silicate | 52 | Brush | E |
| 1479 | 2 | 46 | Alkali silicate | 150 | Brush | E |

TABLE 75

| Invention Example No | Granularity distribution (Ave diameter) of Zn metal grains/Zn alloy grains (μm) Fine metal | Granularity distribution (Ave diameter) of Zn metal grains/Zn alloy grains (μm) Coarse metal | Percent of fine-grain metal grains among Zn metal grains/Zn alloy grains (Vol %) | Chemical component content of Zn metal grains/Zn alloy grains (Mass %) Zn | Mg | Al | Si | Zn alloy grain fracture surfaces or cracks present? | Ave aspect ratio | Mg solid solution phase and Zn—Mg intermetallic compounds present on grain surfaces? | Any of MgZn2, Mg2Zn11, Mg2Zn3, MgZn, Mg7Zn3 present? |
|---|---|---|---|---|---|---|---|---|---|---|---|
| 1480 | 2.36 | 9.57 | 37.61 | 86.9 | 10.3 | 1.6 | 1.2 | Yes | 1.05 | Yes | Yes |
| 1481 | 2.24 | 10.79 | 45.60 | 92.98 | 7 | 0.02 | 0 | Yes | 1.12 | Yes | Yes |
| 1482 | 2.46 | 10.93 | 46.70 | 75.5 | 23.5 | 1 | 0 | Yes | 1.11 | Yes | Yes |
| 1483 | 1.56 | 11.02 | 41.22 | 82.5 | 17.5 | 0 | 0 | No | 1.08 | Yes | Yes |
| 1484 | 1.24 | 11.18 | 45.68 | 80.1 | 12.4 | 7.5 | 0 | Yes | 1.47 | Yes | Yes |
| 1485 | 1.68 | 11.42 | 22.02 | 85.09 | 14.9 | 0 | 0.01 | Yes | 1.50 | Yes | Yes |
| 1486 | 2.65 | 10.8 | 37.03 | 78.7 | 20.7 | 0 | 0.6 | No | 1.13 | Yes | Yes |
| 1487 | 2.22 | 10.65 | 28.46 | 91.29 | 8.6 | 0 | 0.11 | Yes | 1.26 | Yes | Yes |
| 1488 | 2.45 | 11.34 | 43.47 | 85.8 | 14.2 | 0 | 0 | Yes | 1.14 | Yes | Yes |
| 1489 | 2.23 | 11.62 | 35.19 | 98.12 | 0.08 | 0 | 1.8 | Yes | 1.49 | Yes | Yes |
| 1490 | 2.26 | 11.15 | 73.02 | 83.46 | 15.2 | 0 | 1.34 | No | 1.34 | Yes | Yes |
| 1491 | 2.72 | 12.38 | 56.20 | 73.17 | 17.4 | 9 | 0.43 | Yes | 1.18 | Yes | Yes |
| 1492 | 2.13 | 12.55 | 35.86 | 98.6 | 0.8 | 0.6 | 0 | Yes | 1.17 | Yes | Yes |
| 1493 | 1.98 | 9.34 | 93.45 | 93.55 | 6.4 | 0.05 | 0 | Yes | 1.48 | Yes | Yes |
| 1494 | 2.02 | 9.58 | 30.66 | 96.78 | 3.2 | 0.02 | 0 | No | 1.49 | Yes | Yes |
| 1495 | 2.21 | 9.88 | 74.21 | 83 | 9.2 | 7.8 | 0 | Yes | 1.27 | Yes | Yes |
| 1496 | 2.55 | 10 | 55.39 | 70.92 | 19.2 | 9.88 | 0 | Yes | 1.17 | Yes | Yes |
| 1497 | 1.92 | 10.67 | 30.08 | 80.25 | 15.1 | 4.65 | 0 | Yes | 1.16 | Yes | Yes |
| 1498 | 1.96 | 11.89 | 45.09 | 81.85 | 14.5 | 3.65 | 0 | Yes | 1.27 | Yes | Yes |
| 1499 | 2.11 | 12.03 | 41.41 | 89.45 | 10.5 | 0.05 | 0 | Yes | 1.27 | Yes | Yes |

| Invention Example No | Number of faces | Coating details Total metal grain content of coat (Mass %) | Coating details Base resin type | Coating details Coat thickness (μm) | Coating details Coating method | Corrosion Test Results |
|---|---|---|---|---|---|---|
| 1480 | 2 | 49 | Alkyl silicate | 60 | Brush | E |
| 1481 | 2 | 35 | Alkali silicate | 15 | Spray | E |
| 1482 | 2 | 37 | Alkyl silicate | 24 | Spray | E |
| 1483 | 2 | 36 | Alkali silicate | 34 | Spray | E |
| 1484 | 6 | 38 | Alkyl silicate | 20 | Brush | E |
| 1485 | 6 | 48 | Alkali silicate | 200 | Brush | E |
| 1486 | 7 | 46 | Alkyl silicate | 56 | Brush | E |
| 1487 | 6 | 51 | Alkali silicate | 34 | Spray | E |
| 1488 | 2 | 46 | Alkyl silicate | 2 | Spray | G |
| 1489 | 7 | 38 | Alkali silicate | 15 | Spray | E |
| 1490 | 2 | 48 | Alkali silicate | 10 | Spray | E |
| 1491 | 6 | 52 | Alkyl silicate | 125 | Brush | E |
| 1492 | 6 | 30 | Alkali silicate | 24 | Brush | E |
| 1493 | 2 | 76 | Alkyl silicate | 110 | Brush | E |
| 1494 | 2 | 72 | Alkali silicate | 24 | Brush | E |
| 1495 | 7 | 81 | Alkyl silicate | 2 | Spray | G |
| 1496 | 6 | 64 | Alkali silicate | 37 | Spray | E |
| 1497 | 7 | 69 | Alkyl silicate | 113 | Brush | E |
| 1498 | 2 | 83 | Alkali silicate | 2 | Spray | G |
| 1499 | 7 | 30 | Alkyl silicate | 75 | Brush | E |

TABLE 76

| Invention Example No | Granularity distribution (Ave diameter) of Zn metal grains/Zn alloy grains (μm) Fine metal | Granularity distribution (Ave diameter) of Zn metal grains/Zn alloy grains (μm) Coarse metal | Percent of fine-grain metal grains among Zn metal grains/Zn alloy grains (Vol %) | Chemical component content of Zn metal grains/Zn alloy grains (Mass %) Zn | Chemical component content of Zn metal grains/Zn alloy grains (Mass %) Mg | Chemical component content of Zn metal grains/Zn alloy grains (Mass %) Al | Chemical component content of Zn metal grains/Zn alloy grains (Mass %) Si | Zn alloy grain fracture surfaces or cracks present? | Ave aspect ratio | Mg solid solution phase and Zn—Mg intermetallic compounds present on grain surfaces? | Any of MgZn2, Mg2Zn11, Mg2Zn3, MgZn, Mg7Zn3 present? |
|---|---|---|---|---|---|---|---|---|---|---|---|
| 1500 | 2.97 | 12.12 | 17.75 | 87.3 | 7.5 | 5.2 | 0 | Yes | 1.49 | Yes | Yes |
| 1501 | 2.36 | 12.28 | 32.76 | 93.9 | 6.1 | 0 | 0.001 | Yes | 1.29 | Yes | Yes |
| 1502 | 3.05 | 12.52 | 30.89 | 82.55 | 16.8 | 0.05 | 0.6 | Yes | 1.23 | Yes | Yes |
| 1503 | 2.57 | 11.9 | 45.90 | 70.7 | 27.5 | 1 | 0.8 | Yes | 1.23 | Yes | Yes |
| 1504 | 2.65 | 11.75 | 42.22 | 94.6 | 2.9 | 0 | 2.5 | Yes | 1.23 | Yes | Yes |
| 1505 | 2.54 | 12.44 | 18.56 | 94 | 4.5 | 0 | 1.5 | No | 1.23 | Yes | Yes |
| 1506 | 2.85 | 12.03 | 33.57 | 99.43 | 0.07 | 0 | 0.5 | Yes | 1.27 | Yes | Yes |
| 1507 | 2.75 | 10.61 | 31.70 | 96.82 | 3.1 | 0.04 | 0.04 | Yes | 1.23 | Yes | Yes |
| 1508 | 2.46 | 11.3 | 46.71 | 76.3 | 20.5 | 1 | 2.2 | Yes | 1.36 | Yes | Yes |
| 1509 | 2.71 | 11.58 | 47.89 | 68.84 | 29.5 | 0.06 | 1.6 | Yes | 1.11 | Yes | Yes |
| 1510 | 2.36 | 11.11 | 24.23 | 92.33 | 7.6 | 0.07 | 0 | Yes | 1.02 | Yes | Yes |
| 1511 | 2.16 | 12.34 | 39.24 | 95.2 | 0.7 | 1.2 | 2.9 | Yes | 1.05 | Yes | Yes |
| 1512 | 2.46 | 12.51 | 37.37 | 91.8 | 4.6 | 1.8 | 1.8 | Yes | 1.24 | Yes | Yes |
| 1513 | 2.49 | 11.64 | 50.38 | 82 | 8.3 | 9.2 | 0.5 | Yes | 1.33 | Yes | Yes |
| 1514 | 1.63 | 9.16 | 37.14 | 88.2 | 11.8 | 0 | 0 | Yes | 1.27 | Yes | Yes |
| 1515 | 1.51 | 9.46 | 13.48 | 86.06 | 12.9 | 0 | 1.04 | Yes | 1.50 | Yes | Yes |
| 1516 | 3.05 | 9.54 | 40.05 | 99.34 | 0.6 | 0 | 0.06 | Yes | 1.13 | Yes | Yes |
| 1517 | 2.57 | 9.56 | 38.18 | 89.51 | 9.5 | 0 | 0.99 | No | 1.04 | Yes | Yes |
| 1518 | 2.65 | 9.46 | 7.63 | 88.3 | 11.7 | 0 | 0 | Yes | 1.02 | Yes | Yes |
| 1519 | 2.54 | 11.99 | 37.95 | 89.9 | 9.4 | 0.7 | 0 | Yes | 1.08 | Yes | Yes |

| Invention Example No | Number of faces | Coating details Total metal grain content of coat (Mass %) | Coating details Base resin type | Coating details Coat thickness (μm) | Coating details Coating method | Corrosion Test Results |
|---|---|---|---|---|---|---|
| 1500 | 6 | 83 | Alkali silicate | 30 | Brush | E |
| 1501 | 7 | 75 | Alkyl silicate | 34 | Brush | E |
| 1502 | 6 | 76 | Epoxy resin | 124 | Brush | E |
| 1503 | 7 | 72 | Acrylic resin | 15 | Spray | E |
| 1504 | 6 | 71 | Urethane resin | 23 | Spray | E |
| 1505 | 2 | 82 | Polyester resin | 157 | Brush | E |
| 1506 | 7 | 81 | Epoxy resin | 26 | Spray | E |
| 1507 | 6 | 83 | Acrylic resin | 38 | Spray | E |
| 1508 | 6 | 50 | Urethane resin | 160 | Brush | E |
| 1509 | 6 | 72 | Polyester resin | 27 | Brush | E |
| 1510 | 2 | 47 | Epoxy resin | 180 | Brush | E |
| 1511 | 6 | 47 | Acrylic resin | 26 | Spray | E |
| 1512 | 7 | 52 | Urethane resin | 180 | Brush | E |
| 1513 | 2 | 52 | Polyester resin | 15 | Spray | E |
| 1514 | 6 | 50 | Epoxy resin | 2 | Spray | G |
| 1515 | 2 | 46 | Acrylic resin | 28 | Spray | E |
| 1516 | 6 | 47 | Urethane resin | 30 | Spray | E |
| 1517 | 7 | 83 | Polyester resin | 2 | Spray | G |
| 1518 | 7 | 52 | Epoxy resin | 157 | Brush | E |
| 1519 | 2 | 89 | Acrylic resin | 28 | Brush | E |

TABLE 77

| Invention Example No | Granularity distribution (Ave diameter) of Zn metal grains/Zn alloy grains (μm) Fine metal | Granularity distribution (Ave diameter) of Zn metal grains/Zn alloy grains (μm) Coarse metal | Percent of fine-grain metal grains among Zn metal grains/Zn alloy grains (Vol %) | Chemical component content of Zn metal grains/Zn alloy grains (Mass %) Zn | Mg | Al | Si | Zn alloy grain fracture surfaces or cracks present? | Ave aspect ratio | Mg solid solution phase and Zn—Mg intermetallic compounds present on grain surfaces? | Any of MgZn2, Mg2Zn11, Mg2Zn3, MgZn, Mg7Zn3 present? |
|---|---|---|---|---|---|---|---|---|---|---|---|
| 1520 | 2.85 | 12.08 | 14.29 | 87.8 | 11.7 | 0.5 | 0 | Yes | 1.15 | Yes | Yes |
| 1521 | 2.75 | 12.24 | 40.86 | 95.6 | 4.2 | 0.2 | 0 | Yes | 1.34 | Yes | Yes |
| 1522 | 2.46 | 12.48 | 97.50 | 97.13 | 2.8 | 0.07 | 0 | Yes | 1.25 | Yes | Yes |
| 1523 | 2.71 | 11.86 | 13.30 | 86.1 | 13.9 | 0 | 0 | Yes | 1.19 | Yes | Yes |
| 1524 | 2.36 | 11.71 | 43.62 | 82.6 | 14.6 | 1.6 | 1.2 | No | 1.18 | Yes | Yes |
| 1525 | 2.46 | 11.35 | 56.93 | 72.95 | 26.4 | 0.65 | 0 | Yes | 1.24 | Yes | Yes |
| 1526 | 1.45 | 12.02 | 36.59 | 83.23 | 16.5 | 0.27 | 0 | Yes | 1.11 | Yes | Yes |
| 1527 | 2.42 | 13.24 | 39.95 | 79.4 | 19.5 | 0.45 | 0.65 | Yes | 1.27 | Yes | Yes |
| 1528 | 2.11 | 9.46 | 86.50 | 97.08 | 1.6 | 0.33 | 0.99 | Yes | 1.31 | Yes | Yes |
| 1529 | 2.97 | 13.47 | 32.87 | 90.5 | 6 | 1 | 2.5 | Yes | 1.26 | Yes | Yes |
| 1530 | 2.36 | 9.46 | 16.23 | 88.93 | 8.4 | 0.87 | 1.8 | Yes | 1.14 | Yes | Yes |
| 1531 | 3.05 | 13.87 | 37.40 | 86.7 | 13.3 | 0 | 0 | Yes | 1.34 | Yes | Yes |
| 1532 | 2.57 | 13.25 | 40.76 | 81.4 | 18.6 | 0. | 0 | Yes | 1.16 | Yes | Yes |
| 1533 | 2.65 | 13.1 | 87.31 | 97.34 | 1.8 | 0.86 | 0 | No | 1.47 | Yes | Yes |
| 1534 | 2.12 | 9.08 | 92.50 | 95.25 | 4.1 | 0.65 | 0 | Yes | 1.48 | Yes | Yes |
| 1535 | 1.65 | 9.87 | 17.93 | 82.87 | 16.7 | 0.43 | 0 | No | 1.49 | Yes | Yes |
| 1536 | 2.35 | 9.46 | 44.50 | 99 | 0.4 | 0.6 | 0 | Yes | 1.34 | Yes | Yes |
| 1537 | 1.63 | 9.28 | 96.50 | 89.35 | 10.6 | 0.05 | 0 | Yes | 1.29 | Yes | Yes |
| 1538 | 2.64 | 9.45 | 16.94 | 93.08 | 6.9 | 0.02 | 0 | Yes | 1.18 | Yes | Yes |
| 1539 | 2.35 | 9.25 | 88.12 | 99.82 | 0.05 | 0.06 | 0.07 | Yes | 1.48 | Yes | Yes |

| Invention Example No | Number of faces | Coating details Total metal grain content of coat (Mass %) | Base resin type | Coat thickness (μm) | Coating method | Corrosion Test Results |
|---|---|---|---|---|---|---|
| 1520 | 2 | 85 | Alkyl silicate | 130 | Brush | E |
| 1521 | 6 | 53 | Alkyl silicate | 29 | Brush | E |
| 1522 | 7 | 88 | Epoxy resin | 30 | Brush | E |
| 1523 | 6 | 85 | Acrylic resin | 120 | Brush | E |
| 1524 | 7 | 52 | Urethane resin | 187 | Brush | E |
| 1525 | 6 | 83 | Polyester resin | 28 | Spray | E |
| 1526 | 2 | 88 | Epoxy resin | 5 | Spray | E |
| 1527 | 2 | 49 | Acrylic resin | 35 | Spray | E |
| 1528 | 6 | 50 | Urethane resin | 5 | Spray | G |
| 1529 | 7 | 51 | Polyester resin | 200 | Brush | E |
| 1530 | 6 | 83 | Alkali silicate | 25 | Spray | E |
| 1531 | 6 | 82 | Alkali silicate | 15 | Spray | E |
| 1532 | 2 | 88 | Alkyl silicate | 20 | Spray | E |
| 1533 | 7 | 85 | Alkali silicate | 18 | Spray | E |
| 1534 | 2 | 87 | Alkyl silicate | 22 | Spray | E |
| 1535 | 2 | 86 | Alkali silicate | 19 | Spray | E |
| 1536 | 6 | 46 | Alkyl silicate | 29 | Spray | E |
| 1537 | 7 | 49 | Alkali silicate | 23 | Spray | E |
| 1538 | 7 | 35 | Alkyl silicate | 21 | Spray | E |
| 1539 | 6 | 30 | Alkali silicate | 19 | Spray | E |

TABLE 78

| Invention Example No | Granularity distribution (Ave diameter) of Zn metal grains/Zn alloy grains (μm) Fine metal | Granularity distribution (Ave diameter) of Zn metal grains/Zn alloy grains (μm) Coarse metal | Percent of fine-grain metal grains among Zn metal grains/Zn alloy grains (Vol %) | Chemical component content of Zn metal grains/Zn alloy grains (Mass %) Zn | Mg | Al | Si | Zn alloy grain fracture surfaces or cracks present? | Ave aspect ratio | Mg solid solution phase and Zn—Mg intermetallic compounds present on grain surfaces? | Any of MgZn2, Mg2Zn11, Mg2Zn3, MgZn, Mg7Zn3 present? |
|---|---|---|---|---|---|---|---|---|---|---|---|
| 1540 | 2.31 | 9.46 | 60.57 | 91.56 | 6.4 | 1.05 | 0.99 | Yes | 1.27 | Yes | Yes |
| 1541 | 2.62 | 9.46 | 39.48 | 93.36 | 3.5 | 2.6 | 0.54 | Yes | 1.17 | Yes | Yes |
| 1542 | 2.52 | 9.46 | 15.82 | 82.13 | 17.5 | 0.05 | 0.32 | Yes | 1.27 | Yes | Yes |
| 1543 | 2.24 | 13.32 | 49.57 | 91.2 | 3.6 | 5.2 | 0 | No | 1.27 | Yes | Yes |
| 1544 | 0.05 | 6.54 | 86.52 | 94.1 | 5.9 | 0 | 0.001 | Yes | 1.48 | Yes | Yes |
| 1545 | 2.42 | 6.35 | 90.98 | 83.2 | 16.2 | 0 | 0.6 | No | 1.49 | Yes | Yes |
| 1546 | 0.11 | 7.54 | 67.32 | 76.7 | 22.5 | 0 | 0.8 | Yes | 1.34 | Yes | Yes |
| 1547 | 1.92 | 8.64 | 82.33 | 96.52 | 3.4 | 0.04 | 0.04 | Yes | 1.23 | Yes | Yes |
| 1548 | 0.46 | 6.45 | 73.76 | 68.3 | 26.5 | 3 | 2.2 | Yes | 1.23 | Yes | Yes |
| 1549 | 0.77 | 6.48 | 88.77 | 72.84 | 25.5 | 0.06 | 1.6 | Yes | 1.23 | Yes | Yes |
| 1550 | 2.35 | 9.25 | 45.02 | 87.2 | 12.8 | 0 | 0 | Yes | 1.05 | Yes | Yes |
| 1551 | 2.33 | 9.46 | 15.2 | 91.5 | 8.5 | 0 | 0 | Yes | 1.06 | Yes | Yes |
| 1552 | 1.95 | 9.32 | 51.41 | 75.23 | 24.5 | 0.27 | 0 | Yes | 1.38 | Yes | Yes |
| 1553 | 2.15 | 9.22 | 45.46 | 77.48 | 18.4 | 2.55 | 1.57 | Yes | 1.06 | Yes | Yes |
| 1554 | 2.23 | 11.62 | 35.19 | 72.62 | 0.08 | 25.5 | 1.8 | Yes | 1.49 | Yes | Yes |
| 1555 | 2.26 | 11.15 | 73.02 | 64.06 | 15.2 | 19.4 | 1.34 | No | 1.34 | Yes | Yes |
| 1556 | 1.98 | 9.34 | 93.45 | 83 | 6.4 | 10.6 | 0 | Yes | 1.48 | Yes | Yes |
| 1557 | 2.02 | 9.58 | 30.66 | 86.4 | 3.2 | 10.4 | 0 | No | 1.49 | Yes | Yes |
| 1558 | 2.36 | 12.28 | 32.76 | 80.4 | 6.1 | 13.5 | 0.001 | Yes | 1.29 | Yes | Yes |
| 1559 | 3.05 | 12.52 | 30.89 | 70.1 | 16.8 | 12.5 | 0.6 | Yes | 1.23 | Yes | Yes |
| 1560 | 2.57 | 11.9 | 45.90 | 60.9 | 27.5 | 10.8 | 0.8 | Yes | 1.23 | Yes | Yes |

| Invention Example No | Number of faces | Coating details Total metal grain content of coat (Mass %) | Base resin type | Coat thickness (μm) | Coating method | Corrosion Test Results |
|---|---|---|---|---|---|---|
| 1540 | 7 | 76 | Alkyl silicate | 15 | Spray | E |
| 1541 | 7 | 72 | Alkali silicate | 18 | Spray | E |
| 1542 | 6 | 30 | Alkyl silicate | 22 | Spray | E |
| 1543 | 7 | 83 | Alkyl silicate | 21 | Spray | E |
| 1544 | 2 | 75 | Alkyl silicate | 29 | Spray | E |
| 1545 | 7 | 76 | Alkali silicate | 23 | Spray | E |
| 1546 | 7 | 72 | Alkyl silicate | 21 | Spray | E |
| 1547 | 2 | 83 | Alkali silicate | 19 | Spray | E |
| 1548 | 6 | 50 | Alkyl silicate | 21 | Spray | E |
| 1549 | 6 | 72 | Alkali silicate | 19 | Spray | E |
| 1550 | 2 | 50 | Acrylic resin | 654 | Spray | E |
| 1551 | 6 | 48 | Alkali silicate | 700 | Spray | E |
| 1552 | 7 | 75 | Alkyl silicate | 555 | Spray | E |
| 1553 | 7 | 55 | Alkyl silicate | 321 | Spray | E |
| 1554 | 6 | 38 | Alkyl silicate | 152 | Brush | E |
| 1555 | 7 | 48 | Urethane resin | 674 | Spray | E |
| 1556 | 7 | 76 | Polyester resin | 325 | Spray | E |
| 1557 | 6 | 72 | Alkyl silicate | 665 | Spray | E |
| 1558 | 7 | 75 | Alkyl silicate | 354 | Brush | E |
| 1559 | 6 | 76 | Alkyl silicate | 165 | Spray | E |
| 1560 | 7 | 72 | Urethane resin | 354 | Spray | E |

TABLE 79

| Invention Example No | Average grain diameter (μm) | Granularity distribution of Zn metal grains/Zn alloy grains (Ave grain diameter) (μm) Fine metal | Granularity distribution of Zn metal grains/Zn alloy grains (Ave grain diameter) (μm) Coarse metal | Percent of fine-grain metal grains among Zn metal grains/Zn alloy grains (Vol %) | Chemical component content of Zn metal grains/Zn alloy grains (Mass %) Zn | Chemical component content of Zn metal grains/Zn alloy grains (Mass %) Mg | Chemical component content of Zn metal grains/Zn alloy grains (Mass %) Al | Chemical component content of Zn metal grains/Zn alloy grains (Mass %) Si | Total metal grain content of coat (Mass %) | Ratio of fine metal grains in coat outermost surface layer 10% thickness to total fine metal grains (Mass %) | Coat thickness (μm) Inorganic | Coat thickness (μm) Organic | Time to red rusting Organic | Time to red rusting Inorganic |
|---|---|---|---|---|---|---|---|---|---|---|---|---|---|---|
| 374 | — | 2.35 | 9.25 | 35.87 | 96.0 | 8.9 | 0 | 0 | 47 | 55.7 | 24.6 | 125 | E | E |
| 375 | — | 2.49 | 9.56 | 42.04 | 97.5 | 7.8 | 0 | 0 | 80 | 64.5 | 23.8 | 167 | E | E |
| 376 | — | 1.99 | 9.84 | 6.55 | 98.4 | 5.6 | 0 | 0 | 52 | 68.9 | 15.2 | 28 | E | E |
| 377 | — | 2.21 | 8.64 | 66.80 | 95.5 | 10.2 | 0 | 0 | 89 | 64.7 | 10.6 | 34 | E | E |
| 378 | — | 2.64 | 10.55 | 80.03 | 96.2 | 5.6 | 0 | 0 | 34 | 77.9 | 10.7 | 256 | E | E |
| 379 | — | 2.55 | 8.56 | 67.55 | 98.0 | 7.8 | 0 | 0 | 78 | 43.7 | 15 | 24 | G | G |
| 380 | — | 2.94 | 9.99 | 43.38 | 94.5 | 8.9 | 0 | 0 | 34 | 7.8 | 10.5 | 96 | G | G |
| 381 | — | 1.98 | 8.98 | 13.52 | 94.0 | 6.0 | 0 | 0 | 89 | 16.0 | 14.5 | 94 | G | G |
| 382 | — | 2.37 | 8.99 | 68.14 | 97.5 | 12.6 | 0 | 0 | 90 | 89.6 | 12.3 | 93 | E | E |
| 383 | — | 2.15 | 9.22 | 81.37 | 93.2 | 6.8 | 0 | 0 | 86 | 11.8 | 8.6 | 95 | G | G |
| 384 | — | 2.96 | 9.36 | 66.30 | 94.5 | 5.5 | 0 | 0 | 53 | 4.6 | 17.5 | 92 | G | G |
| 385 | — | 2.85 | 9.45 | 42.13 | 93.6 | 6.4 | 0 | 0 | 48 | 2.5 | 12.6 | 95 | G | G |
| 386 | — | 2.94 | 9.61 | 7.56 | 94.1 | 5.9 | 0 | 0 | 46 | 18.9 | 10.4 | 91 | G | G |
| 387 | — | 2.11 | 9.85 | 66.89 | 93.5 | 6.5 | 0.54 | 0.55 | 47 | 75.9 | 10.9 | 90 | E | E |
| 388 | — | 2.68 | 9.23 | 80.12 | 97.6 | 2.4 | 0 | 0.66 | 49 | 55.9 | 19 | 99 | E | E |
| 389 | — | 1.99 | 9.08 | 39.51 | 94.5 | 5.5 | 0 | 0.07 | 83 | 53.8 | 25.6 | 98 | E | E |
| 390 | — | 1.76 | 9.87 | 45.68 | 91.75 | 7.5 | 0.6 | 0.15 | 85 | 97.5 | 28.6 | 97 | E | E |
| 391 | — | 2.66 | 9.46 | 65.58 | 90.4 | 9.5 | 0.05 | 0.05 | 90 | 88.4 | 24.7 | 94 | E | E |
| 392 | — | 2.85 | 9.28 | 70.44 | 90.4 | 8.6 | 0.02 | 0.98 | 89 | 54.8 | 22.9 | 93 | E | E |
| 393 | — | 2.64 | 9.45 | 83.67 | 91.1 | 7.9 | 1 | 0 | 88 | 45.7 | 52.3 | 83 | G | G |

TABLE 80

| Invention Example No | Average grain diameter (μm) | Granularity distribution of Zn metal grains/Zn alloy grains (Ave grain diameter) (μm) Fine metal | Granularity distribution of Zn metal grains/Zn alloy grains (Ave grain diameter) (μm) Coarse metal | Percent of fine-grain metal grains among Zn metal grains/Zn alloy grains (Vol %) | Chemical component content of Zn metal grains/Zn alloy grains (Mass %) Zn | Chemical component content of Zn metal grains/Zn alloy grains (Mass %) Mg | Chemical component content of Zn metal grains/Zn alloy grains (Mass %) Al | Chemical component content of Zn metal grains/Zn alloy grains (Mass %) Si | Total metal grain content of coat (Mass %) | Ratio of fine metal grains in coat outermost surface layer 10% thickness to total fine metal grains (Mass %) | Coat thickness (μm) Inorganic | Coat thickness (μm) Organic | Time to red rusting Organic | Time to red rusting Inorganic |
|---|---|---|---|---|---|---|---|---|---|---|---|---|---|---|
| 394 | — | 2.35 | 9.25 | 80.93 | 81.1 | 13.7 | 5.2 | 0 | 47 | 34.7 | 56.3 | 88 | G | G |
| 395 | — | 2.12 | 9.46 | 47.02 | 89.2 | 9.8 | 1 | 0 | 47 | 57.9 | 33.3 | 89 | E | E |
| 396 | — | 2.26 | 10.54 | 7.66 | 89.45 | 10.5 | 0.05 | 0 | 52 | 65.4 | 34.5 | 87 | E | E |
| 397 | — | 1.76 | 9.55 | 15.20 | 82.93 | 16.4 | 0.07 | 0.6 | 52 | 87.9 | 23.5 | 86 | E | E |
| 398 | — | 2.23 | 9.06 | 73.50 | 95.3 | 3.9 | 0 | 0.8 | 52 | 2.9 | 26.7 | 85 | G | G |
| 399 | — | 2.12 | 9.3 | 49.33 | 95 | 2.5 | 0 | 2.5 | 88 | 12.6 | 195 | 243 | G | G |
| 400 | — | 2.21 | 8.68 | 19.47 | 93.46 | 6 | 0 | 0.54 | 49 | 53.8 | 23 | 74 | E | E |
| 401 | — | 1.38 | 8.53 | 69.55 | 94.1 | 5 | 0 | 0.9 | 35 | 17.8 | 23 | 63 | G | G |
| 402 | — | 1.95 | 9.32 | 87.32 | 96.7 | 2.8 | 0 | 0.5 | 37 | 34.7 | 31.2 | 83 | G | G |
| 403 | — | 1.26 | 8.95 | 75.88 | 98.5 | 0.5 | 0.3 | 0.7 | 36 | 76.8 | 37.5 | 82 | E | E |
| 404 | — | 1.03 | 10.99 | 7.77 | 94.52 | 5.4 | 0.02 | 0.06 | 80 | 58.9 | 12.5 | 81 | E | E |
| 405 | — | 1.65 | 8.7 | 43.55 | 95.65 | 3.5 | 0.05 | 0.8 | 48 | 50.8 | 10.2 | 89 | E | E |
| 406 | — | 2.35 | 8.55 | 7.68 | 89 | 3.3 | 5.2 | 2.5 | 46 | 46.8 | 14.5 | 96 | G | G |
| 407 | — | 1.62 | 9.99 | 8.64 | 94.98 | 3.5 | 0.02 | 1.5 | 52 | 23.7 | 16.3 | 95 | G | G |
| 408 | — | 1.88 | 9.91 | 16.58 | 89.5 | 5 | 4.6 | 0.9 | 51 | 53.8 | 15.8 | 99 | E | E |
| 409 | — | 2.35 | 9.25 | 35.87 | 91.45 | 8.5 | 0.05 | 0 | 47 | 53.8 | 19 | 89 | E | E |
| 410 | — | 2.57 | 9.56 | 42.04 | 97.58 | 2.4 | 0.02 | 0 | 48 | 43.7 | 25.6 | 89 | G | G |
| 411 | — | 2.56 | 9.84 | 38.41 | 94.58 | 0.56 | 0.02 | 0.06 | 49 | 55.9 | 28.6 | 98 | E | E |
| 412 | — | 2.21 | 9.75 | 6.99 | 95.65 | 1.55 | 0.05 | 0.8 | 51 | 65.8 | 24.7 | 96 | E | E |

TABLE 81

| Invention Example No | Diameter distribution (peak diameter) of Zn metal grains/Zn alloy grains (μm) Fine metal | Coarse metal | Percent of fine-grain metal grains among Zn metal grains/Zn alloy grains (Vol %) | Chemical component content of Zn metal grains/Zn alloy grains (Mass %) Zn | Mg | Al | Si | Alloy grain fracture surfaces or cracks present? | Ave aspect ratio | Mg solid solution phase and Zn—Mg intermetallic compounds present on grain surfaces? | Any of MgZn2, Mg2Zn11, Mg2Zn3, MgZn, Mg7Zn3 present? | Number of faces |
|---|---|---|---|---|---|---|---|---|---|---|---|---|
| 1561 | 2.35 | 9.25 | 35.87 | 88.8 | 11.2 | 0 | 0 | Yes | 1.12 | Yes | Yes | 2 |
| 1562 | 2.57 | 9.56 | 42.04 | 90.6 | 9.4 | 0 | 0 | No | 1.38 | Yes | Yes | 2 |
| 1563 | 2.56 | 9.84 | 6.55 | 81.45 | 18.5 | 0 | 0.5 | Yes | 1.22 | Yes | Yes | 2 |
| 1564 | 2.21 | 9.75 | 43.60 | 99.97 | 0.03 | 0 | 0 | Yes | 1.14 | Yes | Yes | 2 |
| 1565 | 2.64 | 9.85 | 44.12 | 98.4 | 1.6 | 0 | 0 | No | 1.02 | Yes | Yes | 6 |
| 1566 | 1.99 | 8.56 | 37.21 | 93.2 | 6.8 | 0 | 0 | Yes | 1.05 | Yes | Yes | 6 |
| 1567 | 2.94 | 8.21 | 43.38 | 84.5 | 13.9 | 0 | 1.6 | No | 1.36 | No | Yes | 7 |
| 1568 | 2.58 | 8.33 | 13.52 | 98.1 | 1.9 | 0 | 0 | Yes | 1.11 | No | Yes | 6 |
| 1569 | 2.37 | 8 | 44.94 | 94.3 | 5.7 | 0 | 0 | No | 1.07 | Yes | Yes | 2 |
| 1570 | 2.15 | 9.22 | 45.46 | 90.8 | 9.2 | 0 | 0 | No | 1.42 | Yes | Yes | 7 |
| 1571 | 2.96 | 9.36 | 35.96 | 83.3 | 15.4 | 0 | 1.3 | Yes | 1.38 | No | Yes | 2 |
| 1572 | 2.85 | 9.45 | 42.13 | 79.84 | 18.6 | 0 | 1.56 | Yes | 1.22 | No | Yes | 6 |
| 1573 | 2.94 | 9.61 | 7.56 | 96.4 | 3.6 | 0 | 0 | Yes | 1.14 | Yes | Yes | 6 |
| 1574 | 2.11 | 9.85 | 43.69 | 94.6 | 5.4 | 0 | 0 | Yes | 1.13 | Yes | Yes | 2 |
| 1575 | 2.68 | 9.23 | 44.21 | 92.4 | 7.6 | 0 | 0 | Yes | 1.02 | No | Yes | 2 |
| 1576 | 2.99 | 9.08 | 39.51 | 75.5 | 24.5 | 0 | 0 | Yes | 1.06 | Yes | Yes | 7 |
| 1577 | 2.78 | 9.87 | 45.68 | 82.4 | 17.6 | 0 | 0 | Yes | 1.05 | Yes | Yes | 6 |
| 1578 | 2.96 | 9.46 | 65.58 | 98.6 | 1.4 | 0 | 0 | Yes | 1.24 | No | Yes | 7 |
| 1579 | 2.85 | 9.28 | 47.24 | 78.5 | 21.5 | 0 | 0 | Yes | 1.33 | No | Yes | 2 |
| 1580 | 2.64 | 9.45 | 47.76 | 89.6 | 10.4 | 0 | 0 | Yes | 1.27 | Yes | Yes | 7 |

| Invention Example No | Coating details Ratio of fine metal grains in coat outermost surface layer 10% thickness to total fine metal grains (Mass %) | Total metal grain content of coat (Mass %) | Base resin type | Coat thickness (μm) | Coating method | Corrosion Test Results |
|---|---|---|---|---|---|---|
| 1561 | 55.7 | 49 | Alkyl silicate | 14 | Spray | E |
| 1562 | 64.5 | 89 | Urethane resin | 55 | Spray | E |
| 1563 | 68.9 | 90 | Alkyl silicate | 8 | Spray | E |
| 1564 | 64.7 | 86 | Urethane resin | 122 | Brush | E |
| 1565 | 77.9 | 48 | Alkyl silicate | 555 | Spray | E |
| 1566 | 43.7 | 47 | Alkali silicate | 19 | Spray | E |
| 1567 | 7.8 | 47 | Alkyl silicate | 25 | Brush | E |
| 1568 | 16.0 | 47 | Alkyl silicate | 58 | Spray | E |
| 1569 | 89.6 | 52 | Alkyl silicate | 685 | Spray | E |
| 1570 | 11.8 | 52 | Alkali silicate | 19 | Brush | E |
| 1571 | 4.6 | 52 | Urethane resin | 700 | Spray | E |
| 1572 | 2.5 | 88 | Alkyl silicate | 77 | Spray | E |
| 1573 | 18.9 | 87 | Alkyl silicate | 54 | Spray | E |
| 1574 | 75.9 | 89 | Alkyl silicate | 64 | Spray | E |
| 1575 | 55.9 | 90 | Alkyl silicate | 34 | Brush | E |
| 1576 | 53.8 | 91 | Alkali silicate | 28 | Spray | E |
| 1577 | 97.5 | 46 | Urethane resin | 109 | Brush | E |
| 1578 | 88.4 | 47 | Alkyl silicate | 15 | Spray | E |
| 1579 | 54.8 | 47 | Alkyl silicate | 14 | Spray | E |
| 1580 | 45.7 | 49 | Alkyl silicate | 18 | Spray | E |

TABLE 82

| Invention Example No | Diameter distribution (peak diameter) of Zn metal grains/Zn alloy grains (μm) Fine metal | Coarse metal | Percent of fine-grain metal grains among Zn metal grains/Zn alloy grains (Vol %) | Chemical component content of Zn metal grains/Zn alloy grains (Mass %) Zn | Mg | Al | Si | Alloy grain fracture surfaces or cracks present? | Ave aspect ratio | Mg solid solution phase and Zn—Mg intermetallic compounds present on grain surfaces? | Any of MgZn2, Mg2Zn11, Mg2Zn3, MgZn, Mg7Zn3 present? | Number of faces |
|---|---|---|---|---|---|---|---|---|---|---|---|---|
| 1581 | 2.35 | 9.25 | 45.02 | 87.2 | 12.8 | 0 | 0 | Yes | 1.05 | Yes | Yes | 6 |
| 1582 | 2.12 | 9.46 | 47.02 | 92.2 | 7.8 | 0 | 0 | Yes | 1.22 | No | Yes | 7 |
| 1583 | 2.34 | 9.46 | 7.66 | 70.5 | 29.5 | 0 | 0 | Yes | 1.13 | No | Yes | 6 |
| 1584 | 2.33 | 9.46 | 15.20 | 91.5 | 8.5 | 0 | 0 | Yes | 1.06 | Yes | Yes | 7 |
| 1585 | 2.23 | 9.06 | 43.16 | 74.5 | 25.5 | 0 | 0 | Yes | 1.05 | Yes | Yes | 6 |
| 1586 | 2.12 | 9.3 | 49.33 | 99.93 | 0.07 | 0 | 0 | Yes | 1.24 | Yes | Yes | 2 |
| 1587 | 2.21 | 8.68 | 19.47 | 89.2 | 10.8 | 0 | 0 | No | 1.05 | Yes | Yes | 7 |
| 1588 | 1.38 | 8.53 | 69.55 | 86 | 11.2 | 1.6 | 1.2 | No | 1.12 | Yes | Yes | 6 |
| 1589 | 1.95 | 9.32 | 51.41 | 75.23 | 24.5 | 0.27 | 0 | Yes | 1.38 | No | Yes | 6 |
| 1590 | 2.26 | 8.95 | 75.88 | 82.6 | 17.4 | 0 | 0 | Yes | 1.13 | No | Yes | 6 |
| 1591 | 2.05 | 12.54 | 48.08 | 98.7 | 1.3 | 0 | 0 | Yes | 1.33 | Yes | Yes | 2 |
| 1592 | 1.65 | 8.7 | 66.85 | 80.5 | 19.5 | 0 | 0 | Yes | 1.27 | Yes | Yes | 6 |
| 1593 | 2.35 | 8.55 | 7.68 | 88.85 | 10.8 | 0.05 | 0.3 | No | 1.23 | No | Yes | 7 |
| 1594 | 1.62 | 8.91 | 8.64 | 87.7 | 11.9 | 0.4 | 0 | Yes | 1.11 | Yes | Yes | 2 |
| 1595 | 1.88 | 9.91 | 16.58 | 90.5 | 9.5 | 0 | 0 | Yes | 1.42 | Yes | Yes | 6 |
| 1596 | 2.35 | 9.25 | 35.87 | 89.5 | 10.5 | 0 | 0 | Yes | 1.06 | No | Yes | 2 |
| 1597 | 2.57 | 9.56 | 42.04 | 84.9 | 15.1 | 0 | 0 | Yes | 1.05 | Yes | Yes | 6 |
| 1598 | 2.56 | 9.84 | 38.41 | 83.2 | 16.8 | 0 | 0 | Yes | 1.07 | Yes | Yes | 7 |
| 1599 | 2.21 | 9.75 | 6.99 | 89.4 | 10.6 | 0 | 0 | Yes | 1.42 | No | Yes | 7 |
| 1600 | 2.64 | 9.85 | 44.12 | 84.3 | 13.3 | 2.4 | 0 | Yes | 1.38 | Yes | Yes | 2 |

| Invention Example No | Coating details Ratio of fine metal grains in coat outermost surface layer 10% thickness to total fine metal grains (Mass %) | Total metal grain content of coat (Mass %) | Base resin type | Coat thickness (μm) | Coating method | Corrosion Test Results |
|---|---|---|---|---|---|---|
| 1581 | 34.7 | 50 | Alkali silicate | 2 | Spray | G |
| 1582 | 57.9 | 87 | Alkyl silicate | 37 | Spray | E |
| 1583 | 65.4 | 83 | Alkali silicate | 12 | Spray | E |
| 1584 | 87.9 | 48 | Alkyl silicate | 160 | Brush | E |
| 1585 | 2.9 | 51 | Alkali silicate | 5 | Brush | G |
| 1586 | 12.6 | 51 | Alkyl silicate | 56 | Brush | E |
| 1587 | 53.8 | 87 | Alkali silicate | 2 | Spray | G |
| 1588 | 17.8 | 85 | Alkyl silicate | 18 | Spray | E |
| 1589 | 34.7 | 86 | Alkyl silicate | 23 | Spray | E |
| 1590 | 76.8 | 50 | Epoxy resin | 30 | Brush | E |
| 1591 | 58.9 | 51 | Acrylic resin | 77 | Brush | E |
| 1592 | 50.8 | 51 | Urethane resin | 655 | Brush | E |
| 1593 | 46.8 | 80 | Polyester resin | 47 | Spray | E |
| 1594 | 23.7 | 46 | Epoxy resin | 43 | Spray | E |
| 1595 | 53.8 | 51 | Acrylic resin | 52 | Brush | E |
| 1596 | 53.8 | 86 | Urethane resin | 20 | Brush | E |
| 1597 | 43.7 | 85 | Polyester resin | 200 | Brush | E |
| 1598 | 55.9 | 82 | Alkali silicate | 22 | Spray | E |
| 1599 | 65.8 | 81 | Alkyl silicate | 25 | Spray | E |
| 1600 | 55.7 | 46 | Alkali silicate | 14 | Spray | E |

TABLE 83

| Invention Example No | Diameter distribution (peak diameter) of Zn metal grains/Zn alloy grains (μm) Fine metal | Diameter distribution (peak diameter) of Zn metal grains/Zn alloy grains (μm) Coarse metal | Percent of fine-grain metal grains among Zn metal grains/Zn alloy grains (Vol %) | Chemical component content of Zn metal grains/Zn alloy grains (Mass %) Zn | Mg | Al | Si | Alloy grain fracture surfaces or cracks present? | Ave aspect ratio | Mg solid solution phase and Zn—Mg intermetallic compounds present on grain surfaces? | Any of MgZn2, Mg2Zn11, Mg2Zn3, MgZn, Mg7Zn3 present? |
|---|---|---|---|---|---|---|---|---|---|---|---|
| 1601 | 2.65 | 8.56 | 66.99 | 98.6 | 1.4 | 0 | 0 | No | 1.22 | Yes | Yes |
| 1602 | 2.94 | 8.21 | 43.38 | 76.45 | 23.5 | 0 | 0.05 | Yes | 1.14 | Yes | Yes |
| 1603 | 2.58 | 8.33 | 39.75 | 91.1 | 8.9 | 0 | 0 | Yes | 1.13 | Yes | Yes |
| 1604 | 2.37 | 8 | 65.38 | 85.1 | 14.9 | 0 | 0 | Yes | 1.02 | Yes | Yes |
| 1605 | 2.15 | 9.22 | 45.46 | 77.48 | 18.4 | 2.55 | 1.57 | Yes | 1.06 | Yes | Yes |
| 1606 | 2.96 | 9.36 | 22.55 | 97.9 | 2.1 | 0 | 0 | Yes | 1.05 | Yes | Yes |
| 1607 | 2.85 | 9.45 | 42.13 | 94.8 | 5.2 | 0 | 0 | Yes | 1.24 | Yes | Yes |
| 1608 | 2.94 | 9.61 | 38.50 | 84.6 | 15.4 | 0 | 0 | Yes | 1.33 | Yes | Yes |
| 1609 | 2.11 | 9.85 | 64.13 | 89.3 | 10.7 | 0 | 0 | Yes | 1.27 | Yes | Yes |
| 1610 | 2.68 | 9.23 | 44.21 | 83.3 | 16.7 | 0 | 0 | Yes | 1.05 | Yes | Yes |
| 1611 | 2.99 | 9.08 | 39.51 | 80.05 | 19.6 | 0.35 | 0 | No | 1.12 | Yes | Yes |
| 1612 | 1.82 | 9.87 | 78.64 | 85.5 | 14.5 | 0 | 0 | No | 1.23 | Yes | Yes |
| 1613 | 1.42 | 9.46 | 42.05 | 85 | 14.2 | 0 | 0.8 | No | 1.36 | Yes | Yes |
| 1614 | 2.12 | 9.28 | 64.58 | 87.3 | 12.7 | 0 | 0 | No | 1.11 | Yes | Yes |
| 1615 | 1.92 | 9.45 | 47.76 | 89.5 | 10.5 | 0 | 0 | Yes | 1.07 | Yes | Yes |
| 1616 | 2.11 | 9.63 | 24.10 | 87.3 | 11.8 | 0 | 0.9 | Yes | 1.42 | Yes | Yes |
| 1617 | 2.97 | 9.16 | 39.11 | 86.4 | 12.8 | 0.5 | 0.3 | Yes | 1.38 | Yes | Yes |
| 1618 | 2.36 | 10.39 | 19.65 | 93.8 | 6.2 | 0 | 0 | Yes | 1.22 | Yes | Yes |
| 1619 | 3.05 | 10.56 | 65.39 | 83.8 | 16.2 | 0 | 0 | Yes | 1.14 | Yes | Yes |
| 1620 | 2.15 | 10.74 | 48.57 | 80.4 | 19.6 | 0 | 0 | Yes | 1.13 | Yes | Yes |

| Invention Example No | Number of faces | Coating details Ratio of fine metal grains in coat outermost surface layer 10% thickness to total fine metal grains (Mass %) | Total metal grain content of coat (Mass %) | Base resin type | Coat thickness (μm) | Coating method | Corrosion Test Results |
|---|---|---|---|---|---|---|---|
| 1601 | 2 | 64.5 | 47 | Urethane resin | 112 | Spray | E |
| 1602 | 6 | 68.9 | 48 | Alkali silicate | 24 | Spray | E |
| 1603 | 7 | 64.7 | 51 | Urethane resin | 150 | Spray | E |
| 1604 | 6 | 77.9 | 53 | Alkali silicate | 18 | Spray | E |
| 1605 | 7 | 43.7 | 88 | Alkyl silicate | 19 | Brush | E |
| 1606 | 6 | 7.8 | 85 | Alkyl silicate | 24 | Spray | E |
| 1607 | 2 | 16.0 | 83 | Urethane resin | 99 | Spray | E |
| 1608 | 2 | 89.6 | 82 | Alkyl silicate | 7 | Spray | E |
| 1609 | 6 | 11.8 | 83 | Epoxy resin | 100 | Spray | E |
| 1610 | 7 | 4.6 | 47 | Alkyl silicate | 27 | Brush | E |
| 1611 | 6 | 2.5 | 51 | Alkali silicate | 15 | Spray | E |
| 1612 | 6 | 18.9 | 52 | Alkyl silicate | 14 | Spray | E |
| 1613 | 2 | 75.9 | 51 | Urethane resin | 55 | Spray | E |
| 1614 | 7 | 55.9 | 52 | Alkyl silicate | 8 | Spray | E |
| 1615 | 2 | 53.8 | 89 | Urethane resin | 122 | Brush | E |
| 1616 | 2 | 97.5 | 85 | Alkyl silicate | 54 | Spray | E |
| 1617 | 6 | 88.4 | 82 | Alkali silicate | 19 | Spray | E |
| 1618 | 7 | 54.8 | 87 | Alkyl silicate | 25 | Brush | E |
| 1619 | 7 | 45.7 | 88 | Alkyl silicate | 58 | Spray | E |
| 1620 | 6 | 34.7 | 49 | Alkyl silicate | 21 | Spray | E |

TABLE 84

| Invention Example No | Diameter distribution (peak diameter) of Zn metal grains/Zn alloy grains (μm) Fine metal | Diameter distribution (peak diameter) of Zn metal grains/Zn alloy grains (μm) Coarse metal | Percent of fine-grain metal grains among Zn metal grains/Zn alloy grains (Vol %) | Chemical component content of Zn metal grains/Zn alloy grains (Mass %) Zn | Chemical component content of Zn metal grains/Zn alloy grains (Mass %) Mg | Chemical component content of Zn metal grains/Zn alloy grains (Mass %) Al | Chemical component content of Zn metal grains/Zn alloy grains (Mass %) Si | Alloy grain fracture surfaces or cracks present? | Ave aspect ratio | Mg solid solution phase and Zn—Mg intermetallic compounds present on grain surfaces? | Any of MgZn2, Mg2Zn11, Mg2Zn3, MgZn, Mg7Zn3 present? |
|---|---|---|---|---|---|---|---|---|---|---|---|
| 1621 | 2.19 | 10.27 | 24.91 | 87.6 | 12.4 | 0 | 0 | Yes | 1.02 | Yes | Yes |
| 1622 | 2.48 | 11.5 | 39.92 | 89.3 | 10.7 | 0 | 0 | Yes | 1.06 | Yes | Yes |
| 1623 | 2.85 | 11.67 | 22.65 | 91.5 | 8.5 | 0 | 0 | Yes | 1.05 | Yes | Yes |
| 1624 | 2.75 | 11.85 | 66.20 | 94.9 | 5.1 | 0 | 0 | Yes | 1.24 | Yes | Yes |
| 1625 | 2.46 | 11.38 | 49.38 | 75.5 | 24.5 | 0 | 0 | Yes | 1.33 | Yes | Yes |
| 1626 | 2.71 | 12.61 | 30.58 | 86.5 | 13.5 | 0 | 0 | Yes | 1.27 | Yes | Yes |
| 1627 | 2.36 | 12.78 | 45.59 | 80 | 20 | 0 | 0 | Yes | 1.05 | Yes | Yes |
| 1628 | 2.16 | 9.57 | 28.32 | 84.5 | 15.5 | 0 | 0 | Yes | 1.12 | Yes | Yes |
| 1629 | 2.46 | 9.81 | 71.87 | 88 | 10.5 | 1.5 | 0 | Yes | 1.23 | Yes | Yes |
| 1630 | 2.49 | 8.43 | 53.05 | 92.1 | 7.9 | 0 | 0 | Yes | 1.36 | Yes | Yes |
| 1631 | 2.95 | 8.55 | 27.74 | 95.2 | 4.8 | 0 | 0 | Yes | 1.11 | Yes | Yes |
| 1632 | 2.36 | 8.22 | 42.75 | 81.6 | 18.4 | 0 | 0 | Yes | 1.07 | Yes | Yes |
| 1633 | 2.21 | 9.44 | 23.29 | 86.8 | 12.7 | 0 | 0.5 | Yes | 1.42 | Yes | Yes |
| 1634 | 2.25 | 9.58 | 61.12 | 89.7 | 10.3 | 0 | 0 | No | 1.38 | Yes | Yes |
| 1635 | 2.44 | 9.67 | 44.30 | 71.2 | 20.8 | 8 | 0 | Yes | 1.22 | Yes | Yes |
| 1636 | 2.78 | 9.83 | 23.96 | 97.5 | 2.5 | 0 | 0 | No | 1.14 | Yes | Yes |
| 1637 | 2.15 | 10.07 | 44.09 | 84.8 | 15.2 | 0 | 0 | Yes | 1.13 | Yes | Yes |
| 1638 | 2.19 | 9.45 | 24.63 | 80.8 | 19.2 | 0 | 0 | No | 1.02 | Yes | Yes |
| 1639 | 2.48 | 9.3 | 62.46 | 78.7 | 13.5 | 7.8 | 0 | Yes | 1.06 | Yes | Yes |
| 1640 | 2.59 | 9.99 | 45.64 | 88.1 | 11.9 | 0 | 0 | No | 1.05 | Yes | Yes |

| Invention Example No | Number of faces | Coating details Ratio of fine metal grains in coat outermost surface layer 10% thickness to total fine metal grains (Mass %) | Total metal grain content of coat (Mass %) | Base resin type | Coat thickness (μm) | Coating method | Corrosion Test Results |
|---|---|---|---|---|---|---|---|
| 1621 | 7 | 57.9 | 50 | Alkali silicate | 19 | Brush | E |
| 1622 | 7 | 65.4 | 51 | Urethane resin | 56 | Spray | E |
| 1623 | 6 | 87.9 | 52 | Alkyl silicate | 77 | Spray | E |
| 1624 | 7 | 2.9 | 53 | Alkyl silicate | 12 | Spray | E |
| 1625 | 2 | 12.6 | 88 | Alkyl silicate | 64 | Spray | E |
| 1626 | 7 | 53.8 | 85 | Alkyl silicate | 34 | Brush | E |
| 1627 | 7 | 17.8 | 83 | Alkali silicate | 28 | Spray | E |
| 1628 | 2 | 34.7 | 81 | Urethane resin | 109 | Brush | E |
| 1629 | 6 | 55.7 | 80 | Alkyl silicate | 15 | Spray | E |
| 1630 | 6 | 64.5 | 47 | Alkyl silicate | 14 | Spray | E |
| 1631 | 7 | 68.9 | 49 | Alkyl silicate | 18 | Spray | E |
| 1632 | 7 | 64.7 | 50 | Urethane resin | 122 | Brush | E |
| 1633 | 6 | 77.9 | 51 | Alkyl silicate | 54 | Spray | E |
| 1634 | 7 | 43.7 | 52 | Alkali silicate | 19 | Spray | E |
| 1635 | 2 | 7.8 | 83 | Alkyl silicate | 25 | Brush | E |
| 1636 | 2 | 16.0 | 88 | Alkyl silicate | 58 | Spray | E |
| 1637 | 6 | 89.6 | 85 | Alkyl silicate | 21 | Spray | E |
| 1638 | 7 | 11.8 | 83 | Alkali silicate | 19 | Brush | E |
| 1639 | 6 | 4.6 | 82 | Urethane resin | 56 | Spray | E |
| 1640 | 2 | 2.5 | 47 | Alkyl silicate | 77 | Spray | E |

TABLE 85

| Invention Example No | Diameter distribution (peak diameter) of Zn metal grains/Zn alloy grains (μm) Fine metal | Diameter distribution (peak diameter) of Zn metal grains/Zn alloy grains (μm) Coarse metal | Percent of fine-grain metal grains among Zn metal grains/Zn alloy grains (Vol %) | Chemical component content of Zn metal grains/Zn alloy grains (Mass %) Zn | Chemical component content of Zn metal grains/Zn alloy grains (Mass %) Mg | Chemical component content of Zn metal grains/Zn alloy grains (Mass %) Al | Chemical component content of Zn metal grains/Zn alloy grains (Mass %) Si | Alloy grain fracture surfaces or cracks present? | Ave aspect ratio | Mg solid solution phase and Zn—Mg intermetallic compounds present on grain surfaces? | Any of MgZn2, Mg2Zn11, Mg2Zn3, MgZn, Mg7Zn3 present? |
|---|---|---|---|---|---|---|---|---|---|---|---|
| 1641 | 2.47 | 9.58 | 25.30 | 88.5 | 10.6 | 0 | 0.9 | Yes | 1.24 | Yes | Yes |
| 1642 | 2.69 | 9.4 | 42.84 | 84.6 | 15.4 | 0 | 0 | Yes | 1.33 | Yes | Yes |
| 1643 | 2.57 | 9.57 | 25.44 | 97.4 | 2.6 | 0 | 0 | Yes | 1.27 | Yes | Yes |
| 1644 | 2.49 | 9.54 | 63.27 | 83.3 | 16.7 | 0 | 0 | Yes | 1.37 | Yes | Yes |
| 1645 | 2.68 | 9.58 | 46.45 | 91.9 | 8.1 | 0 | 0 | Yes | 1.10 | Yes | Yes |
| 1646 | 2.35 | 9.25 | 46.45 | 86.3 | 13.7 | 0 | 0 | Yes | 1.04 | Yes | Yes |
| 1647 | 2.48 | 10.04 | 50.91 | 81.5 | 18.5 | 0 | 0 | Yes | 1.02 | Yes | Yes |
| 1648 | 2.13 | 11.27 | 27.25 | 97.6 | 2.4 | 0 | 0 | Yes | 1.01 | Yes | Yes |
| 1649 | 1.93 | 11.44 | 42.26 | 89.1 | 10.9 | 0 | 0 | Yes | 1.08 | Yes | Yes |
| 1650 | 2.05 | 8.9 | 33.69 | 92.8 | 7.2 | 0 | 0 | Yes | 1.14 | Yes | Yes |
| 1651 | 1.42 | 8.75 | 48.70 | 81.96 | 17.5 | 0.5 | 0.04 | No | 1.23 | Yes | Yes |
| 1652 | 1.46 | 9.44 | 29.24 | 85.4 | 14.6 | 0 | 0 | No | 1.33 | Yes | Yes |
| 1653 | 1.75 | 9.03 | 67.07 | 90.6 | 9.4 | 0 | 0 | Yes | 1.37 | Yes | Yes |
| 1654 | 1.86 | 8.85 | 50.25 | 92.9 | 7.1 | 0 | 0 | Yes | 1.44 | Yes | Yes |
| 1655 | 1.74 | 8.95 | 29.91 | 77.5 | 22.5 | 0 | 0 | Yes | 1.21 | Yes | Yes |
| 1656 | 1.96 | 12.54 | 87.50 | 84.8 | 13.7 | 1.5 | 0 | No | 1.22 | Yes | Yes |
| 1657 | 1.65 | 8.7 | 30.58 | 87.1 | 12.9 | 0 | 0 | No | 1.23 | Yes | Yes |
| 1658 | 2.35 | 8.55 | 68.41 | 95.7 | 4.3 | 0 | 0 | Yes | 1.47 | Yes | Yes |
| 1659 | 1.62 | 10.72 | 54.59 | 80.2 | 17.6 | 1 | 1.2 | No | 1.01 | Yes | Yes |
| 1660 | 2.25 | 9.9 | 34.25 | 98.8 | 0.6 | 0.6 | 0 | Yes | 1.04 | Yes | Yes |

| Invention Example No | Number of faces | Coating details — Ratio of fine metal grains in coat outermost surface layer 10% thickness to total fine metal grains (Mass %) | Total metal grain content of coat (Mass %) | Base resin type | Coat thickness (μm) | Coating method | Corrosion Test Results |
|---|---|---|---|---|---|---|---|
| 1641 | 2 | 18.9 | 46 | Alkyl silicate | 54 | Spray | E |
| 1642 | 7 | 75.9 | 49 | Alkali silicate | 2 | Spray | G |
| 1643 | 6 | 55.9 | 50 | Alkali silicate | 20 | Spray | E |
| 1644 | 7 | 53.8 | 51 | Alkali silicate | 5 | Spray | G |
| 1645 | 7 | 97.5 | 83 | Alkyl silicate | 20 | Spray | E |
| 1646 | 6 | 88.4 | 82 | Alkali silicate | 15 | Brush | E |
| 1647 | 2 | 54.8 | 88 | Alkyl silicate | 57 | Brush | E |
| 1648 | 7 | 45.7 | 85 | Alkali silicate | 13 | Brush | E |
| 1649 | 2 | 34.7 | 86 | Alkyl silicate | 22 | Brush | E |
| 1650 | 2 | 57.9 | 47 | Alkali silicate | 20 | Spray | E |
| 1651 | 7 | 65.4 | 48 | Alkyl silicate | 27 | Spray | E |
| 1652 | 2 | 87.9 | 50 | Alkali silicate | 15 | Spray | E |
| 1653 | 7 | 2.9 | 51 | Alkyl silicate | 35 | Spray | E |
| 1654 | 2 | 12.6 | 52 | Alkali silicate | 34 | Brush | E |
| 1655 | 6 | 53.8 | 88 | Alkyl silicate | 45 | Brush | E |
| 1656 | 6 | 17.8 | 89 | Alkali silicate | 52 | Brush | E |
| 1657 | 7 | 34.7 | 86 | Alkyl silicate | 23 | Brush | E |
| 1658 | 6 | 76.8 | 87 | Alkali silicate | 5 | Spray | E |
| 1659 | 2 | 58.9 | 86 | Alkyl silicate | 52 | Brush | E |
| 1660 | 2 | 50.8 | 46 | Alkali silicate | 150 | Brush | E |

TABLE 86

| Invention Example No | Diameter distribution (peak diameter) of Zn metal grains/Zn alloy grains (μm) Fine metal | Diameter distribution (peak diameter) of Zn metal grains/Zn alloy grains (μm) Coarse metal | Percent of fine-grain metal grains among Zn metal grains/Zn alloy grains (Vol %) | Chemical component content of Zn metal grains/Zn alloy grains (Mass %) Zn | Mg | Al | Si | Alloy grain fracture surfaces or cracks present? | Ave aspect ratio | Mg solid solution phase and Zn—Mg intermetallic compounds present on grain surfaces? | Any of MgZn2, Mg2Zn11, Mg2Zn3, MgZn, Mg7Zn3 present? |
|---|---|---|---|---|---|---|---|---|---|---|---|
| 1661 | 2.36 | 9.57 | 37.61 | 86.9 | 10.3 | 1.6 | 1.2 | Yes | 1.05 | Yes | Yes |
| 1662 | 2.24 | 10.79 | 45.60 | 92.98 | 7 | 0.02 | 0 | Yes | 1.12 | Yes | Yes |
| 1663 | 2.46 | 10.93 | 46.70 | 75.5 | 23.5 | 1 | 0 | Yes | 1.11 | Yes | Yes |
| 1664 | 1.56 | 11.02 | 41.22 | 82.5 | 17.5 | 0 | 0 | No | 1.08 | Yes | Yes |
| 1665 | 1.24 | 11.18 | 45.68 | 80.1 | 12.4 | 7.5 | 0 | Yes | 1.47 | Yes | Yes |
| 1666 | 1.68 | 11.42 | 22.02 | 85.09 | 14.9 | 0 | 0.01 | Yes | 1.50 | Yes | Yes |
| 1667 | 2.65 | 10.8 | 37.03 | 78.7 | 20.7 | 0 | 0.6 | No | 1.13 | Yes | Yes |
| 1668 | 2.22 | 10.65 | 28.46 | 91.29 | 8.6 | 0 | 0.11 | Yes | 1.26 | Yes | Yes |
| 1669 | 2.45 | 11.34 | 43.47 | 85.8 | 14.2 | 0 | 0 | Yes | 1.14 | Yes | Yes |
| 1670 | 2.23 | 11.62 | 35.19 | 98.12 | 0.08 | 0 | 1.8 | Yes | 1.49 | Yes | Yes |
| 1671 | 2.26 | 11.15 | 73.02 | 83.46 | 15.2 | 0 | 1.34 | No | 1.34 | Yes | Yes |
| 1672 | 2.72 | 12.38 | 56.20 | 73.17 | 17.4 | 9 | 0.43 | Yes | 1.18 | Yes | Yes |
| 1673 | 2.13 | 12.55 | 35.86 | 98.6 | 0.8 | 0.6 | 0 | Yes | 1.17 | Yes | Yes |
| 1674 | 1.98 | 9.34 | 93.45 | 93.55 | 6.4 | 0.05 | 0 | Yes | 1.48 | Yes | Yes |
| 1675 | 2.02 | 9.58 | 30.66 | 96.78 | 3.2 | 0.02 | 0 | No | 1.49 | Yes | Yes |
| 1676 | 2.21 | 9.88 | 74.21 | 83 | 9.2 | 7.8 | 0 | Yes | 1.27 | Yes | Yes |
| 1677 | 2.55 | 10 | 55.39 | 70.92 | 19.2 | 9.88 | 0 | Yes | 1.17 | Yes | Yes |
| 1678 | 1.92 | 10.67 | 30.08 | 80.25 | 15.1 | 4.65 | 0 | Yes | 1.16 | Yes | Yes |
| 1679 | 1.96 | 11.89 | 45.09 | 81.85 | 14.5 | 3.65 | 0 | Yes | 1.27 | Yes | Yes |
| 1680 | 2.11 | 12.03 | 41.41 | 89.45 | 10.5 | 0.05 | 0 | Yes | 1.27 | Yes | Yes |

| Invention Example No | Number of faces | Coating details Ratio of fine metal grains in coat outermost surface layer 10% thickness to total fine metal grains (Mass %) | Total metal grain content of coat (Mass %) | Base resin type | Coat thickness (μm) | Coating method | Corrosion Test Results |
|---|---|---|---|---|---|---|---|
| 1661 | 2 | 46.8 | 49 | Alkyl silicate | 60 | Brush | E |
| 1662 | 2 | 23.7 | 35 | Alkali silicate | 15 | Spray | E |
| 1663 | 2 | 53.8 | 37 | Alkyl silicate | 24 | Spray | E |
| 1664 | 2 | 53.8 | 36 | Alkali silicate | 34 | Spray | E |
| 1665 | 6 | 43.7 | 38 | Alkyl silicate | 20 | Brush | E |
| 1666 | 6 | 55.9 | 48 | Alkali silicate | 200 | Brush | E |
| 1667 | 7 | 65.8 | 46 | Alkyl silicate | 56 | Brush | E |
| 1668 | 6 | 55.7 | 51 | Alkali silicate | 34 | Spray | E |
| 1669 | 2 | 64.5 | 46 | Alkyl silicate | 2 | Spray | G |
| 1670 | 7 | 68.9 | 38 | Alkali silicate | 15 | Spray | E |
| 1671 | 2 | 64.7 | 48 | Alkali silicate | 10 | Spray | E |
| 1672 | 6 | 77.9 | 52 | Alkyl silicate | 125 | Brush | E |
| 1673 | 6 | 43.7 | 30 | Alkali silicate | 24 | Brush | E |
| 1674 | 2 | 7.8 | 76 | Alkyl silicate | 110 | Brush | E |
| 1675 | 2 | 16.0 | 72 | Alkyl silicate | 24 | Brush | E |
| 1676 | 7 | 89.6 | 81 | Alkyl silicate | 2 | Spray | G |
| 1677 | 6 | 11.8 | 64 | Alkyl silicate | 37 | Spray | E |
| 1678 | 7 | 4.6 | 69 | Alkyl silicate | 113 | Brush | E |
| 1679 | 2 | 2.5 | 83 | Alkali silicate | 2 | Spray | G |
| 1680 | 7 | 18.9 | 30 | Alkyl silicate | 75 | Brush | E |

TABLE 87

| Invention Example No | Diameter distribution (peak diameter) of Zn metal grains/Zn alloy grains (μm) Fine metal | Diameter distribution (peak diameter) of Zn metal grains/Zn alloy grains (μm) Coarse metal | Percent of fine-grain metal grains among Zn metal grains/Zn alloy grains (Vol %) | Chemical component content of Zn metal grains/Zn alloy grains (Mass %) Zn | Mg | Al | Si | Alloy grain fracture surfaces or cracks present? | Ave aspect ratio | Mg solid solution phase and Zn—Mg intermetallic compounds present on grain surfaces? | Any of MgZn2, Mg2Zn11, Mg2Zn3, MgZn, Mg7Zn3 present? |
|---|---|---|---|---|---|---|---|---|---|---|---|
| 1681 | 2.97 | 12.12 | 17.75 | 87.3 | 7.5 | 5.2 | 0 | Yes | 1.49 | Yes | Yes |
| 1682 | 2.36 | 12.28 | 32.76 | 93.9 | 6.1 | 0 | 0.001 | Yes | 1.29 | Yes | Yes |
| 1683 | 3.05 | 12.52 | 30.89 | 82.55 | 16.8 | 0.05 | 0.6 | Yes | 1.23 | Yes | Yes |
| 1684 | 2.57 | 11.9 | 45.90 | 70.7 | 27.5 | 1 | 0.8 | Yes | 1.23 | Yes | Yes |
| 1685 | 2.65 | 11.75 | 42.22 | 94.6 | 2.9 | 0 | 2.5 | Yes | 1.23 | Yes | Yes |
| 1686 | 2.54 | 12.44 | 18.56 | 94 | 4.5 | 0 | 1.5 | No | 1.23 | Yes | Yes |
| 1687 | 2.85 | 12.03 | 33.57 | 99.43 | 0.07 | 0 | 0.5 | Yes | 1.27 | Yes | Yes |
| 1688 | 2.75 | 10.61 | 31.70 | 96.82 | 3.1 | 0.04 | 0.04 | Yes | 1.23 | Yes | Yes |
| 1689 | 2.46 | 11.3 | 46.71 | 76.3 | 20.5 | 1 | 2.2 | Yes | 1.36 | Yes | Yes |
| 1690 | 2.71 | 11.58 | 47.89 | 68.84 | 29.5 | 0.06 | 1.6 | Yes | 1.11 | Yes | Yes |
| 1691 | 2.36 | 11.11 | 24.23 | 92.33 | 7.6 | 0.07 | 0 | Yes | 1.02 | Yes | Yes |
| 1692 | 2.16 | 12.34 | 39.24 | 95.2 | 0.7 | 1.2 | 2.9 | Yes | 1.05 | Yes | Yes |
| 1693 | 2.46 | 12.51 | 37.37 | 91.8 | 4.6 | 1.8 | 1.8 | Yes | 1.24 | Yes | Yes |
| 1694 | 2.49 | 11.64 | 50.38 | 82 | 8.3 | 9.2 | 0.5 | Yes | 1.33 | Yes | Yes |
| 1695 | 1.63 | 9.16 | 37.14 | 88.2 | 11.8 | 0 | 0 | Yes | 1.27 | Yes | Yes |
| 1696 | 1.51 | 9.46 | 13.48 | 86.06 | 12.9 | 0 | 1.04 | Yes | 1.50 | Yes | Yes |
| 1697 | 3.05 | 9.54 | 40.05 | 99.34 | 0.6 | 0 | 0.06 | Yes | 1.13 | Yes | Yes |
| 1698 | 2.57 | 9.56 | 38.18 | 89.51 | 9.5 | 0 | 0.99 | No | 1.04 | Yes | Yes |
| 1699 | 2.65 | 9.46 | 7.63 | 88.3 | 11.7 | 0 | 0 | Yes | 1.02 | Yes | Yes |
| 1700 | 2.54 | 11.99 | 37.95 | 88.9 | 9.4 | 0.7 | 0 | Yes | 1.08 | Yes | Yes |

| Invention Example No | Number of faces | Coating details Ratio of fine metal grains in coat outermost surface layer 10% thickness to total fine metal grains (Mass %) | Total metal grain content of coat (Mass %) | Base resin type | Coat thickness (μm) | Coating method | Corrosion Test Results |
|---|---|---|---|---|---|---|---|
| 1681 | 6 | 75.9 | 83 | Alkali silicate | 30 | Brush | E |
| 1682 | 7 | 55.9 | 75 | Alkyl silicate | 34 | Brush | E |
| 1683 | 6 | 53.8 | 76 | Epoxy resin | 124 | Brush | E |
| 1684 | 7 | 97.5 | 72 | Acrylic resin | 15 | Spray | E |
| 1685 | 6 | 88.4 | 71 | Urethane resin | 23 | Spray | E |
| 1686 | 2 | 54.8 | 82 | Polyester resin | 157 | Brush | E |
| 1687 | 7 | 45.7 | 81 | Epoxy resin | 26 | Spray | E |
| 1688 | 6 | 34.7 | 83 | Acrylic resin | 38 | Spray | E |
| 1689 | 6 | 57.9 | 50 | Urethane resin | 160 | Brush | E |
| 1690 | 6 | 65.4 | 72 | Polyester resin | 27 | Brush | E |
| 1691 | 2 | 87.9 | 47 | Epoxy resin | 180 | Brush | E |
| 1692 | 6 | 2.9 | 47 | Acrylic resin | 26 | Spray | E |
| 1693 | 7 | 12.6 | 52 | Urethane resin | 180 | Brush | E |
| 1694 | 2 | 53.8 | 52 | Polyester resin | 15 | Spray | E |
| 1695 | 6 | 17.8 | 50 | Epoxy resin | 2 | Spray | G |
| 1696 | 2 | 34.7 | 46 | Acrylic resin | 28 | Spray | E |
| 1697 | 6 | 55.7 | 47 | Urethane resin | 30 | Spray | E |
| 1698 | 7 | 64.5 | 83 | Polyester resin | 2 | Spray | G |
| 1699 | 7 | 68.9 | 52 | Epoxy resin | 157 | Brush | E |
| 1700 | 2 | 64.7 | 89 | Acrylic resin | 28 | Brush | E |

TABLE 88

| Invention Example No | Diameter distribution (peak diameter) of Zn metal grains/Zn alloy grains (μm) Fine metal | Diameter distribution (peak diameter) of Zn metal grains/Zn alloy grains (μm) Coarse metal | Percent of fine-grain metal grains among Zn metal grains/Zn alloy grains (Vol %) | Chemical component content of Zn metal grains/Zn alloy grains (Mass %) Zn | Mg | Al | Si | Alloy grain fracture surfaces or cracks present? | Ave aspect ratio | Mg solid solution phase and Zn—Mg intermetallic compounds present on grain surfaces? | Any of MgZn2, Mg2Zn11, Mg2Zn3, MgZn, Mg7Zn3 present? |
|---|---|---|---|---|---|---|---|---|---|---|---|
| 1701 | 2.85 | 12.08 | 14.29 | 87.8 | 11.7 | 0.5 | 0 | Yes | 1.15 | Yes | Yes |
| 1702 | 2.75 | 12.24 | 40.86 | 95.6 | 4.2 | 0.2 | 0 | Yes | 1.34 | Yes | Yes |
| 1703 | 2.46 | 12.48 | 97.50 | 97.13 | 2.8 | 0.07 | 0 | Yes | 1.25 | Yes | Yes |
| 1704 | 2.71 | 11.86 | 13.30 | 86.1 | 13.9 | 0 | 0 | Yes | 1.19 | Yes | Yes |
| 1705 | 2.36 | 11.71 | 43.62 | 82.6 | 14.6 | 1.6 | 1.2 | No | 1.18 | Yes | Yes |
| 1706 | 2.46 | 11.35 | 56.93 | 72.95 | 26.4 | 0.65 | 0 | Yes | 1.24 | Yes | Yes |
| 1707 | 1.45 | 12.02 | 36.59 | 83.23 | 16.5 | 0.27 | 0 | Yes | 1.11 | Yes | Yes |
| 1708 | 2.42 | 13.24 | 39.95 | 79.4 | 19.5 | 0.45 | 0.65 | Yes | 1.27 | Yes | Yes |
| 1709 | 2.11 | 9.46 | 86.50 | 97.08 | 1.6 | 0.33 | 0.99 | Yes | 1.31 | Yes | Yes |
| 1710 | 2.97 | 13.47 | 32.87 | 90.5 | 6 | 1 | 2.5 | Yes | 1.26 | Yes | Yes |
| 1711 | 2.36 | 9.46 | 16.23 | 88.93 | 8.4 | 0.87 | 1.8 | Yes | 1.14 | Yes | Yes |
| 1712 | 3.05 | 13.87 | 37.40 | 86.7 | 13.3 | 0 | 0 | Yes | 1.34 | Yes | Yes |
| 1713 | 2.57 | 13.25 | 40.76 | 81.4 | 18.6 | 0. | 0 | Yes | 1.16 | Yes | Yes |
| 1714 | 2.65 | 13.1 | 87.31 | 97.34 | 1.8 | 0.86 | 0 | No | 1.47 | Yes | Yes |
| 1715 | 2.12 | 9.08 | 92.50 | 95.25 | 4.1 | 0.65 | 0 | Yes | 1.48 | Yes | Yes |
| 1716 | 1.65 | 9.87 | 17.93 | 82.87 | 16.7 | 0.43 | 0 | No | 1.49 | Yes | Yes |
| 1717 | 2.35 | 9.46 | 44.50 | 99 | 0.4 | 0.6 | 0 | Yes | 1.34 | Yes | Yes |
| 1718 | 1.63 | 9.28 | 96.50 | 89.35 | 10.6 | 0.05 | 0 | Yes | 1.29 | Yes | Yes |
| 1719 | 2.64 | 9.45 | 16.94 | 93.08 | 6.9 | 0.02 | 0 | Yes | 1.18 | Yes | Yes |
| 1720 | 2.35 | 9.25 | 88.12 | 99.82 | 0.05 | 0.06 | 0.07 | Yes | 1.48 | Yes | Yes |

| Invention Example No | Number of faces | Coating details Ratio of fine metal grains in coat outermost surface layer 10% thickness to total fine metal grains (Mass %) | Total metal grain content of coat (Mass %) | Base resin type | Coat thickness (μm) | Coating method | Corrosion Test Results |
|---|---|---|---|---|---|---|---|
| 1701 | 2 | 77.9 | 85 | Alkyl silicate | 130 | Brush | E |
| 1702 | 6 | 43.7 | 53 | Alkyl silicate | 29 | Brush | E |
| 1703 | 7 | 7.8 | 88 | Epoxy resin | 30 | Brush | E |
| 1704 | 6 | 16.0 | 85 | Acrylic resin | 120 | Brush | E |
| 1705 | 7 | 89.6 | 52 | Urethane resin | 187 | Brush | E |
| 1706 | 6 | 11.8 | 83 | Polyester resin | 28 | Spray | E |
| 1707 | 2 | 4.6 | 88 | Epoxy resin | 5 | Spray | E |
| 1708 | 2 | 2.5 | 49 | Acrylic resin | 35 | Spray | E |
| 1709 | 6 | 18.9 | 50 | Urethane resin | 5 | Spray | G |
| 1710 | 7 | 75.9 | 51 | Polyester resin | 200 | Brush | E |
| 1711 | 6 | 55.9 | 83 | Alkali silicate | 25 | Spray | E |
| 1712 | 6 | 53.8 | 82 | Alkali silicate | 15 | Spray | E |
| 1713 | 2 | 97.5 | 88 | Alkyl silicate | 20 | Spray | E |
| 1714 | 7 | 88.4 | 85 | Alkali silicate | 18 | Spray | E |
| 1715 | 2 | 54.8 | 87 | Alkyl silicate | 22 | Spray | E |
| 1716 | 2 | 45.7 | 86 | Alkali silicate | 19 | Spray | E |
| 1717 | 6 | 34.7 | 46 | Alkyl silicate | 29 | Spray | E |
| 1718 | 7 | 57.9 | 49 | Alkali silicate | 23 | Spray | E |
| 1719 | 7 | 65.4 | 35 | Alkyl silicate | 21 | Spray | E |
| 1720 | 6 | 87.9 | 30 | Alkali silicate | 19 | Spray | E |

TABLE 89

| Invention Example No | Diameter distribution (peak diameter) of Zn metal grains/Zn alloy grains (μm) Fine metal | Coarse metal | Percent of fine-grain metal grains among Zn metal grains/Zn alloy grains (Vol %) | Chemical component content of Zn metal grains/Zn alloy grains (Mass %) Zn | Mg | Al | Si | Alloy grain fracture surfaces or cracks present? | Ave aspect ratio | Mg solid solution phase and Zn—Mg intermetallic compounds present on grain surfaces? | Any of MgZn2, Mg2Zn11, Mg2Zn3, MgZn, Mg7Zn3 present? |
|---|---|---|---|---|---|---|---|---|---|---|---|
| 1721 | 2.31 | 9.46 | 60.57 | 91.56 | 6.4 | 1.05 | 0.99 | Yes | 1.27 | Yes | Yes |
| 1722 | 2.62 | 9.46 | 39.48 | 93.36 | 3.5 | 2.6 | 0.54 | Yes | 1.17 | Yes | Yes |
| 1723 | 2.52 | 9.46 | 15.82 | 82.13 | 17.5 | 0.05 | 0.32 | Yes | 1.27 | Yes | Yes |
| 1724 | 2.24 | 13.32 | 49.57 | 91.2 | 3.6 | 5.2 | 0 | No | 1.27 | Yes | Yes |
| 1725 | 0.05 | 6.54 | 86.52 | 94.1 | 5.9 | 0 | 0.001 | Yes | 1.48 | Yes | Yes |
| 1726 | 2.42 | 6.35 | 90.98 | 83.2 | 16.2 | 0 | 0.6 | No | 1.49 | Yes | Yes |
| 1727 | 0.11 | 7.54 | 67.32 | 76.7 | 22.5 | 0 | 0.8 | Yes | 1.34 | Yes | Yes |
| 1728 | 1.92 | 8.64 | 82.33 | 96.52 | 3.4 | 0.04 | 0.04 | Yes | 1.23 | Yes | Yes |
| 1729 | 0.46 | 6.45 | 73.76 | 68.3 | 26.5 | 3 | 2.2 | Yes | 1.23 | Yes | Yes |
| 1730 | 0.77 | 6.48 | 88.77 | 72.84 | 25.5 | 0.06 | 1.6 | Yes | 1.23 | Yes | Yes |
| 1731 | 2.35 | 9.25 | 45.02 | 87.2 | 12.8 | 0 | 0 | Yes | 1.05 | Yes | Yes |
| 1732 | 2.33 | 9.46 | 15.2 | 91.5 | 8.5 | 0 | 0 | Yes | 1.06 | Yes | Yes |
| 1733 | 1.95 | 9.32 | 51.41 | 75.23 | 24.5 | 0.27 | 0 | Yes | 1.38 | Yes | Yes |
| 1734 | 2.15 | 9.22 | 45.46 | 77.48 | 18.4 | 2.55 | 1.57 | Yes | 1.06 | Yes | Yes |
| 1735 | 2.23 | 11.62 | 35.19 | 72.62 | 0.08 | 25.5 | 1.8 | Yes | 1.49 | Yes | Yes |
| 1736 | 2.26 | 11.15 | 73.02 | 64.06 | 15.2 | 19.4 | 1.34 | No | 1.34 | Yes | Yes |
| 1737 | 1.98 | 9.34 | 93.45 | 83 | 6.4 | 10.6 | 0 | Yes | 1.48 | Yes | Yes |
| 1738 | 2.02 | 9.58 | 30.66 | 86.4 | 3.2 | 10.4 | 0 | No | 1.49 | Yes | Yes |
| 1739 | 2.36 | 12.28 | 32.76 | 80.4 | 6.1 | 13.5 | 0.001 | Yes | 1.29 | Yes | Yes |
| 1740 | 3.05 | 12.52 | 30.89 | 70.1 | 16.8 | 12.5 | 0.6 | Yes | 1.23 | Yes | Yes |
| 1741 | 2.57 | 11.9 | 45.90 | 60.9 | 27.5 | 10.8 | 0.8 | Yes | 1.23 | Yes | Yes |

| Invention Example No | Number of faces | Coating details Ratio of fine metal grains in coat outermost surface layer 10% thickness to total fine metal grains (Mass %) | Total metal grain content of coat (Mass %) | Base resin type | Coat thickness (μm) | Coating method | Corrosion Test Results |
|---|---|---|---|---|---|---|---|
| 1721 | 7 | 2.9 | 76 | Alkyl silicate | 15 | Spray | E |
| 1722 | 7 | 12.6 | 72 | Alkali silicate | 18 | Spray | E |
| 1723 | 6 | 53.8 | 30 | Alkyl silicate | 22 | Spray | E |
| 1724 | 7 | 17.8 | 83 | Alkyl silicate | 21 | Spray | E |
| 1725 | 2 | 34.7 | 75 | Alkyl silicate | 29 | Spray | E |
| 1726 | 7 | 76.8 | 76 | Alkali silicate | 23 | Spray | E |
| 1727 | 7 | 58.9 | 72 | Alkyl silicate | 21 | Spray | E |
| 1728 | 2 | 50.8 | 83 | Alkali silicate | 19 | Spray | E |
| 1729 | 6 | 46.8 | 50 | Alkyl silicate | 21 | Spray | E |
| 1730 | 6 | 23.7 | 72 | Alkali silicate | 19 | Spray | E |
| 1731 | 2 | 87.9 | 50 | Acrylic resin | 654 | Spray | E |
| 1732 | 6 | 2.9 | 48 | Alkali silicate | 700 | Spray | E |
| 1733 | 7 | 12.6 | 75 | Alkyl silicate | 555 | Spray | E |
| 1734 | 7 | 53.8 | 55 | Alkyl silicate | 321 | Spray | E |
| 1735 | 6 | 17.8 | 38 | Alkyl silicate | 152 | Brush | E |
| 1736 | 7 | 34.7 | 48 | Urethane resin | 674 | Spray | E |
| 1737 | 7 | 76.8 | 76 | Polyester resin | 325 | Spray | E |
| 1738 | 6 | 58.9 | 72 | Alkyl silicate | 665 | Spray | E |
| 1739 | 7 | 50.8 | 75 | Alkyl silicate | 354 | Brush | E |
| 1740 | 6 | 46.8 | 76 | Alkyl silicate | 165 | Spray | E |
| 1741 | 7 | 23.7 | 72 | Urethane resin | 354 | Spray | E |

TABLE 90

| Invention Example No | Diameter distribution (Ave diameter) of Zn metal grains/Zn alloy grains (μm) Fine metal | Diameter distribution (Ave diameter) of Zn metal grains/Zn alloy grains (μm) Coarse metal | Percent of fine-grain metal grains among Zn metal grains/Zn alloy grains (Vol %) | Chemical component content of Zn metal grains/Zn alloy grains (Mass %) Zn | Chemical component content of Zn metal grains/Zn alloy grains (Mass %) Mg | Chemical component content of Zn metal grains/Zn alloy grains (Mass %) Al | Chemical component content of Zn metal grains/Zn alloy grains (Mass %) Si | Alloy grain fracture surfaces or cracks present? | Ave aspect ratio | Mg solid solution phase and Zn—Mg intermetallic compounds present on grain surfaces? | Any of MgZn2, Mg2Zn11, Mg2Zn3, MgZn, Mg7Zn3 present? |
|---|---|---|---|---|---|---|---|---|---|---|---|
| 1742 | 2.35 | 9.25 | 35.87 | 88.8 | 11.2 | 0 | 0 | Yes | 1.12 | Yes | Yes |
| 1743 | 2.57 | 9.56 | 42.04 | 90.6 | 9.4 | 0 | 0 | No | 1.38 | Yes | Yes |
| 1744 | 2.56 | 9.84 | 6.55 | 81.45 | 18.5 | 0 | 0.05 | Yes | 1.22 | Yes | Yes |
| 1745 | 2.21 | 9.75 | 43.60 | 99.97 | 0.03 | 0 | 0 | Yes | 1.14 | Yes | Yes |
| 1746 | 2.64 | 9.85 | 44.12 | 98.4 | 1.6 | 0 | 0 | No | 1.02 | Yes | Yes |
| 1747 | 1.99 | 8.56 | 37.21 | 93.2 | 6.8 | 0 | 0 | Yes | 1.05 | Yes | Yes |
| 1748 | 2.94 | 8.21 | 43.38 | 84.5 | 13.9 | 0 | 1.6 | No | 1.36 | No | Yes |
| 1749 | 2.58 | 8.33 | 13.52 | 98.1 | 1.9 | 0 | 0 | Yes | 1.11 | No | Yes |
| 1750 | 2.37 | 8 | 44.94 | 94.3 | 5.7 | 0 | 0 | No | 1.07 | Yes | Yes |
| 1751 | 2.15 | 9.22 | 45.46 | 90.8 | 9.2 | 0 | 0 | No | 1.42 | Yes | Yes |
| 1752 | 2.96 | 9.36 | 35.96 | 83.3 | 15.4 | 0 | 1.3 | Yes | 1.38 | No | Yes |
| 1753 | 2.85 | 9.45 | 42.13 | 79.84 | 18.6 | 0 | 1.56 | Yes | 1.22 | No | Yes |
| 1754 | 2.94 | 9.61 | 7.56 | 96.4 | 3.6 | 0 | 0 | Yes | 1.14 | Yes | Yes |
| 1755 | 2.11 | 9.85 | 43.69 | 94.6 | 5.4 | 0 | 0 | Yes | 1.13 | Yes | Yes |
| 1756 | 2.68 | 9.23 | 44.21 | 92.4 | 7.6 | 0 | 0 | Yes | 1.02 | No | Yes |
| 1757 | 2.99 | 9.08 | 39.51 | 75.5 | 24.5 | 0 | 0 | Yes | 1.06 | Yes | Yes |
| 1758 | 2.78 | 9.87 | 45.68 | 82.4 | 17.6 | 0 | 0 | Yes | 1.05 | Yes | Yes |
| 1759 | 2.96 | 9.46 | 65.58 | 98.6 | 1.4 | 0 | 0 | Yes | 1.24 | No | Yes |
| 1760 | 2.85 | 9.28 | 47.24 | 78.5 | 21.5 | 0 | 0 | Yes | 1.33 | No | Yes |
| 1761 | 2.64 | 9.45 | 47.76 | 89.6 | 10.4 | 0 | 0 | Yes | 1.27 | Yes | Yes |

| Invention Example No | Number of faces | Coating details Ratio of fine metal grains in coat outermost surface layer 10% thickness to total fine metal grains (Mass %) | Total metal grain content of coat (Mass %) | Base resin type | Coat thickness (μm) | Coating method | Corrosion Test Results |
|---|---|---|---|---|---|---|---|
| 1742 | 2 | 55.7 | 49 | Alkyl silicate | 14 | Spray | E |
| 1743 | 2 | 64.5 | 89 | Urethane resin | 55 | Spray | E |
| 1744 | 2 | 68.9 | 90 | Alkyl silicate | 8 | Spray | E |
| 1745 | 2 | 64.7 | 86 | Urethane resin | 122 | Brush | E |
| 1746 | 6 | 77.9 | 48 | Alkyl silicate | 555 | Spray | E |
| 1747 | 6 | 43.7 | 47 | Alkali silicate | 19 | Spray | E |
| 1748 | 7 | 7.8 | 47 | Alkyl silicate | 25 | Brush | E |
| 1749 | 6 | 16.0 | 47 | Alkyl silicate | 58 | Spray | E |
| 1750 | 2 | 89.6 | 52 | Alkyl silicate | 685 | Spray | E |
| 1751 | 7 | 11.8 | 52 | Alkali silicate | 19 | Brush | E |
| 1752 | 2 | 4.6 | 52 | Urethane resin | 700 | Spray | E |
| 1753 | 6 | 2.5 | 88 | Alkyl silicate | 77 | Spray | E |
| 1754 | 6 | 18.9 | 87 | Alkyl silicate | 54 | Spray | E |
| 1755 | 2 | 75.9 | 89 | Alkyl silicate | 64 | Spray | E |
| 1756 | 2 | 55.9 | 90 | Alkyl silicate | 34 | Brush | E |
| 1757 | 7 | 53.8 | 91 | Alkali silicate | 28 | Spray | E |
| 1758 | 6 | 97.5 | 46 | Urethane resin | 109 | Brush | E |
| 1759 | 7 | 88.4 | 47 | Alkyl silicate | 15 | Spray | E |
| 1760 | 2 | 54.8 | 47 | Alkyl silicate | 14 | Spray | E |
| 1761 | 7 | 45.7 | 49 | Alkyl silicate | 18 | Spray | E |

TABLE 91

| Invention Example No | Diameter distribution (Ave diameter) of Zn metal grains/Zn alloy grains (μm) Fine metal | Diameter distribution (Ave diameter) of Zn metal grains/Zn alloy grains (μm) Coarse metal | Percent of fine-grain metal grains among Zn metal grains/Zn alloy grains (Vol %) | Chemical component content of Zn metal grains/Zn alloy grains (Mass %) Zn | Chemical component content of Zn metal grains/Zn alloy grains (Mass %) Mg | Chemical component content of Zn metal grains/Zn alloy grains (Mass %) Al | Chemical component content of Zn metal grains/Zn alloy grains (Mass %) Si | Alloy grain fracture surfaces or cracks present? | Ave aspect ratio | Mg solid solution phase and Zn—Mg intermetallic compounds present on grain surfaces? | Any of MgZn2, Mg2Zn11, Mg2Zn3, MgZn, Mg7Zn3 present? |
|---|---|---|---|---|---|---|---|---|---|---|---|
| 1762 | 2.35 | 9.25 | 45.02 | 87.2 | 12.8 | 0 | 0 | Yes | 1.05 | Yes | Yes |
| 1763 | 2.12 | 9.46 | 47.02 | 92.2 | 7.8 | 0 | 0 | Yes | 1.22 | No | Yes |
| 1764 | 2.34 | 9.46 | 7.66 | 70.5 | 29.5 | 0 | 0 | Yes | 1.13 | No | Yes |
| 1765 | 2.33 | 9.46 | 15.20 | 91.5 | 8.5 | 0 | 0 | Yes | 1.06 | Yes | Yes |
| 1766 | 2.23 | 9.06 | 43.16 | 74.5 | 25.5 | 0 | 0 | Yes | 1.05 | Yes | Yes |
| 1767 | 2.12 | 9.3 | 49.33 | 99.93 | 0.07 | 0 | 0 | Yes | 1.24 | Yes | Yes |
| 1768 | 2.21 | 8.68 | 19.47 | 89.2 | 10.8 | 0 | 0 | No | 1.05 | Yes | Yes |
| 1769 | 1.38 | 8.53 | 69.55 | 86 | 11.2 | 1.6 | 1.2 | No | 1.12 | Yes | Yes |
| 1770 | 1.95 | 9.32 | 51.41 | 75.23 | 24.5 | 0.27 | 0 | Yes | 1.38 | No | Yes |
| 1771 | 2.26 | 8.95 | 75.88 | 82.6 | 17.4 | 0 | 0 | Yes | 1.13 | No | Yes |
| 1772 | 2.05 | 12.54 | 48.08 | 98.7 | 1.3 | 0 | 0 | Yes | 1.33 | Yes | Yes |
| 1773 | 1.65 | 8.7 | 66.85 | 80.5 | 19.5 | 0 | 0 | Yes | 1.27 | Yes | Yes |
| 1774 | 2.35 | 8.55 | 7.68 | 88.85 | 10.8 | 0.05 | 0.3 | No | 1.23 | No | Yes |
| 1775 | 1.62 | 8.91 | 8.64 | 87.7 | 11.9 | 0.4 | 0 | Yes | 1.11 | Yes | Yes |
| 1776 | 1.88 | 9.91 | 16.58 | 90.5 | 9.5 | 0 | 0 | Yes | 1.42 | Yes | Yes |
| 1777 | 2.35 | 9.25 | 35.87 | 89.5 | 10.5 | 0 | 0 | Yes | 1.06 | No | Yes |
| 1778 | 2.57 | 9.56 | 42.04 | 84.9 | 15.1 | 0 | 0 | Yes | 1.05 | Yes | Yes |
| 1779 | 2.56 | 9.84 | 38.41 | 83.2 | 16.8 | 0 | 0 | Yes | 1.07 | Yes | Yes |
| 1780 | 2.21 | 9.75 | 6.99 | 89.4 | 10.6 | 0 | 0 | Yes | 1.42 | No | Yes |
| 1781 | 2.64 | 9.85 | 44.12 | 84.3 | 13.3 | 2.4 | 0 | Yes | 1.38 | Yes | Yes |

| Invention Example No | Number of faces | Coating details Ratio of fine metal grains in coat outermost surface layer 10% thickness to total fine metal grains (Mass %) | Total metal grain content of coat (Mass %) | Base resin type | Coat thickness (μm) | Coating method | Corrosion Test Results |
|---|---|---|---|---|---|---|---|
| 1762 | 6 | 34.7 | 50 | Alkali silicate | 2 | Spray | G |
| 1763 | 7 | 57.9 | 87 | Alkyl silicate | 37 | Spray | E |
| 1764 | 6 | 65.4 | 83 | Alkali silicate | 12 | Spray | E |
| 1765 | 7 | 87.9 | 48 | Alkyl silicate | 160 | Brush | E |
| 1766 | 6 | 2.9 | 51 | Alkali silicate | 5 | Brush | G |
| 1767 | 2 | 12.6 | 51 | Alkyl silicate | 56 | Brush | E |
| 1768 | 7 | 53.8 | 87 | Alkali silicate | 2 | Spray | G |
| 1769 | 6 | 17.8 | 85 | Alkyl silicate | 18 | Spray | E |
| 1770 | 6 | 34.7 | 86 | Alkyl silicate | 23 | Spray | E |
| 1771 | 6 | 76.8 | 50 | Epoxy resin | 30 | Brush | E |
| 1772 | 2 | 58.9 | 51 | Acrylic resin | 77 | Brush | E |
| 1773 | 6 | 50.8 | 51 | Urethane resin | 655 | Brush | E |
| 1774 | 7 | 46.8 | 80 | Polyester resin | 47 | Spray | E |
| 1775 | 2 | 23.7 | 46 | Epoxy resin | 43 | Spray | E |
| 1776 | 6 | 53.8 | 51 | Acrylic resin | 52 | Brush | E |
| 1777 | 2 | 53.8 | 86 | Urethane resin | 20 | Brush | E |
| 1778 | 6 | 43.7 | 85 | Polyester resin | 200 | Brush | E |
| 1779 | 7 | 55.9 | 82 | Alkali silicate | 22 | Spray | E |
| 1780 | 7 | 65.8 | 81 | Alkyl silicate | 25 | Spray | E |
| 1781 | 2 | 55.7 | 46 | Alkali silicate | 14 | Spray | E |

TABLE 92

| Invention Example No | Diameter distribution (Ave diameter) of Zn metal grains/Zn alloy grains (μm) Fine metal | Diameter distribution (Ave diameter) of Zn metal grains/Zn alloy grains (μm) Coarse metal | Percent of fine-grain metal grains among Zn metal grains/Zn alloy grains (Vol %) | Chemical component content of Zn metal grains/Zn alloy grains (Mass %) Zn | Chemical component content of Zn metal grains/Zn alloy grains (Mass %) Mg | Chemical component content of Zn metal grains/Zn alloy grains (Mass %) Al | Chemical component content of Zn metal grains/Zn alloy grains (Mass %) Si | Alloy grain fracture surfaces or cracks present? | Ave aspect ratio | Mg solid solution phase and Zn—Mg intermetallic compounds present on grain surfaces? | Any of MgZn2, Mg2Zn11, Mg2Zn3, MgZn, Mg7Zn3 present? |
|---|---|---|---|---|---|---|---|---|---|---|---|
| 1782 | 2.65 | 8.56 | 66.99 | 98.6 | 1.4 | 0 | 0 | No | 1.22 | Yes | Yes |
| 1783 | 2.94 | 8.21 | 43.38 | 76.45 | 23.5 | 0 | 0.05 | Yes | 1.14 | Yes | Yes |
| 1784 | 2.58 | 8.33 | 39.75 | 91.1 | 8.9 | 0 | 0 | Yes | 1.13 | Yes | Yes |
| 1785 | 2.37 | 8 | 65.38 | 85.1 | 14.9 | 0 | 0 | Yes | 1.02 | Yes | Yes |
| 1786 | 2.15 | 9.22 | 45.46 | 77.48 | 18.4 | 2.55 | 1.57 | Yes | 1.06 | Yes | Yes |
| 1787 | 2.96 | 9.36 | 22.55 | 97.9 | 2.1 | 0 | 0 | Yes | 1.05 | Yes | Yes |
| 1788 | 2.85 | 9.45 | 42.13 | 94.8 | 5.2 | 0 | 0 | Yes | 1.24 | Yes | Yes |
| 1789 | 2.94 | 9.61 | 38.50 | 84.6 | 15.4 | 0 | 0 | Yes | 1.33 | Yes | Yes |
| 1790 | 2.11 | 9.85 | 64.13 | 89.3 | 10.7 | 0 | 0 | Yes | 1.27 | Yes | Yes |
| 1791 | 2.68 | 9.23 | 44.21 | 83.3 | 16.7 | 0 | 0 | Yes | 1.05 | Yes | Yes |
| 1792 | 2.99 | 9.08 | 39.51 | 80.05 | 19.6 | 0.35 | 0 | No | 1.12 | Yes | Yes |
| 1793 | 1.82 | 9.87 | 78.64 | 85.5 | 14.5 | 0 | 0 | No | 1.23 | Yes | Yes |
| 1794 | 1.42 | 9.46 | 42.05 | 85 | 14.2 | 0 | 0.8 | No | 1.36 | Yes | Yes |
| 1795 | 2.12 | 9.28 | 64.58 | 87.3 | 12.7 | 0 | 0 | No | 1.11 | Yes | Yes |
| 1796 | 1.92 | 9.45 | 47.76 | 89.5 | 10.5 | 0 | 0 | Yes | 1.07 | Yes | Yes |
| 1797 | 2.11 | 9.63 | 24.10 | 87.3 | 11.8 | 0 | 0.9 | Yes | 1.42 | Yes | Yes |
| 1798 | 2.97 | 9.16 | 39.11 | 86.4 | 12.8 | 0.5 | 0.3 | Yes | 1.38 | Yes | Yes |
| 1799 | 2.36 | 10.39 | 19.65 | 93.8 | 6.2 | 0 | 0 | Yes | 1.22 | Yes | Yes |
| 1800 | 3.05 | 10.56 | 65.39 | 83.8 | 16.2 | 0 | 0 | Yes | 1.14 | Yes | Yes |
| 1801 | 2.15 | 10.74 | 48.57 | 80.4 | 19.6 | 0 | 0 | Yes | 1.13 | Yes | Yes |

| Invention Example No | Number of faces | Coating details Ratio of fine metal grains in coat outermost surface layer 10% thickness to total fine metal grains (Mass %) | Coating details Total metal grain content of coat (Mass %) | Coating details Base resin type | Coating details Coat thickness (μm) | Coating details Coating method | Corrosion Test Results |
|---|---|---|---|---|---|---|---|
| 1782 | 2 | 64.5 | 47 | Urethane resin | 112 | Spray | E |
| 1783 | 6 | 68.9 | 48 | Alkali silicate | 24 | Spray | E |
| 1784 | 7 | 64.7 | 51 | Urethane resin | 150 | Spray | E |
| 1785 | 6 | 77.9 | 53 | Alkali silicate | 18 | Spray | E |
| 1786 | 7 | 43.7 | 88 | Alkyl silicate | 19 | Brush | E |
| 1787 | 6 | 7.8 | 85 | Alkyl silicate | 24 | Spray | E |
| 1788 | 2 | 16.0 | 83 | Urethane resin | 99 | Spray | E |
| 1789 | 2 | 89.6 | 82 | Alkyl silicate | 7 | Spray | E |
| 1790 | 6 | 11.8 | 83 | Epoxy resin | 100 | Spray | E |
| 1791 | 7 | 4.6 | 47 | Alkyl silicate | 27 | Brush | E |
| 1792 | 6 | 2.5 | 51 | Alkali silicate | 15 | Spray | E |
| 1793 | 6 | 18.9 | 52 | Alkyl silicate | 14 | Spray | E |
| 1794 | 2 | 75.9 | 51 | Urethane resin | 55 | Spray | E |
| 1795 | 7 | 55.9 | 52 | Alkyl silicate | 8 | Spray | E |
| 1796 | 2 | 53.8 | 89 | Urethane resin | 122 | Brush | E |
| 1797 | 2 | 97.5 | 85 | Alkyl silicate | 54 | Spray | E |
| 1798 | 6 | 88.4 | 82 | Alkali silicate | 19 | Spray | E |
| 1799 | 7 | 54.8 | 87 | Alkyl silicate | 25 | Brush | E |
| 1800 | 7 | 45.7 | 88 | Alkyl silicate | 58 | Spray | E |
| 1801 | 6 | 34.7 | 49 | Alkyl silicate | 21 | Spray | E |

TABLE 93

| Invention Example No | Diameter distribution (Ave diameter) of Zn metal grains/Zn alloy grains (μm) Fine metal | Diameter distribution (Ave diameter) of Zn metal grains/Zn alloy grains (μm) Coarse metal | Percent of fine-grain metal grains among Zn metal grains/Zn alloy grains (Vol %) | Chemical component content of Zn metal grains/Zn alloy grains (Mass %) Zn | Chemical component content of Zn metal grains/Zn alloy grains (Mass %) Mg | Chemical component content of Zn metal grains/Zn alloy grains (Mass %) Al | Chemical component content of Zn metal grains/Zn alloy grains (Mass %) Si | Alloy grain fracture surfaces or cracks present? | Ave aspect ratio | Mg solid solution phase and Zn—Mg intermetallic compounds present on grain surfaces? | Any of MgZn2, Mg2Zn11, Mg2Zn3, MgZn, Mg7Zn3 present? |
|---|---|---|---|---|---|---|---|---|---|---|---|
| 1802 | 2.19 | 10.27 | 24.91 | 87.6 | 12.4 | 0 | 0 | Yes | 1.02 | Yes | Yes |
| 1803 | 2.48 | 11.5 | 39.92 | 89.3 | 10.7 | 0 | 0 | Yes | 1.06 | Yes | Yes |
| 1804 | 2.85 | 11.67 | 22.65 | 91.5 | 8.5 | 0 | 0 | Yes | 1.05 | Yes | Yes |
| 1805 | 2.75 | 11.85 | 66.20 | 94.9 | 5.1 | 0 | 0 | Yes | 1.24 | Yes | Yes |
| 1806 | 2.46 | 11.38 | 49.38 | 75.5 | 24.5 | 0 | 0 | Yes | 1.33 | Yes | Yes |
| 1807 | 2.71 | 12.61 | 30.58 | 86.5 | 13.5 | 0 | 0 | Yes | 1.27 | Yes | Yes |
| 1808 | 2.36 | 12.78 | 45.59 | 80 | 20 | 0 | 0 | Yes | 1.05 | Yes | Yes |
| 1809 | 2.16 | 9.57 | 28.32 | 84.5 | 15.5 | 0 | 0 | Yes | 1.12 | Yes | Yes |
| 1810 | 2.46 | 9.81 | 71.87 | 88 | 10.5 | 1.5 | 0 | Yes | 1.23 | Yes | Yes |
| 1811 | 2.49 | 8.43 | 53.05 | 92.1 | 7.9 | 0 | 0 | Yes | 1.36 | Yes | Yes |
| 1812 | 2.95 | 8.55 | 27.74 | 95.2 | 4.8 | 0 | 0 | Yes | 1.11 | Yes | Yes |
| 1813 | 2.36 | 8.22 | 42.75 | 81.6 | 18.4 | 0 | 0 | Yes | 1.07 | Yes | Yes |
| 1814 | 2.21 | 9.44 | 23.29 | 86.8 | 12.7 | 0 | 0.5 | Yes | 1.42 | Yes | Yes |
| 1815 | 2.25 | 9.58 | 61.12 | 89.7 | 10.3 | 0 | 0 | No | 1.38 | Yes | Yes |
| 1816 | 2.44 | 9.67 | 44.30 | 71.2 | 20.8 | 8 | 0 | Yes | 1.22 | Yes | Yes |
| 1817 | 2.78 | 9.83 | 23.96 | 97.5 | 2.5 | 0 | 0 | No | 1.14 | Yes | Yes |
| 1818 | 2.15 | 10.07 | 44.09 | 84.8 | 15.2 | 0 | 0 | Yes | 1.13 | Yes | Yes |
| 1819 | 2.19 | 9.45 | 24.63 | 80.8 | 19.2 | 0 | 0 | No | 1.02 | Yes | Yes |
| 1820 | 2.48 | 9.3 | 62.46 | 78.7 | 13.5 | 7.8 | 0 | Yes | 1.06 | Yes | Yes |
| 1821 | 2.59 | 9.99 | 45.64 | 88.1 | 11.9 | 0 | 0 | No | 1.05 | Yes | Yes |

| Invention Example No | Number of faces | Coating details Ratio of fine metal grains in coat outermost surface layer 10% thickness to total fine metal grains (Mass %) | Coating details Total metal grain content of coat (Mass %) | Coating details Base resin type | Coating details Coat thickness (μm) | Coating details Coating method | Corrosion Test Results |
|---|---|---|---|---|---|---|---|
| 1802 | 7 | 57.9 | 50 | Alkali silicate | 19 | Brush | E |
| 1803 | 7 | 65.4 | 51 | Urethane resin | 56 | Spray | E |
| 1804 | 6 | 87.9 | 52 | Alkyl silicate | 77 | Spray | E |
| 1805 | 7 | 2.9 | 53 | Alkyl silicate | 12 | Spray | E |
| 1806 | 2 | 12.8 | 88 | Alkyl silicate | 64 | Spray | E |
| 1807 | 7 | 53.8 | 85 | Alkyl silicate | 34 | Brush | E |
| 1808 | 7 | 17.8 | 83 | Alkali silicate | 28 | Spray | E |
| 1809 | 2 | 34.7 | 81 | Urethane resin | 109 | Brush | E |
| 1810 | 6 | 55.7 | 80 | Alkyl silicate | 15 | Spray | E |
| 1811 | 6 | 64.5 | 47 | Alkyl silicate | 14 | Spray | E |
| 1812 | 7 | 68.9 | 49 | Alkyl silicate | 18 | Spray | E |
| 1813 | 7 | 64.7 | 50 | Urethane resin | 122 | Brush | E |
| 1814 | 6 | 77.9 | 51 | Alkyl silicate | 54 | Spray | E |
| 1815 | 7 | 43.7 | 52 | Alkali silicate | 19 | Spray | E |
| 1816 | 2 | 7.8 | 83 | Alkyl silicate | 25 | Brush | E |
| 1817 | 2 | 16.0 | 88 | Alkyl silicate | 58 | Spray | E |
| 1818 | 6 | 89.6 | 85 | Alkyl silicate | 21 | Spray | E |
| 1819 | 7 | 11.8 | 83 | Alkali silicate | 19 | Brush | E |
| 1820 | 6 | 4.6 | 82 | Urethane resin | 56 | Spray | E |
| 1821 | 2 | 2.5 | 47 | Alkyl silicate | 77 | Spray | E |

TABLE 94

| Invention Example No | Diameter distribution (Ave diameter) of Zn metal grains/Zn alloy grains (μm) Fine metal | Diameter distribution (Ave diameter) of Zn metal grains/Zn alloy grains (μm) Coarse metal | Percent of fine-grain metal grains among Zn metal grains/Zn alloy grains (Vol %) | Chemical component content of Zn metal grains/Zn alloy grains (Mass %) Zn | Chemical component content of Zn metal grains/Zn alloy grains (Mass %) Mg | Chemical component content of Zn metal grains/Zn alloy grains (Mass %) Al | Chemical component content of Zn metal grains/Zn alloy grains (Mass %) Si | Alloy grain fracture surfaces or cracks present? | Ave aspect ratio | Mg solid solution phase and Zn—Mg intermetallic compounds present on grain surfaces? | Any of MgZn2, Mg2Zn11, Mg2Zn3, MgZn, Mg7Zn3 present? |
|---|---|---|---|---|---|---|---|---|---|---|---|
| 1822 | 2.47 | 9.58 | 25.30 | 88.5 | 10.6 | 0 | 0.9 | Yes | 1.24 | Yes | Yes |
| 1823 | 2.69 | 9.4 | 42.84 | 84.6 | 15.4 | 0 | 0 | Yes | 1.33 | Yes | Yes |
| 1824 | 2.57 | 9.57 | 25.44 | 97.4 | 2.6 | 0 | 0 | Yes | 1.27 | Yes | Yes |
| 1825 | 2.49 | 9.54 | 63.27 | 83.3 | 16.7 | 0 | 0 | Yes | 1.37 | Yes | Yes |
| 1826 | 2.68 | 9.58 | 46.45 | 91.9 | 8.1 | 0 | 0 | Yes | 1.10 | Yes | Yes |
| 1827 | 2.35 | 9.25 | 46.45 | 86.3 | 13.7 | 0 | 0 | Yes | 1.04 | Yes | Yes |
| 1828 | 2.48 | 10.04 | 50.91 | 81.5 | 18.5 | 0 | 0 | Yes | 1.02 | Yes | Yes |
| 1829 | 2.13 | 11.27 | 27.25 | 97.6 | 2.4 | 0 | 0 | Yes | 1.01 | Yes | Yes |
| 1830 | 1.93 | 11.44 | 42.26 | 89.1 | 10.9 | 0 | 0 | Yes | 1.08 | Yes | Yes |
| 1831 | 2.05 | 8.9 | 33.69 | 92.8 | 7.2 | 0 | 0 | Yes | 1.14 | Yes | Yes |
| 1832 | 1.42 | 8.75 | 48.70 | 81.96 | 17.5 | 0.5 | 0.04 | No | 1.23 | Yes | Yes |
| 1833 | 1.46 | 9.44 | 29.24 | 85.4 | 14.6 | 0 | 0 | No | 1.33 | Yes | Yes |
| 1834 | 1.75 | 9.03 | 67.07 | 90.6 | 9.4 | 0 | 0 | Yes | 1.37 | Yes | Yes |
| 1835 | 1.86 | 8.85 | 50.25 | 92.9 | 7.1 | 0 | 0 | Yes | 1.44 | Yes | Yes |
| 1836 | 1.74 | 8.95 | 29.91 | 77.5 | 22.5 | 0 | 0 | Yes | 1.21 | Yes | Yes |
| 1837 | 1.96 | 12.54 | 87.50 | 84.8 | 13.7 | 1.5 | 0 | No | 1.22 | Yes | Yes |
| 1838 | 1.65 | 8.7 | 30.58 | 87.1 | 12.9 | 0 | 0 | No | 1.23 | Yes | Yes |
| 1839 | 2.35 | 8.55 | 68.41 | 95.7 | 4.3 | 0 | 0 | Yes | 1.47 | Yes | Yes |
| 1840 | 1.62 | 10.72 | 54.59 | 80.2 | 17.6 | 1 | 1.2 | No | 1.01 | Yes | Yes |
| 1841 | 2.25 | 9.9 | 34.25 | 98.8 | 0.6 | 0.6 | 0 | Yes | 1.04 | Yes | Yes |

| Invention Example No | Number of faces | Coating details Ratio of fine metal grains in coat outermost surface layer 10% thickness to total fine metal grains (Mass %) | Total metal grain content of coat (Mass %) | Base resin type | Coat thickness (μm) | Coating method | Corrosion Test Results |
|---|---|---|---|---|---|---|---|
| 1822 | 2 | 18.9 | 46 | Alkyl silicate | 54 | Spray | E |
| 1823 | 7 | 75.9 | 49 | Alkali silicate | 2 | Spray | G |
| 1824 | 6 | 55.9 | 50 | Alkali silicate | 20 | Spray | E |
| 1825 | 7 | 53.8 | 51 | Alkali silicate | 5 | Spray | G |
| 1826 | 7 | 97.5 | 83 | Alkyl silicate | 20 | Spray | E |
| 1827 | 6 | 88.4 | 82 | Alkali silicate | 15 | Brush | E |
| 1828 | 2 | 54.8 | 88 | Alkyl silicate | 57 | Brush | E |
| 1829 | 7 | 45.7 | 85 | Alkali silicate | 13 | Brush | E |
| 1830 | 2 | 34.7 | 86 | Alkyl silicate | 22 | Brush | E |
| 1831 | 2 | 57.9 | 47 | Alkali silicate | 20 | Spray | E |
| 1832 | 7 | 65.4 | 48 | Alkyl silicate | 27 | Spray | E |
| 1833 | 2 | 87.9 | 50 | Alkali silicate | 15 | Spray | E |
| 1834 | 7 | 2.9 | 51 | Alkyl silicate | 35 | Spray | E |
| 1835 | 2 | 12.6 | 52 | Alkali silicate | 34 | Brush | E |
| 1836 | 6 | 53.8 | 88 | Alkyl silicate | 45 | Brush | E |
| 1837 | 6 | 17.8 | 89 | Alkali silicate | 52 | Brush | E |
| 1838 | 7 | 34.7 | 86 | Alkyl silicate | 23 | Brush | E |
| 1839 | 6 | 76.8 | 87 | Alkali silicate | 5 | Spray | E |
| 1840 | 2 | 58.9 | 86 | Alkyl silicate | 52 | Brush | E |
| 1841 | 2 | 50.8 | 46 | Alkali silicate | 150 | Brush | E |

TABLE 95

| Invention Example No | Diameter distribution (Ave diameter) of Zn metal grains/Zn alloy grains (μm) | | Percent of fine-grain metal grains among Zn metal grains/Zn alloy grains (Vol %) | Chemical component content of Zn metal grains/Zn alloy grains (Mass %) | | | | Alloy grain fracture surfaces or cracks present? | Ave aspect ratio | Mg solid solution phase and Zn—Mg intermetallic compounds present on grain surfaces? | Any of MgZn2, Mg2Zn11, Mg2Zn3, MgZn, Mg7Zn3 present? |
|---|---|---|---|---|---|---|---|---|---|---|---|
| | Fine metal | Coarse metal | | Zn | Mg | Al | Si | | | | |
| 1842 | 2.36 | 9.57 | 37.61 | 86.9 | 10.3 | 1.6 | 1.2 | Yes | 1.05 | Yes | Yes |
| 1843 | 2.24 | 10.79 | 45.60 | 92.98 | 7 | 0.02 | 0 | Yes | 1.12 | Yes | Yes |
| 1844 | 2.46 | 10.93 | 46.70 | 75.5 | 23.5 | 1 | 0 | Yes | 1.11 | Yes | Yes |
| 1845 | 1.56 | 11.02 | 41.22 | 82.5 | 17.5 | 0 | 0 | No | 1.08 | Yes | Yes |
| 1846 | 1.24 | 11.18 | 45.68 | 80.1 | 12.4 | 7.5 | 0 | Yes | 1.47 | Yes | Yes |
| 1847 | 1.68 | 11.42 | 22.02 | 85.09 | 14.9 | 0 | 0.01 | Yes | 1.50 | Yes | Yes |
| 1848 | 2.65 | 10.8 | 37.03 | 78.7 | 20.7 | 0 | 0.6 | No | 1.13 | Yes | Yes |
| 1849 | 2.22 | 10.65 | 28.46 | 91.29 | 8.6 | 0 | 0.11 | Yes | 1.26 | Yes | Yes |
| 1850 | 2.45 | 11.34 | 43.47 | 85.8 | 14.2 | 0 | 0 | Yes | 1.14 | Yes | Yes |
| 1851 | 2.23 | 11.62 | 35.19 | 98.12 | 0.08 | 0 | 1.8 | Yes | 1.49 | Yes | Yes |
| 1852 | 2.26 | 11.15 | 73.02 | 83.46 | 15.2 | 0 | 1.34 | No | 1.34 | Yes | Yes |
| 1853 | 2.72 | 12.38 | 56.20 | 73.17 | 17.4 | 9 | 0.43 | Yes | 1.18 | Yes | Yes |
| 1854 | 2.13 | 12.55 | 35.86 | 98.6 | 0.8 | 0.6 | 0 | Yes | 1.17 | Yes | Yes |
| 1855 | 1.98 | 9.34 | 93.45 | 93.55 | 6.4 | 0.05 | 0 | Yes | 1.48 | Yes | Yes |
| 1856 | 2.02 | 9.58 | 30.66 | 96.78 | 3.2 | 0.02 | 0 | No | 1.49 | Yes | Yes |
| 1857 | 2.21 | 9.88 | 74.21 | 83 | 9.2 | 7.8 | 0 | Yes | 1.27 | Yes | Yes |
| 1858 | 2.55 | 10 | 55.39 | 70.92 | 19.2 | 9.88 | 0 | Yes | 1.17 | Yes | Yes |
| 1859 | 1.92 | 10.67 | 30.08 | 80.25 | 15.1 | 4.65 | 0 | Yes | 1.16 | Yes | Yes |
| 1860 | 1.96 | 11.89 | 45.09 | 81.85 | 14.5 | 3.65 | 0 | Yes | 1.27 | Yes | Yes |
| 1861 | 2.11 | 12.03 | 41.41 | 89.45 | 10.5 | 0.05 | 0 | Yes | 1.27 | Yes | Yes |

| Invention Example No | Number of faces | Coating details | | | | | Corrosion Test Results |
|---|---|---|---|---|---|---|---|
| | | Ratio of fine metal grains in coat outermost surface layer 10% thickness to total fine metal grains (Mass %) | Total metal grain content of coat (Mass %) | Base resin type | Coat thickness (μm) | Coating method | |
| 1842 | 2 | 46.8 | 49 | Alkyl silicate | 60 | Brush | E |
| 1843 | 2 | 23.7 | 35 | Alkali silicate | 15 | Spray | E |
| 1844 | 2 | 53.8 | 37 | Alkyl silicate | 24 | Spray | E |
| 1845 | 2 | 53.8 | 36 | Alkali silicate | 34 | Spray | E |
| 1846 | 6 | 43.7 | 38 | Alkyl silicate | 20 | Brush | E |
| 1847 | 6 | 55.9 | 48 | Alkali silicate | 200 | Brush | E |
| 1848 | 7 | 65.8 | 46 | Alkyl silicate | 56 | Brush | E |
| 1849 | 6 | 55.7 | 51 | Alkali silicate | 34 | Spray | E |
| 1850 | 2 | 64.5 | 46 | Alkyl silicate | 2 | Spray | G |
| 1851 | 7 | 68.9 | 38 | Alkali silicate | 15 | Spray | E |
| 1852 | 2 | 64.7 | 48 | Alkali silicate | 10 | Spray | E |
| 1853 | 6 | 77.9 | 52 | Alkyl silicate | 125 | Brush | E |
| 1854 | 6 | 43.7 | 30 | Alkali silicate | 24 | Brush | E |
| 1855 | 2 | 7.8 | 76 | Alkyl silicate | 110 | Brush | E |
| 1856 | 2 | 16.0 | 72 | Alkali silicate | 24 | Brush | E |
| 1857 | 7 | 89.6 | 81 | Alkyl silicate | 2 | Spray | G |
| 1858 | 6 | 11.8 | 64 | Alkali silicate | 37 | Spray | E |
| 1859 | 7 | 4.6 | 69 | Alkyl silicate | 113 | Brush | E |
| 1860 | 2 | 2.5 | 83 | Alkali silicate | 2 | Spray | G |
| 1861 | 7 | 18.9 | 30 | Alkyl silicate | 75 | Brush | E |

TABLE 96

| Invention Example No | Diameter distribution (Ave diameter) of Zn metal grains/Zn alloy grains (μm) Fine metal | Diameter distribution (Ave diameter) of Zn metal grains/Zn alloy grains (μm) Coarse metal | Percent of fine-grain metal grains among Zn metal grains/Zn alloy grains (Vol %) | Chemical component content of Zn metal grains/Zn alloy grains (Mass %) Zn | Mg | Al | Si | Alloy grain fracture surfaces or cracks present? | Ave aspect ratio | Mg solid solution phase and Zn—Mg intermetallic compounds present on grain surfaces? | Any of MgZn2, Mg2Zn11, Mg2Zn3, MgZn, Mg7Zn3 present? |
|---|---|---|---|---|---|---|---|---|---|---|---|
| 1862 | 2.97 | 12.12 | 17.75 | 87.3 | 7.5 | 5.2 | 0 | Yes | 1.49 | Yes | Yes |
| 1863 | 2.36 | 12.28 | 32.76 | 93.9 | 6.1 | 0 | 0.001 | Yes | 1.29 | Yes | Yes |
| 1864 | 3.05 | 12.52 | 30.89 | 82.55 | 16.8 | 0.05 | 0.6 | Yes | 1.23 | Yes | Yes |
| 1865 | 2.57 | 11.9 | 45.90 | 70.7 | 27.5 | 1 | 0.8 | Yes | 1.23 | Yes | Yes |
| 1866 | 2.65 | 11.75 | 42.22 | 94.6 | 2.9 | 0 | 2.5 | Yes | 1.23 | Yes | Yes |
| 1867 | 2.54 | 12.44 | 18.56 | 94 | 4.5 | 0 | 1.5 | No | 1.23 | Yes | Yes |
| 1868 | 2.85 | 12.03 | 33.57 | 99.43 | 0.07 | 0 | 0.5 | Yes | 1.27 | Yes | Yes |
| 1869 | 2.75 | 10.61 | 31.70 | 96.82 | 3.1 | 0.04 | 0.04 | Yes | 1.23 | Yes | Yes |
| 1870 | 2.46 | 11.3 | 46.71 | 76.3 | 20.5 | 1 | 2.2 | Yes | 1.36 | Yes | Yes |
| 1871 | 2.71 | 11.58 | 47.89 | 68.84 | 29.5 | 0.06 | 1.6 | Yes | 1.11 | Yes | Yes |
| 1872 | 2.36 | 11.11 | 24.23 | 92.33 | 7.6 | 0.07 | 0 | Yes | 1.02 | Yes | Yes |
| 1873 | 2.16 | 12.34 | 39.24 | 95.2 | 0.7 | 1.2 | 2.9 | Yes | 1.05 | Yes | Yes |
| 1874 | 2.46 | 12.51 | 37.37 | 91.8 | 4.6 | 1.8 | 1.8 | Yes | 1.24 | Yes | Yes |
| 1875 | 2.49 | 11.64 | 50.38 | 82 | 8.3 | 9.2 | 0.5 | Yes | 1.33 | Yes | Yes |
| 1876 | 1.63 | 9.16 | 37.14 | 88.2 | 11.8 | 0 | 0 | Yes | 1.27 | Yes | Yes |
| 1877 | 1.51 | 9.46 | 13.48 | 86.06 | 12.9 | 0 | 1.04 | Yes | 1.50 | Yes | Yes |
| 1878 | 3.05 | 9.54 | 40.05 | 99.34 | 0.6 | 0 | 0.06 | Yes | 1.13 | Yes | Yes |
| 1879 | 2.57 | 9.56 | 38.18 | 89.51 | 9.5 | 0 | 0.99 | No | 1.04 | Yes | Yes |
| 1880 | 2.65 | 9.46 | 7.63 | 88.3 | 11.7 | 0 | 0 | Yes | 1.02 | Yes | Yes |
| 1881 | 2.54 | 11.99 | 37.95 | 89.9 | 9.4 | 0.7 | 0 | Yes | 1.08 | Yes | Yes |

| Invention Example No | Number of faces | Coating details Ratio of fine metal grains in coat outermost surface layer 10% thickness to total fine metal grains (Mass %) | Total metal grain content of coat (Mass %) | Base resin type | Coat thickness (μm) | Coating method | Corrosion Test Results |
|---|---|---|---|---|---|---|---|
| 1862 | 6 | 75.9 | 83 | Alkali silicate | 30 | Brush | E |
| 1863 | 7 | 55.9 | 75 | Alkyl silicate | 34 | Brush | E |
| 1864 | 6 | 53.8 | 76 | Epoxy resin | 124 | Brush | E |
| 1865 | 7 | 97.5 | 72 | Acrylic resin | 15 | Spray | E |
| 1866 | 6 | 88.4 | 71 | Urethane resin | 23 | Spray | E |
| 1867 | 2 | 54.8 | 82 | Polyester resin | 157 | Brush | E |
| 1868 | 7 | 45.7 | 81 | Epoxy resin | 26 | Spray | E |
| 1869 | 6 | 34.7 | 83 | Acrylic resin | 38 | Spray | E |
| 1870 | 6 | 57.9 | 50 | Urethane resin | 160 | Brush | E |
| 1871 | 6 | 65.4 | 72 | Polyester resin | 27 | Brush | E |
| 1872 | 2 | 87.9 | 47 | Epoxy resin | 180 | Brush | E |
| 1873 | 6 | 2.9 | 47 | Acrylic resin | 26 | Spray | E |
| 1874 | 7 | 12.6 | 52 | Urethane resin | 180 | Brush | E |
| 1875 | 2 | 53.8 | 52 | Polyester resin | 15 | Spray | E |
| 1876 | 6 | 17.8 | 50 | Epoxy resin | 2 | Spray | G |
| 1877 | 2 | 34.7 | 46 | Acrylic resin | 28 | Spray | E |
| 1878 | 6 | 55.7 | 47 | Urethane resin | 30 | Spray | E |
| 1879 | 7 | 64.5 | 83 | Polyester resin | 2 | Spray | G |
| 1880 | 7 | 68.9 | 52 | Epoxy resin | 157 | Brush | E |
| 1881 | 2 | 64.7 | 89 | Acrylic resin | 28 | Brush | E |

TABLE 97

| Invention Example No | Diameter distribution (Ave diameter) of Zn metal grains/Zn alloy grains (μm) Fine metal | Diameter distribution (Ave diameter) of Zn metal grains/Zn alloy grains (μm) Coarse metal | Percent of fine-grain metal grains among Zn metal grains/Zn alloy grains (Vol %) | Chemical component content of Zn metal grains/Zn alloy grains (Mass %) Zn | Mg | Al | Si | Alloy grain fracture surfaces or cracks present? | Ave aspect ratio | Mg solid solution phase and Zn—Mg intermetallic compounds present on grain surfaces? | Any of MgZn2, Mg2Zn11, Mg2Zn3, MgZn, Mg7Zn3 present? |
|---|---|---|---|---|---|---|---|---|---|---|---|
| 1882 | 2.85 | 12.08 | 14.29 | 87.8 | 11.7 | 0.5 | 0 | Yes | 1.15 | Yes | Yes |
| 1883 | 2.75 | 12.24 | 40.86 | 95.6 | 4.2 | 0.2 | 0 | Yes | 1.34 | Yes | Yes |
| 1884 | 2.46 | 12.48 | 97.50 | 97.13 | 2.8 | 0.07 | 0 | Yes | 1.25 | Yes | Yes |
| 1885 | 2.71 | 11.86 | 13.30 | 86.1 | 13.9 | 0 | 0 | Yes | 1.19 | Yes | Yes |
| 1886 | 2.36 | 11.71 | 43.62 | 82.6 | 14.6 | 1.6 | 1.2 | No | 1.18 | Yes | Yes |
| 1887 | 2.46 | 11.35 | 56.93 | 72.95 | 26.4 | 0.65 | 0 | Yes | 1.24 | Yes | Yes |
| 1888 | 1.45 | 12.02 | 36.59 | 83.23 | 16.5 | 0.27 | 0 | Yes | 1.11 | Yes | Yes |
| 1889 | 2.42 | 13.24 | 39.95 | 79.4 | 19.5 | 0.45 | 0.65 | Yes | 1.27 | Yes | Yes |
| 1890 | 2.11 | 9.46 | 86.50 | 97.08 | 1.6 | 0.33 | 0.99 | Yes | 1.31 | Yes | Yes |
| 1891 | 2.97 | 13.47 | 32.87 | 90.5 | 6 | 1 | 2.5 | Yes | 1.26 | Yes | Yes |
| 1892 | 2.36 | 9.46 | 16.23 | 88.93 | 8.4 | 0.87 | 1.8 | Yes | 1.14 | Yes | Yes |
| 1893 | 3.05 | 13.87 | 37.40 | 86.7 | 13.3 | 0 | 0 | Yes | 1.34 | Yes | Yes |
| 1894 | 2.57 | 13.25 | 40.76 | 81.4 | 18.6 | 0. | 0 | Yes | 1.16 | Yes | Yes |
| 1895 | 2.65 | 13.1 | 87.31 | 97.34 | 1.8 | 0.86 | 0 | No | 1.47 | Yes | Yes |
| 1896 | 2.12 | 9.08 | 92.50 | 95.25 | 4.1 | 0.65 | 0 | Yes | 1.48 | Yes | Yes |
| 1897 | 1.65 | 9.87 | 17.93 | 82.87 | 16.7 | 0.43 | 0 | No | 1.49 | Yes | Yes |
| 1898 | 2.35 | 9.46 | 44.50 | 99 | 0.4 | 0.6 | 0 | Yes | 1.34 | Yes | Yes |
| 1899 | 1.63 | 9.28 | 96.50 | 89.35 | 10.6 | 0.05 | 0 | Yes | 1.29 | Yes | Yes |
| 1900 | 2.64 | 9.45 | 16.94 | 93.08 | 6.9 | 0.02 | 0 | Yes | 1.18 | Yes | Yes |
| 1901 | 2.35 | 9.25 | 88.12 | 99.82 | 0.05 | 0.06 | 0.07 | Yes | 1.48 | Yes | Yes |

| Invention Example No | Number of faces | Coating details Ratio of fine metal grains in coat outermost surface layer 10% thickness to total fine metal grains (Mass %) | Total metal grain content of coat (Mass %) | Base resin type | Coat thickness (μm) | Coating method | Corrosion Test Results |
|---|---|---|---|---|---|---|---|
| 1882 | 2 | 77.9 | 85 | Alkyl silicate | 130 | Brush | E |
| 1883 | 6 | 43.7 | 53 | Alkyl silicate | 29 | Brush | E |
| 1884 | 7 | 7.8 | 88 | Epoxy resin | 30 | Brush | E |
| 1885 | 6 | 16.0 | 85 | Acrylic resin | 120 | Brush | E |
| 1886 | 7 | 89.6 | 52 | Urethane resin | 187 | Brush | E |
| 1887 | 6 | 11.8 | 83 | Polyester resin | 28 | Spray | E |
| 1888 | 2 | 4.6 | 88 | Epoxy resin | 5 | Spray | E |
| 1889 | 2 | 2.5 | 49 | Acrylic resin | 35 | Spray | E |
| 1890 | 6 | 18.9 | 50 | Urethane resin | 5 | Spray | G |
| 1891 | 7 | 75.9 | 51 | Polyester resin | 200 | Brush | E |
| 1892 | 6 | 55.9 | 83 | Alkali silicate | 25 | Spray | E |
| 1893 | 6 | 53.8 | 82 | Alkali silicate | 15 | Spray | E |
| 1894 | 2 | 97.5 | 88 | Alkyl silicate | 20 | Spray | E |
| 1895 | 7 | 88.4 | 85 | Alkali silicate | 18 | Spray | E |
| 1896 | 2 | 54.8 | 87 | Alkyl silicate | 22 | Spray | E |
| 1897 | 2 | 45.7 | 86 | Alkali silicate | 19 | Spray | E |
| 1898 | 6 | 34.7 | 46 | Alkyl silicate | 29 | Spray | E |
| 1899 | 7 | 57.9 | 49 | Alkali silicate | 23 | Spray | E |
| 1900 | 7 | 65.4 | 35 | Alkyl silicate | 21 | Spray | E |
| 1901 | 6 | 87.9 | 30 | Alkali silicate | 19 | Spray | E |

TABLE 98

| Invention Example No | Diameter distribution (Ave diameter) of Zn metal alloy grains (μm) | | Percent of fine-grain metal grains among Zn metal grains/Zn alloy grains (Vol %) | Chemical component content of Zn metal grains/Zn alloy grains (Mass %) | | | | Alloy grain fracture surfaces or cracks present? | Ave aspect ratio | Mg solid solution phase and Zn—Mg intermetallic compounds present on grain surfaces? |
|---|---|---|---|---|---|---|---|---|---|---|
| | Fine metal | Coarse metal | | Zn | Mg | Al | Si | | | |
| 1902 | 2.31 | 9.46 | 60.57 | 91.56 | 6.4 | 1.05 | 0.99 | Yes | 1.27 | Yes |
| 1903 | 2.62 | 9.46 | 39.48 | 93.36 | 3.5 | 2.6 | 0.54 | Yes | 1.17 | Yes |
| 1904 | 2.52 | 9.46 | 15.82 | 82.13 | 17.5 | 0.05 | 0.32 | Yes | 1.27 | Yes |
| 1905 | 2.24 | 13.32 | 49.57 | 91.2 | 3.6 | 5.2 | 0 | No | 1.27 | Yes |
| 1906 | 0.05 | 6.54 | 86.52 | 94.1 | 5.9 | 0 | 0.001 | Yes | 1.48 | Yes |
| 1907 | 2.42 | 6.35 | 90.98 | 83.2 | 16.2 | 0 | 0.6 | No | 1.49 | Yes |
| 1908 | 0.11 | 7.54 | 67.32 | 76.7 | 22.5 | 0 | 0.8 | Yes | 1.34 | Yes |
| 1909 | 1.92 | 8.64 | 82.33 | 96.52 | 3.4 | 0.04 | 0.04 | Yes | 1.23 | Yes |
| 1910 | 0.46 | 6.45 | 73.76 | 68.3 | 26.5 | 3 | 2.2 | Yes | 1.23 | Yes |
| 1911 | 0.77 | 6.48 | 88.77 | 72.84 | 25.5 | 0.06 | 1.6 | Yes | 1.23 | Yes |
| 1912 | 2.35 | 9.25 | 45.02 | 87.2 | 12.8 | 0 | 0 | Yes | 1.05 | Yes |
| 1913 | 2.33 | 9.46 | 15.2 | 91.5 | 8.5 | 0 | 0 | Yes | 1.06 | Yes |
| 1914 | 1.95 | 9.32 | 51.41 | 75.23 | 24.5 | 0.27 | 0 | Yes | 1.38 | Yes |
| 1915 | 2.15 | 9.22 | 45.46 | 77.48 | 18.4 | 2.55 | 1.57 | Yes | 1.06 | Yes |
| 1916 | 2.23 | 11.62 | 35.19 | 72.62 | 0.08 | 25.5 | 1.8 | Yes | 1.49 | Yes |
| 1917 | 2.26 | 11.15 | 73.02 | 64.06 | 15.2 | 19.4 | 1.34 | No | 1.34 | Yes |
| 1918 | 1.98 | 9.34 | 93.45 | 83 | 6.4 | 10.6 | 0 | Yes | 1.48 | Yes |
| 1919 | 2.02 | 9.58 | 30.66 | 86.4 | 3.2 | 10.4 | 0 | No | 1.49 | Yes |
| 1920 | 2.36 | 12.28 | 32.76 | 80.4 | 6.1 | 13.5 | 0.001 | Yes | 1.29 | Yes |
| 1921 | 3.05 | 12.52 | 30.89 | 70.1 | 16.8 | 12.5 | 0.6 | Yes | 1.23 | Yes |
| 1922 | 2.57 | 11.9 | 45.9 | 60.9 | 27.5 | 10.8 | 0.8 | Yes | 1.23 | Yes |

| Invention Example No | Any of MgZn2, Mg2Zn11, Mg2Zn3, MgZn, Mg7Zn3, present? | Number of faces | Coating details | | | | | |
|---|---|---|---|---|---|---|---|---|
| | | | Ratio of fine metal grains in coat outermost surface layer 10% thickness to total fine metal grains (Mass %) | Total metal grain content of coat (Mass %) | Base resin type | Coat thickness (μm) | Coating method | Corrosion Test Results |
| 1902 | Yes | 7 | 2.9 | 76 | Alkyl silicate | 15 | Spray | E |
| 1903 | Yes | 7 | 12.6 | 72 | Alkali silicate | 18 | Spray | E |
| 1904 | Yes | 6 | 53.8 | 30 | Alkyl silicate | 22 | Spray | E |
| 1905 | Yes | 7 | 17.8 | 83 | Alkyl silicate | 21 | Spray | E |
| 1906 | Yes | 2 | 34.7 | 75 | Alkyl silicate | 29 | Spray | E |
| 1907 | Yes | 7 | 76.8 | 76 | Alkali silicate | 23 | Spray | E |
| 1908 | Yes | 7 | 58.9 | 72 | Alkyl silicate | 21 | Spray | E |
| 1909 | Yes | 2 | 50.8 | 83 | Alkali silicate | 19 | spray | E |
| 1910 | Yes | 6 | 46.8 | 50 | Alkyl silicate | 21 | Spray | E |
| 1911 | Yes | 6 | 23.7 | 72 | Alkali silicate | 19 | Spray | E |
| 1912 | Yes | 2 | 87.9 | 50 | Acrylic resin | 654 | Spray | E |
| 1913 | Yes | 6 | 2.9 | 48 | Alkali silicate | 700 | Spray | E |
| 1914 | Yes | 7 | 12.6 | 75 | Alkyl silicate | 555 | Spray | E |
| 1915 | Yes | 7 | 53.8 | 55 | Alkyl silicate | 321 | Spray | E |
| 1916 | Yes | 6 | 17.8 | 38 | Alkyl silicate | 152 | Brush | E |
| 1917 | Yes | 7 | 34.7 | 48 | Urethane resin | 674 | Spray | E |
| 1918 | Yes | 7 | 76.8 | 76 | Polyester resin | 325 | Spray | E |
| 1919 | Yes | 6 | 58.9 | 72 | Alkyl silicate | 665 | Spray | E |
| 1920 | Yes | 7 | 50.8 | 75 | Alkyl silicate | 354 | Brush | E |
| 1921 | Yes | 6 | 46.8 | 76 | Alkyl silicate | 165 | Spray | E |
| 1922 | Yes | 7 | 23.7 | 72 | Urethane resin | 354 | Spray | E |

TABLE 99

| Invention Example No | Average diameter of later-added Zn metal grains (μm) | Diameter distribution (peak diameter) of Zn metal grains/Zn alloy grains (μm) Fine metal | Diameter distribution (peak diameter) of Zn metal grains/Zn alloy grains (μm) Coarse metal | Percent of fine-grain metal grains among Zn metal grains/Zn alloy grains (Vol %) | Chemical component content of Zn metal grains/Zn alloy grains (Mass %) Zn | Mg | Al | Si | Alloy grain fracture surfaces or cracks present? | Ave aspect ratio |
|---|---|---|---|---|---|---|---|---|---|---|
| 1923 | 23.5 | 2.65 | 9.56 | 5.66 | 100 | 0 | 0 | 0 | No | — |
| 1924 | 5.96 | 0.05 | 6.5 | 16.55 | 100 | 0 | 0 | 0 | No | — |
| 1925 | 10.64 | 4.6 | 65.5 | 21.55 | 100 | 0 | 0 | 0 | No | — |
| 1926 | 16.5 | 3.56 | 13.5 | 5.66 | 100 | 0 | 0 | 0 | No | — |
| 1927 | 7.95 | 4.55 | 16.7 | 33.66 | 100 | 0 | 0 | 0 | No | — |
| 1928 | 7.95 | 2.15 | 9.89 | 45.65 | 100 | 0 | 0 | 0 | No | — |
| 1929 | 9.64 | 3.22 | 10.55 | 49.88 | 100 | 0 | 0 | 0 | No | — |
| 1930 | 0.96 | 2.99 | 9.64 | 42.33 | 100 | 0 | 0 | 0 | No | — |
| 1931 | 5.26 | 3.65 | 11.22 | 65.44 | 100 | 0 | 0 | 0 | No | — |
| 1932 | 13.5 | 4.55 | 13.5 | 77.55 | 100 | 0 | 0 | 0 | No | — |
| 1933 | 13.5 | 3.57 | 22.5 | 96.55 | 100 | 0 | 0 | 0 | No | — |
| 1934 | 9.64 | 1.99 | 8.56 | 5.97 | 100 | 0 | 0 | 0 | No | — |
| 1935 | 16.5 | 2.12 | 9.46 | 87.77 | 100 | 0 | 0 | 0 | No | — |
| 1936 | 20.59 | 2.45 | 11.1 | 86.55 | 100 | 0 | 0 | 0 | No | — |
| 1937 | 0.96 | 1.85 | 8.92 | 15.67 | 100 | 0 | 0 | 0 | No | — |
| 1938 | 6.54 | 1.65 | 9.23 | 31.55 | 100 | 0 | 0 | 0 | No | — |
| 1939 | 5.26 | 2.45 | 9.05 | 26.76 | 100 | 0 | 0 | 0 | No | — |
| 1940 | 10.64 | 2.01 | 10.91 | 67.89 | 100 | 0 | 0 | 0 | No | — |
| 1941 | 9.64 | 1.99 | 11.12 | 56.89 | 100 | 0 | 0 | 0 | No | — |
| 1942 | 6.9 | 2.38 | 10.93 | 45.67 | 100 | 0 | 0 | 0 | No | — |
| 1943 | 10.5 | 2.49 | 9.34 | 34.67 | 100 | 0 | 0 | 0 | No | — |

| Invention Example No | Ratio of (Zn metal grains or Zn alloy grains):(Later-added Zn metal grains) Zn metal grains/Zn alloy grains | Ratio of (Zn metal grains or Zn alloy grains):(Later-added Zn metal grains) Later-added Zn metal grains | Mg content of all metal grains (Mass %) | Coating details Total metal grain content of coat (Mass %) | Coating details Base resin type | Coating details Coat thickness (μm) | Coating method | Corrosion Test Results |
|---|---|---|---|---|---|---|---|---|
| 1923 | 1 | 299.5 | — | 35 | Alkali silicate | 2 | Spray | G |
| 1924 | 1 | 12.5 | — | 66 | Alkyl silicate | 37 | Spray | E |
| 1925 | 1 | 3.5 | — | 38 | Alkali silicate | 12 | Spray | E |
| 1926 | 1 | 1.4 | — | 84 | Alkyl silicate | 160 | Brush | E |
| 1927 | 1 | 6.8 | — | 39 | Alkali silicate | 5 | Brush | G |
| 1928 | 1 | 136.5 | — | 85 | Alkyl silicate | 12 | Brush | E |
| 1929 | 1 | 14.5 | — | 36 | Alkali silicate | 2 | Spray | G |
| 1930 | 1 | 0.08 | — | 56 | Alkyl silicate | 18 | Spray | E |
| 1931 | 1 | 1.6 | — | 42 | Alkyl silicate | 23 | Spray | E |
| 1932 | 1 | 3.9 | — | 31 | Epoxy resin | 30 | Brush | E |
| 1933 | 1 | 10.5 | — | 88 | Acrylic resin | 77 | Brush | E |
| 1934 | 1 | 4.9 | — | 78 | Urethane resin | 254 | Brush | E |
| 1935 | 1 | 33.5 | — | 36 | Polyester resin | 47 | Spray | E |
| 1936 | 1 | 2.5 | — | 37 | Epoxy resin | 43 | Spray | E |
| 1937 | 1 | 1.9 | — | 45 | Acrylic resin | 322 | Brush | E |
| 1938 | 1 | 7.1 | — | 68 | Urethane resin | 20 | Brush | E |
| 1939 | 1 | 9.4 | — | 79 | Polyester resin | 700 | Brush | E |
| 1940 | 1 | 16.8 | — | 47 | Alkali silicate | 22 | Spray | E |
| 1941 | 1 | 75.5 | — | 56 | Alkyl silicate | 25 | Spray | E |
| 1942 | 1 | 4.5 | — | 37 | Alkali silicate | 14 | Spray | E |
| 1943 | 1 | 0.9 | — | 90 | Urethane resin | 112 | Spray | E |

TABLE 100

| Invention Example No | Average diameter of later-added Zn metal grains (μm) | Diameter distribution (peak diameter) of Zn metal grains/Zn alloy grains (μm) | | Percent of fine-grain metal grains among Zn metal grains/Zn alloy grains (Vol %) | Chemical component content of Zn metal grains/Zn alloy grains (Mass %) | | | | Alloy grain fracture surfaces or cracks present? | Ave aspect ratio |
|---|---|---|---|---|---|---|---|---|---|---|
| | | Fine metal | Coarse metal | | Zn | Mg | Al | Si | | |
| 1944 | 13.5 | 2.34 | 8.77 | 95.66 | 100 | 0 | 0 | 0 | No | — |
| 1945 | 20.59 | 3.99 | 27.6 | 34.21 | 100 | 0 | 0 | 0 | No | — |
| 1946 | 7.82 | 1.02 | 21.9 | 7.88 | 100 | 0 | 0 | 0 | No | — |
| 1947 | 5.26 | 0.05 | 22.5 | 92.32 | 100 | 0 | 0 | 0 | No | — |
| 1948 | 7.06 | 2.01 | 17.5 | 11.22 | 100 | 0 | 0 | 0 | No | — |
| 1949 | 0.64 | 1.51 | 6.99 | 55.66 | 100 | 0 | 0 | 0 | No | — |
| 1950 | 46.8 | 2.38 | 7.65 | 78.99 | 100 | 0 | 0 | 0 | No | — |
| 1951 | 9.64 | 1.99 | 8.56 | 5.97 | 100 | 0 | 0 | 0 | No | — |
| 1952 | 16.5 | 2.49 | 9.34 | 34.67 | 100 | 0 | 0 | 0 | No | — |
| 1953 | 20.59 | 1.02 | 21.9 | 7.88 | 100 | 0 | 0 | 0 | No | — |
| 1954 | 16.5 | 2.35 | 9.25 | 35.87 | 88.8 | 11.2 | 0 | 0 | Yes | 1.12 |
| 1955 | 13.5 | 2.57 | 9.56 | 42.04 | 90.6 | 9.4 | 0 | 0 | No | 1.38 |
| 1956 | 0.96 | 2.56 | 9.84 | 6.55 | 81.45 | 18.5 | 0 | 0.05 | Yes | 1.22 |
| 1957 | 0.96 | 2.21 | 9.75 | 43.60 | 99.97 | 0.03 | 0 | 0 | Yes | 1.14 |
| 1958 | 8.45 | 2.64 | 9.85 | 44.12 | 98.4 | 1.6 | 0 | 0 | No | 1.02 |
| 1959 | 2.9 | 1.99 | 8.56 | 37.21 | 93.2 | 6.8 | 0 | 0 | Yes | 1.05 |
| 1960 | 5.4 | 2.94 | 8.21 | 43.38 | 84.5 | 13.9 | 0 | 1.6 | No | 1.36 |
| 1961 | 10.6 | 2.58 | 8.33 | 13.52 | 98.1 | 1.9 | 0 | 0 | Yes | 1.11 |
| 1962 | 2.32 | 2.37 | 8 | 44.94 | 94.3 | 5.7 | 0 | 0 | No | 1.07 |
| 1963 | 7.8 | 2.15 | 9.22 | 45.46 | 90.8 | 9.2 | 0 | 0 | No | 1.42 |
| 1964 | 7.95 | 2.96 | 9.36 | 35.96 | 83.3 | 15.4 | 0 | 1.3 | Yes | 1.38 |

| Invention Example No | Ratio of (Zn metal grains or Zn alloy grains):(Later-added Zn metal grains) | | Mg content of all metal grains (Mass %) | Coating details | | | | |
|---|---|---|---|---|---|---|---|---|
| | Zn metal grains/Zn alloy grains | Later-added Zn metal grains | | Total metal grain content of coat (Mass %) | Base resin type | Coat thickness (μm) | Coating method | Corrosion Test Results |
| 1944 | 1 | 3.2 | — | 43 | Alkali silicate | 554 | Spray | E |
| 1945 | 1 | 5.2 | — | 38 | Urethane resin | 150 | Spray | E |
| 1946 | 1 | 1.6 | — | 56 | Alkali silicate | 18 | Spray | E |
| 1947 | 1 | 85.5 | — | 89 | Alkyl silicate | 657 | Brush | E |
| 1948 | 1 | 52.2 | — | 32 | Alkyl silicate | 24 | Spray | E |
| 1949 | 1 | 3.6 | — | 55 | Urethane resin | 99 | Spray | E |
| 1950 | 1 | 1.7 | — | 79 | Alkyl silicate | 7 | Spray | E |
| 1951 | 1 | 4.9 | — | 78 | Epoxy resin | 100 | Spray | E |
| 1952 | 1 | 33.5 | — | 77 | Alkyl silicate | 27 | Brush | E |
| 1953 | 1 | 2.5 | — | 56 | Alkali silicate | 15 | Spray | E |
| 1954 | 1 | 5 | 1.867 | 49 | Alkyl silicate | 14 | Spray | E |
| 1955 | 1 | 198.7 | 0.047 | 89 | Urethane resin | 55 | Spray | E |
| 1956 | 1 | 36 | 0.500 | 90 | Alkyl silicate | 8 | Spray | E |
| 1957 | 1 | 1.5 | 0.012 | 86 | Urethane resin | 122 | Brush | E |
| 1958 | 1 | 0.008 | 1.587 | 48 | Alkyl silicate | 555 | Spray | E |
| 1959 | 1 | 1.4 | 2.833 | 47 | Alkali silicate | 19 | Spray | E |
| 1960 | 1 | 4.2 | 2.673 | 47 | Alkyl silicate | 25 | Brush | E |
| 1961 | 1 | 1.6 | 0.731 | 47 | Alkyl silicate | 58 | Spray | E |
| 1962 | 1 | 7.5 | 0.671 | 52 | Alkyl silicate | 685 | Spray | E |
| 1963 | 1 | 1.6 | 3.538 | 52 | Alkali silicate | 19 | Brush | E |
| 1964 | 1 | 2 | 5.133 | 52 | Urethane resin | 700 | Spray | E |

TABLE 101

| Invention Example No | Average diameter of later-added Zn metal grains (μm) | Diameter distribution (peak diameter) of Zn metal grains/Zn alloy grains (μm) Fine metal | Diameter distribution (peak diameter) of Zn metal grains/Zn alloy grains (μm) Coarse metal | Percent of fine-grain metal grains among Zn metal grains/Zn alloy grains (Vol %) | Chemical component content of Zn metal grains/Zn alloy grains (Mass %) Zn | Mg | Al | Si | Alloy grain fracture surfaces or cracks present? | Ave aspect ratio | Ratio Zn metal grains/Zn alloy grains | Ratio Later-added Zn metal grains | Mg content of all metal grains (Mass %) | Total metal grain content of coat (Mass %) | Base resin type | Coat thickness (μm) | Coating method | Corrosion Test Results |
|---|---|---|---|---|---|---|---|---|---|---|---|---|---|---|---|---|---|---|
| 1965 | 20.59 | 2.85 | 9.45 | 42.13 | 79.84 | 18.6 | 0 | 1.56 | Yes | 1.22 | 1 | 270 | 0.069 | 88 | Alkyl silicate | 77 | Spray | E |
| 1966 | 22.5 | 2.94 | 9.61 | 7.56 | 96.4 | 3.6 | 0 | 0 | Yes | 1.14 | 1 | 7.5 | 0.424 | 87 | Alkyl silicate | 54 | Spray | E |
| 1967 | 4.6 | 2.11 | 9.85 | 43.69 | 94.6 | 5.4 | 0 | 0 | Yes | 1.13 | 1 | 2.9 | 1.385 | 89 | Alkyl silicate | 64 | Spray | E |
| 1968 | 4.9 | 2.68 | 9.23 | 44.21 | 92.4 | 7.6 | 0 | 0 | Yes | 1.02 | 1 | 2.6 | 2.111 | 90 | Alkyl silicate | 34 | Brush | E |
| 1969 | 10.5 | 2.99 | 9.08 | 39.51 | 75.5 | 24.5 | 0 | 0 | Yes | 1.06 | 1 | 0.1 | 22.273 | 91 | Alkali silicate | 28 | Spray | E |
| 1970 | 8.45 | 2.78 | 9.87 | 45.68 | 82.4 | 17.6 | 0 | 0 | Yes | 1.05 | 1 | 1.2 | 8.000 | 46 | Urethane resin | 109 | Brush | E |
| 1971 | 30.5 | 2.96 | 9.46 | 65.58 | 98.6 | 1.4 | 0 | 0 | Yes | 1.24 | 1 | 1.2 | 0.636 | 47 | Alkyl silicate | 15 | Spray | E |
| 1972 | 49.5 | 2.85 | 9.28 | 47.24 | 78.5 | 21.5 | 0 | 0 | Yes | 1.33 | 1 | 62 | 0.341 | 47 | Alkyl silicate | 14 | Spray | E |
| 1973 | 5.9 | 2.64 | 9.45 | 47.76 | 89.6 | 10.4 | 0 | 0 | Yes | 1.27 | 1 | 2.4 | 3.059 | 49 | Alkyl silicate | 18 | Spray | E |
| 1974 | 4.52 | 2.35 | 9.25 | 45.02 | 87.2 | 12.8 | 0 | 0 | Yes | 1.05 | 1 | 2.1 | 4.129 | 50 | Alkali silicate | 2 | Spray | G |
| 1975 | 5.96 | 2.12 | 9.46 | 47.02 | 92.2 | 7.8 | 0 | 0 | Yes | 1.22 | 1 | 34.5 | 0.220 | 87 | Alkyl silicate | 37 | Spray | E |
| 1976 | 5.5 | 2.34 | 9.46 | 7.66 | 70.5 | 29.5 | 0 | 0 | Yes | 1.13 | 1 | 270 | 0.109 | 83 | Alkali silicate | 12 | Spray | E |
| 1977 | 3.6 | 2.33 | 9.46 | 15.20 | 91.5 | 8.5 | 0 | 0 | Yes | 1.06 | 1 | 32.5 | 0.254 | 48 | Alkyl silicate | 160 | Brush | E |
| 1978 | 16.5 | 2.23 | 9.06 | 43.16 | 74.5 | 25.5 | 0 | 0 | Yes | 1.05 | 1 | 3 | 6.375 | 51 | Alkali silicate | 5 | Brush | G |
| 1979 | 12.5 | 2.12 | 9.3 | 49.33 | 99.93 | 0.07 | 0 | 0 | Yes | 1.24 | 1 | 1.5 | 0.028 | 51 | Alkyl silicate | 56 | Brush | E |
| 1980 | 16.5 | 2.21 | 8.68 | 19.47 | 89.2 | 10.8 | 0 | 0 | No | 1.05 | 1 | 7.5 | 1.271 | 87 | Alkali silicate | 2 | Spray | G |
| 1981 | 10.9 | 1.38 | 8.53 | 69.55 | 86 | 11.2 | 1.6 | 1.2 | No | 1.12 | 1 | 13.5 | 0.772 | 85 | Alkyl silicate | 18 | Spray | E |
| 1982 | 5.6 | 1.95 | 9.32 | 51.41 | 75.23 | 24.5 | 0.27 | 0 | Yes | 1.38 | 1 | 5 | 4.083 | 86 | Alkyl silicate | 23 | Spray | E |
| 1983 | 22.6 | 2.26 | 8.95 | 75.88 | 82.6 | 17.4 | 0 | 0 | Yes | 1.13 | 1 | 5 | 2.900 | 50 | Epoxy resin | 30 | Brush | E |
| 1984 | 20.59 | 2.05 | 12.54 | 48.08 | 98.7 | 1.3 | 0 | 0 | Yes | 1.33 | 1 | 1 | 0.650 | 51 | Acrylic resin | 77 | Brush | E |
| 1985 | 20.59 | 1.65 | 8.7 | 66.85 | 80.5 | 19.5 | 0 | 0 | Yes | 1.27 | 1 | 120 | 0.161 | 51 | Urethane resin | 655 | Brush | E |

TABLE 102

| Invention Example No | Average diameter of later-added Zn metal grains (μm) | Diameter distribution (peak diameter) of Zn metal grains/Zn alloy grains (μm) Fine metal | Diameter distribution (peak diameter) of Zn metal grains/Zn alloy grains (μm) Coarse metal | Percent of fine-grain metal grains among Zn metal grains/Zn alloy grains (Vol %) | Chemical component content of Zn metal grains/Zn alloy grains (Mass %) Zn | Chemical component content of Zn metal grains/Zn alloy grains (Mass %) Mg | Chemical component content of Zn metal grains/Zn alloy grains (Mass %) Al | Chemical component content of Zn metal grains/Zn alloy grains (Mass %) Si | Alloy grain fracture surfaces or cracks present? | Ave aspect ratio |
|---|---|---|---|---|---|---|---|---|---|---|
| 1986 | 9.56 | 2.35 | 8.55 | 7.68 | 88.85 | 10.8 | 0.05 | 0.3 | No | 1.23 |
| 1987 | 5.9 | 1.62 | 8.91 | 8.64 | 87.7 | 11.9 | 0.4 | 0 | Yes | 1.11 |
| 1988 | 6.54 | 1.88 | 9.91 | 16.58 | 90.5 | 9.5 | 0 | 0 | Yes | 1.42 |
| 1989 | 21.4 | 2.35 | 9.25 | 35.87 | 89.5 | 10.5 | 0 | 0 | Yes | 1.06 |
| 1990 | 9.8 | 2.57 | 9.56 | 42.04 | 84.9 | 15.1 | 0 | 0 | Yes | 1.05 |
| 1991 | 6.59 | 2.56 | 9.84 | 38.41 | 83.2 | 16.8 | 0 | 0 | Yes | 1.07 |
| 1992 | 6.54 | 2.21 | 9.75 | 6.99 | 89.4 | 10.6 | 0 | 0 | Yes | 1.42 |
| 1993 | 16.5 | 2.64 | 9.85 | 44.12 | 84.3 | 13.3 | 2.4 | 0 | Yes | 1.38 |
| 1994 | 7.8 | 2.65 | 8.56 | 66.99 | 98.6 | 1.4 | 0 | 0 | No | 1.22 |
| 1995 | 16.5 | 2.94 | 8.21 | 43.38 | 76.45 | 23.5 | 0 | 0.05 | Yes | 1.14 |
| 1996 | 6.54 | 2.58 | 8.33 | 39.75 | 91.1 | 8.9 | 0 | 0 | Yes | 1.13 |
| 1997 | 8.45 | 2.37 | 8 | 65.38 | 85.1 | 14.9 | 0 | 0 | Yes | 1.02 |
| 1998 | 8.5 | 2.15 | 9.22 | 45.46 | 77.48 | 18.4 | 2.55 | 1.57 | Yes | 1.06 |
| 1999 | 13.6 | 2.96 | 9.36 | 22.55 | 97.9 | 2.1 | 0 | 0 | Yes | 1.05 |
| 2000 | 12.33 | 2.85 | 9.45 | 42.13 | 94.8 | 5.2 | 0 | 0 | Yes | 1.24 |
| 2001 | 16.5 | 2.94 | 9.61 | 38.50 | 84.6 | 15.4 | 0 | 0 | Yes | 1.33 |
| 2002 | 7.9 | 2.11 | 9.85 | 64.13 | 89.3 | 10.7 | 0 | 0 | Yes | 1.27 |
| 2003 | 10.5 | 2.68 | 9.23 | 44.21 | 83.3 | 16.7 | 0 | 0 | Yes | 1.05 |
| 2004 | 16.5 | 2.99 | 9.08 | 39.51 | 80.05 | 19.6 | 0.35 | 0 | No | 1.12 |
| 2005 | 10.64 | 1.82 | 9.87 | 78.64 | 85.5 | 14.5 | 0 | 0 | No | 1.23 |
| 2006 | 10.5 | 1.42 | 9.46 | 42.05 | 85 | 14.2 | 0 | 0.8 | No | 1.36 |

| Invention Example No | Ratio of (Zn metal grains or Zn alloy grains):(Later-added Zn metal grains) Zn metal grains/Zn alloy grains | Ratio of (Zn metal grains or Zn alloy grains):(Later-added Zn metal grains) Later-added Zn metal grains | Mg content of all metal grains (Mass %) | Total metal grain content of coat (Mass %) | Coating details Base resin type | Coating details Coat thickness (μm) | Coating details Coating method | Corrosion Test Results |
|---|---|---|---|---|---|---|---|---|
| 1986 | 1 | 3.7 | 2.298 | 80 | Polyester resin | 47 | Spray | E |
| 1987 | 1 | 6.1 | 1.676 | 46 | Epoxy resin | 43 | Spray | E |
| 1988 | 1 | 198.5 | 0.048 | 51 | Acrylic resin | 52 | Brush | E |
| 1989 | 1 | 2.5 | 3.000 | 86 | Urethane resin | 20 | Brush | E |
| 1990 | 1 | 18.5 | 0.774 | 85 | Polyester resin | 200 | Brush | E |
| 1991 | 1 | 8 | 1.867 | 82 | Alkali silicate | 22 | Spray | E |
| 1992 | 1 | 1.6 | 4.077 | 81 | Alkyl silicate | 25 | Spray | E |
| 1993 | 1 | 1.2 | 6.045 | 46 | Alkali silicate | 14 | Spray | E |
| 1994 | 1 | 0.5 | 0.933 | 47 | Urethane resin | 112 | Spray | E |
| 1995 | 1 | 9 | 2.350 | 48 | Alkali silicate | 24 | Spray | E |
| 1996 | 1 | 4.5 | 1.618 | 51 | Urethane resin | 150 | Spray | E |
| 1997 | 1 | 136 | 0.109 | 53 | Alkali silicate | 18 | Spray | E |
| 1998 | 1 | 13 | 1.314 | 88 | Alkyl silicate | 19 | Brush | E |
| 1999 | 1 | 10.6 | 0.181 | 85 | Alkyl silicate | 24 | Spray | E |
| 2000 | 1 | 1.6 | 2.000 | 83 | Urethane resin | 99 | Spray | E |
| 2001 | 1 | 68 | 0.223 | 82 | Alkyl silicate | 7 | Spray | E |
| 2002 | 1 | 4.5 | 1.945 | 83 | Epoxy resin | 100 | Spray | E |
| 2003 | 1 | 10.5 | 1.452 | 47 | Alkyl silicate | 27 | Brush | E |
| 2004 | 1 | 4.9 | 3.322 | 51 | Alkali silicate | 15 | Spray | E |
| 2005 | 1 | 10.5 | 1.261 | 52 | Alkyl silicate | 14 | Spray | E |
| 2006 | 1 | 192 | 0.074 | 51 | Urethane resin | 55 | Spray | E |

TABLE 103

| Invention Example No | Average diameter of later-added Zn metal grains (μm) | Diameter distribution (peak diameter) of Zn metal grains/Zn alloy grains (μm) | | Percent of fine-grain metal grains among Zn metal grains/Zn alloy grains (Vol %) | Chemical component content of Zn metal grains/Zn alloy grains (Mass %) | | | | Alloy grain fracture surfaces or cracks present? | Ave aspect ratio |
|---|---|---|---|---|---|---|---|---|---|---|
| | | Fine metal | Coarse metal | | Zn | Mg | Al | Si | | |
| 2007 | 20.59 | 2.12 | 9.28 | 64.58 | 87.3 | 12.7 | 0 | 0 | No | 1.11 |
| 2008 | 8.5 | 1.92 | 9.45 | 47.76 | 89.5 | 10.5 | 0 | 0 | Yes | 1.07 |
| 2009 | 0.5 | 2.11 | 9.63 | 24.10 | 87.3 | 11.8 | 0 | 0.9 | Yes | 1.42 |
| 2010 | 10.5 | 2.97 | 9.16 | 39.11 | 86.4 | 12.8 | 0.5 | 0.3 | Yes | 1.38 |
| 2011 | 11.5 | 2.36 | 10.39 | 19.65 | 93.8 | 6.2 | 0 | 0 | Yes | 1.22 |
| 2012 | 36.5 | 3.05 | 10.56 | 65.39 | 83.8 | 16.2 | 0 | 0 | Yes | 1.14 |
| 2013 | 1.5 | 2.15 | 10.74 | 48.57 | 80.4 | 19.6 | 0 | 0 | Yes | 1.13 |
| 2014 | 8.7 | 2.19 | 10.27 | 24.91 | 87.6 | 12.4 | 0 | 0 | Yes | 1.02 |
| 2015 | 7.8 | 2.48 | 11.5 | 39.92 | 89.3 | 10.7 | 0 | 0 | Yes | 1.06 |
| 2016 | 5.96 | 2.85 | 11.67 | 22.65 | 91.5 | 8.5 | 0 | 0 | Yes | 1.05 |
| 2017 | 0.06 | 2.75 | 11.85 | 66.20 | 94.9 | 5.1 | 0 | 0 | Yes | 1.24 |
| 2018 | 0.9 | 2.46 | 11.38 | 49.38 | 75.5 | 24.5 | 0 | 0 | Yes | 1.33 |
| 2019 | 3.6 | 2.71 | 12.61 | 30.58 | 86.5 | 13.5 | 0 | 0 | Yes | 1.27 |
| 2020 | 10.5 | 2.36 | 12.78 | 45.59 | 80 | 20 | 0 | 0 | Yes | 1.05 |
| 2021 | 0.05 | 2.16 | 9.57 | 28.32 | 84.5 | 15.5 | 0 | 0 | Yes | 1.12 |
| 2022 | 2.32 | 2.46 | 9.81 | 71.87 | 88 | 10.5 | 1.5 | 0 | Yes | 1.23 |
| 2023 | 20.4 | 2.49 | 8.43 | 53.05 | 92.1 | 7.9 | 0 | 0 | Yes | 1.36 |
| 2024 | 7.34 | 2.95 | 8.55 | 27.74 | 95.2 | 4.8 | 0 | 0 | Yes | 1.11 |
| 2025 | 9.4 | 2.36 | 8.22 | 42.75 | 81.6 | 18.4 | 0 | 0 | Yes | 1.07 |
| 2026 | 23.43 | 2.21 | 9.44 | 23.29 | 86.8 | 12.7 | 0 | 0.5 | Yes | 1.42 |
| 2027 | 5.96 | 2.25 | 9.58 | 61.12 | 89.7 | 10.3 | 0 | 0 | No | 1.38 |

| Invention Example No | Ratio of (Zn metal grains or Zn alloy grains):(Later-added Zn metal grains) | | Mg content of all metal grains (Mass %) | Coating details | | | | Corrosion Test Results |
|---|---|---|---|---|---|---|---|---|
| | Zn metal grains/ Zn alloy grains | Later-added Zn metal grains | | Total metal grain content of coat (Mass %) | Base resin type | Coat thickness (μm) | Coating method | |
| 2007 | 1 | 0.07 | 11.869 | 52 | Alkyl silicate | 8 | Spray | E |
| 2008 | 1 | 9.5 | 1.000 | 89 | Urethane resin | 122 | Brush | E |
| 2009 | 1 | 2.6 | 3.278 | 85 | Alkyl silicate | 54 | Spray | E |
| 2010 | 1 | 4.5 | 2.327 | 82 | Alkali silicate | 19 | Spray | E |
| 2011 | 1 | 3 | 1.550 | 87 | Alkyl silicate | 25 | Brush | E |
| 2012 | 1 | 7.5 | 1.908 | 88 | Alkyl silicate | 58 | Spray | E |
| 2013 | 1 | 77 | 0.251 | 49 | Alkyl silicate | 21 | Spray | E |
| 2014 | 1 | 10.5 | 1.078 | 50 | Alkali silicate | 19 | Brush | E |
| 2015 | 1 | 15.5 | 0.648 | 51 | Urethane resin | 56 | Spray | E |
| 2016 | 1 | 5.8 | 1.250 | 52 | Alkyl silicate | 77 | Spray | E |
| 2017 | 1 | 1.9 | 1.759 | 53 | Alkyl silicate | 12 | Spray | E |
| 2018 | 1 | 16.9 | 1.369 | 88 | Alkyl silicate | 64 | Spray | E |
| 2019 | 1 | 1.5 | 5.400 | 85 | Alkyl silicate | 34 | Brush | E |
| 2020 | 1 | 0.05 | 19.048 | 83 | Alkali silicate | 28 | Spray | E |
| 2021 | 1 | 215 | 0.072 | 81 | Urethane resin | 109 | Brush | E |
| 2022 | 1 | 4.2 | 2.019 | 80 | Alkyl silicate | 15 | Spray | E |
| 2023 | 1 | 1.5 | 3.160 | 47 | Alkyl silicate | 14 | Spray | E |
| 2024 | 1 | 4.8 | 0.828 | 49 | Alkyl silicate | 18 | Spray | E |
| 2025 | 1 | 0.5 | 12.267 | 50 | Urethane resin | 122 | Brush | E |
| 2026 | 1 | 2.3 | 3.848 | 51 | Alkyl silicate | 54 | Spray | E |
| 2027 | 1 | 0.05 | 9.810 | 52 | Alkali silicate | 19 | Spray | E |

TABLE 104

| Invention Example No | Average diameter of later-added Zn metal grains (μm) | Diameter distribution (peak diameter) of Zn metal grains/Zn alloy grains (μm) Fine metal | Diameter distribution (peak diameter) of Zn metal grains/Zn alloy grains (μm) Coarse metal | Percent of fine-grain metal grains among Zn metal grains/Zn alloy grains (Vol %) | Chemical component content of Zn metal grains/Zn alloy grains (Mass %) Zn | Mg | Al | Si | Alloy grain fracture surfaces or cracks present? | Ave aspect ratio |
|---|---|---|---|---|---|---|---|---|---|---|
| 2028 | 10.64 | 2.44 | 9.67 | 44.30 | 71.2 | 20.8 | 8 | 0 | Yes | 1.22 |
| 2029 | 16.5 | 2.78 | 9.83 | 23.96 | 97.5 | 2.5 | 0 | 0 | No | 1.14 |
| 2030 | 7.95 | 2.15 | 10.07 | 44.09 | 84.8 | 15.2 | 0 | 0 | Yes | 1.13 |
| 2031 | 7.95 | 2.19 | 9.45 | 24.63 | 80.8 | 19.2 | 0 | 0 | No | 1.02 |
| 2032 | 9.64 | 2.48 | 9.3 | 62.46 | 78.7 | 13.5 | 7.8 | 0 | Yes | 1.06 |
| 2033 | 0.96 | 2.59 | 9.99 | 45.64 | 88.1 | 11.9 | 0 | 0 | No | 1.05 |
| 2034 | 5.26 | 2.47 | 9.58 | 25.30 | 88.5 | 10.6 | 0 | 0.9 | Yes | 1.24 |
| 2035 | 13.5 | 2.69 | 9.4 | 42.84 | 84.6 | 15.4 | 0 | 0 | Yes | 1.33 |
| 2036 | 13.5 | 2.57 | 9.57 | 25.44 | 97.4 | 2.6 | 0 | 0 | Yes | 1.27 |
| 2037 | 9.64 | 2.49 | 9.54 | 63.27 | 83.3 | 16.7 | 0 | 0 | Yes | 1.37 |
| 2038 | 16.5 | 2.68 | 9.58 | 46.45 | 91.9 | 8.1 | 0 | 0 | Yes | 1.10 |
| 2039 | 20.59 | 2.35 | 9.25 | 46.45 | 86.3 | 13.7 | 0 | 0 | Yes | 1.04 |
| 2040 | 0.96 | 2.48 | 10.04 | 50.91 | 81.5 | 18.5 | 0 | 0 | Yes | 1.02 |
| 2041 | 6.54 | 2.13 | 11.27 | 27.25 | 97.6 | 2.4 | 0 | 0 | Yes | 1.01 |
| 2042 | 5.26 | 1.93 | 11.44 | 42.26 | 89.1 | 10.9 | 0 | 0 | Yes | 1.08 |
| 2043 | 10.64 | 2.05 | 8.9 | 33.69 | 92.8 | 7.2 | 0 | 0 | Yes | 1.14 |
| 2044 | 9.64 | 1.42 | 8.75 | 48.70 | 81.96 | 17.5 | 0.5 | 0.04 | No | 1.23 |
| 2045 | 6.9 | 1.46 | 9.44 | 29.24 | 85.4 | 14.6 | 0 | 0 | No | 1.33 |
| 2046 | 10.5 | 1.75 | 9.03 | 67.07 | 90.6 | 9.4 | 0 | 0 | Yes | 1.37 |
| 2047 | 13.5 | 1.86 | 8.85 | 50.25 | 92.9 | 7.1 | 0 | 0 | Yes | 1.44 |
| 2048 | 20.59 | 1.74 | 8.95 | 29.91 | 77.5 | 22.5 | 0 | 0 | Yes | 1.21 |

| Invention Example No | Ratio of (Zn metal grains or Zn alloy grains):(Later-added Zn metal grains) Zn metal grains/Zn alloy grains | Ratio of (Zn metal grains or Zn alloy grains):(Later-added Zn metal grains) Later-added Zn metal grains | Mg content of all metal grains (Mass %) | Coating details Total metal grain content of coat (Mass %) | Coating details Base resin type | Coating details Coat thickness (μm) | Coating details Coating method | Corrosion Test Results |
|---|---|---|---|---|---|---|---|---|
| 2028 | 1 | 120 | 0.172 | 83 | Alkyl silicate | 25 | Brush | E |
| 2029 | 1 | 3.7 | 0.532 | 88 | Alkyl silicate | 58 | Spray | E |
| 2030 | 1 | 16.5 | 0.869 | 85 | Alkyl silicate | 21 | Spray | E |
| 2031 | 1 | 24 | 0.768 | 83 | Alkali silicate | 19 | Brush | E |
| 2032 | 1 | 0.01 | 13.366 | 82 | Urethane resin | 56 | Spray | E |
| 2033 | 1 | 7.8 | 1.352 | 47 | Alkyl silicate | 77 | Spray | E |
| 2034 | 1 | 1.6 | 4.077 | 46 | Alkyl silicate | 54 | Spray | E |
| 2035 | 1 | 3.2 | 3.667 | 49 | Alkali silicate | 2 | Spray | G |
| 2036 | 1 | 5.4 | 0.406 | 50 | Alkali silicate | 20 | Spray | E |
| 2037 | 1 | 220 | 0.076 | 51 | Alkali silicate | 5 | Spray | G |
| 2038 | 1 | 2.2 | 2.531 | 83 | Alkyl silicate | 20 | Spray | E |
| 2039 | 1 | 2.8 | 3.605 | 82 | Alkali silicate | 15 | Brush | E |
| 2040 | 1 | 12 | 1.423 | 88 | Alkyl silicate | 57 | Brush | E |
| 2041 | 1 | 10.6 | 0.207 | 85 | Alkali silicate | 13 | Brush | E |
| 2042 | 1 | 35 | 0.303 | 86 | Alkyl silicate | 22 | Brush | E |
| 2043 | 1 | 125.5 | 0.057 | 47 | Alkali silicate | 20 | Spray | E |
| 2044 | 1 | 6 | 2.500 | 48 | Alkyl silicate | 27 | Spray | E |
| 2045 | 1 | 34 | 0.417 | 50 | Alkali silicate | 15 | Spray | E |
| 2046 | 1 | 1.6 | 3.615 | 51 | Alkyl silicate | 35 | Spray | E |
| 2047 | 1 | 7.5 | 0.835 | 52 | Alkali silicate | 34 | Brush | E |
| 2048 | 1 | 200 | 0.112 | 88 | Alkyl silicate | 45 | Brush | E |

TABLE 105

| Invention Example No | Average diameter of later-added Zn metal grains (μm) | Diameter distribution (peak diameter) of Zn metal grains/Zn alloy grains (μm) Fine metal | Diameter distribution (peak diameter) of Zn metal grains/Zn alloy grains (μm) Coarse metal | Percent of fine-grain metal grains among Zn metal grains/Zn alloy grains (Vol %) | Chemical component content of Zn metal grains/Zn alloy grains (Mass %) Zn | Mg | Al | Si | Alloy grain fracture surfaces or cracks present? | Ave aspect ratio | Ratio of (Zn metal grains or Zn alloy grains):(Later-added Zn metal grains) Zn metal grains/Zn alloy grains | Ratio Later-added Zn metal grains | Mg content of all metal grains (Mass %) | Total metal grain content of coat (Mass %) | Base resin type | Coat thickness (μm) | Coating method | Corrosion Test Results |
|---|---|---|---|---|---|---|---|---|---|---|---|---|---|---|---|---|---|---|
| 2049 | 7.82 | 1.96 | 12.54 | 87.50 | 84.8 | 13.7 | 1.5 | 0 | No | 1.22 | 1 | 7.5 | 1.612 | 89 | Alkali silicate | 52 | Brush | E |
| 2050 | 5.26 | 1.65 | 8.7 | 30.58 | 87.1 | 12.9 | 0 | 0 | No | 1.23 | 1 | 3.2 | 3.071 | 86 | Alkyl silicate | 23 | Brush | E |
| 2051 | 7.06 | 2.35 | 8.55 | 68.41 | 95.7 | 4.3 | 0 | 0 | Yes | 1.47 | 1 | 2.6 | 1.194 | 87 | Alkali silicate | 5 | Spray | E |
| 2052 | 0.64 | 1.62 | 10.72 | 54.59 | 80.2 | 17.6 | 1 | 1.2 | No | 1.01 | 1 | 3 | 4.400 | 86 | Alkyl silicate | 52 | Brush | E |
| 2053 | 46.8 | 2.25 | 9.9 | 34.25 | 98.8 | 0.6 | 0.6 | 0 | Yes | 1.04 | 1 | 15.2 | 0.037 | 46 | Alkali silicate | 150 | Brush | E |
| 2054 | 16.5 | 2.36 | 9.57 | 37.61 | 86.9 | 10.3 | 1.6 | 1.2 | Yes | 1.05 | 1 | 0.09 | 9.450 | 49 | Alkyl silicate | 60 | Brush | E |
| 2055 | 13.5 | 2.24 | 10.79 | 45.60 | 92.98 | 7 | 0.02 | 0 | Yes | 1.12 | 1 | 13.5 | 0.483 | 35 | Alkali silicate | 15 | Spray | E |
| 2056 | 0.96 | 2.46 | 10.93 | 46.70 | 75.5 | 23.5 | 1 | 0 | Yes | 1.11 | 1 | 135.4 | 0.172 | 37 | Alkyl silicate | 24 | Spray | E |
| 2057 | 0.96 | 1.56 | 11.02 | 41.22 | 82.5 | 17.5 | 0 | 0 | No | 1.08 | 1 | 3 | 4.375 | 36 | Alkali silicate | 34 | Spray | E |
| 2058 | 8.45 | 1.24 | 11.18 | 45.68 | 80.1 | 12.4 | 7.5 | 0 | Yes | 1.47 | 1 | 7.8 | 1.409 | 38 | Alkyl silicate | 20 | Brush | E |
| 2059 | 2.9 | 1.68 | 11.42 | 22.02 | 85.09 | 14.9 | 0 | 0.01 | Yes | 1.50 | 1 | 10.2 | 1.330 | 48 | Alkali silicate | 200 | Brush | E |
| 2060 | 5.4 | 2.65 | 10.8 | 37.03 | 78.7 | 20.7 | 0 | 0.6 | No | 1.13 | 1 | 7 | 2.588 | 46 | Alkyl silicate | 56 | Brush | E |
| 2061 | 10.6 | 2.22 | 10.65 | 28.46 | 91.29 | 8.6 | 0 | 0.11 | Yes | 1.26 | 1 | 225.2 | 0.038 | 51 | Alkali silicate | 34 | Spray | E |
| 2062 | 2.32 | 2.45 | 11.34 | 43.47 | 85.8 | 14.2 | 0 | 0 | Yes | 1.14 | 1 | 5.4 | 2.219 | 46 | Alkyl silicate | 2 | Spray | G |
| 2063 | 7.8 | 2.23 | 11.62 | 35.19 | 98.12 | 0.08 | 0 | 1.8 | Yes | 1.49 | 1 | 3.2 | 0.019 | 38 | Alkali silicate | 15 | Spray | E |
| 2064 | 7.95 | 2.26 | 11.15 | 73.02 | 83.46 | 15.2 | 0 | 1.34 | No | 1.34 | 1 | 13.5 | 1.048 | 48 | Alkyl silicate | 10 | Spray | E |
| 2065 | 20.59 | 2.72 | 12.38 | 56.20 | 73.17 | 17.4 | 9 | 0.43 | Yes | 1.18 | 1 | 1.6 | 6.692 | 52 | Alkyl silicate | 125 | Brush | E |
| 2066 | 22.5 | 2.13 | 12.55 | 35.86 | 98.6 | 0.8 | 0.6 | 0 | Yes | 1.17 | 1 | 1.5 | 0.320 | 30 | Alkali silicate | 24 | Brush | E |
| 2067 | 4.6 | 1.98 | 9.34 | 93.45 | 93.55 | 6.4 | 0.05 | 0 | Yes | 1.48 | 1 | 2.5 | 1.829 | 76 | Alkyl silicate | 110 | Brush | E |
| 2068 | 4.9 | 2.02 | 9.58 | 30.66 | 96.78 | 3.2 | 0.02 | 0 | No | 1.49 | 1 | 2.6 | 0.889 | 72 | Alkali silicate | 24 | Brush | E |
| 2069 | 10.5 | 2.21 | 9.88 | 74.21 | 83 | 9.2 | 7.8 | 0 | Yes | 1.27 | 1 | 126 | 0.072 | 81 | Alkyl silicate | 2 | Spray | G |

TABLE 106

| Invention Example No | Average diameter of later-added Zn metal grains (μm) | Diameter distribution (peak diameter) of Zn metal grains/Zn alloy grains (μm) | | Percent of fine-grain metal grains among Zn metal grains/ Zn alloy grains (Vol %) | Chemical component content of Zn metal grains/Zn alloy grains (Mass %) | | | | Alloy grain fracture surfaces or cracks present? | Ave aspect ratio |
|---|---|---|---|---|---|---|---|---|---|---|
| | | Fine metal | Coarse metal | | Zn | Mg | Al | Si | | |
| 2070 | 8.45 | 2.55 | 10 | 55.39 | 70.92 | 19.2 | 9.88 | 0 | Yes | 1.17 |
| 2071 | 30.5 | 1.92 | 10.67 | 30.08 | 80.25 | 15.1 | 4.65 | 0 | Yes | 1.16 |
| 2072 | 49.5 | 1.96 | 11.89 | 45.09 | 81.85 | 14.5 | 3.65 | 0 | Yes | 1.27 |
| 2073 | 5.9 | 2.11 | 12.03 | 41.41 | 89.45 | 10.5 | 0.05 | 0 | Yes | 1.27 |
| 2074 | 4.52 | 2.97 | 12.12 | 17.75 | 87.3 | 7.5 | 5.2 | 0 | Yes | 1.49 |
| 2075 | 5.96 | 2.36 | 12.28 | 32.76 | 93.9 | 6.1 | 0 | 0.001 | Yes | 1.29 |
| 2076 | 5.5 | 3.05 | 12.52 | 30.89 | 82.55 | 16.8 | 0.05 | 0.6 | Yes | 1.23 |
| 2077 | 3.6 | 2.57 | 11.9 | 45.90 | 70.7 | 27.5 | 1 | 0.8 | Yes | 1.23 |
| 2078 | 16.5 | 2.65 | 11.75 | 42.22 | 94.6 | 2.9 | 0 | 2.5 | Yes | 1.23 |
| 2079 | 12.5 | 2.54 | 12.44 | 18.56 | 94 | 4.5 | 0 | 1.5 | No | 1.23 |
| 2080 | 16.5 | 2.85 | 12.03 | 33.57 | 99.43 | 0.07 | 0 | 0.5 | Yes | 1.27 |
| 2081 | 10.9 | 2.75 | 10.61 | 31.70 | 96.82 | 3.1 | 0.04 | 0.04 | Yes | 1.23 |
| 2082 | 5.6 | 2.46 | 11.3 | 46.71 | 76.3 | 20.5 | 1 | 2.2 | Yes | 1.36 |
| 2083 | 22.6 | 2.71 | 11.58 | 47.89 | 68.84 | 29.5 | 0.06 | 1.6 | Yes | 1.11 |
| 2084 | 20.59 | 2.36 | 11.11 | 24.23 | 92.33 | 7.6 | 0.07 | 0 | Yes | 1.02 |
| 2085 | 20.59 | 2.16 | 12.34 | 39.24 | 95.2 | 0.7 | 1.2 | 2.9 | Yes | 1.05 |
| 2086 | 9.56 | 2.46 | 12.51 | 37.37 | 91.8 | 4.6 | 1.8 | 1.8 | Yes | 1.24 |
| 2087 | 5.9 | 2.49 | 11.64 | 50.38 | 82 | 8.3 | 9.2 | 0.5 | Yes | 1.33 |
| 2088 | 6.54 | 1.63 | 9.16 | 37.14 | 88.2 | 11.8 | 0 | 0 | Yes | 1.27 |
| 2089 | 21.4 | 1.51 | 9.46 | 13.48 | 86.06 | 12.9 | 0 | 1.04 | Yes | 1.50 |
| 2090 | 9.8 | 3.05 | 9.54 | 40.05 | 99.34 | 0.6 | 0 | 0.06 | Yes | 1.13 |

| Invention Example No | Ratio of (Zn metal grains or Zn alloy grains):(Later-added Zn metal grains) | | Mg content of all metal grains (Mass %) | Total metal grain content of coat (Mass %) | Coating details | | | Corrosion Test Results |
|---|---|---|---|---|---|---|---|---|
| | Zn metal grains/ Zn alloy grains | Later-added Zn metal grains | | | Base resin type | Coat thickness (μm) | Coating method | |
| 2070 | 1 | 120 | 0.159 | 64 | Alkali silicate | 37 | Spray | E |
| 2071 | 1 | 7.5 | 1.776 | 69 | Alkyl silicate | 113 | Brush | E |
| 2072 | 1 | 6.5 | 1.933 | 83 | Alkali silicate | 2 | Spray | G |
| 2073 | 1 | 20 | 0.500 | 30 | Alkyl silicate | 75 | Brush | E |
| 2074 | 1 | 0.007 | 7.448 | 83 | Alkali silicate | 30 | Brush | E |
| 2075 | 1 | 9 | 0.610 | 75 | Alkyl silicate | 34 | Brush | E |
| 2076 | 1 | 7.5 | 1.976 | 76 | Epoxy resin | 124 | Brush | E |
| 2077 | 1 | 50 | 0.539 | 72 | Acrylic resin | 15 | Spray | E |
| 2078 | 1 | 0.005 | 2.886 | 71 | Urethane resin | 23 | Spray | E |
| 2079 | 1 | 25.6 | 0.169 | 82 | Polyester resin | 157 | Brush | E |
| 2080 | 1 | 56.5 | 0.001 | 81 | Epoxy resin | 26 | Spray | E |
| 2081 | 1 | 1.6 | 1.192 | 83 | Acrylic resin | 38 | Spray | E |
| 2082 | 1 | 3 | 5.125 | 50 | Urethane resin | 160 | Brush | E |
| 2083 | 1 | 100 | 0.292 | 72 | Polyester resin | 27 | Brush | E |
| 2084 | 1 | 65.5 | 0.114 | 47 | Epoxy resin | 180 | Brush | E |
| 2085 | 1 | 1.9 | 0.241 | 47 | Acrylic resin | 26 | Spray | E |
| 2086 | 1 | 2.1 | 1.484 | 52 | Urethane resin | 180 | Brush | E |
| 2087 | 1 | 10.5 | 0.722 | 52 | Polyester resin | 15 | Spray | E |
| 2088 | 1 | 6.5 | 1.573 | 50 | Epoxy resin | 2 | Spray | G |
| 2089 | 1 | 19.5 | 0.629 | 46 | Acrylic resin | 28 | Spray | E |
| 2090 | 1 | 0.8 | 0.333 | 47 | Urethane resin | 30 | Spray | E |

TABLE 107

| Invention Example No | Average diameter of later-added Zn metal grains (μm) | Diameter distribution (peak diameter) of Zn metal grains/Zn alloy grains (μm) | | Percent of fine-grain metal grains among Zn metal grains/Zn alloy grains (Vol %) | Chemical component content of Zn metal grains/Zn alloy grains (Mass %) | | | | Alloy grain fracture surfaces or cracks present? | Ave aspect ratio |
|---|---|---|---|---|---|---|---|---|---|---|
| | | Fine metal | Coarse metal | | Zn | Mg | Al | Si | | |
| 2091 | 6.59 | 2.57 | 9.56 | 38.18 | 89.51 | 9.5 | 0 | 0.99 | No | 1.04 |
| 2092 | 6.54 | 2.65 | 9.46 | 7.63 | 88.3 | 11.7 | 0 | 0 | Yes | 1.02 |
| 2093 | 16.5 | 2.54 | 11.99 | 37.95 | 89.9 | 9.4 | 0.7 | 0 | Yes | 1.08 |
| 2094 | 7.8 | 2.85 | 12.08 | 14.29 | 87.8 | 11.7 | 0.5 | 0 | Yes | 1.15 |
| 2095 | 16.5 | 2.75 | 12.24 | 40.86 | 95.6 | 4.2 | 0.2 | 0 | Yes | 1.34 |
| 2096 | 6.54 | 2.46 | 12.48 | 97.50 | 97.13 | 2.8 | 0.07 | 0 | Yes | 1.25 |
| 2097 | 8.45 | 2.71 | 11.86 | 13.30 | 86.1 | 13.9 | 0 | 0 | Yes | 1.19 |
| 2098 | 8.5 | 2.36 | 11.71 | 43.62 | 82.6 | 14.6 | 1.6 | 1.2 | No | 1.18 |
| 2099 | 13.6 | 2.46 | 11.35 | 56.93 | 72.95 | 26.4 | 0.65 | 0 | Yes | 1.24 |
| 2100 | 12.33 | 1.45 | 12.02 | 36.59 | 83.23 | 16.5 | 0.27 | 0 | Yes | 1.11 |
| 2101 | 16.5 | 2.42 | 13.24 | 39.95 | 79.4 | 19.5 | 0.45 | 0.65 | Yes | 1.27 |
| 2102 | 7.9 | 2.11 | 9.46 | 86.50 | 97.08 | 1.6 | 0.33 | 0.99 | Yes | 1.31 |
| 2103 | 10.5 | 2.97 | 13.47 | 32.87 | 90.5 | 6 | 1 | 2.5 | Yes | 1.26 |
| 2104 | 16.5 | 2.36 | 9.46 | 16.23 | 88.93 | 8.4 | 0.87 | 1.8 | Yes | 1.14 |
| 2105 | 10.64 | 3.05 | 13.87 | 37.40 | 86.7 | 13.3 | 0 | 0 | Yes | 1.34 |
| 2106 | 10.5 | 2.57 | 13.25 | 40.76 | 81.4 | 18.6 | 0. | 0 | Yes | 1.16 |
| 2107 | 20.59 | 2.65 | 13.1 | 87.31 | 97.34 | 1.8 | 0.86 | 0 | No | 1.47 |
| 2108 | 8.5 | 2.12 | 9.08 | 92.50 | 95.25 | 4.1 | 0.65 | 0 | Yes | 1.48 |
| 2109 | 0.5 | 1.65 | 9.87 | 17.93 | 82.87 | 16.7 | 0.43 | 0 | No | 1.49 |
| 2110 | 10.5 | 2.35 | 9.46 | 44.50 | 99 | 0.4 | 0.6 | 0 | Yes | 1.34 |
| 2111 | 11.5 | 1.63 | 9.28 | 96.50 | 89.35 | 10.6 | 0.05 | 0 | Yes | 1.29 |
| 2112 | 36.5 | 2.64 | 9.45 | 16.94 | 93.08 | 6.9 | 0.02 | 0 | Yes | 1.18 |

| Invention Example No | Ratio of (Zn metal grains or Zn alloy grains):(Later-added Zn metal grains) | | Mg content of all metal grains (Mass %) | Coating details | | | | |
|---|---|---|---|---|---|---|---|---|
| | Zn metal grains/Zn alloy grains | Later-added Zn metal grains | | Total metal grain content of coat (Mass %) | Base resin type | Coat thickness (μm) | Coating method | Corrosion Test Results |
| 2091 | 1 | 18.5 | 0.487 | 83 | Polyester resin | 2 | Spray | G |
| 2092 | 1 | 4.3 | 2.208 | 52 | Epoxy resin | 157 | Brush | E |
| 2093 | 1 | 3.2 | 2.238 | 89 | Acrylic resin | 28 | Brush | E |
| 2094 | 1 | 1.5 | 4.680 | 85 | Alkyl silicate | 130 | Brush | E |
| 2095 | 1 | 4.5 | 0.764 | 53 | Alkyl silicate | 29 | Brush | E |
| 2096 | 1 | 15.5 | 0.170 | 88 | Epoxy resin | 30 | Brush | E |
| 2097 | 1 | 10.5 | 1.209 | 85 | Acrylic resin | 120 | Brush | E |
| 2098 | 1 | 2.5 | 4.171 | 52 | Urethane resin | 187 | Brush | E |
| 2099 | 1 | 9 | 2.640 | 83 | Polyester resin | 28 | Spray | E |
| 2100 | 1 | 105 | 0.156 | 88 | Epoxy resin | 5 | Spray | E |
| 2101 | 1 | 5.7 | 2.910 | 49 | Acrylic resin | 35 | Spray | E |
| 2102 | 1 | 3.9 | 0.327 | 50 | Urethane resin | 5 | Spray | G |
| 2103 | 1 | 4.5 | 1.091 | 51 | Polyester resin | 200 | Brush | E |
| 2104 | 1 | 3.6 | 1.826 | 83 | Alkali silicate | 25 | Spray | E |
| 2105 | 1 | 16.4 | 0.764 | 82 | Alkali silicate | 15 | Spray | E |
| 2106 | 1 | 6 | 2.657 | 88 | Alkyl silicate | 20 | Spray | E |
| 2107 | 1 | 7.5 | 0.212 | 85 | Alkali silicate | 18 | Spray | E |
| 2108 | 1 | 10.5 | 0.357 | 87 | Alkyl silicate | 22 | Spray | E |
| 2109 | 1 | 2.6 | 4.639 | 86 | Alkali silicate | 19 | Spray | E |
| 2110 | 1 | 1.5 | 0.160 | 46 | Alkyl silicate | 29 | Spray | E |
| 2111 | 1 | 13.5 | 0.731 | 49 | Alkali silicate | 23 | Spray | E |
| 2112 | 1 | 2.6 | 1.917 | 35 | Alkyl silicate | 21 | Spray | E |

TABLE 108

| Invention Example No | Average diameter of later-added Zn metal grains (μm) | Diameter distribution (peak diameter) of Zn metal grains/Zn alloy grains (μm) Fine metal | Diameter distribution (peak diameter) of Zn metal grains/Zn alloy grains (μm) Coarse metal | Percent of fine-grain metal grains among Zn metal grains/Zn alloy grains (Vol %) | Chemical component content of Zn metal grains/Zn alloy grains (Mass %) Zn | Mg | Al | Si | Alloy grain fracture surfaces or cracks present? | Ave aspect ratio | Ratio of (Zn metal grains or Zn alloy grains):(Later-added Zn metal grains) Zn metal grains/Zn alloy grains | Ratio Later-added Zn metal grains | Mg content of all metal grains (Mass %) | Total metal grain content of coat (Mass %) | Base resin type | Coat thickness (μm) | Coating method | Corrosion Test Results |
|---|---|---|---|---|---|---|---|---|---|---|---|---|---|---|---|---|---|---|
| 2113 | 1.5 | 2.35 | 9.25 | 88.12 | 99.82 | 0.05 | 0.06 | 0.07 | Yes | 1.48 | 1 | 6.5 | 0.007 | 30 | Alkali silicate | 19 | Spray | E |
| 2114 | 8.7 | 2.31 | 9.46 | 60.57 | 91.56 | 6.4 | 1.05 | 0.99 | Yes | 1.27 | 1 | 1.6 | 2.462 | 76 | Alkyl silicate | 15 | Spray | E |
| 2115 | 7.8 | 2.62 | 9.46 | 39.48 | 93.36 | 3.5 | 2.6 | 0.54 | Yes | 1.17 | 1 | 3.8 | 0.729 | 72 | Alkali silicate | 18 | Spray | E |
| 2116 | 5.96 | 2.52 | 9.46 | 15.82 | 82.13 | 17.5 | 0.05 | 0.32 | Yes | 1.27 | 1 | 0.08 | 16.204 | 30 | Alkyl silicate | 22 | Spray | E |
| 2117 | 0.06 | 2.24 | 13.32 | 49.57 | 91.2 | 3.6 | 5.2 | 0 | No | 1.27 | 1 | 164.5 | 0.022 | 83 | Alkyl silicate | 21 | Spray | E |
| 2118 | 0.9 | 0.05 | 6.54 | 86.52 | 94.1 | 5.9 | 0 | 0.001 | Yes | 1.48 | 1 | 3.6 | 1.283 | 75 | Alkyl silicate | 29 | Spray | E |
| 2119 | 3.6 | 2.42 | 6.35 | 90.98 | 83.2 | 16.2 | 0 | 0.6 | No | 1.49 | 1 | 8.6 | 1.688 | 76 | Alkali silicate | 23 | Spray | E |
| 2120 | 10.5 | 0.11 | 7.54 | 67.32 | 76.7 | 22.5 | 0 | 0.8 | Yes | 1.34 | 1 | 12 | 1.731 | 72 | Alkyl silicate | 21 | Spray | E |
| 2121 | 0.05 | 1.92 | 8.64 | 82.33 | 96.52 | 3.4 | 0.04 | 0.04 | Yes | 1.23 | 1 | 5.8 | 0.500 | 83 | Alkali silicate | 19 | Spray | E |
| 2122 | 2.32 | 0.46 | 6.45 | 73.76 | 68.3 | 26.5 | 3 | 2.2 | Yes | 1.23 | 1 | 10 | 2.409 | 50 | Alkyl silicate | 21 | Spray | E |
| 2123 | 20.4 | 0.77 | 6.48 | 88.77 | 72.84 | 25.5 | 0.06 | 1.6 | Yes | 1.23 | 1 | 1 | 12.750 | 72 | Alkali silicate | 19 | Spray | E |
| 2124 | 8.6 | 2.35 | 9.25 | 45.02 | 87.2 | 12.8 | 0 | 0 | Yes | 1.05 | 1 | 10.5 | 1.113 | 50 | Acrylic resin | 654 | Spray | E |
| 2125 | 10.5 | 2.33 | 9.46 | 15.2 | 91.5 | 8.5 | 0 | 0 | Yes | 1.06 | 1 | 6.5 | 1.133 | 48 | Alkali silicate | 700 | Spray | E |
| 2126 | 8.7 | 1.95 | 9.32 | 51.41 | 75.23 | 24.5 | 0.27 | 0 | Yes | 1.38 | 1 | 19.5 | 1.195 | 75 | Alkyl silicate | 555 | Spray | E |
| 2127 | 7.8 | 2.15 | 9.22 | 45.46 | 77.48 | 18.4 | 2.55 | 1.57 | Yes | 1.06 | 1 | 0.8 | 10.222 | 55 | Alkyl silicate | 321 | Spray | E |
| 2128 | 5.96 | 2.23 | 11.62 | 35.19 | 72.62 | 0.08 | 25.5 | 1.8 | Yes | 1.49 | 1 | 5.3 | 0.013 | 38 | Alkyl silicate | 152 | Brush | E |
| 2129 | 1.6 | 2.26 | 11.15 | 73.02 | 64.06 | 15.2 | 19.4 | 1.34 | No | 1.34 | 1 | 4.3 | 2.868 | 48 | Urethane resin | 674 | Spray | E |
| 2130 | 7.2 | 1.98 | 9.34 | 93.45 | 83 | 6.4 | 10.6 | 0 | Yes | 1.48 | 1 | 3.2 | 1.524 | 76 | Polyester resin | 325 | Spray | E |
| 2131 | 10.5 | 2.02 | 9.58 | 30.66 | 86.4 | 3.2 | 10.4 | 0 | No | 1.49 | 1 | 1.5 | 1.280 | 72 | Alkyl silicate | 665 | Spray | E |
| 2132 | 3.6 | 2.36 | 12.28 | 32.76 | 80.4 | 6.1 | 13.5 | 0.001 | Yes | 1.29 | 1 | 4.5 | 1.109 | 75 | Alkyl silicate | 354 | Brush | E |
| 2133 | 4.5 | 3.05 | 12.52 | 30.89 | 70.1 | 16.8 | 12.5 | 0.6 | Yes | 1.23 | 1 | 0.8 | 9.333 | 76 | Alkyl silicate | 165 | Spray | E |
| 2134 | 7.9 | 2.57 | 11.9 | 45.9 | 60.9 | 27.5 | 10.8 | 0.8 | Yes | 1.23 | 1 | 6.5 | 3.667 | 72 | Urethane resin | 354 | Spray | E |

TABLE 109

| Invention Example No | Average diameter of later-added Zn metal grains (μm) | Diameter distribution (Ave diameter) of Zn metal grains/Zn alloy grains (μm) | | Percent of fine-grain metal grains among Zn metal grains/Zn alloy grains (Vol %) | Chemical component content of Zn metal grains/Zn alloy grains (Mass %) | | | | Alloy grain fracture surfaces or cracks present? | Ave aspect ratio |
|---|---|---|---|---|---|---|---|---|---|---|
| | | Fine metal | Coarse metal | | Zn | Mg | Al | Si | | |
| 2135 | 23.5 | 2.65 | 9.56 | 5.66 | 100 | 0 | 0 | 0 | No | — |
| 2136 | 5.96 | 0.05 | 6.5 | 16.55 | 100 | 0 | 0 | 0 | No | — |
| 2137 | 10.64 | 4.6 | 65.5 | 21.55 | 100 | 0 | 0 | 0 | No | — |
| 2138 | 16.5 | 3.56 | 13.5 | 5.66 | 100 | 0 | 0 | 0 | No | — |
| 2139 | 7.95 | 4.55 | 16.7 | 33.66 | 100 | 0 | 0 | 0 | No | — |
| 2140 | 7.95 | 2.15 | 9.89 | 45.65 | 100 | 0 | 0 | 0 | No | — |
| 2141 | 9.64 | 3.22 | 10.55 | 49.88 | 100 | 0 | 0 | 0 | No | — |
| 2142 | 0.96 | 2.99 | 9.64 | 42.33 | 100 | 0 | 0 | 0 | No | — |
| 2143 | 5.26 | 3.65 | 11.22 | 65.44 | 100 | 0 | 0 | 0 | No | — |
| 2144 | 13.5 | 4.55 | 13.5 | 77.55 | 100 | 0 | 0 | 0 | No | — |
| 2145 | 13.5 | 3.57 | 22.5 | 96.55 | 100 | 0 | 0 | 0 | No | — |
| 2146 | 9.64 | 1.99 | 8.56 | 5.97 | 100 | 0 | 0 | 0 | No | — |
| 2147 | 16.5 | 2.12 | 9.46 | 87.77 | 100 | 0 | 0 | 0 | No | — |
| 2148 | 20.59 | 2.45 | 11.1 | 86.55 | 100 | 0 | 0 | 0 | No | — |
| 2149 | 0.96 | 1.85 | 8.92 | 15.67 | 100 | 0 | 0 | 0 | No | — |
| 2150 | 6.54 | 1.65 | 9.23 | 31.55 | 100 | 0 | 0 | 0 | No | — |
| 2151 | 5.26 | 2.45 | 9.05 | 26.76 | 100 | 0 | 0 | 0 | No | — |
| 2152 | 10.64 | 2.01 | 10.91 | 67.89 | 100 | 0 | 0 | 0 | No | — |
| 2153 | 9.64 | 1.99 | 11.12 | 56.89 | 100 | 0 | 0 | 0 | No | — |
| 2154 | 6.9 | 2.38 | 10.93 | 45.67 | 100 | 0 | 0 | 0 | No | — |
| 2155 | 10.5 | 2.49 | 9.34 | 34.67 | 100 | 0 | 0 | 0 | No | — |

| Invention Example No | Ratio of (Zn metal grains or Zn alloy grains):(Later-added Zn metal grains) | | Mg content of all metal grains (Mass %) | Coating details | | | | Corrosion Test Results |
|---|---|---|---|---|---|---|---|---|
| | Zn metal grains/Zn alloy grains | Later-added Zn metal grains | | Total metal grain content of coat (Mass %) | Base resin type | Coat thickness (μm) | Coating method | |
| 2135 | 1 | 299.5 | — | 35 | Alkali silicate | 2 | Spray | G |
| 2136 | 1 | 12.5 | — | 66 | Alkyl silicate | 37 | Spray | E |
| 2137 | 1 | 3.5 | — | 38 | Alkali silicate | 12 | Spray | E |
| 2138 | 1 | 1.4 | — | 84 | Alkyl silicate | 160 | Brush | E |
| 2139 | 1 | 6.8 | — | 39 | Alkali silicate | 5 | Brush | G |
| 2140 | 1 | 136.5 | — | 85 | Alkyl silicate | 12 | Brush | E |
| 2141 | 1 | 14.5 | — | 36 | Alkali silicate | 2 | Spray | G |
| 2142 | 1 | 0.08 | — | 56 | Alkyl silicate | 18 | Spray | E |
| 2143 | 1 | 1.6 | — | 42 | Alkyl silicate | 23 | Spray | E |
| 2144 | 1 | 3.9 | — | 31 | Epoxy resin | 30 | Brush | E |
| 2145 | 1 | 10.5 | — | 88 | Acrylic resin | 77 | Brush | E |
| 2146 | 1 | 4.9 | — | 78 | Urethane resin | 254 | Brush | E |
| 2147 | 1 | 33.5 | — | 36 | Polyester resin | 47 | Spray | E |
| 2148 | 1 | 2.5 | — | 37 | Epoxy resin | 43 | Spray | E |
| 2149 | 1 | 1.9 | — | 45 | Acrylic resin | 322 | Brush | E |
| 2150 | 1 | 7.1 | — | 68 | Urethane resin | 20 | Brush | E |
| 2151 | 1 | 9.4 | — | 79 | Polyester resin | 700 | Brush | E |
| 2152 | 1 | 16.8 | — | 47 | Alkali silicate | 22 | Spray | E |
| 2153 | 1 | 75.5 | — | 56 | Alkyl silicate | 25 | Spray | E |
| 2154 | 1 | 4.5 | — | 37 | Alkali silicate | 14 | Spray | E |
| 2155 | 1 | 0.9 | — | 90 | Urethane resin | 112 | Spray | E |

TABLE 110

| Invention Example No | Average diameter of later-added Zn metal grains (μm) | Diameter distribution (Ave diameter) of Zn metal grains/Zn alloy grains (μm) Fine metal | Diameter distribution (Ave diameter) of Zn metal grains/Zn alloy grains (μm) Coarse metal | Percent of fine-grain metal grains among Zn metal grains/Zn alloy grains (Vol %) | Chemical component content of Zn metal grains/Zn alloy grains (Mass %) Zn | Mg | Al | Si | Alloy grain fracture surfaces or cracks present? | Ave aspect ratio |
|---|---|---|---|---|---|---|---|---|---|---|
| 2156 | 13.5 | 2.34 | 8.77 | 95.66 | 100 | 0 | 0 | 0 | No | — |
| 2157 | 20.59 | 3.99 | 27.6 | 34.21 | 100 | 0 | 0 | 0 | No | — |
| 2158 | 7.82 | 1.02 | 21.9 | 7.88 | 100 | 0 | 0 | 0 | No | — |
| 2159 | 5.26 | 0.05 | 22.5 | 92.32 | 100 | 0 | 0 | 0 | No | — |
| 2160 | 7.06 | 2.01 | 17.5 | 11.22 | 100 | 0 | 0 | 0 | No | — |
| 2161 | 0.64 | 1.51 | 6.99 | 55.66 | 100 | 0 | 0 | 0 | No | — |
| 2162 | 46.8 | 2.38 | 7.65 | 78.99 | 100 | 0 | 0 | 0 | No | — |
| 2163 | 9.64 | 1.99 | 8.56 | 5.97 | 100 | 0 | 0 | 0 | No | — |
| 2164 | 16.5 | 2.49 | 9.34 | 34.67 | 100 | 0 | 0 | 0 | No | — |
| 2165 | 20.59 | 1.02 | 21.9 | 7.88 | 100 | 0 | 0 | 0 | No | — |
| 2166 | 16..5 | 2.35 | 9.25 | 35.87 | 88.8 | 11.2 | 0 | 0 | Yes | 1.12 |
| 2167 | 13.5 | 2.57 | 9.56 | 42.04 | 90.6 | 9.4 | 0 | 0 | No | 1.38 |
| 2168 | 0.96 | 2.56 | 9.84 | 6.55 | 81.45 | 18.5 | 0 | 0.05 | Yes | 1.22 |
| 2169 | 0.96 | 2.21 | 9.75 | 43.60 | 99.97 | 0.03 | 0 | 0 | Yes | 1.14 |
| 2170 | 8.45 | 2.64 | 9.85 | 44.12 | 98.4 | 1.6 | 0 | 0 | No | 1.02 |
| 2171 | 2.9 | 1.99 | 8.56 | 37.21 | 93.2 | 6.8 | 0 | 0 | Yes | 1.05 |
| 2172 | 5.4 | 2.94 | 8.21 | 43.38 | 84.5 | 13.9 | 0 | 1.6 | No | 1.36 |
| 2173 | 10.6 | 2.58 | 8.33 | 13.52 | 98.1 | 1.9 | 0 | 0 | Yes | 1.11 |
| 2174 | 2.32 | 2.37 | 8 | 44.94 | 94.3 | 5.7 | 0 | 0 | No | 1.07 |
| 2175 | 7.8 | 2.15 | 9.22 | 45.46 | 90.8 | 9.2 | 0 | 0 | No | 1.42 |
| 2176 | 7.95 | 2.96 | 9.36 | 35.96 | 83.3 | 15.4 | 0 | 1.3 | Yes | 1.38 |

| Invention Example No | Ratio of (Zn metal grains or Zn alloy grains):(Later-added Zn metal grains) Zn metal grains/Zn alloy grains | Ratio of (Zn metal grains or Zn alloy grains):(Later-added Zn metal grains) Later-added Zn metal grains | Mg content of all metal grains (Mass %) | Coating details Total metal grain content of coat (Mass %) | Coating details Base resin type | Coating details Coat thickness (μm) | Coating method | Corrosion Test Results |
|---|---|---|---|---|---|---|---|---|
| 2156 | 1 | 3.2 | — | 43 | Alkali silicate | 554 | Spray | E |
| 2157 | 1 | 5.2 | — | 38 | Urethane resin | 150 | Spray | E |
| 2158 | 1 | 1.6 | — | 56 | Alkali silicate | 18 | Spray | E |
| 2159 | 1 | 85.5 | — | 89 | Alkyl silicate | 657 | Brush | E |
| 2160 | 1 | 52.2 | — | 32 | Alkyl silicate | 24 | Spray | E |
| 2161 | 1 | 3.6 | — | 55 | Urethane resin | 99 | Spray | E |
| 2162 | 1 | 1.7 | — | 79 | Alkyl silicate | 7 | Spray | E |
| 2163 | 1 | 4.9 | — | 78 | Epoxy resin | 100 | Spray | E |
| 2164 | 1 | 33.5 | — | 77 | Alkyl silicate | 27 | Brush | E |
| 2165 | 1 | 2.5 | — | 56 | Alkali silicate | 15 | Spray | E |
| 2166 | 1 | 5 | 1.867 | 49 | Alkyl silicate | 14 | Spray | E |
| 2167 | 1 | 198.7 | 0.047 | 89 | Urethane resin | 55 | Spray | E |
| 2168 | 1 | 36 | 0.500 | 90 | Alkyl silicate | 8 | Spray | E |
| 2169 | 1 | 1.5 | 0.012 | 86 | Urethane resin | 122 | Brush | E |
| 2170 | 1 | 0.008 | 1.587 | 48 | Alkyl silicate | 555 | Spray | E |
| 2171 | 1 | 1.4 | 2.833 | 47 | Alkali silicate | 19 | Spray | E |
| 2172 | 1 | 4.2 | 2.673 | 47 | Alkyl silicate | 25 | Brush | E |
| 2173 | 1 | 1.6 | 0.731 | 47 | Alkyl silicate | 58 | Spray | E |
| 2174 | 1 | 7.5 | 0.671 | 52 | Alkyl silicate | 685 | Spray | E |
| 2175 | 1 | 1.6 | 3.538 | 52 | Alkali silicate | 19 | Brush | E |
| 2176 | 1 | 2 | 5.133 | 52 | Urethane resin | 700 | Spray | E |

TABLE 111

| Invention Example No | Average diameter of later-added Zn metal grains (μm) | Diameter distribution (Ave diameter) of Zn metal grains/Zn alloy grains (μm) | | Percent of fine-grain metal grains among Zn metal grains/Zn alloy grains (Vol %) | Chemical component content of Zn metal grains/Zn alloy grains (Mass %) | | | | Alloy grain fracture surfaces or cracks present? | Ave aspect ratio |
|---|---|---|---|---|---|---|---|---|---|---|
| | | Fine metal | Coarse metal | | Zn | Mg | Al | Si | | |
| 2177 | 20.59 | 2.85 | 9.45 | 42.13 | 79.84 | 18.6 | 0 | 1.56 | Yes | 1.22 |
| 2178 | 22.5 | 2.94 | 9.61 | 7.56 | 96.4 | 3.6 | 0 | 0 | Yes | 1.14 |
| 2179 | 4.6 | 2.11 | 9.85 | 43.69 | 94.6 | 5.4 | 0 | 0 | Yes | 1.13 |
| 2180 | 4.9 | 2.68 | 9.23 | 44.21 | 92.4 | 7.6 | 0 | 0 | Yes | 1.02 |
| 2181 | 10.5 | 2.99 | 9.08 | 39.51 | 75.5 | 24.5 | 0 | 0 | Yes | 1.06 |
| 2182 | 8.45 | 2.78 | 9.87 | 45.68 | 82.4 | 17.6 | 0 | 0 | Yes | 1.05 |
| 2183 | 30.5 | 2.96 | 9.46 | 65.58 | 98.6 | 1.4 | 0 | 0 | Yes | 1.24 |
| 2184 | 49.5 | 2.85 | 9.28 | 47.24 | 78.5 | 21.5 | 0 | 0 | Yes | 1.33 |
| 2185 | 5.9 | 2.64 | 9.45 | 47.76 | 89.6 | 10.4 | 0 | 0 | Yes | 1.27 |
| 2186 | 4.52 | 2.35 | 9.25 | 45.02 | 87.2 | 12.8 | 0 | 0 | Yes | 1.05 |
| 2187 | 5.96 | 2.12 | 9.46 | 47.02 | 92.2 | 7.8 | 0 | 0 | Yes | 1.22 |
| 2188 | 5.5 | 2.34 | 9.46 | 7.66 | 70.5 | 29.5 | 0 | 0 | Yes | 1.13 |
| 2189 | 3.6 | 2.33 | 9.46 | 15.20 | 91.5 | 8.5 | 0 | 0 | Yes | 1.06 |
| 2190 | 16.5 | 2.23 | 9.06 | 43.16 | 74.5 | 25.5 | 0 | 0 | Yes | 1.05 |
| 2191 | 12.5 | 2.12 | 9.3 | 49.33 | 99.93 | 0.07 | 0 | 0 | Yes | 1.24 |
| 2192 | 16.5 | 2.21 | 8.68 | 19.47 | 89.2 | 10.8 | 0 | 0 | No | 1.05 |
| 2193 | 10.9 | 1.38 | 8.53 | 69.55 | 86 | 11.2 | 1.6 | 1.2 | No | 1.12 |
| 2194 | 5.6 | 1.95 | 9.32 | 51.41 | 75.23 | 24.5 | 0.27 | 0 | Yes | 1.38 |
| 2195 | 22.6 | 2.26 | 8.95 | 75.88 | 82.6 | 17.4 | 0 | 0 | Yes | 1.13 |
| 2196 | 20.59 | 2.05 | 12.54 | 48.08 | 98.7 | 1.3 | 0 | 0 | Yes | 1.33 |
| 2197 | 20.59 | 1.65 | 8.7 | 66.85 | 80.5 | 19.5 | 0 | 0 | Yes | 1.27 |

| Invention Example No | Ratio of (Zn metal grains or Zn alloy grains):(Later-added Zn metal grains) | | Mg content of all metal grains (Mass %) | Coating details | | | | |
|---|---|---|---|---|---|---|---|---|
| | Zn metal grains/Zn alloy grains | Later-added Zn metal grains | | Total metal grain content of coat (Mass %) | Base resin type | Coat thickness (μm) | Coating method | Corrosion Test Results |
| 2177 | 1 | 270 | 0.069 | 88 | Alkyl silicate | 77 | Spray | E |
| 2178 | 1 | 7.5 | 0.424 | 87 | Alkyl silicate | 54 | Spray | E |
| 2179 | 1 | 2.9 | 1.385 | 89 | Alkyl silicate | 64 | Spray | E |
| 2180 | 1 | 2.6 | 2.111 | 90 | Alkyl silicate | 34 | Brush | E |
| 2181 | 1 | 0.1 | 22.273 | 91 | Alkali silicate | 28 | Spray | E |
| 2182 | 1 | 1.2 | 8.000 | 46 | Urethane resin | 109 | Brush | E |
| 2183 | 1 | 1.2 | 0.636 | 47 | Alkyl silicate | 15 | Spray | E |
| 2184 | 1 | 62 | 0.341 | 47 | Alkyl silicate | 14 | Spray | E |
| 2185 | 1 | 2.4 | 3.059 | 49 | Alkyl silicate | 18 | Spray | E |
| 2186 | 1 | 2.1 | 4.129 | 50 | Alkali silicate | 2 | Spray | G |
| 2187 | 1 | 34.5 | 0.220 | 87 | Alkyl silicate | 37 | Spray | E |
| 2188 | 1 | 270 | 0.109 | 83 | Alkali silicate | 12 | Spray | E |
| 2189 | 1 | 32.5 | 0.254 | 48 | Alkyl silicate | 160 | Brush | E |
| 2190 | 1 | 3 | 6.375 | 51 | Alkali silicate | 5 | Brush | G |
| 2191 | 1 | 1.5 | 0.028 | 51 | Alkyl silicate | 56 | Brush | E |
| 2192 | 1 | 7.5 | 1.271 | 87 | Alkali silicate | 2 | Spray | G |
| 2193 | 1 | 13.5 | 0.772 | 85 | Alkyl silicate | 18 | Spray | E |
| 2194 | 1 | 5 | 4.083 | 86 | Alkyl silicate | 23 | Spray | E |
| 2195 | 1 | 5 | 2.900 | 50 | Epoxy resin | 30 | Brush | E |
| 2196 | 1 | 1 | 0.650 | 51 | Acrylic resin | 77 | Brush | E |
| 2197 | 1 | 120 | 0.161 | 51 | Urethane resin | 655 | Brush | E |

TABLE 112

| Invention Example No | Average diameter of later-added Zn metal grains (μm) | Diameter distribution (Ave diameter) of Zn metal grains/Zn alloy grains (μm) Fine metal | Diameter distribution (Ave diameter) of Zn metal grains/Zn alloy grains (μm) Coarse metal | Percent of fine-grain metal grains among Zn metal grains/Zn alloy grains (Vol %) | Chemical component content of Zn metal grains/Zn alloy grains (Mass %) Zn | Mg | Al | Si | Alloy grain fracture surfaces or cracks present? | Ave aspect ratio |
|---|---|---|---|---|---|---|---|---|---|---|
| 2198 | 9.56 | 2.35 | 8.55 | 7.68 | 88.85 | 10.8 | 0.05 | 0.3 | No | 1.23 |
| 2199 | 5.9 | 1.62 | 8.91 | 8.64 | 87.7 | 11.9 | 0.4 | 0 | Yes | 1.11 |
| 2200 | 6.54 | 1.88 | 9.91 | 16.58 | 90.5 | 9.5 | 0 | 0 | Yes | 1.42 |
| 2201 | 21.4 | 2.35 | 9.25 | 35.87 | 89.5 | 10.5 | 0 | 0 | Yes | 1.06 |
| 2202 | 9.8 | 2.57 | 9.56 | 42.04 | 84.9 | 15.1 | 0 | 0 | Yes | 1.05 |
| 2203 | 6.59 | 2.56 | 9.84 | 38.41 | 83.2 | 16.8 | 0 | 0 | Yes | 1.07 |
| 2204 | 6.54 | 2.21 | 9.75 | 6.99 | 89.4 | 10.6 | 0 | 0 | Yes | 1.42 |
| 2205 | 16.5 | 2.64 | 9.85 | 44.12 | 84.3 | 13.3 | 2.4 | 0 | Yes | 1.38 |
| 2206 | 7.8 | 2.65 | 8.56 | 66.99 | 98.6 | 1.4 | 0 | 0 | No | 1.22 |
| 2207 | 16.5 | 2.94 | 8.21 | 43.38 | 76.45 | 23.5 | 0 | 0.05 | Yes | 1.14 |
| 2208 | 6.54 | 2.58 | 8.33 | 39.75 | 91.1 | 8.9 | 0 | 0 | Yes | 1.13 |
| 2209 | 8.45 | 2.37 | 8 | 65.38 | 85.1 | 14.9 | 0 | 0 | Yes | 1.02 |
| 2210 | 8.5 | 2.15 | 9.22 | 45.46 | 77.48 | 18.4 | 2.55 | 1.57 | Yes | 1.06 |
| 2211 | 13.6 | 2.96 | 9.36 | 22.55 | 97.9 | 2.1 | 0 | 0 | Yes | 1.05 |
| 2212 | 12.33 | 2.85 | 9.45 | 42.13 | 94.8 | 5.2 | 0 | 0 | Yes | 1.24 |
| 2213 | 16.5 | 2.94 | 9.61 | 38.50 | 84.6 | 15.4 | 0 | 0 | Yes | 1.33 |
| 2214 | 7.9 | 2.11 | 9.85 | 64.13 | 89.3 | 10.7 | 0 | 0 | Yes | 1.27 |
| 2215 | 10.5 | 2.68 | 9.23 | 44.21 | 83.3 | 16.7 | 0 | 0 | Yes | 1.05 |
| 2216 | 16.5 | 2.99 | 9.08 | 39.51 | 80.05 | 19.6 | 0.35 | 0 | No | 1.12 |
| 2217 | 10.64 | 1.82 | 9.87 | 78.64 | 85.5 | 14.5 | 0 | 0 | No | 1.23 |
| 2218 | 10.5 | 1.42 | 9.46 | 42.05 | 85 | 14.2 | 0 | 0.8 | No | 1.36 |

| Invention Example No | Ratio of (Zn metal grains or Zn alloy grains):(Later-added Zn metal grains) Zn metal grains/Zn alloy grains | Ratio of (Zn metal grains or Zn alloy grains):(Later-added Zn metal grains) Later-added Zn metal grains | Mg content of all metal grains (Mass %) | Total metal grain content of coat (Mass %) | Coating details Base resin type | Coat thickness (μm) | Coating method | Corrosion Test Results |
|---|---|---|---|---|---|---|---|---|
| 2198 | 1 | 3.7 | 2.298 | 80 | Polyester resin | 47 | Spray | E |
| 2199 | 1 | 6.1 | 1.676 | 46 | Epoxy resin | 43 | Spray | E |
| 2200 | 1 | 198.5 | 0.048 | 51 | Acrylic resin | 52 | Brush | E |
| 2201 | 1 | 2.5 | 3.000 | 86 | Urethane resin | 20 | Brush | E |
| 2202 | 1 | 18.5 | 0.774 | 85 | Polyester resin | 200 | Brush | E |
| 2203 | 1 | 8 | 1.867 | 82 | Alkali silicate | 22 | Spray | E |
| 2204 | 1 | 1.6 | 4.077 | 81 | Alkyl silicate | 25 | Spray | E |
| 2205 | 1 | 1.2 | 6.045 | 46 | Alkali silicate | 14 | Spray | E |
| 2206 | 1 | 0.5 | 0.933 | 47 | Urethane resin | 112 | Spray | E |
| 2207 | 1 | 9 | 2.350 | 48 | Alkali silicate | 24 | Spray | E |
| 2208 | 1 | 4.5 | 1.618 | 51 | Urethane resin | 150 | Spray | E |
| 2209 | 1 | 136 | 0.109 | 53 | Alkali silicate | 18 | Spray | E |
| 2210 | 1 | 13 | 1.314 | 88 | Alkyl silicate | 19 | Brush | E |
| 2211 | 1 | 10.6 | 0.181 | 85 | Alkyl silicate | 24 | Spray | E |
| 2212 | 1 | 1.6 | 2.000 | 83 | Urethane resin | 99 | Spray | E |
| 2213 | 1 | 68 | 0.223 | 82 | Alkyl silicate | 7 | Spray | E |
| 2214 | 1 | 4.5 | 1.945 | 83 | Epoxy resin | 100 | Spray | E |
| 2215 | 1 | 10.5 | 1.452 | 47 | Alkyl silicate | 27 | Brush | E |
| 2216 | 1 | 4.9 | 3.322 | 51 | Alkali silicate | 15 | Spray | E |
| 2217 | 1 | 10.5 | 1.261 | 52 | Alkyl silicate | 14 | Spray | E |
| 2218 | 1 | 192 | 0.074 | 51 | Urethane resin | 55 | Spray | E |

TABLE 113

| Invention Example No | Average diameter of later-added Zn metal grains (μm) | Diameter distribution (Ave diameter) of Zn metal grains/Zn alloy grains (μm) Fine metal | Diameter distribution (Ave diameter) of Zn metal grains/Zn alloy grains (μm) Coarse metal | Percent of fine-grain metal grains among Zn metal grains/Zn alloy grains (Vol %) | Chemical component content of Zn metal grains/Zn alloy grains (Mass %) Zn | Chemical component content of Zn metal grains/Zn alloy grains (Mass %) Mg | Chemical component content of Zn metal grains/Zn alloy grains (Mass %) Al | Chemical component content of Zn metal grains/Zn alloy grains (Mass %) Si | Alloy grain fracture surfaces or cracks present? | Ave aspect ratio | Ratio of (Zn metal grains or Zn alloy grains):(Later-added Zn metal grains) Zn metal grains/Zn alloy grains | Ratio of (Zn metal grains or Zn alloy grains):(Later-added Zn metal grains) Later-added Zn metal grains |
|---|---|---|---|---|---|---|---|---|---|---|---|---|
| 2219 | 20.59 | 2.12 | 9.28 | 64.58 | 87.3 | 12.7 | 0 | 0 | No | 1.11 | 1 | 0.07 |
| 2220 | 8.5 | 1.92 | 9.45 | 47.76 | 89.5 | 10.5 | 0 | 0 | Yes | 1.07 | 1 | 9.5 |
| 2221 | 0.5 | 2.11 | 9.63 | 24.10 | 87.3 | 11.8 | 0 | 0.9 | Yes | 1.42 | 1 | 2.6 |
| 2222 | 10.5 | 2.97 | 9.16 | 39.11 | 86.4 | 12.8 | 0.5 | 0.3 | Yes | 1.38 | 1 | 4.5 |
| 2223 | 11.5 | 2.36 | 10.39 | 19.65 | 93.8 | 6.2 | 0 | 0 | Yes | 1.22 | 1 | 3 |
| 2224 | 36.5 | 3.05 | 10.56 | 65.39 | 83.8 | 16.2 | 0 | 0 | Yes | 1.14 | 1 | 7.5 |
| 2225 | 1.5 | 2.15 | 10.74 | 48.57 | 80.4 | 19.6 | 0 | 0 | Yes | 1.13 | 1 | 77 |
| 2226 | 8.7 | 2.19 | 10.27 | 24.91 | 87.6 | 12.4 | 0 | 0 | Yes | 1.02 | 1 | 10.5 |
| 2227 | 7.8 | 2.48 | 11.5 | 39.92 | 89.3 | 10.7 | 0 | 0 | Yes | 1.06 | 1 | 15.5 |
| 2228 | 5.96 | 2.85 | 11.67 | 22.65 | 91.5 | 8.5 | 0 | 0 | Yes | 1.05 | 1 | 5.8 |
| 2229 | 0.06 | 2.75 | 11.85 | 66.20 | 94.9 | 5.1 | 0 | 0 | Yes | 1.24 | 1 | 1.9 |
| 2230 | 0.9 | 2.46 | 11.38 | 49.38 | 75.5 | 24.5 | 0 | 0 | Yes | 1.33 | 1 | 16.9 |
| 2231 | 3.6 | 2.71 | 12.61 | 30.58 | 86.5 | 13.5 | 0 | 0 | Yes | 1.27 | 1 | 1.5 |
| 2232 | 10.5 | 2.36 | 12.78 | 45.59 | 80 | 20 | 0 | 0 | Yes | 1.05 | 1 | 0.05 |
| 2233 | 0.05 | 2.16 | 9.57 | 28.32 | 84.5 | 15.5 | 0 | 0 | Yes | 1.12 | 1 | 215 |
| 2234 | 2.32 | 2.46 | 9.81 | 71.87 | 88 | 10.5 | 1.5 | 0 | Yes | 1.23 | 1 | 4.2 |
| 2235 | 20.4 | 2.49 | 8.43 | 53.05 | 92.1 | 7.9 | 0 | 0 | Yes | 1.36 | 1 | 1.5 |
| 2236 | 7.34 | 2.95 | 8.55 | 27.74 | 95.2 | 4.8 | 0 | 0 | Yes | 1.11 | 1 | 4.8 |
| 2237 | 9.4 | 2.36 | 8.22 | 42.75 | 81.6 | 18.4 | 0 | 0 | Yes | 1.07 | 1 | 0.5 |
| 2238 | 23.43 | 2.21 | 9.44 | 23.29 | 86.8 | 12.7 | 0 | 0.5 | Yes | 1.42 | 1 | 2.3 |
| 2239 | 5.96 | 2.25 | 9.58 | 61.12 | 89.7 | 10.3 | 0 | 0 | No | 1.38 | 1 | 0.05 |

| Invention Example No | Mg content of all metal grains (Mass %) | Total metal grain content of coat (Mass %) | Base resin type | Coat thickness (μm) | Coating method | Corrosion Test Results |
|---|---|---|---|---|---|---|
| 2219 | 11.869 | 52 | Alkyl silicate | 8 | Spray | E |
| 2220 | 1.000 | 89 | Urethane resin | 122 | Brush | E |
| 2221 | 3.278 | 85 | Alkyl silicate | 54 | Spray | E |
| 2222 | 2.327 | 82 | Alkali silicate | 19 | Spray | E |
| 2223 | 1.550 | 87 | Alkyl silicate | 25 | Brush | E |
| 2224 | 1.906 | 88 | Alkyl silicate | 58 | Spray | E |
| 2225 | 0.251 | 49 | Alkyl silicate | 21 | Spray | E |
| 2226 | 1.078 | 50 | Alkali silicate | 19 | Brush | E |
| 2227 | 0.648 | 51 | Urethane resin | 56 | Spray | E |
| 2228 | 1.250 | 52 | Alkyl silicate | 77 | Spray | E |
| 2229 | 1.759 | 53 | Alkyl silicate | 12 | Spray | E |
| 2230 | 1.369 | 88 | Alkyl silicate | 64 | Spray | E |
| 2231 | 5.400 | 85 | Alkyl silicate | 34 | Brush | E |
| 2232 | 19.048 | 83 | Alkali silicate | 28 | Spray | E |
| 2233 | 0.072 | 81 | Urethane resin | 109 | Brush | E |
| 2234 | 2.019 | 80 | Alkyl silicate | 15 | Spray | E |
| 2235 | 3.160 | 47 | Alkyl silicate | 14 | Spray | E |
| 2236 | 0.828 | 49 | Alkyl silicate | 18 | Spray | E |
| 2237 | 12.267 | 50 | Urethane resin | 122 | Brush | E |
| 2238 | 3.848 | 51 | Alkyl silicate | 54 | Spray | E |
| 2239 | 9.810 | 52 | Alkali silicate | 19 | Spray | E |

TABLE 114

| Invention Example No | Average diameter of later-added Zn metal grains (μm) | Diameter distribution (Ave diameter) of Zn metal grains/Zn alloy grains (μm) Fine metal | Diameter distribution (Ave diameter) of Zn metal grains/Zn alloy grains (μm) Coarse metal | Percent of fine-grain metal grains among Zn metal grains/Zn alloy grains (Vol %) | Chemical component content of Zn metal grains/Zn alloy grains (Mass %) Zn | Mg | Al | Si | Alloy grain fracture surfaces or cracks present? | Ave aspect ratio | Ratio of (Zn metal grains or Zn alloy grains):(Later-added Zn metal grains) Zn metal grains/Zn alloy grains | Ratio Later-added Zn metal grains |
|---|---|---|---|---|---|---|---|---|---|---|---|---|
| 2240 | 10.64 | 2.44 | 9.67 | 44.30 | 71.2 | 20.8 | 8 | 0 | Yes | 1.22 | 1 | 120 |
| 2241 | 16.5 | 2.78 | 9.83 | 23.96 | 97.5 | 2.5 | 0 | 0 | No | 1.14 | 1 | 3.7 |
| 2242 | 7.95 | 2.15 | 10.07 | 44.09 | 84.8 | 15.2 | 0 | 0 | Yes | 1.13 | 1 | 16.5 |
| 2243 | 7.95 | 2.19 | 9.45 | 24.63 | 80.8 | 19.2 | 0 | 0 | No | 1.02 | 1 | 24 |
| 2244 | 9.64 | 2.48 | 9.3 | 62.46 | 78.7 | 13.5 | 7.8 | 0 | Yes | 1.06 | 1 | 0.01 |
| 2245 | 0.96 | 2.59 | 9.99 | 45.64 | 88.1 | 11.9 | 0 | 0 | No | 1.05 | 1 | 7.8 |
| 2246 | 5.26 | 2.47 | 9.58 | 25.30 | 88.5 | 10.6 | 0 | 0.9 | Yes | 1.24 | 1 | 1.6 |
| 2247 | 13.5 | 2.69 | 9.4 | 42.84 | 84.6 | 15.4 | 0 | 0 | Yes | 1.33 | 1 | 3.2 |
| 2248 | 13.5 | 2.57 | 9.57 | 25.44 | 97.4 | 2.6 | 0 | 0 | Yes | 1.27 | 1 | 5.4 |
| 2249 | 9.64 | 2.49 | 9.54 | 63.27 | 83.3 | 16.7 | 0 | 0 | Yes | 1.37 | 1 | 220 |
| 2250 | 16.5 | 2.68 | 9.58 | 46.45 | 91.9 | 8.1 | 0 | 0 | Yes | 1.10 | 1 | 2.2 |
| 2251 | 20.59 | 2.35 | 9.25 | 46.45 | 86.3 | 13.7 | 0 | 0 | Yes | 1.04 | 1 | 2.8 |
| 2252 | 0.96 | 2.48 | 10.04 | 50.91 | 81.5 | 18.5 | 0 | 0 | Yes | 1.02 | 1 | 12 |
| 2253 | 6.54 | 2.13 | 11.27 | 27.25 | 97.6 | 2.4 | 0 | 0 | Yes | 1.01 | 1 | 10.6 |
| 2254 | 5.26 | 1.93 | 11.44 | 42.26 | 89.1 | 10.9 | 0 | 0 | Yes | 1.08 | 1 | 35 |
| 2255 | 10.64 | 2.05 | 8.9 | 33.69 | 92.8 | 7.2 | 0 | 0 | Yes | 1.14 | 1 | 125.5 |
| 2256 | 9.64 | 1.42 | 8.75 | 48.70 | 81.96 | 17.5 | 0.5 | 0.04 | No | 1.23 | 1 | 6 |
| 2257 | 6.9 | 1.46 | 9.44 | 29.24 | 85.4 | 14.6 | 0 | 0 | No | 1.33 | 1 | 34 |
| 2258 | 10.5 | 1.75 | 9.03 | 67.07 | 90.6 | 9.4 | 0 | 0 | Yes | 1.37 | 1 | 1.6 |
| 2259 | 13.5 | 1.86 | 8.85 | 50.25 | 92.9 | 7.1 | 0 | 0 | Yes | 1.44 | 1 | 7.5 |
| 2260 | 20.59 | 1.74 | 8.95 | 29.91 | 77.5 | 22.5 | 0 | 0 | Yes | 1.21 | 1 | 200 |

| Invention Example No | Coating details Mg content of all metal grains (Mass %) | Total metal grain content of coat (Mass %) | Base resin type | Coat thickness (μm) | Coating method | Corrosion Test Results |
|---|---|---|---|---|---|---|
| 2240 | 0.172 | 83 | Alkyl silicate | 25 | Brush | E |
| 2241 | 0.532 | 88 | Alkyl silicate | 58 | Spray | E |
| 2242 | 0.869 | 85 | Alkyl silicate | 21 | Spray | E |
| 2243 | 0.768 | 83 | Alkali silicate | 19 | Brush | E |
| 2244 | 13.366 | 82 | Urethane resin | 56 | Spray | E |
| 2245 | 1.352 | 47 | Alkyl silicate | 77 | Spray | E |
| 2246 | 4.077 | 46 | Alkyl silicate | 54 | Spray | E |
| 2247 | 3.667 | 49 | Alkali silicate | 2 | Spray | G |
| 2248 | 0.406 | 50 | Alkali silicate | 20 | Spray | E |
| 2249 | 0.076 | 51 | Alkali silicate | 5 | Spray | G |
| 2250 | 2.531 | 83 | Alkyl silicate | 20 | Spray | E |
| 2251 | 3.605 | 82 | Alkali silicate | 15 | Brush | E |
| 2252 | 1.423 | 88 | Alkyl silicate | 57 | Brush | E |
| 2253 | 0.207 | 85 | Alkali silicate | 13 | Brush | E |
| 2254 | 0.303 | 86 | Alkyl silicate | 22 | Brush | E |
| 2255 | 0.057 | 47 | Alkali silicate | 20 | Spray | E |
| 2256 | 2.500 | 48 | Alkyl silicate | 27 | Spray | E |
| 2257 | 0.417 | 50 | Alkali silicate | 15 | Spray | E |
| 2258 | 3.615 | 51 | Alkyl silicate | 35 | Spray | E |
| 2259 | 0.835 | 52 | Alkali silicate | 34 | Brush | E |
| 2260 | 0.112 | 88 | Alkyl silicate | 45 | Brush | E |

TABLE 115

| Invention Example No | Average diameter of later-added Zn metal grains (μm) | Diameter distribution (Ave diameter) of Zn metal grains/Zn alloy grains (μm) Fine metal | Diameter distribution (Ave diameter) of Zn metal grains/Zn alloy grains (μm) Coarse metal | Percent of fine-grain metal grains among Zn metal grains/Zn alloy grains (Vol %) | Chemical component content of Zn metal grains/Zn alloy grains (Mass %) Zn | Chemical component content of Zn metal grains/Zn alloy grains (Mass %) Mg | Chemical component content of Zn metal grains/Zn alloy grains (Mass %) Al | Chemical component content of Zn metal grains/Zn alloy grains (Mass %) Si | Alloy grain fracture surfaces or cracks present? | Ave aspect ratio | Ratio of (Zn metal grains or Zn alloy grains):(Later-added Zn metal grains) Zn metal grains/Zn alloy grains | Ratio of (Zn metal grains or Zn alloy grains):(Later-added Zn metal grains) Later-added Zn metal grains |
|---|---|---|---|---|---|---|---|---|---|---|---|---|
| 2261 | 7.82 | 1.96 | 12.54 | 87.50 | 84.8 | 13.7 | 1.5 | 0 | No | 1.22 | 1 | 7.5 |
| 2262 | 5.26 | 1.65 | 8.7 | 30.58 | 87.1 | 12.9 | 0 | 0 | No | 1.23 | 1 | 3.2 |
| 2263 | 7.06 | 2.35 | 8.55 | 68.41 | 95.7 | 4.3 | 0 | 0 | Yes | 1.47 | 1 | 2.6 |
| 2264 | 0.64 | 1.62 | 10.72 | 54.59 | 80.2 | 17.6 | 1 | 1.2 | No | 1.01 | 1 | 3 |
| 2265 | 46.8 | 2.25 | 9.9 | 34.25 | 98.8 | 0.6 | 0.6 | 0 | Yes | 1.04 | 1 | 15.2 |
| 2266 | 16.5 | 2.36 | 9.57 | 37.61 | 86.9 | 10.3 | 1.6 | 1.2 | Yes | 1.05 | 1 | 0.09 |
| 2267 | 13.5 | 2.24 | 10.79 | 45.60 | 92.98 | 7 | 0.02 | 0 | Yes | 1.12 | 1 | 13.5 |
| 2268 | 0.96 | 2.46 | 10.93 | 46.70 | 75.5 | 23.5 | 1 | 0 | Yes | 1.11 | 1 | 135.4 |
| 2269 | 0.96 | 1.56 | 11.02 | 41.22 | 82.5 | 17.5 | 0 | 0 | No | 1.08 | 1 | 3 |
| 2270 | 8.45 | 1.24 | 11.18 | 45.68 | 80.1 | 12.4 | 7.5 | 0 | Yes | 1.47 | 1 | 7.8 |
| 2271 | 2.9 | 1.68 | 11.42 | 22.02 | 85.09 | 14.9 | 0 | 0.01 | Yes | 1.50 | 1 | 10.2 |
| 2272 | 5.4 | 2.65 | 10.8 | 37.03 | 78.7 | 20.7 | 0 | 0.6 | No | 1.13 | 1 | 7 |
| 2273 | 10.6 | 2.22 | 10.65 | 28.46 | 91.29 | 8.6 | 0 | 0.11 | Yes | 1.26 | 1 | 225.2 |
| 2274 | 2.32 | 2.45 | 11.34 | 43.47 | 85.8 | 14.2 | 0 | 0 | Yes | 1.14 | 1 | 5.4 |
| 2275 | 7.8 | 2.23 | 11.62 | 35.19 | 98.12 | 0.08 | 0 | 1.8 | Yes | 1.49 | 1 | 3.2 |
| 2276 | 7.95 | 2.26 | 11.15 | 73.02 | 83.46 | 15.2 | 0 | 1.34 | No | 1.34 | 1 | 13.5 |
| 2277 | 20.59 | 2.72 | 12.38 | 56.20 | 73.17 | 17.4 | 9 | 0.43 | Yes | 1.18 | 1 | 1.6 |
| 2278 | 22.5 | 2.13 | 12.55 | 35.86 | 98.6 | 0.8 | 0.6 | 0 | Yes | 1.17 | 1 | 1.5 |
| 2279 | 4.6 | 1.98 | 9.34 | 93.45 | 93.55 | 6.4 | 0.05 | 0 | Yes | 1.48 | 1 | 2.5 |
| 2280 | 4.9 | 2.02 | 9.58 | 30.66 | 96.78 | 3.2 | 0.02 | 0 | No | 1.49 | 1 | 2.6 |
| 2281 | 10.5 | 2.21 | 9.88 | 74.21 | 83 | 9.2 | 7.8 | 0 | Yes | 1.27 | 1 | 126 |

| Invention Example No | Mg content of all metal grains (Mass %) | Total metal grain content of coat (Mass %) | Base resin type | Coat thickness (μm) | Coating method | Corrosion Test Results |
|---|---|---|---|---|---|---|
| 2261 | 1.612 | 89 | Alkali silicate | 52 | Brush | E |
| 2262 | 3.071 | 86 | Alkyl silicate | 23 | Brush | E |
| 2263 | 1.194 | 87 | Alkali silicate | 5 | Spray | E |
| 2264 | 4.400 | 86 | Alkyl silicate | 52 | Brush | E |
| 2265 | 0.037 | 46 | Alkali silicate | 150 | Brush | E |
| 2266 | 9.450 | 49 | Alkyl silicate | 60 | Brush | E |
| 2267 | 0.483 | 35 | Alkali silicate | 15 | Spray | E |
| 2268 | 0.172 | 37 | Alkyl silicate | 24 | Spray | E |
| 2269 | 4.375 | 36 | Alkali silicate | 34 | Spray | E |
| 2270 | 1.409 | 38 | Alkyl silicate | 20 | Brush | E |
| 2271 | 1.330 | 48 | Alkali silicate | 200 | Brush | E |
| 2272 | 2.588 | 46 | Alkyl silicate | 56 | Brush | E |
| 2273 | 0.038 | 51 | Alkali silicate | 34 | Spray | E |
| 2274 | 2.219 | 46 | Alkyl silicate | 2 | Spray | G |
| 2275 | 0.019 | 38 | Alkali silicate | 15 | Spray | E |
| 2276 | 1.048 | 48 | Alkyl silicate | 10 | Spray | E |
| 2277 | 6.692 | 52 | Alkyl silicate | 125 | Brush | E |
| 2278 | 0.320 | 30 | Alkali silicate | 24 | Brush | E |
| 2279 | 1.829 | 76 | Alkyl silicate | 110 | Brush | E |
| 2280 | 0.889 | 72 | Alkali silicate | 24 | Brush | E |
| 2281 | 0.072 | 81 | Alkyl silicate | 2 | Spray | G |

TABLE 116

| Invention Example No | Average diameter of later-added Zn metal grains (μm) | Diameter distribution (Ave diameter) of Zn metal grains/Zn alloy grains (μm) Fine metal | Diameter distribution (Ave diameter) of Zn metal grains/Zn alloy grains (μm) Coarse metal | Percent of fine-grain metal grains among Zn metal grains/Zn alloy grains (Vol %) | Chemical component content of Zn metal grains/Zn alloy grains (Mass %) Zn | Chemical component Mg | Chemical component Al | Chemical component Si | Alloy grain fracture surfaces or cracks present? | Ave aspect ratio | Ratio of (Zn metal grains or Zn alloy grains):(Later-added Zn metal grains) Zn metal grains/Zn alloy grains | Ratio Later-added Zn metal grains |
|---|---|---|---|---|---|---|---|---|---|---|---|---|
| 2282 | 8.45 | 2.55 | 10 | 55.39 | 70.92 | 19.2 | 9.88 | 0 | Yes | 1.17 | 1 | 120 |
| 2283 | 30.5 | 1.92 | 10.67 | 30.08 | 80.25 | 15.1 | 4.65 | 0 | Yes | 1.16 | 1 | 7.5 |
| 2284 | 49.5 | 1.96 | 11.89 | 45.09 | 81.85 | 14.5 | 3.65 | 0 | Yes | 1.27 | 1 | 6.5 |
| 2285 | 5.9 | 2.11 | 12.03 | 41.41 | 89.45 | 10.5 | 0.05 | 0 | Yes | 1.27 | 1 | 20 |
| 2286 | 4.52 | 2.97 | 12.12 | 17.75 | 87.3 | 7.5 | 5.2 | 0 | Yes | 1.49 | 1 | 0.007 |
| 2287 | 5.96 | 2.36 | 12.28 | 32.76 | 93.9 | 6.1 | 0 | 0.001 | Yes | 1.29 | 1 | 9 |
| 2288 | 5.5 | 3.05 | 12.52 | 30.89 | 82.55 | 16.8 | 0.05 | 0.6 | Yes | 1.23 | 1 | 7.5 |
| 2289 | 3.6 | 2.57 | 11.9 | 45.90 | 70.7 | 27.5 | 1 | 0.8 | Yes | 1.23 | 1 | 50 |
| 2290 | 16.5 | 2.65 | 11.75 | 42.22 | 94.6 | 2.9 | 0 | 2.5 | Yes | 1.23 | 1 | 0.005 |
| 2291 | 12.5 | 2.54 | 12.44 | 18.56 | 94 | 4.5 | 0 | 1.5 | No | 1.23 | 1 | 25.6 |
| 2292 | 16.5 | 2.85 | 12.03 | 33.57 | 99.43 | 0.07 | 0 | 0.5 | Yes | 1.27 | 1 | 56.5 |
| 2293 | 10.9 | 2.75 | 10.61 | 31.70 | 96.82 | 3.1 | 0.04 | 0.04 | Yes | 1.23 | 1 | 1.6 |
| 2294 | 5.6 | 2.46 | 11.3 | 46.71 | 76.3 | 20.5 | 1 | 2.2 | Yes | 1.36 | 1 | 3 |
| 2295 | 22.6 | 2.71 | 11.58 | 47.89 | 68.84 | 29.5 | 0.06 | 1.6 | Yes | 1.11 | 1 | 100 |
| 2296 | 20.59 | 2.36 | 11.11 | 24.23 | 92.33 | 7.6 | 0.07 | 0 | Yes | 1.02 | 1 | 65.5 |
| 2297 | 20.59 | 2.16 | 12.34 | 39.24 | 95.2 | 0.7 | 1.2 | 2.9 | Yes | 1.05 | 1 | 1.9 |
| 2298 | 9.56 | 2.46 | 12.51 | 37.37 | 91.8 | 4.6 | 1.8 | 1.8 | Yes | 1.24 | 1 | 2.1 |
| 2299 | 5.9 | 2.49 | 11.64 | 50.38 | 82 | 8.3 | 9.2 | 0.5 | Yes | 1.33 | 1 | 10.5 |
| 2300 | 6.54 | 1.63 | 9.16 | 37.14 | 88.2 | 11.8 | 0 | 0 | Yes | 1.27 | 1 | 6.5 |
| 2301 | 21.4 | 1.51 | 9.46 | 13.48 | 86.06 | 12.9 | 0 | 1.04 | Yes | 1.50 | 1 | 19.5 |
| 2302 | 9.8 | 3.05 | 9.54 | 40.05 | 99.34 | 0.6 | 0 | 0.06 | Yes | 1.13 | 1 | 0.8 |

| Invention Example No | Coating details Mg content of all metal grains (Mass %) | Coating details Total metal grain content of coat (Mass %) | Base resin type | Coat thickness (μm) | Coating method | Corrosion Test Results |
|---|---|---|---|---|---|---|
| 2282 | 0.159 | 64 | Alkali silicate | 37 | Spray | E |
| 2283 | 1.776 | 69 | Alkyl silicate | 113 | Brush | E |
| 2284 | 1.933 | 83 | Alkali silicate | 2 | Spray | G |
| 2285 | 0.500 | 30 | Alkyl silicate | 75 | Brush | E |
| 2286 | 7.448 | 83 | Alkali silicate | 30 | Brush | E |
| 2287 | 0.610 | 75 | Alkyl silicate | 34 | Brush | E |
| 2288 | 1.976 | 76 | Epoxy resin | 124 | Brush | E |
| 2289 | 0.539 | 72 | Acrylic resin | 15 | Spray | E |
| 2290 | 2.886 | 71 | Urethane resin | 23 | Spray | E |
| 2291 | 0.169 | 82 | Polyester resin | 157 | Brush | E |
| 2292 | 0.001 | 81 | Epoxy resin | 26 | Spray | E |
| 2293 | 1.192 | 83 | Acrylic resin | 38 | Spray | E |
| 2294 | 5.125 | 50 | Urethane resin | 160 | Brush | E |
| 2295 | 0.292 | 72 | Polyester resin | 27 | Brush | E |
| 2296 | 0.114 | 47 | Epoxy resin | 180 | Brush | E |
| 2297 | 0.241 | 47 | Acrylic resin | 26 | Spray | E |
| 2298 | 1.484 | 52 | Urethane resin | 180 | Brush | E |
| 2299 | 0.722 | 52 | Polyester resin | 15 | Spray | E |
| 2300 | 1.573 | 50 | Epoxy resin | 2 | Spray | G |
| 2301 | 0.629 | 46 | Acrylic resin | 28 | Spray | E |
| 2302 | 0.333 | 47 | Urethane resin | 30 | Spray | E |

TABLE 117

| Invention Example No | Average diameter of later-added Zn metal grains (μm) | Diameter distribution (Ave diameter) of Zn metal grains/Zn alloy grains (μm) Fine metal | Diameter distribution (Ave diameter) of Zn metal grains/Zn alloy grains (μm) Coarse metal | Percent of fine-grain metal grains among Zn metal grains/Zn alloy grains (Vol %) | Chemical component content of Zn metal grains/Zn alloy grains (Mass %) Zn | Chemical component (Mass %) Mg | Chemical component (Mass %) Al | Chemical component (Mass %) Si | Alloy grain fracture surfaces or cracks present? | Ave aspect ratio | Ratio of (Zn metal grains or Zn alloy grains):(Later-added Zn metal grains) Zn metal grains/ Zn alloy grains | Ratio Later-added Zn metal grains |
|---|---|---|---|---|---|---|---|---|---|---|---|---|
| 2303 | 6.59 | 2.57 | 9.56 | 38.18 | 89.51 | 9.5 | 0 | 0.99 | No | 1.04 | 1 | 18.5 |
| 2304 | 6.54 | 2.65 | 9.46 | 7.63 | 88.3 | 11.7 | 0 | 0 | Yes | 1.02 | 1 | 4.3 |
| 2305 | 16.5 | 2.54 | 11.99 | 37.95 | 89.9 | 9.4 | 0.7 | 0 | Yes | 1.08 | 1 | 3.2 |
| 2306 | 7.8 | 2.85 | 12.08 | 14.29 | 87.8 | 11.7 | 0.5 | 0 | Yes | 1.15 | 1 | 1.5 |
| 2307 | 16.5 | 2.75 | 12.24 | 40.86 | 95.6 | 4.2 | 0.2 | 0 | Yes | 1.34 | 1 | 4.5 |
| 2308 | 6.54 | 2.46 | 12.48 | 97.50 | 97.13 | 2.8 | 0.07 | 0 | Yes | 1.25 | 1 | 15.5 |
| 2309 | 8.45 | 2.71 | 11.86 | 13.30 | 86.1 | 13.9 | 0 | 0 | Yes | 1.19 | 1 | 10.5 |
| 2310 | 8.5 | 2.36 | 11.71 | 43.62 | 82.6 | 14.6 | 1.6 | 1.2 | No | 1.18 | 1 | 2.5 |
| 2311 | 13.6 | 2.46 | 11.35 | 56.93 | 72.95 | 26.4 | 0.65 | 0 | Yes | 1.24 | 1 | 9 |
| 2312 | 12.33 | 1.45 | 12.02 | 36.59 | 83.23 | 16.5 | 0.27 | 0 | Yes | 1.11 | 1 | 105 |
| 2313 | 16.5 | 2.42 | 13.24 | 39.95 | 79.4 | 19.5 | 0.45 | 0.65 | Yes | 1.27 | 1 | 5.7 |
| 2314 | 7.9 | 2.11 | 9.46 | 86.50 | 97.08 | 1.6 | 0.33 | 0.99 | Yes | 1.31 | 1 | 3.9 |
| 2315 | 10.5 | 2.97 | 13.47 | 32.87 | 90.5 | 6 | 1 | 2.5 | Yes | 1.26 | 1 | 4.5 |
| 2316 | 16.5 | 2.36 | 9.46 | 16.23 | 88.93 | 8.4 | 0.87 | 1.8 | Yes | 1.14 | 1 | 3.6 |
| 2317 | 10.64 | 3.05 | 13.87 | 37.40 | 86.7 | 13.3 | 0 | 0 | Yes | 1.34 | 1 | 16.4 |
| 2318 | 10.5 | 2.57 | 13.25 | 40.76 | 81.4 | 18.6 | 0. | 0 | Yes | 1.16 | 1 | 6 |
| 2319 | 20.59 | 2.65 | 13.1 | 87.31 | 97.34 | 1.8 | 0.86 | 0 | No | 1.47 | 1 | 7.5 |
| 2320 | 8.5 | 2.12 | 9.08 | 92.50 | 95.25 | 4.1 | 0.65 | 0 | Yes | 1.48 | 1 | 10.5 |
| 2321 | 0.5 | 1.65 | 9.87 | 17.93 | 82.87 | 16.7 | 0.43 | 0 | No | 1.49 | 1 | 2.6 |
| 2322 | 10.5 | 2.35 | 9.46 | 44.50 | 99 | 0.4 | 0.6 | 0 | Yes | 1.34 | 1 | 1.5 |
| 2323 | 11.5 | 1.63 | 9.28 | 96.50 | 89.35 | 10.6 | 0.05 | 0 | Yes | 1.29 | 1 | 13.5 |
| 2324 | 36.5 | 2.64 | 9.45 | 16.94 | 93.08 | 6.9 | 0.02 | 0 | Yes | 1.18 | 1 | 2.6 |

| Invention Example No | Mg content of all metal grains (Mass %) | Coating details Total metal grain content of coat (Mass %) | Coating details Base resin type | Coating details Coat thickness (μm) | Coating details Coating method | Corrosion Test Results |
|---|---|---|---|---|---|---|
| 2303 | 0.487 | 83 | Polyester resin | 2 | Spray | G |
| 2304 | 2.208 | 52 | Epoxy resin | 157 | Brush | E |
| 2305 | 2.238 | 89 | Acrylic resin | 28 | Brush | E |
| 2306 | 4.680 | 85 | Alkyl silicate | 130 | Brush | E |
| 2307 | 0.764 | 53 | Alkyl silicate | 29 | Brush | E |
| 2308 | 0.170 | 88 | Epoxy resin | 30 | Brush | E |
| 2309 | 1.209 | 85 | Acrylic resin | 120 | Brush | E |
| 2310 | 4.171 | 52 | Urethane resin | 187 | Brush | E |
| 2311 | 2.640 | 83 | Polyester resin | 28 | Spray | E |
| 2312 | 0.156 | 88 | Epoxy resin | 5 | Spray | E |
| 2313 | 2.910 | 49 | Acrylic resin | 35 | Spray | E |
| 2314 | 0.327 | 50 | Urethane resin | 5 | Spray | G |
| 2315 | 1.091 | 51 | Polyester resin | 200 | Brush | E |
| 2316 | 1.826 | 83 | Alkali silicate | 25 | Spray | E |
| 2317 | 0.764 | 82 | Alkali silicate | 15 | Spray | E |
| 2318 | 2.657 | 88 | Alkyl silicate | 20 | Spray | E |
| 2319 | 0.212 | 85 | Alkyl silicate | 18 | Spray | E |
| 2320 | 0.357 | 87 | Alkyl silicate | 22 | Spray | E |
| 2321 | 4.639 | 86 | Alkali silicate | 19 | Spray | E |
| 2322 | 0.160 | 46 | Alkyl silicate | 29 | Spray | E |
| 2323 | 0.731 | 49 | Alkali silicate | 23 | Spray | E |
| 2324 | 1.917 | 35 | Alkyl silicate | 21 | Spray | E |

TABLE 118

| Invention Example No | Average diameter of later-added Zn metal grains (μm) | Diameter distribution (Ave diameter) of Zn metal grains/Zn alloy grains (μm) | | Percent of fine-grain metal grains among Zn metal grains/Zn alloy grains (Vol %) | Chemical component content of Zn metal grains/Zn alloy grains (Mass %) | | | | Alloy grain fracture surfaces or cracks present? | Ave aspect ratio | Ratio of (Zn metal grains or Zn alloy grains):(Later-added Zn metal grains) | |
|---|---|---|---|---|---|---|---|---|---|---|---|---|
| | | Fine metal | Coarse metal | | Zn | Mg | Al | Si | | | Zn metal grains/Zn alloy grains | Later-added Zn metal grains |
| 2325 | 1.5 | 2.35 | 9.25 | 88.12 | 99.82 | 0.05 | 0.06 | 0.07 | Yes | 1.48 | 1 | 6.5 |
| 2326 | 8.7 | 2.31 | 9.46 | 60.57 | 91.56 | 6.4 | 1.05 | 0.99 | Yes | 1.27 | 1 | 1.6 |
| 2327 | 7.8 | 2.62 | 9.46 | 39.48 | 93.36 | 3.5 | 2.6 | 0.54 | Yes | 1.17 | 1 | 3.8 |
| 2328 | 5.96 | 2.52 | 9.46 | 15.82 | 82.13 | 17.5 | 0.05 | 0.32 | Yes | 1.27 | 1 | 0.08 |
| 2329 | 0.06 | 2.24 | 13.32 | 49.57 | 91.2 | 3.6 | 5.2 | 0 | No | 1.27 | 1 | 164.5 |
| 2330 | 0.9 | 0.05 | 6.54 | 86.52 | 94.1 | 5.9 | 0 | 0.001 | Yes | 1.48 | 1 | 3.6 |
| 2331 | 3.6 | 2.42 | 6.35 | 90.98 | 83.2 | 16.2 | 0 | 0.6 | No | 1.49 | 1 | 8.6 |
| 2332 | 10.5 | 0.11 | 7.54 | 67.32 | 76.7 | 22.5 | 0 | 0.8 | Yes | 1.34 | 1 | 12 |
| 2333 | 0.05 | 1.92 | 8.64 | 82.33 | 96.52 | 3.4 | 0.04 | 0.04 | Yes | 1.23 | 1 | 5.8 |
| 2334 | 2.32 | 0.46 | 6.45 | 73.76 | 68.3 | 26.5 | 3 | 2.2 | Yes | 1.23 | 1 | 10 |
| 2335 | 20.4 | 0.77 | 6.48 | 88.77 | 72.84 | 25.5 | 0.06 | 1.6 | Yes | 1.23 | 1 | 1 |
| 2336 | 8.6 | 2.35 | 9.25 | 45.02 | 87.2 | 12.8 | 0 | 0 | Yes | 1.05 | 1 | 10.5 |
| 2337 | 10.5 | 2.33 | 9.46 | 15.2 | 91.5 | 8.5 | 0 | 0 | Yes | 1.06 | 1 | 6.5 |
| 2338 | 8.7 | 1.95 | 9.32 | 51.41 | 75.23 | 24.5 | 0.27 | 0 | Yes | 1.38 | 1 | 19.5 |
| 2339 | 7.8 | 2.15 | 9.22 | 45.46 | 77.48 | 18.4 | 2.55 | 1.57 | Yes | 1.06 | 1 | 0.8 |
| 2340 | 5.96 | 2.23 | 11.62 | 35.19 | 72.62 | 0.08 | 25.5 | 1.8 | Yes | 1.49 | 1 | 5.3 |
| 2341 | 1.6 | 2.26 | 11.15 | 73.02 | 64.06 | 15.2 | 19.4 | 1.34 | No | 1.34 | 1 | 4.3 |
| 2342 | 7.2 | 1.98 | 9.34 | 93.45 | 83 | 6.4 | 10.6 | 0 | Yes | 1.48 | 1 | 3.2 |
| 2343 | 10.5 | 2.02 | 9.58 | 30.66 | 86.4 | 3.2 | 10.4 | 0 | No | 1.49 | 1 | 1.5 |
| 2344 | 3.6 | 2.36 | 12.28 | 32.76 | 80.4 | 6.1 | 13.5 | 0.001 | Yes | 1.29 | 1 | 4.5 |
| 2345 | 4.5 | 3.05 | 12.52 | 30.89 | 70.1 | 16.8 | 12.5 | 0.6 | Yes | 1.23 | 1 | 0.8 |
| 2346 | 7.9 | 2.57 | 11.9 | 45.9 | 60.9 | 27.5 | 10.8 | 0.8 | Yes | 1.23 | 1 | 6.5 |

| Invention Example No | Mg content of all metal grains (Mass %) | Coating details | | | | Corrosion Test Results |
|---|---|---|---|---|---|---|
| | | Total metal grain content of coat (Mass %) | Base resin type | Coat thickness (μm) | Coating method | |
| 2325 | 0.007 | 30 | Alkali silicate | 19 | Spray | E |
| 2326 | 2.462 | 76 | Alkyl silicate | 15 | Spray | E |
| 2327 | 0.729 | 72 | Alkali silicate | 18 | Spray | E |
| 2328 | 16.204 | 30 | Alkyl silicate | 22 | Spray | E |
| 2329 | 0.022 | 83 | Alkyl silicate | 21 | Spray | E |
| 2330 | 1.283 | 75 | Alkyl silicate | 29 | Spray | E |
| 2331 | 1.688 | 76 | Alkali silicate | 23 | Spray | E |
| 2332 | 1.731 | 72 | Alkyl silicate | 21 | Spray | E |
| 2333 | 0.500 | 83 | Alkali silicate | 19 | Spray | E |
| 2334 | 2.409 | 50 | Alkyl silicate | 21 | Spray | E |
| 2335 | 12.750 | 72 | Alkali silicate | 19 | Spray | E |
| 2336 | 1.113 | 50 | Acrylic resin | 654 | Spray | E |
| 2337 | 1.133 | 48 | Alkali silicate | 700 | Spray | E |
| 2338 | 1.195 | 75 | Alkyl silicate | 555 | Spray | E |
| 2339 | 10.222 | 55 | Alkyl silicate | 321 | Spray | E |
| 2340 | 0.013 | 38 | Alkyl silicate | 152 | Brush | E |
| 2341 | 2.868 | 48 | Urethane resin | 674 | Spray | E |
| 2342 | 1.524 | 76 | Polyester resin | 325 | Spray | E |
| 2343 | 1.280 | 72 | Alkyl silicate | 665 | Spray | E |
| 2344 | 1.109 | 75 | Alkyl silicate | 354 | Brush | E |
| 2345 | 9.333 | 76 | Alkyl silicate | 165 | Spray | E |
| 2346 | 3.667 | 72 | Urethane resin | 354 | Spray | E |

TABLE 119

| Invention Example No | Average diameter of later-added Zn metal grains (μm) | Diameter distribution (peak diameter) of Zn metal grains/Zn alloy grains (μm) | | Percent of fine-grain metal grains among Zn metal grains/Zn alloy grains (Vol %) | Chemical component content of Zn metal grains/Zn alloy grains (Mass %) | | | | Alloy grain fracture surfaces or cracks present? | Ave aspect ratio | Mg solid solution phase and Zn—Mg intermetallic compounds present on grain surfaces? | Any of MgZn2, Mg2Zn11, Mg2Zn3, MgZn, Mg7Zn3 present? |
|---|---|---|---|---|---|---|---|---|---|---|---|---|
| | | Fine metal | Coarse metal | | Zn | Mg | Al | Si | | | | |
| 2347 | 16.5 | 2.35 | 9.25 | 35.87 | 88.8 | 11.2 | 0 | 0 | Yes | 1.12 | Yes | Yes |
| 2348 | 13.5 | 2.57 | 9.56 | 42.04 | 90.6 | 9.4 | 0 | 0 | No | 1.38 | Yes | Yes |
| 2349 | 0.96 | 2.56 | 9.84 | 6.55 | 81.45 | 18.5 | 0 | 0.5 | Yes | 1.22 | Yes | Yes |
| 2350 | 0.96 | 2.21 | 9.75 | 43.60 | 99.97 | 0.03 | 0 | 0 | Yes | 1.14 | Yes | Yes |
| 2351 | 8.45 | 2.64 | 9.85 | 44.12 | 98.4 | 1.6 | 0 | 0 | No | 1.02 | Yes | Yes |
| 2352 | 2.9 | 1.99 | 8.56 | 37.21 | 93.2 | 6.8 | 0 | 0 | Yes | 1.05 | Yes | Yes |
| 2353 | 5.4 | 2.94 | 8.21 | 43.38 | 84.5 | 13.9 | 0 | 1.6 | No | 1.36 | No | Yes |
| 2354 | 10.6 | 2.58 | 8.33 | 13.52 | 98.1 | 1.9 | 0 | 0 | Yes | 1.11 | No | Yes |
| 2355 | 2.32 | 2.37 | 8 | 44.94 | 94.3 | 5.7 | 0 | 0 | No | 1.07 | Yes | Yes |
| 2356 | 7.8 | 2.15 | 9.22 | 45.46 | 90.8 | 9.2 | 0 | 0 | No | 1.42 | Yes | Yes |
| 2357 | 7.95 | 2.96 | 9.36 | 35.96 | 83.3 | 15.4 | 0 | 1.3 | Yes | 1.38 | No | Yes |
| 2358 | 20.59 | 2.85 | 9.45 | 42.13 | 79.84 | 18.6 | 0 | 1.56 | Yes | 1.22 | No | Yes |
| 2359 | 22.5 | 2.94 | 9.61 | 7.56 | 96.4 | 3.6 | 0 | 0 | Yes | 1.14 | Yes | Yes |
| 2360 | 4.6 | 2.11 | 9.85 | 43.69 | 94.6 | 5.4 | 0 | 0 | Yes | 1.13 | Yes | Yes |
| 2361 | 4.9 | 2.68 | 9.23 | 44.21 | 92.4 | 7.6 | 0 | 0 | Yes | 1.02 | No | Yes |
| 2362 | 10.5 | 2.99 | 9.08 | 39.51 | 75.5 | 24.5 | 0 | 0 | Yes | 1.06 | Yes | Yes |
| 2363 | 8.45 | 2.78 | 9.87 | 45.68 | 82.4 | 17.6 | 0 | 0 | Yes | 1.05 | Yes | Yes |
| 2364 | 30.5 | 2.96 | 9.46 | 65.58 | 98.6 | 1.4 | 0 | 0 | Yes | 1.24 | No | Yes |
| 2365 | 49.5 | 2.85 | 9.28 | 47.24 | 78.5 | 21.5 | 0 | 0 | Yes | 1.33 | No | Yes |
| 2366 | 5.9 | 2.64 | 9.45 | 47.76 | 89.6 | 10.4 | 0 | 0 | Yes | 1.27 | Yes | Yes |

| Invention Example No | Ratio of (Zn metal grains or Zn alloy grains):(Later-added Zn metal grains) | | Mg content of all metal grains (Mass %) | Coating details | | | | |
|---|---|---|---|---|---|---|---|---|
| | Zn metal grains/Zn alloy grains | Later-added Zn metal grains | | Total metal grain content of coat (Mass %) | Base resin type | Coat thickness (μm) | Coating method | Corrosion Test Results |
| 2347 | 1 | 5 | 1.867 | 49 | Alkyl silicate | 14 | Spray | E |
| 2348 | 1 | 198.7 | 0.047 | 89 | Urethane resin | 55 | Spray | E |
| 2349 | 1 | 1 | 9.250 | 90 | Alkyl silicate | 8 | Spray | E |
| 2350 | 1 | 1.5 | 0.012 | 86 | Urethane resin | 122 | Brush | E |
| 2351 | 1 | 0.008 | 1.587 | 48 | Alkyl silicate | 555 | Spray | E |
| 2352 | 1 | 1.4 | 2.833 | 47 | Alkali silicate | 19 | Spray | E |
| 2353 | 1 | 4.2 | 2.673 | 47 | Alkyl silicate | 25 | Brush | E |
| 2354 | 1 | 1.6 | 0.731 | 47 | Alkyl silicate | 58 | Spray | E |
| 2355 | 1 | 7.5 | 0.671 | 52 | Alkyl silicate | 685 | Spray | E |
| 2356 | 1 | 1.6 | 3.538 | 52 | Alkali silicate | 19 | Brush | E |
| 2357 | 1 | 2 | 5.133 | 52 | Urethane resin | 700 | Spray | E |
| 2358 | 1 | 270 | 0.069 | 88 | Alkyl silicate | 77 | Spray | E |
| 2359 | 1 | 7.5 | 0.424 | 87 | Alkyl silicate | 54 | Spray | E |
| 2360 | 1 | 2.9 | 1.385 | 89 | Alkyl silicate | 64 | Spray | E |
| 2361 | 1 | 2.6 | 2.111 | 90 | Alkyl silicate | 34 | Brush | E |
| 2362 | 1 | 0.1 | 22.273 | 91 | Alkali silicate | 28 | Spray | E |

TABLE 119-continued

|  |  |  |  |  |  |  |  |  |
|---|---|---|---|---|---|---|---|---|
| 2363 | 1 | 1.2 | 8.000 | 46 | Urethane resin | 109 | Brush | E |
| 2364 | 1 | 1.2 | 0.636 | 47 | Alkyl silicate | 15 | Spray | E |
| 2365 | 1 | 62 | 0.341 | 47 | Alkyl silicate | 14 | Spray | E |
| 2366 | 1 | 2.4 | 3.059 | 49 | Alkyl silicate | 18 | Spray | E |

TABLE 120

| Invention Example No | Average diameter of later-added Zn metal grains (μm) | Diameter distribution (peak diameter) of Zn metal grains/Zn alloy grains (μm) | | Percent of fine-grain metal grains among Zn metal grains/Zn alloy grains (Vol %) | Chemical component content of Zn metal grains/Zn alloy grains (Mass %) | | | | Alloy grain fracture surfaces or cracks present? | Ave aspect ratio | Mg solid solution phase and Zn—Mg intermetallic compounds present on grain surfaces? | Any of MgZn2, Mg2Zn11, Mg2Zn3, MgZn, Mg7Zn3 present? |
|---|---|---|---|---|---|---|---|---|---|---|---|---|
| | | Fine metal | Coarse metal | | Zn | Mg | Al | Si | | | | |
| 2367 | 4.52 | 2.35 | 9.25 | 45.02 | 87.2 | 12.8 | 0 | 0 | Yes | 1.05 | Yes | Yes |
| 2368 | 5.96 | 2.12 | 9.46 | 47.02 | 92.2 | 7.8 | 0 | 0 | Yes | 1.22 | No | Yes |
| 2369 | 5.5 | 2.34 | 9.46 | 7.66 | 70.5 | 29.5 | 0 | 0 | Yes | 1.13 | No | Yes |
| 2370 | 3.6 | 2.33 | 9.46 | 15.20 | 91.5 | 8.5 | 0 | 0 | Yes | 1.06 | Yes | Yes |
| 2371 | 16.5 | 2.23 | 9.06 | 43.16 | 74.5 | 25.5 | 0 | 0 | Yes | 1.05 | Yes | Yes |
| 2372 | 12.5 | 2.12 | 9.3 | 49.33 | 99.93 | 0.07 | 0 | 0 | Yes | 1.24 | Yes | Yes |
| 2373 | 16.5 | 2.21 | 8.68 | 19.47 | 89.2 | 10.8 | 0 | 0 | No | 1.05 | Yes | Yes |
| 2374 | 10.9 | 1.38 | 8.53 | 69.55 | 86 | 11.2 | 1.6 | 1.2 | No | 1.12 | Yes | Yes |
| 2375 | 5.6 | 1.95 | 9.32 | 51.41 | 75.23 | 24.5 | 0.27 | 0 | Yes | 1.38 | No | Yes |
| 2376 | 22.6 | 2.26 | 8.95 | 75.88 | 82.6 | 17.4 | 0 | 0 | Yes | 1.13 | No | Yes |
| 2377 | 20.59 | 2.05 | 12.54 | 48.08 | 98.7 | 1.3 | 0 | 0 | Yes | 1.33 | Yes | Yes |
| 2378 | 20.59 | 1.65 | 8.7 | 66.85 | 80.5 | 19.5 | 0 | 0 | Yes | 1.27 | Yes | Yes |
| 2379 | 9.56 | 2.35 | 8.55 | 7.68 | 88.85 | 10.8 | 0.05 | 0.3 | No | 1.23 | No | Yes |
| 2380 | 5.9 | 1.62 | 8.91 | 8.64 | 87.7 | 11.9 | 0.4 | 0 | Yes | 1.11 | Yes | Yes |
| 2381 | 6.54 | 1.88 | 9.91 | 16.58 | 90.5 | 9.5 | 0 | 0 | Yes | 1.42 | Yes | Yes |
| 2382 | 21.4 | 2.35 | 9.25 | 35.87 | 89.5 | 10.5 | 0 | 0 | Yes | 1.06 | No | Yes |
| 2383 | 9.8 | 2.57 | 9.56 | 42.04 | 84.9 | 15.1 | 0 | 0 | Yes | 1.05 | Yes | Yes |
| 2384 | 6.59 | 2.56 | 9.84 | 38.41 | 83.2 | 16.8 | 0 | 0 | Yes | 1.07 | Yes | Yes |
| 2385 | 6.54 | 2.21 | 9.75 | 6.99 | 89.4 | 10.6 | 0 | 0 | Yes | 1.42 | No | Yes |
| 2386 | 16.5 | 2.64 | 9.85 | 44.12 | 84.3 | 13.3 | 2.4 | 0 | Yes | 1.38 | Yes | Yes |

| Invention Example No | Ratio of (Zn metal grains or Zn alloy grains):(Later-added Zn metal grains) | | Mg content of all metal grains (Mass %) | Total metal grain content of coat (Mass %) | Coating details | | | Corrosion Test Results |
|---|---|---|---|---|---|---|---|---|
| | Zn metal grains/ Zn alloy grains | Later-added Zn metal grains | | | Base resin type | Coat thickness (μm) | Coating method | |
| 2367 | 1 | 2.1 | 4.129 | 50 | Alkali silicate | 2 | Spray | G |
| 2368 | 1 | 34.5 | 0.220 | 87 | Alkyl silicate | 37 | Spray | E |
| 2369 | 1 | 270 | 0.109 | 83 | Alkali silicate | 12 | Spray | E |
| 2370 | 1 | 32.5 | 0.254 | 48 | Alkyl silicate | 160 | Brush | E |
| 2371 | 1 | 3 | 6.375 | 51 | Alkali silicate | 5 | Brush | G |
| 2372 | 1 | 1.5 | 0.028 | 51 | Alkyl silicate | 56 | Brush | E |
| 2373 | 1 | 7.5 | 1.271 | 87 | Alkali silicate | 2 | Spray | G |
| 2374 | 1 | 13.5 | 0.772 | 85 | Alkyl silicate | 18 | Spray | E |
| 2375 | 1 | 5 | 4.083 | 86 | Alkyl silicate | 23 | Spray | E |
| 2376 | 1 | 5 | 2.900 | 50 | Epoxy resin | 30 | Brush | E |

TABLE 120-continued

| | | | | | | | | |
|---|---|---|---|---|---|---|---|---|
| 2377 | 1 | 1 | 0.650 | 51 | Acrylic resin | 77 | Brush | E |
| 2378 | 1 | 120 | 0.161 | 51 | Urethane resin | 655 | Brush | E |
| 2379 | 1 | 3.7 | 2.298 | 80 | Polyester resin | 47 | Spray | E |
| 2380 | 1 | 6.1 | 1.676 | 46 | Epoxy resin | 43 | Spray | E |
| 2381 | 1 | 198.5 | 0.048 | 51 | Acrylic resin | 52 | Brush | E |
| 2382 | 1 | 2.5 | 3.000 | 86 | Urethane resin | 20 | Brush | E |
| 2383 | 1 | 18.5 | 0.774 | 85 | Polyester resin | 200 | Brush | E |
| 2384 | 1 | 8 | 1.867 | 82 | Alkali silicate | 22 | Spray | E |
| 2385 | 1 | 1.6 | 4.077 | 81 | Alkyl silicate | 25 | Spray | E |
| 2386 | 1 | 1.2 | 6.045 | 46 | Alkali silicate | 14 | Spray | E |

TABLE 121

| Invention Example No | Average diameter of later-added Zn metal grains (μm) | Diameter distribution (peak diameter) of Zn metal grains/Zn alloy grains (μm) | | Percent of fine-grain metal grains among Zn metal grains/Zn alloy grains (Vol %) | Chemical component content of Zn metal grains/Zn alloy grains (Mass %) | | | | Alloy grain fracture surfaces or cracks present? | Ave aspect ratio | Mg solid solution phase and Zn—Mg intermetallic compounds present on grain surfaces? | Any of MgZn2, Mg2Zn11, Mg2Zn3, MgZn, Mg7Zn3 present? |
|---|---|---|---|---|---|---|---|---|---|---|---|---|
| | | Fine metal | Coarse metal | | Zn | Mg | Al | Si | | | | |
| 2387 | 7.8 | 2.65 | 8.56 | 66.99 | 98.6 | 1.4 | 0 | 0 | No | 1.22 | Yes | Yes |
| 2388 | 16.5 | 2.94 | 8.21 | 43.38 | 76.45 | 23.5 | 0 | 0.05 | Yes | 1.14 | Yes | Yes |
| 2389 | 6.54 | 2.58 | 8.33 | 39.75 | 91.1 | 8.9 | 0 | 0 | Yes | 1.13 | Yes | Yes |
| 2390 | 8.45 | 2.37 | 8 | 65.38 | 85.1 | 14.9 | 0 | 0 | Yes | 1.02 | Yes | Yes |
| 2391 | 8.5 | 2.15 | 9.22 | 45.46 | 77.48 | 18.4 | 2.55 | 1.57 | Yes | 1.06 | Yes | Yes |
| 2392 | 13.6 | 2.96 | 9.36 | 22.55 | 97.9 | 2.1 | 0 | 0 | Yes | 1.05 | Yes | Yes |
| 2393 | 12.33 | 2.85 | 9.45 | 42.13 | 94.8 | 5.2 | 0 | 0 | Yes | 1.24 | Yes | Yes |
| 2394 | 16.5 | 2.94 | 9.61 | 38.50 | 84.6 | 15.4 | 0 | 0 | Yes | 1.33 | Yes | Yes |
| 2395 | 7.9 | 2.11 | 9.85 | 64.13 | 89.3 | 10.7 | 0 | 0 | Yes | 1.27 | Yes | Yes |
| 2396 | 10.5 | 2.68 | 9.23 | 44.21 | 83.3 | 16.7 | 0 | 0 | Yes | 1.05 | Yes | Yes |
| 2397 | 16.5 | 2.99 | 9.08 | 39.51 | 80.05 | 19.6 | 0.35 | 0 | No | 1.12 | Yes | Yes |
| 2398 | 10.64 | 1.82 | 9.87 | 78.64 | 85.5 | 14.5 | 0 | 0 | No | 1.23 | Yes | Yes |
| 2399 | 10.5 | 1.42 | 9.46 | 42.05 | 85 | 14.2 | 0 | 0.8 | No | 1.36 | Yes | Yes |
| 2400 | 20.59 | 2.12 | 9.28 | 64.58 | 87.3 | 12.7 | 0 | 0 | No | 1.11 | Yes | Yes |
| 2401 | 8.5 | 1.92 | 9.45 | 47.76 | 89.5 | 10.5 | 0 | 0 | Yes | 1.07 | Yes | Yes |
| 2402 | 0.5 | 2.11 | 9.63 | 24.10 | 87.3 | 11.8 | 0 | 0.9 | Yes | 1.42 | Yes | Yes |
| 2403 | 10.5 | 2.97 | 9.16 | 39.11 | 86.4 | 12.8 | 0.5 | 0.3 | Yes | 1.38 | Yes | Yes |
| 2404 | 11.5 | 2.36 | 10.39 | 19.65 | 93.8 | 6.2 | 0 | 0 | Yes | 1.22 | Yes | Yes |
| 2405 | 36.5 | 3.05 | 10.56 | 65.39 | 83.8 | 16.2 | 0 | 0 | Yes | 1.14 | Yes | Yes |
| 2406 | 1.5 | 2.15 | 10.74 | 48.57 | 80.4 | 19.6 | 0 | 0 | Yes | 1.13 | Yes | Yes |

| Invention Example No | Ratio of (Zn metal grains or Zn alloy grains):(Later-added Zn metal grains) | | Mg content of all metal grains (Mass %) | Coating details | | | | |
|---|---|---|---|---|---|---|---|---|
| | Zn metal grains/Zn alloy grains | Later-added Zn metal grains | | Total metal grain content of coat (Mass %) | Base resin type | Coat thickness (μm) | Coating method | Corrosion Test Results |
| 2387 | 1 | 0.5 | 0.933 | 47 | Urethane resin | 112 | Spray | E |
| 2388 | 1 | 9 | 2.350 | 48 | Alkali silicate | 24 | Spray | E |
| 2389 | 1 | 4.5 | 1.618 | 51 | Urethane resin | 150 | Spray | E |
| 2390 | 1 | 136 | 0.109 | 53 | Alkali silicate | 18 | Spray | E |
| 2391 | 1 | 13 | 1.314 | 88 | Alkyl silicate | 19 | Brush | E |

TABLE 121-continued

| | | | | | | | | | |
|---|---|---|---|---|---|---|---|---|---|
| 2392 | 1 | 10.6 | 0.181 | 85 | Alkyl silicate | 24 | Spray | E | |
| 2393 | 1 | 1.6 | 2.000 | 83 | Urethane resin | 99 | Spray | E | |
| 2394 | 1 | 68 | 0.223 | 82 | Alkyl silicate | 7 | Spray | E | |
| 2395 | 1 | 4.5 | 1.945 | 83 | Epoxy resin | 100 | Spray | E | |
| 2396 | 1 | 10.5 | 1.452 | 47 | Alkyl silicate | 27 | Brush | E | |
| 2397 | 1 | 4.9 | 3.322 | 51 | Alkali silicate | 15 | Spray | E | |
| 2398 | 1 | 10.5 | 1.261 | 52 | Alkyl silicate | 14 | Spray | E | |
| 2399 | 1 | 192 | 0.074 | 51 | Urethane resin | 55 | Spray | E | |
| 2400 | 1 | 0.07 | 11.869 | 52 | Alkyl silicate | 8 | Spray | E | |
| 2401 | 1 | 9.5 | 1.000 | 89 | Urethane resin | 122 | Brush | E | |
| 2402 | 1 | 2.6 | 3.278 | 85 | Alkyl silicate | 54 | Spray | E | |
| 2403 | 1 | 4.5 | 2.327 | 82 | Alkali silicate | 19 | Spray | E | |
| 2404 | 1 | 3 | 1.550 | 87 | Alkyl silicate | 25 | Brush | E | |
| 2405 | 1 | 7.5 | 1.906 | 88 | Alkyl silicate | 58 | Spray | E | |
| 2406 | 1 | 77 | 0.251 | 49 | Alkyl silicate | 21 | Spray | E | |

TABLE 122

| Invention Example No | Average diameter of later-added Zn metal grains (μm) | Diameter distribution (peak diameter) of Zn metal grains/Zn alloy grains (μm) | | Percent of fine-grain metal grains among Zn metal grains/Zn alloy grains (Vol %) | Chemical component content of Zn metal grains/Zn alloy grains (Mass %) | | | | Alloy grain fracture surfaces or cracks present? | Ave aspect ratio | Mg solid solution phase and Zn—Mg intermetallic compounds present on grain surfaces? | Any of MgZn2, Mg2Zn11, Mg2Zn3, MgZn, Mg7Zn3 present? |
|---|---|---|---|---|---|---|---|---|---|---|---|---|
| | | Fine metal | Coarse metal | | Zn | Mg | Al | Si | | | | |
| 2407 | 8.7 | 2.19 | 10.27 | 24.91 | 87.6 | 12.4 | 0 | 0 | Yes | 1.02 | Yes | Yes |
| 2408 | 7.8 | 2.48 | 11.5 | 39.92 | 89.3 | 10.7 | 0 | 0 | Yes | 1.06 | Yes | Yes |
| 2409 | 5.96 | 2.85 | 11.67 | 22.65 | 91.5 | 8.5 | 0 | 0 | Yes | 1.05 | Yes | Yes |
| 2410 | 0.06 | 2.75 | 11.85 | 66.20 | 94.9 | 5.1 | 0 | 0 | Yes | 1.24 | Yes | Yes |
| 2411 | 0.9 | 2.46 | 11.38 | 49.38 | 75.5 | 24.5 | 0 | 0 | Yes | 1.33 | Yes | Yes |
| 2412 | 3.6 | 2.71 | 12.61 | 30.58 | 86.5 | 13.5 | 0 | 0 | Yes | 1.27 | Yes | Yes |
| 2413 | 10.5 | 2.36 | 12.78 | 45.59 | 80 | 20 | 0 | 0 | Yes | 1.05 | Yes | Yes |
| 2414 | 0.05 | 2.16 | 9.57 | 28.32 | 84.5 | 15.5 | 0 | 0 | Yes | 1.12 | Yes | Yes |
| 2415 | 2.32 | 2.46 | 9.81 | 71.87 | 88 | 10.5 | 1.5 | 0 | Yes | 1.23 | Yes | Yes |
| 2416 | 20.4 | 2.49 | 8.43 | 53.05 | 92.1 | 7.9 | 0 | 0 | Yes | 1.36 | Yes | Yes |
| 2417 | 7.34 | 2.95 | 8.55 | 27.74 | 95.2 | 4.8 | 0 | 0 | Yes | 1.11 | Yes | Yes |
| 2418 | 9.4 | 2.36 | 8.22 | 42.75 | 81.6 | 18.4 | 0 | 0 | Yes | 1.07 | Yes | Yes |
| 2419 | 23.43 | 2.21 | 9.44 | 23.29 | 86.8 | 12.7 | 0 | 0.5 | Yes | 1.42 | Yes | Yes |
| 2420 | 5.96 | 2.25 | 9.58 | 61.12 | 89.7 | 10.3 | 0 | 0 | No | 1.38 | Yes | Yes |
| 2421 | 10.64 | 2.44 | 9.67 | 44.30 | 71.2 | 20.8 | 8 | 0 | Yes | 1.22 | Yes | Yes |
| 2422 | 16.5 | 2.78 | 9.83 | 23.96 | 97.5 | 2.5 | 0 | 0 | No | 1.14 | Yes | Yes |
| 2423 | 7.95 | 2.15 | 10.07 | 44.09 | 84.8 | 15.2 | 0 | 0 | Yes | 1.13 | Yes | Yes |
| 2424 | 7.95 | 2.19 | 9.45 | 24.63 | 80.8 | 19.2 | 0 | 0 | No | 1.02 | Yes | Yes |
| 2425 | 9.64 | 2.48 | 9.3 | 62.46 | 78.7 | 13.5 | 7.8 | 0 | Yes | 1.06 | Yes | Yes |

TABLE 122-continued

| Invention Example No | Ratio of (Zn metal grains or Zn alloy grains):(Later-added Zn metal grains) | | Mg content of all metal grains (Mass %) | Coating details | | | | |
|---|---|---|---|---|---|---|---|---|
| | Zn metal grains/ Zn alloy grains | Later-added Zn metal grains | | Total metal grain content of coat (Mass %) | Base resin type | Coat thickness (μm) | Coating method | Corrosion Test Results |
| 2407 | 1 | 10.5 | 1.078 | 50 | Alkali silicate | 19 | Brush | E |
| 2408 | 1 | 15.5 | 0.648 | 51 | Urethane resin | 56 | Spray | E |
| 2409 | 1 | 5.8 | 1.250 | 22 | Alkyl silicate | 77 | Spray | E |
| 2410 | 1 | 1.9 | 1.759 | 53 | Alkyl silicate | 12 | Spray | E |
| 2411 | 1 | 16.9 | 1.369 | 88 | Alkyl silicate | 64 | Spray | E |
| 2412 | 1 | 1.5 | 5.400 | 85 | Alkyl silicate | 34 | Brush | E |
| 2413 | 1 | 0.05 | 19.048 | 83 | Alkali silicate | 28 | Spray | E |
| 2414 | 1 | 215 | 0.072 | 81 | Urethane resin | 109 | Brush | E |
| 2415 | 1 | 4.2 | 2.019 | 80 | Alkyl silicate | 15 | Spray | E |
| 2416 | 1 | 1.5 | 3.160 | 47 | Alkyl silicate | 14 | Spray | E |
| 2417 | 1 | 4.8 | 0.828 | 49 | Alkyl silicate | 18 | Spray | E |
| 2418 | 1 | 0.5 | 12.267 | 50 | Urethane resin | 122 | Brush | E |
| 2419 | 1 | 2.3 | 3.848 | 51 | Alkyl silicate | 54 | Spray | E |
| 2420 | 1 | 0.05 | 9.810 | 52 | Alkali silicate | 19 | Spray | E |
| 2421 | 1 | 120 | 0.172 | 83 | Alkyl silicate | 25 | Brush | E |
| 2422 | 1 | 3.7 | 0.532 | 88 | Alkyl silicate | 58 | Spray | E |
| 2423 | 1 | 16.5 | 0.869 | 85 | Alkyl silicate | 21 | Spray | E |
| 2424 | 1 | 24 | 0.768 | 83 | Alkali silicate | 19 | Brush | E |
| 2425 | 1 | 0.01 | 13.366 | 82 | Urethane resin | 56 | Spray | E |

TABLE 123

| Invention Example No | Average diameter of later-added Zn metal grains (μm) | Diameter distribution (peak diameter) of Zn metal grains/Zn alloy grains (μm) | | Percent of fine-grain metal grains among Zn metal grains/Zn alloy grains (Vol %) | Chemical component content of Zn metal grains/Zn alloy grains (Mass %) | | | | Alloy grain fracture surfaces or cracks present? | Ave aspect ratio | Mg solid solution phase and Zn—Mg intermetallic compounds present on grain surfaces? | Any of MgZn2, Mg2Zn11, Mg2Zn3, MgZn, Mg7Zn3 present? |
|---|---|---|---|---|---|---|---|---|---|---|---|---|
| | | Fine metal | Coarse metal | | Zn | Mg | Al | Si | | | | |
| 2426 | 0.96 | 2.59 | 9.99 | 45.64 | 88.1 | 11.9 | 0 | 0 | No | 1.05 | Yes | Yes |
| 2427 | 5.26 | 2.47 | 9.58 | 25.30 | 88.5 | 10.6 | 0 | 0.9 | Yes | 1.24 | Yes | Yes |
| 2428 | 13.5 | 2.69 | 9.4 | 42.84 | 84.6 | 15.4 | 0 | 0 | Yes | 1.33 | Yes | Yes |
| 2429 | 13.5 | 2.57 | 9.57 | 25.44 | 97.4 | 2.6 | 0 | 0 | Yes | 1.27 | Yes | Yes |
| 2430 | 9.64 | 2.49 | 9.54 | 63.27 | 83.3 | 16.7 | 0 | 0 | Yes | 1.37 | Yes | Yes |
| 2431 | 16.5 | 2.68 | 9.58 | 46.45 | 91.9 | 8.1 | 0 | 0 | Yes | 1.10 | Yes | Yes |
| 2432 | 20.59 | 2.35 | 9.25 | 46.45 | 86.3 | 13.7 | 0 | 0 | Yes | 1.04 | Yes | Yes |
| 2433 | 0.96 | 2.48 | 10.04 | 50.91 | 81.5 | 18.5 | 0 | 0 | Yes | 1.02 | Yes | Yes |
| 2434 | 6.54 | 2.13 | 11.27 | 27.25 | 97.6 | 2.4 | 0 | 0 | Yes | 1.01 | Yes | Yes |
| 2435 | 5.26 | 1.93 | 11.44 | 42.26 | 89.1 | 10.9 | 0 | 0 | Yes | 1.08 | Yes | Yes |

TABLE 123-continued

| | | | | | | | | | | | | |
|---|---|---|---|---|---|---|---|---|---|---|---|---|
| 2436 | 10.64 | 2.05 | 8.9 | 33.69 | 92.8 | 7.2 | 0 | 0 | Yes | 1.14 | Yes | Yes |
| 2437 | 9.64 | 1.42 | 8.75 | 48.70 | 81.96 | 17.5 | 0.5 | 0.04 | No | 1.23 | Yes | Yes |
| 2438 | 6.9 | 1.46 | 9.44 | 29.24 | 85.4 | 14.6 | 0 | 0 | No | 1.33 | Yes | Yes |
| 2439 | 10.5 | 1.75 | 9.03 | 67.07 | 90.6 | 9.4 | 0 | 0 | Yes | 1.37 | Yes | Yes |
| 2440 | 13.5 | 1.86 | 8.85 | 50.25 | 92.9 | 7.1 | 0 | 0 | Yes | 1.44 | Yes | Yes |
| 2441 | 20.59 | 1.74 | 8.95 | 29.91 | 77.5 | 22.5 | 0 | 0 | Yes | 1.21 | Yes | Yes |
| 2442 | 7.82 | 1.96 | 12.54 | 87.50 | 84.8 | 13.7 | 1.5 | 0 | No | 1.22 | Yes | Yes |
| 2443 | 5.26 | 1.65 | 8.7 | 30.58 | 87.1 | 12.9 | 0 | 0 | No | 1.23 | Yes | Yes |
| 2444 | 7.06 | 2.35 | 8.55 | 68.41 | 95.7 | 4.3 | 0 | 0 | Yes | 1.47 | Yes | Yes |
| 2445 | 0.64 | 1.62 | 10.72 | 54.59 | 80.2 | 17.6 | 1 | 1.2 | No | 1.01 | Yes | Yes |

| | Ratio of (Zn metal grains or Zn alloy grains):(Later-added Zn metal grains) | | | Coating details | | | | |
|---|---|---|---|---|---|---|---|---|
| Invention Example No | Zn metal grains/ Zn alloy grains | Later-added Zn metal grains | Mg content of all metal grains (Mass %) | Total metal grain content of coat (Mass %) | Base resin type | Coat thickness (μm) | Coating method | Corrosion Test Results |
| 2426 | 1 | 7.8 | 1.352 | 47 | Alkyl silicate | 77 | Spray | E |
| 2427 | 1 | 1.6 | 4.077 | 46 | Alkyl silicate | 54 | Spray | E |
| 2428 | 1 | 3.2 | 3.667 | 49 | Alkali silicate | 2 | Spray | G |
| 2429 | 1 | 5.4 | 0.406 | 50 | Alkali silicate | 20 | Spray | E |
| 2430 | 1 | 220 | 0.076 | 51 | Alkali silicate | 5 | Spray | G |
| 2431 | 1 | 2.2 | 2.531 | 83 | Alkyl silicate | 20 | Spray | E |
| 2432 | 1 | 2.8 | 3.605 | 82 | Alkali silicate | 15 | Brush | E |
| 2433 | 1 | 12 | 1.423 | 88 | Alkyl silicate | 57 | Brush | E |
| 2434 | 1 | 10.6 | 0.207 | 85 | Alkali silicate | 13 | Brush | E |
| 2435 | 1 | 35 | 0.303 | 86 | Alkyl silicate | 22 | Brush | E |
| 2436 | 1 | 125.5 | 0.057 | 47 | Alkali silicate | 20 | Spray | E |
| 2437 | 1 | 6 | 2.500 | 48 | Alkyl silicate | 27 | Spray | E |
| 2438 | 1 | 34 | 0.417 | 50 | Alkali silicate | 15 | Spray | E |
| 2439 | 1 | 1.6 | 3.615 | 51 | Alkyl silicate | 35 | Spray | E |
| 2440 | 1 | 7.5 | 0.835 | 52 | Alkali silicate | 34 | Brush | E |
| 2441 | 1 | 200 | 0.112 | 88 | Alkyl silicate | 45 | Brush | E |
| 2442 | 1 | 7.5 | 1.612 | 89 | Alkali silicate | 52 | Brush | E |
| 2443 | 1 | 3.2 | 3.071 | 86 | Alkyl silicate | 23 | Brush | E |
| 2444 | 1 | 2.6 | 1.194 | 87 | Alkali silicate | 5 | Spray | E |
| 2445 | 1 | 3 | 4.400 | 86 | Alkyl silicate | 52 | Brush | E |

TABLE 124

| Invention Example No | Average diameter of later-added Zn metal grains (μm) | Diameter distribution (peak diameter) of Zn metal grains/Zn alloy grains (μm) | | Percent of fine-grain metal grains among Zn metal grains/Zn alloy grains (Vol %) | Chemical component content of Zn metal grains/Zn alloy grains (Mass %) | | | | Alloy grain fracture surfaces or cracks present? | Ave aspect ratio | Mg solid solution phase and Zn—Mg intermetallic compounds present on grain surfaces? | Any of MgZn2, Mg2Zn11, Mg2Zn3, MgZn, Mg7Zn3 present? |
|---|---|---|---|---|---|---|---|---|---|---|---|---|
| | | Fine metal | Coarse metal | | Zn | Mg | Al | Si | | | | |
| 2446 | 46.8 | 2.25 | 9.9 | 34.25 | 98.8 | 0.6 | 0.6 | 0 | Yes | 1.04 | Yes | Yes |
| 2447 | 16.5 | 2.36 | 9.57 | 37.61 | 86.9 | 10.3 | 1.6 | 1.2 | Yes | 1.05 | Yes | Yes |
| 2448 | 13.5 | 2.24 | 10.79 | 45.60 | 92.98 | 7 | 0.02 | 0 | Yes | 1.12 | Yes | Yes |
| 2449 | 0.96 | 2.46 | 10.93 | 46.70 | 75.5 | 23.5 | 1 | 0 | Yes | 1.11 | Yes | Yes |
| 2450 | 0.96 | 1.56 | 11.02 | 41.22 | 82.5 | 17.5 | 0 | 0 | No | 1.08 | Yes | Yes |
| 2451 | 8.45 | 1.24 | 11.18 | 45.68 | 80.1 | 12.4 | 7.5 | 0 | Yes | 1.47 | Yes | Yes |
| 2452 | 2.9 | 1.68 | 11.42 | 22.02 | 85.09 | 14.9 | 0 | 0.01 | Yes | 1.50 | Yes | Yes |
| 2453 | 5.4 | 2.65 | 10.8 | 37.03 | 78.7 | 20.7 | 0 | 0.6 | No | 1.13 | Yes | Yes |
| 2454 | 10.6 | 2.22 | 10.65 | 28.46 | 91.29 | 8.6 | 0 | 0.11 | Yes | 1.26 | Yes | Yes |
| 2455 | 2.32 | 2.45 | 11.34 | 43.47 | 85.8 | 14.2 | 0 | 0 | Yes | 1.14 | Yes | Yes |
| 2456 | 7.8 | 2.23 | 11.62 | 35.19 | 98.12 | 0.08 | 0 | 1.8 | Yes | 1.49 | Yes | Yes |
| 2457 | 7.95 | 2.26 | 11.15 | 73.02 | 83.46 | 15.2 | 0 | 1.34 | No | 1.34 | Yes | Yes |
| 2458 | 20.59 | 2.72 | 12.38 | 56.20 | 73.17 | 17.4 | 9 | 0.43 | Yes | 1.18 | Yes | Yes |
| 2459 | 22.5 | 2.13 | 12.55 | 35.86 | 98.6 | 0.8 | 0.6 | 0 | Yes | 1.17 | Yes | Yes |
| 2460 | 4.6 | 1.98 | 9.34 | 93.45 | 93.55 | 6.4 | 0.05 | 0 | Yes | 1.48 | Yes | Yes |
| 2461 | 4.9 | 2.02 | 9.58 | 30.66 | 96.78 | 3.2 | 0.02 | 0 | No | 1.49 | Yes | Yes |
| 2462 | 10.5 | 2.21 | 9.88 | 74.21 | 83 | 9.2 | 7.8 | 0 | Yes | 1.27 | Yes | Yes |
| 2463 | 8.45 | 2.55 | 10 | 55.39 | 70.92 | 19.2 | 9.88 | 0 | Yes | 1.17 | Yes | Yes |
| 2464 | 30.5 | 1.92 | 10.67 | 30.08 | 80.25 | 15.1 | 4.65 | 0 | Yes | 1.16 | Yes | Yes |
| 2465 | 49.5 | 1.96 | 11.89 | 45.09 | 81.85 | 14.5 | 3.65 | 0 | Yes | 1.27 | Yes | Yes |

| Invention Example No | Ratio of (Zn metal grains or Zn alloy grains):(Later-added Zn metal grains) | | Mg content of all metal grains (Mass %) | Coating details | | | | |
|---|---|---|---|---|---|---|---|---|
| | Zn metal grains/ Zn alloy grains | Later-added Zn metal grains | | Total metal grain content of coat (Mass %) | Base resin type | Coat thickness (μm) | Coating method | Corrosion Test Results |
| 2446 | 1 | 15.2 | 0.037 | 46 | Alkali silicate | 150 | Brush | E |
| 2447 | 1 | 0.09 | 9.450 | 49 | Alkyl silicate | 60 | Brush | E |
| 2448 | 1 | 13.5 | 0.483 | 35 | Alkali silicate | 15 | Spray | E |
| 2449 | 1 | 135.4 | 0.172 | 37 | Alkyl silicate | 24 | Spray | E |
| 2450 | 1 | 3 | 4.375 | 36 | Alkali silicate | 34 | Spray | E |
| 2451 | 1 | 7.8 | 1.409 | 38 | Alkyl silicate | 20 | Brush | E |
| 2452 | 1 | 10.2 | 1.330 | 48 | Alkali silicate | 200 | Brush | E |
| 2453 | 1 | 7 | 2.588 | 46 | Alkyl silicate | 56 | Brush | E |
| 2454 | 1 | 225.2 | 0.038 | 51 | Alkali silicate | 34 | Spray | E |
| 2455 | 1 | 5.4 | 2.219 | 46 | Alkyl silicate | 2 | Spray | G |
| 2456 | 1 | 3.2 | 0.019 | 38 | Alkali silicate | 15 | Spray | E |
| 2457 | 1 | 13.5 | 1.048 | 48 | Alkali silicate | 10 | Spray | E |
| 2458 | 1 | 1.6 | 6.692 | 52 | Alkyl silicate | 125 | Brush | E |
| 2459 | 1 | 1.5 | 0.320 | 30 | Alkali silicate | 24 | Brush | E |
| 2460 | 1 | 2.5 | 1.829 | 76 | Alkyl silicate | 110 | Brush | E |
| 2461 | 1 | 2.6 | 0.889 | 72 | Alkali silicate | 24 | Brush | E |

TABLE 124-continued

| | | | | | | | | |
|---|---|---|---|---|---|---|---|---|
| 2462 | 1 | 126 | 0.072 | 81 | Alkyl silicate | 2 | Spray | G |
| 2463 | 1 | 120 | 0.159 | 64 | Alkali silicate | 37 | Spray | E |
| 2464 | 1 | 7.5 | 1.776 | 69 | Alkyl silicate | 113 | Brush | E |
| 2465 | 1 | 6.5 | 1.933 | 83 | Alkali silicate | 2 | Spray | G |

TABLE 125

| Invention Example No | Average diameter of later-added Zn metal grains (μm) | Diameter distribution (peak diameter) of Zn metal grains/Zn alloy grains (μm) | | Percent of fine-grain metal grains among Zn metal grains/Zn alloy grains (Vol %) | Chemical component content of Zn metal grains/Zn alloy grains (Mass %) | | | | Alloy grain fracture surfaces or cracks present? | Ave aspect ratio | Mg solid solution phase and Zn—Mg intermetallic compounds present on grain surfaces? | Any of MgZn2, Mg2Zn11, Mg2Zn3, MgZn, Mg7Zn3 present? |
|---|---|---|---|---|---|---|---|---|---|---|---|---|
| | | Fine metal | Coarse metal | | Zn | Mg | Al | Si | | | | |
| 2466 | 5.9 | 2.11 | 12.03 | 41.41 | 89.45 | 10.5 | 0.05 | 0 | Yes | 1.27 | Yes | Yes |
| 2467 | 4.52 | 2.97 | 12.12 | 17.75 | 87.3 | 7.5 | 5.2 | 0 | Yes | 1.49 | Yes | Yes |
| 2468 | 5.96 | 2.36 | 12.28 | 32.76 | 93.9 | 6.1 | 0 | 0.001 | Yes | 1.29 | Yes | Yes |
| 2469 | 5.5 | 3.05 | 12.52 | 30.89 | 82.55 | 16.8 | 0.05 | 0.6 | Yes | 1.23 | Yes | Yes |
| 2470 | 3.6 | 2.57 | 11.9 | 45.90 | 70.7 | 27.5 | 1 | 0.8 | Yes | 1.23 | Yes | Yes |
| 2471 | 16.5 | 2.65 | 11.75 | 42.22 | 94.6 | 2.9 | 0 | 2.5 | Yes | 1.23 | Yes | Yes |
| 2472 | 12.5 | 2.54 | 12.44 | 18.56 | 94 | 4.5 | 0 | 1.5 | No | 1.23 | Yes | Yes |
| 2473 | 16.5 | 2.85 | 12.03 | 33.57 | 99.43 | 0.07 | 0 | 0.5 | Yes | 1.27 | Yes | Yes |
| 2474 | 10.9 | 2.75 | 10.61 | 31.70 | 96.82 | 3.1 | 0.04 | 0.04 | Yes | 1.23 | Yes | Yes |
| 2475 | 5.6 | 2.46 | 11.3 | 46.71 | 76.3 | 20.5 | 1 | 2.2 | Yes | 1.36 | Yes | Yes |
| 2476 | 22.6 | 2.71 | 11.58 | 47.89 | 68.84 | 29.5 | 0.06 | 1.6 | Yes | 1.11 | Yes | Yes |
| 2477 | 20.59 | 2.36 | 11.11 | 24.23 | 92.33 | 7.6 | 0.07 | 0 | Yes | 1.02 | Yes | Yes |
| 2478 | 20.59 | 2.16 | 12.34 | 39.24 | 95.2 | 0.7 | 1.2 | 2.9 | Yes | 1.05 | Yes | Yes |
| 2479 | 9.56 | 2.46 | 12.51 | 37.37 | 91.8 | 4.6 | 1.8 | 1.8 | Yes | 1.24 | Yes | Yes |
| 2480 | 5.9 | 2.49 | 11.64 | 50.38 | 82 | 8.3 | 9.2 | 0.5 | Yes | 1.33 | Yes | Yes |
| 2481 | 6.54 | 1.63 | 9.16 | 37.14 | 88.2 | 11.8 | 0 | 0 | Yes | 1.27 | Yes | Yes |
| 2482 | 21.4 | 1.51 | 9.46 | 13.48 | 86.06 | 12.9 | 0 | 1.04 | Yes | 1.50 | Yes | Yes |
| 2483 | 9.8 | 3.05 | 9.54 | 40.05 | 99.34 | 0.6 | 0 | 0.06 | Yes | 1.13 | Yes | Yes |
| 2484 | 6.59 | 2.57 | 9.56 | 38.18 | 89.51 | 9.5 | 0 | 0.99 | No | 1.04 | Yes | Yes |
| 2485 | 6.54 | 2.65 | 9.46 | 7.63 | 88.3 | 11.7 | 0 | 0 | Yes | 1.02 | Yes | Yes |

| Invention Example No | Ratio of (Zn metal grains or Zn alloy grains):(Later-added Zn metal grains) | | Mg content of all metal grains (Mass %) | Coating details | | | | |
|---|---|---|---|---|---|---|---|---|
| | Zn metal grains/Zn alloy grains | Later-added Zn metal grains | | Total metal grain content of coat (Mass %) | Base resin type | Coat thickness (μm) | Coating method | Corrosion Test Results |
| 2466 | 1 | 20 | 0.500 | 30 | Alkyl silicate | 75 | Brush | E |
| 2467 | 1 | 0.007 | 7.448 | 83 | Alkali silicate | 30 | Brush | E |
| 2468 | 1 | 9 | 0.610 | 75 | Alkyl silicate | 34 | Brush | E |
| 2469 | 1 | 7.5 | 1.976 | 76 | Epoxy resin | 124 | Brush | E |
| 2470 | 1 | 50 | 0.539 | 72 | Acrylic resin | 15 | Spray | E |
| 2471 | 1 | 0.005 | 2.886 | 71 | Urethane resin | 23 | Spray | E |
| 2472 | 1 | 25.6 | 0.169 | 82 | Polyester resin | 157 | Brush | E |
| 2473 | 1 | 56.5 | 0.001 | 81 | Epoxy resin | 26 | Spray | E |
| 2474 | 1 | 1.6 | 1.192 | 83 | Acrylic resin | 38 | Spray | E |
| 2475 | 1 | 3 | 5.125 | 50 | Urethane resin | 160 | Brush | E |
| 2476 | 1 | 100 | 0.292 | 72 | Polyester resin | 27 | Brush | E |
| 2477 | 1 | 65.5 | 0.114 | 47 | Epoxy resin | 180 | Brush | E |

TABLE 125-continued

| | | | | | | | | |
|---|---|---|---|---|---|---|---|---|
| 2478 | 1 | 1.9 | 0.241 | 47 | Acrylic resin | 26 | Spray | E |
| 2479 | 1 | 2.1 | 1.484 | 52 | Urethane resin | 180 | Brush | E |
| 2480 | 1 | 10.5 | 0.722 | 52 | Polyester resin | 15 | Spray | E |
| 2481 | 1 | 6.5 | 1.573 | 50 | Epoxy resin | 2 | Spray | G |
| 2482 | 1 | 19.5 | 0.629 | 46 | Acrylic resin | 28 | Spray | E |
| 2483 | 1 | 0.8 | 0.333 | 47 | Urethane resin | 30 | Spray | E |
| 2484 | 1 | 18.5 | 0.487 | 83 | Polyester resin | 2 | Spray | G |
| 2485 | 1 | 4.3 | 2.208 | 52 | Epoxy resin | 157 | Brush | E |

TABLE 126

| Invention Example No | Average diameter of later-added Zn metal grains (μm) | Diameter distribution (peak diameter) of Zn metal grains/Zn alloy grains (μm) Fine metal | Diameter distribution (peak diameter) of Zn metal grains/Zn alloy grains (μm) Coarse metal | Percent of fine-grain metal grains among Zn metal grains/Zn alloy grains (Vol %) | Chemical component content of Zn metal grains/Zn alloy grains (Mass %) Zn | Mg | Al | Si | Alloy grain fracture surfaces or cracks present? | Ave aspect ratio | Mg solid solution phase and Zn—Mg intermetallic compounds present on grain surfaces? | Any of MgZn2, Mg2Zn11, Mg2Zn3, MgZn, Mg7Zn3 present? |
|---|---|---|---|---|---|---|---|---|---|---|---|---|
| 2487 | 7.8 | 2.85 | 12.08 | 14.29 | 87.8 | 11.7 | 0.5 | 0 | Yes | 1.15 | Yes | Yes |
| 2488 | 16.5 | 2.75 | 12.24 | 40.86 | 95.6 | 4.2 | 0.2 | 0 | Yes | 1.34 | Yes | Yes |
| 2489 | 6.54 | 2.46 | 12.48 | 97.50 | 97.13 | 2.8 | 0.07 | 0 | Yes | 1.25 | Yes | Yes |
| 2490 | 8.45 | 2.71 | 11.86 | 13.30 | 86.1 | 13.9 | 0 | 0 | Yes | 1.19 | Yes | Yes |
| 2491 | 8.5 | 2.36 | 11.71 | 43.62 | 82.6 | 14.6 | 1.6 | 1.2 | No | 1.18 | Yes | Yes |
| 2492 | 13.6 | 2.46 | 11.35 | 56.93 | 72.95 | 26.4 | 0.65 | 0 | Yes | 1.24 | Yes | Yes |
| 2493 | 12.33 | 1.45 | 12.02 | 36.59 | 83.23 | 16.5 | 0.27 | 0 | Yes | 1.11 | Yes | Yes |
| 2494 | 16.5 | 2.42 | 13.24 | 39.95 | 79.4 | 19.5 | 0.45 | 0.65 | Yes | 1.27 | Yes | Yes |
| 2495 | 7.9 | 2.11 | 9.46 | 86.50 | 97.08 | 1.6 | 0.33 | 0.99 | Yes | 1.31 | Yes | Yes |
| 2496 | 10.5 | 2.97 | 13.47 | 32.87 | 90.5 | 6 | 1 | 2.5 | Yes | 1.26 | Yes | Yes |
| 2497 | 16.5 | 2.36 | 9.46 | 16.23 | 88.93 | 8.4 | 0.87 | 1.8 | Yes | 1.14 | Yes | Yes |
| 2498 | 10.64 | 3.05 | 13.87 | 37.40 | 86.7 | 13.3 | 0 | 0 | Yes | 1.34 | Yes | Yes |
| 2499 | 10.5 | 2.57 | 13.25 | 40.76 | 81.4 | 18.6 | 0. | 0 | Yes | 1.16 | Yes | Yes |
| 2500 | 20.59 | 2.65 | 13.1 | 87.31 | 97.34 | 1.8 | 0.86 | 0 | No | 1.47 | Yes | Yes |
| 2501 | 8.5 | 2.12 | 9.08 | 92.50 | 95.25 | 4.1 | 0.65 | 0 | Yes | 1.48 | Yes | Yes |
| 2502 | 0.5 | 1.65 | 9.87 | 17.93 | 82.87 | 16.7 | 0.43 | 0 | No | 1.49 | Yes | Yes |
| 2503 | 10.5 | 2.35 | 9.46 | 44.50 | 99 | 0.4 | 0.6 | 0 | Yes | 1.34 | Yes | Yes |
| 2504 | 11.5 | 1.63 | 9.28 | 96.50 | 89.35 | 10.6 | 0.05 | 0 | Yes | 1.29 | Yes | Yes |
| 2505 | 36.5 | 2.64 | 9.45 | 16.94 | 93.08 | 6.9 | 0.02 | 0 | Yes | 1.18 | Yes | Yes |
| 2506 | 1.5 | 2.35 | 9.25 | 88.12 | 99.82 | 0.05 | 0.06 | 0.07 | Yes | 1.48 | Yes | Yes |

| Invention Example No | Ratio of (Zn metal grains or Zn alloy grains):(Later-added Zn metal grains) Zn metal grains/Zn alloy grains | Ratio of (Zn metal grains or Zn alloy grains):(Later-added Zn metal grains) Later-added Zn metal grains | Mg content of all metal grains (Mass %) | Coating details Total metal grain content of coat (Mass %) | Coating details Base resin type | Coating details Coat thickness (μm) | Coating details Coating method | Corrosion Test Results |
|---|---|---|---|---|---|---|---|---|
| 2487 | 1 | 1.5 | 4.680 | 85 | Alkyl silicate | 130 | Brush | E |
| 2488 | 1 | 4.5 | 0.764 | 53 | Alkyl silicate | 29 | Brush | E |
| 2489 | 1 | 15.5 | 0.170 | 88 | Epoxy resin | 30 | Brush | E |
| 2490 | 1 | 10.5 | 1.209 | 85 | Acrylic resin | 120 | Brush | E |
| 2491 | 1 | 2.5 | 4.171 | 52 | Urethane resin | 187 | Brush | E |
| 2492 | 1 | 9 | 2.640 | 83 | Polyester resin | 28 | Spray | E |
| 2493 | 1 | 10.5 | 0.156 | 88 | Epoxy resin | 5 | Spray | E |
| 2494 | 1 | 5.7 | 2.910 | 49 | Acrylic resin | 35 | Spray | E |
| 2495 | 1 | 3.9 | 0.327 | 50 | Urethane resin | 5 | Spray | G |

TABLE 126-continued

| | | | | | | | | |
|---|---|---|---|---|---|---|---|---|
| 2496 | 1 | 4.5 | 1.091 | 51 | Polyester resin | 200 | Brush | E |
| 2497 | 1 | 3.6 | 1.826 | 83 | Alkali silicate | 25 | Spray | E |
| 2498 | 1 | 16.4 | 0.764 | 82 | Alkali silicate | 15 | Spray | E |
| 2499 | 1 | 6 | 2.657 | 88 | Alkyl silicate | 20 | Spray | E |
| 2500 | 1 | 7.5 | 0.212 | 85 | Alkali silicate | 18 | Spray | E |
| 2501 | 1 | 10.5 | 0.357 | 87 | Alkyl silicate | 22 | Spray | E |
| 2502 | 1 | 2.6 | 4.639 | 86 | Alkali silicate | 19 | Spray | E |
| 2503 | 1 | 1.5 | 0.160 | 46 | Alkyl silicate | 29 | Spray | E |
| 2504 | 1 | 13.5 | 0.731 | 49 | Alkali silicate | 23 | Spray | E |
| 2505 | 1 | 2.6 | 1.917 | 35 | Alkyl silicate | 21 | Spray | E |
| 2506 | 1 | 6.5 | 0.007 | 30 | Alkali silicate | 19 | Spray | E |

TABLE 127

| Invention Example No | Average diameter of later-added Zn metal grains (μm) | Diameter distribution (peak diameter) of Zn metal alloy grains (μm) | | Percent of fine-grain metal grains among Zn metal grains/Zn alloy grains (Vol %) | Chemical component content of Zn metal grains/Zn alloy grains (Mass %) | | | | Alloy grain fracture surfaces or cracks present? | Ave aspect ratio | Mg solid solution phase and Zn—Mg intermetallic compounds present on grain surfaces? | Any of MgZn2, Mg2Zn11, Mg2Zn3, MgZn, Mg7Zn3 present? |
|---|---|---|---|---|---|---|---|---|---|---|---|---|
| | | Fine metal | Coarse metal | | Zn | Mg | Al | Si | | | | |
| 2507 | 8.7 | 2.31 | 9.46 | 60.57 | 91.56 | 6.4 | 1.05 | 0.99 | Yes | 1.27 | Yes | Yes |
| 2508 | 7.8 | 2.62 | 9.46 | 39.48 | 93.36 | 3.5 | 2.6 | 0.54 | Yes | 1.17 | Yes | Yes |
| 2509 | 5.96 | 2.52 | 9.46 | 15.82 | 82.13 | 17.5 | 0.05 | 0.32 | Yes | 1.27 | Yes | Yes |
| 2510 | 0.06 | 2.24 | 13.32 | 49.57 | 91.2 | 3.6 | 5.2 | 0 | No | 1.27 | Yes | Yes |
| 2511 | 0.9 | 0.05 | 6.54 | 86.52 | 94.1 | 5.9 | 0 | 0.001 | Yes | 1.48 | Yes | Yes |
| 2512 | 3.6 | 2.42 | 6.35 | 90.98 | 83.2 | 16.2 | 0 | 0.6 | No | 1.49 | Yes | Yes |
| 2513 | 10.5 | 0.11 | 7.54 | 67.32 | 76.7 | 22.5 | 0 | 0.8 | Yes | 1.34 | Yes | Yes |
| 2514 | 0.05 | 1.92 | 8.64 | 82.33 | 96.52 | 3.4 | 0.04 | 0.04 | Yes | 1.23 | Yes | Yes |
| 2515 | 2.32 | 0.46 | 6.45 | 73.76 | 68.3 | 26.5 | 3 | 2.2 | Yes | 1.23 | Yes | Yes |
| 2516 | 20.4 | 0.77 | 6.48 | 88.77 | 72.84 | 25.5 | 0.06 | 1.6 | Yes | 1.23 | Yes | Yes |
| 2517 | 8.6 | 2.35 | 9.25 | 45.02 | 87.2 | 12.8 | 0 | 0 | Yes | 1.05 | Yes | Yes |
| 2518 | 10.5 | 2.33 | 9.46 | 15.2 | 91.5 | 8.5 | 0 | 0 | Yes | 1.06 | Yes | Yes |
| 2519 | 8.7 | 1.95 | 9.32 | 51.41 | 75.23 | 24.5 | 0.27 | 0 | Yes | 1.38 | Yes | Yes |
| 2520 | 7.8 | 2.15 | 9.22 | 45.46 | 77.48 | 18.4 | 2.55 | 1.57 | Yes | 1.06 | Yes | Yes |
| 2521 | 5.96 | 2.23 | 11.62 | 35.19 | 72.62 | 0.08 | 25.5 | 1.8 | Yes | 1.49 | Yes | Yes |
| 2522 | 1.6 | 2.26 | 11.15 | 73.02 | 64.06 | 15.2 | 19.4 | 1.34 | No | 1.34 | Yes | Yes |
| 2523 | 7.2 | 1.98 | 9.34 | 93.45 | 83 | 6.4 | 10.6 | 0 | Yes | 1.48 | Yes | Yes |
| 2524 | 10.5 | 2.02 | 9.58 | 30.66 | 86.4 | 3.2 | 10.4 | 0 | No | 1.49 | Yes | Yes |
| 2525 | 3.6 | 2.36 | 12.28 | 32.76 | 80.4 | 6.1 | 13.5 | 0.001 | Yes | 1.29 | Yes | Yes |
| 2526 | 4.5 | 3.05 | 12.52 | 30.89 | 70.1 | 16.8 | 12.5 | 0.6 | Yes | 1.23 | Yes | Yes |
| 2527 | 7.9 | 2.57 | 11.9 | 45.9 | 60.9 | 27.5 | 10.8 | 0.8 | Yes | 1.23 | Yes | Yes |

| Invention Example No | Ratio of (Zn metal grains or Zn alloy grains):(Later-added Zn metal grains) | | Mg content of all metal grains (Mass %) | Coating details | | | | |
|---|---|---|---|---|---|---|---|---|
| | Zn metal grains/Zn alloy grains | Later-added Zn metal grains | | Total metal grain content of coat (Mass %) | Base resin type | Coat thickness (μm) | Coating method | Corrosion Test Results |
| 2507 | 1 | 1.6 | 2.462 | 76 | Alkyl silicate | 15 | Spray | E |
| 2508 | 1 | 3.8 | 0.729 | 72 | Alkali silicate | 18 | Spray | E |

TABLE 127-continued

| | | | | | | | | |
|---|---|---|---|---|---|---|---|---|
| 2509 | 1 | 0.08 | 16.204 | 30 | Alkyl silicate | 22 | Spray | E |
| 2510 | 1 | 164.5 | 0.022 | 83 | Alkyl silicate | 21 | Spray | E |
| 2511 | 1 | 3.6 | 1.283 | 75 | Alkyl silicate | 29 | Spray | E |
| 2512 | 1 | 8.6 | 1.688 | 76 | Alkali silicate | 23 | Spray | E |
| 2513 | 1 | 12 | 1.731 | 72 | Alkyl silicate | 21 | Spray | E |
| 2514 | 1 | 5.8 | 0.500 | 83 | Alkali silicate | 19 | Spray | E |
| 2515 | 1 | 10 | 2.409 | 50 | Alkyl silicate | 21 | Spray | E |
| 2516 | 1 | 1 | 12.750 | 72 | Alkali silicate | 19 | Spray | E |
| 2517 | 1 | 10.5 | 1.113 | 50 | Acrylic resin | 654 | Spray | E |
| 2518 | 1 | 6.5 | 1.133 | 48 | Alkali silicate | 700 | Spray | E |
| 2519 | 1 | 19.5 | 1.195 | 75 | Alkyl silicate | 555 | Spray | E |
| 2520 | 1 | 0.8 | 10.222 | 55 | Alkyl silicate | 12 | Spray | E |
| 2521 | 1 | 5.3 | 0.013 | 38 | Alkyl silicate | 678 | Brush | E |
| 2522 | 1 | 4.3 | 2.868 | 48 | Urethane resin | 674 | Spray | E |
| 2523 | 1 | 3.2 | 1.524 | 76 | Polyester resin | 325 | Spray | E |
| 2524 | 1 | 1.5 | 1.280 | 72 | Alkyl silicate | 665 | Spray | E |
| 2525 | 1 | 4.5 | 1.109 | 75 | Alkyl silicate | 354 | Brush | E |
| 2526 | 1 | 0.8 | 9.333 | 76 | Alkyl silicate | 165 | Spray | E |
| 2527 | 1 | 6.5 | 3.667 | 72 | Urethane resin | 354 | Spray | E |

TABLE 128

| Invention Example No | Average diameter of later-added Zn metal grains (μm) | Diameter distribution (peak diameter) of Zn metal grains/Zn alloy grains (μm) | | Percent of fine-grain metal grains among Zn metal grains/Zn alloy grains (Vol %) | Chemical component content of Zn metal grains/Zn alloy grains (Mass %) | | | | Alloy grain fracture surfaces or cracks present? | Ave aspect ratio | Mg solid solution phase and Zn—Mg intermetallic compounds present on grain surfaces? | Any of MgZn2, Mg2Zn11, Mg2Zn3, MgZn, Mg7Zn3 present? |
|---|---|---|---|---|---|---|---|---|---|---|---|---|
| | | Fine metal | Coarse metal | | Zn | Mg | Al | Si | | | | |
| 2528 | 16.5 | 2.35 | 9.25 | 35.87 | 88.8 | 11.2 | 0 | 0 | Yes | 1.12 | Yes | Yes |
| 2529 | 13.5 | 2.57 | 9.56 | 42.04 | 90.6 | 9.4 | 0 | 0 | No | 1.38 | Yes | Yes |
| 2530 | 0.96 | 2.56 | 9.84 | 6.55 | 81.45 | 18.5 | 0 | 0.05 | Yes | 1.22 | Yes | Yes |
| 2531 | 0.96 | 2.21 | 9.75 | 43.60 | 99.97 | 0.03 | 0 | 0 | Yes | 1.14 | Yes | Yes |
| 2532 | 8.45 | 2.64 | 9.85 | 44.12 | 98.4 | 1.6 | 0 | 0 | No | 1.02 | Yes | Yes |
| 2533 | 2.9 | 1.99 | 8.56 | 37.21 | 93.2 | 6.8 | 0 | 0 | Yes | 1.05 | Yes | Yes |
| 2534 | 5.4 | 2.94 | 8.21 | 43.38 | 84.5 | 13.9 | 0 | 1.6 | No | 1.36 | No | Yes |
| 2535 | 10.6 | 2.58 | 8.33 | 13.52 | 98.1 | 1.9 | 0 | 0 | Yes | 1.11 | No | Yes |
| 2536 | 2.32 | 2.37 | 8 | 44.94 | 94.3 | 5.7 | 0 | 0 | No | 1.07 | Yes | Yes |
| 2537 | 7.8 | 2.15 | 9.22 | 45.46 | 90.8 | 9.2 | 0 | 0 | No | 1.42 | Yes | Yes |
| 2538 | 7.95 | 2.96 | 9.36 | 35.96 | 83.3 | 15.4 | 0 | 1.3 | Yes | 1.38 | No | Yes |
| 2539 | 20.59 | 2.85 | 9.45 | 42.13 | 79.84 | 18.6 | 0 | 1.56 | Yes | 1.22 | No | Yes |
| 2540 | 22.5 | 2.94 | 9.61 | 7.56 | 96.4 | 3.6 | 0 | 0 | Yes | 1.14 | Yes | Yes |
| 2541 | 4.6 | 2.11 | 9.85 | 43.69 | 94.6 | 5.4 | 0 | 0 | Yes | 1.13 | Yes | Yes |
| 2542 | 4.9 | 2.68 | 9.23 | 44.21 | 92.4 | 7.6 | 0 | 0 | Yes | 1.02 | No | Yes |
| 2543 | 10.5 | 2.99 | 9.08 | 39.51 | 75.5 | 24.5 | 0 | 0 | Yes | 1.06 | Yes | Yes |
| 2544 | 8.45 | 2.78 | 9.87 | 45.68 | 82.4 | 17.6 | 0 | 0 | Yes | 1.05 | Yes | Yes |
| 2545 | 30.5 | 2.96 | 9.46 | 65.58 | 98.6 | 1.4 | 0 | 0 | Yes | 1.24 | No | Yes |
| 2546 | 49.5 | 2.85 | 9.28 | 47.24 | 78.5 | 21.5 | 0 | 0 | Yes | 1.33 | No | Yes |
| 2547 | 5.9 | 2.64 | 9.45 | 47.76 | 89.6 | 10.4 | 0 | 0 | Yes | 1.27 | Yes | Yes |

TABLE 128-continued

| Invention Example No | Ratio of (Zn metal grains or Zn alloy grains):(Later-added Zn metal grains) | | Mg content of all metal grains (Mass %) | Coating details | | | | |
|---|---|---|---|---|---|---|---|---|
| | Zn metal grains/ Zn alloy grains | Later-added Zn metal grains | | Total metal grain content of coat (Mass %) | Base resin type | Coat thickness (μm) | Coating method | Corrosion Test Results |
| 2528 | 1 | 5 | 1.867 | 49 | Alkyl silicate | 14 | Spray | E |
| 2529 | 1 | 198.7 | 0.047 | 89 | Urethane resin | 55 | Spray | E |
| 2530 | 1 | 36 | 0.500 | 90 | Alkyl silicate | 8 | Spray | E |
| 2531 | 1 | 1.5 | 0.012 | 86 | Urethane resin | 122 | Brush | E |
| 2532 | 1 | 0.008 | 1.587 | 48 | Alkyl silicate | 555 | Spray | E |
| 2533 | 1 | 1.4 | 2.833 | 47 | Alkali silicate | 19 | Spray | E |
| 2534 | 1 | 4.2 | 2.673 | 47 | Alkyl silicate | 25 | Brush | E |
| 2535 | 1 | 1.6 | 0.731 | 47 | Alkyl silicate | 58 | Spray | E |
| 2536 | 1 | 7.5 | 0.671 | 52 | Alkyl silicate | 685 | Spray | E |
| 2537 | 1 | 1.6 | 3.538 | 52 | Alkali silicate | 19 | Brush | E |
| 2538 | 1 | 2 | 5.133 | 52 | Urethane resin | 700 | Spray | E |
| 2539 | 1 | 270 | 0.069 | 88 | Alkyl silicate | 77 | Spray | E |
| 2540 | 1 | 7.5 | 0.424 | 87 | Alkyl silicate | 54 | Spray | E |
| 2541 | 1 | 2.9 | 1.385 | 89 | Alkyl silicate | 64 | Spray | E |
| 2542 | 1 | 2.6 | 2.111 | 90 | Alkyl silicate | 34 | Brush | E |
| 2543 | 1 | 0.1 | 22.273 | 91 | Alkali silicate | 28 | Spray | E |
| 2544 | 1 | 1.2 | 8.000 | 46 | Urethane resin | 109 | Brush | E |
| 2545 | 1 | 1.2 | 0.636 | 47 | Alkyl silicate | 15 | Spray | E |
| 2546 | 1 | 62 | 0.341 | 47 | Alkyl silicate | 14 | Spray | E |
| 2547 | 1 | 2.4 | 3.059 | 49 | Alkyl silicate | 18 | Spray | E |

TABLE 129

| Invention Example No | Average diameter of later-added Zn metal grains (μm) | Diameter distribution (peak diameter) of Zn metal grains/Zn alloy grains (μm) | | Percent of fine-grain metal grains among Zn metal grains/ Zn alloy grains (Vol %) | Chemical component content of Zn metal grains/Zn alloy grains (Mass %) | | | | Alloy grain fracture surfaces or cracks present? | Ave aspect ratio | Mg solid solution phase and Zn—Mg intermetallic compounds present on grain surfaces? | Any of MgZn2, Mg2Zn11, Mg2Zn3, MgZn, Mg7Zn3 present? |
|---|---|---|---|---|---|---|---|---|---|---|---|---|
| | | Fine metal | Coarse metal | | Zn | Mg | Al | Si | | | | |
| 2548 | 4.52 | 2.35 | 9.25 | 45.02 | 87.2 | 12.8 | 0 | 0 | Yes | 1.05 | Yes | Yes |
| 2549 | 5.96 | 2.12 | 9.46 | 47.02 | 92.2 | 7.8 | 0 | 0 | Yes | 1.22 | No | Yes |
| 2550 | 5.5 | 2.34 | 9.46 | 7.66 | 70.5 | 29.5 | 0 | 0 | Yes | 1.13 | No | Yes |
| 2551 | 3.6 | 2.33 | 9.46 | 15.20 | 91.5 | 8.5 | 0 | 0 | Yes | 1.06 | Yes | Yes |
| 2552 | 16.5 | 2.23 | 9.06 | 43.16 | 74.5 | 25.5 | 0 | 0 | Yea | 1.05 | Yes | Yes |
| 2553 | 12.5 | 2.12 | 9.3 | 49.33 | 99.93 | 0.07 | 0 | 0 | Yes | 1.24 | Yes | Yes |

TABLE 129-continued

| | | | | | | | | | | | | |
|---|---|---|---|---|---|---|---|---|---|---|---|---|
| 2554 | 16.5 | 2.21 | 8.68 | 19.47 | 89.2 | 10.8 | 0 | 0 | No | 1.05 | Yes | Yes |
| 2555 | 10.9 | 1.38 | 8.53 | 69.55 | 86 | 11.2 | 1.6 | 1.2 | No | 1.12 | Yes | Yes |
| 2556 | 5.6 | 1.95 | 9.32 | 51.41 | 75.23 | 24.5 | 0.27 | 0 | Yes | 1.38 | No | Yes |
| 2557 | 22.6 | 2.26 | 8.95 | 75.88 | 82.6 | 17.4 | 0 | 0 | Yes | 1.13 | No | Yes |
| 2558 | 20.59 | 2.05 | 12.54 | 48.08 | 98.7 | 1.3 | 0 | 0 | Yes | 1.33 | Yes | Yes |
| 2559 | 20.59 | 1.65 | 8.7 | 66.85 | 80.5 | 19.5 | 0 | 0 | Yes | 1.27 | Yes | Yes |
| 2560 | 9.56 | 2.35 | 8.55 | 7.68 | 88.85 | 10.8 | 0.05 | 0.3 | No | 1.23 | No | Yes |
| 2561 | 5.9 | 1.62 | 8.91 | 8.64 | 87.7 | 11.9 | 0.4 | 0 | Yes | 1.11 | Yes | Yes |
| 2562 | 6.54 | 1.88 | 9.91 | 16.58 | 90.5 | 9.5 | 0 | 0 | Yes | 1.42 | Yes | Yes |
| 2563 | 21.4 | 2.35 | 9.25 | 35.87 | 89.5 | 10.5 | 0 | 0 | Yes | 1.06 | No | Yes |
| 2564 | 9.8 | 2.57 | 9.56 | 42.04 | 84.9 | 15.1 | 0 | 0 | Yes | 1.05 | Yes | Yes |
| 2565 | 6.59 | 2.56 | 9.84 | 38.41 | 83.2 | 16.8 | 0 | 0 | Yes | 1.07 | Yes | Yes |
| 2566 | 6.54 | 2.21 | 9.75 | 6.99 | 89.4 | 10.6 | 0 | 0 | Yes | 1.42 | No | Yes |
| 2567 | 16.5 | 2.6 | 49.85 | 44.12 | 84.3 | 13.3 | 2.4 | 0 | Yes | 1.38 | Yes | Yes |

| Invention Example No | Ratio of (Zn metal grains or Zn alloy grains):(Later-added Zn metal grains) | | Mg content of all metal grains (Mass %) | Total metal grain content of coat (Mass %) | Coating details | | | Corrosion Test Results |
|---|---|---|---|---|---|---|---|---|
| | Zn metal grains/ Zn alloy grains | Later-added Zn metal grains | | | Base resin type | Coat thickness (μm) | Coating method | |
| 2548 | 1 | 2.1 | 4.129 | 50 | Alkali silicate | 2 | Spray | G |
| 2549 | 1 | 34.5 | 0.220 | 87 | Alkyl silicate | 37 | Spray | E |
| 2550 | 1 | 270 | 0.109 | 83 | Alkali silicate | 12 | Spray | E |
| 2551 | 1 | 32.5 | 0.254 | 48 | Alkyl silicate | 160 | Brush | E |
| 2552 | 1 | 3 | 6.375 | 51 | Alkali silicate | 5 | Brush | G |
| 2553 | 1 | 1.5 | 0.028 | 51 | Alkyl silicate | 56 | Brush | E |
| 2554 | 1 | 7.5 | 1.271 | 87 | Alkali silicate | 2 | Spray | G |
| 2555 | 1 | 13.5 | 0.772 | 85 | Alkyl silicate | 18 | Spray | E |
| 2556 | 1 | 5 | 4.083 | 86 | Alkyl silicate | 23 | Spray | E |
| 2557 | 1 | 5 | 2.900 | 50 | Epoxy resin | 30 | Brush | E |
| 2558 | 1 | 1 | 0.650 | 51 | Acrylic resin | 77 | Brush | E |
| 2559 | 1 | 120 | 0.161 | 51 | Urethane resin | 655 | Brush | E |
| 2560 | 1 | 3.7 | 2.298 | 80 | Polyester resin | 47 | Spray | E |
| 2561 | 1 | 6.1 | 1.676 | 46 | Epoxy resin | 43 | Spray | E |
| 2562 | 1 | 198.5 | 0.048 | 51 | Acrylic resin | 52 | Brush | E |
| 2563 | 1 | 2.5 | 3.000 | 86 | Urethane resin | 20 | Brush | E |
| 2564 | 1 | 18.5 | 0.774 | 85 | Polyester resin | 200 | Brush | E |
| 2565 | 1 | 8 | 1.867 | 82 | Alkali silicate | 22 | Spray | E |
| 2566 | 1 | 1.6 | 4.077 | 81 | Alkyl silicate | 25 | Spray | E |
| 2567 | 1 | 1.2 | 6.045 | 46 | Alkali silicate | 14 | Spray | E |

TABLE 130

| Invention Example No | Average diameter of later-added Zn metal grains (μm) | Diameter distribution (peak diameter) of Zn metal grains/Zn alloy grains (μm) | | Percent of fine-grain metal grains among Zn metal grains/Zn alloy grains (Vol %) | Chemical component content of Zn metal grains/Zn alloy grains (Mass %) | | | | Alloy grain fracture surfaces or cracks present? | Ave aspect ratio | Mg solid solution phase and Zn—Mg intermetallic compounds present on grain surfaces? | Any of MgZn2, Mg2Zn11, Mg2Zn3, MgZn, Mg7Zn3 present? |
|---|---|---|---|---|---|---|---|---|---|---|---|---|
| | | Fine metal | Coarse metal | | Zn | Mg | Al | Si | | | | |
| 2568 | 7.8 | 2.65 | 8.56 | 66.99 | 98.6 | 1.4 | 0 | 0 | No | 1.22 | Yes | Yes |
| 2569 | 16.5 | 2.94 | 8.21 | 43.38 | 76.45 | 23.5 | 0 | 0.05 | Yes | 1.14 | Yes | Yes |
| 2570 | 6.54 | 2.58 | 8.33 | 39.75 | 91.1 | 8.9 | 0 | 0 | Yes | 1.13 | Yes | Yes |
| 2571 | 8.45 | 2.37 | 8 | 65.38 | 85.1 | 14.9 | 0 | 0 | Yes | 1.02 | Yes | Yes |
| 2572 | 8.5 | 2.15 | 9.22 | 45.46 | 77.48 | 18.4 | 2.55 | 1.57 | Yes | 1.06 | Yes | Yes |
| 2573 | 13.6 | 2.96 | 9.36 | 22.55 | 97.9 | 2.1 | 0 | 0 | Yes | 1.05 | Yes | Yes |
| 2574 | 12.33 | 2.85 | 9.45 | 42.13 | 94.8 | 5.2 | 0 | 0 | Yes | 1.24 | Yes | Yes |
| 2575 | 16.5 | 2.94 | 9.61 | 38.50 | 84.6 | 15.4 | 0 | 0 | Yes | 1.33 | Yes | Yes |
| 2576 | 7.9 | 2.11 | 9.85 | 64.13 | 89.3 | 10.7 | 0 | 0 | Yes | 1.27 | Yes | Yes |
| 2577 | 10.5 | 2.68 | 9.23 | 44.21 | 83.3 | 16.7 | 0 | 0 | Yes | 1.05 | Yes | Yes |
| 2578 | 16.5 | 2.99 | 9.08 | 39.51 | 80.05 | 19.6 | 0.35 | 0 | No | 1.12 | Yes | Yes |
| 2579 | 10.64 | 1.82 | 9.87 | 78.64 | 85.5 | 14.5 | 0 | 0 | No | 1.23 | Yes | Yes |
| 2580 | 10.5 | 1.42 | 9.46 | 42.05 | 85 | 14.2 | 0 | 0.8 | No | 1.36 | Yes | Yes |
| 2581 | 20.59 | 2.12 | 9.28 | 64.58 | 87.3 | 12.7 | 0 | 0 | No | 1.11 | Yes | Yes |
| 2582 | 8.5 | 1.92 | 9.45 | 47.76 | 89.5 | 10.5 | 0 | 0 | Yes | 1.07 | Yes | Yes |
| 2583 | 0.5 | 2.11 | 9.63 | 24.10 | 87.3 | 11.8 | 0 | 0.9 | Yes | 1.42 | Yes | Yes |
| 2584 | 10.5 | 2.97 | 9.16 | 39.11 | 86.4 | 12.8 | 0.5 | 0.3 | Yes | 1.38 | Yes | Yes |
| 2585 | 11.5 | 2.36 | 10.39 | 19.65 | 93.8 | 6.2 | 0 | 0 | Yes | 1.22 | Yes | Yes |
| 2586 | 36.5 | 3.05 | 10.56 | 65.39 | 83.8 | 16.2 | 0 | 0 | Yes | 1.14 | Yes | Yes |
| 2587 | 1.5 | 2.15 | 10.74 | 48.57 | 80.4 | 19.6 | 0 | 0 | Yes | 1.13 | Yes | Yes |

| Invention Example No | Ratio of (Zn metal grains or Zn alloy grains):(Later-added Zn metal grains) | | Mg content of all metal grains (Mass %) | Coating details | | | | |
|---|---|---|---|---|---|---|---|---|
| | Zn metal grains/Zn alloy grains | Later-added Zn metal grains | | Total metal grain content of coat (Mass %) | Base resin type | Coat thickness (μm) | Coating method | Corrosion Test Results |
| 2568 | 1 | 0.5 | 0.933 | 47 | Urethane resin | 112 | Spray | E |
| 2569 | 1 | 9 | 2.350 | 48 | Alkali silicate | 24 | Spray | E |
| 2570 | 1 | 4.5 | 1.618 | 51 | Urethane resin | 150 | Spray | E |
| 2571 | 1 | 136 | 0.109 | 53 | Alkali silicate | 18 | Spray | E |
| 2572 | 1 | 13 | 1.314 | 88 | Alkyl silicate | 19 | Brush | E |
| 2573 | 1 | 10.6 | 0.181 | 85 | Alkyl silicate | 24 | Spray | E |
| 2574 | 1 | 1.6 | 2.000 | 83 | Urethane resin | 99 | Spray | E |
| 2575 | 1 | 68 | 0.223 | 82 | Alkyl silicate | 7 | Spray | E |
| 2576 | 1 | 4.5 | 1.945 | 83 | Epoxy resin | 100 | Spray | E |
| 2577 | 1 | 10.5 | 1.452 | 47 | Alkyl silicate | 27 | Brush | E |
| 2578 | 1 | 4.9 | 3.322 | 51 | Alkali silicate | 15 | Spray | E |
| 2579 | 1 | 10.5 | 1.261 | 52 | Alkyl silicate | 14 | Spray | E |
| 2580 | 1 | 192 | 0.074 | 51 | Urethane resin | 55 | Spray | E |
| 2581 | 1 | 0.07 | 11.869 | 52 | Alkyl silicate | 8 | Spray | E |
| 2582 | 1 | 9.5 | 1.000 | 89 | Urethane resin | 122 | Brush | E |
| 2583 | 1 | 2.6 | 3.278 | 85 | Alkyl silicate | 54 | Spray | E |

TABLE 130-continued

| | | | | | | | | |
|---|---|---|---|---|---|---|---|---|
| 2584 | 1 | 4.5 | 2.327 | 82 | Alkali silicate | 19 | Spray | E |
| 2585 | 1 | 3 | 1.550 | 87 | Alkyl silicate | 25 | Brush | E |
| 2586 | 1 | 7.5 | 1.906 | 88 | Alkyl silicate | 58 | Spray | E |
| 2587 | 1 | 77 | 0.251 | 49 | Alkyl silicate | 21 | Spray | E |

TABLE 131

| Invention Example No | Average diameter of later-added Zn metal grains (μm) | Diameter distribution (peak diameter) of Zn metal grains/Zn alloy grains (μm) | | Percent of fine-grain metal grains among Zn metal grains/Zn alloy grains (Vol %) | Chemical component content of Zn metal grains/Zn alloy grains (Mass %) | | | | Alloy grain fracture surfaces or cracks present? | Ave aspect ratio | Mg solid solution phase and Zn—Mg intermetallic compounds present on grain surfaces? | Any of MgZn2, Mg2Zn11, Mg2Zn3, MgZn, Mg7Zn3 present? |
|---|---|---|---|---|---|---|---|---|---|---|---|---|
| | | Fine metal | Coarse metal | | Zn | Mg | Al | Si | | | | |
| 2588 | 8.7 | 2.19 | 10.27 | 24.91 | 87.6 | 12.4 | 0 | 0 | Yes | 1.02 | Yes | Yes |
| 2589 | 7.8 | 2.48 | 11.5 | 39.92 | 89.3 | 10.7 | 0 | 0 | Yes | 1.06 | Yes | Yes |
| 2590 | 5.96 | 2.85 | 11.67 | 22.65 | 91.5 | 8.5 | 0 | 0 | Yes | 1.05 | Yes | Yes |
| 2591 | 0.06 | 2.75 | 11.85 | 66.20 | 94.9 | 5.1 | 0 | 0 | Yes | 1.24 | Yes | Yes |
| 2592 | 0.9 | 2.46 | 11.38 | 49.38 | 75.5 | 24.5 | 0 | 0 | Yes | 1.33 | Yes | Yes |
| 2593 | 3.6 | 2.71 | 12.61 | 30.58 | 86.5 | 13.5 | 0 | 0 | Yes | 1.27 | Yes | Yes |
| 2594 | 10.5 | 2.36 | 12.78 | 45.59 | 80 | 20 | 0 | 0 | Yes | 1.05 | Yes | Yes |
| 2595 | 0.05 | 2.16 | 9.57 | 28.32 | 84.5 | 15.5 | 0 | 0 | Yes | 1.12 | Yes | Yes |
| 2596 | 2.32 | 2.46 | 9.81 | 71.87 | 88 | 10.5 | 1.5 | 0 | Yes | 1.23 | Yes | Yes |
| 2597 | 20.4 | 2.49 | 8.43 | 53.05 | 92.1 | 7.9 | 0 | 0 | Yes | 1.36 | Yes | Yes |
| 2598 | 7.34 | 2.95 | 8.55 | 27.74 | 95.2 | 4.8 | 0 | 0 | Yes | 1.11 | Yes | Yes |
| 2599 | 9.4 | 2.36 | 8.22 | 42.75 | 81.6 | 18.4 | 0 | 0 | Yes | 1.07 | Yes | Yes |
| 2600 | 23.43 | 2.21 | 9.44 | 23.29 | 86.8 | 12.7 | 0 | 0.5 | Yes | 1.42 | Yes | Yes |
| 2601 | 5.96 | 2.25 | 9.58 | 61.12 | 89.7 | 10.3 | 0 | 0 | No | 1.38 | Yes | Yes |
| 2602 | 10.64 | 2.44 | 9.67 | 44.30 | 71.2 | 20.8 | 8 | 0 | Yes | 1.22 | Yes | Yes |
| 2603 | 16.5 | 2.78 | 9.83 | 23.96 | 97.5 | 2.5 | 0 | 0 | No | 1.14 | Yes | Yes |
| 2604 | 7.95 | 2.15 | 10.07 | 44.09 | 84.8 | 15.2 | 0 | 0 | Yes | 1.13 | Yes | Yes |
| 2605 | 7.95 | 2.19 | 9.45 | 24.63 | 80.8 | 19.2 | 0 | 0 | No | 1.02 | Yes | Yes |
| 2606 | 9.64 | 2.48 | 9.3 | 62.46 | 78.7 | 13.5 | 7.8 | 0 | Yes | 1.06 | Yes | Yes |
| 2607 | 0.96 | 2.59 | 9.99 | 45.64 | 88.1 | 11.9 | 0 | 0 | No | 1.05 | Yes | Yes |

| Invention Example No | Ratio of (Zn metal grains or Zn alloy grains):(Later-added Zn metal grains) | | Mg content of all metal grains (Mass %) | Total metal grain content of coat (Mass %) | Coating details | | | Corrosion Test Results |
|---|---|---|---|---|---|---|---|---|
| | Zn metal grains/ Zn alloy grains | Later-added Zn metal grains | | | Base resin type | Coat thickness (μm) | Coating method | |
| 2588 | 1 | 10.5 | 1.078 | 50 | Alkali silicate | 19 | Brush | E |
| 2589 | 1 | 15.5 | 0.648 | 51 | Urethane resin | 56 | Spray | E |
| 2590 | 1 | 5.8 | 1.250 | 52 | Alkyl silicate | 77 | Spray | E |
| 2591 | 1 | 1.9 | 1.759 | 53 | Alkyl silicate | 12 | Spray | E |
| 2592 | 1 | 16.9 | 1.369 | 88 | Alkyl silicate | 64 | Spray | E |
| 2593 | 1 | 1.5 | 5.400 | 85 | Alkyl silicate | 34 | Brush | E |
| 2594 | 1 | 0.05 | 19.048 | 83 | Alkali silicate | 28 | Spray | E |
| 2595 | 1 | 215 | 0.072 | 81 | Urethane resin | 109 | Brush | E |

TABLE 131-continued

| | | | | | | | | | |
|---|---|---|---|---|---|---|---|---|---|
| | 2596 | 1 | 4.2 | 2.019 | 80 | Alkyl silicate | 15 | Spray | E |
| | 2597 | 1 | 1.5 | 3.160 | 47 | Alkyl silicate | 14 | Spray | E |
| | 2598 | 1 | 4.8 | 0.828 | 49 | Alkyl silicate | 18 | Spray | E |
| | 2599 | 1 | 0.5 | 12.267 | 50 | Urethane resin | 122 | Brush | E |
| | 2600 | 1 | 2.3 | 3.848 | 51 | Alkyl silicate | 54 | Spray | E |
| | 2601 | 1 | 0.05 | 9.810 | 52 | Alkali silicate | 19 | Spray | E |
| | 2602 | 1 | 120 | 0.172 | 83 | Alkyl silicate | 25 | Brush | E |
| | 2603 | 1 | 3.7 | 0.532 | 88 | Alkyl silicate | 58 | Spray | E |
| | 2604 | 1 | 16.5 | 0.869 | 85 | Alkyl silicate | 21 | Spray | E |
| | 2605 | 1 | 24 | 0.768 | 83 | Alkali silicate | 19 | Brush | E |
| | 2606 | 1 | 0.01 | 13.366 | 82 | Urethane resin | 56 | Spray | E |
| | 2607 | 1 | 7.8 | 1.352 | 47 | Alkyl silicate | 77 | Spray | E |

TABLE 132

| Invention Example No | Average diameter of later-added Zn metal grains (μm) | Diameter distribution (peak diameter) of Zn metal grains/Zn alloy grains (μm) Fine metal | Diameter distribution (peak diameter) of Zn metal grains/Zn alloy grains (μm) Coarse metal | Percent of fine-grain metal grains among Zn metal grains/ Zn alloy grains (Vol %) | Chemical component content of Zn metal grains/Zn alloy grains (Mass %) Zn | Mg | Al | Si | Alloy grain fracture surfaces or cracks present? | Ave aspect ratio | Mg solid solution phase and Zn—Mg intermetallic compounds present on grain surfaces? | Any of MgZn2, Mg2Zn11, Mg2Zn3, MgZn, Mg7Zn3 present? |
|---|---|---|---|---|---|---|---|---|---|---|---|---|
| 2608 | 5.26 | 2.47 | 9.58 | 25.30 | 88.5 | 10.6 | 0 | 0.9 | Yes | 1.24 | Yes | Yes |
| 2609 | 13.5 | 2.69 | 9.4 | 42.84 | 84.6 | 15.4 | 0 | 0 | Yes | 1.33 | Yes | Yes |
| 2610 | 13.5 | 2.57 | 9.57 | 25.44 | 97.4 | 2.6 | 0 | 0 | Yes | 1.27 | Yes | Yes |
| 2611 | 9.64 | 2.49 | 9.54 | 63.27 | 83.3 | 16.7 | 0 | 0 | Yes | 1.37 | Yes | Yes |
| 2612 | 16.5 | 2.68 | 9.58 | 46.45 | 91.9 | 8.1 | 0 | 0 | Yes | 1.10 | Yes | Yes |
| 2613 | 20.59 | 2.35 | 9.25 | 46.45 | 86.3 | 13.7 | 0 | 0 | Yes | 1.04 | Yes | Yes |
| 2614 | 0.96 | 2.48 | 10.04 | 50.91 | 81.5 | 18.5 | 0 | 0 | Yes | 1.02 | Yes | Yes |
| 2615 | 6.54 | 2.13 | 11.27 | 27.25 | 97.6 | 2.4 | 0 | 0 | Yes | 1.01 | Yes | Yes |
| 2616 | 5.26 | 1.93 | 11.44 | 42.26 | 89.1 | 10.9 | 0 | 0 | Yes | 1.08 | Yes | Yes |
| 2617 | 10.64 | 2.05 | 8.9 | 33.69 | 92.8 | 7.2 | 0 | 0 | Yes | 1.14 | Yes | Yes |
| 2618 | 9.64 | 1.42 | 8.75 | 48.70 | 81.96 | 17.5 | 0.5 | 0.04 | No | 1.23 | Yes | Yes |
| 2619 | 6.9 | 1.46 | 9.44 | 29.24 | 85.4 | 14.6 | 0 | 0 | No | 1.33 | Yes | Yes |
| 2620 | 10.5 | 1.75 | 9.03 | 67.07 | 90.6 | 9.4 | 0 | 0 | Yes | 1.37 | Yes | Yes |
| 2621 | 13.5 | 1.86 | 8.85 | 50.25 | 92.9 | 7.1 | 0 | 0 | Yes | 1.44 | Yes | Yes |
| 2622 | 20.59 | 1.74 | 8.95 | 29.91 | 77.5 | 22.5 | 0 | 0 | Yes | 1.21 | Yes | Yes |
| 2623 | 7.82 | 1.96 | 12.54 | 87.50 | 84.8 | 13.7 | 1.5 | 0 | No | 1.22 | Yes | Yes |
| 2624 | 5.26 | 1.65 | 8.7 | 30.58 | 87.1 | 12.9 | 0 | 0 | No | 1.23 | Yes | Yes |
| 2625 | 7.06 | 2.35 | 8.55 | 68.41 | 95.7 | 4.3 | 0 | 0 | Yes | 1.47 | Yes | Yes |
| 2626 | 0.64 | 1.62 | 10.72 | 54.59 | 80.2 | 17.6 | 1 | 1.2 | No | 1.01 | Yes | Yes |

| Invention Example No | Ratio of (Zn metal grains or Zn alloy grains):(Later-added Zn metal grains) Zn metal grains/Zn alloy grains | Ratio of (Zn metal grains or Zn alloy grains):(Later-added Zn metal grains) Later-added Zn metal grains | Mg content of all metal grains (Mass %) | Coating details Total metal grain content of coat (Mass %) | Coating details Base resin type | Coating details Coat thickness (μm) | Coating details Coating method | Corrosion Test Results |
|---|---|---|---|---|---|---|---|---|
| 2608 | 1 | 1.6 | 4.077 | 46 | Alkyl silicate | 54 | Spray | E |

TABLE 132-continued

|  | 2609 | 1 | 3.2 | 3.667 | 49 | Alkali silicate | 2 | Spray | G |
|---|---|---|---|---|---|---|---|---|---|
|  | 2610 | 1 | 5.4 | 0.406 | 50 | Alkali silicate | 20 | Spray | E |
|  | 2611 | 1 | 220 | 0.076 | 51 | Alkali silicate | 5 | Spray | G |
|  | 2612 | 1 | 2.2 | 2.531 | 83 | Alkyl silicate | 20 | Spray | E |
|  | 2613 | 1 | 2.8 | 3.605 | 82 | Alkali silicate | 15 | Brush | E |
|  | 2614 | 1 | 12 | 1.423 | 88 | Alkyl silicate | 57 | Brush | E |
|  | 2615 | 1 | 10.6 | 0.207 | 85 | Alkali silicate | 13 | Brush | E |
|  | 2616 | 1 | 35 | 0.303 | 86 | Alkyl silicate | 22 | Brush | E |
|  | 2617 | 1 | 125.5 | 0.057 | 47 | Alkali silicate | 20 | Spray | E |
|  | 2618 | 1 | 6 | 2.500 | 48 | Alkyl silicate | 27 | Spray | E |
|  | 2619 | 1 | 34 | 0.417 | 50 | Alkali silicate | 15 | Spray | E |
|  | 2620 | 1 | 1.6 | 3.615 | 51 | Alkyl silicate | 35 | Spray | E |
|  | 2621 | 1 | 7.5 | 0.835 | 52 | Alkali silicate | 34 | Brush | E |
|  | 2622 | 1 | 200 | 0.112 | 88 | Alkyl silicate | 45 | Brush | E |
|  | 2623 | 1 | 7.5 | 1.612 | 89 | Alkali silicate | 52 | Brush | E |
|  | 2624 | 1 | 3.2 | 3.071 | 86 | Alkyl silicate | 23 | Brush | E |
|  | 2625 | 1 | 2.6 | 1.194 | 87 | Alkali silicate | 23 | Spray | E |
|  | 2626 | 1 | 3 | 4.400 | 86 | Alkyl silicate | 52 | Brush | E |

TABLE 133

| Invention Example No | Average diameter of later-added Zn metal grains (μm) | Diameter distribution (peak diameter) of Zn metal grains/Zn alloy grains (μm) | | Percent of fine-grain metal grains among Zn metal grains/Zn alloy grains (Vol %) | Chemical component content of Zn metal grains/Zn alloy grains (Mass %) | | | | Alloy grain fracture surfaces or cracks present? | Ave aspect ratio | Mg solid solution phase and Zn—Mg intermetallic compounds present on grain surfaces? | Any of MgZn2, Mg2Zn11, Mg2Zn3, MgZn, Mg7Zn3 present? |
|---|---|---|---|---|---|---|---|---|---|---|---|---|
|  |  | Fine metal | Coarse metal |  | Zn | Mg | Al | Si |  |  |  |  |
| 2627 | 46.8 | 2.25 | 9.9 | 34.25 | 98.8 | 0.6 | 0.6 | 0 | Yes | 1.04 | Yes | Yes |
| 2628 | 16.5 | 2.36 | 9.57 | 37.61 | 86.9 | 10.3 | 1.6 | 1.2 | Yes | 1.05 | Yes | Yes |
| 2629 | 13.5 | 2.24 | 10.79 | 45.60 | 92.98 | 7 | 0.02 | 0 | Yes | 1.12 | Yes | Yes |
| 2630 | 0.96 | 2.46 | 10.93 | 46.70 | 75.5 | 23.5 | 1 | 0 | Yes | 1.11 | Yes | Yes |
| 2631 | 0.96 | 1.56 | 11.02 | 41.22 | 82.5 | 17.5 | 0 | 0 | No | 1.08 | Yes | Yes |
| 2632 | 8.45 | 1.24 | 11.18 | 45.68 | 80.1 | 12.4 | 7.5 | 0 | Yes | 1.47 | Yes | Yes |
| 2633 | 2.9 | 1.68 | 11.42 | 22.02 | 85.09 | 14.9 | 0 | 0.01 | Yes | 1.50 | Yes | Yes |
| 2634 | 5.4 | 2.65 | 10.8 | 37.03 | 78.7 | 20.7 | 0 | 0.6 | No | 1.13 | Yes | Yes |
| 2635 | 10.6 | 2.22 | 10.65 | 28.46 | 91.29 | 8.6 | 0 | 0.11 | Yes | 1.26 | Yes | Yes |
| 2636 | 2.32 | 2.45 | 11.34 | 43.47 | 85.8 | 14.2 | 0 | 0 | Yes | 1.14 | Yes | Yes |
| 2637 | 7.8 | 2.23 | 11.62 | 35.19 | 98.12 | 0.08 | 0 | 1.8 | Yes | 1.49 | Yes | Yes |
| 2638 | 7.95 | 2.26 | 11.15 | 73.02 | 83.46 | 15.2 | 0 | 1.34 | No | 1.34 | Yes | Yes |
| 2639 | 20.59 | 2.72 | 12.38 | 56.20 | 73.17 | 17.4 | 9 | 0.43 | Yes | 1.18 | Yes | Yes |
| 2640 | 22.5 | 2.13 | 12.55 | 35.86 | 98.6 | 0.8 | 0.6 | 0 | Yes | 1.17 | Yes | Yes |
| 2641 | 4.6 | 1.98 | 9.34 | 93.45 | 93.55 | 6.4 | 0.05 | 0 | Yes | 1.48 | Yes | Yes |
| 2642 | 4.9 | 2.02 | 9.58 | 30.66 | 96.78 | 3.2 | 0.02 | 0 | No | 1.49 | Yes | Yes |
| 2643 | 10.5 | 2.21 | 9.88 | 74.21 | 83 | 9.2 | 7.8 | 0 | Yes | 1.27 | Yes | Yes |
| 2644 | 8.45 | 2.55 | 10 | 55.39 | 70.92 | 19.2 | 9.88 | 0 | Yes | 1.17 | Yes | Yes |
| 2645 | 30.5 | 1.92 | 10.67 | 30.08 | 80.25 | 15.1 | 4.65 | 0 | Yes | 1.16 | Yes | Yes |
| 2646 | 49.5 | 1.96 | 11.89 | 45.09 | 81.85 | 14.5 | 3.65 | 0 | Yes | 1.27 | Yes | Yes |
| 2647 | 5.9 | 2.11 | 12.03 | 41.41 | 89.45 | 10.5 | 0.05 | 0 | Yes | 1.27 | Yes | Yes |

TABLE 133-continued

| Invention Example No | Ratio of (Zn metal grains or Zn alloy grains):(Later-added Zn metal grains) | | Mg content of all metal grains (Mass %) | Coating details | | | | Corrosion Test Results |
|---|---|---|---|---|---|---|---|---|
| | Zn metal grains/ Zn alloy grains | Later-added Zn metal grains | | Total metal grain content of coat (Mass %) | Base resin type | Coat thickness (µm) | Coating method | |
| 2627 | 1 | 15.2 | 0.037 | 46 | Alkali silicate | 150 | Brush | E |
| 2628 | 1 | 0.09 | 9.450 | 49 | Alkyl silicate | 60 | Brush | E |
| 2629 | 1 | 13.5 | 0.483 | 35 | Alkali silicate | 15 | Spray | E |
| 2630 | 1 | 135.4 | 0.172 | 37 | Alkyl silicate | 24 | Spray | E |
| 2631 | 1 | 3 | 4.375 | 36 | Alkali silicate | 34 | Spray | E |
| 2632 | 1 | 7.8 | 1.409 | 38 | Alkyl silicate | 20 | Brush | E |
| 2633 | 1 | 10.2 | 1.330 | 48 | Alkali silicate | 200 | Brush | E |
| 2634 | 1 | 7 | 2.588 | 46 | Alkyl silicate | 56 | Brush | E |
| 2635 | 1 | 225.2 | 0.038 | 51 | Alkali silicate | 34 | Spray | E |
| 2636 | 1 | 5.4 | 2.219 | 46 | Alkyl silicate | 2 | Spray | G |
| 2637 | 1 | 3.2 | 0.019 | 38 | Alkali silicate | 15 | Spray | E |
| 2638 | 1 | 13.5 | 1.048 | 48 | Alkali silicate | 10 | Spray | E |
| 2639 | 1 | 1.6 | 6.692 | 52 | Alkyl silicate | 125 | Brush | E |
| 2640 | 1 | 1.5 | 0.320 | 30 | Alkali silicate | 24 | Brush | E |
| 2641 | 1 | 2.5 | 1.829 | 76 | Alkyl silicate | 110 | Brush | E |
| 2642 | 1 | 2.6 | 0.889 | 72 | Alkali silicate | 24 | Brush | E |
| 2643 | 1 | 126 | 0.072 | 81 | Alkyl silicate | 2 | Spray | G |
| 2644 | 1 | 120 | 0.159 | 64 | Alkali silicate | 37 | Spray | E |
| 2645 | 1 | 7.5 | 1.776 | 69 | Alkyl silicate | 113 | Brush | E |
| 2646 | 1 | 6.5 | 1.933 | 83 | Alkali silicate | 2 | Spray | G |
| 2647 | 1 | 2.0 | 0.500 | 30 | Alkyl silicate | 75 | Brush | E |

TABLE 134

| Invention Example No | Average diameter of later-added Zn metal grains (µm) | Diameter distribution (peak diameter) of Zn metal grains/Zn alloy grains (µm) | | Percent of fine-grain metal grains among Zn metal grains/ Zn alloy grains (Vol %) | Chemical component content of Zn metal grains/Zn alloy grains (Mass %) | | | | Alloy grain fracture surfaces or cracks present? | Ave aspect ratio | Mg solid solution phase and Zn—Mg intermetallic compounds present on grain surfaces? | Any of MgZn2, Mg2Zn11, Mg2Zn3, MgZn, Mg7Zn3 present? |
|---|---|---|---|---|---|---|---|---|---|---|---|---|
| | | Fine metal | Coarse metal | | Zn | Mg | Al | Si | | | | |
| 2648 | 4.52 | 2.97 | 12.12 | 17.75 | 87.3 | 7.5 | 5.2 | 0 | Yes | 1.49 | Yes | Yes |
| 2649 | 5.96 | 2.36 | 12.28 | 32.76 | 93.9 | 6.1 | 0 | 0.001 | Yes | 1.29 | Yes | Yes |
| 2650 | 5.5 | 3.05 | 12.52 | 30.89 | 82.55 | 16.8 | 0.05 | 0.6 | Yes | 1.23 | Yes | Yes |
| 2651 | 3.6 | 2.57 | 11.9 | 45.90 | 70.7 | 27.5 | 1 | 0.8 | Yes | 1.23 | Yes | Yes |

TABLE 134-continued

| | | | | | | | | | | | |
|---|---|---|---|---|---|---|---|---|---|---|---|
| 2652 | 16.5 | 2.65 | 11.75 | 42.22 | 94.6 | 2.9 | 0 | 2.5 | Yes | 1.23 | Yes | Yes |
| 2653 | 12.5 | 2.54 | 12.44 | 18.56 | 94 | 4.5 | 0 | 1.5 | No | 1.23 | Yes | Yes |
| 2654 | 16.5 | 2.85 | 12.03 | 33.57 | 99.43 | 0.07 | 0 | 0.5 | Yes | 1.27 | Yes | Yes |
| 2655 | 10.9 | 2.75 | 10.61 | 31.70 | 96.82 | 3.1 | 0.04 | 0.04 | Yes | 1.23 | Yes | Yes |
| 2656 | 5.6 | 2.46 | 11.3 | 46.71 | 76.3 | 20.5 | 1 | 2.2 | Yes | 1.36 | Yes | Yes |
| 2657 | 22.6 | 2.71 | 11.58 | 47.89 | 68.84 | 29.5 | 0.06 | 1.6 | Yes | 1.11 | Yes | Yes |
| 2658 | 20.59 | 2.36 | 11.11 | 24.23 | 92.33 | 7.6 | 0.07 | 0 | Yes | 1.02 | Yes | Yes |
| 2659 | 20.59 | 2.16 | 12.34 | 39.24 | 95.2 | 0.7 | 1.2 | 2.9 | Yes | 1.05 | Yes | Yes |
| 2660 | 9.56 | 2.46 | 12.51 | 37.37 | 91.8 | 4.6 | 1.8 | 1.8 | Yes | 1.24 | Yes | Yes |
| 2661 | 5.9 | 2.49 | 11.64 | 50.38 | 82 | 8.3 | 9.2 | 0.5 | Yes | 1.33 | Yes | Yes |
| 2662 | 6.54 | 1.63 | 9.16 | 37.14 | 88.2 | 11.8 | 0 | 0 | Yes | 1.27 | Yes | Yes |
| 2663 | 21.4 | 1.51 | 9.46 | 13.48 | 86.06 | 12.9 | 0 | 1.04 | Yes | 1.50 | Yes | Yes |
| 2664 | 9.8 | 3.05 | 9.54 | 40.05 | 99.34 | 0.6 | 0 | 0.06 | Yes | 1.13 | Yes | Yes |
| 2665 | 6.59 | 2.57 | 9.56 | 38.18 | 89.51 | 9.5 | 0 | 0.99 | No | 1.04 | Yes | Yes |
| 2666 | 6.54 | 2.65 | 9.46 | 7.63 | 88.3 | 11.7 | 0 | 0 | Yes | 1.02 | Yes | Yes |
| 2667 | 16.5 | 2.54 | 11.99 | 37.95 | 89.9 | 9.4 | 0.7 | 0 | Yes | 1.08 | Yes | Yes |

| Invention Example No | Ratio of (Zn metal grains or Zn alloy grains):(Later-added Zn metal grains) | | Mg content of all metal grains (Mass %) | Total metal grain content of coat (Mass %) | Coating details | | | Corrosion Test Results |
|---|---|---|---|---|---|---|---|---|
| | Zn metal grains/Zn alloy grains | Later-added Zn metal grains | | | Base resin type | Coat thickness (μm) | Coating method | |
| 2648 | 1 | 0.007 | 7.448 | 83 | Alkali silicate | 30 | Brush | E |
| 2649 | 1 | 9 | 0.610 | 75 | Alkyl silicate | 34 | Brush | E |
| 2650 | 1 | 7.5 | 1.976 | 76 | Epoxy resin | 124 | Brush | E |
| 2651 | 1 | 50 | 0.539 | 72 | Acrylic resin | 15 | Spray | E |
| 2652 | 1 | 0.005 | 2.886 | 71 | Urethane resin | 23 | Spray | E |
| 2653 | 1 | 25.6 | 0.169 | 82 | Polyester resin | 157 | Brush | E |
| 2654 | 1 | 56.5 | 0.001 | 81 | Epoxy resin | 26 | Spray | E |
| 2655 | 1 | 1.6 | 1.192 | 83 | Acrylic resin | 38 | Spray | E |
| 2656 | 1 | 3 | 5.125 | 50 | Urethane resin | 160 | Brush | E |
| 2657 | 1 | 100 | 0.292 | 72 | Polyester resin | 27 | Brush | E |
| 2658 | 1 | 65.5 | 0.114 | 47 | Epoxy resin | 180 | Brush | E |
| 2659 | 1 | 1.9 | 0.241 | 47 | Acrylic resin | 26 | Spray | E |
| 2660 | 1 | 2.1 | 1.484 | 52 | Urethane resin | 180 | Brush | E |
| 2661 | 1 | 10.5 | 0.722 | 52 | Polyester resin | 15 | Spray | E |
| 2662 | 1 | 6.5 | 1.573 | 50 | Epoxy resin | 2 | Spray | G |
| 2663 | 1 | 19.5 | 0.629 | 46 | Acrylic resin | 28 | Spray | E |
| 2664 | 1 | 0.8 | 0.333 | 47 | Urethane resin | 30 | Spray | E |
| 2665 | 1 | 18.5 | 0.487 | 83 | Polyester resin | 2 | Spray | G |
| 2666 | 1 | 4.3 | 2.208 | 52 | Epoxy resin | 157 | Brush | E |
| 2667 | 1 | 3.2 | 2.238 | 89 | Acrylic resin | 28 | Brush | E |

TABLE 135

| Invention Example No | Average diameter of later-added Zn metal grains (μm) | Diameter distribution (peak diameter) of Zn metal grains/Zn alloy grains (μm) Fine metal | Diameter distribution (peak diameter) of Zn metal grains/Zn alloy grains (μm) Coarse metal | Percent of fine-grain metal grains among Zn metal grains/Zn alloy grains (Vol %) | Chemical component content of Zn metal grains/Zn alloy grains (Mass %) Zn | Chemical component content of Zn metal grains/Zn alloy grains (Mass %) Mg | Chemical component content of Zn metal grains/Zn alloy grains (Mass %) Al | Chemical component content of Zn metal grains/Zn alloy grains (Mass %) Si | Alloy grain fracture surfaces or cracks present? | Ave aspect ratio | Mg solid solution phase and Zn—Mg intermetallic compounds present on grain surfaces? | Any of MgZn2, Mg2Zn11, Mg2Zn3, MgZn, Mg7Zn3 present? |
|---|---|---|---|---|---|---|---|---|---|---|---|---|
| 2668 | 7.8 | 2.85 | 12.08 | 14.29 | 87.8 | 11.7 | 0.5 | 0 | Yes | 1.15 | Yes | Yes |
| 2669 | 16.5 | 2.75 | 12.24 | 40.86 | 95.6 | 4.2 | 0.2 | 0 | Yes | 1.34 | Yes | Yes |
| 2670 | 6.54 | 2.46 | 12.48 | 97.50 | 97.13 | 2.8 | 0.07 | 0 | Yes | 1.25 | Yes | Yes |
| 2671 | 8.45 | 2.71 | 11.86 | 13.30 | 86.1 | 13.9 | 0 | 0 | Yes | 1.19 | Yes | Yes |
| 2672 | 8.5 | 2.36 | 11.71 | 43.62 | 82.6 | 14.6 | 1.6 | 1.2 | No | 1.18 | Yes | Yes |
| 2673 | 13.6 | 2.46 | 11.35 | 56.93 | 72.95 | 26.4 | 0.65 | 0 | Yes | 1.24 | Yes | Yes |
| 2674 | 12.33 | 1.45 | 12.02 | 36.59 | 83.23 | 16.5 | 0.27 | 0 | Yes | 1.11 | Yes | Yes |
| 2675 | 16.5 | 2.42 | 13.24 | 39.95 | 79.4 | 19.5 | 0.45 | 0.65 | Yes | 1.27 | Yes | Yes |
| 2676 | 7.9 | 2.11 | 9.46 | 86.50 | 97.08 | 1.6 | 0.33 | 0.99 | Yes | 1.31 | Yes | Yes |
| 2677 | 10.5 | 2.97 | 13.47 | 32.87 | 90.5 | 6 | 1 | 2.5 | Yes | 1.26 | Yes | Yes |
| 2678 | 16.5 | 2.36 | 9.46 | 16.23 | 88.93 | 8.4 | 0.87 | 1.8 | Yes | 1.14 | Yes | Yes |
| 2679 | 10.64 | 3.05 | 13.87 | 37.40 | 86.7 | 13.3 | 0 | 0 | Yes | 1.34 | Yes | Yes |
| 2680 | 10.5 | 2.57 | 13.25 | 40.76 | 81.4 | 18.6 | 0. | 0 | Yes | 1.16 | Yes | Yes |
| 2681 | 20.59 | 2.65 | 13.1 | 87.31 | 97.34 | 1.8 | 0.86 | 0 | No | 1.47 | Yes | Yes |
| 2682 | 8.5 | 2.12 | 9.08 | 92.50 | 95.25 | 4.1 | 0.65 | 0 | Yes | 1.48 | Yes | Yes |
| 2683 | 0.5 | 1.65 | 9.87 | 17.93 | 82.87 | 16.7 | 0.43 | 0 | No | 1.49 | Yes | Yes |
| 2684 | 10.5 | 2.35 | 9.46 | 44.50 | 99 | 0.4 | 0.6 | 0 | Yes | 1.34 | Yes | Yes |
| 2685 | 11.5 | 1.63 | 9.28 | 96.50 | 89.35 | 10.6 | 0.05 | 0 | Yes | 1.29 | Yes | Yes |
| 2686 | 36.5 | 2.64 | 9.45 | 16.94 | 93.08 | 6.9 | 0.02 | 0 | Yes | 1.18 | Yes | Yes |

| Invention Example No | Ratio of (Zn metal grains or Zn alloy grains):(Later-added Zn metal grains) Zn metal grains/Zn alloy grains | Ratio of (Zn metal grains or Zn alloy grains):(Later-added Zn metal grains) Later-added Zn metal grains | Mg content of all metal grains (Mass %) | Coating details Total metal grain content of coat (Mass %) | Coating details Base resin type | Coating details Coat thickness (μm) | Coating details Coating method | Corrosion Test Results |
|---|---|---|---|---|---|---|---|---|
| 2668 | 1 | 1.5 | 4.680 | 85 | Alkyl silicate | 130 | Brush | E |
| 2669 | 1 | 4.5 | 0.764 | 53 | Alkyl silicate | 29 | Brush | E |
| 2670 | 1 | 15.5 | 0.170 | 88 | Epoxy resin | 30 | Brush | E |
| 2671 | 1 | 10.5 | 1.209 | 85 | Acrylic resin | 120 | Brush | E |
| 2672 | 1 | 2.5 | 4.171 | 52 | Urethane resin | 187 | Brush | E |
| 2673 | 1 | 9 | 2.640 | 83 | Polyester resin | 28 | Spray | E |
| 2674 | 1 | 10.5 | 0.156 | 88 | Epoxy resin | 5 | Spray | E |
| 2675 | 1 | 5.7 | 2.910 | 49 | Acrylic resin | 35 | Spray | E |
| 2676 | 1 | 3.9 | 0.327 | 50 | Urethane resin | 5 | Spray | G |
| 2677 | 1 | 4.5 | 1.091 | 51 | Polyester resin | 200 | Brush | E |
| 2678 | 1 | 3.6 | 1.826 | 83 | Alkali silicate | 25 | Spray | E |
| 2679 | 1 | 16.4 | 0.764 | 82 | Alkali silicate | 15 | Spray | E |
| 2680 | 1 | 6 | 2.657 | 88 | Alkyl silicate | 20 | Spray | E |
| 2681 | 1 | 7.5 | 0.212 | 85 | Alkali silicate | 18 | Spray | E |
| 2682 | 1 | 10.5 | 0.357 | 87 | Alkyl silicate | 22 | Spray | E |
| 2683 | 1 | 2.6 | 4.639 | 86 | Alkali silicate | 19 | Spray | E |
| 2684 | 1 | 1.5 | 0.160 | 46 | Alkyl silicate | 29 | Spray | E |
| 2685 | 1 | 13.5 | 0.731 | 49 | Alkali silicate | 23 | Spray | E |

TABLE 135-continued

| | | | | | | | | |
|---|---|---|---|---|---|---|---|---|
| 2686 | 1 | 2.6 | 1.917 | 35 | Alkyl silicate | 21 | Spray | E |

TABLE 136

| Invention Example No | Average diameter of later-added Zn metal grains (μm) | Diameter distribution (peak diameter) of Zn metal grains/Zn alloy grains (μm) Fine metal | Diameter distribution (peak diameter) of Zn metal grains/Zn alloy grains (μm) Coarse metal | Percent of fine-grain metal grains among Zn metal grains/Zn alloy grains (Vol %) | Chemical component content of Zn metal grains/Zn alloy grains (Mass %) Zn | Chemical component content of Zn metal grains/Zn alloy grains (Mass %) Mg | Chemical component content of Zn metal grains/Zn alloy grains (Mass %) Al | Chemical component content of Zn metal grains/Zn alloy grains (Mass %) Si | Alloy grain fracture surfaces or cracks present? | Ave aspect ratio | Mg solid solution phase and Zn—Mg intermetallic compounds present on grain surfaces? | Any of MgZn2, Mg2Zn11, Mg2Zn3, MgZn, Mg7Zn3 present? |
|---|---|---|---|---|---|---|---|---|---|---|---|---|
| 2687 | 1.5 | 2.35 | 9.25 | 88.12 | 99.82 | 0.05 | 0.06 | 0.07 | Yes | 1.48 | Yes | Yes |
| 2688 | 8.7 | 2.31 | 9.46 | 60.57 | 91.56 | 6.4 | 1.05 | 0.99 | Yes | 1.27 | Yes | Yes |
| 2689 | 7.8 | 2.62 | 9.46 | 39.48 | 93.36 | 3.5 | 2.6 | 0.54 | Yes | 1.17 | Yes | Yes |
| 2690 | 5.96 | 2.52 | 9.46 | 15.82 | 82.13 | 17.5 | 0.05 | 0.32 | Yes | 1.27 | Yes | Yes |
| 2691 | 0.06 | 2.24 | 13.32 | 49.57 | 91.2 | 3.6 | 5.2 | 0 | No | 1.27 | Yes | Yes |
| 2692 | 0.9 | 0.05 | 6.54 | 86.52 | 94.1 | 5.9 | 0 | 0.001 | Yes | 1.48 | Yes | Yes |
| 2693 | 3.6 | 2.42 | 6.35 | 90.98 | 83.2 | 16.2 | 0 | 0.6 | No | 1.49 | Yes | Yes |
| 2694 | 10.5 | 0.11 | 7.54 | 67.32 | 76.7 | 22.5 | 0 | 0.8 | Yes | 1.34 | Yes | Yes |
| 2695 | 0.05 | 1.92 | 8.64 | 82.33 | 96.52 | 3.4 | 0.04 | 0.04 | Yes | 1.23 | Yes | Yes |
| 2696 | 2.32 | 0.46 | 6.45 | 73.76 | 68.3 | 26.5 | 3 | 2.2 | Yes | 1.23 | Yes | Yes |
| 2697 | 20.4 | 0.77 | 6.48 | 88.77 | 72.84 | 25.5 | 0.06 | 1.6 | Yes | 1.23 | Yes | Yes |
| 2698 | 8.6 | 2.35 | 9.25 | 45.02 | 87.2 | 12.8 | 0 | 0 | Yes | 1.05 | Yes | Yes |
| 2699 | 10.5 | 2.33 | 9.46 | 15.2 | 91.5 | 8.5 | 0 | 0 | Yes | 1.06 | Yes | Yes |
| 2700 | 8.7 | 1.95 | 9.32 | 51.41 | 75.23 | 24.5 | 0.27 | 0 | Yes | 1.38 | Yes | Yes |
| 2701 | 7.8 | 2.15 | 9.22 | 45.46 | 77.48 | 18.4 | 2.55 | 1.57 | Yes | 1.06 | Yes | Yes |
| 2702 | 5.96 | 2.23 | 11.62 | 35.19 | 72.62 | 0.08 | 25.5 | 1.8 | Yes | 1.49 | Yes | Yes |
| 2703 | 1.6 | 2.26 | 11.15 | 73.02 | 64.06 | 15.2 | 19.4 | 1.34 | No | 1.34 | Yes | Yes |
| 2704 | 7.2 | 1.98 | 9.34 | 93.45 | 83 | 6.4 | 10.6 | 0 | Yes | 1.48 | Yes | Yes |
| 2705 | 10.5 | 2.02 | 9.58 | 30.66 | 86.4 | 3.2 | 10.4 | 0 | No | 1.49 | Yes | Yes |
| 2706 | 3.6 | 2.36 | 12.28 | 32.76 | 80.4 | 6.1 | 13.5 | 0.001 | Yes | 1.29 | Yes | Yes |
| 2707 | 4.5 | 3.05 | 12.52 | 30.89 | 70.1 | 16.8 | 12.5 | 0.6 | Yes | 1.23 | Yes | Yes |
| 2708 | 7.9 | 2.57 | 11.9 | 45.9 | 60.9 | 27.5 | 10.8 | 0.8 | Yes | 1.23 | Yes | Yes |

| Invention Example No | Ratio of (Zn metal grains or Zn alloy grains):(Later-added Zn metal grains) Zn metal grains/Zn alloy grains | Ratio of (Zn metal grains or Zn alloy grains):(Later-added Zn metal grains) Later-added Zn metal grains | Mg content of all metal grains (Mass %) | Coating details Total metal grain content of coat (Mass %) | Coating details Base resin type | Coating details Coat thickness (μm) | Coating details Coating method | Corrosion Test Results |
|---|---|---|---|---|---|---|---|---|
| 2687 | 1 | 6.5 | 0.007 | 30 | Alkali silicate | 19 | Spray | E |
| 2688 | 1 | 1.6 | 2.462 | 76 | Alkyl silicate | 15 | Spray | E |
| 2689 | 1 | 3.8 | 0.729 | 72 | Alkali silicate | 18 | Spray | E |
| 2690 | 1 | 0.08 | 16.204 | 30 | Alkyl silicate | 22 | Spray | E |
| 2691 | 1 | 164.5 | 0.022 | 83 | Alkyl silicate | 21 | Spray | E |
| 2692 | 1 | 3.6 | 1.283 | 75 | Alkyl silicate | 29 | Spray | E |
| 2693 | 1 | 8.6 | 1.688 | 76 | Alkali silicate | 23 | Spray | E |
| 2694 | 1 | 12 | 1.731 | 72 | Alkyl silicate | 21 | Spray | E |
| 2695 | 1 | 5.8 | 0.500 | 83 | Alkali silicate | 19 | Spray | E |
| 2696 | 1 | 10 | 2.409 | 50 | Alkyl silicate | 21 | Spray | E |

TABLE 136-continued

| | | | | | | | | |
|---|---|---|---|---|---|---|---|---|
| 2697 | 1 | 1 | 12.750 | 72 | Alkali silicate | 19 | Spray | E |
| 2698 | 1 | 10.5 | 1.113 | 50 | Acrylic resin | 654 | Spray | E |
| 2699 | 1 | 6.5 | 1.133 | 48 | Alkali silicate | 700 | Spray | E |
| 2700 | 1 | 19.5 | 1.195 | 75 | Alkyl silicate | 555 | Spray | E |
| 2701 | 1 | 0.8 | 10.222 | 55 | Alkyl silicate | 12 | Spray | E |
| 2702 | 1 | 5.3 | 0.013 | 38 | Alkyl silicate | 678 | Brush | E |
| 2703 | 1 | 4.3 | 2.868 | 48 | Urethane resin | 674 | Spray | E |
| 2704 | 1 | 3.2 | 1.524 | 76 | Polyester resin | 325 | Spray | E |
| 2705 | 1 | 1.5 | 1.280 | 72 | Alkyl silicate | 665 | Spray | E |
| 2706 | 1 | 4.5 | 1.109 | 75 | Alkyl silicate | 354 | Brush | E |
| 2707 | 1 | 0.8 | 9.333 | 76 | Alkyl silicate | 165 | Spray | E |
| 2708 | 1 | 6.5 | 3.667 | 72 | Urethane resin | 354 | Spray | E |

TABLE 137

| Invention Example No | Average diameter of later-added Zn metal grains (μm) | Diameter distribution (peak diameter) of Zn metal grains/Zn alloy grains (μm) | | Percent of fine-grain metal grains among Zn metal grains/Zn alloy grains (Vol %) | Chemical component content of Zn metal grains/Zn alloy grains (Mass %) | | | | Alloy grain fracture surfaces or cracks present? | Average aspect ratio | Mg solid solution phase and Zn—Mg intermetallic compounds present on grain surfaces? | Any of MgZn2, Mg2Zn11, Mg2Zn3, MgZn, Mg7Zn3 present? |
|---|---|---|---|---|---|---|---|---|---|---|---|---|
| | | Fine metal | Coarse metal | | Zn | Mg | Al | Si | | | | |
| 2709 | 16..5 | 2.35 | 9.25 | 35.87 | 88.8 | 11.2 | 0 | 0 | Yes | 1.12 | Yes | Yes |
| 2710 | 13.5 | 2.57 | 9.56 | 42.04 | 90.6 | 9.4 | 0 | 0 | No | 1.38 | Yes | Yes |
| 2711 | 0.96 | 2.56 | 9.84 | 6.55 | 81.45 | 18.5 | 0 | 0.05 | Yes | 1.22 | Yes | Yes |
| 2712 | 0.96 | 2.21 | 9.75 | 43.60 | 99.97 | 0.03 | 0 | 0 | Yes | 1.14 | Yes | Yes |
| 2713 | 8.45 | 2.64 | 9.85 | 44.12 | 98.4 | 1.6 | 0 | 0 | No | 1.02 | Yes | Yes |
| 2714 | 2.9 | 1.99 | 8.56 | 37.21 | 93.2 | 6.8 | 0 | 0 | Yes | 1.05 | Yes | Yes |
| 2715 | 5.4 | 2.94 | 8.21 | 43.38 | 84.5 | 13.9 | 0 | 1.6 | No | 1.36 | No | Yes |
| 2716 | 10.6 | 2.58 | 8.33 | 13.52 | 98.1 | 1.9 | 0 | 0 | Yes | 1.11 | No | Yes |
| 2717 | 2.32 | 2.37 | 8 | 44.94 | 94.3 | 5.7 | 0 | 0 | No | 1.07 | Yes | Yes |
| 2718 | 7.8 | 2.15 | 9.22 | 45.46 | 90.8 | 9.2 | 0 | 0 | No | 1.42 | Yes | Yes |
| 2719 | 7.95 | 2.96 | 9.36 | 35.96 | 83.3 | 15.4 | 0 | 1.3 | Yes | 1.38 | No | Yes |
| 2720 | 20.59 | 2.85 | 9.45 | 42.13 | 79.84 | 18.6 | 0 | 1.56 | Yes | 1.22 | No | Yes |
| 2721 | 22.5 | 2.94 | 9.61 | 7.56 | 96.4 | 3.6 | 0 | 0 | Yes | 1.14 | Yes | Yes |
| 2722 | 4.6 | 2.11 | 9.85 | 43.69 | 94.6 | 5.4 | 0 | 0 | Yes | 1.13 | Yes | Yes |
| 2723 | 4.9 | 2.68 | 9.23 | 44.21 | 92.4 | 7.6 | 0 | 0 | Yes | 1.02 | No | Yes |
| 2724 | 10.5 | 2.99 | 9.08 | 39.51 | 75.5 | 24.5 | 0 | 0 | Yes | 1.06 | Yes | Yes |
| 2725 | 8.45 | 2.78 | 9.87 | 45.68 | 82.4 | 17.6 | 0 | 0 | Yes | 1.05 | Yes | Yes |
| 2726 | 30.5 | 2.96 | 9.46 | 65.58 | 98.6 | 1.4 | 0 | 0 | Yes | 1.24 | No | Yes |
| 2727 | 49.5 | 2.85 | 9.28 | 47.24 | 78.5 | 21.5 | 0 | 0 | Yes | 1.33 | No | Yes |
| 2728 | 5.9 | 2.64 | 9.45 | 47.76 | 89.6 | 10.4 | 0 | 0 | Yes | 1.27 | Yes | Yes |

| Invention Example No | Number of faces | Ratio of (Zn metal grains or Zn alloy grains):(Later-added Zn metal grains) | | Mg content of all metal grains (Mass %) | Total metal grain content of coat (Mass %) | Coating details | | | Corrosion Test Results |
|---|---|---|---|---|---|---|---|---|---|
| | | Zn metal grains/Zn alloy grains | Later-added Zn metal grains | | | Base resin type | Coat thickness (μm) | Coating method | |
| 2709 | 2 | 1 | 5 | 1.867 | 49 | Alkyl silicate | 14 | Spray | E |

TABLE 137-continued

| | | | | | | | | | | |
|---|---|---|---|---|---|---|---|---|---|---|
| 2710 | 2 | 1 | 198.7 | 0.047 | 89 | Urethane resin | 55 | Spray | E |
| 2711 | 2 | 1 | 36 | 0.500 | 90 | Alkyl silicate | 8 | Spray | E |
| 2712 | 2 | 1 | 1.5 | 0.012 | 86 | Urethane resin | 122 | Brush | E |
| 2713 | 6 | 1 | 0.008 | 1.587 | 48 | Alkyl silicate | 555 | Spray | E |
| 2714 | 6 | 1 | 1.4 | 2.833 | 47 | Alkali silicate | 19 | Spray | E |
| 2715 | 7 | 1 | 4.2 | 2.673 | 47 | Alkyl silicate | 25 | Brush | E |
| 2716 | 6 | 1 | 1.6 | 0.731 | 47 | Alkyl silicate | 58 | Spray | E |
| 2717 | 2 | 1 | 7.5 | 0.671 | 52 | Alkyl silicate | 685 | Spray | E |
| 2718 | 7 | 1 | 1.6 | 3.538 | 52 | Alkali silicate | 19 | Brush | E |
| 2719 | 2 | 1 | 2 | 5.133 | 52 | Urethane resin | 700 | Spray | E |
| 2720 | 6 | 1 | 270 | 0.069 | 88 | Alkyl silicate | 77 | Spray | E |
| 2721 | 6 | 1 | 7.5 | 0.424 | 87 | Alkyl silicate | 54 | Spray | E |
| 2722 | 2 | 1 | 2.9 | 1.385 | 89 | Alkyl silicate | 64 | Spray | E |
| 2723 | 2 | 1 | 2.6 | 2.111 | 90 | Alkyl silicate | 34 | Brush | E |
| 2724 | 7 | 1 | 0.1 | 22.273 | 91 | Alkali silicate | 28 | Spray | E |
| 2725 | 6 | 1 | 1.2 | 8.000 | 46 | Urethane resin | 109 | Brush | E |
| 2726 | 7 | 1 | 1.2 | 0.636 | 47 | Alkyl silicate | 15 | Spray | E |
| 2727 | 2 | 1 | 62 | 0.341 | 47 | Alkyl silicate | 14 | Spray | E |
| 2728 | 7 | 1 | 2.4 | 3.059 | 49 | Alkyl silicate | 18 | Spray | E |

TABLE 138

| Invention Example No | Average diameter of later-added Zn metal grains (μm) | Diameter distribution (peak diameter) of Zn metal alloy grains (μm) | | Percent of fine-grain metal grains among Zn metal grains/ Zn alloy grains (Vol %) | Chemical component content of Zn metal grains/Zn alloy grains (Mass %) | | | | Alloy grain fracture surfaces or cracks present? | Average aspect ratio | Mg solid solution phase and Zn—Mg intermetallic compounds present on grain surfaces? | Any of MgZn2, Mg2Zn11, Mg2Zn3, MgZn, Mg7Zn3 present? |
|---|---|---|---|---|---|---|---|---|---|---|---|---|
| | | Fine metal | Coarse metal | | Zn | Mg | Al | Si | | | | |
| 2729 | 4.52 | 2.35 | 9.25 | 45.02 | 87.2 | 12.8 | 0 | 0 | Yes | 1.05 | Yes | Yes |
| 2730 | 5.96 | 2.12 | 9.46 | 47.02 | 92.2 | 7.8 | 0 | 0 | Yes | 1.22 | No | Yes |
| 2731 | 5.5 | 2.34 | 9.46 | 7.66 | 70.5 | 29.5 | 0 | 0 | Yes | 1.13 | No | Yes |
| 2732 | 3.6 | 2.33 | 9.46 | 15.20 | 91.5 | 8.5 | 0 | 0 | Yes | 1.06 | Yes | Yes |
| 2733 | 16.5 | 2.23 | 9.06 | 43.16 | 74.5 | 25.5 | 0 | 0 | Yes | 1.05 | Yes | Yes |
| 2734 | 12.5 | 2.12 | 9.3 | 49.33 | 99.93 | 0.07 | 0 | 0 | Yes | 1.24 | Yes | Yes |
| 2735 | 16.5 | 2.21 | 8.68 | 19.47 | 89.2 | 10.8 | 0 | 0 | No | 1.05 | Yes | Yes |
| 2736 | 10.9 | 1.38 | 8.53 | 69.55 | 86 | 11.2 | 1.6 | 1.2 | No | 1.12 | Yes | Yes |
| 2737 | 5.6 | 1.95 | 9.32 | 51.41 | 75.23 | 24.5 | 0.27 | 0 | Yes | 1.38 | No | Yes |
| 2738 | 22.6 | 2.26 | 8.95 | 75.88 | 82.6 | 17.4 | 0 | 0 | Yes | 1.13 | No | Yes |
| 2739 | 20.59 | 2.05 | 12.54 | 48.08 | 98.7 | 1.3 | 0 | 0 | Yes | 1.33 | Yes | Yes |
| 2740 | 20.59 | 1.65 | 8.7 | 66.85 | 80.5 | 19.5 | 0 | 0 | Yes | 1.27 | Yes | Yes |
| 2741 | 9.56 | 2.35 | 8.55 | 7.68 | 88.85 | 10.8 | 0.05 | 0.3 | No | 1.23 | No | Yes |
| 2742 | 5.9 | 1.62 | 8.91 | 8.64 | 87.7 | 11.9 | 0.4 | 0 | Yes | 1.11 | Yes | Yes |
| 2743 | 6.54 | 1.88 | 9.91 | 16.58 | 90.5 | 9.5 | 0 | 0 | Yes | 1.42 | Yes | Yes |
| 2744 | 21.4 | 2.35 | 9.25 | 35.87 | 89.5 | 10.5 | 0 | 0 | Yes | 1.06 | No | Yes |
| 2745 | 9.8 | 2.57 | 9.56 | 42.04 | 84.9 | 15.1 | 0 | 0 | Yes | 1.05 | Yes | Yes |
| 2746 | 6.59 | 2.56 | 9.84 | 38.41 | 83.2 | 16.8 | 0 | 0 | Yes | 1.07 | Yes | Yes |
| 2747 | 6.54 | 2.21 | 9.75 | 6.99 | 89.4 | 10.6 | 0 | 0 | Yes | 1.42 | No | Yes |
| 2748 | 16.5 | 2.64 | 9.85 | 44.12 | 84.3 | 13.3 | 2.4 | 0 | Yes | 1.38 | Yes | Yes |

TABLE 138-continued

| Invention Example No | Number of faces | Ratio of (Zn metal grains or Zn alloy grains):(Later-added Zn metal grains) | | Mg content of all metal grains (Mass %) | Coating details | | | | Corrosion Test Results |
|---|---|---|---|---|---|---|---|---|---|
| | | Zn metal grains/ Zn alloy grains | Later-added Zn metal grains | | Total metal grain content of coat (Mass %) | Base resin type | Coat thickness (μm) | Coating method | |
| 2729 | 6 | 1 | 2.1 | 4.129 | 50 | Alkali silicate | 2 | Spray | G |
| 2730 | 7 | 1 | 34.5 | 0.220 | 87 | Alkyl silicate | 37 | Spray | E |
| 2731 | 6 | 1 | 270 | 0.109 | 83 | Alkali silicate | 12 | Spray | E |
| 2732 | 7 | 1 | 32.5 | 0.254 | 48 | Alkyl silicate | 160 | Brush | E |
| 2733 | 6 | 1 | 3 | 6.375 | 51 | Alkali silicate | 5 | Brush | G |
| 2734 | 2 | 1 | 1.5 | 0.028 | 51 | Alkyl silicate | 56 | Brush | E |
| 2735 | 7 | 1 | 7.5 | 1.271 | 87 | Alkali silicate | 2 | Spray | G |
| 2736 | 6 | 1 | 13.5 | 0.772 | 85 | Alkyl silicate | 18 | Spray | E |
| 2737 | 6 | 1 | 5 | 4.083 | 86 | Alkyl silicate | 23 | Spray | E |
| 2738 | 6 | 1 | 5 | 2.900 | 50 | Epoxy resin | 30 | Brush | E |
| 2739 | 2 | 1 | 1 | 0.650 | 51 | Acrylic resin | 77 | Brush | E |
| 2740 | 6 | 1 | 120 | 0.161 | 51 | Urethane resin | 655 | Brush | E |
| 2741 | 7 | 1 | 3.7 | 2.298 | 80 | Polyester resin | 47 | Spray | E |
| 2742 | 2 | 1 | 6.1 | 1.676 | 46 | Epoxy resin | 43 | Spray | E |
| 2743 | 6 | 1 | 198.5 | 0.048 | 51 | Acrylic resin | 52 | Brush | E |
| 2744 | 2 | 1 | 2.5 | 3.000 | 86 | Urethane resin | 20 | Brush | E |
| 2745 | 6 | 1 | 18.5 | 0.774 | 85 | Polyester resin | 200 | Brush | E |
| 2746 | 7 | 1 | 8 | 1.867 | 82 | Alkali silicate | 22 | Spray | E |
| 2747 | 7 | 1 | 1.6 | 4.077 | 81 | Alkyl silicate | 25 | Spray | E |
| 2748 | 2 | 1 | 1.2 | 6.045 | 46 | Alkali silicate | 14 | Spray | E |

TABLE 139

| Invention Example No | Average diameter of later-added Zn metal grains (μm) | Diameter distribution (peak diameter) of Zn metal grains/Zn alloy grains (μm) | | Percent of fine-grain metal grains among Zn metal grains/ Zn alloy grains (Vol %) | Chemical component content of Zn metal grains/Zn alloy grains (Mass %) | | | | Alloy grain fracture surfaces or cracks present? | Average aspect ratio | Mg solid solution phase and Zn—Mg intermetallic compounds present on grain surfaces? | Any of MgZn2, Mg2Zn11, Mg2Zn3, MgZn, Mg7Zn3 present? |
|---|---|---|---|---|---|---|---|---|---|---|---|---|
| | | Fine metal | Coarse metal | | Zn | Mg | Al | Si | | | | |
| 2749 | 7.8 | 2.65 | 8.56 | 66.99 | 98.6 | 1.4 | 0 | 0 | No | 1.22 | Yes | Yes |
| 2750 | 16.5 | 2.94 | 8.21 | 43.38 | 76.45 | 23.5 | 0 | 0.05 | Yes | 1.14 | Yes | Yes |
| 2751 | 6.54 | 2.58 | 8.33 | 39.75 | 91.1 | 8.9 | 0 | 0 | Yes | 1.13 | Yes | Yes |
| 2752 | 8.45 | 2.37 | 8 | 65.38 | 85.1 | 14.9 | 0 | 0 | Yes | 1.02 | Yes | Yes |
| 2753 | 8.5 | 2.15 | 9.22 | 45.46 | 77.48 | 18.4 | 2.55 | 1.57 | Yes | 1.06 | Yes | Yes |
| 2754 | 13.6 | 2.96 | 9.36 | 22.55 | 97.9 | 2.1 | 0 | 0 | Yes | 1.05 | Yes | Yes |
| 2755 | 12.33 | 2.85 | 9.45 | 42.13 | 94.8 | 5.2 | 0 | 0 | Yes | 1.24 | Yes | Yes |
| 2756 | 16.5 | 2.94 | 9.61 | 38.50 | 84.6 | 15.4 | 0 | 0 | Yes | 1.33 | Yes | Yes |
| 2757 | 7.9 | 2.11 | 9.85 | 64.13 | 89.3 | 10.7 | 0 | 0 | Yes | 1.27 | Yes | Yes |
| 2758 | 10.5 | 2.68 | 9.23 | 44.21 | 83.3 | 16.7 | 0 | 0 | Yes | 1.05 | Yes | Yes |

TABLE 139-continued

| | | | | | | | | | | | |
|---|---|---|---|---|---|---|---|---|---|---|---|
| 2759 | 16.5 | 2.99 | 9.08 | 39.51 | 80.05 | 19.6 | 0.35 | 0 | No | 1.12 | Yes | Yes |
| 2760 | 10.64 | 1.82 | 9.87 | 78.64 | 85.5 | 14.5 | 0 | 0 | No | 1.23 | Yes | Yes |
| 2761 | 10.5 | 1.42 | 9.46 | 42.05 | 85 | 14.2 | 0 | 0.8 | No | 1.36 | Yes | Yes |
| 2762 | 20.59 | 2.12 | 9.28 | 64.58 | 87.3 | 12.7 | 0 | 0 | No | 1.11 | Yes | Yes |
| 2763 | 8.5 | 1.92 | 9.45 | 47.76 | 89.5 | 10.5 | 0 | 0 | Yes | 1.07 | Yes | Yes |
| 2764 | 0.5 | 2.11 | 9.63 | 24.10 | 87.3 | 11.8 | 0 | 0.9 | Yes | 1.42 | Yes | Yes |
| 2765 | 10.5 | 2.97 | 9.16 | 39.11 | 86.4 | 12.8 | 0.5 | 0.3 | Yes | 1.38 | Yes | Yes |
| 2766 | 11.5 | 2.36 | 10.39 | 19.65 | 93.8 | 6.2 | 0 | 0 | Yes | 1.22 | Yes | Yes |
| 2767 | 36.5 | 3.05 | 10.56 | 65.39 | 83.8 | 16.2 | 0 | 0 | Yes | 1.14 | Yes | Yes |
| 2768 | 1.5 | 2.15 | 10.74 | 48.57 | 80.4 | 19.6 | 0 | 0 | Yes | 1.13 | Yes | Yes |

| Invention Example No | Number of faces | Ratio of (Zn metal grains or Zn alloy grains):(Later-added Zn metal grains) | | Mg content of all metal grains (Mass %) | Coating details | | | | Corrosion Test Results |
|---|---|---|---|---|---|---|---|---|---|
| | | Zn metal grains/ Zn alloy grains | Later-added Zn metal grains | | Total metal grain content of coat (Mass %) | Base resin type | Coat thickness (μm) | Coating method | |
| 2749 | 2 | 1 | 0.5 | 0.933 | 47 | Urethane resin | 112 | Spray | E |
| 2750 | 6 | 1 | 9 | 2.350 | 48 | Alkali silicate | 24 | Spray | E |
| 2751 | 7 | 1 | 4.5 | 1.618 | 51 | Urethane resin | 150 | Spray | E |
| 2752 | 6 | 1 | 136 | 0.109 | 53 | Alkali silicate | 18 | Spray | E |
| 2753 | 7 | 1 | 13 | 1.314 | 88 | Alkyl silicate | 19 | Brush | E |
| 2754 | 6 | 1 | 10.6 | 0.181 | 85 | Alkyl silicate | 24 | Spray | E |
| 2755 | 2 | 1 | 1.6 | 2.000 | 83 | Urethane resin | 99 | Spray | E |
| 2756 | 2 | 1 | 68 | 0.223 | 82 | Alkyl silicate | 7 | Spray | E |
| 2757 | 6 | 1 | 4.5 | 1.945 | 83 | Epoxy resin | 100 | Spray | E |
| 2758 | 7 | 1 | 10.5 | 1.452 | 47 | Alkyl silicate | 27 | Brush | E |
| 2759 | 6 | 1 | 4.9 | 3.322 | 51 | Alkali silicate | 15 | Spray | E |
| 2760 | 6 | 1 | 10.5 | 1.261 | 52 | Alkyl silicate | 14 | Spray | E |
| 2761 | 2 | 1 | 192 | 0.074 | 51 | Urethane resin | 55 | Spray | E |
| 2762 | 7 | 1 | 0.07 | 11.869 | 52 | Alkyl silicate | 8 | Spray | E |
| 2763 | 2 | 1 | 9.5 | 1.000 | 89 | Urethane resin | 122 | Brush | E |
| 2764 | 2 | 1 | 2.6 | 3.278 | 85 | Alkyl silicate | 54 | Spray | E |
| 2765 | 6 | 1 | 4.5 | 2.327 | 82 | Alkali silicate | 19 | Spray | E |
| 2766 | 7 | 1 | 3 | 1.550 | 87 | Alkyl silicate | 25 | Brush | E |
| 2767 | 7 | 1 | 7.5 | 1.906 | 88 | Alkyl silicate | 58 | Spray | E |
| 2768 | 6 | 1 | 77 | 0.251 | 49 | Alkyl silicate | 21 | Spray | E |

TABLE 140

| Invention Example No | Average diameter of later-added Zn metal grains (μm) | Diameter distribution (peak diameter) of Zn metal grains/Zn alloy grains (μm) | | Percent of fine-grain metal grains among Zn metal grains/Zn alloy grains (Vol %) | Chemical component content of Zn metal grains/Zn alloy grains (Mass %) | | | | Alloy grain fracture surfaces or cracks present? | Average aspect ratio | Mg solid solution phase and Zn—Mg intermetallic compounds present on grain surfaces? | Any of MgZn2, Mg2Zn11, Mg2Zn3, MgZn, Mg7Zn3 present? |
|---|---|---|---|---|---|---|---|---|---|---|---|---|
| | | Fine metal | Coarse metal | | Zn | Mg | Al | Si | | | | |
| 2769 | 8.7 | 2.19 | 10.27 | 24.91 | 87.6 | 12.4 | 0 | 0 | Yes | 1.02 | Yes | Yes |
| 2770 | 7.8 | 2.48 | 11.5 | 39.92 | 89.3 | 10.7 | 0 | 0 | Yes | 1.06 | Yes | Yes |
| 2771 | 5.96 | 2.85 | 11.67 | 22.65 | 91.5 | 8.5 | 0 | 0 | Yes | 1.05 | Yes | Yes |
| 2772 | 0.06 | 2.75 | 11.85 | 66.20 | 94.9 | 5.1 | 0 | 0 | Yes | 1.24 | Yes | Yes |
| 2773 | 0.9 | 2.46 | 11.38 | 49.38 | 75.5 | 24.5 | 0 | 0 | Yes | 1.33 | Yes | Yes |
| 2774 | 3.6 | 2.71 | 12.61 | 30.58 | 86.5 | 13.5 | 0 | 0 | Yes | 1.27 | Yes | Yes |
| 2775 | 10.5 | 2.36 | 12.78 | 45.59 | 80 | 20 | 0 | 0 | Yes | 1.05 | Yes | Yes |
| 2776 | 0.05 | 2.16 | 9.57 | 28.32 | 84.5 | 15.5 | 0 | 0 | Yes | 1.12 | Yes | Yes |
| 2777 | 2.32 | 2.46 | 9.81 | 71.87 | 88 | 10.5 | 1.5 | 0 | Yes | 1.23 | Yes | Yes |
| 2778 | 20.4 | 2.49 | 8.43 | 53.05 | 92.1 | 7.9 | 0 | 0 | Yes | 1.36 | Yes | Yes |
| 2779 | 7.34 | 2.95 | 8.55 | 27.74 | 95.2 | 4.8 | 0 | 0 | Yes | 1.11 | Yes | Yes |
| 2780 | 9.4 | 2.36 | 8.22 | 42.75 | 81.6 | 18.4 | 0 | 0 | Yes | 1.07 | Yes | Yes |
| 2781 | 23.43 | 2.21 | 9.44 | 23.29 | 86.8 | 12.7 | 0 | 0.5 | Yes | 1.42 | Yes | Yes |
| 2782 | 5.96 | 2.25 | 9.58 | 61.12 | 89.7 | 10.3 | 0 | 0 | No | 1.38 | Yes | Yes |
| 2783 | 10.64 | 2.44 | 9.67 | 44.30 | 71.2 | 20.8 | 8 | 0 | Yes | 1.22 | Yes | Yes |
| 2784 | 16.5 | 2.78 | 9.83 | 23.96 | 97.5 | 2.5 | 0 | 0 | No | 1.14 | Yes | Yes |
| 2785 | 7.95 | 2.15 | 10.07 | 44.09 | 84.8 | 15.2 | 0 | 0 | Yes | 1.13 | Yes | Yes |
| 2786 | 7.95 | 2.19 | 9.45 | 24.63 | 80.8 | 19.2 | 0 | 0 | No | 1.02 | Yes | Yes |
| 2787 | 9.64 | 2.48 | 9.3 | 62.46 | 78.7 | 13.5 | 7.8 | 0 | Yes | 1.06 | Yes | Yes |
| 2788 | 0.96 | 2.59 | 9.99 | 45.64 | 88.1 | 11.9 | 0 | 0 | No | 1.05 | Yes | Yes |

| Invention Example No | Number of faces | Ratio of (Zn metal grains or Zn alloy grains):(Later-added Zn metal grains) | | Mg content of all metal grains (Mass %) | Coating details | | | | Corrosion Test Results |
|---|---|---|---|---|---|---|---|---|---|
| | | Zn metal grains/Zn alloy grains | Later-added Zn metal grains | | Total metal grain content of coat (Mass %) | Base resin type | Coat thickness (μm) | Coating method | |
| 2769 | 7 | 1 | 10.5 | 1.078 | 50 | Alkali silicate | 19 | Brush | E |
| 2770 | 7 | 1 | 15.5 | 0.648 | 51 | Urethane resin | 56 | Spray | E |
| 2771 | 6 | 1 | 5.8 | 1.250 | 52 | Alkyl silicate | 77 | Spray | E |
| 2772 | 7 | 1 | 1.9 | 1.759 | 53 | Alkyl silicate | 12 | Spray | E |
| 2773 | 2 | 1 | 16.9 | 1.369 | 88 | Alkyl silicate | 64 | Spray | E |
| 2774 | 7 | 1 | 1.5 | 5.400 | 85 | Alkyl silicate | 34 | Brush | E |
| 2775 | 7 | 1 | 0.05 | 19.048 | 83 | Alkali silicate | 28 | Spray | E |
| 2776 | 2 | 1 | 215 | 0.072 | 81 | Urethane resin | 109 | Brush | E |
| 2777 | 6 | 1 | 4.2 | 2.019 | 80 | Alkyl silicate | 15 | Spray | E |
| 2778 | 6 | 1 | 1.5 | 3.160 | 47 | Alkyl silicate | 14 | Spray | E |
| 2779 | 7 | 1 | 4.8 | 0.828 | 49 | Alkyl silicate | 18 | Spray | E |
| 2780 | 7 | 1 | 0.5 | 12.267 | 50 | Urethane resin | 122 | Brush | E |
| 2781 | 6 | 1 | 2.3 | 3.848 | 51 | Alkyl silicate | 54 | Spray | E |
| 2782 | 7 | 1 | 0.05 | 9.810 | 52 | Alkali silicate | 19 | Spray | E |
| 2783 | 2 | 1 | 120 | 0.172 | 83 | Alkyl silicate | 25 | Brush | E |

TABLE 140-continued

| | | | | | | | | | |
|---|---|---|---|---|---|---|---|---|---|
| 2784 | 2 | 1 | 3.7 | 0.532 | 88 | Alkyl silicate | 58 | Spray | E |
| 2785 | 6 | 1 | 16.5 | 0.869 | 85 | Alkyl silicate | 21 | Spray | E |
| 2786 | 7 | 1 | 24 | 0.768 | 83 | Alkali silicate | 19 | Brush | E |
| 2787 | 6 | 1 | 0.01 | 13.366 | 82 | Urethane resin | 56 | Spray | E |
| 2788 | 2 | 1 | 7.8 | 1.352 | 47 | Alkyl silicate | 77 | Spray | E |

TABLE 141

| Invention Example No | Average diameter of later-added Zn metal grains (μm) | Diameter distribution (peak diameter) of Zn metal grains/Zn alloy grains (μm) | | Percent of fine-grain metal grains among Zn metal grains/Zn alloy grains (Vol %) | Chemical component content of Zn metal grains/Zn alloy grains (Mass %) | | | | Alloy grain fracture surfaces or cracks present? | Average aspect ratio | Mg solid solution phase and Zn—Mg intermetallic compounds present on grain surfaces? | Any of MgZn2, Mg2Zn11, Mg2Zn3, MgZn, Mg7Zn3 present? |
|---|---|---|---|---|---|---|---|---|---|---|---|---|
| | | Fine metal | Coarse metal | | Zn | Mg | Al | Si | | | | |
| 2789 | 5.26 | 2.47 | 9.58 | 25.30 | 88.5 | 10.6 | 0 | 0.9 | Yes | 1.24 | Yes | Yes |
| 2790 | 13.5 | 2.69 | 9.4 | 42.84 | 84.6 | 15.4 | 0 | 0 | Yes | 1.33 | Yes | Yes |
| 2791 | 13.5 | 2.57 | 9.57 | 25.44 | 97.4 | 2.6 | 0 | 0 | Yes | 1.27 | Yes | Yes |
| 2792 | 9.64 | 2.49 | 9.54 | 63.27 | 83.3 | 16.7 | 0 | 0 | Yes | 1.37 | Yes | Yes |
| 2793 | 16.5 | 2.68 | 9.58 | 46.45 | 91.9 | 8.1 | 0 | 0 | Yes | 1.10 | Yes | Yes |
| 2794 | 20.59 | 2.35 | 9.25 | 46.45 | 86.3 | 13.7 | 0 | 0 | Yes | 1.04 | Yes | Yes |
| 2795 | 0.96 | 2.48 | 10.04 | 50.91 | 81.5 | 18.5 | 0 | 0 | Yes | 1.02 | Yes | Yes |
| 2796 | 6.54 | 2.13 | 11.27 | 27.25 | 97.6 | 2.4 | 0 | 0 | Yes | 1.01 | Yes | Yes |
| 2797 | 5.26 | 1.93 | 11.44 | 42.26 | 89.1 | 10.9 | 0 | 0 | Yes | 1.08 | Yes | Yes |
| 2798 | 10.64 | 2.05 | 8.9 | 33.69 | 92.8 | 7.2 | 0 | 0 | Yes | 1.14 | Yes | Yes |
| 2799 | 9.64 | 1.42 | 8.75 | 48.70 | 81.96 | 17.5 | 0.5 | 0.04 | No | 1.23 | Yes | Yes |
| 2800 | 6.9 | 1.46 | 9.44 | 29.24 | 85.4 | 14.6 | 0 | 0 | No | 1.33 | Yes | Yes |
| 2801 | 10.5 | 1.75 | 9.03 | 67.07 | 90.6 | 9.4 | 0 | 0 | Yes | 1.37 | Yes | Yes |
| 2802 | 13.5 | 1.86 | 8.85 | 50.25 | 92.9 | 7.1 | 0 | 0 | Yes | 1.44 | Yes | Yes |
| 2803 | 20.59 | 1.74 | 8.95 | 29.91 | 77.5 | 22.5 | 0 | 0 | Yes | 1.21 | Yes | Yes |
| 2804 | 7.82 | 1.96 | 12.54 | 87.50 | 84.8 | 13.7 | 1.5 | 0 | No | 1.22 | Yes | Yes |
| 2805 | 5.26 | 1.65 | 8.7 | 30.58 | 87.1 | 12.9 | 0 | 0 | No | 1.23 | Yes | Yes |
| 2806 | 7.06 | 2.35 | 8.55 | 68.41 | 95.7 | 4.3 | 0 | 0 | Yes | 1.47 | Yes | Yes |
| 2807 | 0.64 | 1.62 | 10.72 | 54.59 | 80.2 | 17.6 | 1 | 1.2 | No | 1.01 | Yes | Yes |
| 2808 | 46.8 | 2.25 | 9.9 | 34.25 | 98.8 | 0.6 | 0.6 | 0 | Yes | 1.04 | Yes | Yes |

| Invention Example No | Ratio of (Zn metal grains or Zn alloy grains):(Later-added Zn metal grains) | | Mg content of all metal grains (Mass %) | Coating details | | | | Corrosion Test Results |
|---|---|---|---|---|---|---|---|---|
| | Number of faces | Zn metal grains/Zn alloy grains | Later-added Zn metal grains | | Total metal grain content of coat (Mass %) | Base resin type | Coat thickness (μm) | Coating method | |
| 2789 | 2 | 1 | 1.6 | 4.077 | 46 | Alkyl silicate | 54 | Spray | E |
| 2790 | 7 | 1 | 3.2 | 3.667 | 49 | Alkali silicate | 2 | Spray | G |
| 2791 | 6 | 1 | 5.4 | 0.406 | 50 | Alkali silicate | 20 | Spray | E |
| 2792 | 7 | 1 | 220 | 0.076 | 51 | Alkali silicate | 5 | Spray | G |
| 2793 | 7 | 1 | 2.2 | 2.531 | 83 | Alkyl silicate | 20 | Spray | E |
| 2794 | 6 | 1 | 2.8 | 3.605 | 82 | Alkali silicate | 15 | Brush | E |

TABLE 141-continued

| | | | | | | | | | |
|---|---|---|---|---|---|---|---|---|---|
| 2795 | 2 | 1 | 12 | 1.423 | 88 | Alkyl silicate | 57 | Brush | E |
| 2796 | 7 | 1 | 10.6 | 0.207 | 85 | Alkali silicate | 13 | Brush | E |
| 2797 | 2 | 1 | 35 | 0.303 | 86 | Alkyl silicate | 22 | Brush | E |
| 2798 | 2 | 1 | 125.5 | 0.057 | 47 | Alkali silicate | 20 | Spray | E |
| 2799 | 7 | 1 | 6 | 2.500 | 48 | Alkyl silicate | 27 | Spray | E |
| 2800 | 2 | 1 | 34 | 0.417 | 50 | Alkali silicate | 15 | Spray | E |
| 2801 | 7 | 1 | 1.6 | 3.615 | 51 | Alkyl silicate | 35 | Spray | E |
| 2802 | 2 | 1 | 7.5 | 0.835 | 52 | Alkali silicate | 34 | Brush | E |
| 2803 | 6 | 1 | 200 | 0.112 | 88 | Alkyl silicate | 45 | Brush | E |
| 2804 | 6 | 1 | 7.5 | 1.612 | 89 | Alkali silicate | 52 | Brush | E |
| 2805 | 7 | 1 | 3.2 | 3.071 | 86 | Alkyl silicate | 23 | Brush | E |
| 2806 | 6 | 1 | 2.6 | 1.194 | 87 | Alkali silicate | 5 | Spray | E |
| 2807 | 2 | 1 | 3 | 4.400 | 86 | Alkyl silicate | 52 | Brush | E |
| 2808 | 2 | 1 | 15.2 | 0.037 | 46 | Alkali silicate | 150 | Brush | E |

TABLE 142

| Invention Example No | Average diameter of later-added Zn metal grains (μm) | Diameter distribution (peak diameter) of Zn metal grains/Zn alloy grains (μm) | | Percent of fine-grain metal grains among Zn metal grains/Zn alloy grains (Vol %) | Chemical component content of Zn metal grains/Zn alloy grains (Mass %) | | | | Alloy grain fracture surfaces or cracks present? | Average aspect ratio | Mg solid solution phase and Zn—Mg intermetallic compounds present on grain surfaces? | Any of MgZn2, Mg2Zn11, Mg2Zn3, MgZn, Mg7Zn3 present? |
|---|---|---|---|---|---|---|---|---|---|---|---|---|
| | | Fine metal | Coarse metal | | Zn | Mg | Al | Si | | | | |
| 2809 | 16.5 | 2.36 | 9.57 | 37.61 | 86.9 | 10.3 | 1.6 | 1.2 | Yes | 1.05 | Yes | Yes |
| 2810 | 13.5 | 2.24 | 10.79 | 45.60 | 92.98 | 7 | 0.02 | 0 | Yes | 1.12 | Yes | Yes |
| 2811 | 0.96 | 2.46 | 10.93 | 46.70 | 75.5 | 23.5 | 1 | 0 | Yes | 1.11 | Yes | Yes |
| 2812 | 0.96 | 1.56 | 11.02 | 41.22 | 82.5 | 17.5 | 0 | 0 | No | 1.08 | Yes | Yes |
| 2813 | 8.45 | 1.24 | 11.18 | 45.68 | 80.1 | 12.4 | 7.5 | 0 | Yes | 1.47 | Yes | Yes |
| 2814 | 2.9 | 1.68 | 11.42 | 22.02 | 85.09 | 14.9 | 0 | 0.01 | Yes | 1.50 | Yes | Yes |
| 2815 | 5.4 | 2.65 | 10.8 | 37.03 | 78.7 | 20.7 | 0 | 0.6 | No | 1.13 | Yes | Yes |
| 2816 | 10.6 | 2.22 | 10.65 | 28.46 | 91.29 | 8.6 | 0 | 0.11 | Yes | 1.26 | Yes | Yes |
| 2817 | 2.32 | 2.45 | 11.34 | 43.47 | 85.8 | 14.2 | 0 | 0 | Yes | 1.14 | Yes | Yes |
| 2818 | 7.8 | 2.23 | 11.62 | 35.19 | 98.12 | 0.08 | 0 | 1.8 | Yes | 1.49 | Yes | Yes |
| 2819 | 7.95 | 2.26 | 11.15 | 73.02 | 83.46 | 15.2 | 0 | 1.34 | No | 1.34 | Yes | Yes |
| 2820 | 20.59 | 2.72 | 12.38 | 56.20 | 73.17 | 17.4 | 9 | 0.43 | Yes | 1.18 | Yes | Yes |
| 2821 | 22.5 | 2.13 | 12.55 | 35.86 | 98.6 | 0.8 | 0.6 | 0 | Yes | 1.17 | Yes | Yes |
| 2822 | 4.6 | 1.98 | 9.34 | 93.45 | 93.55 | 6.4 | 0.05 | 0 | Yes | 1.48 | Yes | Yes |
| 2823 | 4.9 | 2.02 | 9.58 | 30.66 | 96.78 | 3.2 | 0.02 | 0 | No | 1.49 | Yes | Yes |
| 2824 | 10.5 | 2.21 | 9.88 | 74.21 | 83 | 9.2 | 7.8 | 0 | Yes | 1.27 | Yes | Yes |
| 2825 | 8.45 | 2.55 | 10 | 55.39 | 70.92 | 19.2 | 9.88 | 0 | Yes | 1.17 | Yes | Yes |
| 2826 | 30.5 | 1.92 | 10.67 | 30.08 | 80.25 | 15.1 | 4.65 | 0 | Yes | 1.16 | Yes | Yes |
| 2827 | 49.5 | 1.96 | 11.89 | 45.09 | 81.85 | 14.5 | 3.65 | 0 | Yes | 1.27 | Yes | Yes |
| 2828 | 5.9 | 2.11 | 12.03 | 41.41 | 89.45 | 10.5 | 0.05 | 0 | Yes | 1.27 | Yes | Yes |

TABLE 142-continued

| Invention Example No | Number of faces | Ratio of (Zn metal grains or Zn alloy grains):(Later-added Zn metal grains) Zn metal grains/ Zn alloy grains | Later-added Zn metal grains | Mg content of all metal grains (Mass %) | Coating details Total metal grain content of coat (Mass %) | Base resin type | Coat thickness (μm) | Coating method | Corrosion Test Results |
|---|---|---|---|---|---|---|---|---|---|
| 2809 | 2 | 1 | 0.09 | 9.450 | 49 | Alkyl silicate | 60 | Brush | E |
| 2810 | 2 | 1 | 13.5 | 0.483 | 35 | Alkali silicate | 15 | Spray | E |
| 2811 | 2 | 1 | 135.4 | 0.172 | 37 | Alkyl silicate | 24 | Spray | E |
| 2812 | 2 | 1 | 3 | 4.375 | 36 | Alkali silicate | 34 | Spray | E |
| 2813 | 6 | 1 | 7.8 | 1.409 | 38 | Alkyl silicate | 20 | Brush | E |
| 2814 | 6 | 1 | 10.2 | 1.330 | 48 | Alkali silicate | 200 | Brush | E |
| 2815 | 7 | 1 | 7 | 2.588 | 46 | Alkyl silicate | 56 | Brush | E |
| 2816 | 6 | 1 | 225.2 | 0.038 | 51 | Alkali silicate | 34 | Spray | E |
| 2817 | 2 | 1 | 5.4 | 2.219 | 46 | Alkyl silicate | 2 | Spray | G |
| 2818 | 7 | 1 | 3.2 | 0.019 | 38 | Alkali silicate | 15 | Spray | E |
| 2819 | 2 | 1 | 13.5 | 1.048 | 48 | Alkali silicate | 10 | Spray | E |
| 2820 | 6 | 1 | 1.6 | 6.692 | 52 | Alkyl silicate | 125 | Brush | E |
| 2821 | 6 | 1 | 1.5 | 0.320 | 30 | Alkali silicate | 24 | Brush | E |
| 2822 | 2 | 1 | 2.5 | 1.829 | 76 | Alkyl silicate | 110 | Brush | E |
| 2823 | 2 | 1 | 2.6 | 0.889 | 72 | Alkali silicate | 24 | Brush | E |
| 2824 | 7 | 1 | 126 | 0.072 | 81 | Alkyl silicate | 2 | Spray | G |
| 2825 | 6 | 1 | 120 | 0.159 | 64 | Alkali silicate | 37 | Spray | E |
| 2826 | 7 | 1 | 7.5 | 1.776 | 69 | Alkyl silicate | 113 | Brush | E |
| 2827 | 2 | 1 | 6.5 | 1.933 | 83 | Alkali silicate | 2 | Spray | G |
| 2828 | 7 | 1 | 20 | 0.500 | 30 | Alkyl silicate | 75 | Brush | E |

TABLE 143

| Invention Example No | Average diameter of later-added Zn metal grains (μm) | Diameter distribution (peak diameter) of Zn metal grains/Zn alloy grains (μm) Fine metal | Coarse metal | Percent of fine-grain metal grains among Zn metal grains/Zn alloy grains (Vol %) | Chemical component content of Zn metal grains/Zn alloy grains (Mass %) Zn | Mg | Al | Si | Alloy grain fracture surfaces or cracks present? | Average aspect ratio | Mg solid solution phase and Zn—Mg inter-metallic compounds present on grain surfaces? | Any of MgZn2, Mg2Zn11, Mg2Zn3, MgZn, Mg7Zn3 present? |
|---|---|---|---|---|---|---|---|---|---|---|---|---|
| 2829 | 4.52 | 2.97 | 12.12 | 17.75 | 87.3 | 7.5 | 5.2 | 0 | Yes | 1.49 | Yes | Yes |
| 2830 | 5.96 | 2.36 | 12.28 | 32.76 | 93.9 | 6.1 | 0 | 0.001 | Yes | 1.29 | Yes | Yes |
| 2831 | 5.5 | 3.05 | 12.52 | 30.89 | 82.55 | 16.8 | 0.05 | 0.6 | Yes | 1.23 | Yes | Yes |
| 2832 | 3.6 | 2.57 | 11.9 | 45.90 | 70.7 | 27.5 | 1 | 0.8 | Yes | 1.23 | Yes | Yes |
| 2833 | 16.5 | 2.65 | 11.75 | 42.22 | 94.6 | 2.9 | 0 | 2.5 | Yes | 1.23 | Yes | Yes |
| 2834 | 12.5 | 2.54 | 12.44 | 18.56 | 94 | 4.5 | 0 | 1.5 | No | 1.23 | Yes | Yes |

TABLE 143-continued

| | | | | | | | | | | | | |
|---|---|---|---|---|---|---|---|---|---|---|---|---|
| 2835 | 16.5 | 2.85 | 12.03 | 33.57 | 99.43 | 0.07 | 0 | 0.5 | Yes | 1.27 | Yes | Yes |
| 2836 | 10.9 | 2.75 | 10.61 | 31.70 | 96.82 | 3.1 | 0.04 | 0.04 | Yes | 1.23 | Yes | Yes |
| 2837 | 5.6 | 2.46 | 11.3 | 46.71 | 76.3 | 20.5 | 1 | 2.2 | Yes | 1.36 | Yes | Yes |
| 2838 | 22.6 | 2.71 | 11.58 | 47.89 | 68.84 | 29.5 | 0.06 | 1.6 | Yes | 1.11 | Yes | Yes |
| 2839 | 20.59 | 2.36 | 11.11 | 24.23 | 92.33 | 7.6 | 0.07 | 0 | Yes | 1.02 | Yes | Yes |
| 2840 | 20.59 | 2.16 | 12.34 | 39.24 | 95.2 | 0.7 | 1.2 | 2.9 | Yes | 1.05 | Yes | Yes |
| 2841 | 9.56 | 2.46 | 12.51 | 37.37 | 91.8 | 4.6 | 1.8 | 1.8 | Yes | 1.24 | Yes | Yes |
| 2842 | 5.9 | 2.49 | 11.64 | 50.38 | 82 | 8.3 | 9.2 | 0.5 | Yes | 1.33 | Yes | Yes |
| 2843 | 6.54 | 1.63 | 9.16 | 37.14 | 88.2 | 11.8 | 0 | 0 | Yes | 1.27 | Yes | Yes |
| 2844 | 21.4 | 1.51 | 9.46 | 13.48 | 86.06 | 12.9 | 0 | 1.04 | Yes | 1.50 | Yes | Yes |
| 2845 | 9.8 | 3.05 | 9.54 | 40.05 | 99.34 | 0.6 | 0 | 0.06 | Yes | 1.13 | Yes | Yes |
| 2846 | 6.59 | 2.57 | 9.56 | 38.18 | 89.51 | 9.5 | 0 | 0.99 | No | 1.04 | Yes | Yes |
| 2847 | 6.54 | 2.65 | 9.46 | 7.63 | 88.3 | 11.7 | 0 | 0 | Yes | 1.02 | Yes | Yes |
| 2848 | 16.5 | 2.54 | 11.99 | 37.95 | 89.9 | 9.4 | 0.7 | 0 | Yes | 1.08 | Yes | Yes |

| | | Ratio of (Zn metal grains or Zn alloy grains):(Later-added Zn metal grains) | | Mg content of all metal grains (Mass %) | Total metal grain content of coat (Mass %) | Coating details | | | |
|---|---|---|---|---|---|---|---|---|---|
| Invention Example No | Number of faces | Zn metal grains/ Zn alloy grains | Later-added Zn metal grains | | | Base resin type | Coat thickness (μm) | Coating method | Corrosion Test Results |
| 2829 | 6 | 1 | 0.007 | 7.448 | 83 | Alkali silicate | 30 | Brush | E |
| 2830 | 7 | 1 | 9 | 0.610 | 75 | Alkyl silicate | 34 | Brush | E |
| 2831 | 6 | 1 | 7.5 | 1.976 | 76 | Epoxy resin | 124 | Brush | E |
| 2832 | 7 | 1 | 50 | 0.539 | 72 | Acrylic resin | 15 | Spray | E |
| 2833 | 6 | 1 | 0.005 | 2.886 | 71 | Urethane resin | 23 | Spray | E |
| 2834 | 2 | 1 | 25.6 | 0.169 | 82 | Polyester resin | 157 | Brush | E |
| 2835 | 7 | 1 | 56.5 | 0.001 | 81 | Epoxy resin | 26 | Spray | E |
| 2836 | 6 | 1 | 1.6 | 1.192 | 83 | Acrylic resin | 38 | Spray | E |
| 2837 | 6 | 1 | 3 | 5.125 | 50 | Urethane resin | 160 | Brush | E |
| 2838 | 6 | 1 | 100 | 0.292 | 72 | Polyester resin | 27 | Brush | E |
| 2839 | 2 | 1 | 65.5 | 0.114 | 47 | Epoxy resin | 180 | Brush | E |
| 2840 | 6 | 1 | 1.9 | 0.241 | 47 | Acrylic resin | 26 | Spray | E |
| 2841 | 7 | 1 | 2.1 | 1.484 | 52 | Urethane resin | 180 | Brush | E |
| 2842 | 2 | 1 | 10.5 | 0.722 | 52 | Polyester resin | 15 | Spray | E |
| 2843 | 6 | 1 | 6.5 | 1.573 | 50 | Epoxy resin | 2 | Spray | G |
| 2844 | 2 | 1 | 19.5 | 0.629 | 46 | Acrylic resin | 28 | Spray | E |
| 2845 | 6 | 1 | 0.8 | 0.333 | 47 | Urethane resin | 30 | Spray | E |
| 2846 | 7 | 1 | 18.5 | 0.487 | 83 | Polyester resin | 2 | Spray | G |
| 2847 | 7 | 1 | 4.3 | 2.208 | 52 | Epoxy resin | 157 | Brush | E |
| 2848 | 2 | 1 | 3.2 | 2.238 | 89 | Acrylic resin | 28 | Brush | E |

TABLE 144

| Invention Example No | Average diameter of later-added Zn metal grains (μm) | Diameter distribution (peak diameter) of Zn metal grains/Zn alloy grains (μm) Fine metal | Diameter distribution (peak diameter) of Zn metal grains/Zn alloy grains (μm) Coarse metal | Percent of fine-grain metal grains among Zn metal grains/Zn alloy grains (Vol %) | Chemical component content of Zn metal grains/Zn alloy grains (Mass %) Zn | Chemical component content of Zn metal grains/Zn alloy grains (Mass %) Mg | Chemical component content of Zn metal grains/Zn alloy grains (Mass %) Al | Chemical component content of Zn metal grains/Zn alloy grains (Mass %) Si | Alloy grain fracture surfaces or cracks present? | Average aspect ratio | Mg solid solution phase and Zn—Mg inter-metallic compounds present on grain surfaces? | Any of MgZn2, Mg2Zn11, Mg2Zn3, MgZn, Mg7Zn3 present? |
|---|---|---|---|---|---|---|---|---|---|---|---|---|
| 2849 | 7.8 | 2.85 | 12.08 | 14.29 | 87.8 | 11.7 | 0.5 | 0 | Yes | 1.15 | Yes | Yes |
| 2850 | 16.5 | 2.75 | 12.24 | 40.86 | 95.6 | 4.2 | 0.2 | 0 | Yes | 1.34 | Yes | Yes |
| 2851 | 6.54 | 2.46 | 12.48 | 97.50 | 97.13 | 2.8 | 0.07 | 0 | Yes | 1.25 | Yes | Yes |
| 2852 | 8.45 | 2.71 | 11.86 | 13.30 | 86.1 | 13.9 | 0 | 0 | Yes | 1.19 | Yes | Yes |
| 2853 | 8.5 | 2.36 | 11.71 | 43.62 | 82.6 | 14.6 | 1.6 | 1.2 | No | 1.18 | Yes | Yes |
| 2854 | 13.6 | 2.46 | 11.35 | 56.93 | 72.95 | 26.4 | 0.65 | 0 | Yes | 1.24 | Yes | Yes |
| 2855 | 12.33 | 1.45 | 12.02 | 36.59 | 83.23 | 16.5 | 0.27 | 0 | Yes | 1.11 | Yes | Yes |
| 2856 | 16.5 | 2.42 | 13.24 | 39.95 | 79.4 | 19.5 | 0.45 | 0.65 | Yes | 1.27 | Yes | Yes |
| 2857 | 7.9 | 2.11 | 9.46 | 86.50 | 97.08 | 1.6 | 0.33 | 0.99 | Yes | 1.31 | Yes | Yes |
| 2858 | 10.5 | 2.97 | 13.47 | 32.87 | 90.5 | 6 | 1 | 2.5 | Yes | 1.26 | Yes | Yes |
| 2859 | 16.5 | 2.36 | 9.46 | 16.23 | 88.93 | 8.4 | 0.87 | 1.8 | Yes | 1.14 | Yes | Yes |
| 2860 | 10.64 | 3.05 | 13.87 | 37.40 | 86.7 | 13.3 | 0 | 0 | Yes | 1.34 | Yes | Yes |
| 2861 | 10.5 | 2.57 | 13.25 | 40.76 | 81.4 | 18.6 | 0. | 0 | Yes | 1.16 | Yes | Yes |
| 2862 | 20.59 | 2.65 | 13.1 | 87.31 | 97.34 | 1.8 | 0.86 | 0 | No | 1.47 | Yes | Yes |
| 2863 | 8.5 | 2.12 | 9.08 | 92.50 | 95.25 | 4.1 | 0.65 | 0 | Yes | 1.48 | Yes | Yes |
| 2864 | 0.5 | 1.65 | 9.87 | 17.93 | 82.87 | 16.7 | 0.43 | 0 | No | 1.49 | Yes | Yes |
| 2865 | 10.5 | 2.35 | 9.46 | 44.50 | 99 | 0.4 | 0.6 | 0 | Yes | 1.34 | Yes | Yes |
| 2866 | 11.5 | 1.63 | 9.28 | 96.50 | 89.35 | 10.6 | 0.05 | 0 | Yes | 1.29 | Yes | Yes |
| 2867 | 36.5 | 2.64 | 9.45 | 16.94 | 93.08 | 6.9 | 0.02 | 0 | Yes | 1.18 | Yes | Yes |
| 2868 | 1.5 | 2.35 | 9.25 | 88.12 | 99.82 | 0.05 | 0.06 | 0.07 | Yes | 1.48 | Yes | Yes |

| Invention Example No | Number of faces | Ratio of (Zn metal grains or Zn alloy grains):(Later-added Zn metal grains) Zn metal grains/Zn alloy grains | Ratio of (Zn metal grains or Zn alloy grains):(Later-added Zn metal grains) Later-added Zn metal grains | Mg content of all metal grains (Mass %) | Total metal grain content of coat (Mass %) | Coating details Base resin type | Coating details Coat thickness (μm) | Coating details Coating method | Corrosion Test Results |
|---|---|---|---|---|---|---|---|---|---|
| 2849 | 2 | 1 | 1.5 | 4.680 | 85 | Alkyl silicate | 130 | Brush | E |
| 2850 | 6 | 1 | 4.5 | 0.764 | 53 | Alkyl silicate | 29 | Brush | E |
| 2851 | 7 | 1 | 15.5 | 0.170 | 88 | Epoxy resin | 30 | Brush | E |
| 2852 | 6 | 1 | 10.5 | 1.209 | 85 | Acrylic resin | 120 | Brush | E |
| 2853 | 7 | 1 | 2.5 | 4.171 | 52 | Urethane resin | 187 | Brush | E |
| 2854 | 6 | 1 | 9 | 2.640 | 83 | Polyester resin | 28 | Spray | E |
| 2855 | 2 | 1 | 10.5 | 0.156 | 88 | Epoxy resin | 5 | Spray | E |
| 2856 | 2 | 1 | 5.7 | 2.910 | 49 | Acrylic resin | 35 | Spray | E |
| 2857 | 6 | 1 | 3.9 | 0.327 | 50 | Urethane resin | 5 | Spray | G |
| 2858 | 7 | 1 | 4.5 | 1.091 | 51 | Polyester resin | 200 | Brush | E |
| 2859 | 6 | 1 | 3.6 | 1.826 | 83 | Alkali silicate | 25 | Spray | E |
| 2860 | 6 | 1 | 16.4 | 0.764 | 82 | Alkali silicate | 15 | Spray | E |
| 2861 | 2 | 1 | 6 | 2.657 | 88 | Alkyl silicate | 20 | Spray | E |
| 2862 | 7 | 1 | 7.5 | 0.212 | 85 | Alkali silicate | 18 | Spray | E |
| 2863 | 2 | 1 | 10.5 | 0.357 | 87 | Alkyl silicate | 22 | Spray | E |
| 2864 | 2 | 1 | 2.6 | 4.639 | 86 | Alkali silicate | 19 | Spray | E |
| 2865 | 6 | 1 | 1.5 | 0.160 | 46 | Alkyl silicate | 29 | Spray | E |
| 2866 | 7 | 1 | 13.5 | 0.731 | 49 | Alkali silicate | 23 | Spray | E |

TABLE 144-continued

|  |  |  |  |  |  |  |  |  |  |
|---|---|---|---|---|---|---|---|---|---|
| 2867 | 7 | 1 | 2.6 | 1.917 | 35 | Alkyl silicate | 21 | Spray | E |
| 2868 | 6 | 1 | 6.5 | 0.007 | 30 | Alkali silicate | 19 | Spray | E |

TABLE 145

| Invention Example No | Average diameter of later-added Zn metal grains (μm) | Diameter distribution (peak diameter) of Zn metal grains/Zn alloy grains (μm) | | Percent of fine-grain metal grains among Zn metal grains/Zn alloy grains (Vol %) | Chemical component content of Zn metal grains/Zn alloy grains (Mass %) | | | | Alloy grain fracture surfaces or cracks present? | Average aspect ratio | Mg solid solution phase and Zn—Mg inter-metallic compounds present on grain surfaces? | Any of MgZn2, Mg2Zn11, Mg2Zn3, MgZn, Mg7Zn3 present? |
|---|---|---|---|---|---|---|---|---|---|---|---|---|
| | | Fine metal | Coarse metal | | Zn | Mg | Al | Si | | | | |
| 2869 | 8.7 | 2.31 | 9.46 | 60.57 | 91.56 | 6.4 | 1.05 | 0.99 | Yes | 1.27 | Yes | Yes |
| 2870 | 7.8 | 2.62 | 9.46 | 39.48 | 93.36 | 3.5 | 2.6 | 0.54 | Yes | 1.17 | Yes | Yes |
| 2871 | 5.96 | 2.52 | 9.46 | 15.82 | 82.13 | 17.5 | 0.05 | 0.32 | Yes | 1.27 | Yes | Yes |
| 2872 | 0.06 | 2.24 | 13.32 | 49.57 | 91.2 | 3.6 | 5.2 | 0 | No | 1.27 | Yes | Yes |
| 2873 | 0.9 | 0.05 | 6.54 | 86.52 | 94.1 | 5.9 | 0 | 0.001 | Yes | 1.48 | Yes | Yes |
| 2874 | 3.6 | 2.42 | 6.35 | 90.98 | 83.2 | 16.2 | 0 | 0.6 | No | 1.49 | Yes | Yes |
| 2875 | 10.5 | 0.11 | 7.54 | 67.32 | 76.7 | 22.5 | 0 | 0.8 | Yes | 1.34 | Yes | Yes |
| 2876 | 0.05 | 1.92 | 8.64 | 82.33 | 96.52 | 3.4 | 0.04 | 0.04 | Yes | 1.23 | Yes | Yes |
| 2877 | 2.32 | 0.46 | 6.45 | 73.76 | 68.3 | 26.5 | 3 | 2.2 | Yes | 1.23 | Yes | Yes |
| 2878 | 20.4 | 0.77 | 6.48 | 88.77 | 72.84 | 25.5 | 0.06 | 1.6 | Yes | 1.23 | Yes | Yes |
| 2879 | 8.6 | 2.35 | 9.25 | 45.02 | 87.2 | 12.8 | 0 | 0 | Yes | 1.05 | Yes | Yes |
| 2880 | 10.5 | 2.33 | 9.46 | 15.2 | 91.5 | 8.5 | 0 | 0 | Yes | 1.06 | Yes | Yes |
| 2881 | 8.7 | 1.95 | 9.32 | 51.41 | 75.23 | 24.5 | 0.27 | 0 | Yes | 1.38 | Yes | Yes |
| 2882 | 7.8 | 2.15 | 9.22 | 45.46 | 77.48 | 18.4 | 2.55 | 1.57 | Yes | 1.06 | Yes | Yes |
| 2883 | 5.96 | 2.23 | 11.62 | 35.19 | 72.62 | 0.08 | 25.5 | 1.8 | Yes | 1.49 | Yes | Yes |
| 2884 | 1.6 | 2.26 | 11.15 | 73.02 | 64.06 | 15.2 | 19.4 | 1.34 | No | 1.34 | Yes | Yes |
| 2885 | 7.2 | 1.98 | 9.34 | 93.45 | 83 | 6.4 | 10.6 | 0 | Yes | 1.48 | Yes | Yes |
| 2886 | 10.5 | 2.02 | 9.58 | 30.66 | 86.4 | 3.2 | 10.4 | 0 | No | 1.49 | Yes | Yes |
| 2887 | 3.6 | 2.36 | 12.28 | 32.76 | 80.4 | 6.1 | 13.5 | 0.001 | Yes | 1.29 | Yes | Yes |
| 2888 | 4.5 | 3.05 | 12.52 | 30.89 | 70.1 | 16.8 | 12.5 | 0.6 | Yes | 1.23 | Yes | Yes |
| 2889 | 7.9 | 2.57 | 11.9 | 45.9 | 60.9 | 27.5 | 10.8 | 0.8 | Yes | 1.23 | Yes | Yes |

| Invention Example No | Number of faces | Ratio of (Zn metal grains or Zn alloy grains):(Later-added Zn metal grains) | | Mg content of all metal grains (Mass %) | Coating details | | | | Corrosion Test Results |
|---|---|---|---|---|---|---|---|---|---|
| | | Zn metal grains/Zn alloy grains | Later-added Zn metal grains | | Total metal grain content of coat (Mass %) | Base resin type | Coat thickness (μm) | Coating method | |
| 2869 | 7 | 1 | 1.6 | 2.462 | 76 | Alkyl silicate | 15 | Spray | E |
| 2870 | 7 | 1 | 3.8 | 0.729 | 72 | Alkali silicate | 18 | Spray | E |
| 2871 | 6 | 1 | 0.08 | 16.204 | 30 | Alkyl silicate | 22 | Spray | E |
| 2872 | 7 | 1 | 164.5 | 0.022 | 83 | Alkyl silicate | 21 | Spray | E |
| 2873 | 2 | 1 | 3.6 | 1.283 | 75 | Alkyl silicate | 29 | Spray | E |
| 2874 | 7 | 1 | 8.6 | 1.688 | 76 | Alkali silicate | 23 | Spray | E |
| 2875 | 7 | 1 | 12 | 1.731 | 72 | Alkyl silicate | 21 | Spray | E |
| 2876 | 2 | 1 | 5.8 | 0.500 | 83 | Alkali silicate | 19 | Spray | E |
| 2877 | 6 | 1 | 10 | 2.409 | 50 | Alkyl silicate | 21 | Spray | E |
| 2878 | 6 | 1 | 1 | 12.750 | 72 | Alkali silicate | 19 | Spray | E |
| 2879 | 7 | 1 | 10.5 | 1.113 | 50 | Acrylic resin | 654 | Spray | E |

TABLE 145-continued

| | | | | | | | | | | |
|---|---|---|---|---|---|---|---|---|---|---|
| 2880 | 6 | 1 | 6.5 | 1.133 | 48 | Alkali silicate | 700 | Spray | E |
| 2881 | 7 | 1 | 19.5 | 1.195 | 75 | Alkyl silicate | 555 | Spray | E |
| 2882 | 7 | 1 | 0.8 | 10.222 | 55 | Alkyl silicate | 12 | Spray | E |
| 2883 | 6 | 1 | 5.3 | 0.013 | 38 | Alkyl silicate | 678 | Brush | E |
| 2884 | 7 | 1 | 4.3 | 2.868 | 48 | Urethane resin | 674 | Spray | E |
| 2885 | 2 | 1 | 3.2 | 1.524 | 76 | Polyester resin | 325 | Spray | E |
| 2886 | 7 | 1 | 1.5 | 1.280 | 72 | Alkyl silicate | 665 | Spray | E |
| 2887 | 7 | 1 | 4.5 | 1.109 | 75 | Alkyl silicate | 354 | Brush | E |
| 2888 | 2 | 1 | 0.8 | 9.333 | 76 | Alkyl silicate | 165 | Spray | E |
| 2889 | 6 | 1 | 6.5 | 3.667 | 72 | Urethane resin | 354 | Spray | E |

TABLE 146

| Invention Example No | Average diameter of later-added Zn metal grains (μm) | Diameter distribution (peak diameter) of Zn metal grains/Zn alloy grains (μm) | | Percent of fine-grain metal grains among Zn metal grains/Zn alloy grains (Vol %) | Chemical component content of Zn metal grains/Zn alloy grains (Mass %) | | | | Alloy grain fracture surfaces or cracks present? | Average aspect ratio | Mg solid solution phase and Zn—Mg inter-metallic compounds present on grain surfaces? | Any of MgZn2, Mg2Zn11, Mg2Zn3, MgZn, Mg7Zn3 present? |
|---|---|---|---|---|---|---|---|---|---|---|---|---|
| | | Fine metal | Coarse metal | | Zn | Mg | Al | Si | | | | |
| 2890 | 16.5 | 2.35 | 9.25 | 35.87 | 88.8 | 11.2 | 0 | 0 | Yes | 1.12 | Yes | Yes |
| 2891 | 13.5 | 2.57 | 9.56 | 42.04 | 90.6 | 9.4 | 0 | 0 | No | 1.38 | Yes | Yes |
| 2892 | 0.96 | 2.56 | 9.84 | 6.55 | 81.45 | 18.5 | 0 | 0.05 | Yes | 1.22 | Yes | Yes |
| 2893 | 0.96 | 2.21 | 9.75 | 43.60 | 99.97 | 0.03 | 0 | 0 | Yes | 1.14 | Yes | Yes |
| 2894 | 8.45 | 2.64 | 9.85 | 44.12 | 98.4 | 1.6 | 0 | 0 | No | 1.02 | Yes | Yes |
| 2895 | 2.9 | 1.99 | 8.56 | 37.21 | 93.2 | 6.8 | 0 | 0 | Yes | 1.05 | Yes | Yes |
| 2896 | 5.4 | 2.94 | 8.21 | 43.38 | 84.5 | 13.9 | 0 | 1.6 | No | 1.36 | No | Yes |
| 2897 | 10.6 | 2.58 | 8.33 | 13.52 | 98.1 | 1.9 | 0 | 0 | Yes | 1.11 | No | Yes |
| 2898 | 2.32 | 2.37 | 8 | 44.94 | 94.3 | 5.7 | 0 | 0 | No | 1.07 | Yes | Yes |
| 2899 | 7.8 | 2.15 | 9.22 | 45.46 | 90.8 | 9.2 | 0 | 0 | No | 1.42 | Yes | Yes |
| 2900 | 7.95 | 2.96 | 9.36 | 35.96 | 83.3 | 15.4 | 0 | 1.3 | Yes | 1.38 | No | Yes |
| 2901 | 20.59 | 2.85 | 9.45 | 42.13 | 79.84 | 18.6 | 0 | 1.56 | Yes | 1.22 | No | Yes |
| 2902 | 22.5 | 2.94 | 9.61 | 7.56 | 96.4 | 3.6 | 0 | 0 | Yes | 1.14 | Yes | Yes |
| 2903 | 4.6 | 2.11 | 9.85 | 43.69 | 94.6 | 5.4 | 0 | 0 | Yes | 1.13 | Yes | Yes |
| 2904 | 4.9 | 2.68 | 9.23 | 44.21 | 92.4 | 7.6 | 0 | 0 | Yes | 1.02 | No | Yes |
| 2905 | 10.5 | 2.99 | 9.08 | 39.51 | 75.5 | 24.5 | 0 | 0 | Yes | 1.06 | Yes | Yes |
| 2906 | 8.45 | 2.78 | 9.87 | 45.68 | 82.4 | 17.6 | 0 | 0 | Yes | 1.05 | Yes | Yes |
| 2907 | 30.5 | 2.96 | 9.46 | 65.58 | 98.6 | 1.4 | 0 | 0 | Yes | 1.24 | No | Yes |
| 2908 | 49.5 | 2.85 | 9.28 | 47.24 | 78.5 | 21.5 | 0 | 0 | Yes | 1.33 | No | Yes |
| 2909 | 5.9 | 2.64 | 9.45 | 47.76 | 89.6 | 10.4 | 0 | 0 | Yes | 1.27 | Yes | Yes |

| Invention Example No | Number of faces | Ratio of (Zn metal grains or Zn alloy grains):(Later-added Zn metal grains) | | Mg content of all metal grains (Mass %) | Total metal grain content of coat (Mass %) | Coating details | | | Corrosion Test Results |
|---|---|---|---|---|---|---|---|---|---|
| | | Zn metal grains/Zn alloy grains | Later-added Zn metal grains | | | Base resin type | Coat thickness (μm) | Coating method | |
| 2890 | 2 | 1 | 5 | 1.867 | 49 | Alkyl silicate | 14 | Spray | E |
| 2891 | 2 | 1 | 198.7 | 0.047 | 89 | Urethane resin | 55 | Spray | E |
| 2892 | 2 | 1 | 36 | 0.500 | 90 | Alkyl silicate | 8 | Spray | E |

TABLE 146-continued

|  |  |  |  |  |  |  |  |  |  |
|---|---|---|---|---|---|---|---|---|---|
| 2893 | 2 | 1 | 1.5 | 0.012 | 86 | Urethane resin | 122 | Brush | E |
| 2894 | 6 | 1 | 0.008 | 1.587 | 48 | Alkyl silicate | 555 | Spray | E |
| 2895 | 6 | 1 | 1.4 | 2.833 | 47 | Alkali silicate | 19 | Spray | E |
| 2896 | 7 | 1 | 4.2 | 2.673 | 47 | Alkyl silicate | 25 | Brush | E |
| 2897 | 6 | 1 | 1.6 | 0.731 | 47 | Alkyl silicate | 58 | Spray | E |
| 2898 | 2 | 1 | 7.5 | 0.671 | 52 | Alkyl silicate | 685 | Spray | E |
| 2899 | 7 | 1 | 1.6 | 3.538 | 52 | Alkali silicate | 19 | Brush | E |
| 2900 | 2 | 1 | 2 | 5.133 | 52 | Urethane resin | 700 | Spray | E |
| 2901 | 6 | 1 | 270 | 0.069 | 88 | Alkyl silicate | 77 | Spray | E |
| 2902 | 6 | 1 | 7.5 | 0.424 | 87 | Alkyl silicate | 54 | Spray | E |
| 2903 | 2 | 1 | 2.9 | 1.385 | 89 | Alkyl silicate | 64 | Spray | E |
| 2904 | 2 | 1 | 2.6 | 2.111 | 90 | Alkyl silicate | 34 | Brush | E |
| 2905 | 7 | 1 | 0.1 | 22.273 | 91 | Alkali silicate | 28 | Spray | E |
| 2906 | 6 | 1 | 1.2 | 8.000 | 46 | Urethane resin | 109 | Brush | E |
| 2907 | 7 | 1 | 1.2 | 0.636 | 47 | Alkyl silicate | 15 | Spray | E |
| 2908 | 2 | 1 | 62 | 0.341 | 47 | Alkyl silicate | 14 | Spray | E |
| 2909 | 7 | 1 | 2.4 | 3.059 | 49 | Alkyl silicate | 18 | Spray | E |

TABLE 147

| Invention Example No | Average diameter of later-added Zn metal grains (μm) | Diameter distribution (peak diameter) of Zn metal grains/Zn alloy grains (μm) Fine metal | Diameter distribution (peak diameter) of Zn metal grains/Zn alloy grains (μm) Coarse metal | Percent of fine-grain metal grains among Zn metal grains/Zn alloy grains (Vol %) | Chemical component content of Zn metal grains/Zn alloy grains (Mass %) Zn | Mg | Al | Si | Alloy grain fracture surfaces or cracks present? | Average aspect ratio | Mg solid solution phase and Zn—Mg inter-metallic compounds present on grain surfaces? | Any of MgZn2, Mg2Zn11, Mg2Zn3, MgZn, Mg7Zn3 present? |
|---|---|---|---|---|---|---|---|---|---|---|---|---|
| 2910 | 4.52 | 2.35 | 9.25 | 45.02 | 87.2 | 12.8 | 0 | 0 | Yes | 1.05 | Yes | Yes |
| 2911 | 5.96 | 2.12 | 9.46 | 47.02 | 92.2 | 7.8 | 0 | 0 | Yes | 1.22 | No | Yes |
| 2912 | 5.5 | 2.34 | 9.46 | 7.66 | 70.5 | 29.5 | 0 | 0 | Yes | 1.13 | No | Yes |
| 2913 | 3.6 | 2.33 | 9.46 | 15.20 | 91.5 | 8.5 | 0 | 0 | Yes | 1.06 | Yes | Yes |
| 2914 | 16.5 | 2.23 | 9.06 | 43.16 | 74.5 | 25.5 | 0 | 0 | Yes | 1.05 | Yes | Yes |
| 2915 | 12.5 | 2.12 | 9.3 | 49.33 | 99.93 | 0.07 | 0 | 0 | Yes | 1.24 | Yes | Yes |
| 2916 | 16.5 | 2.21 | 8.68 | 19.47 | 89.2 | 10.8 | 0 | 0 | No | 1.05 | Yes | Yes |
| 2917 | 10.9 | 1.38 | 8.53 | 69.55 | 86 | 11.2 | 1.6 | 1.2 | No | 1.12 | Yes | Yes |
| 2918 | 5.6 | 1.95 | 9.32 | 51.41 | 75.23 | 24.5 | 0.27 | 0 | Yes | 1.38 | No | Yes |
| 2919 | 22.6 | 2.26 | 8.95 | 75.88 | 82.6 | 17.4 | 0 | 0 | Yes | 1.13 | No | Yes |
| 2920 | 20.59 | 2.05 | 12.54 | 48.08 | 98.7 | 1.3 | 0 | 0 | Yes | 1.33 | Yes | Yes |
| 2921 | 20.59 | 1.65 | 8.7 | 66.85 | 80.5 | 19.5 | 0 | 0 | Yes | 1.27 | Yes | Yes |
| 2922 | 9.56 | 2.35 | 8.55 | 7.68 | 88.85 | 10.8 | 0.05 | 0.3 | No | 1.23 | No | Yes |
| 2923 | 5.9 | 1.62 | 8.91 | 8.64 | 87.7 | 11.9 | 0.4 | 0 | Yes | 1.11 | Yes | Yes |
| 2924 | 6.54 | 1.88 | 9.91 | 16.58 | 90.5 | 9.5 | 0 | 0 | Yes | 1.42 | Yes | Yes |
| 2925 | 21.4 | 2.35 | 9.25 | 35.87 | 89.5 | 10.5 | 0 | 0 | Yes | 1.06 | No | Yes |
| 2926 | 9.8 | 2.57 | 9.56 | 42.04 | 84.9 | 15.1 | 0 | 0 | Yes | 1.05 | Yes | Yes |
| 2927 | 6.59 | 2.56 | 9.84 | 38.41 | 83.2 | 16.8 | 0 | 0 | Yes | 1.07 | Yes | Yes |
| 2928 | 6.54 | 2.21 | 9.75 | 6.99 | 89.4 | 10.6 | 0 | 0 | Yes | 1.42 | No | Yes |
| 2929 | 16.5 | 2.64 | 9.85 | 44.12 | 84.3 | 13.3 | 2.4 | 0 | Yes | 1.38 | Yes | Yes |

TABLE 147-continued

| Invention Example No | Number of faces | Ratio of (Zn metal grains or Zn alloy grains):(Later-added Zn metal grains) Zn metal grains/ Zn alloy grains | Later-added Zn metal grains | Mg content of all metal grains (Mass %) | Total metal grain content of coat (Mass %) | Base resin type | Coat thickness (μm) | Coating method | Corrosion Test Results |
|---|---|---|---|---|---|---|---|---|---|
| 2910 | 6 | 1 | 2.1 | 4.129 | 50 | Alkali silicate | 2 | Spray | G |
| 2911 | 7 | 1 | 34.5 | 0.220 | 87 | Alkyl silicate | 37 | Spray | E |
| 2912 | 6 | 1 | 270 | 0.109 | 83 | Alkali silicate | 12 | Spray | E |
| 2913 | 7 | 1 | 32.5 | 0.254 | 48 | Alkyl silicate | 160 | Brush | E |
| 2914 | 6 | 1 | 3 | 6.375 | 51 | Alkali silicate | 5 | Brush | G |
| 2915 | 2 | 1 | 1.5 | 0.028 | 51 | Alkyl silicate | 56 | Brush | E |
| 2916 | 7 | 1 | 7.5 | 1.271 | 87 | Alkali silicate | 2 | Spray | G |
| 2917 | 6 | 1 | 13.5 | 0.772 | 85 | Alkyl silicate | 18 | Spray | E |
| 2918 | 6 | 1 | 5 | 4.083 | 86 | Alkyl silicate | 23 | Spray | E |
| 2919 | 6 | 1 | 5 | 2.900 | 50 | Epoxy resin | 30 | Brush | E |
| 2920 | 2 | 1 | 1 | 0.650 | 51 | Acrylic resin | 77 | Brush | E |
| 2921 | 6 | 1 | 120 | 0.161 | 51 | Urethane resin | 655 | Brush | E |
| 2922 | 7 | 1 | 3.7 | 2.298 | 80 | Polyester resin | 47 | Spray | E |
| 2923 | 2 | 1 | 6.1 | 1.676 | 46 | Epoxy resin | 43 | Spray | E |
| 2924 | 6 | 1 | 198.5 | 0.048 | 51 | Acrylic resin | 52 | Brush | E |
| 2925 | 2 | 1 | 2.5 | 3.000 | 86 | Urethane resin | 20 | Brush | E |
| 2926 | 6 | 1 | 18.5 | 0.774 | 85 | Polyester resin | 200 | Brush | E |
| 2927 | 7 | 1 | 8 | 1.867 | 82 | Alkali silicate | 22 | Spray | E |
| 2928 | 7 | 1 | 1.6 | 4.077 | 81 | Alkyl silicate | 25 | Spray | E |
| 2929 | 2 | 1 | 1.2 | 6.045 | 46 | Alkali silicate | 14 | Spray | E |

TABLE 148

| Invention Example No | Average diameter of later-added Zn metal grains (μm) | Diameter distribution (peak diameter) of Zn metal grains/Zn alloy grains (μm) Fine metal | Coarse metal | Percent of fine-grain metal grains among Zn metal grains/Zn alloy grains (Vol %) | Chemical component content of Zn metal grains/Zn alloy grains (Mass %) Zn | Mg | Al | Si | Alloy grain fracture surfaces or cracks present? | Average aspect ratio | Mg solid solution phase and Zn—Mg inter-metallic compounds present on grain surfaces? | Any of MgZn2, Mg2Zn11, Mg2Zn3, MgZn, Mg7Zn3 present? |
|---|---|---|---|---|---|---|---|---|---|---|---|---|
| 2930 | 7.8 | 2.65 | 8.56 | 66.99 | 98.6 | 1.4 | 0 | 0 | No | 1.22 | Yes | Yes |
| 2931 | 16.5 | 2.94 | 8.21 | 43.38 | 76.45 | 23.5 | 0 | 0.05 | Yes | 1.14 | Yes | Yes |
| 2932 | 6.54 | 2.58 | 8.33 | 39.75 | 91.1 | 8.9 | 0 | 0 | Yes | 1.13 | Yes | Yes |
| 2933 | 8.45 | 2.37 | 8 | 65.38 | 85.1 | 14.9 | 0 | 0 | Yes | 1.02 | Yes | Yes |
| 2934 | 8.5 | 2.15 | 9.22 | 45.46 | 77.48 | 18.4 | 2.55 | 1.57 | Yes | 1.06 | Yes | Yes |
| 2935 | 13.6 | 2.96 | 9.36 | 22.55 | 97.9 | 2.1 | 0 | 0 | Yes | 1.05 | Yes | Yes |
| 2936 | 12.33 | 2.85 | 9.45 | 42.13 | 94.8 | 5.2 | 0 | 0 | Yes | 1.24 | Yes | Yes |
| 2937 | 16.5 | 2.94 | 9.61 | 38.50 | 84.6 | 15.4 | 0 | 0 | Yes | 1.33 | Yes | Yes |
| 2938 | 7.9 | 2.11 | 9.85 | 64.13 | 89.3 | 10.7 | 0 | 0 | Yes | 1.27 | Yes | Yes |
| 2939 | 10.5 | 2.68 | 9.23 | 44.21 | 83.3 | 16.7 | 0 | 0 | Yes | 1.05 | Yes | Yes |
| 2940 | 16.5 | 2.99 | 9.08 | 39.51 | 80.05 | 19.6 | 0.35 | 0 | No | 1.12 | Yes | Yes |

TABLE 148-continued

| | | | | | | | | | | | | |
|---|---|---|---|---|---|---|---|---|---|---|---|---|
| 2941 | 10.64 | 1.82 | 9.87 | 78.64 | 85.5 | 14.5 | 0 | 0 | No | 1.23 | Yes | Yes |
| 2942 | 10.5 | 1.42 | 9.46 | 42.05 | 85 | 14.2 | 0 | 0.8 | No | 1.36 | Yes | Yes |
| 2943 | 20.59 | 2.12 | 9.28 | 64.58 | 87.3 | 12.7 | 0 | 0 | No | 1.11 | Yes | Yes |
| 2944 | 8.5 | 1.92 | 9.45 | 47.76 | 89.5 | 10.5 | 0 | 0 | Yes | 1.07 | Yes | Yes |
| 2945 | 0.5 | 2.11 | 9.63 | 24.10 | 87.3 | 11.8 | 0 | 0.9 | Yes | 1.42 | Yes | Yes |
| 2946 | 10.5 | 2.97 | 9.16 | 39.11 | 86.4 | 12.8 | 0.5 | 0.3 | Yes | 1.38 | Yes | Yes |
| 2947 | 11.5 | 2.36 | 10.39 | 19.65 | 93.8 | 6.2 | 0 | 0 | Yes | 1.22 | Yes | Yes |
| 2948 | 36.5 | 3.05 | 10.56 | 65.39 | 83.8 | 16.2 | 0 | 0 | Yes | 1.14 | Yes | Yes |
| 2949 | 1.5 | 2.15 | 10.74 | 48.57 | 80.4 | 19.6 | 0 | 0 | Yes | 1.13 | Yes | Yes |

| Invention Example No | Number of faces | Ratio of (Zn metal grains or Zn alloy grains):(Later-added Zn metal grains) | | Mg content of all metal grains (Mass %) | Total metal grain content of coat (Mass %) | Coating details | | | Corrosion Test Results |
|---|---|---|---|---|---|---|---|---|---|
| | | Zn metal grains/ Zn alloy grains | Later-added Zn metal grains | | | Base resin type | Coat thickness (μm) | Coating method | |
| 2930 | 2 | 1 | 0.5 | 0.933 | 47 | Urethane resin | 112 | Spray | E |
| 2931 | 6 | 1 | 9 | 2.350 | 48 | Alkali silicate | 24 | Spray | E |
| 2932 | 7 | 1 | 4.5 | 1.618 | 51 | Urethane resin | 150 | Spray | E |
| 2933 | 6 | 1 | 136 | 0.109 | 53 | Alkali silicate | 18 | Spray | E |
| 2934 | 7 | 1 | 13 | 1.314 | 88 | Alkyl silicate | 19 | Brush | E |
| 2935 | 6 | 1 | 10.6 | 0.181 | 85 | Alkyl silicate | 24 | Spray | E |
| 2936 | 2 | 1 | 1.6 | 2.000 | 83 | Urethane resin | 99 | Spray | E |
| 2937 | 2 | 1 | 68 | 0.223 | 82 | Alkyl silicate | 7 | Spray | E |
| 2938 | 6 | 1 | 4.5 | 1.945 | 83 | Epoxy resin | 100 | Spray | E |
| 2939 | 7 | 1 | 10.5 | 1.452 | 47 | Alkyl silicate | 27 | Brush | E |
| 2940 | 6 | 1 | 4.9 | 3.322 | 51 | Alkali silicate | 15 | Spray | E |
| 2941 | 6 | 1 | 10.5 | 1.261 | 52 | Alkyl silicate | 14 | Spray | E |
| 2942 | 2 | 1 | 192 | 0.074 | 51 | Urethane resin | 55 | Spray | E |
| 2943 | 7 | 1 | 0.07 | 11.869 | 52 | Alkyl silicate | 8 | Spray | E |
| 2944 | 2 | 1 | 9.5 | 1.000 | 89 | Urethane resin | 122 | Brush | E |
| 2945 | 2 | 1 | 2.6 | 3.278 | 85 | Alkyl silicate | 54 | Spray | E |
| 2946 | 6 | 1 | 4.5 | 2.327 | 82 | Alkali silicate | 19 | Spray | E |
| 2947 | 7 | 1 | 3 | 1.550 | 87 | Alkyl silicate | 25 | Brush | E |
| 2948 | 7 | 1 | 7.5 | 1.906 | 88 | Alkyl silicate | 58 | Spray | E |
| 2949 | 6 | 1 | 77 | 0.251 | 49 | Alkyl silicate | 21 | Spray | E |

TABLE 149

| Invention Example No | Average diameter of later-added Zn metal grains (μm) | Diameter distribution (peak diameter) of Zn metal grains/Zn alloy grains (μm) Fine metal | Diameter distribution (peak diameter) of Zn metal grains/Zn alloy grains (μm) Coarse metal | Percent of fine-grain metal grains among Zn metal grains/Zn alloy grains (Vol %) | Chemical component content of Zn metal grains/Zn alloy grains (Mass %) Zn | Chemical component content of Zn metal grains/Zn alloy grains (Mass %) Mg | Chemical component content of Zn metal grains/Zn alloy grains (Mass %) Al | Chemical component content of Zn metal grains/Zn alloy grains (Mass %) Si | Alloy grain fracture surfaces or cracks present? | Average aspect ratio | Mg solid solution phase and Zn—Mg intermetallic compounds present on grain surfaces? | Any of MgZn2, Mg2Zn11, Mg2Zn3, MgZn, Mg7Zn3 present? |
|---|---|---|---|---|---|---|---|---|---|---|---|---|
| 2950 | 8.7 | 2.19 | 10.27 | 24.91 | 87.6 | 12.4 | 0 | 0 | Yes | 1.02 | Yes | Yes |
| 2951 | 7.8 | 2.48 | 11.5 | 39.92 | 89.3 | 10.7 | 0 | 0 | Yes | 1.06 | Yes | Yes |
| 2952 | 5.96 | 2.85 | 11.67 | 22.65 | 91.5 | 8.5 | 0 | 0 | Yes | 1.05 | Yes | Yes |
| 2953 | 0.06 | 2.75 | 11.85 | 66.20 | 94.9 | 5.1 | 0 | 0 | Yes | 1.24 | Yes | Yes |
| 2954 | 0.9 | 2.46 | 11.38 | 49.38 | 75.5 | 24.5 | 0 | 0 | Yes | 1.33 | Yes | Yes |
| 2955 | 3.6 | 2.71 | 12.61 | 30.58 | 86.5 | 13.5 | 0 | 0 | Yes | 1.27 | Yes | Yes |
| 2956 | 10.5 | 2.36 | 12.78 | 45.59 | 80 | 20 | 0 | 0 | Yes | 1.05 | Yes | Yes |
| 2957 | 0.05 | 2.16 | 9.57 | 28.32 | 84.5 | 15.5 | 0 | 0 | Yes | 1.12 | Yes | Yes |
| 2958 | 2.32 | 2.46 | 9.81 | 71.87 | 88 | 10.5 | 1.5 | 0 | Yes | 1.23 | Yes | Yes |
| 2959 | 20.4 | 2.49 | 8.43 | 53.05 | 92.1 | 7.9 | 0 | 0 | Yes | 1.36 | Yes | Yes |
| 2960 | 7.34 | 2.95 | 8.55 | 27.74 | 95.2 | 4.8 | 0 | 0 | Yes | 1.11 | Yes | Yes |
| 2961 | 9.4 | 2.36 | 8.22 | 42.75 | 81.6 | 18.4 | 0 | 0 | Yes | 1.07 | Yes | Yes |
| 2962 | 23.43 | 2.21 | 9.44 | 23.29 | 86.8 | 12.7 | 0 | 0.5 | Yes | 1.42 | Yes | Yes |
| 2963 | 5.96 | 2.25 | 9.58 | 61.12 | 89.7 | 10.3 | 0 | 0 | No | 1.38 | Yes | Yes |
| 2964 | 10.64 | 2.44 | 9.67 | 44.30 | 71.2 | 20.8 | 8 | 0 | Yes | 1.22 | Yes | Yes |
| 2965 | 16.5 | 2.78 | 9.83 | 23.96 | 97.5 | 2.5 | 0 | 0 | No | 1.14 | Yes | Yes |
| 2966 | 7.95 | 2.15 | 10.07 | 44.09 | 84.8 | 15.2 | 0 | 0 | Yes | 1.13 | Yes | Yes |
| 2967 | 7.95 | 2.19 | 9.45 | 24.63 | 80.8 | 19.2 | 0 | 0 | No | 1.02 | Yes | Yes |
| 2968 | 9.64 | 2.48 | 9.3 | 62.46 | 78.7 | 13.5 | 7.8 | 0 | Yes | 1.06 | Yes | Yes |
| 2969 | 0.96 | 2.59 | 9.99 | 45.64 | 88.1 | 11.9 | 0 | 0 | No | 1.05 | Yes | Yes |

| Invention Example No | Number of faces | Ratio of (Zn metal grains or Zn alloy grains):(Later-added Zn metal grains) Zn metal grains/Zn alloy grains | Ratio of (Zn metal grains or Zn alloy grains):(Later-added Zn metal grains) Later-added Zn metal grains | Mg content of all metal grains (Mass %) | Coating details Total metal grain content of coat (Mass %) | Coating details Base resin type | Coating details Coat thickness (μm) | Coating details Coating method | Corrosion Test Results |
|---|---|---|---|---|---|---|---|---|---|
| 2950 | 7 | 1 | 10.5 | 1.078 | 50 | Alkali silicate | 19 | Brush | E |
| 2951 | 7 | 1 | 15.5 | 0.648 | 51 | Urethane resin | 56 | Spray | E |
| 2952 | 6 | 1 | 5.8 | 1.250 | 52 | Alkyl silicate | 77 | Spray | E |
| 2953 | 7 | 1 | 1.9 | 1.759 | 53 | Alkyl silicate | 12 | Spray | E |
| 2954 | 2 | 1 | 16.9 | 1.369 | 88 | Alkyl silicate | 64 | Spray | E |
| 2955 | 7 | 1 | 1.5 | 5.400 | 85 | Alkyl silicate | 34 | Brush | E |
| 2956 | 7 | 1 | 0.05 | 19.048 | 83 | Alkali silicate | 28 | Spray | E |
| 2957 | 2 | 1 | 215 | 0.072 | 81 | Urethane resin | 109 | Brush | E |
| 2958 | 6 | 1 | 4.2 | 2.019 | 80 | Alkyl silicate | 15 | Spray | E |
| 2959 | 6 | 1 | 1.5 | 3.160 | 47 | Alkyl silicate | 14 | Spray | E |
| 2960 | 7 | 1 | 4.8 | 0.828 | 49 | Alkyl silicate | 18 | Spray | E |
| 2961 | 7 | 1 | 0.5 | 12.267 | 50 | Urethane resin | 122 | Brush | E |
| 2962 | 6 | 1 | 2.3 | 3.848 | 51 | Alkyl silicate | 54 | Spray | E |
| 2963 | 7 | 1 | 0.05 | 9.810 | 52 | Alkali silicate | 19 | Spray | E |
| 2964 | 2 | 1 | 120 | 0.172 | 83 | Alkyl silicate | 25 | Brush | E |
| 2965 | 2 | 1 | 3.7 | 0.532 | 88 | Alkyl silicate | 58 | Spray | E |

TABLE 149-continued

| | | | | | | | | | |
|---|---|---|---|---|---|---|---|---|---|
| 2966 | 6 | 1 | 16.5 | 0.869 | 85 | Alkyl silicate | 21 | Spray | E |
| 2967 | 7 | 1 | 24 | 0.768 | 83 | Alkali silicate | 19 | Brush | E |
| 2968 | 6 | 1 | 0.01 | 13.366 | 82 | Urethane resin | 56 | Spray | E |
| 2969 | 2 | 1 | 7.8 | 1.352 | 47 | Alkyl silicate | 77 | Spray | E |

TABLE 150

| Invention Example No | Average diameter of later-added Zn metal grains (μm) | Diameter distribution (peak diameter) of Zn metal grains/Zn alloy grains (μm) | | Percent of fine-grain metal grains among Zn metal grains/Zn alloy grains (Vol %) | Chemical component content of Zn metal grains/Zn alloy grains (Mass %) | | | | Alloy grain fracture surfaces or cracks present? | Average aspect ratio | Mg solid solution phase and Zn—Mg inter-metallic compounds present on grain surfaces? | Any of MgZn2, Mg2Zn11, Mg2Zn3, MgZn, Mg7Zn3 present? |
|---|---|---|---|---|---|---|---|---|---|---|---|---|
| | | Fine metal | Coarse metal | | Zn | Mg | Al | Si | | | | |
| 2970 | 5.26 | 2.47 | 9.58 | 25.30 | 88.5 | 10.6 | 0 | 0.9 | Yes | 1.24 | Yes | Yes |
| 2971 | 13.5 | 2.69 | 9.4 | 42.84 | 84.6 | 15.4 | 0 | 0 | Yes | 1.33 | Yes | Yes |
| 2972 | 13.5 | 2.57 | 9.57 | 25.44 | 97.4 | 2.6 | 0 | 0 | Yes | 1.27 | Yes | Yes |
| 2973 | 9.64 | 2.49 | 9.54 | 53.27 | 83.3 | 16.7 | 0 | 0 | Yes | 1.37 | Yes | Yes |
| 2974 | 16.5 | 2.68 | 9.58 | 46.45 | 91.9 | 8.1 | 0 | 0 | Yes | 1.10 | Yes | Yes |
| 2975 | 20.59 | 2.35 | 9.25 | 46.45 | 86.3 | 13.7 | 0 | 0 | Yes | 1.04 | Yes | Yes |
| 2976 | 0.96 | 2.48 | 10.04 | 50.91 | 81.5 | 18.5 | 0 | 0 | Yes | 1.02 | Yes | Yes |
| 2977 | 6.54 | 2.13 | 11.27 | 27.25 | 97.6 | 2.4 | 0 | 0 | Yes | 1.01 | Yes | Yes |
| 2978 | 5.26 | 1.93 | 11.44 | 42.26 | 89.1 | 10.9 | 0 | 0 | Yes | 1.08 | Yes | Yes |
| 2979 | 10.64 | 2.05 | 8.9 | 33.69 | 92.8 | 7.2 | 0 | 0 | Yes | 1.14 | Yes | Yes |
| 2980 | 9.64 | 1.42 | 8.75 | 48.70 | 81.96 | 17.5 | 0.5 | 0.04 | No | 1.23 | Yes | Yes |
| 2981 | 6.9 | 1.46 | 9.44 | 29.24 | 85.4 | 14.6 | 0 | 0 | No | 1.33 | Yes | Yes |
| 2982 | 10.5 | 1.75 | 9.03 | 67.07 | 90.6 | 9.4 | 0 | 0 | Yes | 1.37 | Yes | Yes |
| 2983 | 13.5 | 1.86 | 8.85 | 50.25 | 92.9 | 7.1 | 0 | 0 | Yes | 1.44 | Yes | Yes |
| 2984 | 20.59 | 1.74 | 8.95 | 29.91 | 77.5 | 22.5 | 0 | 0 | Yes | 1.21 | Yes | Yes |
| 2985 | 7.82 | 1.96 | 12.54 | 87.50 | 84.8 | 13.7 | 1.5 | 0 | No | 1.22 | Yes | Yes |
| 2986 | 5.26 | 1.65 | 8.7 | 30.58 | 87.1 | 12.9 | 0 | 0 | No | 1.23 | Yes | Yes |
| 2987 | 7.06 | 2.35 | 8.55 | 68.41 | 95.7 | 4.3 | 0 | 0 | Yes | 1.47 | Yes | Yes |
| 2988 | 0.64 | 1.62 | 10.72 | 54.59 | 80.2 | 17.6 | 1 | 1.2 | No | 1.01 | Yes | Yes |
| 2989 | 46.8 | 2.25 | 9.9 | 34.25 | 98.8 | 0.6 | 0.6 | 0 | Yes | 1.04 | Yes | Yes |

| Invention Example No | Number of faces | Ratio of (Zn metal grains or Zn alloy grains):(Later-added Zn metal grains) | | Mg content of all metal grains (Mass %) | Coating details | | | | |
|---|---|---|---|---|---|---|---|---|---|
| | | Zn metal grains/Zn alloy grains | Later-added Zn metal grains | | Total metal grain content of coat (Mass %) | Base resin type | Coat thickness (μm) | Coating method | Corrosion Test Results |
| 2970 | 2 | 1 | 1.6 | 4.077 | 46 | Alkyl silicate | 54 | Spray | E |
| 2971 | 7 | 1 | 3.2 | 3.667 | 49 | Alkali silicate | 2 | Spray | G |
| 2972 | 6 | 1 | 5.4 | 0.406 | 50 | Alkali silicate | 20 | Spray | E |
| 2973 | 7 | 1 | 220 | 0.076 | 51 | Alkali silicate | 5 | Spray | G |
| 2974 | 7 | 1 | 2.2 | 2.531 | 83 | Alkyl silicate | 20 | Spray | E |
| 2975 | 6 | 1 | 2.8 | 3.605 | 82 | Alkali silicate | 15 | Brush | E |
| 2976 | 2 | 1 | 12 | 1.423 | 88 | Alkyl silicate | 57 | Brush | E |
| 2977 | 7 | 1 | 10.6 | 0.207 | 85 | Alkali silicate | 13 | Brush | E |
| 2978 | 2 | 1 | 35 | 0.303 | 86 | Alkyl silicate | 22 | Brush | E |

TABLE 150-continued

| | | | | | | | | | | |
|---|---|---|---|---|---|---|---|---|---|---|
| 2979 | 2 | 1 | 125.5 | 0.057 | 47 | Alkali silicate | 20 | Spray | E |
| 2980 | 7 | 1 | 6 | 2.500 | 48 | Alkyl silicate | 27 | Spray | E |
| 2981 | 2 | 1 | 34 | 0.417 | 50 | Alkali silicate | 15 | Spray | E |
| 2982 | 7 | 1 | 1.6 | 3.615 | 51 | Alkyl silicate | 35 | Spray | E |
| 2983 | 2 | 1 | 7.5 | 0.835 | 52 | Alkali silicate | 34 | Brush | E |
| 2984 | 6 | 1 | 200 | 0.112 | 88 | Alkyl silicate | 45 | Brush | E |
| 2985 | 6 | 1 | 7.5 | 1.612 | 89 | Alkali silicate | 52 | Brush | E |
| 2986 | 7 | 1 | 3.2 | 3.071 | 86 | Alkyl silicate | 23 | Brush | E |
| 2987 | 6 | 1 | 2.6 | 1.194 | 87 | Alkali silicate | 5 | Spray | E |
| 2988 | 2 | 1 | 3 | 4.400 | 86 | Alkyl silicate | 52 | Brush | E |
| 2989 | 2 | 1 | 15.2 | 0.037 | 46 | Alkali silicate | 150 | Brush | E |

TABLE 151

| Invention Example No | Average diameter of later-added Zn metal grains (μm) | Diameter distribution (peak diameter) of Zn metal grains/Zn alloy grains (μm) | | Percent of fine-grain metal grains among Zn metal grains/Zn alloy grains (Vol %) | Chemical component content of Zn metal grains/Zn alloy grains (Mass %) | | | | Alloy grain fracture surfaces or cracks present? | Average aspect ratio | Mg solid solution phase and Zn—Mg intermetallic compounds present on grain surfaces? | Any of MgZn2, Mg2Zn11, Mg2Zn3, MgZn, Mg7Zn3 present? |
|---|---|---|---|---|---|---|---|---|---|---|---|---|
| | | Fine metal | Coarse metal | | Zn | Mg | Al | Si | | | | |
| 2990 | 16.5 | 2.36 | 9.57 | 37.61 | 86.9 | 10.3 | 1.6 | 1.2 | Yes | 1.05 | Yes | Yes |
| 2991 | 13.5 | 2.24 | 10.79 | 45.60 | 92.98 | 7 | 0.02 | 0 | Yes | 1.12 | Yes | Yes |
| 2992 | 0.96 | 2.46 | 10.93 | 46.70 | 75.5 | 23.5 | 1 | 0 | Yes | 1.11 | Yes | Yes |
| 2993 | 0.96 | 1.56 | 11.02 | 41.22 | 82.5 | 17.5 | 0 | 0 | No | 1.08 | Yes | Yes |
| 2994 | 8.45 | 1.24 | 11.18 | 45.68 | 80.1 | 12.4 | 7.5 | 0 | Yes | 1.47 | Yes | Yes |
| 2995 | 2.9 | 1.68 | 11.42 | 22.02 | 85.09 | 14.9 | 0 | 0.01 | Yes | 1.50 | Yes | Yes |
| 2996 | 5.4 | 2.65 | 10.8 | 37.03 | 78.7 | 20.7 | 0 | 0.6 | No | 1.13 | Yes | Yes |
| 2997 | 10.6 | 2.22 | 10.65 | 28.46 | 91.29 | 8.6 | 0 | 0.11 | Yes | 1.26 | Yes | Yes |
| 2998 | 2.32 | 2.45 | 11.34 | 43.47 | 85.8 | 14.2 | 0 | 0 | Yes | 1.14 | Yes | Yes |
| 2999 | 7.8 | 2.23 | 11.62 | 35.19 | 98.12 | 0.08 | 0 | 1.8 | Yes | 1.49 | Yes | Yes |
| 3000 | 7.95 | 2.26 | 11.15 | 73.02 | 83.46 | 15.2 | 0 | 1.34 | No | 1.34 | Yes | Yes |
| 3001 | 20.59 | 2.72 | 12.38 | 56.20 | 73.17 | 17.4 | 9 | 0.43 | Yes | 1.18 | Yes | Yes |
| 3002 | 22.5 | 2.13 | 12.55 | 35.86 | 98.6 | 0.8 | 0.6 | 0 | Yes | 1.17 | Yes | Yes |
| 3003 | 4.6 | 1.98 | 9.34 | 93.45 | 93.55 | 6.4 | 0.05 | 0 | Yes | 1.48 | Yes | Yes |
| 3004 | 4.9 | 2.02 | 9.58 | 30.66 | 96.78 | 3.2 | 0.02 | 0 | No | 1.49 | Yes | Yes |
| 3005 | 10.5 | 2.21 | 9.88 | 74.21 | 83 | 9.2 | 7.8 | 0 | Yes | 1.27 | Yes | Yes |
| 3006 | 8.45 | 2.55 | 10 | 55.39 | 70.92 | 19.2 | 9.88 | 0 | Yes | 1.17 | Yes | Yes |
| 3007 | 30.5 | 1.92 | 10.67 | 30.08 | 80.25 | 15.1 | 4.65 | 0 | Yes | 1.16 | Yes | Yes |
| 3008 | 49.5 | 1.96 | 11.89 | 45.09 | 81.85 | 14.5 | 3.65 | 0 | Yes | 1.27 | Yes | Yes |
| 3009 | 5.9 | 2.11 | 12.03 | 41.41 | 89.45 | 10.5 | 0.05 | 0 | Yes | 1.27 | Yes | Yes |

| Invention Example No | Number of faces | Ratio of (Zn metal grains or Zn alloy grains):(Later-added Zn metal grains) | | Mg content of all metal grains (Mass %) | Coating details | | | | Corrosion Test Results |
|---|---|---|---|---|---|---|---|---|---|
| | | Zn metal grains/Zn alloy grains | Later-added Zn metal grains | | Total metal grain content of coat (Mass %) | Base resin type | Coat thickness (μm) | Coating method | |
| 2990 | 2 | 1 | 0.09 | 9.450 | 49 | Alkyl silicate | 60 | Brush | E |
| 2991 | 2 | 1 | 13.5 | 0.483 | 35 | Alkyl silicate | 15 | Spray | E |

TABLE 151-continued

|      |   |   |       |       |    |                |     |       |   |
|------|---|---|-------|-------|----|----------------|-----|-------|---|
| 2992 | 2 | 1 | 135.4 | 0.172 | 37 | Alkyl silicate | 24  | Spray | E |
| 2993 | 2 | 1 | 3     | 4.375 | 36 | Alkali silicate| 34  | Spray | E |
| 2994 | 6 | 1 | 7.8   | 1.409 | 38 | Alkyl silicate | 20  | Brush | E |
| 2995 | 6 | 1 | 10.2  | 1.330 | 48 | Alkali silicate| 200 | Brush | E |
| 2996 | 7 | 1 | 7     | 2.588 | 46 | Alkyl silicate | 56  | Brush | E |
| 2997 | 6 | 1 | 225.2 | 0.038 | 51 | Alkali silicate| 34  | Spray | E |
| 2998 | 2 | 1 | 5.4   | 2.219 | 46 | Alkyl silicate | 2   | Spray | G |
| 2999 | 7 | 1 | 3.2   | 0.019 | 38 | Alkali silicate| 15  | Spray | E |
| 3000 | 2 | 1 | 13.5  | 1.048 | 48 | Alkali silicate| 10  | Spray | E |
| 3001 | 6 | 1 | 1.6   | 6.692 | 52 | Alkyl silicate | 125 | Brush | E |
| 3002 | 6 | 1 | 1.5   | 0.320 | 30 | Alkali silicate| 24  | Brush | E |
| 3003 | 2 | 1 | 2.5   | 1.829 | 76 | Alkyl silicate | 110 | Brush | E |
| 3004 | 2 | 1 | 2.6   | 0.889 | 72 | Alkali silicate| 24  | Brush | E |
| 3005 | 7 | 1 | 126   | 0.072 | 81 | Alkyl silicate | 2   | Spray | G |
| 3006 | 6 | 1 | 120   | 0.159 | 64 | Alkali silicate| 37  | Spray | E |
| 3007 | 7 | 1 | 7.5   | 1.776 | 69 | Alkyl silicate | 113 | Brush | E |
| 3008 | 2 | 1 | 6.5   | 1.933 | 83 | Alkali silicate| 2   | Spray | G |
| 3009 | 7 | 1 | 20    | 0.500 | 30 | Alkyl silicate | 75  | Brush | E |

TABLE 152

| Invention Example No | Average diameter of later-added Zn metal grains (μm) | Diameter distribution (peak diameter) of Zn metal grains/Zn alloy grains (μm) | | Percent of fine-grain metal grains among Zn metal grains/Zn alloy grains (Vol %) | Chemical component content of Zn metal grains/Zn alloy grains (Mass %) | | | | Alloy grain fracture surfaces or cracks present? | Average aspect ratio | Mg solid solution phase and Zn—Mg intermetallic compounds present on grain surfaces? | Any of MgZn2, Mg2Zn11, Mg2Zn3, MgZn, Mg7Zn3 present? |
|---|---|---|---|---|---|---|---|---|---|---|---|---|
| | | Fine metal | Coarse metal | | Zn | Mg | Al | Si | | | | |
| 3010 | 4.52  | 2.97 | 12.12 | 17.75 | 87.3  | 7.5  | 5.2  | 0     | Yes | 1.49 | Yes | Yes |
| 3011 | 5.96  | 2.36 | 12.28 | 32.76 | 93.9  | 6.1  | 0    | 0.001 | Yes | 1.29 | Yes | Yes |
| 3012 | 5.5   | 3.05 | 12.52 | 30.89 | 82.55 | 16.8 | 0.05 | 0.6   | Yes | 1.23 | Yes | Yes |
| 3013 | 3.6   | 2.57 | 11.9  | 45.90 | 70.7  | 27.5 | 1    | 0.8   | Yes | 1.23 | Yes | Yes |
| 3014 | 16.5  | 2.65 | 11.75 | 42.22 | 94.6  | 2.9  | 0    | 2.5   | Yes | 1.23 | Yes | Yes |
| 3015 | 12.5  | 2.54 | 12.44 | 18.56 | 94    | 4.5  | 0    | 1.5   | No  | 1.23 | Yes | Yes |
| 3016 | 16.5  | 2.85 | 12.03 | 33.57 | 99.43 | 0.07 | 0    | 0.5   | Yes | 1.27 | Yes | Yes |
| 3017 | 10.9  | 2.75 | 10.61 | 31.70 | 96.82 | 3.1  | 0.04 | 0.04  | Yes | 1.23 | Yes | Yes |
| 3018 | 5.6   | 2.46 | 11.3  | 46.71 | 76.3  | 20.5 | 1    | 2.2   | Yes | 1.36 | Yes | Yes |
| 3019 | 22.6  | 2.71 | 11.58 | 47.89 | 68.84 | 29.5 | 0.06 | 1.6   | Yes | 1.11 | Yes | Yes |
| 3020 | 20.59 | 2.36 | 11.11 | 24.23 | 92.33 | 7.6  | 0.07 | 0     | Yes | 1.02 | Yes | Yes |
| 3021 | 20.59 | 2.16 | 12.34 | 39.24 | 95.2  | 0.7  | 1.2  | 2.9   | Yes | 1.05 | Yes | Yes |
| 3022 | 9.56  | 2.46 | 12.51 | 37.37 | 91.8  | 4.6  | 1.8  | 1.8   | Yes | 1.24 | Yes | Yes |
| 3023 | 5.9   | 2.49 | 11.64 | 50.38 | 82    | 8.3  | 9.2  | 0.5   | Yes | 1.33 | Yes | Yes |
| 3024 | 6.54  | 1.63 | 9.16  | 37.14 | 88.2  | 11.8 | 0    | 0     | Yes | 1.27 | Yes | Yes |
| 3025 | 21.4  | 1.51 | 9.46  | 13.48 | 86.06 | 12.9 | 0    | 1.04  | Yes | 1.50 | Yes | Yes |
| 3026 | 9.8   | 3.05 | 9.54  | 40.05 | 99.34 | 0.6  | 0    | 0.06  | Yes | 1.13 | Yes | Yes |
| 3027 | 6.59  | 2.57 | 9.56  | 38.18 | 89.51 | 9.5  | 0    | 0.99  | No  | 1.04 | Yes | Yes |
| 3028 | 6.54  | 2.65 | 9.46  | 7.63  | 88.3  | 11.7 | 0    | 0     | Yes | 1.02 | Yes | Yes |
| 3029 | 16.5  | 2.54 | 11.99 | 37.95 | 89.9  | 9.4  | 0.7  | 0     | Yes | 1.08 | Yes | Yes |

TABLE 152-continued

| Invention Example No | Number of faces | Ratio of (Zn metal grains or Zn alloy grains):(Later-added Zn metal grains) Zn metal grains/ Zn alloy grains | Later-added Zn metal grains | Mg content of all metal grains (Mass %) | Total metal grain content of coat (Mass %) | Base resin type | Coat thickness (μm) | Coating method | Corrosion Test Results |
|---|---|---|---|---|---|---|---|---|---|
| 3010 | 6 | 1 | 0.007 | 7.448 | 83 | Alkali silicate | 30 | Brush | E |
| 3011 | 7 | 1 | 9 | 0.610 | 75 | Alkyl silicate | 34 | Brush | E |
| 3012 | 6 | 1 | 7.5 | 1.976 | 76 | Epoxy resin | 124 | Brush | E |
| 3013 | 7 | 1 | 50 | 0.539 | 72 | Acrylic resin | 15 | Spray | E |
| 3014 | 6 | 1 | 0.005 | 2.886 | 71 | Urethane resin | 23 | Spray | E |
| 3015 | 2 | 1 | 25.6 | 0.169 | 82 | Polyester resin | 157 | Brush | E |
| 3016 | 7 | 1 | 56.5 | 0.001 | 81 | Epoxy resin | 26 | Spray | E |
| 3017 | 6 | 1 | 1.6 | 1.192 | 83 | Acrylic resin | 38 | Spray | E |
| 3018 | 6 | 1 | 3 | 5.125 | 50 | Urethane resin | 160 | Brush | E |
| 3019 | 6 | 1 | 100 | 0.292 | 72 | Urethane resin | 27 | Brush | E |
| 3020 | 2 | 1 | 65.5 | 0.114 | 47 | Epoxy resin | 180 | Brush | E |
| 3021 | 6 | 1 | 1.9 | 0.241 | 47 | Acrylic resin | 26 | Spray | E |
| 3022 | 7 | 1 | 2.1 | 1.484 | 52 | Urethane resin | 180 | Brush | E |
| 3023 | 2 | 1 | 10.5 | 0.722 | 52 | Urethane resin | 15 | Spray | E |
| 3024 | 6 | 1 | 6.5 | 1.573 | 50 | Epoxy resin | 2 | Spray | G |
| 3025 | 2 | 1 | 19.5 | 0.629 | 46 | Acrylic resin | 28 | Spray | E |
| 3026 | 6 | 1 | 0.8 | 0.333 | 47 | Urethane resin | 30 | Spray | E |
| 3027 | 7 | 1 | 18.5 | 0.487 | 83 | Urethane resin | 2 | Spray | G |
| 3028 | 7 | 1 | 4.3 | 2.208 | 52 | Epoxy resin | 157 | Brush | E |
| 3029 | 2 | 1 | 3.2 | 2.238 | 89 | Acrylic resin | 28 | Brush | E |

TABLE 153

| Invention Example No | Average diameter of later-added Zn metal grains (μm) | Diameter distribution (peak diameter) of Zn metal grains/Zn alloy grains (μm) Fine metal | Coarse metal | Percent of fine-grain metal grains among Zn metal grains/Zn alloy grains (Vol %) | Chemical component content of Zn metal grains/Zn alloy grains (Mass %) Zn | Mg | Al | Si | Alloy grain fracture surfaces or cracks present? | Average aspect ratio | Mg solid solution phase and Zn—Mg inter-metallic compounds present on grain surfaces? | Any of $MgZn_2$, $Mg_2Zn_{11}$, $Mg_2Zn_3$, $MgZn$, $Mg_7Zn_3$ present? |
|---|---|---|---|---|---|---|---|---|---|---|---|---|
| 3030 | 7.8 | 2.85 | 12.08 | 14.29 | 87.8 | 11.7 | 0.5 | 0 | Yes | 1.15 | Yes | Yes |
| 3031 | 16.5 | 2.75 | 12.24 | 40.86 | 95.6 | 4.2 | 0.2 | 0 | Yes | 1.34 | Yes | Yes |
| 3032 | 6.54 | 2.46 | 12.48 | 97.50 | 97.13 | 2.8 | 0.07 | 0 | Yes | 1.25 | Yes | Yes |
| 3033 | 8.45 | 2.71 | 11.86 | 13.30 | 86.1 | 13.9 | 0 | 0 | Yes | 1.19 | Yes | Yes |
| 3034 | 8.5 | 2.36 | 11.71 | 43.62 | 82.6 | 14.6 | 1.6 | 1.2 | No | 1.18 | Yes | Yes |
| 3035 | 13.6 | 2.46 | 11.35 | 56.93 | 72.95 | 26.4 | 0.65 | 0 | Yes | 1.24 | Yes | Yes |
| 3036 | 12.33 | 1.45 | 12.02 | 36.59 | 83.23 | 16.5 | 0.27 | 0 | Yes | 1.11 | Yes | Yes |
| 3037 | 16.5 | 2.42 | 13.24 | 39.95 | 79.4 | 19.5 | 0.45 | 0.65 | Yes | 1.27 | Yes | Yes |
| 3038 | 7.9 | 2.11 | 9.46 | 86.50 | 97.08 | 1.6 | 0.33 | 0.99 | Yes | 1.31 | Yes | Yes |
| 3039 | 10.5 | 2.97 | 13.47 | 32.87 | 90.5 | 6 | 1 | 2.5 | Yes | 1.26 | Yes | Yes |
| 3040 | 16.5 | 2.36 | 9.46 | 16.23 | 88.93 | 8.4 | 0.87 | 1.8 | Yes | 1.14 | Yes | Yes |
| 3041 | 10.64 | 3.05 | 13.87 | 37.40 | 86.7 | 13.3 | 0 | 0 | Yes | 1.34 | Yes | Yes |
| 3042 | 10.5 | 2.57 | 13.25 | 40.76 | 81.4 | 18.6 | 0. | 0 | Yes | 1.16 | Yes | Yes |
| 3043 | 20.59 | 2.65 | 13.1 | 87.31 | 97.34 | 1.8 | 0.86 | 0 | No | 1.47 | Yes | Yes |
| 3044 | 8.5 | 2.12 | 9.08 | 92.50 | 95.25 | 4.1 | 0.65 | 0 | Yes | 1.48 | Yes | Yes |
| 3045 | 0.5 | 1.65 | 9.87 | 17.93 | 82.87 | 16.7 | 0.43 | 0 | No | 1.49 | Yes | Yes |
| 3046 | 10.5 | 2.35 | 9.46 | 44.50 | 99 | 0.4 | 0.6 | 0 | Yes | 1.34 | Yes | Yes |

TABLE 153-continued

| | | | | | | | | | | | | |
|---|---|---|---|---|---|---|---|---|---|---|---|---|
| 3047 | 11.5 | 1.63 | 9.28 | 96.50 | 89.35 | 10.6 | 0.05 | 0 | Yes | 1.29 | Yes | Yes |
| 3048 | 36.5 | 2.64 | 9.45 | 16.94 | 93.08 | 6.9 | 0.02 | 0 | Yes | 1.18 | Yes | Yes |
| 3049 | 1.5 | 2.35 | 9.25 | 88.12 | 99.82 | 0.05 | 0.06 | 0.07 | Yes | 1.48 | Yes | Yes |

| Invention Example No | Number of faces | Ratio of (Zn metal grains or Zn alloy grains):(Later-added Zn metal grains) | | Mg content of all metal grains (Mass %) | Coating details | | | | Corrosion Test Results |
|---|---|---|---|---|---|---|---|---|---|
| | | Zn metal grains/ Zn alloy grains | Later-added Zn metal grains | | Total metal grain content of coat (Mass %) | Base resin type | Coat thickness (μm) | Coating method | |
| 3030 | 2 | 1 | 1.5 | 4.680 | 85 | Alkyl silicate | 130 | Brush | E |
| 3031 | 6 | 1 | 4.5 | 0.764 | 53 | Alkyl silicate | 29 | Brush | E |
| 3032 | 7 | 1 | 15.5 | 0.170 | 88 | Epoxy resin | 30 | Brush | E |
| 3033 | 6 | 1 | 10.5 | 1.209 | 85 | Acrylic resin | 120 | Brush | E |
| 3034 | 7 | 1 | 2.5 | 4.171 | 52 | Urethane resin | 187 | Brush | E |
| 3035 | 6 | 1 | 9 | 2.640 | 83 | Polyester resin | 28 | Spray | E |
| 3036 | 2 | 1 | 10.5 | 0.156 | 88 | Epoxy resin | 5 | Spray | E |
| 3037 | 2 | 1 | 5.7 | 2.910 | 49 | Acrylic resin | 35 | Spray | E |
| 3038 | 6 | 1 | 3.9 | 0.327 | 50 | Urethane resin | 5 | Spray | G |
| 3039 | 7 | 1 | 4.5 | 1.091 | 51 | Polyester resin | 200 | Brush | E |
| 3040 | 6 | 1 | 3.6 | 1.826 | 83 | Alkali silicate | 25 | Spray | E |
| 3041 | 6 | 1 | 16.4 | 0.764 | 82 | Alkali silicate | 15 | Spray | E |
| 3042 | 2 | 1 | 6 | 2.657 | 88 | Alkyl silicate | 20 | Spray | E |
| 3043 | 7 | 1 | 7.5 | 0.212 | 85 | Alkali silicate | 18 | Spray | E |
| 3044 | 2 | 1 | 10.5 | 0.357 | 87 | Alkyl silicate | 22 | Spray | E |
| 3045 | 2 | 1 | 2.6 | 4.639 | 86 | Alkali silicate | 19 | Spray | E |
| 3046 | 6 | 1 | 1.5 | 0.160 | 46 | Alkyl silicate | 29 | Spray | E |
| 3047 | 7 | 1 | 13.5 | 0.731 | 49 | Alkali silicate | 23 | Spray | E |
| 3048 | 7 | 1 | 2.6 | 1.917 | 35 | Alkyl silicate | 21 | Spray | E |
| 3049 | 6 | 1 | 6.5 | 0.007 | 30 | Alkali silicate | 19 | Spray | E |

TABLE 154

| Invention Example No | Average diameter of later-added Zn metal grains (μm) | Diameter distribution (peak diameter) of Zn metal grains/Zn alloy grains (μm) | | Percent of fine-grain metal grains among Zn metal grains/Zn alloy grains (Vol %) | Chemical component content of Zn metal grains/Zn alloy grains (Mass %) | | | | Alloy grain fracture surfaces or cracks present? | Mg solid solution phase and Zn—Mg intermetallic compounds present | | Any of $MgZn_2$, $Mg_2Zn_{11}$, $Mg_2Zn_3$, $MgZn$, $Mg_7Zn_3$ present? |
|---|---|---|---|---|---|---|---|---|---|---|---|---|
| | | Fine metal | Coarse metal | | Zn | Mg | Al | Si | | Average aspect ratio | on grain surfaces? | |
| 3050 | 8.7 | 2.31 | 9.46 | 60.57 | 91.56 | 6.4 | 1.05 | 0.99 | Yes | 1.27 | Yes | Yes |
| 3051 | 7.8 | 2.62 | 9.46 | 39.48 | 93.36 | 3.5 | 2.6 | 0.54 | Yes | 1.17 | Yes | Yes |
| 3052 | 5.96 | 2.52 | 9.46 | 15.82 | 82.13 | 17.5 | 0.05 | 0.32 | Yes | 1.27 | Yes | Yes |
| 3053 | 0.06 | 2.24 | 13.32 | 49.57 | 91.2 | 3.6 | 5.2 | 0 | No | 1.27 | Yes | Yes |
| 3054 | 0.9 | 0.05 | 6.54 | 86.52 | 94.1 | 5.9 | 0 | 0.001 | Yes | 1.48 | Yes | Yes |
| 3055 | 3.6 | 2.42 | 6.35 | 90.98 | 83.2 | 16.2 | 0 | 0.6 | No | 1.49 | Yes | Yes |
| 3056 | 10.5 | 0.11 | 7.54 | 67.32 | 76.7 | 22.5 | 0 | 0.8 | Yes | 1.34 | Yes | Yes |

TABLE 154-continued

| | | | | | | | | | | | |
|---|---|---|---|---|---|---|---|---|---|---|---|
| 3057 | 0.05 | 1.92 | 8.64 | 82.33 | 96.52 | 3.4 | 0.04 | 0.04 | Yes | 1.23 | Yes | Yes |
| 3058 | 2.32 | 0.46 | 6.45 | 73.76 | 68.3 | 26.5 | 3 | 2.2 | Yes | 1.23 | Yes | Yes |
| 3059 | 20.4 | 0.77 | 6.48 | 88.77 | 72.84 | 25.5 | 0.06 | 1.6 | Yes | 1.23 | Yes | Yes |
| 3060 | 8.6 | 2.35 | 9.25 | 45.02 | 87.2 | 12.8 | 0 | 0 | Yes | 1.05 | Yes | Yes |
| 3061 | 10.5 | 2.33 | 9.46 | 15.2 | 91.5 | 8.5 | 0 | 0 | Yes | 1.06 | Yes | Yes |
| 3062 | 8.7 | 1.95 | 9.32 | 51.41 | 75.23 | 24.5 | 0.27 | 0 | Yes | 1.38 | Yes | Yes |
| 3063 | 7.8 | 2.15 | 9.22 | 45.46 | 77.48 | 18.4 | 2.55 | 1.57 | Yes | 1.06 | Yes | Yes |
| 3064 | 5.96 | 2.23 | 11.62 | 35.19 | 72.62 | 0.08 | 25.5 | 1.8 | Yes | 1.49 | Yes | Yes |
| 3065 | 1.6 | 2.26 | 11.15 | 73.02 | 64.06 | 15.2 | 19.4 | 1.34 | No | 1.34 | Yes | Yes |
| 3066 | 7.2 | 1.98 | 9.34 | 93.45 | 83 | 6.4 | 10.6 | 0 | Yes | 1.48 | Yes | Yes |
| 3067 | 10.5 | 2.02 | 9.58 | 30.66 | 86.4 | 3.2 | 10.4 | 0 | No | 1.49 | Yes | Yes |
| 3068 | 3.6 | 2.36 | 12.28 | 32.76 | 80.4 | 6.1 | 13.5 | 0.001 | Yes | 1.29 | Yes | Yes |
| 3069 | 4.5 | 3.05 | 12.52 | 30.89 | 70.1 | 16.8 | 12.5 | 0.6 | Yes | 1.23 | Yes | Yes |
| 3070 | 7.9 | 2.57 | 11.9 | 45.9 | 60.9 | 27.5 | 10.8 | 0.8 | Yes | 1.23 | Yes | Yes |

| | | Ratio of (Zn metal grains or Zn alloy grains):(Later-added Zn metal grains) | | | Coating details | | | | |
|---|---|---|---|---|---|---|---|---|---|
| Invention Example No | Number of faces | Zn metal grains/ Zn alloy grains | Later-added Zn metal grains | Mg content of all metal grains (Mass %) | Total metal grain content of coat (Mass %) | Base resin type | Coat thickness (μm) | Coating method | Corrosion Test Results |
| 3050 | 7 | 1 | 1.6 | 2.462 | 76 | Alkyl silicate | 15 | Spray | E |
| 3051 | 7 | 1 | 3.8 | 0.729 | 72 | Alkali silicate | 18 | Spray | E |
| 3052 | 6 | 1 | 0.08 | 16.204 | 30 | Alkyl silicate | 22 | Spray | E |
| 3053 | 7 | 1 | 164.5 | 0.022 | 83 | Alkyl silicate | 21 | Spray | E |
| 3054 | 2 | 1 | 3.6 | 1.283 | 75 | Alkyl silicate | 29 | Spray | E |
| 3055 | 7 | 1 | 8.6 | 1.688 | 76 | Alkali silicate | 23 | Spray | E |
| 3056 | 7 | 1 | 12 | 1.731 | 72 | Alkyl silicate | 21 | Spray | E |
| 3057 | 2 | 1 | 5.8 | 0.500 | 83 | Alkali silicate | 19 | Spray | E |
| 3058 | 6 | 1 | 10 | 2.409 | 50 | Alkyl silicate | 21 | Spray | E |
| 3059 | 6 | 1 | 1 | 12.750 | 72 | Alkali silicate | 19 | Spray | E |
| 3060 | 6 | 1 | 10.5 | 1.113 | 50 | Acrylic resin | 654 | Spray | E |
| 3061 | 7 | 1 | 6.5 | 1.133 | 48 | Alkali silicate | 700 | Spray | E |
| 3062 | 7 | 1 | 19.5 | 1.195 | 75 | Alkyl silicate | 555 | Spray | E |
| 3063 | 6 | 1 | 0.8 | 10.222 | 55 | Alkyl silicate | 12 | Spray | E |
| 3064 | 7 | 1 | 5.3 | 0.013 | 38 | Alkyl silicate | 678 | Brush | E |
| 3065 | 2 | 1 | 4.3 | 2.868 | 48 | Urethane resin | 674 | Spray | E |
| 3066 | 7 | 1 | 3.2 | 1.524 | 76 | Polyester resin | 325 | Spray | E |
| 3067 | 7 | 1 | 1.5 | 1.280 | 72 | Alkyl silicate | 665 | Spray | E |
| 3068 | 2 | 1 | 4.5 | 1.109 | 75 | Alkyl silicate | 354 | Brush | E |
| 3069 | 6 | 1 | 0.8 | 9.333 | 76 | Alkyl silicate | 165 | Spray | E |
| 3070 | 6 | 1 | 6.5 | 3.667 | 72 | Urethane resin | 354 | Spray | E |

TABLE 155

| Invention Example No | Average diameter of later-added Zn metal grains (μm) | Diameter distribution (peak diameter) of Zn metal grains/Zn alloy grains (μm) Fine metal | Diameter distribution (peak diameter) of Zn metal grains/Zn alloy grains (μm) Coarse metal | Percent of fine-grain metal grains among Zn metal grains/Zn alloy grains (Vol %) | Chemical component content of Zn metal grains/Zn alloy grains (Mass %) Zn | Mg | Al | Si | Alloy grain fracture surfaces or cracks present? | Average aspect ratio | Mg solid solution phase and Zn—Mg inter-metallic compounds present on grain surfaces? | Any of MgZn2, Mg2Zn11, Mg2Zn3, MgZn, Mg7Zn3 present? |
|---|---|---|---|---|---|---|---|---|---|---|---|---|
| 3071 | 16.5 | 2.35 | 9.25 | 35.87 | 88.8 | 11.2 | 0 | 0 | Yes | 1.12 | Yes | Yes |
| 3072 | 13.5 | 2.57 | 9.56 | 42.04 | 90.6 | 9.4 | 0 | 0 | No | 1.38 | Yes | Yes |
| 3073 | 0.96 | 2.56 | 9.84 | 6.55 | 81.45 | 18.5 | 0 | 0.5 | Yes | 1.22 | Yes | Yes |
| 3074 | 0.96 | 2.21 | 9.75 | 43.60 | 99.97 | 0.03 | 0 | 0 | Yes | 1.14 | Yes | Yes |
| 3075 | 8.45 | 2.64 | 9.85 | 44.12 | 98.4 | 1.6 | 0 | 0 | No | 1.02 | Yes | Yes |
| 3076 | 2.9 | 1.99 | 8.56 | 37.21 | 93.2 | 6.8 | 0 | 0 | Yes | 1.05 | Yes | Yes |
| 3077 | 5.4 | 2.94 | 8.21 | 43.38 | 84.5 | 13.9 | 0 | 1.6 | No | 1.36 | No | Yes |
| 3078 | 10.6 | 2.58 | 8.33 | 13.52 | 98.1 | 1.9 | 0 | 0 | Yes | 1.11 | No | Yes |
| 3079 | 2.32 | 2.37 | 8 | 44.94 | 94.3 | 5.7 | 0 | 0 | No | 1.07 | Yes | Yes |
| 3080 | 7.8 | 2.15 | 9.22 | 45.46 | 90.8 | 9.2 | 0 | 0 | No | 1.42 | Yes | Yes |
| 3081 | 7.95 | 2.96 | 9.36 | 35.96 | 83.3 | 15.4 | 0 | 1.3 | Yes | 1.38 | No | Yes |
| 3082 | 20.59 | 2.85 | 9.45 | 42.13 | 79.84 | 18.6 | 0 | 1.56 | Yes | 1.22 | No | Yes |
| 3083 | 22.5 | 2.94 | 9.61 | 7.56 | 96.4 | 3.6 | 0 | 0 | Yes | 1.14 | Yes | Yes |
| 3084 | 4.6 | 2.11 | 9.85 | 43.69 | 94.6 | 5.4 | 0 | 0 | Yes | 1.13 | Yes | Yes |
| 3085 | 4.9 | 2.68 | 9.23 | 44.21 | 92.4 | 7.6 | 0 | 0 | Yes | 1.02 | No | Yes |
| 3086 | 10.5 | 2.99 | 9.08 | 39.51 | 75.5 | 24.5 | 0 | 0 | Yes | 1.06 | Yes | Yes |
| 3087 | 8.45 | 2.78 | 9.87 | 45.68 | 82.4 | 17.6 | 0 | 0 | Yes | 1.05 | Yes | Yes |
| 3088 | 30.5 | 2.96 | 9.46 | 65.58 | 98.6 | 1.4 | 0 | 0 | Yes | 1.24 | No | Yes |
| 3089 | 49.5 | 2.85 | 9.28 | 47.24 | 78.5 | 21.5 | 0 | 0 | Yes | 1.33 | No | Yes |
| 3090 | 5.9 | 2.64 | 9.45 | 47.76 | 89.6 | 10.4 | 0 | 0 | Yes | 1.27 | Yes | Yes |

| Invention Example No | Number of faces | Ratio of (Zn metal grains or Zn alloy grains):(Later-added Zn metal grains) Zn metal grains/Zn alloy grains | Ratio of (Zn metal grains or Zn alloy grains):(Later-added Zn metal grains) Later-added Zn Metal grains | Mg content of all metal grains (Mass %) | Coating details Ratio of fine metal grains in coat outermost surface layer 10% thickness to total fine metal grains (Mass %) | Coating details Total metal grain content of coat (Mass %) | Coating details Base resin type | Coating details Coat thickness (μm) | Coating details Coating method | Corrosion Test Results |
|---|---|---|---|---|---|---|---|---|---|---|
| 3071 | 2 | 1 | 5 | 1.867 | 55.7 | 49 | Alkyl silicate | 14 | Spray | E |
| 3072 | 2 | 1 | 198.7 | 0.047 | 64.5 | 89 | Urethane resin | 55 | Spray | E |
| 3073 | 2 | 1 | 36 | 0.500 | 68.9 | 90 | Alkyl silicate | 8 | Spray | E |
| 3074 | 2 | 1 | 1.5 | 0.012 | 64.7 | 86 | Urethane resin | 122 | Brush | E |
| 3075 | 6 | 1 | 0.008 | 1.587 | 77.9 | 48 | Alkyl silicate | 555 | Spray | E |
| 3076 | 6 | 1 | 1.4 | 2.833 | 43.7 | 47 | Alkali silicate | 19 | Spray | E |
| 3077 | 7 | 1 | 4.2 | 2.673 | 7.8 | 47 | Alkyl silicate | 25 | Brush | E |
| 3078 | 6 | 1 | 1.6 | 0.731 | 16.0 | 47 | Alkyl silicate | 58 | Spray | E |
| 3079 | 2 | 1 | 7.5 | 0.671 | 89.6 | 52 | Alkyl silicate | 685 | Spray | E |
| 3080 | 7 | 1 | 1.6 | 3.538 | 11.8 | 52 | Alkali silicate | 19 | Brush | E |
| 3081 | 2 | 1 | 2 | 5.133 | 4.6 | 52 | Urethane resin | 700 | Spray | E |
| 3082 | 6 | 1 | 270 | 0.069 | 2.5 | 88 | Alkyl silicate | 77 | Spray | E |
| 3083 | 6 | 1 | 7.5 | 0.424 | 18.9 | 87 | Alkyl silicate | 54 | Spray | E |
| 3084 | 2 | 1 | 2.9 | 1.385 | 75.9 | 89 | Alkyl silicate | 64 | Spray | E |
| 3085 | 2 | 1 | 2.6 | 2.111 | 55.9 | 90 | Alkyl silicate | 34 | Brush | E |
| 3086 | 7 | 1 | 0.1 | 22.273 | 53.8 | 91 | Alkali silicate | 28 | Spray | E |

TABLE 155-continued

| 3087 | 6 | 1 | 1.2 | 8.000 | 97.5 | 46 | Urethane resin | 109 | Brush | E |
| 3088 | 7 | 1 | 1.2 | 0.636 | 88.4 | 47 | Alkyl silicate | 15 | Spray | E |
| 3089 | 2 | 1 | 62 | 0.341 | 54.8 | 47 | Alkyl silicate | 14 | Spray | E |
| 3090 | 7 | 1 | 2.4 | 3.059 | 45.7 | 49 | Alkyl silicate | 18 | Spray | E |

TABLE 156

| Invention Example No | Average diameter of later-added Zn metal grains (μm) | Diameter distribution (peak diameter) of Zn metal grains/Zn alloy grains (μm) | | Percent of fine-grain metal grains among Zn metal grains/Zn alloy grains (Vol %) | Chemical component content of Zn metal grains/Zn alloy grains (Mass %) | | | | Alloy grain fracture surfaces or cracks present? | Average aspect ratio | Mg solid solution phase and Zn—Mg inter-metallic compounds present on grain surfaces? | Any of MgZn2, Mg2Zn11, Mg2Zn3, MgZn, Mg7Zn3 present? |
|---|---|---|---|---|---|---|---|---|---|---|---|---|
| | | Fine metal | Coarse metal | | Zn | Mg | Al | Si | | | | |
| 3091 | 4.52 | 2.35 | 9.25 | 45.02 | 87.2 | 12.8 | 0 | 0 | Yes | 1.05 | Yes | Yes |
| 3092 | 5.96 | 2.12 | 9.46 | 47.02 | 92.2 | 7.8 | 0 | 0 | Yes | 1.22 | No | Yes |
| 3093 | 5.5 | 2.34 | 9.46 | 7.66 | 70.5 | 29.5 | 0 | 0 | Yes | 1.13 | No | Yes |
| 3094 | 3.6 | 2.33 | 9.46 | 15.20 | 91.5 | 8.5 | 0 | 0 | Yes | 1.06 | Yes | Yes |
| 3095 | 16.5 | 2.23 | 9.06 | 43.16 | 74.5 | 25.5 | 0 | 0 | Yes | 1.05 | Yes | Yes |
| 3096 | 12.5 | 2.12 | 9.3 | 49.33 | 99.93 | 0.07 | 0 | 0 | Yes | 1.24 | Yes | Yes |
| 3097 | 16.5 | 2.21 | 8.68 | 19.47 | 89.2 | 10.8 | 0 | 0 | No | 1.05 | Yes | Yes |
| 3098 | 10.9 | 1.38 | 8.53 | 69.55 | 86 | 11.2 | 1.6 | 1.2 | No | 1.12 | Yes | Yes |
| 3099 | 5.6 | 1.95 | 9.32 | 51.41 | 75.23 | 24.5 | 0.27 | 0 | Yes | 1.38 | No | Yes |
| 3100 | 22.6 | 2.26 | 8.95 | 75.88 | 82.6 | 17.4 | 0 | 0 | Yes | 1.13 | No | Yes |
| 3101 | 20.59 | 2.05 | 12.54 | 48.08 | 98.7 | 1.3 | 0 | 0 | Yes | 1.33 | Yes | Yes |
| 3102 | 20.59 | 1.65 | 8.7 | 66.85 | 80.5 | 19.5 | 0 | 0 | Yes | 1.27 | Yes | Yes |
| 3103 | 9.56 | 2.35 | 8.55 | 7.68 | 88.85 | 10.8 | 0.05 | 0.3 | No | 1.23 | No | Yes |
| 3104 | 5.9 | 1.62 | 8.91 | 8.64 | 87.7 | 11.9 | 0.4 | 0 | Yes | 1.11 | Yes | Yes |
| 3105 | 6.54 | 1.88 | 9.91 | 16.58 | 90.5 | 9.5 | 0 | 0 | Yes | 1.42 | Yes | Yes |
| 3106 | 21.4 | 2.35 | 9.25 | 35.87 | 89.5 | 10.5 | 0 | 0 | Yes | 1.06 | No | Yes |
| 3107 | 9.8 | 2.57 | 9.56 | 42.04 | 84.9 | 15.1 | 0 | 0 | Yes | 1.05 | Yes | Yes |
| 3108 | 6.59 | 2.56 | 9.84 | 38.41 | 83.2 | 16.8 | 0 | 0 | Yes | 1.07 | Yes | Yes |
| 3109 | 6.54 | 2.21 | 9.75 | 6.99 | 89.4 | 10.6 | 0 | 0 | Yes | 1.42 | No | Yes |
| 3110 | 16.5 | 2.64 | 9.85 | 44.12 | 84.3 | 13.3 | 2.4 | 0 | Yes | 1.38 | Yes | Yes |

| Invention Example No | Number of faces | Ratio of (Zn metal grains or Zn alloy grains):(Later-added Zn metal grains) | | Mg content of all metal grains (Mass %) | Coating details | | | | | |
|---|---|---|---|---|---|---|---|---|---|---|
| | | Zn metal grains/Zn alloy grains | Later-added Zn Metal grains | | Ratio of fine metal grains in coat outermost surface layer 10% thickness to total fine metal grains (Mass %) | Total metal grain content of coat (Mass %) | Base resin type | Coat thickness (μm) | Coating method | Corrosion Test Results |
| 3091 | 6 | 1 | 2.1 | 4.129 | 34.7 | 50 | Alkali silicate | 2 | Spray | G |
| 3092 | 7 | 1 | 34.5 | 0.220 | 57.9 | 87 | Alkyl silicate | 37 | Spray | E |
| 3093 | 6 | 1 | 270 | 0.109 | 65.4 | 83 | Alkali silicate | 12 | Spray | E |
| 3094 | 7 | 1 | 32.5 | 0.254 | 87.9 | 48 | Alkyl silicate | 160 | Brush | E |
| 3095 | 6 | 1 | 3 | 6.375 | 2.9 | 51 | Alkali silicate | 5 | Brush | G |
| 3096 | 2 | 1 | 1.5 | 0.028 | 12.6 | 51 | Alkyl silicate | 56 | Brush | E |
| 3097 | 7 | 1 | 7.5 | 1.271 | 53.8 | 87 | Alkali silicate | 2 | Spray | G |
| 3098 | 6 | 1 | 13.5 | 0.772 | 17.8 | 85 | Alkyl silicate | 18 | Spray | E |
| 3099 | 6 | 1 | 5 | 4.083 | 34.7 | 86 | Alkyl silicate | 23 | Spray | E |

TABLE 156-continued

| | | | | | | | | | | | |
|---|---|---|---|---|---|---|---|---|---|---|---|
| 3100 | 6 | 1 | 5 | 2.900 | 76.8 | 50 | Epoxy resin | 30 | Brush | E |
| 3101 | 2 | 1 | 1 | 0.650 | 58.9 | 51 | Acrylic resin | 77 | Brush | E |
| 3102 | 6 | 1 | 120 | 0.161 | 50.8 | 51 | Urethane resin | 655 | Brush | E |
| 3103 | 7 | 1 | 3.7 | 2.298 | 46.8 | 80 | Polyester resin | 47 | Spray | E |
| 3104 | 2 | 1 | 6.1 | 1.676 | 23.7 | 46 | Epoxy resin | 43 | Spray | E |
| 3105 | 6 | 1 | 198.5 | 0.048 | 53.8 | 51 | Acrylic resin | 52 | Brush | E |
| 3106 | 2 | 1 | 2.5 | 3.000 | 53.8 | 86 | Urethane resin | 20 | Brush | E |
| 3107 | 6 | 1 | 18.5 | 0.774 | 43.7 | 85 | Polyester resin | 200 | Brush | E |
| 3108 | 7 | 1 | 8 | 1.867 | 55.9 | 82 | Alkali silicate | 22 | Spray | E |
| 3109 | 7 | 1 | 1.6 | 4.077 | 65.8 | 81 | Alkyl silicate | 25 | Spray | E |
| 3110 | 2 | 1 | 1.2 | 6.045 | 55.7 | 46 | Alkali silicate | 14 | Spray | E |

TABLE 157

| Invention Example No | Average diameter of later-added Zn metal grains (μm) | Diameter distribution (peak diameter) of Zn metal grains/Zn alloy grains (μm) | | Percent of fine-grain metal grains among Zn metal grains/Zn alloy grains (Vol %) | Chemical component content of Zn metal grains/Zn alloy grains (Mass %) | | | | Alloy grain fracture surfaces or cracks present? | Average aspect ratio | Mg solid solution phase and Zn—Mg inter-metallic compounds present on grain surfaces? | Any of MgZn2, Mg2Zn11, Mg2Zn3, MgZn, Mg7Zn3 present? |
|---|---|---|---|---|---|---|---|---|---|---|---|---|
| | | Fine metal | Coarse metal | | Zn | Mg | Al | Si | | | | |
| 3111 | 7.8 | 2.65 | 8.56 | 66.99 | 98.6 | 1.4 | 0 | 0 | No | 1.22 | Yes | Yes |
| 3112 | 16.5 | 2.94 | 8.21 | 43.38 | 76.45 | 23.5 | 0 | 0.05 | Yes | 1.14 | Yes | Yes |
| 3113 | 6.54 | 2.58 | 8.33 | 39.75 | 91.1 | 8.9 | 0 | 0 | Yes | 1.13 | Yes | Yes |
| 3114 | 8.45 | 2.37 | 8 | 65.38 | 85.1 | 14.9 | 0 | 0 | Yes | 1.02 | Yes | Yes |
| 3115 | 8.5 | 2.15 | 9.22 | 45.46 | 77.48 | 18.4 | 2.55 | 1.57 | Yes | 1.06 | Yes | Yes |
| 3116 | 13.6 | 2.96 | 9.36 | 22.55 | 97.9 | 2.1 | 0 | 0 | Yes | 1.05 | Yes | Yes |
| 3117 | 12.33 | 2.85 | 9.45 | 42.13 | 94.8 | 5.2 | 0 | 0 | Yes | 1.24 | Yes | Yes |
| 3118 | 16.5 | 2.94 | 9.61 | 38.50 | 84.6 | 15.4 | 0 | 0 | Yes | 1.33 | Yes | Yes |
| 3119 | 7.9 | 2.11 | 9.85 | 64.13 | 89.3 | 10.7 | 0 | 0 | Yes | 1.27 | Yes | Yes |
| 3120 | 10.5 | 2.68 | 9.23 | 44.21 | 83.3 | 16.7 | 0 | 0 | Yes | 1.05 | Yes | Yes |
| 3121 | 16.5 | 2.99 | 9.08 | 39.51 | 80.05 | 19.6 | 0.35 | 0 | No | 1.12 | Yes | Yes |
| 3122 | 10.64 | 1.82 | 9.87 | 78.64 | 85.5 | 14.5 | 0 | 0 | No | 1.23 | Yes | Yes |
| 3123 | 10.5 | 1.42 | 9.46 | 42.05 | 85 | 14.2 | 0 | 0.8 | No | 1.36 | Yes | Yes |
| 3124 | 20.59 | 2.12 | 9.28 | 64.58 | 87.3 | 12.7 | 0 | 0 | No | 1.11 | Yes | Yes |
| 3125 | 8.5 | 1.92 | 9.45 | 47.76 | 89.5 | 10.5 | 0 | 0 | Yes | 1.07 | Yes | Yes |
| 3126 | 0.5 | 2.11 | 9.63 | 24.10 | 87.3 | 11.8 | 0 | 0.9 | Yes | 1.42 | Yes | Yes |
| 3127 | 10.5 | 2.97 | 9.16 | 39.11 | 86.4 | 12.8 | 0.5 | 0.3 | Yes | 1.38 | Yes | Yes |
| 3128 | 11.5 | 2.36 | 10.39 | 19.65 | 93.8 | 6.2 | 0 | 0 | Yes | 1.22 | Yes | Yes |
| 3129 | 36.5 | 3.05 | 10.56 | 65.39 | 83.8 | 16.2 | 0 | 0 | Yes | 1.14 | Yes | Yes |
| 3130 | 1.5 | 2.15 | 10.74 | 48.57 | 80.4 | 19.6 | 0 | 0 | Yes | 1.13 | Yes | Yes |

| Invention Example No | Number of faces | Ratio of (Zn metal grains or Zn alloy grains):(Later-added Zn metal grains) | | Mg content of all metal grains (Mass %) | Coating details | | | | | Corrosion Test Results |
|---|---|---|---|---|---|---|---|---|---|---|
| | | Zn metal grains/Zn alloy grains | Later-added Zn Metal grains | | Ratio of fine metal grains in coat outermost surface layer 10% thickness to total fine metal grains (Mass %) | Total metal grain content of coat (Mass %) | Base resin type | Coat thickness (μm) | Coating method | |
| 3111 | 2 | 1 | 0.5 | 0.933 | 64.5 | 47 | Urethane resin | 112 | Spray | E |
| 3112 | 6 | 1 | 9 | 2.350 | 68.9 | 48 | Alkali silicate | 24 | Spray | E |

TABLE 157-continued

| | | | | | | | | | | | |
|---|---|---|---|---|---|---|---|---|---|---|---|
| 3113 | 7 | 1 | 4.5 | 1.618 | 64.7 | 51 | Urethane resin | 150 | Spray | E | |
| 3114 | 6 | 1 | 136 | 0.109 | 77.9 | 53 | Alkali silicate | 18 | Spray | E | |
| 3115 | 7 | 1 | 13 | 1.314 | 43.7 | 88 | Alkyl silicate | 19 | Brush | E | |
| 3116 | 6 | 1 | 10.6 | 0.181 | 7.8 | 85 | Alkyl silicate | 24 | Spray | E | |
| 3117 | 2 | 1 | 1.6 | 2.000 | 16.0 | 83 | Urethane resin | 99 | Spray | E | |
| 3118 | 2 | 1 | 68 | 0.223 | 89.6 | 82 | Alkyl silicate | 7 | Spray | E | |
| 3119 | 6 | 1 | 4.5 | 1.945 | 11.8 | 83 | Epoxy resin | 100 | Spray | E | |
| 3120 | 7 | 1 | 10.5 | 1.452 | 4.6 | 47 | Alkyl silicate | 27 | Brush | E | |
| 3121 | 6 | 1 | 4.9 | 3.322 | 2.5 | 51 | Alkali silicate | 15 | Spray | E | |
| 3122 | 6 | 1 | 10.5 | 1.261 | 18.9 | 52 | Alkyl silicate | 14 | Spray | E | |
| 3123 | 2 | 1 | 192 | 0.074 | 75.9 | 51 | Urethane resin | 55 | Spray | E | |
| 3124 | 7 | 1 | 0.07 | 11.869 | 55.9 | 52 | Alkyl silicate | 8 | Spray | E | |
| 3125 | 2 | 1 | 9.5 | 1.000 | 53.8 | 89 | Urethane resin | 122 | Brush | E | |
| 3126 | 2 | 1 | 2.6 | 3.278 | 97.5 | 85 | Alkyl silicate | 54 | Spray | E | |
| 3127 | 6 | 1 | 4.5 | 2.327 | 88.4 | 82 | Alkali silicate | 19 | Spray | E | |
| 3128 | 7 | 1 | 3 | 1.550 | 54.8 | 87 | Alkyl silicate | 25 | Brush | E | |
| 3129 | 7 | 1 | 7.5 | 1.906 | 45.7 | 88 | Alkyl silicate | 58 | Spray | E | |
| 3130 | 6 | 1 | 77 | 0.251 | 34.7 | 49 | Alkyl silicate | 21 | Spray | E | |

TABLE 158

| Invention Example No | Ave diameter of later-added Zn metal grains (μm) | Diameter distribution (peak diameter) of Zn metal grains/Zn alloy grains (μm) | | Percent of fine-grain metal grains among Zn metal grains/Zn alloy grains (Vol %) | Chemical component content of Zn metal grains/Zn alloy grains (Mass %) | | | | Alloy grain fracture surfaces or cracks present? | Average aspect ratio | Mg solid solution phase and Zn—Mg inter-metallic compounds present on grain surfaces? | Any of MgZn2, Mg2Zn11, Mg2Zn3, MgZn, Mg7Zn3 present? | Number of faces |
|---|---|---|---|---|---|---|---|---|---|---|---|---|---|
| | | Fine metal | Coarse metal | | Zn | Mg | Al | Si | | | | | |
| 3131 | 8.7 | 2.19 | 10.27 | 24.91 | 87.6 | 12.4 | 0 | 0 | Yes | 1.02 | Yes | Yes | 7 |
| 3132 | 7.8 | 2.48 | 11.5 | 39.92 | 89.3 | 10.7 | 0 | 0 | Yes | 1.06 | Yes | Yes | 7 |
| 3133 | 5.96 | 2.85 | 11.67 | 22.65 | 91.5 | 8.5 | 0 | 0 | Yes | 1.05 | Yes | Yes | 6 |
| 3134 | 0.06 | 2.75 | 11.85 | 66.20 | 94.9 | 5.1 | 0 | 0 | Yes | 1.24 | Yes | Yes | 7 |
| 3135 | 0.9 | 2.46 | 11.38 | 49.38 | 75.5 | 24.5 | 0 | 0 | Yes | 1.33 | Yes | Yes | 2 |
| 3136 | 3.6 | 2.71 | 12.61 | 30.58 | 86.5 | 13.5 | 0 | 0 | Yes | 1.27 | Yes | Yes | 7 |
| 3137 | 10.5 | 2.36 | 12.78 | 45.59 | 80 | 20 | 0 | 0 | Yes | 1.05 | Yes | Yes | 7 |
| 3138 | 0.05 | 2.16 | 9.57 | 28.32 | 84.5 | 15.5 | 0 | 0 | Yes | 1.12 | Yes | Yes | 2 |
| 3139 | 2.32 | 2.46 | 9.81 | 71.87 | 88 | 10.5 | 1.5 | 0 | Yes | 1.23 | Yes | Yes | 6 |
| 3140 | 20.4 | 2.49 | 8.43 | 53.05 | 92.1 | 7.9 | 0 | 0 | Yes | 1.36 | Yes | Yes | 6 |
| 3141 | 7.34 | 2.95 | 8.55 | 27.74 | 95.2 | 4.8 | 0 | 0 | Yes | 1.11 | Yes | Yes | 7 |
| 3142 | 9.4 | 2.36 | 8.22 | 42.75 | 81.6 | 18.4 | 0 | 0 | Yes | 1.07 | Yes | Yes | 7 |
| 3143 | 23.43 | 2.21 | 9.44 | 23.29 | 86.8 | 12.7 | 0 | 0.5 | Yes | 1.42 | Yes | Yes | 6 |
| 3144 | 5.96 | 2.25 | 9.58 | 61.12 | 89.7 | 10.3 | 0 | 0 | No | 1.38 | Yes | Yes | 7 |
| 3145 | 10.64 | 2.44 | 9.67 | 44.30 | 71.2 | 20.8 | 8 | 0 | Yes | 1.22 | Yes | Yes | 2 |
| 3146 | 16.5 | 2.78 | 9.83 | 23.96 | 97.5 | 2.5 | 0 | 0 | No | 1.14 | Yes | Yes | 2 |
| 3147 | 7.95 | 2.15 | 10.07 | 44.09 | 84.8 | 15.2 | 0 | 0 | Yes | 1.13 | Yes | Yes | 6 |
| 3148 | 7.95 | 2.19 | 9.45 | 24.63 | 80.8 | 19.2 | 0 | 0 | No | 1.02 | Yes | Yes | 7 |
| 3149 | 9.64 | 2.48 | 9.3 | 62.46 | 78.7 | 13.5 | 7.8 | 0 | Yes | 1.06 | Yes | Yes | 6 |
| 3150 | 0.96 | 2.59 | 9.99 | 45.64 | 88.1 | 11.9 | 0 | 0 | No | 1.05 | Yes | Yes | 2 |

TABLE 158-continued

| | Ratio of (Zn metal grains or Zn alloy grains):(Later-added Zn metal grains) | | | Coating details | | | | | |
|---|---|---|---|---|---|---|---|---|---|
| Invention Example No | Zn metal grains/ Zn alloy grains | Later-added Zn Metal grains | Mg content of all metal grains (Mass %) | Ratio of fine metal grains in coat outermost surface layer 10% thickness to total fine metal grains (Mass %) | Total metal grain content of coat (Mass %) | Base resin type | Coat thickness (μm) | Coating method | Corrosion Test Results |
| 3131 | 1 | 10.5 | 1.078 | 57.9 | 50 | Alkali silicate | 19 | Brush | E |
| 3132 | 1 | 15.5 | 0.648 | 65.4 | 51 | Urethane resin | 56 | Spray | E |
| 3133 | 1 | 5.8 | 1.250 | 87.9 | 52 | Alkyl silicate | 77 | Spray | E |
| 3134 | 1 | 1.9 | 1.759 | 2.9 | 53 | Alkyl silicate | 12 | Spray | E |
| 3135 | 1 | 16.9 | 1.369 | 12.6 | 88 | Alkyl silicate | 64 | Spray | E |
| 3136 | 1 | 1.5 | 5.400 | 53.8 | 85 | Alkyl silicate | 34 | Brush | E |
| 3137 | 1 | 0.05 | 19.048 | 17.8 | 83 | Alkali silicate | 28 | Spray | E |
| 3138 | 1 | 215 | 0.072 | 34.7 | 81 | Urethane resin | 109 | Brush | E |
| 3139 | 1 | 4.2 | 2.019 | 55.7 | 80 | Alkyl silicate | 15 | Spray | E |
| 3140 | 1 | 1.5 | 3.160 | 64.5 | 47 | Alkyl silicate | 14 | Spray | E |
| 3141 | 1 | 4.8 | 0.828 | 68.9 | 49 | Alkyl silicate | 18 | Spray | E |
| 3142 | 1 | 0.5 | 12.267 | 64.7 | 50 | Urethane resin | 122 | Brush | E |
| 3143 | 1 | 2.3 | 3.848 | 77.9 | 51 | Alkyl silicate | 54 | Spray | E |
| 3144 | 1 | 0.05 | 9.810 | 43.7 | 52 | Alkali silicate | 19 | Spray | E |
| 3145 | 1 | 120 | 0.172 | 7.8 | 83 | Alkyl silicate | 25 | Brush | E |
| 3146 | 1 | 3.7 | 0.532 | 16.0 | 88 | Alkyl silicate | 58 | Spray | E |
| 3147 | 1 | 16.5 | 0.869 | 89.6 | 85 | Alkyl silicate | 21 | Spray | E |
| 3148 | 1 | 24 | 0.768 | 11.8 | 83 | Alkali silicate | 19 | Brush | E |
| 3149 | 1 | 0.01 | 13.366 | 4.6 | 82 | Urethane resin | 56 | Spray | E |
| 3150 | 1 | 7.8 | 1.352 | 2.5 | 47 | Alkyl silicate | 77 | Spray | E |

TABLE 159

| Invention Example No | Ave diameter of later-added Zn metal grains (μm) | Diameter distribution (peak diameter) of Zn metal grains/Zn alloy grains (μm) | | Percent of fine-grain metal grains among Zn metal grains/Zn alloy grains (Vol %) | Chemical component content of Zn metal grains/Zn alloy grains (Mass %) | | | | Alloy grain fracture surfaces or cracks present? | Average aspect ratio | Mg solid solution phase and Zn—Mg inter-metallic compounds present on grain surfaces? | Any of MgZn2, Mg2Zn11, Mg2Zn3, MgZn, Mg7Zn3 present? | Number of faces |
|---|---|---|---|---|---|---|---|---|---|---|---|---|---|
| | | Fine metal | Coarse metal | | Zn | Mg | Al | Si | | | | | |
| 3151 | 5.26 | 2.47 | 9.58 | 25.30 | 88.5 | 10.6 | 0 | 0.9 | Yes | 1.24 | Yes | Yes | 2 |
| 3152 | 13.5 | 2.69 | 9.4 | 42.84 | 84.6 | 15.4 | 0 | 0 | Yes | 1.33 | Yes | Yes | 7 |
| 3153 | 13.5 | 2.57 | 9.57 | 25.44 | 97.4 | 2.6 | 0 | 0 | Yes | 1.27 | Yes | Yes | 6 |
| 3154 | 9.64 | 2.49 | 9.54 | 63.27 | 83.3 | 16.7 | 0 | 0 | Yes | 1.37 | Yes | Yes | 7 |
| 3155 | 16.5 | 2.68 | 9.58 | 46.45 | 91.9 | 8.1 | 0 | 0 | Yes | 1.10 | Yes | Yes | 7 |
| 3156 | 20.59 | 2.35 | 9.25 | 46.45 | 86.3 | 13.7 | 0 | 0 | Yes | 1.04 | Yes | Yes | 6 |
| 3157 | 0.96 | 2.48 | 10.04 | 50.91 | 81.5 | 18.5 | 0 | 0 | Yes | 1.02 | Yes | Yes | 2 |

TABLE 159-continued

| | | | | | | | | | | | | | |
|---|---|---|---|---|---|---|---|---|---|---|---|---|---|
| 3158 | 6.54 | 2.13 | 11.27 | 27.25 | 97.6 | 2.4 | 0 | 0 | Yes | 1.01 | Yes | Yes | 7 |
| 3159 | 5.26 | 1.93 | 11.44 | 42.26 | 89.1 | 10.9 | 0 | 0 | Yes | 1.08 | Yes | Yes | 2 |
| 3160 | 10.64 | 2.05 | 8.9 | 33.69 | 92.8 | 7.2 | 0 | 0 | Yes | 1.14 | Yes | Yes | 2 |
| 3161 | 9.64 | 1.42 | 8.75 | 48.70 | 81.96 | 17.5 | 0.5 | 0.04 | No | 1.23 | Yes | Yes | 7 |
| 3162 | 6.9 | 1.46 | 9.44 | 29.24 | 85.4 | 14.6 | 0 | 0 | No | 1.33 | Yes | Yes | 2 |
| 3163 | 10.5 | 1.75 | 9.03 | 67.07 | 90.6 | 9.4 | 0 | 0 | Yes | 1.37 | Yes | Yes | 7 |
| 3164 | 13.5 | 1.86 | 8.85 | 50.25 | 92.9 | 7.1 | 0 | 0 | Yes | 1.44 | Yes | Yes | 2 |
| 3165 | 20.59 | 1.74 | 8.95 | 29.91 | 77.5 | 22.5 | 0 | 0 | Yes | 1.21 | Yes | Yes | 6 |
| 3166 | 7.82 | 1.96 | 12.54 | 87.50 | 84.8 | 13.7 | 1.5 | 0 | No | 1.22 | Yes | Yes | 6 |
| 3167 | 5.26 | 1.65 | 8.7 | 30.58 | 87.1 | 12.9 | 0 | 0 | No | 1.23 | Yes | Yes | 7 |
| 3168 | 7.06 | 2.35 | 8.55 | 68.41 | 95.7 | 4.3 | 0 | 0 | Yes | 1.47 | Yes | Yes | 6 |
| 3169 | 0.64 | 1.62 | 10.72 | 54.59 | 80.2 | 17.6 | 1 | 1.2 | No | 1.01 | Yes | Yes | 2 |
| 3170 | 46.8 | 2.25 | 9.9 | 34.25 | 98.8 | 0.6 | 0.6 | 0 | Yes | 1.04 | Yes | Yes | 2 |

| | Ratio of (Zn metal grains or Zn alloy grains):(Later-added Zn metal grains) | | | Coating details | | | | |
|---|---|---|---|---|---|---|---|---|
| Invention Example No | Zn metal grains/ Zn alloy grains | Later-added Zn Metal grains | Mg content of all metal grains (Mass %) | Ratio of fine metal grains in coat outermost surface layer 10% thickness to total fine metal grains (Mass %) | Total metal grain content of coat (Mass %) | Base resin type | Coat thickness (μm) | Coating method | Corrosion Test Results |
| 3151 | 1 | 1.6 | 4.077 | 18.9 | 46 | Alkyl silicate | 54 | Spray | E |
| 3152 | 1 | 3.2 | 3.667 | 75.9 | 49 | Alkali silicate | 2 | Spray | G |
| 3153 | 1 | 5.4 | 0.406 | 55.9 | 50 | Alkali silicate | 20 | Spray | E |
| 3154 | 1 | 220 | 0.076 | 53.8 | 51 | Alkali silicate | 5 | Spray | G |
| 3155 | 1 | 2.2 | 2.531 | 97.5 | 83 | Alkyl silicate | 20 | Spray | E |
| 3156 | 1 | 2.8 | 3.605 | 88.4 | 82 | Alkali silicate | 15 | Brush | E |
| 3157 | 1 | 12 | 1.423 | 54.8 | 88 | Alkyl silicate | 57 | Brush | E |
| 3158 | 1 | 10.6 | 0.207 | 45.7 | 85 | Alkali silicate | 13 | Brush | E |
| 3159 | 1 | 35 | 0.303 | 34.7 | 86 | Alkyl silicate | 22 | Brush | E |
| 3160 | 1 | 125.5 | 0.057 | 57.9 | 47 | Alkali silicate | 20 | Spray | E |
| 3161 | 1 | 6 | 2.500 | 65.4 | 48 | Alkyl silicate | 27 | Spray | E |
| 3162 | 1 | 34 | 0.417 | 87.9 | 50 | Alkali silicate | 15 | Spray | E |
| 3163 | 1 | 1.6 | 3.615 | 2.9 | 51 | Alkyl silicate | 35 | Spray | E |
| 3164 | 1 | 7.5 | 0.835 | 12.6 | 52 | Alkali silicate | 34 | Brush | E |
| 3165 | 1 | 200 | 0.112 | 53.8 | 88 | Alkyl silicate | 45 | Brush | E |
| 3166 | 1 | 7.5 | 1.612 | 17.8 | 89 | Alkali silicate | 52 | Brush | E |
| 3167 | 1 | 3.2 | 3.071 | 34.7 | 86 | Alkyl silicate | 23 | Brush | E |
| 3168 | 1 | 2.6 | 1.194 | 76.8 | 87 | Alkali silicate | 5 | Spray | E |
| 3169 | 1 | 3 | 4.400 | 58.9 | 86 | Alkyl silicate | 52 | Brush | E |
| 3170 | 1 | 15.2 | 0.037 | 50.8 | 46 | Alkali silicate | 150 | Brush | E |

TABLE 160

| Invention Example No | Ave diameter of later-added Zn metal grains (μm) | Diameter distribution (peak diameter) of Zn metal grains/Zn alloy grains (μm) | | Percent of fine-grain metal grains among Zn metal grains/Zn alloy grains (Vol %) | Chemical component content of Zn metal grains/Zn alloy grains (Mass %) | | | | Alloy grain fracture surfaces or cracks present? | Average aspect ratio | Mg solid solution phase and Zn—Mg inter-metallic compounds present on grain surfaces? | Any of MgZn2, Mg2Zn11, Mg2Zn3, MgZn, Mg7Zn3 present? | Number of faces |
|---|---|---|---|---|---|---|---|---|---|---|---|---|---|
| | | Fine metal | Coarse metal | | Zn | Mg | Al | Si | | | | | |
| 3171 | 16.5 | 2.36 | 9.57 | 37.61 | 86.9 | 10.3 | 1.6 | 1.2 | Yes | 1.05 | Yes | Yes | 2 |
| 3172 | 13.5 | 2.24 | 10.79 | 45.60 | 92.98 | 7 | 0.02 | 0 | Yes | 1.12 | Yes | Yes | 2 |
| 3173 | 0.96 | 2.46 | 10.93 | 46.70 | 75.5 | 23.5 | 1 | 0 | Yes | 1.11 | Yes | Yes | 2 |
| 3174 | 0.96 | 1.56 | 11.02 | 41.22 | 82.5 | 17.5 | 0 | 0 | No | 1.08 | Yes | Yes | 2 |
| 3175 | 8.45 | 1.24 | 11.18 | 45.68 | 80.1 | 12.4 | 7.5 | 0 | Yes | 1.47 | Yes | Yes | 6 |
| 3176 | 2.9 | 1.68 | 11.42 | 22.02 | 85.09 | 14.9 | 0 | 0.01 | Yes | 1.50 | Yes | Yes | 6 |
| 3177 | 5.4 | 2.65 | 10.8 | 37.03 | 78.7 | 20.7 | 0 | 0.6 | No | 1.13 | Yes | Yes | 7 |
| 3178 | 10.6 | 2.22 | 10.65 | 28.46 | 91.29 | 8.6 | 0 | 0.11 | Yes | 1.26 | Yes | Yes | 6 |
| 3179 | 2.32 | 2.45 | 11.34 | 43.47 | 85.8 | 14.2 | 0 | 0 | Yes | 1.14 | Yes | Yes | 2 |
| 3180 | 7.8 | 2.23 | 11.62 | 35.19 | 98.12 | 0.08 | 0 | 1.8 | Yes | 1.49 | Yes | Yes | 7 |
| 3181 | 7.95 | 2.26 | 11.15 | 73.02 | 83.46 | 15.2 | 0 | 1.34 | No | 1.34 | Yes | Yes | 2 |
| 3182 | 20.59 | 2.72 | 12.38 | 56.20 | 73.17 | 17.4 | 9 | 0.43 | Yes | 1.18 | Yes | Yes | 6 |
| 3183 | 22.5 | 2.13 | 12.55 | 35.86 | 98.6 | 0.8 | 0.6 | 0 | Yes | 1.17 | Yes | Yes | 6 |
| 3184 | 4.6 | 1.98 | 9.34 | 93.45 | 93.55 | 6.4 | 0.05 | 0 | Yes | 1.48 | Yes | Yes | 2 |
| 3185 | 4.9 | 2.02 | 9.58 | 30.66 | 96.78 | 3.2 | 0.02 | 0 | No | 1.49 | Yes | Yes | 2 |
| 3186 | 10.5 | 2.21 | 9.88 | 74.21 | 83 | 9.2 | 7.8 | 0 | Yes | 1.27 | Yes | Yes | 7 |
| 3187 | 8.45 | 2.55 | 10 | 55.39 | 70.92 | 19.2 | 9.88 | 0 | Yes | 1.17 | Yes | Yes | 6 |
| 3188 | 30.5 | 1.92 | 10.67 | 30.08 | 80.25 | 15.1 | 4.65 | 0 | Yes | 1.16 | Yes | Yes | 7 |
| 3189 | 49.5 | 1.96 | 11.89 | 45.09 | 81.85 | 14.5 | 3.65 | 0 | Yes | 1.27 | Yes | Yes | 2 |
| 3190 | 5.9 | 2.11 | 12.03 | 41.41 | 89.45 | 10.5 | 0.05 | 0 | Yes | 1.27 | Yes | Yes | 7 |

| Invention Example No | Ratio of (Zn metal grains or Zn alloy grains):(Later-added Zn metal grains) | | Mg content of all metal grains (Mass %) | Coating details | | | | | |
|---|---|---|---|---|---|---|---|---|---|
| | Zn metal grains/Zn alloy grains | Later-added Zn Metal grains | | Ratio of fine metal grains in coat outermost surface layer 10% thickness to total fine metal grains (Mass % | Total metal grain content of coat (Mass %) | Base resin type | Coat thickness (μm) | Coating method | Corrosion Test Results |
| 3171 | 1 | 0.09 | 9.450 | 46.8 | 49 | Alkyl silicate | 60 | Brush | E |
| 3172 | 1 | 13.5 | 0.483 | 23.7 | 35 | Alkali silicate | 15 | Spray | E |
| 3173 | 1 | 135.4 | 0.172 | 53.8 | 37 | Alkyl silicate | 24 | Spray | E |
| 3174 | 1 | 3 | 4.375 | 53.8 | 36 | Alkali silicate | 34 | Spray | E |
| 3175 | 1 | 7.8 | 1.409 | 43.7 | 38 | Alkyl silicate | 20 | Brush | E |
| 3176 | 1 | 10.2 | 1.330 | 55.9 | 48 | Alkali silicate | 200 | Brush | E |
| 3177 | 1 | 7 | 2.588 | 65.8 | 46 | Alkyl silicate | 56 | Brush | E |
| 3178 | 1 | 225.2 | 0.038 | 55.7 | 51 | Alkali silicate | 34 | Spray | E |
| 3179 | 1 | 5.4 | 2.219 | 64.5 | 46 | Alkyl silicate | 2 | Spray | G |
| 3180 | 1 | 3.2 | 0.019 | 68.9 | 38 | Alkali silicate | 15 | Spray | E |
| 3181 | 1 | 13.5 | 1.048 | 64.7 | 48 | Alkali silicate | 10 | Spray | E |
| 3182 | 1 | 1.6 | 6.692 | 77.9 | 52 | Alkyl silicate | 125 | Brush | E |
| 3183 | 1 | 1.5 | 0.320 | 43.7 | 30 | Alkali silicate | 24 | Brush | E |
| 3184 | 1 | 2.5 | 1.829 | 7.8 | 76 | Alkyl silicate | 110 | Brush | E |
| 3185 | 1 | 2.6 | 0.889 | 16.0 | 72 | Alkali silicate | 24 | Brush | E |
| 3186 | 1 | 126 | 0.072 | 89.6 | 81 | Alkyl silicate | 2 | Spray | G |

TABLE 160-continued

| | | | | | | | | | |
|---|---|---|---|---|---|---|---|---|---|
| 3187 | 1 | 120 | 0.159 | 11.8 | 64 | Alkali silicate | 37 | Spray | E |
| 3188 | 1 | 7.5 | 1.776 | 4.6 | 69 | Alkyl silicate | 113 | Brush | E |
| 3189 | 1 | 6.5 | 1.933 | 2.5 | 83 | Alkali silicate | 2 | Spray | G |
| 3190 | 1 | 20 | 0.500 | 18.9 | 30 | Alkyl silicate | 75 | Brush | E |

TABLE 161

| Invention Example No | Ave diameter of later-added Zn metal grains (μm) | Diameter distribution (peak diameter) of Zn metal grains/Zn alloy grains (μm) | | Percent of fine-grain metal grains among Zn metal grains/Zn alloy grains (Vol %) | Chemical component content of Zn metal grains/Zn alloy grains (Mass %) | | | | Alloy grain fracture surfaces or cracks present? | Average aspect ratio | Mg solid solution phase and Zn—Mg inter-metallic compounds present on grain surfaces? | Any of MgZn2, Mg2Zn11, Mg2Zn3, MgZn, Mg7Zn3 present? | Number of faces |
|---|---|---|---|---|---|---|---|---|---|---|---|---|---|
| | | Fine metal | Coarse metal | | Zn | Mg | Al | Si | | | | | |
| 3191 | 4.52 | 2.97 | 12.12 | 17.75 | 87.3 | 7.5 | 5.2 | 0 | Yes | 1.49 | Yes | Yes | 6 |
| 3192 | 5.96 | 2.36 | 12.28 | 32.76 | 93.9 | 6.1 | 0 | 0.001 | Yes | 1.29 | Yes | Yes | 7 |
| 3193 | 5.5 | 3.05 | 12.52 | 30.89 | 82.55 | 16.8 | 0.05 | 0.6 | Yes | 1.23 | Yes | Yes | 6 |
| 3194 | 3.6 | 2.57 | 11.9 | 45.90 | 70.7 | 27.5 | 1 | 0.8 | Yes | 1.23 | Yes | Yes | 7 |
| 3195 | 16.5 | 2.65 | 11.75 | 42.22 | 94.6 | 2.9 | 0 | 2.5 | Yes | 1.23 | Yes | Yes | 6 |
| 3196 | 12.5 | 2.54 | 12.44 | 18.56 | 94 | 4.5 | 0 | 1.5 | No | 1.23 | Yes | Yes | 2 |
| 3197 | 16.5 | 2.85 | 12.03 | 33.57 | 99.43 | 0.07 | 0 | 0.5 | Yes | 1.27 | Yes | Yes | 7 |
| 3198 | 10.9 | 2.75 | 10.61 | 31.70 | 96.82 | 3.1 | 0.04 | 0.04 | Yes | 1.23 | Yes | Yes | 6 |
| 3199 | 5.6 | 2.46 | 11.3 | 46.71 | 76.3 | 20.5 | 1 | 2.2 | Yes | 1.36 | Yes | Yes | 6 |
| 3200 | 22.6 | 2.71 | 11.58 | 47.89 | 68.84 | 29.5 | 0.06 | 1.6 | Yes | 1.11 | Yes | Yes | 6 |
| 3201 | 20.59 | 2.36 | 11.11 | 24.23 | 92.33 | 7.6 | 0.07 | 0 | Yes | 1.02 | Yes | Yes | 2 |
| 3202 | 20.59 | 2.16 | 12.34 | 39.24 | 95.2 | 0.7 | 1.2 | 2.9 | Yes | 1.05 | Yes | Yes | 6 |
| 3203 | 9.56 | 2.46 | 12.51 | 37.37 | 91.8 | 4.6 | 1.8 | 1.8 | Yes | 1.24 | Yes | Yes | 7 |
| 3204 | 5.9 | 2.49 | 11.64 | 50.38 | 82 | 8.3 | 9.2 | 0.5 | Yes | 1.33 | Yes | Yes | 2 |
| 3205 | 6.54 | 1.63 | 9.16 | 37.14 | 88.2 | 11.8 | 0 | 0 | Yes | 1.27 | Yes | Yes | 6 |
| 3206 | 21.4 | 1.51 | 9.46 | 13.48 | 86.06 | 12.9 | 0 | 1.04 | Yes | 1.50 | Yes | Yes | 2 |
| 3207 | 9.8 | 3.05 | 9.54 | 40.05 | 99.34 | 0.6 | 0 | 0.06 | Yes | 1.13 | Yes | Yes | 6 |
| 3208 | 6.59 | 2.57 | 9.56 | 38.18 | 89.51 | 9.5 | 0 | 0.99 | No | 1.04 | Yes | Yes | 7 |
| 3209 | 6.54 | 2.65 | 9.46 | 7.63 | 88.3 | 11.7 | 0 | 0 | Yes | 1.02 | Yes | Yes | 7 |
| 3210 | 16.5 | 2.54 | 11.99 | 37.95 | 89.9 | 9.4 | 0.7 | 0 | Yes | 1.08 | Yes | Yes | 2 |

| Invention Example No | Ratio of (Zn metal grains or Zn alloy grains):(Later-added Zn metal grains) | | Coating details | | | | | |
|---|---|---|---|---|---|---|---|---|
| | Zn metal grains/Zn alloy grains | Later-added Zn Metal grains | Mg content of all metal grains (Mass %) | Ratio of fine metal grains in coat outermost surface layer 10% thickness to total fine metal grains (Mass %) | Total metal grain content of coat (Mass %) | Base resin type | Coat thickness (μm) | Coating method | Corrosion Test Results |
| 3191 | 1 | 0.007 | 7.448 | 75.9 | 83 | Alkali silicate | 30 | Brush | E |
| 3192 | 1 | 9 | 0.610 | 55.9 | 75 | Alkyl silicate | 34 | Brush | E |
| 3193 | 1 | 7.5 | 1.976 | 53.8 | 76 | Epoxy resin | 124 | Brush | E |
| 3194 | 1 | 50 | 0.539 | 97.5 | 72 | Acrylic resin | 15 | Spray | E |
| 3195 | 1 | 0.005 | 2.886 | 88.4 | 71 | Urethane resin | 23 | Spray | E |
| 3196 | 1 | 25.6 | 0.169 | 54.8 | 82 | Polyester resin | 157 | Brush | E |
| 3197 | 1 | 56.5 | 0.001 | 45.7 | 81 | Epoxy resin | 26 | Spray | E |
| 3198 | 1 | 1.6 | 1.192 | 34.7 | 83 | Acrylic resin | 38 | Spray | E |
| 3199 | 1 | 3 | 5.125 | 57.9 | 50 | Urethane resin | 160 | Brush | E |

TABLE 161-continued

| | | | | | | | | | |
|---|---|---|---|---|---|---|---|---|---|
| 3200 | 1 | 100 | 0.292 | 65.4 | 72 | Polyester resin | 27 | Brush | E |
| 3201 | 1 | 65.5 | 0.114 | 87.9 | 47 | Epoxy resin | 180 | Brush | E |
| 3202 | 1 | 1.9 | 0.241 | 2.9 | 47 | Acrylic resin | 26 | Spray | E |
| 3203 | 1 | 2.1 | 1.484 | 12.6 | 52 | Urethane resin | 180 | Brush | E |
| 3204 | 1 | 10.5 | 0.722 | 53.8 | 52 | Polyester resin | 15 | Spray | E |
| 3205 | 1 | 6.5 | 1.573 | 17.8 | 50 | Epoxy resin | 2 | Spray | G |
| 3206 | 1 | 19.5 | 0.629 | 34.7 | 46 | Acrylic resin | 28 | Spray | E |
| 3207 | 1 | 0.8 | 0.333 | 55.7 | 47 | Urethane resin | 30 | Spray | E |
| 3208 | 1 | 18.5 | 0.487 | 64.5 | 83 | Polyester resin | 2 | Spray | G |
| 3209 | 1 | 4.3 | 2.208 | 68.9 | 52 | Epoxy resin | 157 | Brush | E |
| 3210 | 1 | 3.2 | 2.238 | 64.7 | 89 | Acrylic resin | 28 | Brush | E |

TABLE 162

| Invention Example No | Ave diameter of later-added Zn metal grains (μm) | Diameter distribution (peak diameter) of Zn metal alloy grains (μm) | | Percent of fine-grain metal grains among Zn metal grains/Zn alloy grains (Vol %) | Chemical component content of Zn metal grains/Zn alloy grains (Mass %) | | | | Alloy grain fracture surfaces or cracks present? | Average aspect ratio | Mg solid solution phase and Zn—Mg inter-metallic compounds present on grain surfaces? | Any of MgZn2, Mg2Zn11, Mg2Zn3, MgZn, Mg7Zn3 present? | Number of faces |
|---|---|---|---|---|---|---|---|---|---|---|---|---|---|
| | | Fine metal | Coarse metal | | Zn | Mg | Al | Si | | | | | |
| 3211 | 7.8 | 2.85 | 12.08 | 14.29 | 87.8 | 11.7 | 0.5 | 0 | Yes | 1.15 | Yes | Yes | 2 |
| 3212 | 16.5 | 2.75 | 12.24 | 40.86 | 95.6 | 4.2 | 0.2 | 0 | Yes | 1.34 | Yes | Yes | 6 |
| 3213 | 6.54 | 2.46 | 12.48 | 97.50 | 97.13 | 2.8 | 0.07 | 0 | Yes | 1.25 | Yes | Yes | 7 |
| 3214 | 8.45 | 2.71 | 11.86 | 13.30 | 86.1 | 13.9 | 0 | 0 | Yes | 1.19 | Yes | Yes | 6 |
| 3215 | 8.5 | 2.36 | 11.71 | 43.62 | 82.6 | 14.6 | 1.6 | 1.2 | No | 1.18 | Yes | Yes | 7 |
| 3216 | 13.6 | 2.46 | 11.35 | 56.93 | 72.95 | 26.4 | 0.65 | 0 | Yes | 1.24 | Yes | Yes | 6 |
| 3217 | 12.33 | 1.45 | 12.02 | 36.59 | 83.23 | 16.5 | 0.27 | 0 | Yes | 1.11 | Yes | Yes | 2 |
| 3218 | 16.5 | 2.42 | 13.24 | 39.95 | 79.4 | 19.5 | 0.45 | 0.65 | Yes | 1.27 | Yes | Yes | 2 |
| 3219 | 7.9 | 2.11 | 9.46 | 86.50 | 97.08 | 1.6 | 0.33 | 0.99 | Yes | 1.31 | Yes | Yes | 6 |
| 3220 | 10.5 | 2.97 | 13.47 | 32.87 | 90.5 | 6 | 1 | 2.5 | Yes | 1.26 | Yes | Yes | 7 |
| 3221 | 16.5 | 2.36 | 9.46 | 16.23 | 88.93 | 8.4 | 0.87 | 1.8 | Yes | 1.14 | Yes | Yes | 6 |
| 3222 | 10.64 | 3.05 | 13.87 | 37.40 | 86.7 | 13.3 | 0 | 0 | Yes | 1.34 | Yes | Yes | 6 |
| 3223 | 10.5 | 2.57 | 13.25 | 40.76 | 81.4 | 18.6 | 0. | 0 | Yes | 1.16 | Yes | Yes | 2 |
| 3224 | 20.59 | 2.65 | 13.1 | 87.31 | 97.34 | 1.8 | 0.86 | 0 | No | 1.47 | Yes | Yes | 7 |
| 3225 | 8.5 | 2.12 | 9.08 | 92.50 | 95.25 | 4.1 | 0.65 | 0 | Yes | 1.48 | Yes | Yes | 2 |
| 3226 | 0.5 | 1.65 | 9.87 | 17.93 | 82.87 | 16.7 | 0.43 | 0 | No | 1.49 | Yes | Yes | 2 |
| 3227 | 10.5 | 2.35 | 9.46 | 44.50 | 99 | 0.4 | 0.6 | 0 | Yes | 1.34 | Yes | Yes | 6 |
| 3228 | 11.5 | 1.63 | 9.28 | 96.50 | 89.35 | 10.6 | 0.05 | 0 | Yes | 1.29 | Yes | Yes | 7 |
| 3229 | 36.5 | 2.64 | 9.45 | 16.94 | 93.08 | 6.9 | 0.02 | 0 | Yes | 1.18 | Yes | Yes | 7 |
| 3230 | 1.5 | 2.35 | 9.25 | 88.12 | 99.82 | 0.05 | 0.06 | 0.07 | Yes | 1.48 | Yes | Yes | 6 |

| Invention Example No | Ratio of (Zn metal grains or Zn alloy grains):(Later-added Zn metal grains) | | Mg content of all metal grains (Mass %) | Coating details | | | | |
|---|---|---|---|---|---|---|---|---|
| | Zn metal grains/Zn alloy grains | Later-added Zn Metal grains | | Ratio of fine metal grains in coat outermost surface layer 10% thickness to total fine metal grains (Mass %) | Total metal grain content of coat (Mass %) | Base resin type | Coat thickness (μm) | Coating method | Corrosion Test Results |
| 3211 | 1 | 1.5 | 4.680 | 77.9 | 85 | Alkyl silicate | 130 | Brush | E |
| 3212 | 1 | 4.5 | 0.764 | 43.7 | 53 | Alkyl silicate | 29 | Brush | E |

TABLE 162-continued

| | | | | | | | | | |
|---|---|---|---|---|---|---|---|---|---|
| 3213 | 1 | 15.5 | 0.170 | 7.8 | 88 | Epoxy resin | 30 | Brush | E |
| 3214 | 1 | 10.5 | 1.209 | 16.0 | 85 | Acrylic resin | 120 | Brush | E |
| 3215 | 1 | 2.5 | 4.171 | 89.6 | 52 | Urethane resin | 187 | Brush | E |
| 3216 | 1 | 9 | 2.640 | 11.8 | 83 | Polyester resin | 28 | Spray | E |
| 3217 | 1 | 10.5 | 0.156 | 4.6 | 88 | Epoxy resin | 5 | Spray | E |
| 3218 | 1 | 5.7 | 2.910 | 2.5 | 49 | Acrylic resin | 35 | Spray | E |
| 3219 | 1 | 3.9 | 0.327 | 18.9 | 50 | Urethane resin | 5 | Spray | G |
| 3220 | 1 | 4.5 | 1.091 | 75.9 | 51 | Polyester resin | 200 | Brush | E |
| 3221 | 1 | 3.6 | 1.826 | 55.9 | 83 | Alkali silicate | 25 | Spray | E |
| 3222 | 1 | 16.4 | 0.764 | 53.8 | 82 | Alkali silicate | 15 | Spray | E |
| 3223 | 1 | 6 | 2.657 | 97.5 | 88 | Alkyl silicate | 20 | Spray | E |
| 3224 | 1 | 7.5 | 0.212 | 88.4 | 85 | Alkali silicate | 18 | Spray | E |
| 3225 | 1 | 10.5 | 0.357 | 54.8 | 87 | Alkyl silicate | 22 | Spray | E |
| 3226 | 1 | 2.6 | 4.639 | 45.7 | 86 | Alkali silicate | 19 | Spray | E |
| 3227 | 1 | 1.5 | 0.160 | 34.7 | 46 | Alkyl silicate | 29 | Spray | E |
| 3228 | 1 | 13.5 | 0.731 | 57.9 | 49 | Alkali silicate | 23 | Spray | E |
| 3229 | 1 | 2.6 | 1.917 | 65.4 | 35 | Alkyl silicate | 21 | Spray | E |
| 3230 | 1 | 6.5 | 0.007 | 87.9 | 30 | Alkali silicate | 19 | Spray | E |

TABLE 163

| Invention Example No | Ave diameter of later-added Zn metal grains (μm) | Diameter distribution (peak diameter) of Zn metal grains/Zn alloy grains (μm) | | Percent of fine-grain metal grains among Zn metal grains/Zn alloy grains (Vol %) | Chemical component content of Zn metal grains/Zn alloy grains (Mass %) | | | | Alloy grain fracture surfaces or cracks present? | Average aspect ratio | Mg solid solution phase and Zn—Mg intermetallic compounds present on grain surfaces? | Any of MgZn2, Mg2Zn11, Mg2Zn3, MgZn, Mg7Zn3 present? | Number of faces |
|---|---|---|---|---|---|---|---|---|---|---|---|---|---|
| | | Fine metal | Coarse metal | | Zn | Mg | Al | Si | | | | | |
| 3231 | 8.7 | 2.31 | 9.46 | 60.57 | 91.56 | 6.4 | 1.05 | 0.99 | Yes | 1.27 | Yes | Yes | 7 |
| 3232 | 7.8 | 2.62 | 9.46 | 39.48 | 93.36 | 3.5 | 2.6 | 0.54 | Yes | 1.17 | Yes | Yes | 7 |
| 3233 | 5.96 | 2.52 | 9.46 | 15.82 | 82.13 | 17.5 | 0.05 | 0.32 | Yes | 1.27 | Yes | Yes | 6 |
| 3234 | 0.06 | 2.24 | 13.32 | 49.57 | 91.2 | 3.6 | 5.2 | 0 | No | 1.27 | Yes | Yes | 7 |
| 3235 | 0.9 | 0.05 | 6.54 | 86.52 | 94.1 | 5.9 | 0 | 0.001 | Yes | 1.48 | Yes | Yes | 2 |
| 3236 | 3.6 | 2.42 | 6.35 | 90.98 | 83.2 | 16.2 | 0 | 0.6 | No | 1.49 | Yes | Yes | 7 |
| 3237 | 10.5 | 0.11 | 7.54 | 67.32 | 76.7 | 22.5 | 0 | 0.8 | Yes | 1.34 | Yes | Yes | 7 |
| 3238 | 0.05 | 1.92 | 8.64 | 82.33 | 96.52 | 3.4 | 0.04 | 0.04 | Yes | 1.23 | Yes | Yes | 2 |
| 3239 | 2.32 | 0.46 | 6.45 | 73.76 | 68.3 | 26.5 | 3 | 2.2 | Yes | 1.23 | Yes | Yes | 6 |
| 3240 | 20.4 | 0.77 | 6.48 | 88.77 | 72.84 | 25.5 | 0.06 | 1.6 | Yes | 1.23 | Yes | Yes | 6 |
| 3241 | 8.6 | 2.35 | 9.25 | 45.02 | 87.2 | 12.8 | 0 | 0 | Yes | 1.05 | Yes | Yes | 6 |
| 3242 | 10.5 | 2.33 | 9.46 | 15.2 | 91.5 | 8.5 | 0 | 0 | Yes | 1.06 | Yes | Yes | 7 |
| 3243 | 8.7 | 1.95 | 9.32 | 51.41 | 75.23 | 24.5 | 0.27 | 0 | Yes | 1.38 | Yes | Yes | 7 |
| 3244 | 7.8 | 2.15 | 9.22 | 45.46 | 77.48 | 18.4 | 2.55 | 1.57 | Yes | 1.06 | Yes | Yes | 6 |
| 3245 | 5.96 | 2.23 | 11.62 | 35.19 | 72.62 | 0.08 | 25.5 | 1.8 | Yes | 1.49 | Yes | Yes | 7 |
| 3246 | 1.6 | 2.26 | 11.15 | 73.02 | 64.06 | 15.2 | 19.4 | 1.34 | No | 1.34 | Yes | Yes | 2 |
| 3247 | 7.2 | 1.98 | 9.34 | 93.45 | 83 | 6.4 | 10.6 | 0 | Yes | 1.48 | Yes | Yes | 7 |
| 3248 | 10.5 | 2.02 | 9.58 | 30.66 | 86.4 | 3.2 | 10.4 | 0 | No | 1.49 | Yes | Yes | 7 |
| 3249 | 3.6 | 2.36 | 12.28 | 32.76 | 80.4 | 6.1 | 13.5 | 0.001 | Yes | 1.29 | Yes | Yes | 2 |
| 3250 | 4.5 | 3.05 | 12.52 | 30.89 | 70.1 | 16.8 | 12.5 | 0.6 | Yes | 1.23 | Yes | Yes | 6 |
| 3251 | 7.9 | 2.57 | 11.9 | 45.9 | 60.9 | 27.5 | 10.8 | 0.8 | Yes | 1.23 | Yes | Yes | 6 |

TABLE 163-continued

| | Ratio of (Zn metal grains or Zn alloy grains):(Later-added Zn metal grains) | | | Coating details | | | | | |
|---|---|---|---|---|---|---|---|---|---|
| Invention Example No | Zn metal grains/ Zn alloy grains | Later-added Zn Metal grains | Mg content of all metal grains (Mass %) | Ratio of fine metal grains in coat outermost surface layer 10% thickness to total fine metal grains (Mass % | Total metal grain content of coat (Mass %) | Base resin type | Coat thickness (μm) | Coating method | Corrosion Test Results |
| 3231 | 1 | 1.6 | 2.462 | 2.9 | 76 | Alkyl silicate | 15 | Spray | E |
| 3232 | 1 | 3.8 | 0.729 | 12.6 | 72 | Alkali silicate | 18 | Spray | E |
| 3233 | 1 | 0.08 | 16.204 | 53.8 | 30 | Alkyl silicate | 22 | Spray | E |
| 3234 | 1 | 164.5 | 0.022 | 17.8 | 83 | Alkyl silicate | 21 | Spray | E |
| 3235 | 1 | 3.6 | 1.283 | 34.7 | 75 | Alkyl silicate | 29 | Spray | E |
| 3236 | 1 | 8.6 | 1.688 | 76.8 | 76 | Alkali silicate | 23 | Spray | E |
| 3237 | 1 | 12 | 1.731 | 58.9 | 72 | Alkyl silicate | 21 | Spray | E |
| 3238 | 1 | 5.8 | 0.500 | 50.8 | 83 | Alkali silicate | 19 | Spray | E |
| 3239 | 1 | 10 | 2.409 | 46.8 | 50 | Alkyl silicate | 21 | Spray | E |
| 3240 | 1 | 1 | 12.750 | 23.7 | 72 | Alkali silicate | 19 | Spray | E |
| 3241 | 1 | 10.5 | 1.113 | 87.9 | 50 | Acrylic resin | 654 | Spray | E |
| 3242 | 1 | 6.5 | 1.133 | 2.9 | 48 | Alkali silicate | 700 | Spray | E |
| 3243 | 1 | 19.5 | 1.195 | 12.6 | 75 | Alkyl silicate | 555 | Spray | E |
| 3244 | 1 | 0.8 | 10.222 | 53.8 | 55 | Alkyl silicate | 12 | Spray | E |
| 3245 | 1 | 5.3 | 0.013 | 17.8 | 38 | Alkyl silicate | 152 | Brush | E |
| 3246 | 1 | 4.3 | 2.868 | 34.7 | 48 | Urethane resin | 674 | Spray | E |
| 3247 | 1 | 3.2 | 1.524 | 76.8 | 76 | Polyester resin | 325 | Spray | E |
| 3248 | 1 | 1.5 | 1.280 | 58.9 | 72 | Alkyl silicate | 665 | Spray | E |
| 3249 | 1 | 4.5 | 1.109 | 50.8 | 75 | Alkyl silicate | 354 | Brush | E |
| 3250 | 1 | 0.8 | 9.333 | 46.8 | 76 | Alkyl silicate | 165 | Spray | E |
| 3251 | 1 | 6.5 | 3.667 | 23.7 | 72 | Urethane resin | 354 | Spray | E |

TABLE 164

| Invention Example No | Ave diameter of later-added Zn metal grains (μm) | Diameter distribution (peak diameter) of Zn metal alloy grains (μm) | | Percent of fine-grain metal grains among Zn metal grains/Zn alloy grains (Vol %) | Chemical component content of Zn metal grains/Zn alloy grains (Mass %) | | | | Alloy grain fracture surfaces or cracks present? | Average aspect ratio | Mg solid solution phase and Zn—Mg intermetallic compounds present on grain surfaces? | Any of MgZn2, Mg2Zn11, Mg2Zn3, MgZn, Mg7Zn3 present? | Number of faces |
|---|---|---|---|---|---|---|---|---|---|---|---|---|---|
| | | Fine metal | Coarse metal | | Zn | Mg | Al | Si | | | | | |
| 3252 | 16.5 | 2.35 | 9.25 | 35.87 | 88.8 | 11.2 | 0 | 0 | Yes | 1.12 | Yes | Yes | 2 |
| 3253 | 13.5 | 2.57 | 9.56 | 42.04 | 90.6 | 9.4 | 0 | 0 | No | 1.38 | Yes | Yes | 2 |
| 3254 | 0.96 | 2.56 | 9.84 | 6.55 | 81.45 | 18.5 | 0 | 0.05 | Yes | 1.22 | Yes | Yes | 2 |
| 3255 | 0.96 | 2.21 | 9.75 | 43.60 | 99.97 | 0.03 | 0 | 0 | Yes | 1.14 | Yes | Yes | 2 |
| 3256 | 8.45 | 2.64 | 9.85 | 44.12 | 98.4 | 1.6 | 0 | 0 | No | 1.02 | Yes | Yes | 6 |

TABLE 164-continued

| No | | | | | | | | | | | | | |
|---|---|---|---|---|---|---|---|---|---|---|---|---|---|
| 3257 | 2.9 | 1.99 | 8.56 | 37.21 | 93.2 | 6.8 | 0 | 0 | Yes | 1.05 | Yes | Yes | 6 |
| 3258 | 5.4 | 2.94 | 8.21 | 43.38 | 84.5 | 13.9 | 0 | 1.6 | No | 1.36 | No | Yes | 7 |
| 3259 | 10.6 | 2.58 | 8.33 | 13.52 | 98.1 | 1.9 | 0 | 0 | Yes | 1.11 | No | Yes | 6 |
| 3260 | 2.32 | 2.37 | 8 | 44.94 | 94.3 | 5.7 | 0 | 0 | No | 1.07 | Yes | Yes | 2 |
| 3261 | 7.8 | 2.15 | 9.22 | 45.46 | 90.8 | 9.2 | 0 | 0 | No | 1.42 | Yes | Yes | 7 |
| 3262 | 7.95 | 2.96 | 9.36 | 35.96 | 83.3 | 15.4 | 0 | 1.3 | Yes | 1.38 | No | Yes | 2 |
| 3263 | 20.59 | 2.85 | 9.45 | 42.13 | 79.84 | 18.6 | 0 | 1.56 | Yes | 1.22 | No | Yes | 6 |
| 3264 | 22.5 | 2.94 | 9.61 | 7.56 | 96.4 | 3.6 | 0 | 0 | Yes | 1.14 | Yes | Yes | 6 |
| 3265 | 4.6 | 2.11 | 9.85 | 43.69 | 94.6 | 5.4 | 0 | 0 | Yes | 1.13 | Yes | Yes | 2 |
| 3266 | 4.9 | 2.68 | 9.23 | 44.21 | 92.4 | 7.6 | 0 | 0 | Yes | 1.02 | No | Yes | 2 |
| 3267 | 10.5 | 2.99 | 9.08 | 39.51 | 75.5 | 24.5 | 0 | 0 | Yes | 1.06 | Yes | Yes | 7 |
| 3268 | 8.45 | 2.78 | 9.87 | 45.68 | 82.4 | 17.6 | 0 | 0 | Yes | 1.05 | Yes | Yes | 6 |
| 3269 | 30.5 | 2.96 | 9.46 | 65.58 | 98.6 | 1.4 | 0 | 0 | Yes | 1.24 | No | Yes | 7 |
| 3270 | 49.5 | 2.85 | 9.28 | 47.24 | 78.5 | 21.5 | 0 | 0 | Yes | 1.33 | No | Yes | 2 |
| 3271 | 5.9 | 2.64 | 9.45 | 47.76 | 89.6 | 10.4 | 0 | 0 | Yes | 1.27 | Yes | Yes | 7 |

| | Ratio of (Zn metal grains or Zn alloy grains):(Later-added Zn metal grains) | | Mg | Coating details | | | | | |
|---|---|---|---|---|---|---|---|---|---|
| Invention Example No | Zn metal grains/ Zn alloy grains | Later-added Zn Metal grains | content of all metal grains (Mass %) | Ratio of fine metal grains in coat outermost surface layer 10% thickness to total fine metal grains (Mass %) | Total metal grain content of coat (Mass %) | Base resin type | Coat thickness (μm) | Coating method | Corrosion Test Results |
| 3252 | 1 | 5 | 1.867 | 55.7 | 49 | Alkyl silicate | 14 | Spray | E |
| 3253 | 1 | 198.7 | 0.047 | 64.5 | 89 | Urethane resin | 55 | Spray | E |
| 3254 | 1 | 36 | 0.500 | 68.9 | 90 | Alkyl silicate | 8 | Spray | E |
| 3255 | 1 | 1.5 | 0.012 | 64.7 | 86 | Urethane resin | 122 | Brush | E |
| 3256 | 1 | 0.008 | 1.587 | 77.9 | 48 | Alkyl silicate | 555 | Spray | E |
| 3257 | 1 | 1.4 | 2.833 | 43.7 | 47 | Alkali silicate | 19 | Spray | E |
| 3258 | 1 | 4.2 | 2.673 | 7.8 | 47 | Alkyl silicate | 25 | Brush | E |
| 3259 | 1 | 1.6 | 0.731 | 16.0 | 47 | Alkyl silicate | 58 | Spray | E |
| 3260 | 1 | 7.5 | 0.671 | 89.6 | 52 | Alkyl silicate | 685 | Spray | E |
| 3261 | 1 | 1.6 | 3.538 | 11.8 | 52 | Alkali silicate | 19 | Brush | E |
| 3262 | 1 | 2 | 5.133 | 4.6 | 52 | Urethane resin | 700 | Spray | E |
| 3263 | 1 | 270 | 0.069 | 2.5 | 88 | Alkyl silicate | 77 | Spray | E |
| 3264 | 1 | 7.5 | 0.424 | 18.9 | 87 | Alkyl silicate | 54 | Spray | E |
| 3265 | 1 | 2.9 | 1.385 | 75.9 | 89 | Alkyl silicate | 64 | Spray | E |
| 3266 | 1 | 2.6 | 2.111 | 55.9 | 90 | Alkyl silicate | 34 | Brush | E |
| 3267 | 1 | 0.1 | 22.273 | 53.8 | 91 | Alkali silicate | 28 | Spray | E |
| 3268 | 1 | 1.2 | 8.000 | 97.5 | 46 | Urethane resin | 109 | Brush | E |
| 3269 | 1 | 1.2 | 0.636 | 88.4 | 47 | Alkyl silicate | 15 | Spray | E |
| 3270 | 1 | 62 | 0.341 | 54.8 | 47 | Alkyl silicate | 14 | Spray | E |
| 3271 | 1 | 2.4 | 3.059 | 45.7 | 49 | Alkyl silicate | 18 | Spray | E |

TABLE 165

| Invention Example No | Ave diameter of later-added Zn metal grains (μm) | Diameter distribution (peak diameter) of Zn metal grains/Zn alloy grains (μm) | | Percent of fine-grain metal grains among Zn metal grains/Zn alloy grains (Vol %) | Chemical component content of Zn metal grains/Zn alloy grains (Mass %) | | | | Alloy grain fracture surfaces or cracks present? | Average aspect ratio | Mg solid solution phase and Zn—Mg inter-metallic compounds present on grain surfaces? | Any of MgZn2, Mg2Zn11, Mg2Zn3, MgZn, Mg7Zn3 present? | Number of faces |
|---|---|---|---|---|---|---|---|---|---|---|---|---|---|
| | | Fine metal | Coarse metal | | Zn | Mg | Al | Si | | | | | |
| 3272 | 4.52 | 2.35 | 9.25 | 45.02 | 87.2 | 12.8 | 0 | 0 | Yes | 1.05 | Yes | Yes | 6 |
| 3273 | 5.96 | 2.12 | 9.46 | 47.02 | 92.2 | 7.8 | 0 | 0 | Yes | 1.22 | No | Yes | 7 |
| 3274 | 5.5 | 2.34 | 9.46 | 7.66 | 70.5 | 29.5 | 0 | 0 | Yes | 1.13 | No | Yes | 6 |
| 3275 | 3.6 | 2.33 | 9.46 | 15.20 | 91.5 | 8.5 | 0 | 0 | Yes | 1.06 | Yes | Yes | 7 |
| 3276 | 16.5 | 2.23 | 9.06 | 43.16 | 74.5 | 25.5 | 0 | 0 | Yes | 1.05 | Yes | Yes | 6 |
| 3277 | 12.5 | 2.12 | 9.3 | 49.33 | 99.93 | 0.07 | 0 | 0 | Yes | 1.24 | Yes | Yes | 2 |
| 3278 | 16.5 | 2.21 | 8.68 | 19.47 | 89.2 | 10.8 | 0 | 0 | No | 1.05 | Yes | Yes | 7 |
| 3279 | 10.9 | 1.38 | 8.53 | 69.55 | 86 | 11.2 | 1.6 | 1.2 | No | 1.12 | Yes | Yes | 6 |
| 3280 | 5.6 | 1.95 | 9.32 | 51.41 | 75.23 | 24.5 | 0.27 | 0 | Yes | 1.38 | No | Yes | 6 |
| 3281 | 22.6 | 2.26 | 8.95 | 75.88 | 82.6 | 17.4 | 0 | 0 | Yes | 1.13 | No | Yes | 6 |
| 3282 | 20.59 | 2.05 | 12.54 | 48.08 | 98.7 | 1.3 | 0 | 0 | Yes | 1.33 | Yes | Yes | 2 |
| 3283 | 20.59 | 1.65 | 8.7 | 66.85 | 80.5 | 19.5 | 0 | 0 | Yes | 1.27 | Yes | Yes | 6 |
| 3284 | 9.56 | 2.35 | 8.55 | 7.68 | 88.85 | 10.8 | 0.05 | 0.3 | No | 1.23 | No | Yes | 7 |
| 3285 | 5.9 | 1.62 | 8.91 | 8.64 | 87.7 | 11.9 | 0.4 | 0 | Yes | 1.11 | Yes | Yes | 2 |
| 3286 | 6.54 | 1.88 | 9.91 | 16.58 | 90.5 | 9.5 | 0 | 0 | Yes | 1.42 | Yes | Yes | 6 |
| 3287 | 21.4 | 2.35 | 9.25 | 35.87 | 89.5 | 10.5 | 0 | 0 | Yes | 1.06 | No | Yes | 2 |
| 3288 | 9.8 | 2.57 | 9.56 | 42.04 | 84.9 | 15.1 | 0 | 0 | Yes | 1.05 | Yes | Yes | 6 |
| 3289 | 6.59 | 2.56 | 9.84 | 38.41 | 83.2 | 16.8 | 0 | 0 | Yes | 1.07 | Yes | Yes | 7 |
| 3290 | 6.54 | 2.21 | 9.75 | 6.99 | 89.4 | 10.6 | 0 | 0 | Yes | 1.42 | No | Yes | 7 |
| 3291 | 16.5 | 2.64 | 9.85 | 44.12 | 84.3 | 13.3 | 2.4 | 0 | Yes | 1.38 | Yes | Yes | 2 |

| Invention Example No | Ratio of (Zn metal grains or Zn alloy grains):(Later-added Zn metal grains) | | Mg content of all metal grains (Mass %) | Ratio of fine metal grains in coat outermost surface layer 10% thickness to total fine metal grains (Mass %) | Total metal grain content of coat (Mass %) | Coating details | | | Corrosion Test Results |
|---|---|---|---|---|---|---|---|---|---|
| | Zn metal grains/Zn alloy grains | Later-added Zn Metal grains | | | | Base resin type | Coat thickness (μm) | Coating method | |
| 3272 | 1 | 2.1 | 4.129 | 34.7 | 50 | Alkali silicate | 2 | Spray | G |
| 3273 | 1 | 34.5 | 0.220 | 57.9 | 87 | Alkyl silicate | 37 | Spray | E |
| 3274 | 1 | 270 | 0.109 | 65.4 | 83 | Alkali silicate | 12 | Spray | E |
| 3275 | 1 | 32.5 | 0.254 | 87.9 | 48 | Alkyl silicate | 160 | Brush | E |
| 3276 | 1 | 3 | 6.375 | 2.9 | 51 | Alkali silicate | 5 | Brush | G |
| 3277 | 1 | 1.5 | 0.028 | 12.6 | 51 | Alkyl silicate | 56 | Brush | E |
| 3278 | 1 | 7.5 | 1.271 | 53.8 | 87 | Alkali silicate | 2 | Spray | E |
| 3279 | 1 | 13.5 | 0.772 | 17.8 | 85 | Alkyl silicate | 18 | Spray | E |
| 3280 | 1 | 5 | 4.083 | 34.7 | 86 | Alkyl silicate | 23 | Spray | E |
| 3281 | 1 | 5 | 2.900 | 76.8 | 50 | Epoxy resin | 30 | Brush | E |
| 3282 | 1 | 1 | 0.650 | 58.9 | 51 | Acrylic resin | 77 | Brush | E |
| 3283 | 1 | 120 | 0.161 | 50.8 | 51 | Urethane resin | 655 | Brush | E |
| 3284 | 1 | 3.7 | 2.298 | 46.8 | 80 | Polyester resin | 47 | Spray | E |
| 3285 | 1 | 6.1 | 1.676 | 23.7 | 46 | Epoxy resin | 43 | Spray | E |
| 3286 | 1 | 198.5 | 0.048 | 53.8 | 51 | Acrylic resin | 52 | Brush | E |
| 3287 | 1 | 2.5 | 3.000 | 53.8 | 86 | Urethane resin | 20 | Brush | E |

TABLE 165-continued

| | | | | | | | | | |
|---|---|---|---|---|---|---|---|---|---|
| 3288 | 1 | 18.5 | 0.774 | 43.7 | 85 | Polyester resin | 200 | Brush | E |
| 3289 | 1 | 8 | 1.867 | 55.9 | 82 | Alkali silicate | 22 | Spray | E |
| 3290 | 1 | 1.6 | 4.077 | 65.8 | 81 | Alkyl silicate | 25 | Spray | E |
| 3291 | 1 | 1.2 | 6.045 | 55.7 | 46 | Alkali silicate | 14 | Spray | E |

TABLE 166

| Invention Example No | Ave diameter of later-added Zn metal grains (μm) | Diameter distribution (peak diameter) of Zn metal grains/Zn alloy grains (μm) | | Percent of fine-grain metal grains among Zn metal grains/Zn alloy grains (Vol %) | Chemical component content of Zn metal grains/Zn alloy grains (Mass %) | | | | Alloy grain fracture surfaces or cracks present? | Average aspect ratio | Mg solid solution phase and Zn—Mg intermetallic compounds present on grain surfaces? | Any of MgZn2, Mg2Zn11, Mg2Zn3, MgZn, Mg7Zn3 present? | Number of faces |
|---|---|---|---|---|---|---|---|---|---|---|---|---|---|
| | | Fine metal | Coarse metal | | Zn | Mg | Al | Si | | | | | |
| 3292 | 7.8 | 2.65 | 8.56 | 66.99 | 98.6 | 1.4 | 0 | 0 | No | 1.22 | Yes | Yes | 2 |
| 3293 | 16.5 | 2.94 | 8.21 | 43.38 | 76.45 | 23.5 | 0 | 0.05 | Yes | 1.14 | Yes | Yes | 6 |
| 3294 | 6.54 | 2.58 | 8.33 | 39.75 | 91.1 | 8.9 | 0 | 0 | Yes | 1.13 | Yes | Yes | 7 |
| 3295 | 8.45 | 2.37 | 8 | 65.38 | 85.1 | 14.9 | 0 | 0 | Yes | 1.02 | Yes | Yes | 6 |
| 3296 | 8.5 | 2.15 | 9.22 | 45.46 | 77.48 | 18.4 | 2.55 | 1.57 | Yes | 1.06 | Yes | Yes | 7 |
| 3297 | 13.6 | 2.96 | 9.36 | 22.55 | 97.9 | 2.1 | 0 | 0 | Yes | 1.05 | Yes | Yes | 6 |
| 3298 | 12.33 | 2.85 | 9.45 | 42.13 | 94.8 | 5.2 | 0 | 0 | Yes | 1.24 | Yes | Yes | 2 |
| 3299 | 16.5 | 2.94 | 9.61 | 38.50 | 84.6 | 15.4 | 0 | 0 | Yes | 1.33 | Yes | Yes | 2 |
| 3300 | 7.9 | 2.11 | 9.85 | 64.13 | 89.3 | 10.7 | 0 | 0 | Yes | 1.27 | Yes | Yes | 6 |
| 3301 | 10.5 | 2.68 | 9.23 | 44.21 | 83.3 | 16.7 | 0 | 0 | Yes | 1.05 | Yes | Yes | 7 |
| 3302 | 16.5 | 2.99 | 9.08 | 39.51 | 80.05 | 19.6 | 0.35 | 0 | No | 1.12 | Yes | Yes | 6 |
| 3303 | 10.64 | 1.82 | 9.87 | 78.64 | 85.5 | 14.5 | 0 | 0 | No | 1.23 | Yes | Yes | 6 |
| 3304 | 10.5 | 1.42 | 9.46 | 42.05 | 85 | 14.2 | 0 | 0.8 | No | 1.36 | Yes | Yes | 2 |
| 3305 | 20.59 | 2.12 | 9.28 | 64.58 | 87.3 | 12.7 | 0 | 0 | No | 1.11 | Yes | Yes | 7 |
| 3306 | 8.5 | 1.92 | 9.45 | 47.76 | 89.5 | 10.5 | 0 | 0 | Yes | 1.07 | Yes | Yes | 2 |
| 3307 | 0.5 | 2.11 | 9.63 | 24.10 | 87.3 | 11.8 | 0 | 0.9 | Yes | 1.42 | Yes | Yes | 2 |
| 3308 | 10.5 | 2.97 | 9.16 | 39.11 | 86.4 | 12.8 | 0.5 | 0.3 | Yes | 1.38 | Yes | Yes | 6 |
| 3309 | 11.5 | 2.36 | 10.39 | 19.65 | 93.8 | 6.2 | 0 | 0 | Yes | 1.22 | Yes | Yes | 7 |
| 3310 | 36.5 | 3.05 | 10.56 | 65.39 | 83.8 | 16.2 | 0 | 0 | Yes | 1.14 | Yes | Yes | 7 |
| 3311 | 1.5 | 2.15 | 10.74 | 48.57 | 80.4 | 19.6 | 0 | 0 | Yes | 1.13 | Yes | Yes | 6 |

| Invention Example No | Ratio of (Zn metal grains or Zn alloy grains):(Later-added Zn metal grains) | | Mg content of all metal grains (Mass %) | Coating details | | | | | |
|---|---|---|---|---|---|---|---|---|---|
| | Zn metal grains/Zn alloy grains | Later-added Zn Metal grains | | Ratio of fine metal grains in coat outermost surface layer 10% thickness to total fine metal grains (Mass %) | Total metal grain content of coat (Mass %) | Base resin type | Coat thickness (μm) | Coating method | Corrosion Test Results |
| 3292 | 1 | 0.5 | 0.933 | 64.5 | 47 | Urethane resin | 112 | Spray | E |
| 3293 | 1 | 9 | 2.350 | 68.9 | 48 | Alkali silicate | 24 | Spray | E |
| 3294 | 1 | 4.5 | 1.618 | 64.7 | 51 | Urethane resin | 150 | Spray | E |
| 3295 | 1 | 136 | 0.109 | 77.9 | 53 | Alkali silicate | 18 | Spray | E |
| 3296 | 1 | 13 | 1.314 | 43.7 | 88 | Alkyl silicate | 19 | Brush | E |
| 3297 | 1 | 10.6 | 0.181 | 7.8 | 85 | Alkyl silicate | 24 | Spray | E |
| 3298 | 1 | 1.6 | 2.000 | 16.0 | 83 | Urethane resin | 99 | Spray | E |
| 3299 | 1 | 68 | 0.223 | 89.6 | 82 | Alkyl silicate | 7 | Spray | E |
| 3300 | 1 | 4.5 | 1.945 | 11.8 | 83 | Epoxy resin | 100 | Spray | E |

TABLE 166-continued

| | | | | | | | | | |
|---|---|---|---|---|---|---|---|---|---|
| 3301 | 1 | 10.5 | 1.452 | 4.6 | 47 | Alkyl silicate | 27 | Brush | E |
| 3302 | 1 | 4.9 | 3.322 | 2.5 | 51 | Alkali silicate | 15 | Spray | E |
| 3303 | 1 | 10.5 | 1.261 | 18.9 | 52 | Alkyl silicate | 14 | Spray | E |
| 3304 | 1 | 192 | 0.074 | 75.9 | 51 | Urethane resin | 55 | Spray | E |
| 3305 | 1 | 0.07 | 11.869 | 55.9 | 52 | Alkyl silicate | 8 | Spray | E |
| 3306 | 1 | 9.5 | 1.000 | 53.8 | 89 | Urethane resin | 122 | Brush | E |
| 3307 | 1 | 2.6 | 3.278 | 97.5 | 85 | Alkyl silicate | 54 | Spray | E |
| 3308 | 1 | 4.5 | 2.327 | 88.4 | 82 | Alkali silicate | 19 | Spray | E |
| 3309 | 1 | 3 | 1.550 | 54.8 | 87 | Alkyl silicate | 25 | Brush | E |
| 3310 | 1 | 7.5 | 1.906 | 45.7 | 88 | Alkyl silicate | 58 | Spray | E |
| 3311 | 1 | 77 | 0.251 | 34.7 | 49 | Alkyl silicate | 21 | Spray | E |

TABLE 167

| Invention Example No | Ave diameter of later-added Zn metal grains (μm) | Diameter distribution (peak diameter) of Zn metal grains/Zn alloy grains (μm) | | Percent of fine-grain metal grains among Zn metal grains/Zn alloy grains (Vol %) | Chemical component content of Zn metal grains/Zn alloy grains (Mass %) | | | | Alloy grain fracture surfaces or cracks present? | Average aspect ratio | Mg solid solution phase and Zn—Mg intermetallic compounds present on grain surfaces? | Any of MgZn2, Mg2Zn11, Mg2Zn3, MgZn, Mg7Zn3 present? | Number of faces |
|---|---|---|---|---|---|---|---|---|---|---|---|---|---|
| | | Fine metal | Coarse metal | | Zn | Mg | Al | Si | | | | | |
| 3312 | 8.7 | 2.19 | 10.27 | 24.91 | 87.6 | 12.4 | 0 | 0 | Yes | 1.02 | Yes | Yes | 7 |
| 3313 | 7.8 | 2.48 | 11.5 | 39.92 | 89.3 | 10.7 | 0 | 0 | Yes | 1.06 | Yes | Yes | 7 |
| 3314 | 5.96 | 2.85 | 11.67 | 22.65 | 91.5 | 8.5 | 0 | 0 | Yes | 1.05 | Yes | Yes | 6 |
| 3315 | 0.06 | 2.75 | 11.85 | 66.20 | 94.9 | 5.1 | 0 | 0 | Yes | 1.24 | Yes | Yes | 7 |
| 3316 | 0.9 | 2.46 | 11.38 | 49.38 | 75.5 | 24.5 | 0 | 0 | Yes | 1.33 | Yes | Yes | 2 |
| 3317 | 3.6 | 2.71 | 12.61 | 30.58 | 86.5 | 13.5 | 0 | 0 | Yes | 1.27 | Yes | Yes | 7 |
| 3318 | 10.5 | 2.36 | 12.78 | 45.59 | 80 | 20 | 0 | 0 | Yes | 1.05 | Yes | Yes | 7 |
| 3319 | 0.05 | 2.16 | 9.57 | 28.32 | 84.5 | 15.5 | 0 | 0 | Yes | 1.12 | Yes | Yes | 2 |
| 3320 | 2.32 | 2.46 | 9.81 | 71.87 | 88 | 10.5 | 1.5 | 0 | Yes | 1.23 | Yes | Yes | 6 |
| 3321 | 20.4 | 2.49 | 8.43 | 53.05 | 92.1 | 7.9 | 0 | 0 | Yes | 1.36 | Yes | Yes | 6 |
| 3322 | 7.34 | 2.95 | 8.55 | 27.74 | 95.2 | 4.8 | 0 | 0 | Yes | 1.11 | Yes | Yes | 7 |
| 3323 | 9.4 | 2.36 | 8.22 | 42.75 | 81.6 | 18.4 | 0 | 0 | Yes | 1.07 | Yes | Yes | 7 |
| 3324 | 23.43 | 2.21 | 9.44 | 23.29 | 86.8 | 12.7 | 0 | 0.5 | Yes | 1.42 | Yes | Yes | 6 |
| 3325 | 5.96 | 2.25 | 9.58 | 61.12 | 89.7 | 10.3 | 0 | 0 | No | 1.38 | Yes | Yes | 7 |
| 3326 | 10.64 | 2.44 | 9.67 | 44.30 | 71.2 | 20.8 | 8 | 0 | Yes | 1.22 | Yes | Yes | 2 |
| 3327 | 16.5 | 2.78 | 9.83 | 23.96 | 97.5 | 2.5 | 0 | 0 | No | 1.14 | Yes | Yes | 2 |
| 3328 | 7.95 | 2.15 | 10.07 | 44.09 | 84.8 | 15.2 | 0 | 0 | Yes | 1.13 | Yes | Yes | 6 |
| 3329 | 7.95 | 2.19 | 9.45 | 24.63 | 80.8 | 19.2 | 0 | 0 | No | 1.02 | Yes | Yes | 7 |
| 3330 | 9.64 | 2.48 | 9.3 | 62.46 | 78.7 | 13.5 | 7.8 | 0 | Yes | 1.06 | Yes | Yes | 6 |
| 3331 | 0.96 | 2.59 | 9.99 | 45.64 | 88.1 | 11.9 | 0 | 0 | No | 1.05 | Yes | Yes | 2 |

| Invention Example No | Ratio of (Zn metal grains or Zn alloy grains):(Later-added Zn metal grains) | | Mg content of all metal grains (Mass %) | Coating details | | | | | |
|---|---|---|---|---|---|---|---|---|---|
| | Zn metal grains/Zn alloy grains | Later-added Zn Metal grains | | Ratio of fine metal grains in coat outermost surface layer 10% thickness to total fine metal grains (Mass %) | Total metal grain content of coat (Mass %) | Base resin type | Coat thickness (μm) | Coating method | Corrosion Test Results |
| 3312 | 1 | 10.5 | 1.078 | 57.9 | 50 | Alkali silicate | 19 | Brush | E |
| 3313 | 1 | 15.5 | 0.648 | 65.4 | 51 | Urethane resin | 56 | Spray | E |

TABLE 167-continued

| | | | | | | | | | |
|---|---|---|---|---|---|---|---|---|---|
| | 3314 | 1 | 5.8 | 1.250 | 87.9 | 52 | Alkyl silicate | 77 | Spray | E |
| | 3315 | 1 | 1.9 | 1.759 | 2.9 | 53 | Alkyl silicate | 12 | Spray | E |
| | 3316 | 1 | 16.9 | 1.369 | 12.6 | 88 | Alkyl silicate | 64 | Spray | E |
| | 3317 | 1 | 1.5 | 5.400 | 53.8 | 85 | Alkyl silicate | 34 | Brush | E |
| | 3318 | 1 | 0.05 | 19.048 | 17.8 | 83 | Alkali silicate | 28 | Spray | E |
| | 3319 | 1 | 215 | 0.072 | 34.7 | 81 | Urethane resin | 109 | Brush | E |
| | 3320 | 1 | 4.2 | 2.019 | 55.7 | 80 | Alkyl silicate | 15 | Spray | E |
| | 3321 | 1 | 1.5 | 3.160 | 64.5 | 47 | Alkyl silicate | 14 | Spray | E |
| | 3322 | 1 | 4.8 | 0.828 | 68.9 | 49 | Alkyl silicate | 18 | Spray | E |
| | 3323 | 1 | 0.5 | 12.267 | 64.7 | 50 | Urethane resin | 122 | Brush | E |
| | 3324 | 1 | 2.3 | 3.848 | 77.9 | 51 | Alkyl silicate | 54 | Spray | E |
| | 3325 | 1 | 0.05 | 9.810 | 43.7 | 52 | Alkali silicate | 19 | Spray | E |
| | 3326 | 1 | 120 | 0.172 | 7.8 | 83 | Alkyl silicate | 25 | Brush | E |
| | 3327 | 1 | 3.7 | 0.532 | 16.0 | 88 | Alkyl silicate | 58 | Spray | E |
| | 3328 | 1 | 16.5 | 0.869 | 89.6 | 85 | Alkyl silicate | 21 | Spray | E |
| | 3329 | 1 | 24 | 0.768 | 11.8 | 83 | Alkali silicate | 19 | Brush | E |
| | 3330 | 1 | 0.01 | 13.366 | 4.6 | 82 | Urethane resin | 56 | Spray | E |
| | 3331 | 1 | 7.8 | 1.352 | 2.5 | 47 | Alkyl silicate | 77 | Spray | E |

TABLE 168

| Invention Example No | Ave diameter of later-added Zn metal grains (μm) | Diameter distribution (peak diameter) of Zn metal grains/Zn alloy grains (μm) Fine metal | Diameter distribution (peak diameter) of Zn metal grains/Zn alloy grains (μm) Coarse metal | Percent of fine-grain metal grains among Zn metal grains/Zn alloy grains (Vol %) | Chemical component content of Zn metal grains/Zn alloy grains (Mass %) Zn | Chemical component content of Zn metal grains/Zn alloy grains (Mass %) Mg | Chemical component content of Zn metal grains/Zn alloy grains (Mass %) Al | Chemical component content of Zn metal grains/Zn alloy grains (Mass %) Si | Alloy grain fracture surfaces or cracks present? | Average aspect ratio | Mg solid solution phase and Zn—Mg inter-metallic compounds present on grain surfaces? | Any of MgZn2, Mg2Zn11, Mg2Zn3, MgZn, Mg7Zn3 present? | Number of faces |
|---|---|---|---|---|---|---|---|---|---|---|---|---|---|
| 3332 | 5.26 | 2.47 | 9.58 | 25.30 | 88.5 | 10.6 | 0 | 0.9 | Yes | 1.24 | Yes | Yes | 2 |
| 3333 | 13.5 | 2.69 | 9.4 | 42.84 | 84.6 | 15.4 | 0 | 0 | Yes | 1.33 | Yes | Yes | 7 |
| 3334 | 13.5 | 2.57 | 9.57 | 25.44 | 97.4 | 2.6 | 0 | 0 | Yes | 1.27 | Yes | Yes | 6 |
| 3335 | 9.64 | 2.49 | 9.54 | 63.27 | 83.3 | 16.7 | 0 | 0 | Yes | 1.37 | Yes | Yes | 7 |
| 3336 | 16.5 | 2.68 | 9.58 | 46.45 | 91.9 | 8.1 | 0 | 0 | Yes | 1.10 | Yes | Yes | 7 |
| 3337 | 20.59 | 2.35 | 9.25 | 46.45 | 86.3 | 13.7 | 0 | 0 | Yes | 1.04 | Yes | Yes | 6 |
| 3338 | 0.96 | 2.48 | 10.04 | 50.91 | 81.5 | 18.5 | 0 | 0 | Yes | 1.02 | Yes | Yes | 2 |
| 3339 | 6.54 | 2.13 | 11.27 | 27.25 | 97.6 | 2.4 | 0 | 0 | Yes | 1.01 | Yes | Yes | 7 |
| 3340 | 5.26 | 1.93 | 11.44 | 42.26 | 89.1 | 10.9 | 0 | 0 | Yes | 1.08 | Yes | Yes | 2 |
| 3341 | 10.64 | 2.05 | 8.9 | 33.69 | 92.8 | 7.2 | 0 | 0 | Yes | 1.14 | Yes | Yes | 2 |
| 3342 | 9.64 | 1.42 | 8.75 | 48.70 | 81.96 | 17.5 | 0.5 | 0.04 | No | 1.23 | Yes | Yes | 7 |
| 3343 | 6.9 | 1.46 | 9.44 | 29.24 | 85.4 | 14.6 | 0 | 0 | No | 1.33 | Yes | Yes | 2 |
| 3344 | 10.5 | 1.75 | 9.03 | 67.07 | 90.6 | 9.4 | 0 | 0 | Yes | 1.37 | Yes | Yes | 7 |
| 3345 | 13.5 | 1.86 | 8.85 | 50.25 | 92.9 | 7.1 | 0 | 0 | Yes | 1.44 | Yes | Yes | 2 |
| 3346 | 20.59 | 1.74 | 8.95 | 29.91 | 77.5 | 22.5 | 0 | 0 | Yes | 1.21 | Yes | Yes | 6 |
| 3347 | 7.82 | 1.96 | 12.54 | 87.50 | 84.8 | 13.7 | 1.5 | 0 | No | 1.22 | Yes | Yes | 6 |
| 3348 | 5.26 | 1.65 | 8.7 | 30.58 | 87.1 | 12.9 | 0 | 0 | No | 1.23 | Yes | Yes | 7 |
| 3349 | 7.06 | 2.35 | 8.55 | 68.41 | 95.7 | 4.3 | 0 | 0 | Yes | 1.47 | Yes | Yes | 6 |
| 3350 | 0.64 | 1.62 | 10.72 | 54.59 | 80.2 | 17.6 | 1 | 1.2 | No | 1.01 | Yes | Yes | 2 |
| 3351 | 46.8 | 2.25 | 9.9 | 34.25 | 98.8 | 0.6 | 0.6 | 0 | Yes | 1.04 | Yes | Yes | 2 |

TABLE 168-continued

| | Ratio of (Zn metal grains or Zn alloy grains):(Later-added Zn metal grains) | | Coating details | | | | | | |
|---|---|---|---|---|---|---|---|---|---|
| Invention Example No | Zn metal grains/ Zn alloy grains | Later-added Zn Metal grains | Mg content of all metal grains (Mass %) | Ratio of fine metal grains in coat outermost surface layer 10% thickness to total fine metal grains (Mass %) | Total metal grain content of coat (Mass %) | Base resin type | Coat thickness (μm) | Coating method | Corrosion Test Results |
| 3332 | 1 | 1.6 | 4.077 | 18.9 | 46 | Alkyl silicate | 54 | Spray | E |
| 3333 | 1 | 3.2 | 3.667 | 75.9 | 49 | Alkali silicate | 2 | Spray | G |
| 3334 | 1 | 5.4 | 0.406 | 55.9 | 50 | Alkali silicate | 20 | Spray | E |
| 3335 | 1 | 220 | 0.076 | 53.8 | 51 | Alkali silicate | 5 | Spray | G |
| 3336 | 1 | 2.2 | 2.531 | 97.5 | 83 | Alkyl silicate | 20 | Spray | E |
| 3337 | 1 | 2.8 | 3.605 | 88.4 | 82 | Alkali silicate | 15 | Brush | E |
| 3338 | 1 | 12 | 1.423 | 54.8 | 88 | Alkyl silicate | 57 | Brush | E |
| 3339 | 1 | 10.6 | 0.207 | 45.7 | 85 | Alkali silicate | 13 | Brush | E |
| 3340 | 1 | 35 | 0.303 | 34.7 | 86 | Alkyl silicate | 22 | Brush | E |
| 3341 | 1 | 125.5 | 0.057 | 57.9 | 47 | Alkali silicate | 20 | Spray | E |
| 3342 | 1 | 6 | 2.500 | 65.4 | 48 | Alkyl silicate | 27 | Spray | E |
| 3343 | 1 | 34 | 0.417 | 87.9 | 50 | Alkali silicate | 15 | Spray | E |
| 3344 | 1 | 1.6 | 3.615 | 2.9 | 51 | Alkyl silicate | 35 | Spray | E |
| 3345 | 1 | 7.5 | 0.835 | 12.6 | 52 | Alkali silicate | 34 | Brush | E |
| 3346 | 1 | 200 | 0.112 | 53.8 | 88 | Alkyl silicate | 45 | Brush | E |
| 3347 | 1 | 7.5 | 1.612 | 17.8 | 89 | Alkali silicate | 52 | Brush | E |
| 3348 | 1 | 3.2 | 3.071 | 34.7 | 86 | Alkyl silicate | 23 | Brush | E |
| 3349 | 1 | 2.6 | 1.194 | 76.8 | 87 | Alkali silicate | 5 | Spray | E |
| 3350 | 1 | 3 | 4.400 | 58.9 | 86 | Alkyl silicate | 52 | Brush | E |
| 3351 | 1 | 15.2 | 0.037 | 50.8 | 46 | Alkali silicate | 150 | Brush | E |

TABLE 169

| Invention Example No | Ave diameter of later-added Zn metal grains (μm) | Diameter distribution (peak diameter) of Zn metal grains/Zn alloy grains (μm) | | Percent of fine-grain metal grains among Zn metal grains/Zn alloy grains (Vol %) | Chemical component content of Zn metal grains/Zn alloy grains (Mass %) | | | | Alloy grain fracture surfaces or cracks present? | Average aspect ratio | Mg solid solution phase and Zn—Mg inter-metallic compounds present on grain surfaces? | Any of MgZn2, Mg2Zn11, Mg2Zn3, MgZn, Mg7Zn3 present? | Number of faces |
|---|---|---|---|---|---|---|---|---|---|---|---|---|---|
| | | Fine metal | Coarse metal | | Zn | Mg | Al | Si | | | | | |
| 3352 | 16.5 | 2.36 | 9.57 | 37.61 | 86.9 | 10.3 | 1.6 | 1.2 | Yes | 1.05 | Yes | Yes | 2 |
| 3353 | 13.5 | 2.24 | 10.79 | 45.60 | 92.98 | 7 | 0.02 | 0 | Yes | 1.12 | Yes | Yes | 2 |
| 3354 | 0.96 | 2.46 | 10.93 | 46.70 | 75.5 | 23.5 | 1 | 0 | Yes | 1.11 | Yes | Yes | 2 |
| 3355 | 0.96 | 1.56 | 11.02 | 41.22 | 82.5 | 17.5 | 0 | 0 | No | 1.08 | Yes | Yes | 2 |
| 3356 | 8.45 | 1.24 | 11.18 | 45.68 | 80.1 | 12.4 | 7.5 | 0 | Yes | 1.47 | Yes | Yes | 6 |
| 3357 | 2.9 | 1.68 | 11.42 | 22.02 | 85.09 | 14.9 | 0 | 0.01 | Yes | 1.50 | Yes | Yes | 6 |
| 3358 | 5.4 | 2.65 | 10.8 | 37.03 | 78.7 | 20.7 | 0 | 0.6 | No | 1.13 | Yes | Yes | 7 |

TABLE 169-continued

| | | | | | | | | | | | | |
|---|---|---|---|---|---|---|---|---|---|---|---|---|
| 3359 | 10.6 | 2.22 | 10.65 | 28.46 | 91.29 | 8.6 | 0 | 0.11 | Yes | 1.26 | Yes | Yes | 6 |
| 3360 | 2.32 | 2.45 | 11.34 | 43.47 | 85.8 | 14.2 | 0 | 0 | Yes | 1.14 | Yes | Yes | 2 |
| 3361 | 7.8 | 2.23 | 11.62 | 35.19 | 98.12 | 0.08 | 0 | 1.8 | Yes | 1.49 | Yes | Yes | 7 |
| 3362 | 7.95 | 2.26 | 11.15 | 73.02 | 83.46 | 15.2 | 0 | 1.34 | No | 1.34 | Yes | Yes | 2 |
| 3363 | 20.59 | 2.72 | 12.38 | 56.20 | 73.17 | 17.4 | 9 | 0.43 | Yes | 1.18 | Yes | Yes | 6 |
| 3364 | 22.5 | 2.13 | 12.55 | 35.86 | 98.6 | 0.8 | 0.6 | 0 | Yes | 1.17 | Yes | Yes | 6 |
| 3365 | 4.6 | 1.98 | 9.34 | 93.45 | 93.55 | 6.4 | 0.05 | 0 | Yes | 1.48 | Yes | Yes | 2 |
| 3366 | 4.9 | 2.02 | 9.58 | 30.66 | 96.78 | 3.2 | 0.02 | 0 | No | 1.49 | Yes | Yes | 2 |
| 3367 | 10.5 | 2.21 | 9.88 | 74.21 | 83 | 9.2 | 7.8 | 0 | Yes | 1.27 | Yes | Yes | 7 |
| 3368 | 8.45 | 2.55 | 10 | 55.39 | 70.92 | 19.2 | 9.88 | 0 | Yes | 1.17 | Yes | Yes | 6 |
| 3369 | 30.5 | 1.92 | 10.67 | 30.08 | 80.25 | 15.1 | 4.65 | 0 | Yes | 1.16 | Yes | Yes | 7 |
| 3370 | 49.5 | 1.96 | 11.89 | 45.09 | 81.85 | 14.5 | 3.65 | 0 | Yes | 1.27 | Yes | Yes | 2 |
| 3371 | 5.9 | 2.11 | 12.03 | 41.41 | 89.45 | 10.5 | 0.05 | 0 | Yes | 1.27 | Yes | Yes | 7 |

| | Ratio of (Zn metal grains or Zn alloy grains):(Later-added Zn metal grains) | | | Coating details | | | | | |
|---|---|---|---|---|---|---|---|---|---|
| Invention Example No | Zn metal grains/ Zn alloy grains | Later-added Zn Metal grains | Mg content of all metal grains (Mass %) | Ratio of fine metal grains in coat outermost surface layer 10% thickness to total fine metal grains (Mass %) | Total metal grain content of coat (Mass %) | Base resin type | Coat thickness (μm) | Coating method | Corrosion Test Results |
| 3352 | 1 | 0.09 | 9.450 | 46.8 | 49 | Alkyl silicate | 60 | Brush | E |
| 3353 | 1 | 13.5 | 0.483 | 23.7 | 35 | Alkali silicate | 15 | Spray | E |
| 3354 | 1 | 135.4 | 0.172 | 53.8 | 37 | Alkyl silicate | 24 | Spray | E |
| 3355 | 1 | 3 | 4.375 | 53.8 | 36 | Alkali silicate | 34 | Spray | E |
| 3356 | 1 | 7.8 | 1.409 | 43.7 | 38 | Alkyl silicate | 20 | Brush | E |
| 3357 | 1 | 10.2 | 1.330 | 55.9 | 48 | Alkali silicate | 200 | Brush | E |
| 3358 | 1 | 7 | 2.588 | 65.8 | 46 | Alkyl silicate | 56 | Brush | E |
| 3359 | 1 | 225.2 | 0.038 | 55.7 | 51 | Alkali silicate | 34 | Spray | E |
| 3360 | 1 | 5.4 | 2.219 | 64.5 | 46 | Alkyl silicate | 2 | Spray | G |
| 3361 | 1 | 3.2 | 0.019 | 68.9 | 38 | Alkali silicate | 15 | Spray | E |
| 3362 | 1 | 13.5 | 1.048 | 64.7 | 48 | Alkali silicate | 10 | Spray | E |
| 3363 | 1 | 1.6 | 6.692 | 77.9 | 52 | Alkyl silicate | 125 | Brush | E |
| 3364 | 1 | 1.5 | 0.320 | 43.7 | 30 | Alkali silicate | 24 | Brush | E |
| 3365 | 1 | 2.5 | 1.829 | 7.8 | 76 | Alkyl silicate | 110 | Brush | E |
| 3366 | 1 | 2.6 | 0.889 | 16.0 | 72 | Alkali silicate | 24 | Brush | E |
| 3367 | 1 | 126 | 0.072 | 89.6 | 81 | Alkyl silicate | 2 | Spray | G |
| 3368 | 1 | 120 | 0.159 | 11.8 | 64 | Alkali silicate | 37 | Spray | E |
| 3369 | 1 | 7.5 | 1.776 | 4.6 | 69 | Alkyl silicate | 113 | Brush | E |
| 3370 | 1 | 6.5 | 1.933 | 2.5 | 83 | Alkali silicate | 2 | Spray | G |
| 3371 | 1 | 2.0 | 0.500 | 18.9 | 30 | Alkyl silicate | 75 | Brush | E |

TABLE 170

| Invention Example No | Ave diameter of later-added Zn metal grains (μm) | Diameter distribution (peak diameter) of Zn metal grains/Zn alloy grains (μm) | | Percent of fine-grain metal grains among Zn metal grains/Zn alloy grains (Vol %) | Chemical component content of Zn metal grains/Zn alloy grains (Mass %) | | | | Alloy grain fracture surfaces or cracks present? | Average aspect ratio | Mg solid solution phase and Zn—Mg inter-metallic compounds present on grain surfaces? | Any of MgZn2, Mg2Zn11, Mg2Zn3, MgZn, Mg7Zn3 present? | Number of faces |
|---|---|---|---|---|---|---|---|---|---|---|---|---|---|
| | | Fine metal | Coarse metal | | Zn | Mg | Al | Si | | | | | |
| 3372 | 4.52 | 2.97 | 12.12 | 17.75 | 87.3 | 7.5 | 5.2 | 0 | Yes | 1.49 | Yes | Yes | 6 |
| 3373 | 5.96 | 2.36 | 12.28 | 32.76 | 93.9 | 6.1 | 0 | 0.001 | Yes | 1.29 | Yes | Yes | 7 |
| 3374 | 5.5 | 3.05 | 12.52 | 30.89 | 82.55 | 16.8 | 0.05 | 0.6 | Yes | 1.23 | Yes | Yes | 6 |
| 3375 | 3.6 | 2.57 | 11.9 | 45.90 | 70.7 | 27.5 | 1 | 0.8 | Yes | 1.23 | Yes | Yes | 7 |
| 3376 | 16.5 | 2.65 | 11.75 | 42.22 | 94.6 | 2.9 | 0 | 2.5 | Yes | 1.23 | Yes | Yes | 6 |
| 3377 | 12.5 | 2.54 | 12.44 | 18.56 | 94 | 4.5 | 0 | 1.5 | No | 1.23 | Yes | Yes | 2 |
| 3378 | 16.5 | 2.85 | 12.03 | 33.57 | 99.43 | 0.07 | 0 | 0.5 | Yes | 1.27 | Yes | Yes | 7 |
| 3379 | 10.9 | 2.75 | 10.61 | 31.70 | 96.82 | 3.1 | 0.04 | 0.04 | Yes | 1.23 | Yes | Yes | 6 |
| 3380 | 5.6 | 2.46 | 11.3 | 46.71 | 76.3 | 20.5 | 1 | 2.2 | Yes | 1.36 | Yes | Yes | 6 |
| 3381 | 22.6 | 2.71 | 11.58 | 47.89 | 68.84 | 29.5 | 0.06 | 1.6 | Yes | 1.11 | Yes | Yes | 6 |
| 3382 | 20.59 | 2.36 | 11.11 | 24.23 | 92.33 | 7.6 | 0.07 | 0 | Yes | 1.02 | Yes | Yes | 2 |
| 3383 | 20.59 | 2.16 | 12.34 | 39.24 | 95.2 | 0.7 | 1.2 | 2.9 | Yes | 1.05 | Yes | Yes | 6 |
| 3384 | 9.56 | 2.46 | 12.51 | 37.37 | 91.8 | 4.6 | 1.8 | 1.8 | Yes | 1.24 | Yes | Yes | 7 |
| 3385 | 5.9 | 2.49 | 11.64 | 50.38 | 82 | 8.3 | 9.2 | 0.5 | Yes | 1.33 | Yes | Yes | 2 |
| 3386 | 6.54 | 1.63 | 9.16 | 37.14 | 88.2 | 11.8 | 0 | 0 | Yes | 1.27 | Yes | Yes | 6 |
| 3387 | 21.4 | 1.51 | 9.46 | 13.48 | 86.06 | 12.9 | 0 | 1.04 | Yes | 1.50 | Yes | Yes | 2 |
| 3388 | 9.8 | 3.05 | 9.54 | 40.05 | 99.34 | 0.6 | 0 | 0.06 | Yes | 1.13 | Yes | Yes | 6 |
| 3389 | 6.59 | 2.57 | 9.56 | 38.18 | 89.51 | 9.5 | 0 | 0.99 | No | 1.04 | Yes | Yes | 7 |
| 3390 | 6.54 | 2.65 | 9.46 | 7.63 | 88.3 | 11.7 | 0 | 0 | Yes | 1.02 | Yes | Yes | 7 |
| 3391 | 16.5 | 2.54 | 11.99 | 37.95 | 89.9 | 9.4 | 0.7 | 0 | Yes | 1.08 | Yes | Yes | 2 |

| Invention Example No | Ratio of (Zn metal grains or Zn alloy grains):(Later-added Zn metal grains) | | Mg content of all metal grains (Mass %) | Coating details | | | | | |
|---|---|---|---|---|---|---|---|---|---|
| | Zn metal grains/ Zn alloy grains | Later-added Zn Metal grains | | Ratio of fine metal grains in coat outermost surface layer 10% thickness to total fine metal grains (Mass %) | Total metal grain content of coat (Mass %) | Base resin type | Coat thickness (μm) | Coating method | Corrosion Test Results |
| 3372 | 1 | 0.007 | 7.448 | 75.9 | 83 | Alkali silicate | 30 | Brush | E |
| 3373 | 1 | 9 | 0.610 | 55.9 | 75 | Alkyl silicate | 34 | Brush | E |
| 3374 | 1 | 7.5 | 1.976 | 53.8 | 76 | Epoxy resin | 124 | Brush | E |
| 3375 | 1 | 50 | 0.539 | 97.5 | 72 | Acrylic resin | 15 | Spray | E |
| 3376 | 1 | 0.005 | 2.886 | 88.4 | 71 | Urethane resin | 23 | Spray | E |
| 3377 | 1 | 25.6 | 0.169 | 54.8 | 82 | Polyester resin | 157 | Brush | E |
| 3378 | 1 | 56.5 | 0.001 | 45.7 | 81 | Epoxy resin | 26 | Spray | E |
| 3379 | 1 | 1.6 | 1.192 | 34.7 | 83 | Acrylic resin | 38 | Spray | E |
| 3380 | 1 | 3 | 5.125 | 57.9 | 50 | Urethane resin | 160 | Brush | E |
| 3381 | 1 | 100 | 0.292 | 65.4 | 72 | Polyester resin | 27 | Brush | E |
| 3382 | 1 | 65.5 | 0.114 | 87.9 | 47 | Epoxy resin | 180 | Brush | E |
| 3383 | 1 | 1.9 | 0.241 | 2.9 | 47 | Acrylic resin | 26 | Spray | E |
| 3384 | 1 | 2.1 | 1.484 | 12.6 | 52 | Urethane resin | 180 | Brush | E |
| 3385 | 1 | 10.5 | 0.722 | 53.8 | 52 | Polyester resin | 15 | Spray | E |
| 3386 | 1 | 6.5 | 1.573 | 17.8 | 50 | Epoxy resin | 2 | Spray | G |
| 3387 | 1 | 19.5 | 0.629 | 34.7 | 46 | Acrylic resin | 28 | Spray | E |

TABLE 170-continued

| | | | | | | | | | |
|---|---|---|---|---|---|---|---|---|---|
| 3388 | 1 | 0.8 | 0.333 | 55.7 | 47 | Urethane resin | 30 | Spray | E |
| 3389 | 1 | 18.5 | 0.487 | 64.5 | 83 | Polyester resin | 2 | Spray | G |
| 3390 | 1 | 4.3 | 2.208 | 68.9 | 52 | Epoxy resin | 157 | Brush | E |
| 3391 | 1 | 3.2 | 2.238 | 64.7 | 89 | Acrylic resin | 28 | Brush | E |

TABLE 171

| Invention Example No | Ave diameter of later-added Zn metal grains (μm) | Diameter distribution (peak diameter) of Zn metal grains/Zn alloy grains (μm) | | Percent of fine-grain metal grains among Zn metal grains/Zn alloy grains (Vol %) | Chemical component content of Zn metal grains/Zn alloy grains (Mass %) | | | | Alloy grain fracture surfaces or cracks present? | Average aspect ratio | Mg solid solution phase and Zn—Mg inter-metallic compounds present on grain surfaces? | Any of MgZn2, Mg2Zn11, Mg2Zn3, MgZn, Mg7Zn3 present? | Number of faces |
|---|---|---|---|---|---|---|---|---|---|---|---|---|---|
| | | Fine metal | Coarse metal | | Zn | Mg | Al | Si | | | | | |
| 3392 | 7.8 | 2.85 | 12.08 | 14.29 | 87.8 | 11.7 | 0.5 | 0 | Yes | 1.15 | Yes | Yes | 2 |
| 3393 | 16.5 | 2.75 | 12.24 | 40.86 | 95.6 | 4.2 | 0.2 | 0 | Yes | 1.34 | Yes | Yes | 6 |
| 3394 | 6.54 | 2.46 | 12.48 | 97.50 | 97.13 | 2.8 | 0.07 | 0 | Yes | 1.25 | Yes | Yes | 7 |
| 3395 | 8.45 | 2.71 | 11.86 | 13.30 | 86.1 | 13.9 | 0 | 0 | Yes | 1.19 | Yes | Yes | 6 |
| 3396 | 8.5 | 2.36 | 11.71 | 43.62 | 82.6 | 14.6 | 1.6 | 1.2 | No | 1.18 | Yes | Yes | 7 |
| 3397 | 13.6 | 2.46 | 11.35 | 56.93 | 72.95 | 26.4 | 0.65 | 0 | Yes | 1.24 | Yes | Yes | 6 |
| 3398 | 12.33 | 1.45 | 12.02 | 36.59 | 83.23 | 16.5 | 0.27 | 0 | Yes | 1.11 | Yes | Yes | 2 |
| 3399 | 16.5 | 2.42 | 13.24 | 39.95 | 79.4 | 19.5 | 0.45 | 0.65 | Yes | 1.27 | Yes | Yes | 2 |
| 3400 | 7.9 | 2.11 | 9.46 | 86.50 | 97.08 | 1.6 | 0.33 | 0.99 | Yes | 1.31 | Yes | Yes | 6 |
| 3401 | 10.5 | 2.97 | 13.47 | 32.87 | 90.5 | 6 | 1 | 2.5 | Yes | 1.26 | Yes | Yes | 7 |
| 3402 | 16.5 | 2.36 | 9.46 | 16.23 | 88.93 | 8.4 | 0.87 | 1.8 | Yes | 1.14 | Yes | Yes | 6 |
| 3403 | 10.64 | 3.05 | 13.87 | 37.40 | 86.7 | 13.3 | 0 | 0 | Yes | 1.34 | Yes | Yes | 6 |
| 3404 | 10.5 | 2.57 | 13.25 | 40.76 | 81.4 | 18.6 | 0. | 0 | Yes | 1.16 | Yes | Yes | 2 |
| 3405 | 20.59 | 2.65 | 13.1 | 87.31 | 97.34 | 1.8 | 0.86 | 0 | No | 1.47 | Yes | Yes | 7 |
| 3406 | 8.5 | 2.12 | 9.08 | 92.50 | 95.25 | 4.1 | 0.65 | 0 | Yes | 1.48 | Yes | Yes | 2 |
| 3407 | 0.5 | 1.65 | 9.87 | 17.93 | 82.87 | 16.7 | 0.43 | 0 | No | 1.49 | Yes | Yes | 2 |
| 3408 | 10.5 | 2.35 | 9.46 | 44.50 | 99 | 0.4 | 0.6 | 0 | Yes | 1.34 | Yes | Yes | 6 |
| 3409 | 11.5 | 1.63 | 9.28 | 96.50 | 89.35 | 10.6 | 0.05 | 0 | Yes | 1.29 | Yes | Yes | 7 |
| 3410 | 36.5 | 2.64 | 9.45 | 16.94 | 93.08 | 6.9 | 0.02 | 0 | Yes | 1.18 | Yes | Yes | 7 |
| 3411 | 1.5 | 2.35 | 9.25 | 88.12 | 99.82 | 0.05 | 0.06 | 0.07 | Yes | 1.48 | Yes | Yes | 6 |

| Invention Example No | Ratio of (Zn metal grains or Zn alloy grains):(Later-added Zn metal grains) | | Coating details | | | | | | |
|---|---|---|---|---|---|---|---|---|---|
| | Zn metal grains/ Zn alloy grains | Later-added Zn Metal grains | Mg content of all metal grains (Mass %) | Ratio of fine metal grains in coat outermost surface layer 10% thickness to total fine metal grains (Mass %) | Total metal grain content of coat (Mass %) | Base resin type | Coat thickness (μm) | Coating method | Corrosion Test Results |
| 3392 | 1 | 1.5 | 4.680 | 77.9 | 85 | Alkyl silicate | 130 | Brush | E |
| 3393 | 1 | 4.5 | 0.764 | 43.7 | 53 | Alkyl silicate | 29 | Brush | E |
| 3394 | 1 | 15.5 | 0.170 | 7.8 | 88 | Epoxy resin | 30 | Brush | E |
| 3395 | 1 | 10.5 | 1.209 | 16.0 | 85 | Acrylic resin | 120 | Brush | E |
| 3396 | 1 | 2.5 | 4.171 | 89.6 | 52 | Urethane resin | 187 | Brush | E |
| 3397 | 1 | 9 | 2.640 | 11.8 | 83 | Polyester resin | 28 | Spray | E |
| 3398 | 1 | 10.5 | 0.156 | 4.6 | 88 | Epoxy resin | 5 | Spray | E |
| 3399 | 1 | 5.7 | 2.910 | 2.5 | 49 | Acrylic resin | 35 | Spray | E |
| 3400 | 1 | 3.9 | 0.327 | 18.9 | 50 | Urethane resin | 5 | Spray | G |

TABLE 171-continued

| | | | | | | | | | |
|---|---|---|---|---|---|---|---|---|---|
| 3401 | 1 | 4.5 | 1.091 | 75.9 | 51 | Polyester resin | 200 | Brush | E |
| 3402 | 1 | 3.6 | 1.826 | 55.9 | 83 | Alkali silicate | 25 | Spray | E |
| 3403 | 1 | 16.4 | 0.764 | 53.8 | 82 | Alkali silicate | 15 | Spray | E |
| 3404 | 1 | 6 | 2.657 | 97.5 | 88 | Alkyl silicate | 20 | Spray | E |
| 3405 | 1 | 7.5 | 0.212 | 88.4 | 85 | Alkali silicate | 18 | Spray | E |
| 3406 | 1 | 10.5 | 0.357 | 54.8 | 87 | Alkyl silicate | 22 | Spray | E |
| 3407 | 1 | 2.6 | 4.639 | 45.7 | 86 | Alkali silicate | 19 | Spray | E |
| 3408 | 1 | 1.5 | 0.160 | 34.7 | 46 | Alkyl silicate | 29 | Spray | E |
| 3409 | 1 | 13.5 | 0.731 | 57.9 | 49 | Alkali silicate | 23 | Spray | E |
| 3410 | 1 | 2.6 | 1.917 | 65.4 | 35 | Alkyl silicate | 21 | Spray | E |
| 3411 | 1 | 6.5 | 0.007 | 87.9 | 30 | Alkali silicate | 19 | Spray | E |

TABLE 172

| Invention Example No | Ave diameter of later-added Zn metal grains (μm) | Diameter distribution (peak diameter) of Zn metal grains/Zn alloy grains (μm) Fine metal | Diameter distribution (peak diameter) of Zn metal grains/Zn alloy grains (μm) Coarse metal | Percent of fine-grain metal grains among Zn metal grains/Zn alloy grains (Vol %) | Chemical component content of Zn metal grains/Zn alloy grains (Mass %) Zn | Chemical component content of Zn metal grains/Zn alloy grains (Mass %) Mg | Chemical component content of Zn metal grains/Zn alloy grains (Mass %) Al | Chemical component content of Zn metal grains/Zn alloy grains (Mass %) Si | Alloy grain fracture surfaces or cracks present? | Average aspect ratio | Mg solid solution phase and Zn—Mg intermetallic compounds present on grain surfaces? | Any of MgZn2, Mg2Zn11, Mg2Zn3, MgZn, Mg7Zn3 present? | Number of faces |
|---|---|---|---|---|---|---|---|---|---|---|---|---|---|
| 3412 | 8.7 | 2.31 | 9.46 | 60.57 | 91.56 | 6.4 | 1.05 | 0.99 | Yes | 1.27 | Yes | Yes | 7 |
| 3413 | 7.8 | 2.62 | 9.46 | 39.48 | 93.36 | 3.5 | 2.6 | 0.54 | Yes | 1.17 | Yes | Yes | 7 |
| 3414 | 5.96 | 2.52 | 9.46 | 15.82 | 82.13 | 17.5 | 0.05 | 0.32 | Yes | 1.27 | Yes | Yes | 6 |
| 3415 | 0.06 | 2.24 | 13.32 | 49.57 | 91.2 | 3.6 | 5.2 | 0 | No | 1.27 | Yes | Yes | 7 |
| 3416 | 0.9 | 0.05 | 6.54 | 86.52 | 94.1 | 5.9 | 0 | 0.001 | Yes | 1.48 | Yes | Yes | 2 |
| 3417 | 3.6 | 2.42 | 6.35 | 90.98 | 83.2 | 16.2 | 0 | 0.6 | No | 1.49 | Yes | Yes | 7 |
| 3418 | 10.5 | 0.11 | 7.54 | 67.32 | 76.7 | 22.5 | 0 | 0.8 | Yes | 1.34 | Yes | Yes | 7 |
| 3419 | 0.05 | 1.92 | 8.64 | 82.33 | 96.52 | 3.4 | 0.04 | 0.04 | Yes | 1.23 | Yes | Yes | 2 |
| 3420 | 2.32 | 0.46 | 6.45 | 73.76 | 68.3 | 26.5 | 3 | 2.2 | Yes | 1.23 | Yes | Yes | 6 |
| 3421 | 20.4 | 0.77 | 6.48 | 88.77 | 72.84 | 25.5 | 0.06 | 1.6 | Yes | 1.23 | Yes | Yes | 6 |
| 3422 | 8.6 | 2.35 | 9.25 | 45.02 | 87.2 | 12.8 | 0 | 0 | Yes | 1.05 | Yes | Yes | 6 |
| 3423 | 10.5 | 2.33 | 9.46 | 15.2 | 91.5 | 8.5 | 0 | 0 | Yes | 1.06 | Yes | Yes | 7 |
| 3424 | 8.7 | 1.95 | 9.32 | 51.41 | 75.23 | 24.5 | 0.27 | 0 | Yes | 1.38 | Yes | Yes | 7 |
| 3425 | 7.8 | 2.15 | 9.22 | 45.46 | 77.48 | 18.4 | 2.55 | 1.57 | Yes | 1.06 | Yes | Yes | 6 |
| 3426 | 5.96 | 2.23 | 11.62 | 35.19 | 72.62 | 0.08 | 25.5 | 1.8 | Yes | 1.49 | Yes | Yes | 7 |
| 3427 | 1.6 | 2.26 | 11.15 | 73.02 | 64.06 | 15.2 | 19.4 | 1.34 | No | 1.34 | Yes | Yes | 2 |
| 3428 | 7.2 | 1.98 | 9.34 | 93.45 | 83 | 6.4 | 10.6 | 0 | Yes | 1.48 | Yes | Yes | 7 |
| 3429 | 10.5 | 2.02 | 9.58 | 30.66 | 86.4 | 3.2 | 10.4 | 0 | No | 1.49 | Yes | Yes | 7 |
| 3430 | 3.6 | 2.36 | 12.28 | 32.76 | 80.4 | 6.1 | 13.5 | 0.001 | Yes | 1.29 | Yes | Yes | 2 |
| 3431 | 4.5 | 3.05 | 12.52 | 30.89 | 70.1 | 16.8 | 12.5 | 0.6 | Yes | 1.23 | Yes | Yes | 6 |
| 3432 | 7.9 | 2.57 | 11.9 | 45.9 | 60.9 | 27.5 | 10.8 | 0.8 | Yes | 1.23 | Yes | Yes | 6 |

| Invention Example No | Ratio of (Zn metal grains or Zn alloy grains):(Later-added Zn metal grains) Zn metal grains/Zn alloy grains | Ratio of (Zn metal grains or Zn alloy grains):(Later-added Zn metal grains) Later-added Zn Metal grains | Mg content of all metal grains (Mass %) | Ratio of fine metal grains in coat outermost surface layer 10% thickness to total fine metal grains (Mass %) | Total metal grain content of coat (Mass %) | Base resin type | Coat thickness (μm) | Coating method | Corrosion Test Results |
|---|---|---|---|---|---|---|---|---|---|
| 3412 | 1 | 1.6 | 2.462 | 2.9 | 76 | Alkyl silicate | 15 | Spray | E |

TABLE 172-continued

| | | | | | | | | | |
|---|---|---|---|---|---|---|---|---|---|
| 3413 | 1 | 3.8 | 0.729 | 12.6 | 72 | Alkali silicate | 18 | Spray | E |
| 3414 | 1 | 0.08 | 16.204 | 53.8 | 30 | Alkyl silicate | 22 | Spray | E |
| 3415 | 1 | 164.5 | 0.022 | 17.8 | 83 | Alkyl silicate | 21 | Spray | E |
| 3416 | 1 | 3.6 | 1.283 | 34.7 | 75 | Alkyl silicate | 29 | Spray | E |
| 3417 | 1 | 8.6 | 1.688 | 76.8 | 76 | Alkali silicate | 23 | Spray | E |
| 3418 | 1 | 12 | 1.731 | 58.9 | 72 | Alkyl silicate | 21 | Spray | E |
| 3419 | 1 | 5.8 | 0.500 | 50.8 | 83 | Alkali silicate | 19 | Spray | E |
| 3420 | 1 | 10 | 2.409 | 46.8 | 50 | Alkyl silicate | 21 | Spray | E |
| 3421 | 1 | 1 | 12.750 | 23.7 | 72 | Alkali silicate | 19 | Spray | E |
| 3422 | 1 | 10.5 | 1.113 | 87.9 | 50 | Acrylic resin | 654 | Spray | E |
| 3423 | 1 | 6.5 | 1.133 | 2.9 | 48 | Alkali silicate | 700 | Spray | E |
| 3424 | 1 | 19.5 | 1.195 | 12.6 | 75 | Alkyl silicate | 555 | Spray | E |
| 3425 | 1 | 0.8 | 10.222 | 53.8 | 55 | Alkyl silicate | 12 | Spray | E |
| 3426 | 1 | 5.3 | 0.013 | 17.8 | 38 | Alkyl silicate | 152 | Brush | E |
| 3427 | 1 | 4.3 | 2.868 | 34.7 | 48 | Urethane resin | 674 | Spray | E |
| 3428 | 1 | 3.2 | 1.524 | 76.8 | 76 | Polyester resin | 325 | Spray | E |
| 3429 | 1 | 1.5 | 1.280 | 58.9 | 72 | Alkyl silicate | 665 | Spray | E |
| 3430 | 1 | 4.5 | 1.109 | 50.8 | 75 | Alkyl silicate | 354 | Brush | E |
| 3431 | 1 | 0.8 | 9.333 | 46.8 | 76 | Alkyl silicate | 165 | Spray | E |
| 3432 | 1 | 6.5 | 3.667 | 23.7 | 72 | Urethane resin | 354 | Spray | E |

INDUSTRIAL APPLICABILITY

As explained in the foregoing, the present invention enables provision of highly corrosion-resistant coating material and highly corrosion-resistant steel that exhibit excellent corrosion-resistance and rust prevention unattainable using the metal particles added to conventional rust-prevention coating materials. It achieves this improvement over the prior art by producing Zn metal particles or Zn alloy particles having two grain-diameter frequency peaks in the grain-diameter frequency distribution and combining the particles with an inorganic or organic binder.

The present invention therefore can therefore be advantageously applied for primary rust proofing or combating corrosion of steel materials used in industrial machinery, vehicles, ships, chemical industry facilities, buildings, bridges and the like. As such, it has considerable industrial applicability.

What is claimed is:

1. A highly corrosion-resistant, rust-prevention coating material comprising:
   one of an organic binder and an inorganic binder; and
   Zn-alloy particles, the Zn-alloy particles comprising Zn, 0.1 to 30 percent Mg, and unavoidable impurities, and having physical fragmentation faces and/or cracks of 0.01 μm or greater length, or cracks of 0.01 μm or greater depth, wherein
   a Mg solid solution phase and Zn—Mg intermetallic compounds are present at fracture facets and/or cracks, wherein
   the Zn-alloy particles are dispersed in the binder in an amount of 30 mass % or greater based on a mass of a dry coating film of the coating material,
   wherein
   (i) the Zn-alloy particles include:
   (i-1) fine-grain Zn-alloy particles having a peak grain diameter in the range of 0.05 to 5 μm, the fine-grain Zn-alloy particles having a grain-diameter distribution, a grain-diameter frequency distribution of the grain diameter distribution having a single peak and a tail on either side of the peak, and
   (i-2) coarse-grain Zn-alloy particles having a peak grain diameter in the range of 6 to 100 μm, the coarse-grain Zn-alloy particles having a grain-diameter distribution, a grain-diameter frequency distribution of the grain diameter distribution having a single peak and a tail on either side of the peak, such that
   a grain-diameter frequency distribution of all the Zn-alloy particles has the grain-diameter frequency distribution peak of the fine-grain Zn-alloy particles and the grain-diameter frequency distribution peak of the coarse-grain Zn-alloy particles;
   and wherein
   (ii) 5 to 99% in volume percent of the Zn-alloy particles are Zn-alloy particles have a diameter in the range of 0.05 to 5 μm.

2. The highly corrosion-resistant, rust-prevention coating material according to claim 1, the Zn alloy particles having an average aspect ratio value, determined from maximum grain diameter/minimum grain diameter, in a range of 1 to 1.5.

3. The highly corrosion-resistant, rust-prevention coating material according to claim 1, wherein the Zn—Mg intermetallic compounds are selected from the group consisting of $MgZn_2$, $Mg_2Zn_{11}$, $Mg_2Zn_3$, $MgZn$, $Mg_7Zn_3$, and combinations thereof.

4. The highly corrosion-resistant, rust-prevention coating material according to claim 1, wherein the Zn-alloy particles are polyhedrons having multiple flat or curved surfaces each enclosed by a single contour line.

5. The highly corrosion-resistant, rust-prevention coating material according to claim 1, further comprising, dispersed in the binder, metal particles of Zn and a balance of unavoidable impurities, the dispersed metal particles of Zn and a balance of unavoidable impurities having an average grain diameter of 0.05 to 50 μm,
wherein
(a) 5 to 99% in volume percent of all metal particles are Zn-alloy particles having a grain diameter of 0.05 to 50 μm; and
(b) the metal particles are dispersed in the binder in an amount of 30 mass % or greater based on a mass of a dry coating film of the coating material.

6. The highly corrosion-resistant, rust-prevention coating material according to claim 1, wherein the binder is an organic binder.

7. A highly corrosion-resistant, rust-prevention coating material comprising:
one of an organic binder and an inorganic binder;
Zn-alloy particles comprising Zn, 0.1 to 30 percent Mg, and unavoidable impurities; and
metal particles of Zn and a balance of unavoidable impurities, the metal particles of Zn and a balance of unavoidable impurities having an average grain diameter of 0.05 to 50 μm; wherein
the Zn-alloy particles and metal particles of Zn and a balance of unavoidable impurities are dispersed in the binder in an amount of 30 mass % or greater based on a mass of a dry coating film of the coating material;
wherein
(i) the Zn-alloy particles include:
(i-1) fine-grain Zn-alloy particles having a peak grain diameter in the range of 0.05 to 5 μm, the fine-grain Zn-alloy particles having a grain-diameter distribution, a grain-diameter frequency distribution of the grain diameter distribution having a single peak and a tail on either side of the peak, and
(i-2) coarse-grain Zn-alloy particles having a peak grain diameter in the range of 6 to 100 μm, the coarse-grain Zn-alloy particles having a grain-diameter distribution, a grain-diameter frequency distribution of the grain diameter distribution having a single peak and a tail on either side of the peak, such that
a grain-diameter frequency distribution of all the Zn-alloy particles has the grain-diameter frequency distribution peak of the fine-grain Zn-alloy particles and the grain-diameter frequency distribution peak of the coarse-grain Zn-alloy particles;
and wherein
(ii) 5 to 99% in volume percent of the Zn-alloy particles are Zn-alloy particles have a diameter in the range of 0.05 to 5 μm; and wherein
5 to 99% in volume percent of all metal particles are Zn alloy particles have a grain diameter of 0.05 to 5 μm;
wherein a ratio, in mass %, of one of the amount of the fine-grain and coarse-grain Zn-alloy particles or the amount of the fine-grain and coarse-grain Zn alloy particles to the amount of the Zn metal particles of an average grain diameter of 0.05 to 50 μm containing Zn and a balance of unavoidable impurities is ⅟300.0 or less.

8. The highly corrosion-resistant, rust-prevention coating material according to claim 7, wherein the Mg content of the mixed particles including the Zn alloy particles and the Zn metal particles of an average grain diameter of 0.05 to 50 μm containing Zn and a balance of unavoidable impurities is 0.01 to less than 30 mass % where the total of the mixed particles is defined as 100 mass %.

9. A highly corrosion-resistant steel coated with a highly corrosion-resistant, rust-prevention coating material,
a dry coating film of the coating material having a thickness of 2 to 700 μm, the coating material comprising:
one of an organic binder and an inorganic binder; and
Zn alloy particles comprising Zn, Mg: 0.01 to 30%, and unavoidable impurities, the Zn alloy particles dispersed in the binder in an amount of 30 mass % or greater based on a mass of a dry coating film of the coating material,
wherein
(i) the Zn alloy particles include:
(i-1) fine-grain Zn alloy particles having a peak grain diameter in the range of 0.05 to 5 μM, the fine-grain Zn alloy particles having a grain-diameter distribution, a grain-diameter frequency distribution of the grain diameter distribution having a single peak and a tail on either side of the peak, and
(i-2) coarse-grain Zn alloy particles having a peak grain diameter in the range of 6 to 100 μm, the coarse-grain Zn alloy particles having a grain-diameter distribution, a grain-diameter frequency distribution of the grain diameter distribution having a single peak and a tail on either side of the peak, such that
a grain-diameter frequency distribution of all the Zn alloy particles has the grain-diameter frequency distribution peak of the fine-grain Zn alloy particles and the grain-diameter frequency distribution peak of the coarse-grain Zn alloy particles;
and wherein
(ii) 5 to 99% in volume percent of the Zn alloy particles are Zn alloy particles having a diameter in the range of 0.05 to 5 μm
and wherein
the fine-grain Zn alloy particles having a grain diameter of 0.05 to 5 μm are present in an amount in an outermost 10% thickness surface layer region of the dry film that is at least twice the amount of the fine-grain Zn alloy particles of a grain diameter of 0.05 to 5 μm in the dry film as a whole.

10. A highly corrosion-resistant steel coated with a highly corrosion-resistant, rust-prevention coating material, comprising:
a dry coating film of a coating material having a thickness of 2 to 700 μm, the coating material comprising:
one of an organic binder and an inorganic binder; and
Zn-alloy particles, the Zn-alloy particles comprising Zn, 0.1 to 30 percent Mg, and unavoidable impurities, and having physical fragmentation faces and/or cracks of 0.01 μm or greater length, or cracks of 0.01 μm or greater depth, wherein
a Mg solid solution phase and Zn—Mg intermetallic compounds are present at fracture facets and/or cracks, wherein
the Zn-alloy particles are dispersed in the binder in an amount of 30 mass % or greater based on a mass of a dry coating film of the coating material, wherein
(i) the Zn-alloy particles include:
(i-1) fine-grain Zn-alloy particles having a peak grain diameter in the range of 0.05 to 5 µm, the fine-grain Zn-alloy particles having a grain-diameter distribution, a grain-diameter frequency distribution of the grain diameter distribution having a single peak and a tail on either side of the peak, and
(i-2) coarse-grain Zn-alloy particles having a peak grain diameter in the range of 6 to 100 µm, the coarse-grain Zn-alloy particles having a grain-diameter distribution, a grain-diameter frequency distribution of the grain diameter distribution having a single peak and a tail on either side of the peak, such that
a grain-diameter frequency distribution of all the Zn-alloy particles has the grain-diameter frequency distribution peak of the fine-grain Zn-alloy particles and the grain-diameter frequency distribution peak of the coarse-grain Zn-alloy particles;
and wherein
(ii) 5 to 99% in volume percent of the Zn-alloy particles are Zn-alloy particles having a diameter in the range of 0.05 to 5 µm.

11. A steel structure comprising:
a highly corrosion-resistant steel coated with a highly corrosion-resistant, rust-prevention coating material, the highly corrosion-resistant, rust-prevention coating material comprising:
a dry coating film of the coating material having a thickness of 2 to 700 µm, the coating material comprising:
one of an organic binder and an inorganic binder; and
Zn-alloy particles comprising Zn, 0.1 to 30 percent Mg, and unavoidable impurities, and having physical fragmentation faces and/or cracks of 0.01 µm or greater length, or cracks of 0.01 µm or greater depth; wherein
a Mg solid solution phase and Zn—Mg intermetallic compounds are present at fracture facets and/or cracks, wherein
the Zn-alloy particles are dispersed in the binder in an amount of 30 mass % or greater based on a mass of a dry coating film of the coating material,
wherein
(i) the Zn-alloy particles include:
(i-1) fine-grain Zn-alloy particles having a peak grain diameter in the range of 0.05 to 5 µm, the fine-grain Zn-alloy particles having a grain-diameter distribution, a grain-diameter frequency distribution of the grain diameter distribution having a single peak and a tail on either side of the peak, and
(i-2) coarse-grain Zn-alloy particles having a peak grain diameter in the range of 6 to 100 µm, the coarse-grain Zn-alloy particles having a grain-diameter distribution, a grain-diameter frequency distribution of the grain diameter distribution having a single peak and a tail on either side of the peak, such that
a grain-diameter frequency distribution of all the Zn-alloy particles has the grain-diameter frequency distribution peak of the fine-grain Zn-alloy particles and the grain-diameter frequency distribution peak of the coarse-grain Zn-alloy particles;
and wherein
(ii) 5 to 99% in volume percent of the Zn-alloy particles are Zn-alloy particles having a diameter in the range of 0.05 to 5 µm.

* * * * *